US010618225B2

(12) United States Patent
Dunlap

(10) Patent No.: US 10,618,225 B2
(45) Date of Patent: Apr. 14, 2020

(54) CARRIER PLATE FOR USE IN MANUFACTURING STITCHLESS BULK BAGS WITH HEAT FUSED SEAMS

(71) Applicant: AMERIGLOBE, LLC, Lafayette, LA (US)

(72) Inventor: Clifford Dunlap, Baton Rouge, LA (US)

(73) Assignee: AMERIGLOBE, LLC, Lafayette, LA (US)

( * ) Notice: Subject to any disclaimer, the term of this patent is extended or adjusted under 35 U.S.C. 154(b) by 105 days.

(21) Appl. No.: 15/807,272

(22) Filed: Nov. 8, 2017

(65) Prior Publication Data

US 2018/0126661 A1 May 10, 2018

Related U.S. Application Data

(60) Provisional application No. 62/492,900, filed on May 1, 2017, provisional application No. 62/419,317, filed on Nov. 8, 2016.

(51) Int. Cl.

*B32B 37/00* (2006.01)
*B29C 65/00* (2006.01)

(Continued)

(52) U.S. Cl.

CPC .......... *B29C 66/8511* (2013.01); *B29C 65/18* (2013.01); *B29C 65/224* (2013.01); (Continued)

(58) Field of Classification Search

USPC .............................................. 156/580, 583.1
See application file for complete search history.

(56) References Cited

U.S. PATENT DOCUMENTS 3,788,199 A 1/1974 Sato et al.
3,924,383 A 12/1975 Heger (Continued)

FOREIGN PATENT DOCUMENTS

DE 10234510 A1 2/2004
EP 2570365 3/2013

(Continued)

OTHER PUBLICATIONS

PCT International Search Report and the Written Opinion of the Searching Authority for International Application No. PCT/US2014/041154 (dated Nov. 13, 2014).

(Continued)

*Primary Examiner* — James D Sells

(74) *Attorney, Agent, or Firm* — Garvey, Smith & Nehrbass, Patent Attorneys, L.L.C.; Julia M. FitzPatrick; Gregory C. Smith

(57) ABSTRACT

A stitchless highly oriented polypropylene fabric bulk bag of the type that can hold 500 to 5000 pounds (226.7 to 2268 kilograms) of bulk material includes a highly oriented polypropylene fabric top, body and bottom, with a heat fused joint providing an air tight connection between the top and body, and another air tight heat fused joint connecting the body and bottom. A fill spout and discharge tube may also be provided with an air tight heat fused joint connecting the fill spout to the top and another air tight heat fused joint connecting the discharge spout to the bottom. Heat sealing machinery include heat seal bar assemblies that can self-align during heat-sealing to apply even pressure to all areas being heat sealed. A heating element is of single piece construction and can include end coupler portions as part of the single piece construction. Carrier plates used in a heat-sealing assembly line guide parts placement, provide quality (Continued)

checks for parts placement, and tooling set-up for machinery.

20 Claims, 167 Drawing Sheets

(51) Int. Cl.
*B29C 65/22* (2006.01)
*B65D 88/16* (2006.01)
*B29C 65/18* (2006.01)
*B29L 31/00* (2006.01)
*B29K 623/00* (2006.01)

(52) U.S. Cl.
CPC .......... *B29C 65/228* (2013.01); *B29C 65/229* (2013.01); *B29C 66/1122* (2013.01); *B29C 66/4322* (2013.01); *B29C 66/43121* (2013.01); *B29C 66/43421* (2013.01); *B29C 66/71* (2013.01); *B29C 66/729* (2013.01); *B29C 66/7292* (2013.01); *B29C 66/73711* (2013.01); *B29C 66/8163* (2013.01); *B29C 66/8167* (2013.01); *B29C 66/8242* (2013.01); *B29C 66/8322* (2013.01); *B29C 66/91212* (2013.01); *B29C 66/91231* (2013.01); *B29C 66/91933* (2013.01); *B65D 88/1618* (2013.01); *B65D 88/1668* (2013.01); *B65D 88/1681* (2013.01); *B29C 66/8122* (2013.01); *B29K 2623/12* (2013.01); *B29K 2713/02* (2013.01); *B29K 2995/005* (2013.01); *B29L 2031/7126* (2013.01); *B29L 2031/7128* (2013.01)

(56) References Cited

U.S. PATENT DOCUMENTS

| | | | |
|---|---|---|---|
| 4,906,320 A | 3/1990 | Powers | |
| 5,417,035 A | 5/1995 | English | |
| 5,695,598 A | 12/1997 | Groshens et al. | |
| 5,823,683 A | 10/1998 | Antonacci et al. | |
| 6,179,467 B1 | 1/2001 | Derby et al. | |
| 6,374,579 B1 | 4/2002 | Muller | |
| 6,935,782 B2 | 8/2005 | Cholsaipant | |
| 7,081,078 B2 | 7/2006 | Bailey et al. | |
| 7,276,269 B2 | 10/2007 | Kraimer et al. | |
| 8,236,711 B1 | 8/2012 | Wang | |
| 8,297,840 B2 | 10/2012 | Jansen | |
| 10,112,739 B2 * | 10/2018 | Dunlap | A41H 43/04 |
| 2008/0115458 A1 | 5/2008 | Funaki et al. | |
| 2008/0176009 A1 | 7/2008 | Chereau et al. | |
| 2009/0260324 A1 | 10/2009 | Funaki et al. | |
| 2010/0158418 A1 | 6/2010 | Jansen | |
| 2010/0209024 A1 | 8/2010 | Fuerst et al. | |
| 2010/0209025 A1 | 8/2010 | Futase | |
| 2011/0019942 A1 | 1/2011 | Piraneo | |
| 2011/0033135 A1 | 2/2011 | Breck et al. | |
| 2011/0085749 A1 | 4/2011 | Frei et al. | |
| 2011/0206300 A1 | 8/2011 | Koesters et al. | |
| 2012/0094563 A1 | 4/2012 | Arroyo Villan et al. | |
| 2012/0227363 A1 | 9/2012 | Nussbaum | |
| 2012/0314979 A1 | 12/2012 | Heininga | |
| 2013/0064481 A1 | 3/2013 | Yamamoto et al. | |
| 2013/0202231 A1 | 8/2013 | Nowak et al. | |
| 2013/0209002 A1 | 8/2013 | Bazbaz | |
| 2013/0305664 A1 | 11/2013 | Yillan et al. | |
| 2014/0363106 A1 | 11/2014 | Schnaars, Sr. et al. | |

FOREIGN PATENT DOCUMENTS

| | | |
|---|---|---|
| GB | 1604213 A | 12/1981 |
| SU | 1533636 | 1/1990 |
| WO | 1998/011291 | 3/1998 |
| WO | 2003/032763 | 4/2003 |
| WO | WO2010091708 A1 | 8/2010 |
| WO | 2012052445 | 4/2012 |
| WO | 2012/121716 | 9/2012 |

OTHER PUBLICATIONS

PCT International Search Report and the Written Opinion of the Searching Authority for International Application No. PCT/US2014/041155 (dated Sep. 30, 2014).

PCT International Search Report and Written Opinion for International Patent Application Serial No. PCT/US2017/060652 (dated Mar. 15, 2018).

Encyclopedia of Polymer Science, vol. 11, Propylene Polymers.

* cited by examiner

| Test 1-5 ounce polyproplyne standard 1 ½ inch fold chain stitch - WARP | | | |
|---|---|---|---|
| | No Stitch Tensile | Chain StitchTensile | % Tensile Strength |
| | 408.9 | 237.7 | |
| | 403.3 | 242.1 | |
| | 405.1 | 248.2 | |
| | 414.0 | 231 | |
| | 390.3 | 193.7 | |
| Average – set 1 | 404.32 | 230.54 | 57.0% |
| | 378.3 | 217.4 | |
| | 393.5 | 230.2 | |
| | 403.0 | 207.3 | |
| | 378.3 | 221.1 | |
| | 393.9 | 242.8 | |
| Average – set 2 | 389.4 | 223.8 | 57.5% |
| | | | |
| Average–sets 1 & 2 | | | 57.2% |

| Test 2-5 ounce polyproplyne standard 1 ½ inch fold chain stitch - WEFT | | | |
|---|---|---|---|
| | No Stitch Tensile | Chain StitchTensile | % Tensile Strength |
| | 393.2 | 249.9 | |
| | 400.6 | 206.8 | |
| | 368.0 | 226.3 | |
| | 378.9 | 226.8 | |
| | 405.2 | 238.3 | |
| Average – set 1 | 389.18 | 229.62 | 59.0% |
| | 397.8 | 223.5 | |
| | 361.4 | 226.3 | |
| | 379.0 | 229.5 | |
| | 393.2 | 230.9 | |
| | 422.1 | 231.2 | |
| Average – set 2 | 390.7 | 228.3 | 58.4% |
| | | | |
| Average–sets 1 & 2 | | | 58.7% |

FIG. 1A

| Test 3-5 ounce polyproplyne standard 1 1/2 in. fold chain stitch with 1 1/2 hem-WARP | | | |
|---|---|---|---|
| | No Stitch Tensile | Chain StitchTensile | % Tensile Strength |
| | 379.4 | 251.2 | |
| | 390.2 | 251.4 | |
| | 379.5 | 239.0 | |
| | 388.4 | 262.4 | |
| | 413.0 | 250.7 | |
| Average – set 1 | 390.1 | 250.9 | 64.3% |
| | 403.8 | 277.3 | |
| | 402.3 | 256.3 | |
| | 392.3 | 241.9 | |
| | 403.6 | 265.4 | |
| | 403.4 | 271.3 | |
| Average – set 2 | 401.1 | 262.4 | 65.4% |
| | | | |
| Average–sets 1 & 2 | | | 64.9% |

| Test 4-5 ounce polyproplyne standard 1 ½ inch fold chain stitch with 1 ½ hem- WEFT | | | |
|---|---|---|---|
| | No Stitch Tensile | Chain StitchTensile | % Tensile Strength |
| | 406.4 | 254.8 | |
| | 441.7 | 246.1 | |
| | 423.5 | 246.3 | |
| | 413.7 | 255.8 | |
| | 431.4 | 254.4 | |
| Average – set 1 | 423.34 | 251.48 | 59.4% |
| | 428.0 | 303.6 | |
| | 414.0 | 215.8 | |
| | 393.2 | 268.5 | |
| | 387.5 | 276.9 | |
| | 388.4 | 250.0 | |
| Average – set 2 | 402.2 | 263.0 | 65.4% |
| | | | |
| Average–sets 1 & 2 | | | 62.4% |

FIG. 1B

| 502 FUSION TENSILE STRENGTH | | | | | | | | | | | | |
|---|---|---|---|---|---|---|---|---|---|---|---|---|
| | | 428 | | | | | | | | | | |
| | | | | | | | | | | | | |
| | #1 | | | #2 | | | #3 | | | #4 | | |
| | | 400 | | | 353 | | | 414 | | | 408 | |
| | | 373 | | | 407 | | | 412 | | | 411 | |
| | | 425 | | | 425 | | | 413 | | | 426 | |
| | | 390 | | | 395 | | | 442 | | | 382 | |
| | | 434 | | | 435 | | | 437 | | | 407 | |
| | | 419 | | | 412 | | | 415 | | | 356 | |
| | | Avg 407 | Drop 4.9% | | Avg 407 | Drop 3.7% | | Avg 422 | Drop 1.4% | | Avg 398 | Drop 7% |

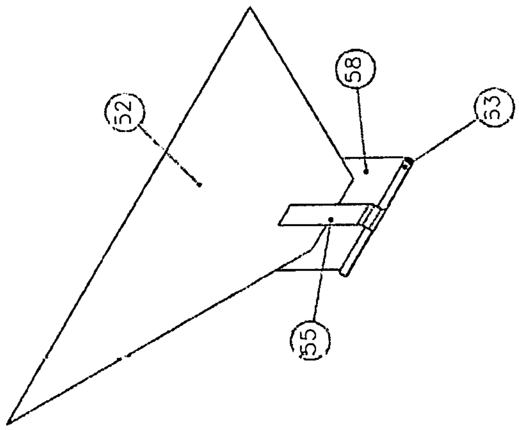
FIG 25
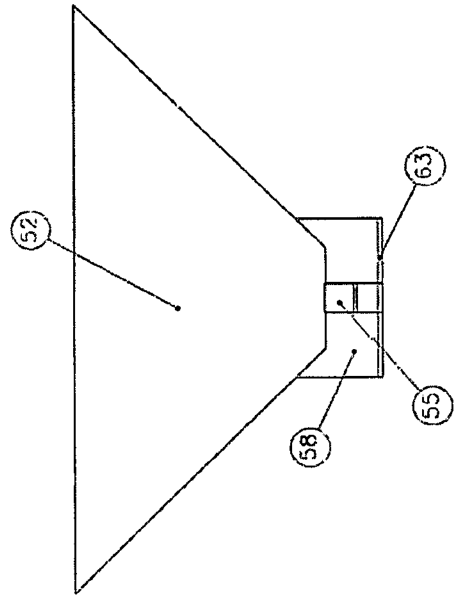
REAR VIEW
FIG 25B
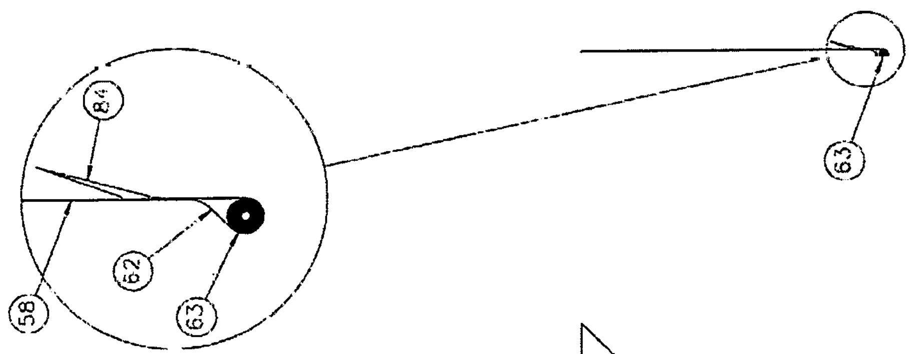
FIG 25D
SIDE VIEW
FIG 25C
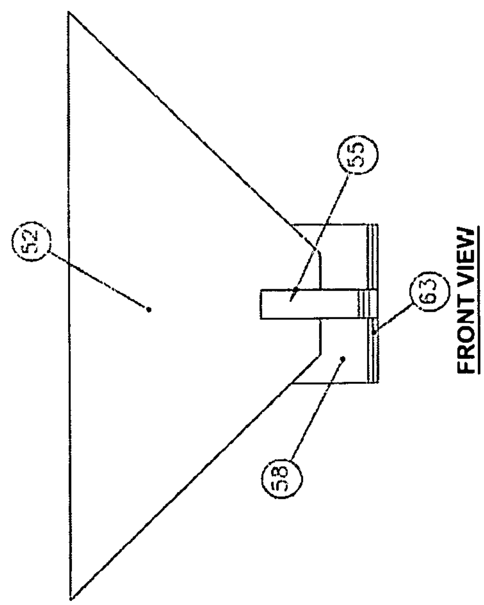
FRONT VIEW
FIG. 25A

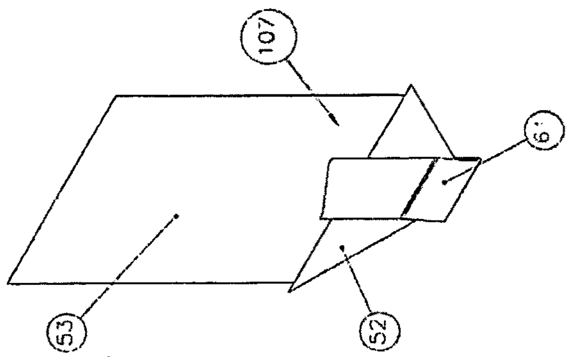
FIG 26
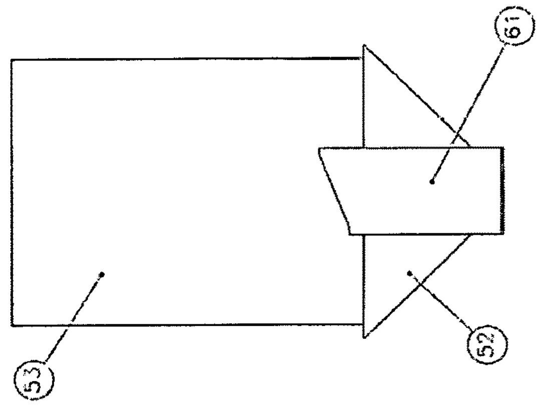
REAR VIEW
FIG 26B
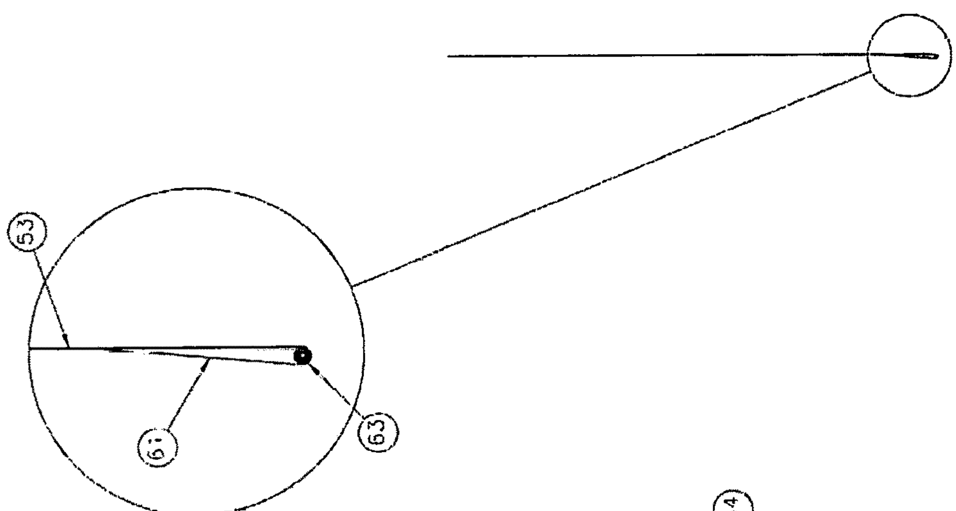
FIG 26D
SIDE VIEW
FIG 26C
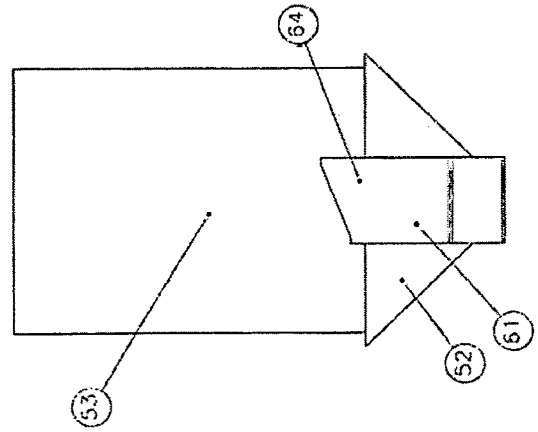
FRONT VIEW
FIG. 26A

TOP VIEW

FRONT VIEW

FRONT VIEW

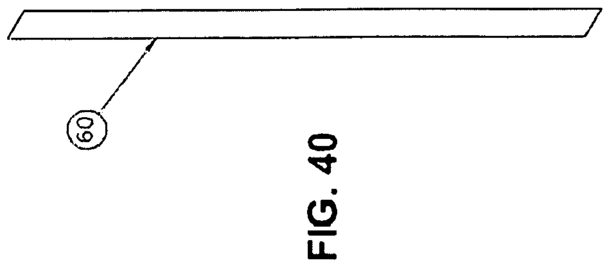
FIG. 40
FIG. 40A
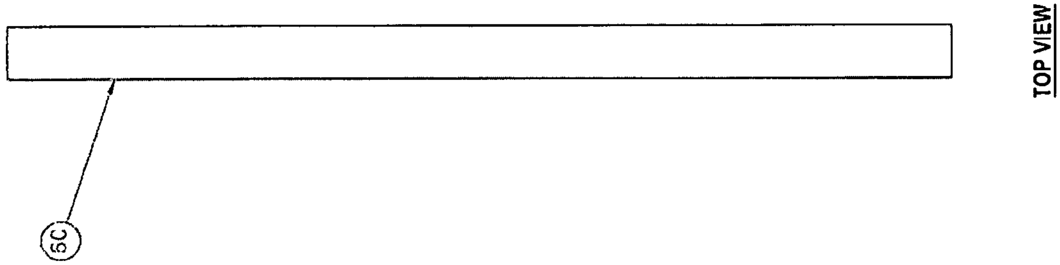

TOP VIEW

TOP VIEW

FRONT VIEW

END VIEW

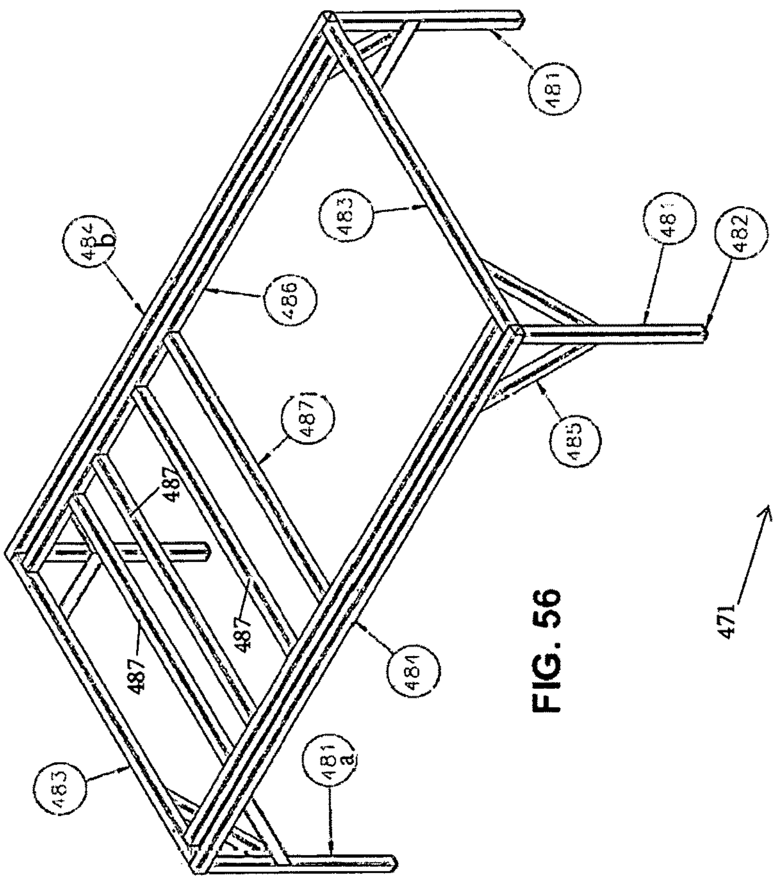
FIG. 56
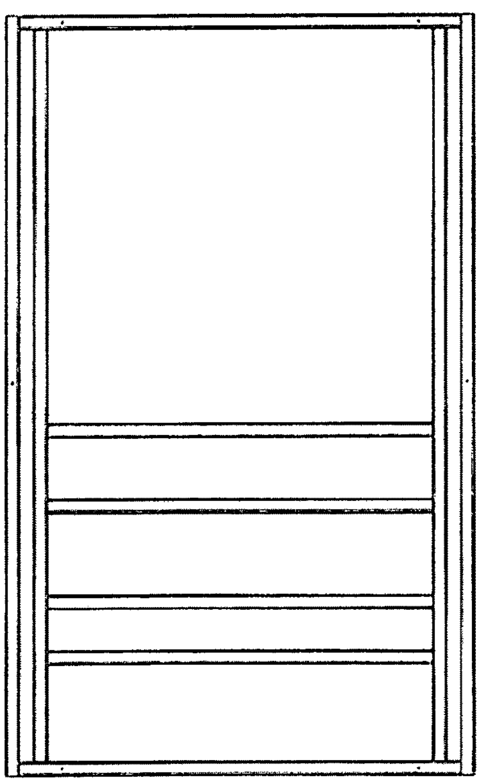
FIG 56A
TOP VIEW
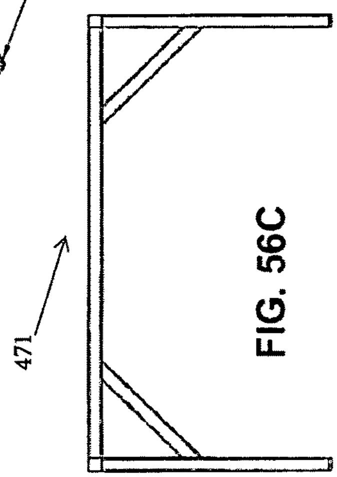
FIG. 56C
SIDE VIEW
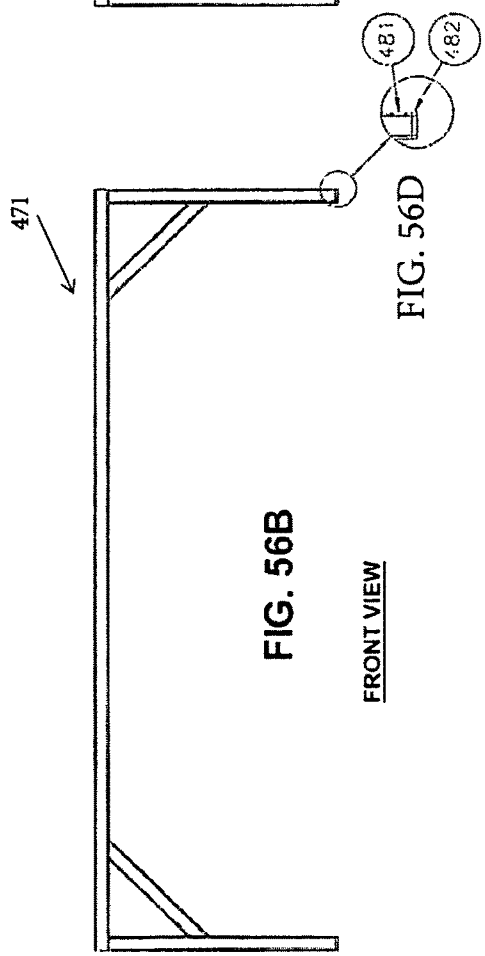
FIG. 56D
FIG. 56B
FRONT VIEW

SIDE VIEW

TOP VIEW

FRONT VIEW

BOTTOM VIEW

SIDE VIEW

TOP VIEW

FRONT VIEW

TOP VIEW

FRONT VIEW

SIDE VIEW

BOTTOM VIEW

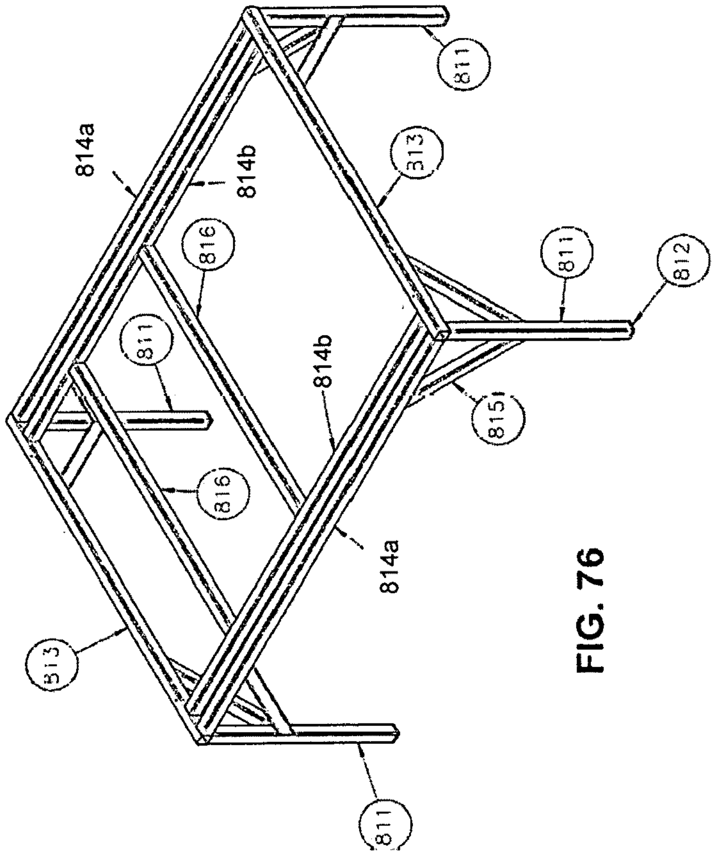
FIG. 76
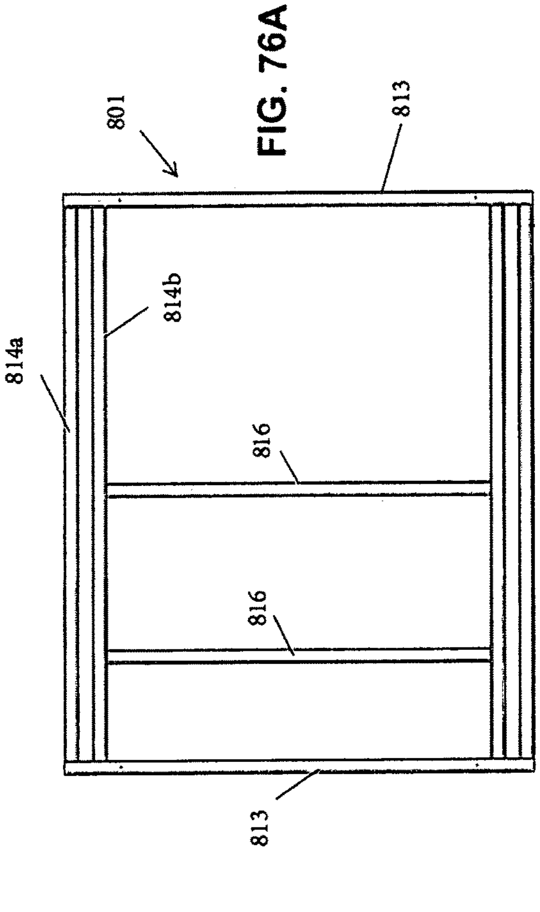
FIG. 76A
TOP VIEW
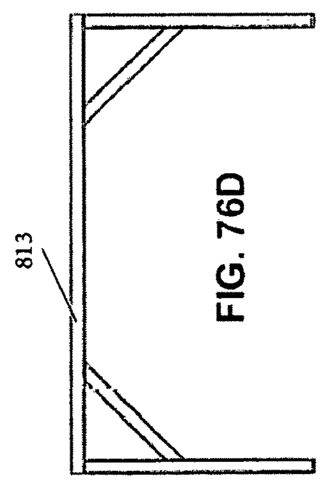
FIG. 76D
SIDE VIEW
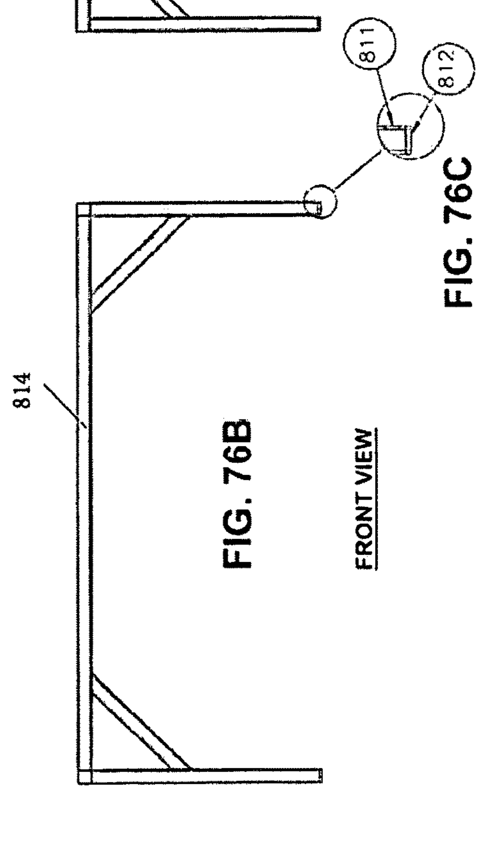
FIG. 76C
FIG. 76B
FRONT VIEW

FRONT VIEW

FRONT VIEW

Controller Faults Explained

Timeout Fault:
Triggered if ramp up exceeds 20 seconds. Cycle is terminated and Engineering is notified to check machine and clear alarm.

Overshoot Warning:
Triggered if overshoot exceeds the overshoot warning threshold which varies per heating element. Cycle is allowed to complete. Operator can clear alarm but advised to check bag for damage.

Overshoot Fault:
Triggered by three (3) consecutive overshoot warnings. Cycle is allowed to complete, however Engineering is notified to check machine and clear alarm.

High Temp Fault:
Triggered if either control or check sensors exceed high temperature trigger at any point in the cycle. Cycle is terminated and Engineering is notified.

Low Temp Fault:
Triggered if the control sensor temperature drops below set threshold during seal time. Cycle is terminated and Engineering notified.

Dual Sensor Fault:
Each heating element has two (2) sensors monitoring the temperature of the element. One (1) sensor is used for control and the other is used as a fail-safe check. Once the seal time is reached there is a five (5) second delay to allow the temperature to stabilize and then the temperature average is calculated for the remainder of the seal time. At the end of the seal time the averages for the control and check sensors are compared by the PLC and a dual sensor fault is triggered if the values are out of tolerance. Cycle is allowed to complete but Engineering is notified to check machine and clear alarm.

FIG. 119

1-Electrical Schematics

| Drawing | Function | Location | | Description | Folder designation |
|---|---|---|---|---|---|
| 01 | F1 | L1 | | Cover page | |
| 02 | F1 | L1 | | Drawing list | |
| 03 | F1 | L1 | | High Voltage Power Schematic | |
| 04 | F1 | L2 | | PLC Control Power Schematic | |
| 05 | F1 | L2 | | Sensor Wiring I | |
| 06 | F1 | L2 | | Sensor Wiring II | |
| 07 | F1 | L2 | | Sensor Wiring III | |
| 08 | F1 | L3 | | I/O Control Wiring I | |
| 09 | F1 | L3 | | I/O Control Wiring II | |
| 10 | F1 | L1 | | Enclosure Layout | |
| 11 | F1 | L1 | | Inner Panel Layout | |

Table 1. Summary comparision of hand sewn bulk bags to Fusion bulk bags.

| Sewn bulk bags | Fusion™ bulk bags |
|---|---|
| 20 16 week lead time for FIBC users | 4 week lead time for FIBC users |
| 20 min sewing labor per bag | 6 min sealing automation per bag |
| 63% seal strength retention | 95% seal strength retention |
| Need extra fabric at seams to reinforce thread strength | Eliminates 20% of fabric needs |
| Contaminated by human contact, needles, etc | Eliminates contamination by automated process |
| Needle holes created in PP fabric, possible leakage | Leakage/tear risk eliminated with sealed seams |
| Production concentrated in SE Asia | Production can be domestic to the user |
| Liners often needed for cleanliness and moisture retention purposes | Eliminates need of liner for some industries |

FRONT VIEW

END VIEW

FRONT VIEW

END VIEW

TOP VIEW

FRONT VIEW

END VIEW

TOP VIEW

FRONT VIEW

END VIEW

TOP VIEW

FRONT VIEW

END VIEW

TOP VIEW

FRONT VIEW

TOP VIEW

FRONT VIEW

END VIEW

FIG. 157
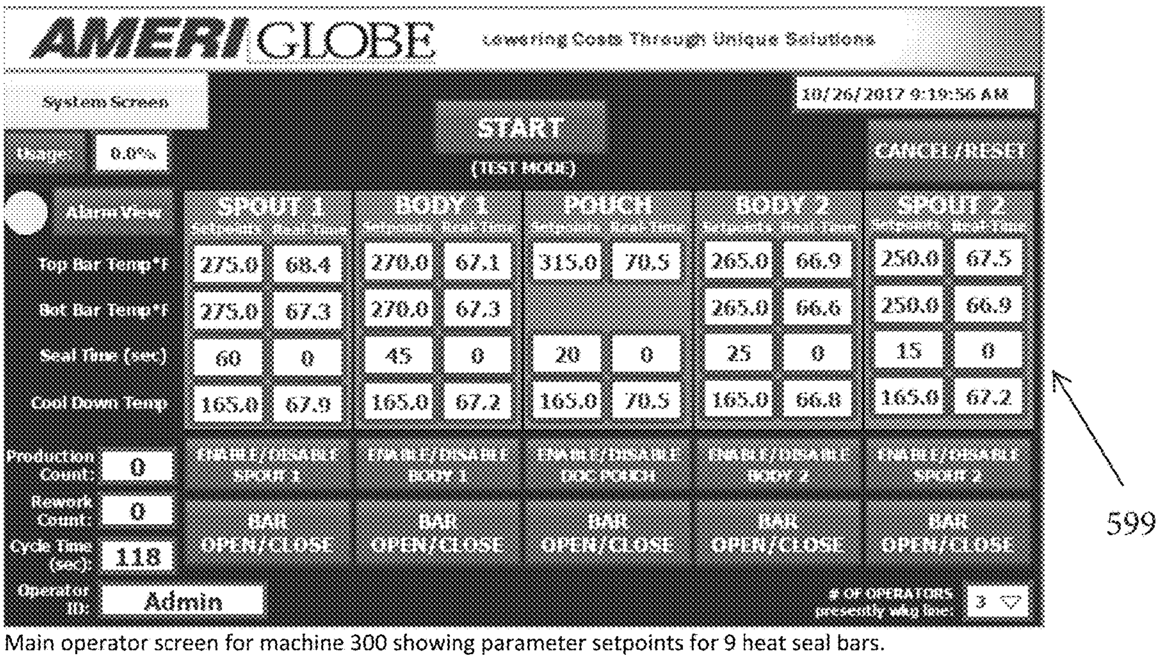
Main operator screen for machine 300 showing parameter setpoints for 9 heat seal bars.
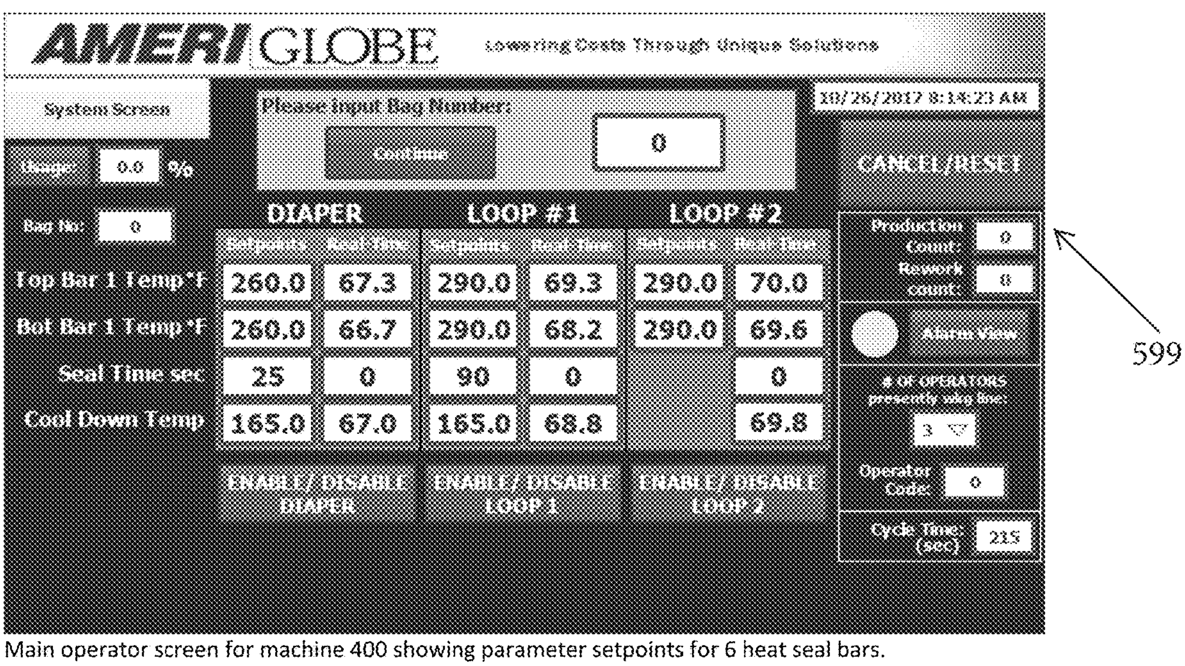
Main operator screen for machine 400 showing parameter setpoints for 6 heat seal bars.
FIG. 158

FIG. 159
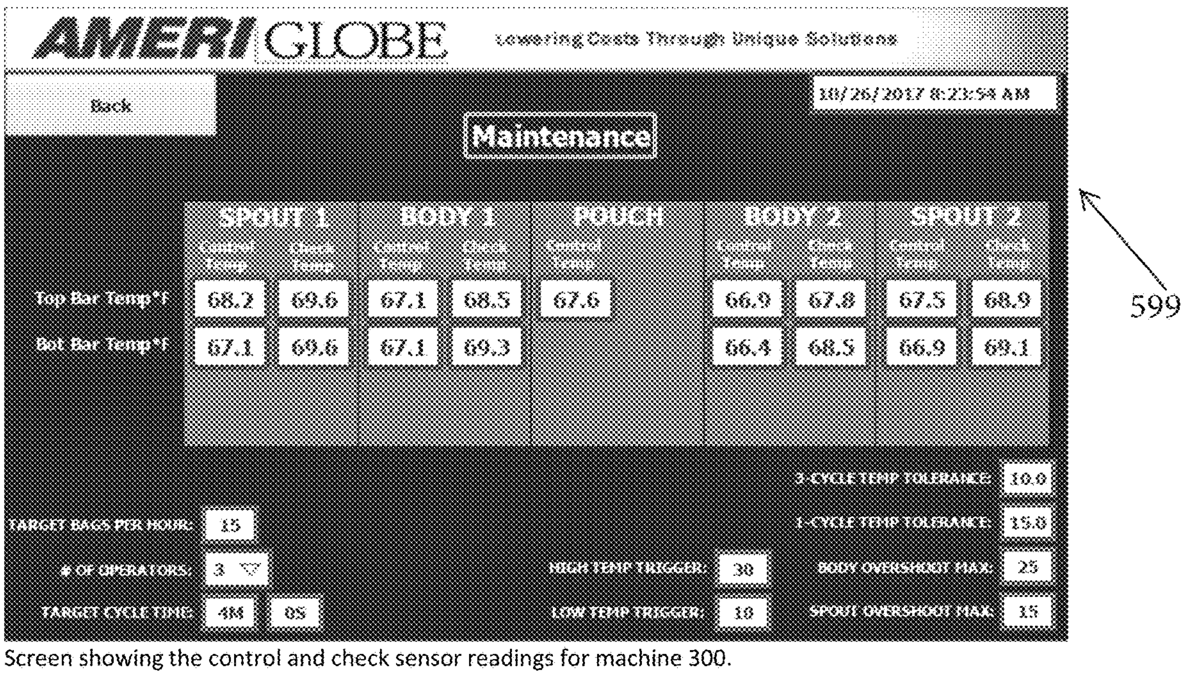
Screen showing the control and check sensor readings for machine 300.
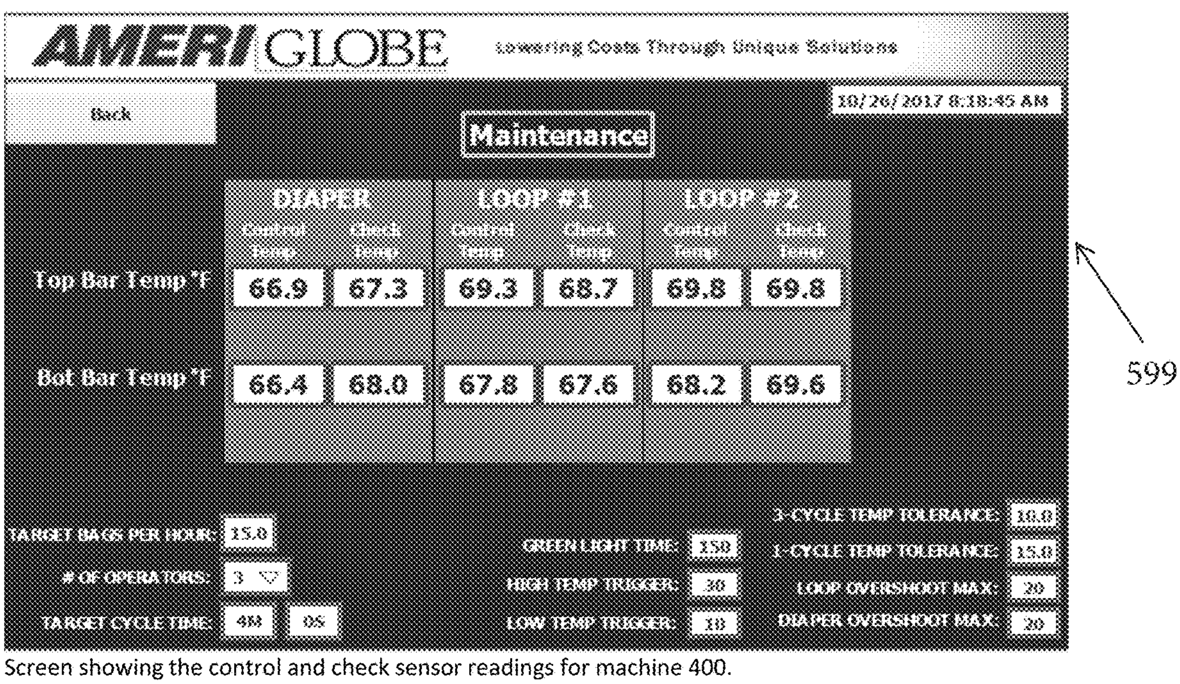
Screen showing the control and check sensor readings for machine 400.
FIG. 160

FIG. 161
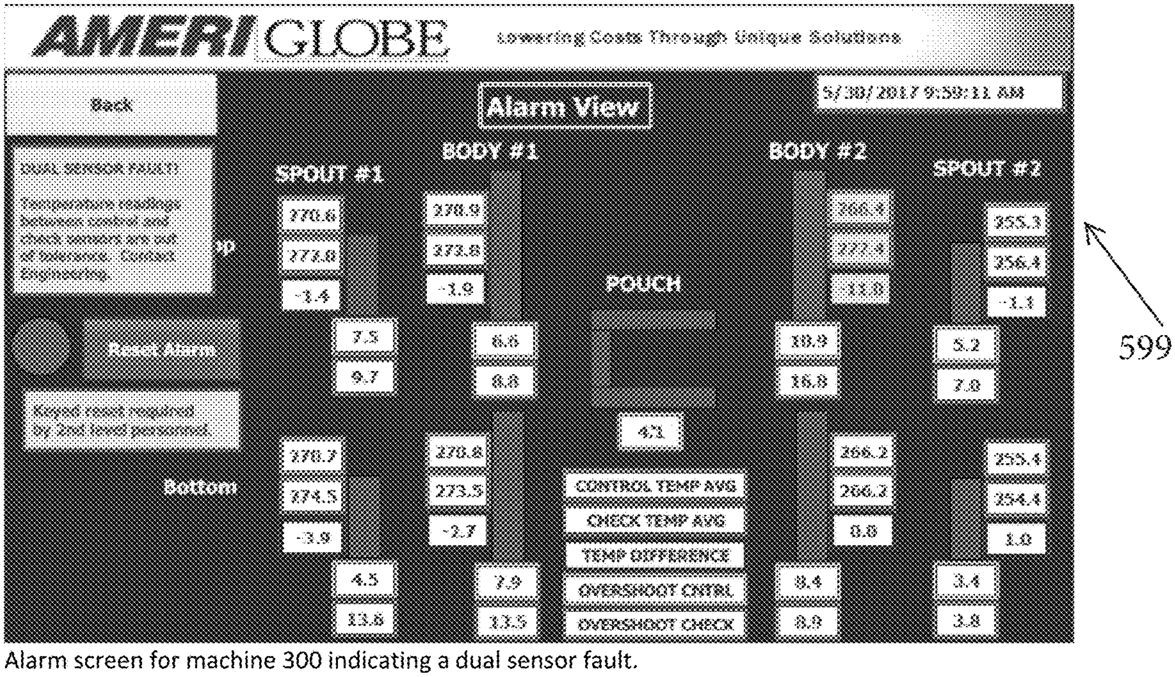
Alarm screen for machine 300 indicating a dual sensor fault.
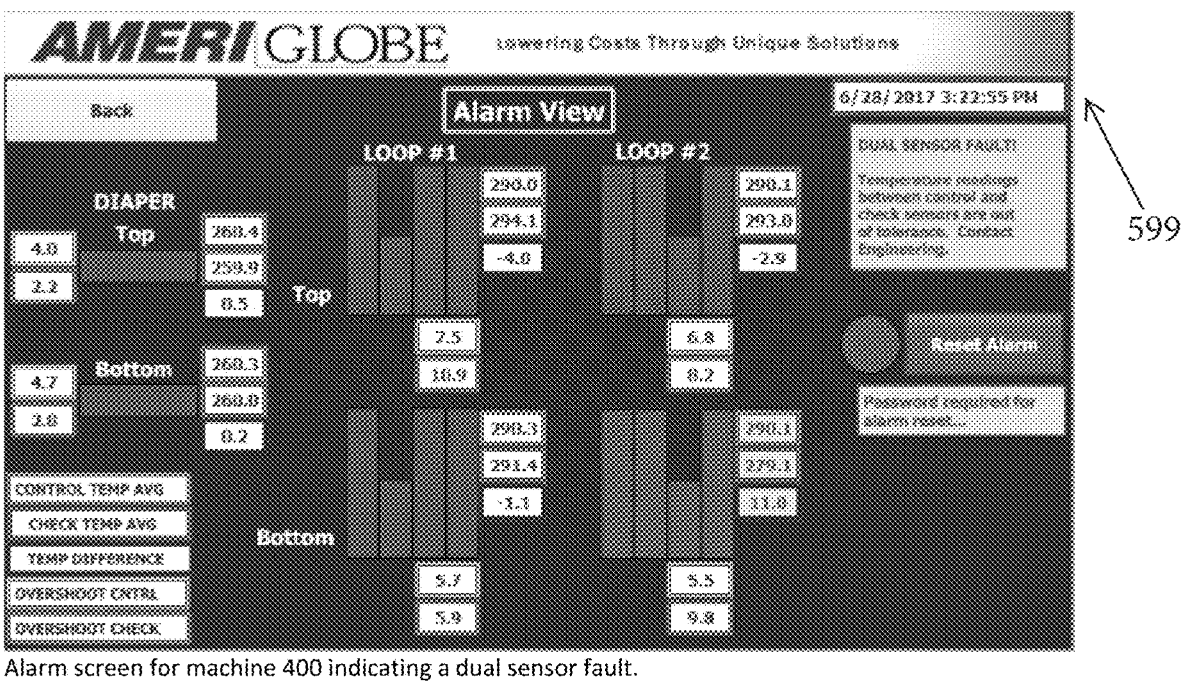
Alarm screen for machine 400 indicating a dual sensor fault.
FIG. 162

FIG. 163
Timeout Fault Machine 300
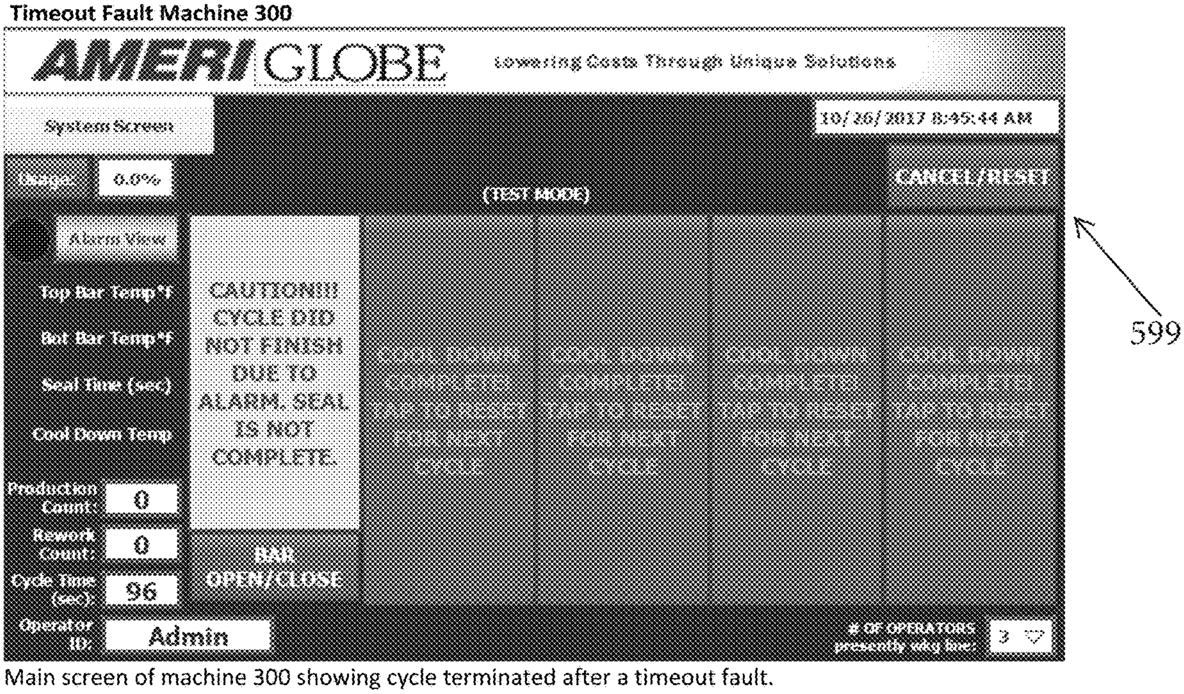
599
Main screen of machine 300 showing cycle terminated after a timeout fault.
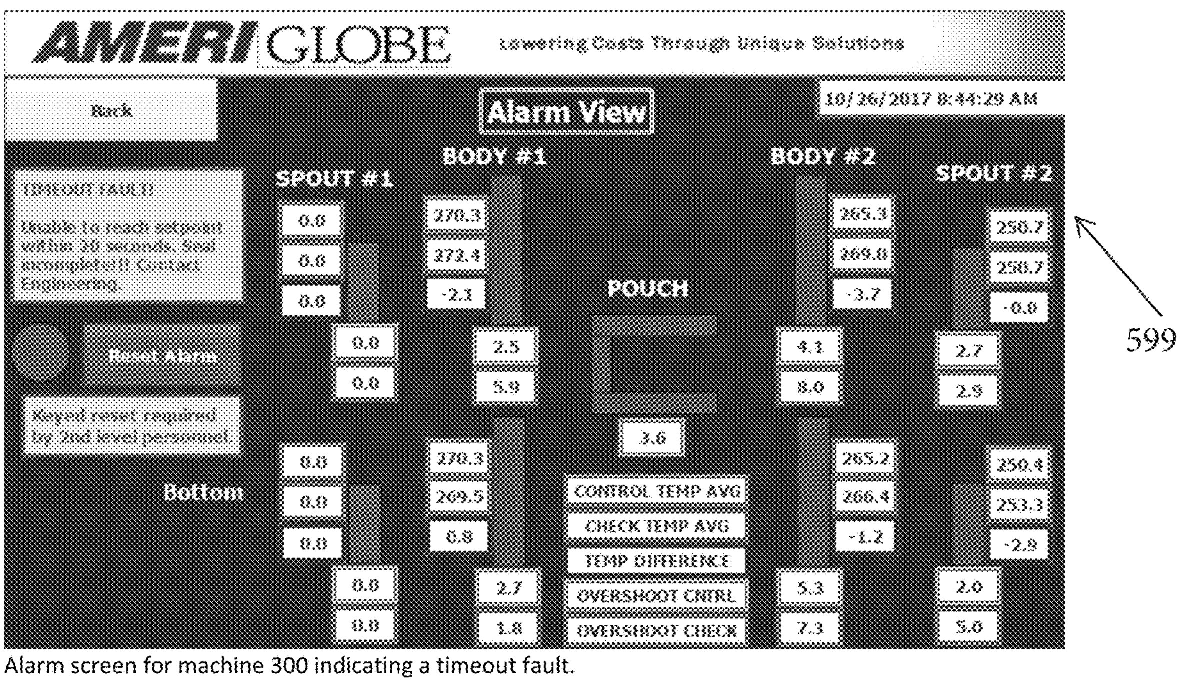
599
Alarm screen for machine 300 indicating a timeout fault.
FIG. 164

FIG. 165
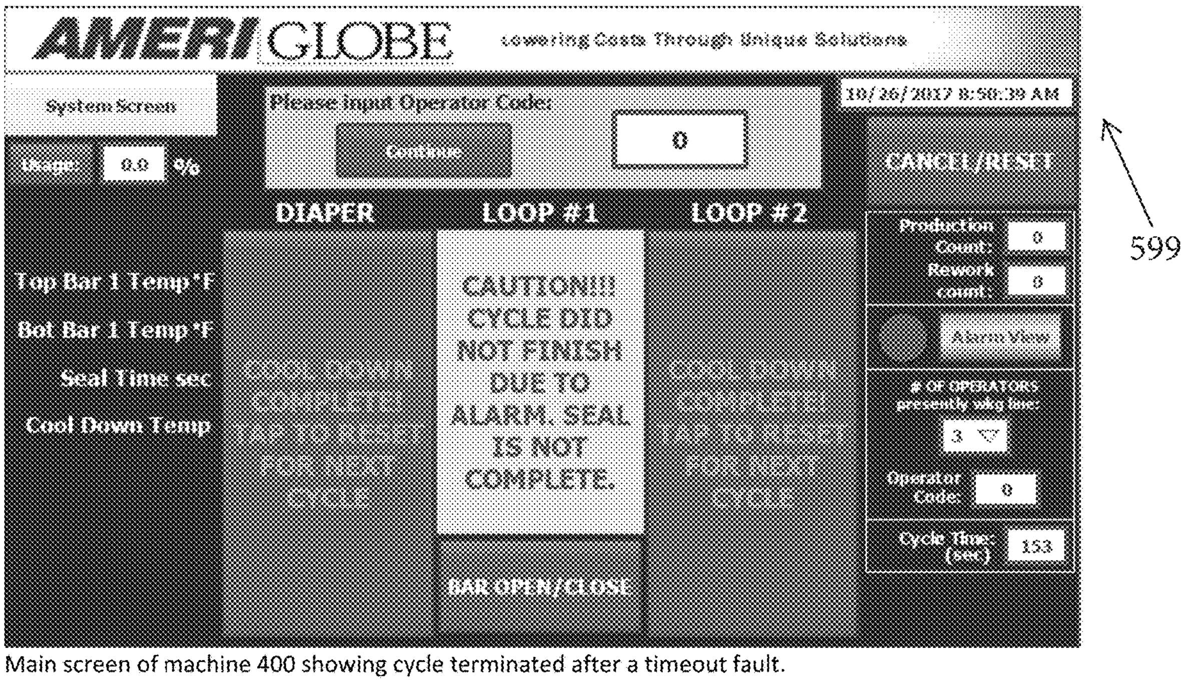
Main screen of machine 400 showing cycle terminated after a timeout fault.
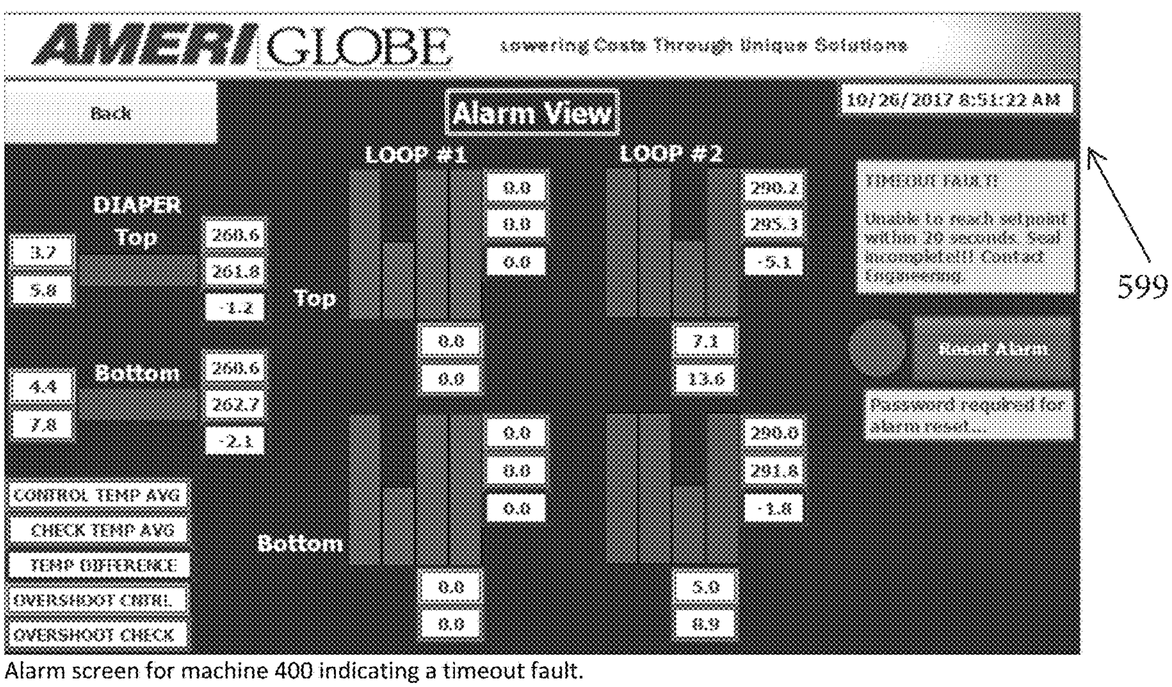
Alarm screen for machine 400 indicating a timeout fault.
FIG. 166

FIG. 167
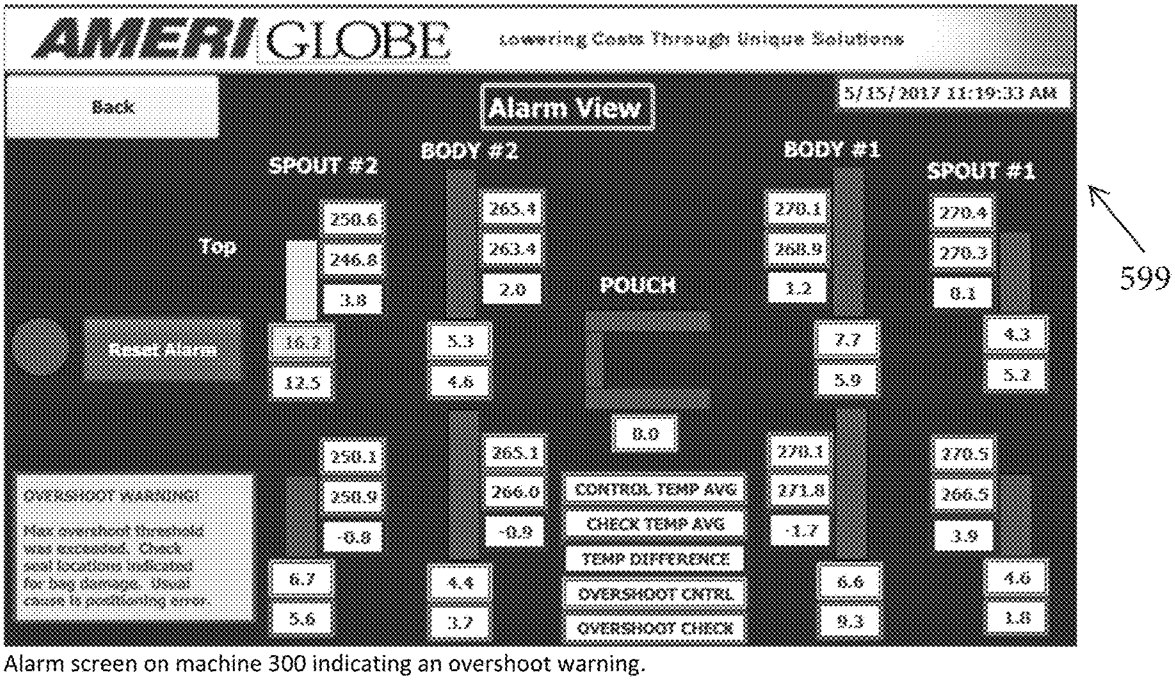
Alarm screen on machine 300 indicating an overshoot warning.
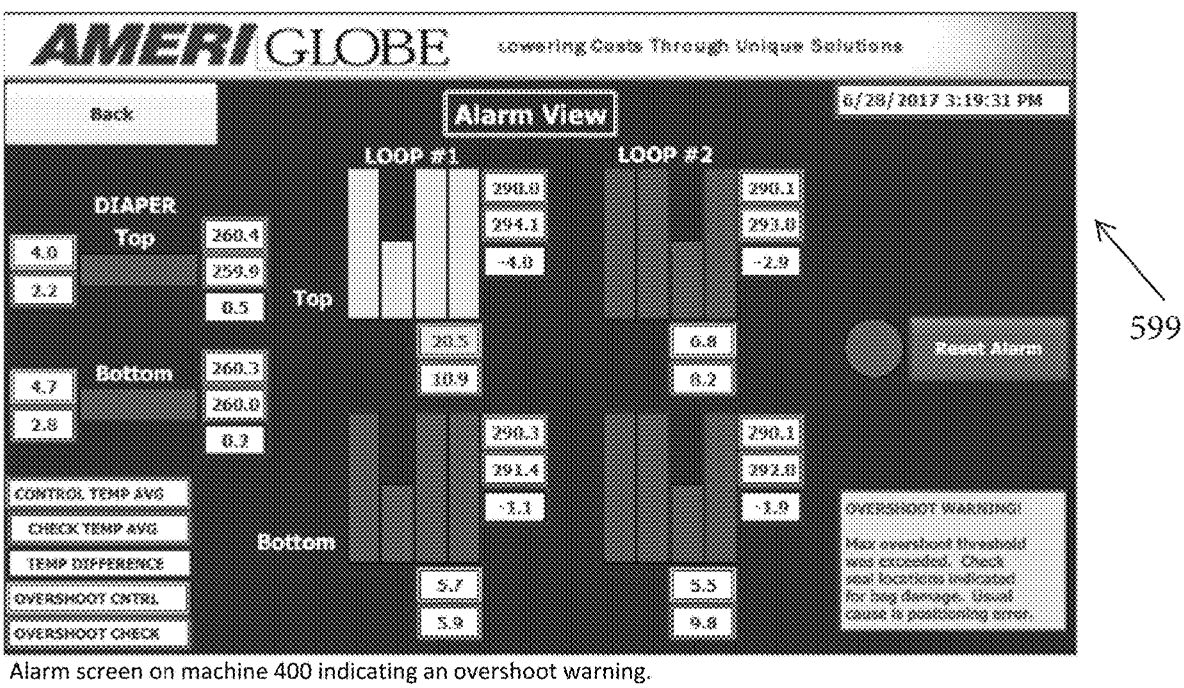
Alarm screen on machine 400 indicating an overshoot warning.
FIG. 168

FIG. 169
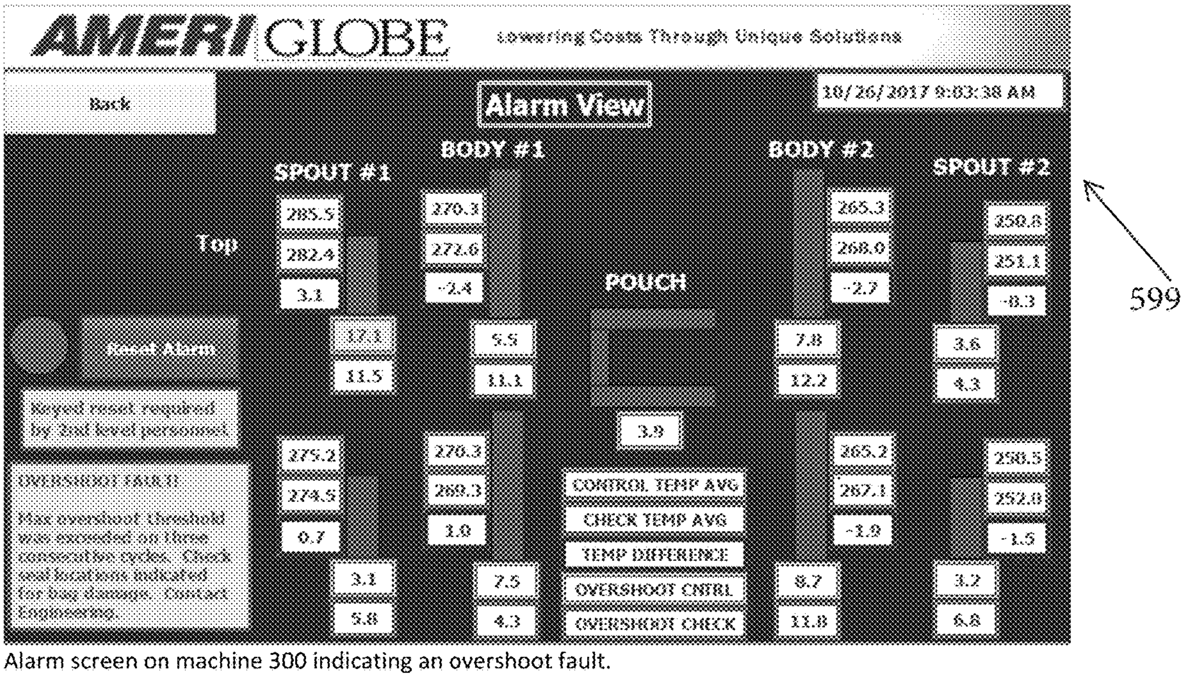
Alarm screen on machine 300 indicating an overshoot fault.
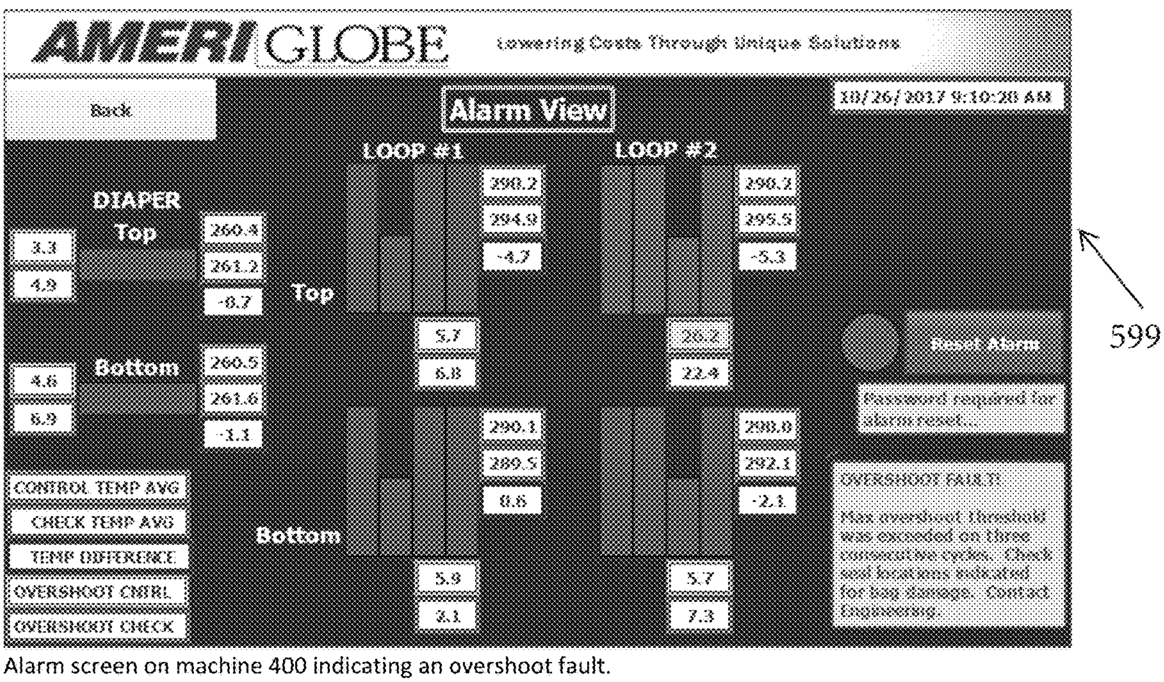
Alarm screen on machine 400 indicating an overshoot fault.
FIG. 170

FIG. 171
Page 121 lines 24-26 – High Temperature Fault
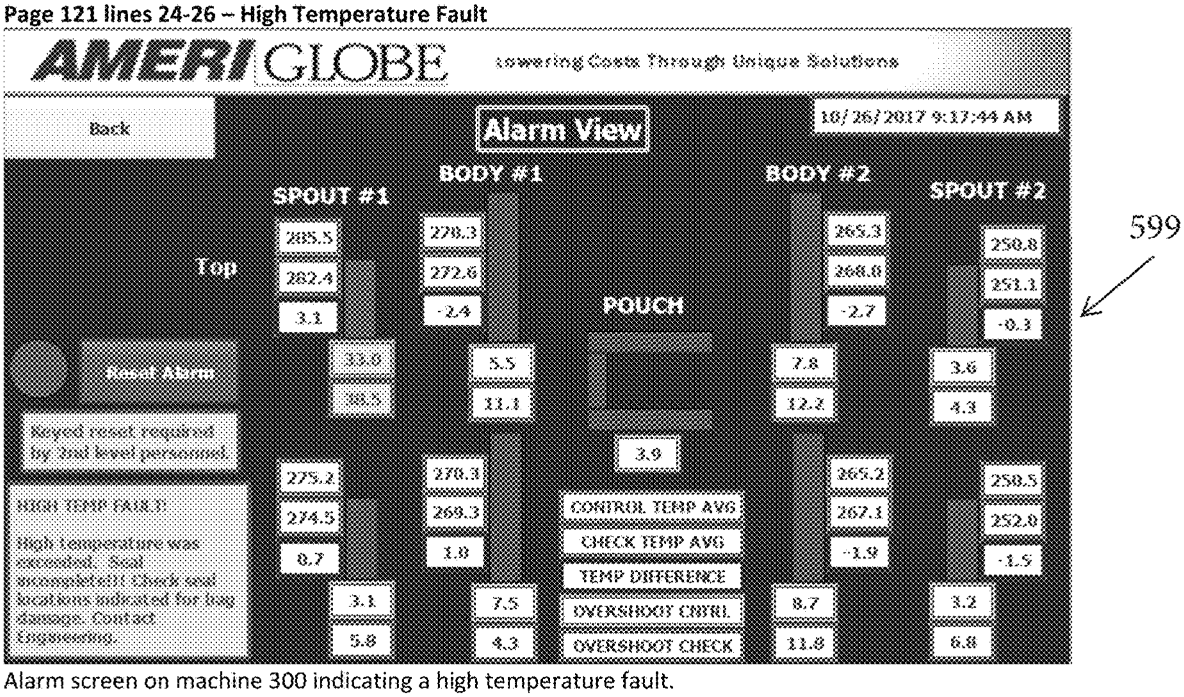
599
Alarm screen on machine 300 indicating a high temperature fault.
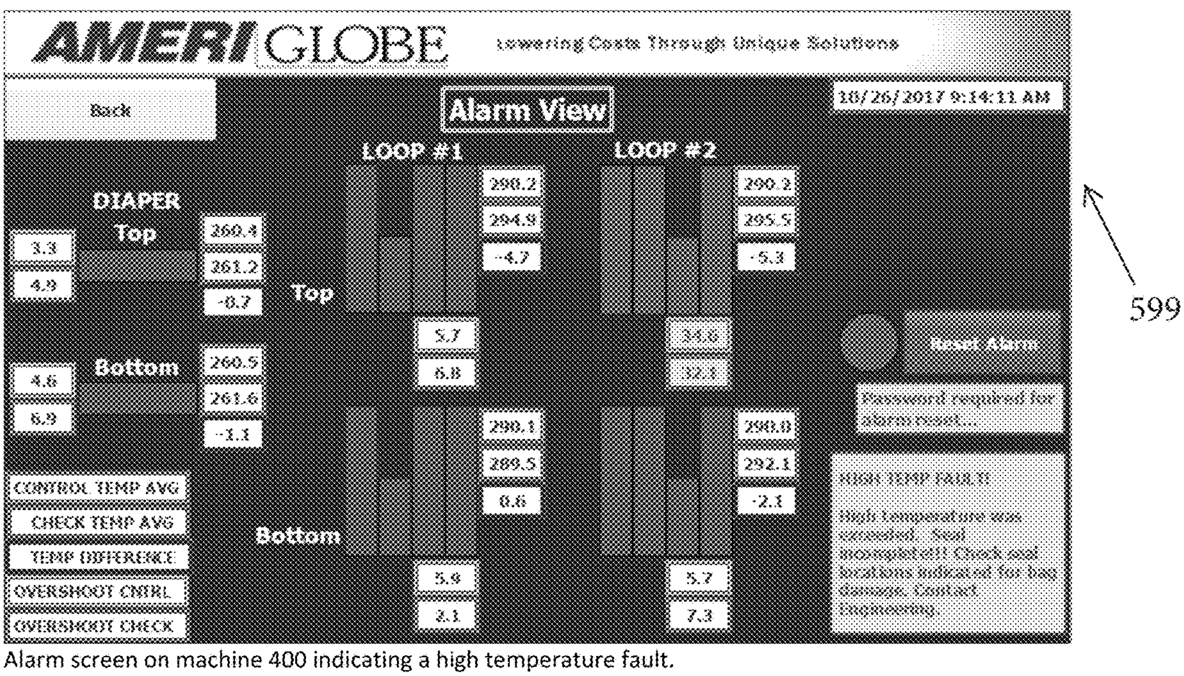
599
Alarm screen on machine 400 indicating a high temperature fault.
FIG. 172

FIG.173
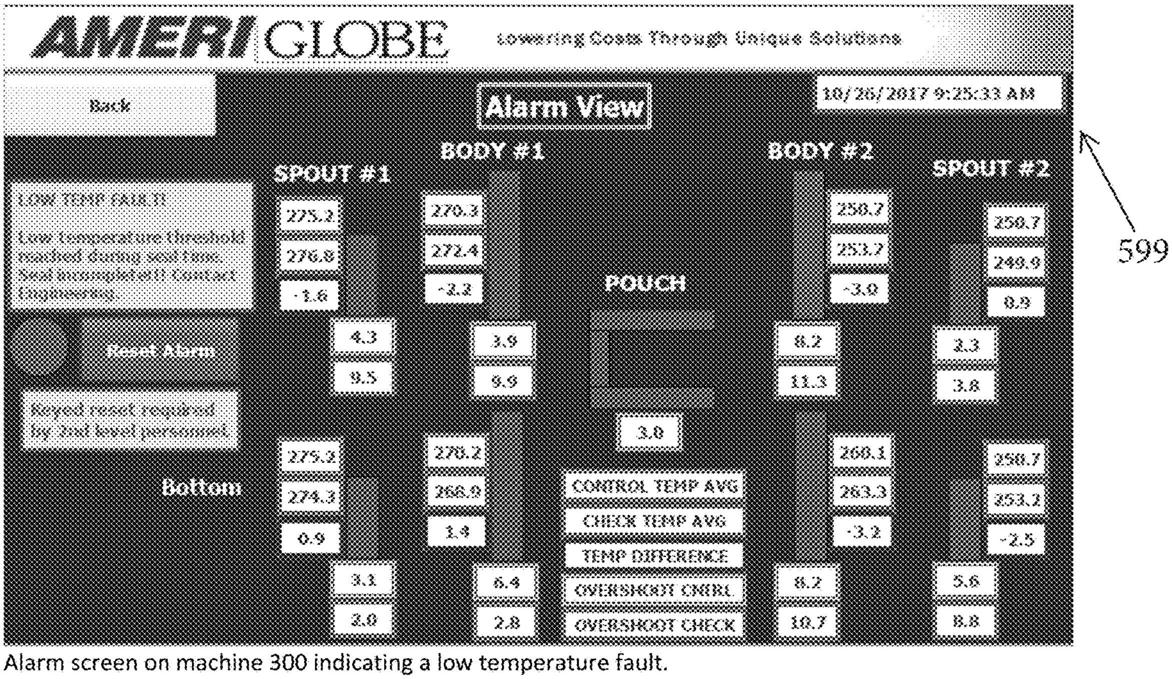
Alarm screen on machine 300 indicating a low temperature fault.
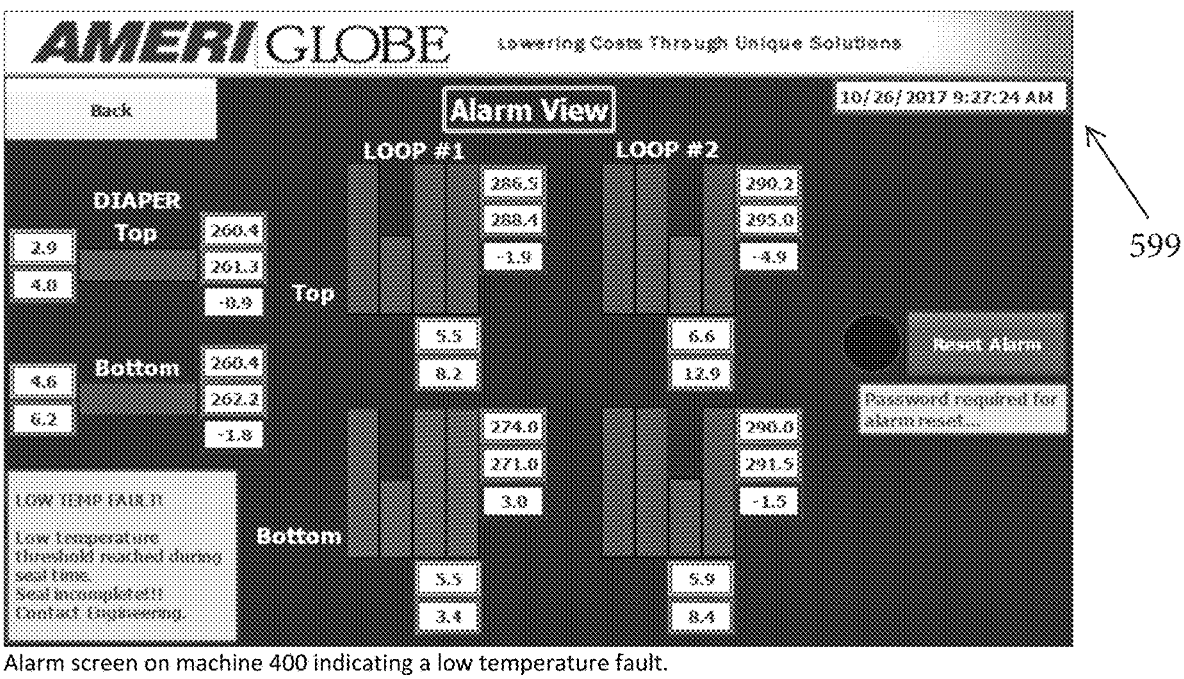
Alarm screen on machine 400 indicating a low temperature fault.
FIG. 174

FIG. 175
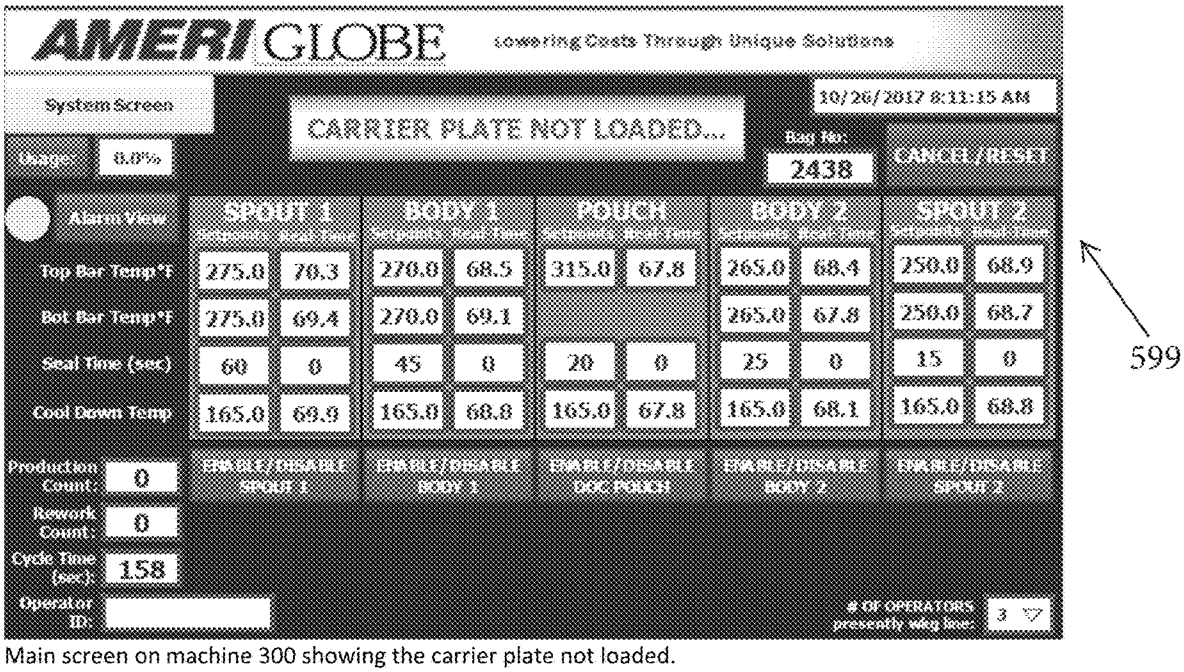
Main screen on machine 300 showing the carrier plate not loaded.
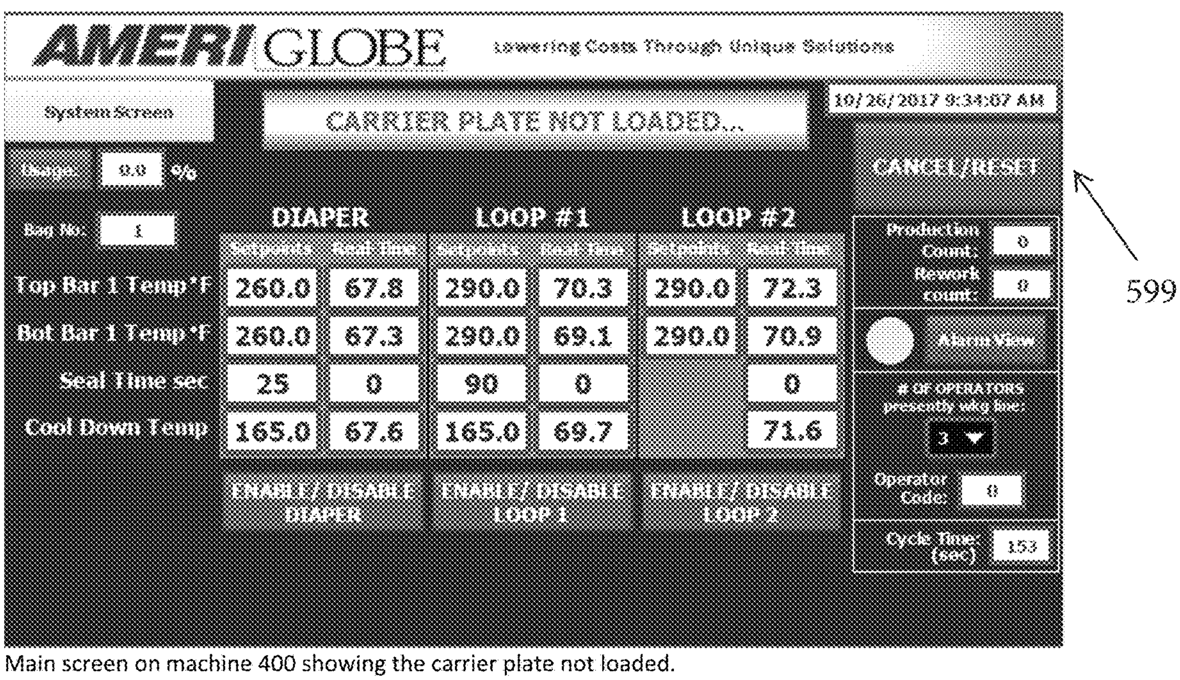
Main screen on machine 400 showing the carrier plate not loaded.
FIG. 176

Main SCADA screen showing general production data and alarms for multiple machines.

SCADA screen for machine 300 showing real-time production info and data log for each machine cycle.

599

SCADA screen for machine 400 showing real-time production info and data log for each machine cycle.

CARRIER PLATE FOR USE IN MANUFACTURING STITCHLESS BULK BAGS WITH HEAT FUSED SEAMS

CROSS-REFERENCE TO RELATED APPLICATIONS

This application claims the benefit of and/or priority to U.S. Provisional Patent Application Ser. No. 62/492,900, filed on 1 May 2017 and U.S. Provisional Patent Application Ser. No. 62/419,317, filed on 8 Nov. 2016, each of which are hereby incorporated herein by reference thereto.

This application is related to U.S. patent application Ser. No. 14/297,331, filed on 5 Jun. 2014 (published as no. US2014-0360669A1 on 11 Dec. 2014), and U.S. patent application Ser. No. 14/297,441, filed on 5 Jun. 2014 (published as no. US 2014-0363106A1 on 11 Dec. 2014), each of which claims the benefit to/of and priority to/of U.S. Provisional Patent Application Ser. No. 61/831,476, filed on 5 Jun. 2013; U.S. Provisional Patent Application Ser. No. 61/890,664, filed on 14 Oct. 2013; U.S. Provisional Patent Application Ser. No. 61/909,737, filed on 27 Nov. 2013; U.S. Provisional Patent Application No. 61/994,642, filed 16 May 2014, each of which is hereby incorporated herein by reference.

International Application Serial No. PCT/US14/41154, filed on 5 Jun. 2014 (published as no. WO2014/197727 on 11 Dec. 2014), and International Application Serial No. PCT/US14/41155, filed on 5 Jun. 2014 (published as no. WO2014/197728 on 11 Dec. 2014), are each hereby incorporated herein by reference.

This application is additionally related to U.S. Provisional Patent Application Ser. No. 62/252,270, filed on 6 Nov. 2015 and U.S. Provisional Patent Application Ser. No. 62/269,087, filed on 17 Dec. 2015, U.S. patent application Ser. No. 15/345,452, filed on 7 Nov. 2016, and U.S. patent application Ser. No. 15/383,841, filed 19 Dec. 2016, each of which is hereby incorporated herein by reference.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to the bulk bag industry and the art for production of bulk bags without use of sewing machines and stitched seams. The invention further relates to flexible fabric packaging, bags or containers, and the production of flexible fabric packaging, bags or containers without thread contamination and with minimal, or no, human contact with the interior of the packaging, fabric or container to help eliminate concerns regarding bacterial contamination. The invention further relates to production of air tight, or at least nearly air tight flexible fabric packaging, bags or containers that do not contain stitching or sewing holes.

2. General Background of the Invention

Woven polypropylene fabrics have been the fabric of choice in certain industries, including the bulk bag industry, given the strength, cost and flexibility of the fabrics. In the industry, around 200,000,000 bulk bags are sold each year, but the process of bag construction has remained basically unchanged for about 40 years or more. Although woven polypropylene fabrics and some similar fabrics are very strong, they are also very chemically inert. The polypropylene fabrics are highly oriented through a heating and stretching process to achieve maximum strength while maintaining the needed flexibility of fabrics to fit the needs of the marketplace. Due to these properties, it is very difficult to find a method of connecting two polypropylene fabrics without damaging the fabric itself, thereby reducing notably the strength and usefulness of the fabrics.

The bulk bag industry is now over 40 years old. The very first bulk bags were constructed by combining various configurations of woven fabrics and woven webbing by sewing them together to get the needed strength.

Today, sewing remains nearly the exclusive method for connecting the materials of construction when making bulk bags. The determination of which fabrics to use and which sewing patterns and which threads to use to combine these parts to create the most economical bulk bag container are well known and have been studied in great detail.

However, the basic methods cannot produce the most economical container as the act of sewing reduces the fabric strength through the needle punctures. The average sewn seam in these high strength woven polypropylene fabrics creates seams that are generally about 63% of the strength of the unsewn fabrics.

Therefore, in order for the seams to be strong enough, the fabrics themselves must be constructed thicker and stronger to make up for the loss of strength in the seam. Many efforts have been made to find an acceptable alternative to sewing polypropylene fabrics for several reasons.

1. The act of sewing creates thread ends that must be cut from the end of each sew line. These ends often get loose and can become unwanted contamination within the bags.

2. Because of the high heat generated by the needles passing through this tough polypropylene fabric, threads are often breaking. This causes production to momentarily stop while the machine is re-threaded.

3. Sewing machines can run at speeds of several thousand stitches per minute. At this high speed with many mechanical parts, there is a high incidence of parts breakage and needle breakage which stops production of that machine while it is repaired.

4. Because of points 2 & 3, the production of bulk bags, for example, requires a high amount of labor to operate these machines and deal with these issues. Global bulk bag production has largely taken place outside the United States, to be produced in countries with abundant sources of low wage labor.

Furthermore, even sewing seams reduce the strength of the polypropylene or other similar fabrics as the needle punctures break the fibers in the area and reduce the fabric total strength. The number of stitches in each inch or centimeter of the seam, the needle size and the thickness of the thread used to make the stitch, all play a part in the overall strength of the resulting seam. Often these seams produce a joint that is about 63 to 70% of the strength of the unstitched fabric. Due to the weakening of the fabrics, fabrics that are 30% stronger than would be theoretically needed to carry the very heavy weights that bulk bags are designed to carry may be used. For all of these reasons, an alternative to sewing has been desired and sought after within the industry for many years.

Thus, for many years, this industry has searched for an alternative to sewing as a method of bulk bag construction. Such diverse methods as chemical bonds, adhesives, solvent glues, laser light sealing, and other forms of known heat sealing have been tried and were unsuccessful.

Various glues and various welding methods have been tried. Generally, contact and solvent glues have been found unsuccessful due to poor peeling strengths, the lack of a permanent and temperature resistant bond, and with low shear strength retention.

For example, contact glues have been found unsuccessful due to:

1. poor peeling strengths,
2. the lack of a permanent bond, (contact glues stay active so they can be peeled and reattached over and over)
3. a bond that is easily affected by temperature changes (glue often melts at very low temperatures and becomes inactive in cooler temperatures),
4. shear strength that is only attained with very large area type coverage.

Solvent glues have also failed due to the following;

a. joints are brittle and inflexible,
b. often involve hazardous elements not allowable in food packaging, and
c. fabric strength is reduced by molecular reconfiguration.

Heat welding has been tried with polypropylene fabrics and largely rejected because to heat weld as seen in the prior art, one must reach the melting point of the polypropylene fabrics to bond them together. However, the polypropylene fabrics are highly oriented and bringing them up to this temperature level results in a fabric tensile strength loss of approximately 50%.

Laser welding has been tried and showed some marginal success but this method is not economically feasible due to low production rates and very high capital costs.

The basic issue has always been that bulk bags must safely carry tremendous weights, for example in some cases up to 3,300 (1,497 kilograms) or 4,400 pounds (1,996 kilograms) or 5,000 or more pounds (2,268 kilograms). Many prior efforts have shown that joints can be achieved but nothing in the prior art has shown itself to be able to carry the tremendous weights with the required 5 to 1 lifting safety in the resulting containers.

Therefore, after 40 years of production, sewing still remains the basic method of producing bulk bags. Bulk bags are still manufactured largely through the original methods of sewing woven polypropylene fabrics together to form the bag and its lifting components. As discussed above, polypropylene has been the primary fabric of choice due to its combination of strength, flexibility, and cost.

The art of heat sealing is well known in plastic fabric industries such as those industries using polyethylene or PVC fabrics, but as mentioned has largely been rejected with polypropylene fabric. The prior art method has been simple. The prior art process for heat sealing or welding polyethylene has been to heat the fabric up to something higher than the melting temperature of polyethylene then squeeze the fabrics parts together with enough force to squeeze any melting laminated coatings out from between the fabrics and allow the fabrics to join directly together. Heat sealing equipment is useful in that it is significantly more amenable to automation than sewing machines. It has far less moving parts and can be electronically supervised for dependable repeatability.

In the prior art, polyethylene fabrics are heated up past their melting point, then squeezed together with sufficient pressure (for example, 20 psi (137 kilopascal)) to be sure the fabrics meet and join for a pre-determined amount of time, and the joint is made. This joint is typically around 80 to 85% of the original strength of the materials. Since polyethylene materials are not so highly oriented, as compared to polypropylene, this high heat method results in an acceptable joint. In the prior art, pressure may generally be applied at approximately 20 psi (137 kilopascal) across the entire joint area to squeeze the laminations out. Heat is applied at temperatures significantly over the melting point of the polyethylene fabric so that the laminations would become liquefied and the surface of the woven portions would also become melted. The liquefied lamination was then squeezed out from between the fabrics and the melted surfaces of the fabrics themselves were used to make the joint. Example melting points of some polyethylene fabrics may be about 235 or 265 degrees Fahrenheit (112.8 or 129.4 degrees Celsius). High and low density polyethylene fabrics are made in the prior art, and different polyethylene fabrics may have different melting points, wherein low density polyethylene generally has a lower melting point than high density polyethylene. Temperatures, for example, of about 425 to 500 degrees Fahrenheit (218.3 to 260 degrees Celsius) are applied in the prior art to melt the laminated film and polyethylene fabric. Additionally, polyethylene has about 30% less tensile strength than similar sized polypropylene and a great deal greater amount of stretch. Therefore, polyethylene has not been a useful alternative fabric when making bags to carry the great weights of bulk bags (e.g., up to 4,400 pounds (1,996 kilograms), or more).

Polypropylene is so highly oriented that use of current or standard heat sealing procedures, which call for temperatures exceeding the melting point of the fabrics, results in the strength of the fabric itself being immensely deteriorated. Testing conducted with regard to developing the present invention has shown an average loss of tensile strength of approximately 50% when polypropylene fabric is joined through standard heat sealing methods as described above, wherein the fabric is heated to a temperature exceeding the melting point of the fabric. This then results in joint strengths that are significantly less than joint strengths currently available through sewing polypropylene fabrics. Thicker stronger fabrics may then be preferred to be used so that the final strength of a resulting product will safely lift the required weights necessary for the product. Further, such joints produced through heat sealing polypropylene fabric with standard heat sealing methods show a measure of crystallization in the joint area which also reduces the flexibility of the fabrics in the joint areas.

There is a need in the industry to produce products comprising polyethylene fabrics with stronger heat sealed seams or joints than what is achieved by prior art methods of heat sealing polyethylene fabrics.

There is a need in the industry to produce products comprising polypropylene fabrics, including fabric bulk bags, by sealing, instead of stitching the parts or fabric pieces together, given that needles break frequently and sewing requires an operator to replace the needle and repair the stitches that were not properly applied.

There is also a need in the industry to produce products comprising polypropylene or polyethylene fabrics, including fabric bulk bags, by sealing, instead of stitching the parts together. Use of sewing machines for bulk bag production, for example, involves high amounts of labor, thread contamination will always be a possibility and powders sifting through the sewn seams will always be a concern.

While sewing machines might be able to be automated, they have not been able to run in an automated manner.

Threads break as heat builds up, and an operator is needed to re-string the machine with new thread. These machines operate at high speeds and often skip stitches. This requires an operator to see this quality issue and repair it right away.

The following prior art references are incorporated herein by reference.

| Patent/Publication No. | Title | Issue Date |
|---|---|---|
| 6,374,579 | Liner Bag for Flexible Bulk Container | Apr. 23, 2002 |
| 6,935,782 | Bulk Bag with Seamless Bottom | Aug. 30, 2005 |
| 8,297,840 | Heat Activated Adhesives for Bag Closures | Oct. 30, 2012 |
| 2008/0115458 | Pillow Packaging Bag, Pillow Type Packaging Body, Heat Seal Bar for Pillow Packaging Machine, and Pillow Packaging Machine | May 22, 2008 |
| 2010/0209025 | Flexible Package Bag Provided with One-Way Functioning Nozzle and Packaging Structure for Liquid Material | Aug. 19, 2010 |
| 2011/0085749 | Open Mesh Material and Bags Made Therefrom | Apr. 14, 2011 |
| 2011/0206300 | Side-Gusset Bag | Aug. 25, 2011 |
| 2012/0227363 | Method and Apparatus for Top Sealing Woven Bags | Sep. 13, 2012 |
| 2012/03149t | Bag and Method of Manufacturing a Bag | Dec. 13, 2012 |
| 2013/0202231 | Composite Film Bag for Packaging Bulk Products | Aug. 8, 2013 |
| 2013/0209002 | Easy Open Plastic Bags | Aug. 15, 2013 |

BRIEF SUMMARY OF THE INVENTION

As discussed above, bulk bags, a commonly used name for Flexible Intermediate Bulk Containers (FIBCs), have been in use since sometime in the 1970's. They are well known as large bags made of woven polypropylene designed to lift and carry loads from about 500 to 5,000 pounds (226.8 to 2,268 kilograms).

For their entire known history, such bags generally have been fabricated by cutting woven polypropylene fabrics to needed sizes and then sewing the pieces together in a fashion that will give them adequate size and strength to carry the heavy loads discussed above. Woven polypropylene, e.g., highly oriented woven polypropylene, has been the material of choice due to its strength, low cost and its inertness to almost every dry chemical that might be transported in it.

However, due to being so inert, the only prior art way for commercially constructing the bulk bag has been to physically connect the pieces by sewing them together with needle and threads.

For 40 years, other forms of construction have been tried and found unable to meet the shear strength needs of this package, used to carry about 500 to 5000 pounds (226.8 to 2,268 kilograms) of bulk material, in a commercially viable manner. Therefore, all bulk bags being made to this day have stitching holes on every seam with threads passed through these stitching holes.

These stitch holes are points of entry and exit by the hundreds in every bulk bag. If the product within the bag is made of fine powders, these powders often leak through the stitch holes causing local contamination and the need for cleanup. If the product is also hazardous, this can cause great expense and concern for those who have to handle and clean up the leaking powders.

Another concern with stitched polypropylene fabric bags and bulk bags is their ability to control moisture. Each stitching hole in the fabric is a break in the barrier to moisture entering or leaving the bag and the product within. Increases in moisture often can devalue the product within. Therefore many bags need an extra moisture barrier such as a polyethylene film liner to be added within the bag. This adds cost and complexity to each such bag.

The present invention solves these problems created by stitch holes in a very direct way by eliminating any stitching holes in the product containment area of the bulk bag. Embodiments of the present invention provide an entirely stitchless bulk bag, e.g., for carrying bulk product weighing about 500 to 5000 lbs (226.8 to 2,268 kilograms).

Other embodiments of the present invention provide an entirely stitchless bulk bag at least in a containment area of the bulk bag, e.g., in areas that can come into contact with bulk material to be held or contained in the bulk bag.

Further, when sewing these bulk bags together, as done in the prior art, there are many stop and starting points to the sewing process. At each of these points, threads are cut so the sewing machine can be re-positioned. These cut threads leave long tails of threads attached to the bags. These long threads are often considered as sources of contamination or as aesthetically displeasing. They are then cut off and often become a true source of contamination as a loose thread within the bag. One or more embodiments of the present invention solve this contamination problem by eliminating all sewing in the product containment area, and providing a bulk bag without any stitches in the containment area.

Another advantage to the present invention is the reduction of fabric weight needed in the seam areas. In the prior art, each needle puncture of the fabric causes a weakening of the fabric. The yarns making up the fabric are punctured (damaged) making the sewn fabric weaker than the unsewn fabric. Because of this, the unsewn fabrics must start out heavier so that the sewn fabric will have enough strength left to carry the weight and needed safety levels, e.g., the current 5 to 1 lifting standard in the bulk bag industry. Various embodiments of the present invention solves this problem in a very direct manner by eliminating any puncturing or weakening of the fabric in any seams involving the product containment area, which enables production of bulk bags, e.g., for carrying about 500 to 5000 lbs (226.8 to 2,268 kilograms) of bulk material, with lighter fabric than what is used in the prior art.

Another advantage of the present invention is its ability to be automated, i.e., automating the production of bulk bags. The average sewn bulk bag requires about 600 inches (1,524 centimeters) of sewing. During this time, the bag must be manually moved through a series of directions and steps to put the stitches in the most useful position. Further, when moving at a high speed to construct the bulk bag, the friction between the polypropylene fabric and the needle often reaches a temperature high enough to either melt or weaken the thread to the point of breaking. This causes the operation to stop and the need to manually rethread the needle of the sewing machine. Due to all the changes in direction and the customizing of every bag, no one has ever successfully automated the sewing of the bulk bag. The present invention solves this issue by working with the bulk bag fabrics in a simple 2-dimensional condition and using a specially designed set of heating elements to bond the coatings of the fabrics together. This bonding action is accomplished using simple equipment in simple up and down motions on the 2-dimensional form of the bulk bag being manufactured.

In various embodiments of the present invention the bonds generally have at least about a 90% bonding efficiency which allows for lighter fabrics to be used. The bag design allows the bonds to be made in minimal numbers of straight line seams that can be made in minimal steps. This allows automation to be applied in various embodiments of the method of the present invention to the manufacture of the stitchless bulk bag of the present invention.

Another gain in the present invention is the ability to monitor the creation of each bond of the bulk bag through computer analysis. This provides greater repeatability and therefore a higher level of safety to the end user than can be presently created with individually hand sewn bulk bags. In the prior art of sewing, the damage occurring to the threads during the sewing process is not measured, nor is the tension of each stitch measured. Both of these conditions are important to the overall safety of each bulk bag during the lifting process. Since they are not measured, the manufacturer must increase the amount of thread being used to overcome these unknowns. In one or more preferred embodiments, this problem in the prior art is being overcome in the present invention by utilizing at least double monitoring of the critical controls needed to be assured that each and every seal is being properly controlled by the computers. In other embodiments additional critical controls may also be used, e.g., triple monitoring controls.

Another part of the present invention in various embodiments is the elimination of the need to reinforce the part of the bag to which the lifting loops are sewn. In the prior art, the attachment of the lift loops involves a lot of stitching in select areas of the fabrics. This amount of stitching to allow the bag to be safely picked up has the effect of weakening this critical part of the fabric. Therefore, the prior art is prone to increasing the number of yarns in the loop attachment area either by process in the weaving or by folding the fabric over at this lift loop attachment point to place more fabric under the stitches to create safe lifting capacity. One or more embodiments of the present invention eliminate this need by eliminating the stitching of the loops to the bag body, by stitching the loop to another panel of woven fabric with a coating that can then be heat sealed to the bag which can provide about 90% or more of the original fabric strength in the bonded condition.

Another advantage provided by the present invention is the additional safety given to the product in the event mishandling of the bulk bag occurs. In the prior art, if a bag was improperly handled by less than all four lift loops, the lift loops often tear away from the bag by pulling and breaking portions of the side wall from the bag. This causes large holes in the bulk bag product containment area allowing the product to spill out of the bag and/or contamination to enter the bag. This often causes the loss of the product that was being transported in the bulk bag. If the product was considered to be hazardous, then a spill containment action would be needed. In one or more preferred embodiments of the present invention, this problem is solved by adding the lift loops to the bulk bag on a separate piece of fabric that can tear away from the bag, e.g., given any improper handling of the bag, without damaging the sidewalls of the bulk bag, allowing the product to remain safely contained within the bag with no leakage.

Another novel feature of the present invention is the ability to utilize seamless and stitchless tubing for fill and discharge spouts without changing the critical diameter of the spout during the attachment of the tie cord. In the prior art, tie cords are attached by pinching an edge of the tube and sewing the tie cord to it. This pinching and sewing causes the original diameter of the tube to be reduced in that sewn area. This pinched area then causes difficulties in placing the pinched tube onto the filling machines that are designed for the diameter of the original fabric spout.

A second way the prior art attaches a tie cord is to slide an open end of the tube onto the throat of the sewing machine and apply a small stitching pattern to attach the loop. This leads to potential contamination from oil or threads because of the machine entering this part of the bag.

Both of these method problems experienced in the prior art are eliminated in a straight forward and simple manner in the present invention. By recognizing that there is little need for strength in the anchoring of this tie cord, in one or more preferred embodiments of the present invention, the sewing is replaced with a simple longitudinal or vertical piece of tape placed over the tie cord which is preferably attached in a lateral or horizontal position. During the tie off procedures, the longitudinal or vertical tape is not challenged during the lateral or horizontal tying of the cord to restrict the tube from product flow.

Another problem experienced in the prior art is the positioning and securing of a clear document pouch on the bulk bag. The bulk bags often need to be accompanied by product information such as manufacturing date, product name, lot number, etc. So a document pouch is typically provided to contain, carry and present this information to the receiver of the filled bulk bag.

Again, due to the inertness of the polypropylene fabric, the manner of attachment of a document pouch has been to sew an edge of the document pouch in one of the seams of the sewn bulk bag. The most commonly used seam was a seam that attached the top of the bag to the side of the bulk bag. This then allowed the pouch to be 'buried' between the top of the bag it is sewn to and the bottom of the bag that is stacked upon it.

Since many FIBCs are not filled to the top, the document pouch often ends up laying in a horizontal position on top of the product and is unreadable by the forklift driver while in his seat. This then causes the driver to leave his machine to read the documents.

In one or more preferred embodiments of the present invention, this problem encountered with document pouches is solved by attaching the label through heat welding or sealing or fusion. When attached with heat, it can be placed nearly anywhere on the vertical side of a bag without needing a relationship to a sewn seam or bag edge. By design, this pouch can now be positioned low enough on a side wall to always be readable by the forklift driver without him having to leave his seat on the forklift.

Another novel feature of one or more embodiments of the present invention is that thick lifting loops that have to be attached through sewing in the prior art, are replaced, using bag fabric to replace the loops. By eliminating the sewing, the bag becomes more amenable to recycling because the lift loops are often sewn in the prior art bags and contain polyester threads which are considered to be a form of contamination in the recycling effort for FIBCs.

Another issue solved by the stitchless designed bulk bag in various embodiments of the present invention is the strengthening of the failure point experienced in one and two loop design bags. These designs are well known in the art and have been considered the most efficient bag design in the market. Since it uses all the vertical fibers in the bag body to securely lift the weight, this design often uses a lighter weight of fabric than traditional four loop bags. However, even this efficient design is hampered by the loss of strength in the sewn seam in the prior art. The present invention, by strengthening the seam strength, e.g., with heat fused or welded or sealed joints instead of stitched seams, is able to lower the overall fabric strength even more and achieve similar lifting safety.

Another issue resolved by the stitchless bulk bag of present invention is the ability to eliminate the liner needed to secure the product in one and two lift loop bags. Due to the highly efficient bonding strength of the stitchless bag invention, the liner can be replaced with a spouted top. This is desirable as the liner often poses problems during product discharge in the prior art. Since the liner is used for product protection from water, only the stitchless design with a fully enclosed top spout can adequately protect the product without a liner. Prior art sewn bags continually puncture the fabric and the moisture barrier and further, as stated above, weaken the fabric as well.

Another important problem experienced in the FIBC industry that the stitchless bag solves is the contamination and leakage issue that baffled bulk bags have. Baffled bulk bags have a fabric structure sewn across the corners on the inside of the bulk bag. These corners restrict the sides of the prior art baffled FIBC from rounding out to their full diameter thus giving this design a much squarer looking shape. These bags are well known in the prior art. But, in the prior art process of sewing these cross corner panels inside the bag, the sewing machines are working inside the bag. This increases the potential of threads being left inside the bag as well as oil residue being atomized and clinging to the interior surface of the bulk bag in the product containment area of the bag.

Also, every stitch hole is an additional opportunity for leakage of the product over and above those opportunities created in the making of a standard bulk bag. The baffle bag has 8 additional vertical stitch lines that are created to attach the four corner panels. In a common size, such as about a 50 inch (127 centimeter) tall bag, this would equal about 8×50 or 400 additional stitching inches. The average stitching pattern is about 3 stitches per inch (7.62 centimeters) or about an additional 1200 stitching holes in every baffled bag. This is 1200 additional chances for product leakage or moisture contamination.

The stitchless bag of the present invention solves these problems in a straightforward way. In preferred embodiments, all interior panels are sealed from the outside. By sealing the interior panels from the outside, all of the stitching holes are eliminated and all contamination by thread or by machine oil is eliminated.

As discussed, the apparatus, system and method of the present invention solves the problems confronted in the art in a simple and straightforward manner. What is provided is one or more alternative methods of connecting woven polypropylene fabrics, or similar fabrics, without the use of sewing machines and sewing threads. Also provided are one or more methods for connecting polyethylene fabrics without use of sewing machines and sewing threads. Various embodiments of the present invention are useful in the production of bulk bags, e.g., bags that can carry about 500 to 5000 lbs (226.8 to 2,268 kilograms) of bulk material, and also will apply to any product for which one wishes to connect polypropylene fabrics, polyethylene fabrics, or similar fabrics without the use of sewing machines. This invention also relates to the ability to produce products involving connecting polypropylene fabrics or similar fabrics, including bulk bags, with minimal labor, thereby allowing such products to be made in all areas of the world where the products are needed, versus only being produced in volume in those areas of the world with large amounts of low wage labor.

An object of the present invention is thus to provide an alternative to sewing polypropylene or other similar fabrics in producing bulk bags and other flexible fabric products or containers. The present invention seeks to provide an alternative method of connecting woven polypropylene fabrics or similar fabrics without the use of sewing machines and sewing threads. While this invention is useful in the production of bulk bags, it also can apply to any product that wishes to connect polypropylene fabrics or similar fabrics without the use of sewing machines. For example, the present invention can also be useful with smaller bags (e.g., for holding about 25 to 100 pounds (11 to 45 kilograms)).

Another object of the present invention is to design a sealing system that can utilize simple robots for automation in the construction of flexible fabric containers.

It is a further object of the present invention that a flexible fabric bag or product made by heat sealing versus sewing will have many advantages as follows: lower wage content, reduced or eliminated sewing thread contamination, no needle holes to allow sifting of product out or moisture and contamination in, a more consistent quality control, controlled by computerized production rather than being hand made with all the attendant consistency issues such a handmade method creates.

It is a further object of the present invention that the flexible fabric products made by heat sealing will have great marketplace appeal for those companies for whom any thread contamination would jeopardize the quality of their product. Such companies include in the food, electronics, medical, or pharmaceutical industries. These bags would have no threads or sift holes to endanger things, such as the product or the workers as there would be no sewing.

It is a further object of the present invention to provide a flexible fabric product has great appeal to those companies who are concerned about sifting of their product through the needle holes left by the sewing process. Such companies may include the carbon black companies, where very tiny amounts of their product can make very large messes. Other companies may include companies whose products are going into sensitive end user environments where small amounts of their products would contaminate the area.

It is a further object of the present invention to provide a flexible fabric product that would not require a liner, e.g., a polyethylene liner. This would be useful for companies who are using polyethylene liners to prevent sifting and contamination. Liners make bulk bags, for example, more difficult to work with and add a notable amount of cost to the overall product.

It is a further object of the present invention to provide a method that allows companies to pursue full automation for woven fabric product or bag production.

It is a further object of the present invention to provide a method that allows companies to pursue at least partial automation for woven fabric product or bag production.

It is a further object of the present invention to provide a method that allows companies to pursue automation for woven fabric product or bag production with regard to at least a majority of the bag production process.

It is a further object of the present invention to provide heat sealed joints with minimal damage of the original fabric for allowing lower costs through facilitating automated production to reduce labor costs, and also facilitating reduction of fabric weights and thicknesses while providing similar overall strengths through higher seam efficiencies.

It is a further objective of the present invention to use heat sealing equipment, which can be automated, to produce polypropylene products without requiring stitched seams or sewing machines. It is also an objective of the present invention to use heat sealing methods to produce products comprising fabrics similar to polypropylene, without requiring stitched seams or sewing machines.

Another objective of the present invention is to facilitate a robotic or automated system for production of large fabric bags, for example polypropylene bulk bags or barrier cells, for forming a flood barrier, for example, when filled with sand or the like, using robots or other automated system.

A further objective of the present invention is to provide a heat sealed polypropylene product that may be manufactured without human touch on the inside of the product, so as to maintain a sterile product and help eliminate concerns regarding bacterial contamination of polypropylene storage products, as well as to eliminate the possibility of leakage through sewing holes, so that the product may be used in medical applications, for example, in the pharmaceutical industry.

Another object of the present invention is to include different seam configurations that would always have shear strength working for the seam. An object of the present invention is also to include a seam that will work in both directions.

In developing the present invention, testing and experimentation was conducted. For example, testing and experimentation with heat sealing polypropylene fabric was conducted. Test results showed that these fabrics are highly oriented for strength. This high orientation and the molecular structure of polypropylene made efforts to connect two pieces of this material difficult. To join polypropylene pieces of fabric required such a level of heat that the polypropylene fabric simply crystallized making it brittle and not helpful for the purpose of lifting great weights, a purpose for which bulk bags, for example are routinely used.

Besides crystallizing the fabric, heat sealing polypropylene fabric using standard procedures known in the art resulted in seams with two distinctly different strengths. In seaming operations, including when sewing, there exists a "shear strength" and a "peel strength". For example, the lift loops sewn to the side walls of a bulk bag have amazing strength when pulled straight up as this motion utilizes the shear strength of this joint, where the entire joint is sharing the load at all times. But if the bag is lying on its side and it is picked up by one loop, the joint is temporarily put into a position where the peel strength becomes critical, where one edge of the joint is attacked. Thus in shear strength position, the entire joint is sharing the load at all times. In the peel strength position, only one edge of the joint is attacked or bearing the load. As that edge fails, the next edge and then the next edge fail in sequence.

This peel versus shear strength issue was considered when experimenting with heat sealing polypropylene fabric, for constructing bulk bags for example, because any interior panel that may be installed via heat seal in a bulk bag may be attacked by fill material weight from either side. It is also difficult to control all filling situations in the field.

When testing panels for inside a fabric container, for flood wall use for example, an upside down "T" shape seam construction was developed and used. Testing revealed that if the force came from the right side of the 'T', the right side of the seal or joint would be in shear and the left side would be in peel. But the right side would protect the left side with all of its shear strength. If the load or force came from the left side, the seam would work in reverse with the shear strength on the left protecting the peel on the right.

Another object of the present invention is to provide a heat sealed bulk bag without damaging the bag fabric or weakening the bag fabric.

In further testing conducted with polypropylene fabrics, different glues were tested for making usable joints with polypropylene fabric. Test results using Super Glue showed that Super Glue did not achieve about a 20 pound (9 kilogram) shear strength.

Testing was also conducted using different types of fabric. Polyethylene fabric is similar to polypropylene but is not as highly oriented and many products comprising polyethylene have been made using standard heat sealing methods.

Testing and experimentation with polyethylene fabric showed that polyethylene fabrics were generally about 30% weaker than polypropylene fabrics. Testing was performed with regard to heat sealing polyethylene fabric to produce a bulk bag. As previously discussed, polypropylene fabric has been preferred in the bulk bag industry given its higher strength.

As discussed, prior art methods of heat sealing generally involve high enough heat and high enough applied pressure to melt the basic fabrics and join them together. This method purposefully, melts any applied coating and squeezes it aside through the high pressure levels so that the base woven materials can be joined together. This method has been successful, with polyethylene fabrics and was necessary because the strength being relied upon came from the woven fabrics. The coatings were generally applied for the purpose of providing dust and/or moisture control. The technology at the time for applying the laminations did not provide dependably strong attachments of the coating to the fabric itself. Therefore, the art of joining the fabrics intentionally melted away the laminated materials by melting them and squeezing them out from between the fabrics.

In the prior art, the standard method discussed above has been applied to woven fabrics that have a thin layer of laminated film on at least one side, for example about a 1 or 2 mil (0.0254 or 0.0508 mm) layer. For polyethylene fabrics, standard laminated film or coating is often comprised of polyethylene, or a mixture of polyethylene and other additives. Standard prior art methods apply pressure to squeeze the laminated film or coating out from between the layers of polyethylene fabric, to allow the fabric pieces to melt and join together. Traditionally in the art, the laminated film or coating was not very securely attached to the woven fabrics. Therefore, if the joint included the laminated film itself, the lamination became the cause of the joint failure because of its weak attachment to the woven fabrics.

To determine a joint strength, laminated woven fabrics may be tensile tested before being joined to get a baseline strength of fabric. For example, a fabric may break at about 200 lbs per inch (3,572 kilograms per meter) in its raw state. Then two pieces of this fabric may be joined and then pulled to destruction again. A resulting strength, for example, of about 160 to 165 pounds per inch (2,857 to 2,946 kilograms/meter) would mean that a resulting joint would have lost about 17 to 20% of the total fabric strength as a result of being sealed together. While this joint strength may be sufficient based on current industry standards, it still represents a significant cost of inefficiency.

In an embodiment of the method of the present invention, the method provides a heat fused joint between pieces of polyethylene fabric by joining the laminations or coatings rather than by joining the fabrics. Current laminating methods now produce a cling or connection rate between the woven fabric and the lamination that is very strong and dependable. By leaving the lamination in place between the fabrics and not joining the fabric pieces, the improved sealing method of the present invention adds the strength of the lamination to the total strength of the joint. Additionally, since the method of the present invention does not damage the fabric by melting the woven portions, the sealed joint retains virtually all of the base woven fabrics strength. The small percentage of strength lost, for example two or three percent of strength that may be lost, is the result of minimal damage to the laminated film through melting and fusing that occurs in the present method.

In the prior art heat sealing or welding methods, pressure may generally be applied at approximately 20 psi (137 kilopascal) across the entire joint area to squeeze the laminations out. Heat is applied at temperatures significantly over the melting point of the polyethylene fabric so that the laminations would become liquefied and the surface of the woven portions would also become melted. The liquefied lamination was then squeezed out from between the fabrics and the melted surfaces of the fabrics themselves were used to make the joint. Example melting points of some polyethylene fabrics may be about 235 or 265 degrees Fahrenheit (112.8 or 129.4 degrees Celsius). High and low density polyethylene fabrics are made in the prior art, and different polyethylene fabrics may have different melting points, wherein low density polyethylene generally has a lower melting point than high density polyethylene. Temperatures, for example of about 425 to 500 degrees Fahrenheit (218.3 to 260 degrees Celsius) are applied in the prior art to melt the laminated film and polyethylene fabric.

An embodiment of the method of the present invention comprises joining polyethylene fabrics using controlled heat, time and pressure amounts that leave the base or woven materials unmelted and undamaged yet still melt the laminations or coatings. The pressure levels are preferably kept light enough to leave the lightly melted lamination in place rather than to purposefully squeeze it out from between the woven portions of the joint.

Another embodiment of the present invention comprises a method of heat sealing polyethylene fabric comprising joining polyethylene fabrics using controlled heat, time and pressure amounts that leave the base or woven materials unmelted and undamaged yet still melting the laminations.

In another embodiment of the method of heat sealing polyethylene fabric, the pressure levels are kept light enough to leave the lightly melted lamination in place rather than to purposefully squeeze it out from between the woven portions of the joint, e.g., pressure of 2 to 6 psi (13.8 to 41.4 kilopascal) can be utilized.

In another embodiment of the method of heat sealing polyethylene fabric, seals provide about 90% to 97% joint strengths in the shear direction.

In another embodiment of the method of heat sealing polyethylene fabric, the seal comprises a strength of about 92 to 95%.

In another embodiment of the method of heat sealing polyethylene fabric the seal comprises a strength of about 96 to 97%.

In another embodiment of the method of heat sealing polyethylene fabric, the method comprises heating a laminated film or coating on polyethylene fabric pieces right at or barely above the melting point of the polyethylene fabrics so that only the lamination is melted and liquefied. Then light pressures, for example about 5 to 6 psi (34 to 41 kilopascals), are used to join the laminations of the fabric pieces together, rather than to push them away and join the underlying fabrics. In another embodiment of the method of heat sealing polyethylene fabric, the method provides a heat fused polyethylene seal or joint with about 90 to 97% strength, as compared to the strength of the original fabric.

Another embodiment of the present invention comprises heat fusing polyethylene fabrics to produce a bulk bag. In an embodiment of the polyethylene bulk bag of the present invention, the bag would not include lift loops but would include fabric tunnels which would use the strength of the entire bag fabrics for lifting versus the lift loop bags that use only a small portion of the fabric for lifting. Testing results for an embodiment of the present invention, showed that a heat sealed bulk bag built out of polyethylene fabric held over 18,000 lbs (8,165 kilograms) of hydraulic pressure before failing. On a 5 to 1 safety ratio, this bag could be useful for applications that carry up to about 3600 lbs (1,633 kilograms). In this embodiment, the method used all of the fabric on two sides of the bag. Further, the fabric was doubled so the heat seal would be on the bottom of the bag and protected from any potential peeling forces. Although the heat fused polyethylene bag had nearly 50% more materials, this embodiment of the bag, still eliminated a lot of the labor associated with producing fabric bulk bags via sewing methods.

In another embodiment of the method of heat sealing polyethylene fabric, impulse heat sealing equipment is used to deliver controlled amounts of heat for controlled amounts of time to specified portions of the fabric which result in about a two inch (5.08 centimeter) wide seal. In another embodiment of the method of heat sealing polyethylene fabric, these seals provide about 90% to 97% joint strengths in the shear direction.

In another embodiment of the method of heat sealing polyethylene fabric, heat sealing equipment may be automated, and sensors can be attached to monitor time, heat, and pressure. These readings can transfer to a watch station in a control room. Robots can move the materials from work station to work station and fabric can be positioned and sealed robotically.

In another embodiment of the method of heat sealing polyethylene fabric, using relatively low heat and low pressure, only the coating itself is being joined. This leaves the fabric completely undamaged and unweakened. In fact, the strength of the coating now adds to the overall joint strength rather than being squeezed out in the current methods. With the resulting joint strengths, one is now able to lift greater weights with less material than can be done with the current, commonly used methods of sewing fabrics together.

When developing an embodiment of a heat sealed polyethylene bulk bag, the following factors were considered.

First, there are many changes in direction and different or special shapes for heat sealing equipment that may be needed for production of bulk bags. Second, safety levels for polyethylene bulk bags would preferably be similar to the safety levels of polypropylene fabric bulk bags, which are about 30% stronger.

When testing an embodiment of a heat sealed polyethylene bulk bag, the results showed about 93% joint efficiency.

In an embodiment of a polyethylene bulk bag of the present invention, the lift loops were eliminated and replaced with fabric tunnels which would use the strength of the entire bag fabrics for lifting versus the lift loop bags that use only a small portion of the fabric for lifting.

Experimental models were constructed to identify and evaluate any practical issues. In one embodiment, test results showed that a heat sealed bulk bag built out of polyethylene fabric held over 18,000 lbs (8,164 kilograms) of hydraulic pressure before failing. On a 5 to 1 safety ratio, this bag could have been sold for applications that carried up to about 3,600 lbs (1632 kilograms). In this embodiment, the method used all of the fabric on two sides of the bag. Further, the fabric was doubled so the heat seal would be on the bottom of the bag and protected from any potential peeling forces. This meant that the heat fused polyethylene bag had nearly about 50% more materials. This embodiment of the bag, however, still eliminated a lot of the labor associated with producing fabric bulk bags via sewing methods.

An embodiment of the method of the present invention is a method to produce bulk bags or any flexible fabric container comprising polypropylene fabrics in a manner that can result in joints that are heat sealed in such a manner that the natural stresses on each heat sealed joint will be applied to the joint or seam in the shear direction for the greatest strength.

One or more preferred embodiments of the method of producing polypropylene bulk bags, e.g., highly oriented polypropylene fabric bulk bags, would utilize a fusion or bonding or sealing coating on at least one surface of a fabric layer to be heat-fused to another fabric layer. As used herein, a fusion or bonding or sealing coating can mean a coating comprising propylene based elastomers or plastomers. In various embodiments, the fusion or bonding or sealing coating can comprise about 50% to 90% of propylene-based plastomers, propylene-based elastomers, or mixtures thereof and about 10% to 50% polyethylene resins and additives, having a melting point that is preferably at least about 5 degrees lower than the melting point of the polypropylene fabrics to be joined together. In other embodiments, the fusion or bonding or sealing coating can comprise about 50% to 90% of VERSIFY™ 3000 (Trademark of The Dow Chemical Company) and about 10% to 50% polyethylene resins, having a melting point that is preferably at least about 5 degrees lower than the melting point of the polypropylene fabrics to be joined together. Suitable propylene based elastomers or plastomers can be purchased for example under the trademark VERSIFY™ 3000, and EXXON™.

In various embodiments a mixture of a minimum of about 70% pure VERSIFY™ 3000 and about 25% polyethylene, and about 5% other additives such as pigments or Ultra Violet (UV) inhibitors, can be used for a bonding or sealing or fusion coating. Other potential additives may include anti-static protection. Properly sealed, this system will produce heat sealed joints resulting in an average joint strength of about 92% of the strength of standard 5 ounces per square yard (169.53 grams per square meter) woven polypropylene.

Another embodiment of the present invention comprises a method of joining highly oriented polypropylene woven fabrics by the following steps: coating the fabrics with materials, wherein one piece of fabric to be joined is coated with materials comprising VERSIFY™ 3000, which has a melting point lower than the polypropylene fabric, and wherein the other piece of fabric to be joined is coated with a standard industry coating; heating the coating comprising VERSIFY™ 3000 to its lower melting point; and joining the coatings with pressure light enough to allow the coating to stay in place and generally keep the woven fabrics from touching.

Another embodiment of the present invention comprises a method of joining highly oriented polypropylene woven fabrics by the following steps: coating the fabrics with materials, wherein one piece of fabric to be joined is coated with a propylene based elastomers or plastomers coating, e.g., a coating having about 50% to 90% of propylene-based plastomers, propylene-based elastomers, or mixtures thereof and about 10% to 50% polyethylene resins and additives, and having a melting point that is preferably at least about 5 degrees lower than the melting point of the polypropylene fabrics to be joined together, and wherein the other piece of fabric to be joined is coated with a standard industry laminate coating; heating the coating comprising propylene based elastomers or plastomers to its lower melting point; and joining the propylene based elastomer or plastomer coating and standard industry coating with pressure light enough to allow the coatings to stay in place and generally keep the woven fabrics from touching.

In an embodiment of the present invention, the strength of the coating adds to the overall joint strength, and resulting joint strengths, allows one to lift greater weights with less material than can be done with the current, commonly used methods of sewing fabrics together.

In another embodiment of the present invention, a coating comprising a suitable percentage of VERSIFY™ 3000, or other suitable propylene elastomer or plastomer coating with a melting point lower than the melting point of the polypropylene fabrics, will be applied on at least one side of one piece of polypropylene fabric and a standard industry coating will be applied to at least one side of another piece of polypropylene fabric. Standard industry coatings for polypropylene fabric generally comprise a majority percentage of polypropylene and a small percentage of polyethylene, e.g., 15 to 30 percent. The piece of fabric comprising the VERSIFY™ 3000 coating, or other suitable propylene elastomer or plastomer with a melting point below the melting point of the polypropylene fabric, will be positioned to overlap the piece of fabric comprising the standard coating, and positioned so that the coating layers are in contact. Low heat and low pressure, e.g., about 221 to 290 degrees Fahrenheit (105 to 143 degrees Celsius) and 2 to 6 psi (13.8 to 41.4 kilopascal), will be applied to melt the coating and form a joint between the coatings of the polypropylene fabric. This embodiment of the present invention is cost effective because standard coatings cost less than coating comprising VERSIFY™ 3000, for example.

Testing results have shown similar seam strengths when joining one fabric comprising a VERSIFY™ 3000 coating and joining another fabric comprising a standard coating. A notable amount of money may be saved as the standard coating is far less expensive. In a preferred embodiment, both the VERSIFY™ coating, or other suitable propylene elastomer or plastomer coating with a melting point below the melting point of the polypropylene fabrics, and the standard coating will be applied to about a 2.5 mil (0.0635 mm) thickness. In a preferred embodiment of the present invention, the coating is applied at about a 2.5 mil (0.0635 mm) thickness. Generally in the prior art, standard industry coatings are applied at about 1 mil (0.0254 mm) thickness.

In another embodiment of the present invention coatings will be applied to the fabrics at a thickness of about 1 mil to 2.5 mil (0.0254 to 0.0653 mm).

In one or more embodiments of the present invention coatings can be applied at over 2.5 mil (0.0635 mm) thickness.

In one or more embodiments of the present invention coatings can be applied at less than 2.5 mil (0.0635 mm) thickness.

In one or more preferred embodiments, a coating on one fabric portion, e.g., a body fabric portion, can be applied at one thickness, while the coating on a different fabric portion, e.g., the bottom, can be applied at a different thickness.

In various embodiments it can be desirable to apply a thicker coating on fabric portions that will form a bond that will need to withstand a greater load of weight or pressure, e.g., a bottom portion can have a thicker coating than a top portion.

In various embodiments a coating, e.g., a bonding or a standard coating can be applied at 2 to 5 mil thickness (0.05 to 0.13 millimeters).

In an embodiment of the method of the present invention, the method is for creating a new form of heat welding seam for polypropylene fabrics that provides as high as about 95% seam strength in the shear position. An objective of the present invention is to use that seaming method to create a safely improved bulk bag that is competitive in the marketplace.

Another embodiment of the method of producing flexible fabric bags, comprising the steps of coating a polypropylene fabric with 100% VERSIFY™ 3000 or a combination VERSIFY™ 3000 and polyethylene, and joining the fabrics (not specifically just edges) using a combination of heat and minimal pressure in such a manner that only the coatings are welded together and not the fabrics. Thus producing a joint that will have a strength greater than the original uncoated fabric.

An embodiment of the method of the present invention comprises using heat to combine the laminated coatings of the fabrics versus trying to combine the fabrics themselves. Since the coatings have a marginally lower melting point then the fabric itself, this invention joins polypropylene fabrics without damaging the tensile strength of the original fabrics.

In one or more embodiments of the present invention, impulse heat sealing equipment is used to deliver controlled amounts of heat for controlled amounts of time to specified portions of the fabric which result in about a 2 inch (5.08 cm) wide seal. In an embodiment of the present invention, these seals provide about 85% to 96% joint strengths in the shear direction.

In various embodiments, the amount of heat and pressure applied to form one bag joint can be different from the amount of heat and pressure applied to form another bag joint.

In an embodiment of the present invention, heat sealing equipment may be automated, and sensors can be attached to monitor time, heat, and pressure. These readings can transfer to a watch station in a control room. Robots can move the materials from work station to work station and fabric can be positioned and sealed robotically. In other embodiments, materials can be moved from work station to work station manually or by hand, or with a combination of automation and manual movement.

An embodiment of the method of the present invention enables production of a robotically manufactured bulk bag that has very little labor, wherein the bulk bags will not have human touch on the inside of the bag so as to prevent human bacteria contaminations.

An embodiment of the present invention comprises a robotic or automated system for production of large fabric bags, for example polypropylene bulk bags or barrier cells, for forming a flood barrier, for example, when filled with sand or the like using robots or other automated system.

Another embodiment of the present invention comprises a simple robotic or automated system that may fit into about a 40 foot (12.2 meters) export container, or other suitable transportation means, that one could then take to any potential flood site or project site and start producing about 500 foot (152.4 m) lengths of fabric bags or containers or cells on site, for example. The robotic or automated system would be similar to a system used to make endless rain gutters for homes and apartments, for example. In another embodiment of the present invention, the automated or robotic system would also enable production of other polypropylene or similar fabric products on site, in various length measurements as may be suitable for a particular purpose or project.

In another embodiment of the present invention, what is provided is a method of producing flexible fabric bags, comprising the steps of coating polypropylene fabric portions with a combination of VERSIFY™ 3000, or other propylene elastomer or plastomer coating, with a melting point below the melting point of the polypropylene fabric, and polyethylene; wherein each fabric piece has a coated side and an uncoated side; positioning fabric pieces so that a coated side of one fabric piece faces a coated side of another fabric piece, selecting an area of fabrics to be joined for forming one or more seams or joints and applying heat to the coated fabric at the joint area under a pressure of area to be joined that is less than about 2 psi (13.8 kilopascal), to form a joint with at least about a 90% joint efficiency in a joint tensile test.

Another embodiment of the method of producing flexible fabric bags, comprises the steps of coating a polypropylene fabric with a combination of VERSIFY™ 3000, or other suitable propylene elastomer or plastomer with a melting point below the melting point of the polypropylene fabric, and polyethylene; joining edges of the coated fabric, by applying heat to the coated fabric at the joint location under a pressure of less than about 2 psi (13.8 kilopascal), to form a joint with at least about a 90% joint efficiency in a joint tensile test.

Another embodiment of the method of producing flexible fabric bags, comprises the steps of coating a polypropylene fabric with 100% VERSIFY™ 3000, or other suitable propylene elastomer or plastomer with a melting point less than the melting point of the polypropylene fabric, or coating the fabrics with a combination VERSIFY™ 3000, or other suitable propylene elastomer or plastomer with a melting point below the melting point of the polypropylene fabric, and polyethylene, and joining the fabrics (not specifically just edges) using a combination of heat and minimal pressure in such a manner that only the coatings are welded together and not the fabrics, thus producing a joint that will have a strength greater than the original uncoated fabric.

In one or more embodiments of the present invention, all weight bearing points in the flexible bag are designed so that a welded or heat sealed joint will be stressed in the shear direction when the bag is being properly used.

In one or more embodiments of the present invention, if lifting loops are provided, the lifting loops are further protected against peel forces with an additional piece of protective piece of material applied over the top portion of the lift loop seam to protect against peel pressures.

Another embodiment of the present invention comprises a method of producing a flexible polypropylene fabric bag with heat fused seams comprising: providing fabric pieces, wherein each fabric piece has a coated side and an uncoated side; positioning fabric pieces so that a coated side of one fabric piece faces a coated side of another fabric piece; selecting an area of fabrics to be joined for forming one or more seams or joints; applying heat to the area to be joined that is less than the melting point of the fabrics, for forming one or more seams or joints.

In another embodiment of the method of the present invention, the seams or joints between pieces of fabric are formed one at time, to produce a flexible polypropylene fabric bulk bag.

In another embodiment of the method of the present invention, the seams or joints between fabric pieces are joined in a single step to produce the main body of the flexible polypropylene fabric bulk bag.

In another embodiment of the method of the present invention, the seams or joints of the flexible polypropylene fabric bulk bag retain at least about 85% of the fabric strength without using sewing machines.

In another embodiment of the method of the present invention, the seams or joints of the flexible polypropylene fabric bulk bag retain at least about 90% of the fabric strength.

In another embodiment of the method of the present invention, the seams or joints of the flexible polypropylene fabric bulk bag retain at least about 96% of the fabric strength.

In one or more embodiments of the method of the present invention, joints or seams retain at least about 100% of the fabric strength without using sewing machines.

In one or more embodiments of the method of the present invention, for each seam or joint, a joined coated portion of one fabric piece forms a half of one seam or joint, and a joined coated portion of another fabric piece comprises a second half of the same seam or joint.

Another embodiment of the present invention comprises a method of producing flexible fabric bags with heat fused seams in a single step, comprising:

a. providing 8 layers of flexible fabric, including: i. a top layer for a top panel, having a flat side; ii. a second layer for a body panel, having a flat side; iii. a third layer for a body panel, having a gusset side; iv. a fourth layer for a top panel, having a gusset side; v. a fifth layer for a top panel, having a gusset side; vi. a sixth layer for a body panel, having a gusset side; vii. a seventh layer for a body panel, having a flat side; viii. an eighth layer, for a top panel having a flat side; b. wherein the layers of fabric comprise a layer of coating; c. positioning the layers of flexible fabric so that all areas intended to be joined have coating facing coating and all areas intending not to be joined are uncoated fabrics facing uncoated fabrics; d. positioning the layers of fabric so that there is an overlap of the fabric layers; e. centering the overlapped portions of fabric under a seal bar; and f applying low heat and low pressure to create heat fused or heat welded or heat sealed seams or joints.

In another embodiment of the method of the present invention, the method preferably comprises pulse heating.

In another embodiment of the method of the present invention, heat is preferably applied from top and bottom directions to the flexible layers of fabric.

In another embodiment of the method of the present invention, heat is preferably applied from one direction to the flexible layers of fabric.

Another embodiment of the present invention comprises a polypropylene container comprising heat fused seams, wherein the seams comprise a "T" shape, and wherein the right side of the "T" seam in a shear position enables protection of the left side in a peel position when force is applied in the right direction, and wherein the left side of the "T" seam in a shear position enables protection of the right side in a peel position when force is applied in the direction of the left side.

Another embodiment of the present invention comprises a method of automated production for producing flexible fabric bags with heat fused seams comprising: a. providing layers of flexible fabric, including tubular flexible fabric portions, wherein some layers are gusseted and some layers are flat, and wherein the layers of flexible fabric comprise a layer of coating; b. positioning the layers of tubular flexible fabric so the gusseted layers comprise coating on the outside and the flat fabric layers comprise coating on the inside of their gussets; c. positioning the layers of fabric so that one layer overlaps an adjacent layer; and d. applying low heat and low pressure to the overlapped portions of the layers of fabric to create heat fused or sealed seams.

Another embodiment of the method of producing flexible fabric bags with heat fused seams comprises: a. providing fabric pieces, wherein each fabric piece has a coated side and an uncoated side; b. applying heat that is less than the melting point of the fabric pieces to be joined for joining fabric pieces to create one or more seams or joints wherein for each seam or joint, a coated side of one piece of fabric will form a half of the seam and will face a coated side of another piece of fabric for forming the other half of the seam.

In another embodiment of the present invention, the one or more joints have a joint strength equal to or greater than about 85% of the fabric.

In another embodiment of the present invention, the one or more joints have a joint strength equal to or greater than about 85% of the fabric without using sewing machines.

In another embodiment of the present invention, the overlapped portions of fabric are about 1½ (3.81 cm) inches and the overlapped portions of fabric are centered under about a 2 inch (5.08 cm) wide seal bar.

Another embodiment of the method of the present invention comprises joining polypropylene woven fabrics by the following steps:

a) coating the fabrics with materials that have a melting point that is lower than the melting point of the polypropylene fabrics to be joined together;

b) heating the coating to at least the melting point of the coating; and c) joining the heated materials with pressure light enough to allow the coating to stay in place and generally keep the woven fabrics from touching.

In various embodiments, the fabrics are not being heated up past their melting points.

In various embodiments, the fabrics are only being heated to a point below the melting point of the woven fabric but high enough to melt the coating.

In various embodiments, by using such relatively low heat, the inventive process does not damage or reduce the strength of the fabric.

In various embodiments, low pressure is applied to clamp the fabrics together to complete the seal.

In various embodiments, the pressure applied is under about 7 psi (48 kilopascals).

In various embodiments, the pressure applied is about 2 to 7 psi (14 to 48 kilopascals).

In various embodiments, the pressure applied is about under 2 psi (14 kilopascals).

In various embodiments, by using low heat and low pressure, only the coating itself is being joined, leaving the fabric completely undamaged and unweakened.

In various embodiments, the strength of the coating adds to the overall joint strength, and the resulting joint strengths, allow one to lift higher weights with less material than can be done with the current, commonly used methods of sewing fabrics together.

In various embodiments, the fabrics are similar to polypropylene.

In various embodiments, the fabrics are woven of a plastic material other than polypropylene.

Another embodiment of the method of joining highly oriented polypropylene woven fabrics comprises the following steps:

a) coating the fabrics with a coating comprising VERSIFY™ and polyethylene resins, the coating having a melting point that is at least about 5 degrees lower than the melting point of the polypropylene fabrics to be joined together;

b) heating the coating to its lower melting point; and c) joining the heated materials with sufficient pressure to allow the coating to remain in place and yet not allow the woven fabrics to make direct contact in order to achieve at least about 91% joint efficiency.

In various embodiments, the coating comprises about 50% to 90% of propylene-based plastomers, propylene-based elastomers, or mixtures thereof and about 10% to 50% polyethylene resins and additives, having a melting point that is at least about 5 degrees lower than the melting point of the polypropylene fabrics to be joined together.

In various embodiments, the coating comprises about 50% to 90% of VERSIFY™ 3000 and about 10% to 50% polyethylene resins, having a melting point that is at least about 5 degrees lower than the melting point of the polypropylene fabrics to be joined together.

In various embodiments, the coating comprises about 50% to 90% of a propylene copolymer and about 10% to 50% polyethylene resins.

In various embodiments, the coating has a melting point that is at least about 15% lower than the melting point of the polypropylene fabrics to be joined together.

Another embodiment of the method of joining highly oriented polypropylene woven fabrics comprises the following steps:

a) coating the fabrics with materials comprising about 70% VERSIFY™ and about 30% polyethylene resins, having a melting point that is at least about 5 degrees lower than the melting point of the polypropylene fabrics to be joined together;

b) heating the coating to its lower melting point; and c) joining the heated materials with sufficient pressure to allow the coating to remain in place and yet not allow the woven fabrics to make direct contact in order to achieve at least about 91% joint efficiency.

As discussed herein, Flexible Intermediate Bulk Containers (FIBC) or bulk bags with heat fused joints in accordance with principles herein, have improved functionality, increased sustainability, and are revolutionizing the bulk bag industry. By innovating on the standard hand-sewn bag construction to an automated heat sealing process, this improved technology enables a cleaner and higher performance bag that impacts every part of the value chain.

An improved embodiment of the method and machinery of the present invention includes an intermediate stage heat sealing closed loop production line, including an automated FIBC manufacturing system that can have a continuous sequential closed loop flow of product.

One or more embodiments of an overall System can include:

a. first fully or almost fully automated heat sealed bag assembly line b. sequential flow—lower labor and less product movement An automated heat sealed bag assembly line can include:

1. Carrier Plate, including the following features and functions a. precision guides for all parts of a bag b. precision bag alignment—(e.g., to keep bags within about 1⁄16 inch (0.159 cm) tolerance).

c. can be used as a precision set-up tooling for the impulse heat sealing machines d. single piece main plate is preferred to insure high degree of accuracy e. clamps bag parts in position f. preferably bag is never removed from carrier plate until completion through both impulse heat sealing machines.

2. Main Body Carrier Plate Assembly Table, including the following features and functions:

a. precision carrier guides for precision movement of the carrier plate from the carrier plate assembly table into impulse heat sealing machines.

3. Main Body/Top/Bottom/Spouts Impulse Heat Sealing Machine, including the following features and function:

a. all heat seal bars are preferably two axes self-adjusting for maintaining equal pressure during sealing process;

b. heating sealing elements are single piece—prior art industry is 3 pieces minimum;

c. fail safe temperature control preferably with at least dual sensors;

d. sensors are 1⁄32" (0.079 cm) higher than insulation pad to ensure that the two sensors are seeing equal pressure as two parts of a three way triangle points of contact;

e. clamping system on seal bars for holding Teflon cover in place—industry uses tape 4. Loop/Diaper carrier Plate Assembly Table, including the following features and functions:

a. carrier plate once again ensures accurate placement of parts—loops and diaper;

b. precision carrier guides for precision movement of the carrier plate from the carrier plate assembly table into impulse heat sealing machines 5. Loop/Diaper Impulse Heat Sealing Machine, including the following features and functions:

a. same unique features as number 3; and b. both loop seal bars are preferably three axes self-aligning for maintaining equal pressure during sealing process.

6. Bag Unload Carrier Plate Table, for unloading completed bag from carrier plate.

7. Return Conveyor, which can be commercial with Ameriglobe, LLC advanced electronics In one or more preferred embodiments of the heat sealing closed loop production line system and method, non-sewn FIBC bags can be produced in about 2.5 to 5 minutes.

In preferred embodiments of the heat sealing closed loop production line system and method, heat welded FIBCs can be produced in about 2.5 to 5 minutes. In preferred embodiments of the heat sealing closed loop production line system and method, substantially flat fabric parts or pieces in (2-D) construction facilitates the automation process and precision (that is =/− about 1/16 inch (0.159 cm)) in the FIBC manufacturing.

In preferred embodiments of the heat sealing closed loop production line system and method, an FIBC bag is produced with no manufacturing equipment/tools making contact with an inside of the bag during manufacturing.

In preferred embodiments of the heat sealing closed loop production line system and method, an FIBC bag is produced with no manufacturing equipment/tools making contact with an inside surface of the bag during manufacturing.

In preferred embodiments of the heat sealing closed loop production line system and method, two and three axes impulse heat sealing heads are utilized which allow full self-alignment during the heat sealing process.

In various embodiments, single piece heating elements allow for lower costs and lower maintenance change-over time.

In preferred embodiments of the heat sealing closed loop production line system and method, at least dual fail-safe sensor controls over the set temperature points are utilized.

In preferred embodiments of the heat sealing closed loop production line system and method, a multiple purpose carrier tray system can be used for (a) parts assembly, (b) tooling set-up and (c) quality checks of parts during assembly.

In various embodiments, during the manufacturing process, the FIBC bag as it is being manufactured never leaves the carrier plate that it is attached to which insures a high degree of parts placement control, until a bag is completed.

In various embodiments, advantages of the heat sealing closed loop production line system and method include

- an FIBC automated manufacturing system;
- continuous sequential closed loop flow of product;
- a non-sewn FIBC bag;
- flat parts (2-D) construction which in turn allows for automation and precision (=/−1/16 inch (0.159 cm)) FIBC manufacturing;
- an FIBC bag with no manufacturing equipment/tools inside bag during manufacturing;
- two and three axes impulse heat sealing heads which allow full self-alignment during the heat sealing process and help ensure equal pressure during heat sealing;
- single piece heating elements—lower costs and lower maintenance change-over time;
- dual fail-safe sensor control over the set temperature points;
- multiple purpose carrier tray system used for (a) parts assembly, (b) tooling set-up and (c) quality checks of parts during assembly; and
- during the manufacturing process, the FIBC bag as it is being manufactured never leaves the carrier plate that it is attached to which insures a high degree of parts placement control.

In various embodiments of the bulk bag heat sealing closed loop production line system and method, a production flow system overview and sequence steps, includes the following:

1. Providing individual fabric parts for a bulk bag in substantially flat and folded or gusseted configuration on a main body cart. (The bag fabric parts on the main body cart can include one or more discharge spouts, body portions, fill spouts, tops, bottoms, and/or a document pouch. One or more bag fabric parts can be folded and gusseted and then pressed to a substantially flat condition in a 2-D configuration prior to placement on the cart.)

2. The individual parts of the bag can be assembled by an operator on a carrier plate, which can be placed on a main body assembly table for an initial bag to be made or as part of an assembly line and placed on the table after the previous cycle.

Preferably a carrier plate includes spout guides that provide an indication of how to line up the fill and discharge spouts on the carrier plate and with respect to the other bag pieces, and which allow for quality check of the placement of the spout bag pieces. Preferably a carrier plate also includes tooling location points for helping to align the carrier plate in the heat sealing machinery.

Preferably a carrier plate also includes one or more holding clamps for holding fabric pieces in place on the carrier plate. Preferably a carrier plate includes body guides that provide an indication for how to place and line up the body on the carrier plate and a quality check for the placement of the body. Preferably a carrier plate includes top/bottom guides that provide an indication for how to place and line up the top and bottom on the carrier plate and with respect to the other fabric pieces, and provides a quality check for placement of the top and bottom pieces.

Preferably carrier plate guides and quality check indicators are provided on the carrier plate based on desired dimensions for a bag to be heat sealed, and desired locations of bag joint overlap areas.

3. The assembled bag, while still clamped onto the carrier plate via one or more holding clamps can then be moved into position into a heat impulse sealing machine, e.g., a main body impulse sealer machine. Once the carrier plate is in position (which can be detected by a sensor), the cycle of the machine can be initiated at a control panel by an operator. A preferred embodiment of a heat sealing main bag body machine can include 4 top side heat sealing bars that can be pushed downward onto a top bag surface over 4 main bag joint locations and correspond to the location of 4 bottom side heat sealing bars that can be in contact with a bottom surface of the bag in 4 main joint locations. A fifth upper heat sealing bar can also be provided in a main body sealing machine for heat-sealing a document pouch. The 5 top side heat sealing bars of the machine are preferably pushed downward (preferably at 2 psi (13.8 kilopascal) to the mating 4 lower side heat sealing bars by pneumatic cylinders. The top 5 Heat Sealing Bars and lower 4 Heat Sealing Bars can heat seal bag joints at 5 connection areas, between the discharge spout and bottom, top and fill spout, top to the body, bottom to the body, and for a document pouch. Preferably, pneumatic cylinders remain in an extended position during a temperature ramp-up period, a temperature bake time and a cool-down time. At the completion of the temperature times, the pneumatic cylinders can retract and are ready for the next cycle.

4. The individual bag fabric parts for the lift loop assemblies and the diaper/bottom cover can be located on a loop/diaper cart.

5. The heat sealed assembled bag, while still clamped onto the carrier plate, can then be moved from the first heat sealer machine, e.g., a main body impulse sealer machine, onto a loop/diaper assembly table. The loop assemblies and diaper can be placed in their proper position on the heat sealed assembled bag while on the carrier plate and can be clamped with the holding clamps.

6. The heat sealed assembled bag, while still clamped onto the carrier plate is then moved into position into a second heat sealer machine, e.g., a loop/diaper impulse sealer machine. Once the carrier plate is in position in the second heat sealer machine (which can be detected by a sensor), the cycle of the machine can be initiated at a control panel (e.g., a second control panel) by an operator. While in the second heat sealer machine, 3 top side heat sealing bars can be pushed downward (e.g., preferably at 30 psi) to mating 3 lower side heat sealing bars by pneumatic cylinders. The top 3 heat sealing bars and lower 3 heat sealing bars can heat seal at the 3 connection areas for the lift loop assemblies and bottom cover or diaper.

Preferably the second heat sealing machine can couple 4 lift loop assemblies to the bag and the bottom cover. One pair of upper and lower heat sealing bars can be positioned in the machine above and below joint locations for two lift loop assemblies positioned on one side of the folded bag, a second pair of upper and lower heat sealing bars can be positioned above and below joint locations for another two lift loop assemblies positioned on the other side of the folded bag, and a third pair of upper and lower heat sealing bars can be positioned above and below a joint area for the bottom cover. The carrier plate can include guides and quality check indicators for positioning the respective lift loop assemblies on the bag and the bottom cover on the bag. The carrier plate can also include indicators for lining up the bag in the second heat sealing machine in line with the respective heat sealing elements.

7. The assembled bag, while still clamped onto the carrier plate can then be moved onto a finished bag unload table where the bag is unclamped from the carrier plate and moved to a finished bag area. The carrier plate can then be moved onto a conveyor system that will automatically return the carrier plate to the starting position, e.g. near the main body assembly table or to the main body assembly table.

In various embodiments of the bulk bag heat sealing closed loop production line system and method, sub-assemblies and support equipment can include:

1. A seal bar that can have a typical 2 inch (5.08 cm) wide seal bar construction, and preferably can be water cooled to decrease the cool-down time. Preferably a seal bar has at least twin fail-safe sensor controls to monitor and regulate tight temperature control (e.g., to about +/−1 degree)

2. An upper seal bar preferably has a two axis pivot yoke to insure uniform pressure during the heat sealing process when pressed against its mating lower seal bar by two pneumatic air cylinders, for example.

3. A Teflon seal bar heating element cover preferably is held in place by clamp bars.

4. The heating element preferably is of single piece construction and is held in place by a pivoting clamping assembly. The heating element can be stretched to its proper tension by two springs.

5. The heating element preferably is insulated from the seal bar by an insulating material; e.g., a rubber insulation material.

In various embodiments of the bulk bag heat sealing closed loop production line system and method, a loop seal bar construction can include the following:

1. a seal bar that can be water cooled to decrease the cool-down time and preferably has twin fail-safe sensor controls to monitor and regulate tight temperature control (e.g., within about +/−1 degree F. (−17.2 degrees Celsius));

2. the upper seal bar preferably has a three axis pivot yoke to insure uniform pressure during the heat sealing process when pressed against its mating lower seal bar by two pneumatic air cylinders, for example;

3. a Teflon seal bar heating element cover preferably is held in place by clamp bars;

4. preferably the heating element is a single piece construction and is held in place by a pivoting clamping assembly, and wherein the heating element can be stretched to its proper tension by two springs;

5. preferably the heating element is insulated from the seal bar by a rubber insulation material.

In various embodiments of a carrier plate of the bulk bag heat sealing closed loop production line system and method, preferably:

1. The carrier plate is precision milled within =/− about 0.01 inch (0.0254 cm); and 2. The carrier plate serves as a (a) precision parts assembly platform, (b) tooling plate for machine set-up and (c) a material quality check during assembly.

In various embodiments of a main body cart of the heat sealing closed loop production line system and method, preferably:

1. the main body cart is preferably designed to exacting dimensions to hold a full day's production of main body parts; e.g. bulk bag fabric pieces in repeatable and accurate positioning; and 2. the main body cart is designed to be unloaded from either side.

In various embodiments of a loop/diaper body cart of the bulk bag heat sealing closed loop production line system and method, preferably:

1. The loop/diaper body cart is designed to exacting dimensions to hold a full day's production of Main Body Parts in repeatable accurate positioning; and 2. The loop/diaper body cart is designed to be unloaded from either side.

In various embodiments using automation, producing a bulk bag or FIBC in 2D (two-dimensional) form is important for automation.

The gusseted and folded configuration of the fabric pieces that are substantially flattened prior to entering the heating sealing machinery enables a bag joint to be formed around a circumference of the bulk bag at joint locations all while it is in the flattened and folded 2D configuration. The fabric gusseted and folded pieces can include fill spout, top, body, bottom, discharge spout, lift loop assemblies and bottom cover. In the prior art methods of sewing the bags, the bags are sewn in 3D or three dimensional configuration, wherein bags need to be opened up during the sewing process.

In various embodiments, dimensions of a fabric part carrier table can vary based on the dimensions of the fabric parts it will hold. Dimensions of the fabric parts can be selected based on desired bag dimensions.

In various embodiments, use of a combination of tubular fabric (e.g., for a body portion and fill and discharge tubes) and flat sheets of fabric (e.g., for top and bottom portions) allows for a minimal total fabric usage to produce the bulk bag. In the prior art for example, more fabric than is needed is used in forming sewn seams for the bag, for example.

Through experimentation and testing with automation for production of bulk bags, gusseting is the only known way to match differing fabrics for automation. All of the above results in minimal square inches (centimeters) of material being used while still being able to obtain at or around the same pounds per square inch (kilograms per square centimeter) as with sewn seams and heavier fabric, for example.

In the prior art, liners have been cut out of gusseted material as a single piece liner, but this results in a lot of wasted fabric. In embodiments of the present invention with a five fabric pieces for assembling a bag, gusseting of the pieces, allows the different sized pieces to fit together. Use of different fabric portions for the bag assembly also allows for potential selection of a different fabric for each piece, e.g., fabrics of different thickness, densities, weights and/or strengths. For example, a bottom portion could be made of thicker fabric than what is used for a top portion. This may be desirable to make the bottom as strong as possible, but allowing for savings in cost for other bag fabric pieces.

In various embodiments, the bag fabric portions include a top and bottom portion both of which are constructed from flat fabric pieces that are then folded or gusseted into a desired fold configuration for assembly with the other bag pieces. In various embodiments a discharge tube and fill spout and body are formed from tubular fabric pieces that are then folded or gusseted into a desired fold configuration for assembly with the other bag pieces. In various embodiments an opening in a bottom portion is substantially square in shape and receives a tubular portion of a discharge spout.

In various embodiments the gusseted configuration of the bag portions and the heat sealing method enable use of the least amount of fabric in the bag construction as possible, without waste from overlapping used in sewn seams for example, or in cutting out a single piece bag from an overall fabric piece with wasted fabric portions. In sewing, generally you have about a 1 to 1.5 inch (2.54 to 3.81 cm) fold on each side for sewing.

In preferred embodiments of automation for bulk bags, flat sheets of fabric and tubular pieces of fabric are gusseted and then pressed or substantially flattened. Portions of one piece of fabric can be fit within a portion of another piece of fabric to form an overlapped and desired joint area. When the overlapped areas are heat sealed, the joint is formed around the entire circumference of the fabric pieces, connecting the fabric pieces.

In various embodiments, the strength of bonds formed via heat sealing versus sewing strength allows reduction on total weight of fabric in the heat sealed bags, versus sewn bags.

In various embodiments, a lift loop assembly includes a lift loop attached to a lift loop panel, and wherein the panel is the portion that forms a heat sealed joint with the bag fabric. A lift loop panel can be substantially rectangular and positioned either laterally or longitudinally on the bag. A lift loop panel can also be substantially square or other desired shape.

In various embodiments of a bulk bag including heat sealed joints, fabric tape can be included on an edge of a lift loop panel to increase the bond strength of the heat sealed panel, by delaying the peel point. Preferably tape is added along a vertical or longitudinal edge of the lift loop panel.

The tape along a lift loop panel edge can be fabric tape including an adhesive backing and can be coupled to the bag via the adhesive. In some embodiments fabric tape can be included along each lift loop edge. In some embodiments tape is only included along an inner longitudinal edge of a lift loop panel 59 of the bulk bag. In some embodiments tape is only included along a vertical inner edge of lift loop panel 59.

In various embodiments, lift loop panel can be any desired shape.

In various embodiments a lift loop panel can be rectangular in shape with the longer sides of the rectangle positioned substantially horizontally on the bulk bag. In such embodiments tape along the edges of a lift loop panel are not necessary for delaying the peel.

The tape at the edge of the lift loop panel can be beneficial to help prevent curling of the fabric that can occur during the heat sealing process when just a lift loop panel or patch without the tape is heat sealed to the bag.

In various embodiments, the method includes fully bonding every part of a joint area to an outside edge of the respective pieces being joined, e.g., so that there is no graspable portion, restricts peeling. Fully bonding to the outside edge discourages manual attempts to damage the bond by picking at the important edge and causing early release of the bond. This can be accomplished by having the heat seal bar extend beyond the location of a desired joint edge.

In various embodiments, e.g., if a bag body includes a bonding coating that includes propylene elastomers and plastomers, a buffer is preferably placed between portions of fabric wherein a bonding coating is in contact with another bonding coating given the gusseting of the bag pieces, and for which it is not desired to create a bond. For example, when heat sealing the diaper or bottom cover to the bag, a buffer can be placed during the bonding process whenever and wherever a bonding coating meets a bonding coating. This can require a buffer in the diaper cover area. A buffer for example can be wax paper. A buffer, e.g., wax paper, can also be used when heat sealing the lift loop assemblies to prevent heat sealing body gussets together, for example, if the body exterior includes a bonding coating, e.g., a propylene based elastomer or plastomer coating.

Preferably a bottom cover or diaper is cut at an angle so that a pull tab is formed which can easily be pulled and removed by a user when ready to discharge bag contents.

In various embodiments, fill spout and discharge tube fabric ties can be attached to a fill spout or discharge tube via adhesive tape, e.g., polypropylene or polyethylene fabric tape with an adhesive thereon.

In various embodiments, a tint can be added to a coating on bag pieces, e.g., a bonding coating or the standard polypropylene fabric coating, so that after the coating is applied to the fabric it is easily identified as the particular type of coating. For example, a green tint or other desired color, can be added to a bonding coating. In preferred embodiments, the bonding coating with tint can be applied at 2 to 4 mils (0.05 to 0.10 millimeters). A shade guide can be provided as a quality check wherein the tint at 2 mils (0.05 millimeters), for example, will be a certain shade. If tint is darker or lighter than what it should be at 2 mils (0.05 millimeters), this can be an indication that the bonding coating was not applied to designated thickness and can provide another quality check function for the bag.

Tinting the bonding coating on the fabric can also help make sure the special bonding coating is in the proper position.

Tinting the bonding coating on the fabric can also help to identify the proper thickness of the coating.

In various embodiments a standard fabric polypropylene coating can be tinted instead of the bonding coating, or the standard fabric polypropylene coating can be tinted a different color than the bonding coating. A shade guide can also be used to measure if the standard fabric polypropylene coating is applied at the right thickness.

In various embodiments, lift loops are made of all fabric, which further eliminates sewing from the bag manufacturing process.

In various embodiments, lift loops are made of all fabric, e.g., of the same highly oriented polypropylene fabric used for the bag fabric pieces for top, bottom, fill and discharge spout and body portions.

In various embodiments, tape can be used to secure the spout ties versus sewing. This again, eliminates sewing thread and machines from the production line and any attendant loose threads.

In various embodiments, tape, e.g., fabric tape with an adhesive backing, can be used to couple a spout tie to a discharge tube or fill spout.

In various embodiments, an oversized top can be accomplished by repositioning the lift loops lower on the bag. This can easily be done with the heat sealing method, wherein the lift loop assembly is positioned on the bag and attached to the bag at a desired lower location on the bag body, e.g., about 4 to 6 inches (10.2 to 15.2 cm) below an upper edge of a bag body portion, and then the lift loop assembly can be heat sealed to the bag body at the selected location using a sealing bar. With sewing methods, it can be difficult to sew the loops lower down on a bag as sewing machines typically are not constructed to easily do this. Costs include more manpower to reposition the loops for this function. With one or more heat sealing embodiments as described herein, it is not easy to incorporate an enlarged top to be connected to a body of typical dimensions, as dimensions of the oversized type and gusseting formation may not properly align with the typical size body.

In various embodiments a bonding coating, e.g., including propylene based elastomers and plastomers needs to be present in all joints, at least on one fabric piece in the overlapped area in which a joint will be formed.

In one or more preferred embodiments, all tubular materials or fabric pieces are coated with a bonding coating, and all other fabric pieces or materials are coating using an industry standard coating. But everything can be also be reversed in other embodiments, so long as at the point of bonding either two coated surfaces with a bonding coating faces each other or one coated surface with a bonding coating and one coated surface with an industry standard coating are being joined.

In one or more preferred embodiments, a discharge tube, body and fill spout are coated with a bonding coating, and all other fabric pieces or materials (e.g., a top, bottom, lift loop panel, diaper cover or document pouch) are coating using an industry standard coating.

In one or more preferred embodiments, a discharge tube, body and fill spout are coated with a standard industry coating, and all other fabric pieces or materials (e.g., a top, bottom, lift loop panel, diaper cover or document pouch) are coating using bonding coating. In various embodiments a bulk bag can include one heat sealed joint between a fabric piece with a bonding coating and a fabric piece with a standard industry coating.

Experimentation has shown that a standard polypropylene fabric coating that comprises a majority of polypropylene and some polyethylene does not work as a bonding coating to form a bond that can work as a bag joint when a standard polypropylene fabric coating on one piece of fabric is bonded with a standard polypropylene fabric coating on another piece of fabric.

In embodiments where a propylene based plastomers or elastomers coating is on one piece of fabric and bonded with a standard polypropylene fabric coating on another piece of fabric, a bulk bag heat sealed joint is being formed with a bonding coating on only one piece of fabric that is being joined to another piece of fabric.

In various embodiments, a bulk bag can include one heat sealed joint between a fabric piece with a bonding coating and another fabric piece with a bonding coating.

In various embodiments a bulk bag can include more than one heat sealed joint between a fabric piece with a bonding coating and a fabric piece with a standard industry coating.

In various embodiments a bulk bag can include more than one heat sealed joint between a fabric piece with a bonding coating and another fabric piece with a bonding coating.

In the practice of coating tubular pieces of fabric with a coating, a coating is applied to the fabric while the tube is substantially flattened, and in practice the applied bonding coating does not typically cover the folded edge of the tubular piece. In preferred various embodiments of the present invention, tubular materials are coated with a bonding coating in a manner that brings the coating at least to the folded edge or just over the folded edge for strength in the folded edge area.

Typically in the prior art, when applying a coating to fabric, e.g., to tubular fabric pieces, an operator will apply clear tape to the folded edge and then coat onto the tape. This in practice can leave an uncoated area of up to about 1.5 inches (3.81 centimeters). If a bonding coating is applied to the fabric in this manner with tape applied to the folded edge, the result is that the fabric piece can have at or about a 1.5 inch (3.81 centimeters) or more area that does not include the bonding coating. This means that a heat-sealed joint will have a weak area, e.g., in an area where a bond between coatings of the fabric pieces is not formed.

In various embodiments of the method of the present invention, tubular fabric pieces are coated with a bonding coating in a manner that brings the coating at least to the folded edge or just over the folded edge for added strength in the folded edge area when applied to the tubular fabric in flattened configuration. In various embodiments, the coating will be applied at or around ⅛ inches (0.32 cm) before an edge of the tubular fabric, or at or around ⅜ inches (0.95 cm) past the edge of the coated fabric. In various embodiments, the coating will be applied from an edge, and at least not more than ⅛ inches (0.32 cm) before an edge, of the tubular fabric, or at least ⅜ inches (0.95 cm) past the edge of the coated fabric. Although it is preferred to have coating on an entire exterior or interior surface of a tubular fabric piece, in practice if this is not practical, a preferred method has coating up to the edge or no more past the edge than ½ inch (1.27 cm) beyond the edge for greater strength.

In various embodiments, a standard polypropylene fabric coating can also be applied to fabric pieces in a same or similar manner, wherein, tubular fabric pieces are coated with a standard polypropylene fabric coating in a manner that brings the coating at least to the folded edge or just over the folded edge for added strength in the folded edge area when applied to the tubular fabric in flattened configuration. In various embodiments, the coating will be applied at or around ⅛ inches (0.32 cm) before an edge of the tubular fabric, or at or around ⅜ inches (0.95 cm) past the edge of the coated fabric. In various embodiments, the coating will be applied from the edge, and preferably not more than ⅛ inches (0.32 cm) before an edge of the tubular fabric, or at least ⅜ inches (0.95 cm) past the edge of the coated fabric.

In one or more embodiments, a bag body and/or bottom portions can be folded or gusseted so that portions of the fabric that do not include a coating (e.g., which may occur at folded edges during application of a coating as described above), will be positioned wherein a bottom cover or diaper portion will cover those non-coated areas, or a portion of the bag fabric that may still have the tape applied during the coating application.

In practice, a coated tubular piece of fabric to be used to form a bag fill spout, body portion, or discharge tube, may be received in a substantially flattened configuration with two folded edges that do not have coating covering the folded edges. During the folding or gusseting stage of the fabric portions, a tubular piece of fabric can be newly folded wherein the uncoated folded edges are moved to a substantially central position on the tubular piece of fabric, and then with gusseting and pressing being done as described further herein with respective to FIGS. 22A-D, for example.

In various embodiments, the bottom discharge structure is configured to strengthen the discharge structure and strengthen a zero point area at the discharge tube and bottom panel joint.

In construction of a heat fused bag wherein a bottom portion opening is constructed with four slits, a zero point area can occur at about the 90 degree angle point, wherein two pieces are at about 90 degrees respective to each other, going from the horizontal to the vertical, at bottom portion slit areas, which are weak areas in a heat sealed bag. Taping configurations as described herein can overcome the weak area at the zero point. In other embodiments, a discharge tube in gusseted form can be positioned through the bottom opening and sealed to the bottom flaps wherein the slit between bottom flaps is not located at a corner of the gusseted discharge tube in folded and flattened configuration. For example, the discharge tube and bottom flaps can be fused together wherein the bottom slits are located at or about centrally between the corners of the discharge tube in folded and gusseted form. When sealed in this manner, the weak areas do not result in a blowout point for the bag when heavier contents are included therein.

In various embodiments, the slits between the bottom opening flaps are preferred because the slits enable some expansion of the opening going from a smaller square to a larger circular shape.

In various embodiments, the automation system and process of the present invention can be used to produce a two loop design bag that is popular in Europe. In various embodiments, substantially square spouts are utilized and are important to the gusseting designs of this bag. Square spouts allow for heavier weight to be successfully held in a bag, than in the other embodiments, e.g., without a square spout.

In various embodiments, heat fused bulk bags with heat sealed joints can be priced competitively relative to conventional sewn bulk bags based on the value they generate due to their enhanced performance and sustainability. Example—Price for imported bag with liner is $12.09 USD and price of a similar heat sealed bag can be $12.09 USD.

A bulk bag with heat sealed joints in accordance with one or more principles herein is a novel technology that enhances bag performance, sustainability, and cleanliness via a scalable manufacturing process based on a heat sealing construction. As previously discussed, woven polypropylene fabrics have been the fabric of choice in the bulk bag industry, given the strength, cost and flexibility of the fabrics, but more importantly, due to its nearly perfect chemical inertness. The polypropylene fabrics are highly oriented through a heating and stretching process to achieve maximum strength while maintaining the needed flexibility of fabrics to fit the needs of the marketplace. As discussed, the challenge has been, "With the chemical inertness, how does any process achieve a strong enough seal without damaging the inherent and important properties?" Prior art methods and ways to join polypropylene fabrics with sealed joints has worked with small bags of up to 100 pounds (45 kilograms). But to meet the FIBC industry's safety standards, for some applications the bags must be able to hold suspended weights of up to 16,500 pounds (7,484 kilograms), to meet the 5 to safety ratio. Up until the heat sealed bags and method and technology as described herein was created, no accepted or useful method has been found for a bulk bag that can carry such weight safely.

The Flexible Intermediate Bulk Container (FIBC)/bulk bag industry is now over 40 years old. Currently, the FIBC market is estimated to sell 200 to 300 million FIBCs a year with an average price of $12.00 USD. It is a $2.5 billion market that has been growing steadily at 7% per year for more than two decades and shows no signs of slowing down its growth. The very first bulk bags were constructed by combining various configurations of woven polypropylene fabrics and woven webbing by sewing them together to get the needed strength. Today, sewing remains nearly the exclusive method for connecting the materials of construction when making bulk bags. The determination of which fabrics to use and which sewing patterns and which threads to use to combine these parts to create the most economical bulk bag container are well known and have been studied in great detail.

Heat welding has been tried and largely rejected because to heat weld as in the prior art, one must reach the melting point of the polypropylene fabrics to bond them together. However, the polypropylene fabrics are highly oriented and bringing them up to this temperature level results in a fabric tensile strength loss of approximately 50%.

The basic issue has always been that bulk bags must safely carry tremendous weights, for example in some cases up to 3,300 (1,497 kilograms) or 4,400 pounds (1,996 kilograms). Many prior efforts have shown that joints can be achieved but nothing in the prior art has shown itself to be able to carry these weights with the required 5 to 1 lifting safety in the resulting containers. Therefore, after 40 years of production, bulk bags are still manufactured largely through the original methods of sewing woven polypropylene fabrics together to form the bag and its lifting components.

The FIBC/bulk bag heat sealing technology in accordance with principles herein is a technology that utilizes a novel and automated thermal bonding process of highly oriented, woven polypropylene coated fabrics together through a combination of a uniquely formulated extrusion coating polyolefin blend, a specially designed bulk bag that keeps every seam in its strongest position for shear strength, and a specially designed and highly computer controlled heating system such that the thermally bonded (heat sealed) seam does not damage the strength of the chemically inert, heat sensitive polypropylene fabric and is able to retain greater than 95% of the original tensile strength of the fabric. This is a significant improvement over the strength of a sewn seam.

It is important to understand that in the present invention, the bag is not carrying the tremendous weights based on the strength of heated polypropylene fabrics. The strength of the bag and its lifting capacity is in the bond only that is formed between bag fabric pieces.

In various embodiments, the actual polypropylene fabrics are purposely separated by the bonding coating and only the coatings (e.g., a bonding coating and bonding coating or a bonding coating and standard laminate polypropylene fabric coating) are bonded together. A preferred bonding coating used has a lower melting point than the polypropylene fabrics. So while the coating is being heated up to its melting point to make the bond strong, the polypropylene fabrics do NOT reach their melting point and therefore keeps all of its original strength.

To accomplish this, the equipment that can be utilized in the automated heat sealing process has to be carefully designed to reach target temperatures below the polypropylene melting temperatures and to hold the temperatures long enough for the bonding coating to fully reach the target temperature without varying too high and reaching the melting point of polypropylene fabric.

Preferably the equipment, e.g., the heat sealing machinery, can hold the temperature within about a 5 degree range of the target temperature to help make sure that the resulting bond is strong and the fabric stays strong.

Preferably the bonding coating not only has the ability to bond with itself, but also can bond to the polypropylene fabric with enough strength that neither the bonding of the bonding coating to itself, nor the bonding of the bonding coating to the fabric piece will break under the pressure of the contents of the bag.

While many FIBCs are coated prior to sewing, the industry standard coatings are unable to bond to themselves with a bond strength of anything greater than about 25% of the material's own tensile strength. However, in the present invention, a standard industry coating can effectively be used to form heat sealed joint and bond when bonding the industry polypropylene fabric standard coating to a propylene based plastomers or elastomers coating.

When a standard polypropylene fabric coating on a first piece of polypropylene fabric is heat welded to a bonding coating (e.g., a propylene based plastomer or elastomer coating) on a second piece of polypropylene fabric, the bond between the standard coating and bonding coating, the bond between the bonding coating and second polypropylene fabric piece, and the bond between the standard coating and first polypropylene fabric piece will not break under the weight of contents in a bulk bag, e.g., up to 5,000 pounds (2,268 kilograms) or more of material contents in the bag.

Next a concern to deal with was the amount of labor used to produce a single FIBC. In the simplest design of a prior art FIBC, there can be about 428 inches (10.8 meters) of sewn seams alone. A sewing machine can only sew each seam individually and then it must also travel along every inch (2.5 cm) of every seam. Essentially, the FIBC is sewn in its final form or simply put in its 3 dimensional condition. This requires the machine operator to become very skilled at manipulating each inch (2.5 cm) of every seam of the bag in a proper condition under the sewing machine's needle. It takes an average of 3 months for any new operator to develop enough skill to make a single design of a bulk bag.

In the present invention, preferably the parts of the bag are gusseted into squares so that each piece nestles perfectly within its neighboring piece such that there is about a two inch (5.08 cm) wide sealing or overlapped joint area. The specialized equipment of the present invention assures the operator that all pieces are perfectly aligned by use of a frame, e.g., a carrier frame. Once this frame is filled, there are four seam or overlapped areas, each consisting of 8 individual layers of materials, the frame is placed in the specialized equipment, a start button is pushed and five sealing heads come down on the parts to seal the overlapped areas. The computerized controls can bring each individual sealing bar to the proper temperature and based on the thickness of the fabrics under each sealing head, can hold the temperature for a specified amount of time so that the entire thickness of the 8 layers will reach the perfect or target temperature, or temperature within a target range, for the maximum strength of the bond, for each particular seam or joint formed.

At this point a computer controlled cooling system can cool each bond to a second specified temperature which makes the bond permanent. As each sealing head completes its full cycle, the sealing head is retracted. When all four sealing heads reach the end of their individual cycle, the resulting bonds have turned all of the 8 layers mentioned above into four pairs of completed seams. Only the correct pairs of fabrics have been properly paired and no incorrect pairs of fabric have been seamed together.

At this point, all 428 inches (10.9 m) of seams throughout the entire bag have been made in a single production step in a 2 Dimensional manner.

As mentioned 5 sealing heads can be included on a first stage machine. Four of the sealing heads can seal for bag containment area bonds, and a fifth sealing head can attach a document pouch to the bag. This step can be included without any extra labor. Alternatively, a first stage machine can include less than five sealing heads, e.g., 1, 2, 3, or 4, to form a desired number of joints 1, 2, 3, or 4 in a single step. The heat sealing machinery can include upper, or lower, or both upper and lower sealing heads to seal a joint area.

Once the FIBC has been through this step, which can be completed in about just 2.5 minutes, the bag can go through a second step to add lifting loops and/or a cover to the bottom to keep the discharge spout relatively clean of debris. This step can also take just about 2.5 minutes.

Lastly the bag can be folded, compressed and packaged on a shipping pallet. Then the bag is ready to be shipped to the end user who will fill the bags with product.

Because prior art sewn bulk bags are constructed with hand-sewn seams, which require a large amount of labor the majority of bags are being sourced out of Southeast Asian or other low cost labor markets. Because bags are manufactured in such a geographical position, most manufacturers around the world have an average delivery time from order to receipt of over 90 days. Along with these supply chain dynamics come issues in bag performance, contamination, and manufacturing defects. In this regard, the heat sealed bag and method of the present invention represents a significant step-change in bulk bag performance and manufacturing.

Advantages of the heat sealed bulk bag design and automated sealing process of the present invention are numerous.

As the new bag manufacturing uses heat-sealed seams in accordance with principles herein, this construction method can reduce production labor needs by around 70%.

The heat sealing solution as described in one or more embodiments herein does not have any needle holes and is nearly air tight, which results in the most sift proof bag in the market. Loss of bag contents by sifting through the sewing holes is one of the biggest issues in the FIBC industry, and huge efforts have been made to try to create sift-proof seams.

Additionally, with hand-sewn FIBC bulk bags, there is a minimum of 14 starts and stops with the sewing machine. Each sewn seam has two individual threads. Each time the machine stops and starts in a new seam, there are 4 thread end cut that need to be controlled. This is a minimum of about 56 opportunities for loose threads to be left inside the sewn bag. A single loose thread left within the bag can be cause for the entire contents of the bag to be labeled unusable. This often results in the rejection of an average of 2,204 pounds (999.7 kilograms) of good product that is lost to the supplier.

Faced with such losses of product, manufacturers who use FIBCs, often have polyethylene liners installed to keep the bag contents clean and secure.

Another issue resolved by one or more embodiments of the present invention is the prevention of sifting of product through the stitching holes all along every seam that the sewing method always produces. If the product contained within the bag is a hard to contain product such as carbon black, both of which can easily sift through the needle holes then a liner is needed in this situation as well. However, with the heat sealed FIBC bulk bag, the need for a bag liner is eliminated entirely. By eliminating this liner, and also eliminating the needle holes and thread and reliance on human sewing labor, the heat sealed bulk bag represents the cleanest and most sustainable known bulk bag.

Another concern in the prior art bags and method was the possibility of mishandling the FIBC in a manner that causes breakage. The most common catastrophic manner of failure is from picking up a bag that has fallen over in an incorrect manner. Sometimes forklift operators try to pick up a fallen bag that is lying on its side by lifting it with a single loop. This often causes the entire side of the bag so split open exposing the contents to the area around it. This causes the loss of the product due to potential contamination. Also, if the product was hazardous, this can cause a Hazmat event. This failure is inherent to the design of the bags. The prior art lift loops are sewn directly to the bag's containment wall itself. So, a lift loop failure naturally becomes a bag failure.

In embodiments of the present invention, a lift loop patch is heat sealed to bag. If the lift loop patch bond breaks, the lift loop patch will peel away from the bag fabric, but the bag fabric will not itself tear and bag contents will remain within the bag.

A bulk bag with heat fused joints of the present invention generally operates in the same fashion as currently sewn FIBCs so there will not be a learning curve for the end users nor the bag fillers.

Some features of a heat sealed bag design of the present invention are enabled by the heat sealing system.

In a prior art sewn bag, the discharge spout is often protected by a circular drawstring cover on the bottom of the bag. In order to access the discharge spout, this cover needs to be opened. This drawstring has the entire weight of the product within the bag against the knot that is holding the cover closed. Very often, the weight on this knot makes it very difficult to open. The operator is often found standing under the bag yanking on this knot. This is unsafe for the operator to do, but the operator's only other option is to bring out a knife to cut the tie cord and that is often not allowed in food grade factories. One or more embodiments of a heat sealed bag of the present invention eliminate this knot in favor of a piece of fabric covering the discharge tube and sealed to the outer edge of the bag in a manner that is easy to peel off the bag. With this improvement, the operator never has to reach or stand under the bag to undo the discharge spout cover.

Further, without a liner, the heat sealed FIBC can go directly to recycling versus having to separate a polyethylene liner from a polypropylene bag as is required in the prior art.

The production of a heat sealed bag in various embodiments of the present invention can also be enhanced by computerized controls. An operator in some cases can require a single day or less of training on the method of production of heat sealed bags.

To enable the heat sealed bulk bag construction, significant advances on the automation of bulk bag manufacturing, defect elimination, and more strict specifications have been made through testing. In the production of a heat sealed FIBC bulk bag, preferably all joints are made with a bonding coating heat sealing system that includes a bonding coating that is a propylene plastomer and elastomer, (e.g., VERSIFY™ 3000) on at least one piece of fabric to be joined. Also, significant advances have been made in the bag tolerance specifications by eliminating the human error in sewing, which can vary by 1" (2.54 cm) or more. Due to the use of high accuracy cutting and sealing machines in the production stage, these bags can be accurate to within about ¼ inch or ⅛ inch (0.64 cm or 0.32 cm) in every aspect. As such, the heat sealed FIBC bulk bags stand straighter, which results in less prone to tilting and increases user safety. This increase in precision not only improves safety but also increases ease of use in automated filling and emptying of contents.

Importantly, advances in heat sealed bag construction of the present invention enable the production to be local to the consumer, instead of all being sourced from a few select countries. This has an impact on lead times, which are, through the embodiments of the present invention, now can be only 30 days as opposed to 100 days for sewn bags from SE Asia. As a result, stock inventories can be greatly reduced. This saves time and money on logistics and supply chain costs for the entire industry.

In various embodiments, a heat sealed bag can be built in two dimensional (2D).

In various embodiments a heat sealed bag is made in a gusseted, pressed, and substantially flat condition. Folding it for packing and shipping will be much easier and possibly automatable.

In the prior art every FIBC bag is currently handmade and has many inconsistencies. At AmeriGlobe, LLC a standard tolerance for sewn bulk bag height is about 1 inch (2.54 cm). For spout diameters it is about one half (½) inch (1.27 cm). Fabric cuts have a tolerance of about one half (½) inch (1.27 cm). The sewing process often gathers one side of each seam a little more than the other side. This can cause wrinkling and height variations. It also creates undependable seam strength variances as one side of the seam can be literally longer than the other side. If the sewing machine skips a stitch, the seam itself opens up under product pressure and creates losses. Sewing lines are not perfectly straight and vertical. This also causes uneven pressures along the seams and causes early seam breakage at the narrowest points. A heat sealed bag of the present invention, however, can be operated on the basis of zero defects. Machines will preferably have only about ½ inch (0.64 cm) tolerances.

Additionally, cleanliness concerns include the machine oils and human bacteria left behind by the sewing process. These cannot be avoided because the machine must go inside the bag and a human must operate it in the prior art. In embodiments of heat seal machinery of the present invention, a multi-use table can be used that can make straight welds, e.g., transversely extending welds, for attaching the 5 main pieces of the bag together, and a large patch welder for attaching lift loops.

In various embodiments, a bulk bag of the present invention can be made with zero human or machine touch on the inside of a bag.

In various embodiments, a method of construction of heat sealed bags uses less materials than prior art bag construction, e.g., prior art sewn bag construction.

In various embodiments, a first major step in the production line is that the top spout, the top sheet, the body of the bag, the bottom sheet and the bottom spout can all be fused together in a single production step that can take about 20 to 25 seconds of machine time to accomplish.

In various embodiments of the method, and of the heat sealed bag, an operator is able to control the sealing surfaces to allow sealing 8 layers in a single stroke into 4 sealed pairs of fabric layers. This single step produces a heat sealed bag.

In various embodiments, a complete bulk bag can be formed in a single step in a single machine with 4 heat sealing bars, or 4 pairs of upper and lower heat sealing bars, to seal 4 bag joints simultaneously.

In various embodiments, a complete bulk bag can be formed in a single step in a single machine with 2 heat sealing bars, or 2 pairs of upper and lower heat sealing bars, to seal 2 bag joints simultaneously In various embodiments, a complete bulk bag can be formed in a single step in a single machine with 1 heat sealing bar, or 1 pair of upper and lower heat sealing bars, to seal 1 bag joint.

In embodiments of a bulk bag without a fill spout or without a discharge tube, a polypropylene bag can be fabricated in a machine that includes two sealing bars or two pairs of upper and lower sealing bars to form a bag joint between the bag body portion and the top and bottom portions.

In some embodiments, a single heat sealing bar or a single pair of heat sealing bars can be utilized to form a bag with a bag body portion and a bottom.

In some embodiments, two sealing bars or two pairs of upper and lower sealing bars can be used to form a bag with a joint connecting a body portion and a bottom, and a joint connecting a discharge tube and the bottom.

In some embodiments, three sealing bars, or three pairs of upper and lower sealing bars can be used to form a joint between a top and a body portion, a bottom and a body portion, and a bottom and discharge tube portion.

The present invention is an interruptive technology in an industry that has been basically unchanged in 40 years or more. At a 7% annual growth rate the need for manual operators will double in 8 years. Many current factory owners whose current population is 5,000 to 10,000 employees, are having a difficult time today finding enough labor to fill their factories and meet their production schedules.

Further the prior art handmade constructions do not lend themselves to forward automation due to the variances caused by the hand making process.

The methods of the present invention designed for production make this container safer to use.

The methods of operation of the present invention makes this container more environmentally friendly by using less plastic and making it easier to recycle through elimination of the liner. Further because the bag can be made locally to the end user, it will reduce the environmental damage caused by long distance transportation needed to get everything from southeast Asia, for example.

The methods of production in one or more embodiments are also friendlier for the employees. It is physically less demanding and requires little education or training.

Given the level of automation of the present invention, it can help standardize sizing in the industry. This will help improve the efficiencies of every manufacturing plant from the production of the raw materials to the finished bag.

Advantages of heat-sealed bags in accordance with one or more embodiments herein include:

1. Faster and Cleaner—bag construction is an automated process;

2. Lighter and Stronger—the seal strength is stronger and the bag is lighter; and/or 3. Easier Handling—eliminates the need for liners.

In various embodiments, an extrusion coating is used as a bonding coating that is a polyolefin and allows for a heat sealed seam.

In various embodiments heat sealing is automated, precise and contamination free whereas sewing in the prior art is labor intensive and includes a high risk of contamination.

In various embodiments a bag can be manufactured via heat sealing and folded for transport or storage in around 6 minutes, whereas prior art sewing of a bag typically takes 20 minutes or more.

In various embodiments a heat sealed joint retains about 95 percent or more of the fabric strength whereas a prior art sewn seam retains about 63 percent of the fabric strength.

In various embodiments a heat sealed joint retains about 95 percent of the fabric strength which enables less use of fabric in the overall bag.

In various embodiments a heat sealed bag is designed for functionality and no liner enables easy opening and discharge of contents. Prior art sewn bags have complex and difficult spouts.

In various embodiments filled heat sealed bags can be stacked on each other.

In various embodiments, different fabrics can be used for different parts of a bag, e.g., fabrics of differing densities or thicknesses or strengths. For example, a bottom portion can be made from a stronger polypropylene fabric than a top portion. A diaper cover or lift loop panel or body portion or fill spout or discharge tube or top or bottom could all be made of the same fabric or of differing fabrics. In various embodiments one or more fabric portions can be selected from the same material, while one or more other fabric portions can be selected from a different material.

In various embodiments fabrics for each bag portion can be chosen so that some bag portions will have the desired maximum strength, while selecting more cost effective fabrics for other bag portions where less strength is needed.

In various embodiments, one or more of the heat sealing machinery, heat sealing systems, heat sealing assembly line and methods described herein can be used to heat seal polypropylene fabric, e.g., highly oriented polypropylene fabric, to form a bag or container.

In various embodiments, one or more of the heat sealing machinery, heat sealing systems, heat sealing assembly line and methods described herein can be used to heat seal polypropylene fabric, e.g., highly oriented polypropylene fabric.

In various embodiments, one or more of the heat sealing machinery, heat sealing systems, heat sealing assembly line and methods described herein can be used to heat seal polyethylene fabric, e.g., highly oriented polyethylene fabric, to form a bag or container.

In various embodiments, one or more of the heat sealing machinery, heat sealing systems, heat sealing assembly line and methods described herein can be used to heat seal polyethylene fabric.

In various embodiments, one or more of the heat sealing machinery, heat sealing systems, heat sealing assembly line and methods described herein can be used to heat seal polyethylene fabric, to form a bag or container.

In various embodiments, one or more of the heat sealing machinery, heat sealing systems, heat sealing assembly lines and methods described herein can be used to heat seal plastic fabric to form a bag or container.

In various embodiments, one or more of the heat sealing machinery, heat sealing systems, heat sealing assembly lines and methods described herein can be used to heat seal plastic fabric.

In one or more embodiments of making a heat sealed bag, at times a bonding coating will be in contact with a bonding coating in gusseted areas in locations where it is not desired to form a joint. In embodiments wherein a standard fabric coating is on one fabric piece and a bonding coating is on another fabric piece, the overlapping to form the joint area can be done so as to minimize unwanted bonds and to make a bag easier to assemble and heat seal. The overlapping to form the joint area can be done on a standard coating side to help prevent destroying or damaging the bag during heat sealing.

During heat sealing, escaping heat from sealing heads sometimes influences neighboring coatings. Generally, it is desirable to have the overflow of heat to go to a standard coating side. The grip of the standard polypropylene fabric coating to the polypropylene fabric, for example, is very strong, while the grip of a standard polypropylene coating to a standard polypropylene coating is not strong. When separating any bond formed between standard coatings, a bag is not destroyed because the standard coating is not broken off, or pulled from, the fabric. When a bonding coating is bonded to another bonding coating, the bond is so strong that when breaking the bond, the bonding coating pulls away from the bag fabric, damages the fabric, and the bag generally is rejected.

When heat sealing, the interfaces between standard and standard coatings, bonding and standard coatings, and bonding and bonding coatings, needs to be considered. The interface between standard coating to standard coating has less grip, whereas the interface of standard coating to bonding coating, and of bonding coating to bonding coating has more grip and is very strong grip.

When heat sealing a joint with one fabric piece having a bonding coating, and one fabric piece having a standard polypropylene fabric laminate coating, at least three different melting points are present in an overlapped area to be heat fused (1) melting point of the fabric, (2) melting point of the bonding coating, and (3) melting point of the standard coating.

A bonding coating as described herein, for example, a bonding coating including VERSIFY™ 3000, has a lower melting point than a polypropylene standard fabric laminate coating. A polypropylene standard fabric laminate coating has a melting point lower than polypropylene fabric.

In one or more embodiments, during heat sealing, a bonding coating is melted, a polypropylene standard laminate coating is not melted, but can be heated to a softening temperature, and the fabric is not heated to a temperature at which it could be melted or weakened or damaged.

In one or more embodiments, during heat sealing, a bonding coating is melted, a polypropylene standard laminate coating is not completely melted, (e.g., only_15_ to 30 percent of the standard laminate coating is melted), and the fabric is not heated to a temperature at which it is melted or weakened or damaged.

VERSIFY™ 3000, which can be used as, or included in a bonding coating, has a melting temperature of around 226 degrees F. (107.8 degrees Celsius), and a softening temperature of around 221 degrees F. (105 degrees Celsius). A standard polypropylene fabric coating, which can include about 70 to 85 percent polypropylene and about 15 to 30 percent polyethylene, has a melting point of about 239 degrees F. (115 degrees Celsius) and a softening point of about 221 degrees F. (105 degrees Celsius). Generally, polypropylene will soften at about 310 degrees Fahrenheit (154 degrees Celsius) and liquefy or melt at about 330 degrees Fahrenheit (165.6 degrees Celsius). Polyethylene typically has a melting point of about 190 degrees Fahrenheit (87.8 degrees Celsius).

Testing has shown that when heat sealing, a joint formed with a fabric piece having a bonding coating with about 70 percent VERSIFY™ 3000, and another fabric piece with a standard polypropylene fabric laminate coating, when the heat seal bars are set to a temperature of around 290 degrees F. (143.3 degrees Celsius), the center of the gusseted layers is reaching a temperature of about 232 to 234 degrees F. (111 to 112 degrees Celsius). Top or bottom areas of the gusseted layers can be about 5 degrees higher, e.g., about 237 to 239 degrees F. (113.9 to 115 degrees Celsius). When this occurs, the bonding coating is melting but the standard polypropylene coating is not melting (or is not completely melting, or is softening) and a bond is formed between the bonding coating and the standard polypropylene fabric coating. The polypropylene fabric is also not damaged or weakened.

In some embodiments, when forming a bag joint, the bonding coating is melting but the standard polypropylene coating is not melting and a bond is formed between the bonding coating and the standard polypropylene fabric coating, and the bond has sufficient strength as a bulk bag joint, e.g., for a bulk bag that can hold 2,000 to 5,000 pounds (907 to 2,268 kilograms) or more of bulk material.

In some embodiments, when forming a bag joint, the bonding coating is melting but the standard polypropylene coating is not completely melting, and a bond is formed between the bonding coating and the standard polypropylene fabric coating, and the bond has sufficient strength as bulk bag joint, e.g., for a bulk bag that can hold 2,000 to 5,000 pounds (907 to 2,268 kilograms) or more of bulk material.

In some embodiments, when forming a bag joint, the bonding coating is melting but the standard polypropylene coating is not melting but is softening and a bond is formed between the bonding coating and the standard polypropylene fabric coating, and the bond has sufficient strength as bulk bag joint, e.g., for a bulk bag that can hold 2,000 to 5,000 pounds (907 to 2,268 kilograms) or more of bulk material.

A bond formed between a standard polypropylene fabric coating and bonding can be in the range of microns.

During experimentation, matrix testing and tensile strength testing has been performed. A selected test temperature is used when heat sealing one or more bag joint areas to form a heat sealed bag. After completing a bag, pressure is applied to the heat sealed bag until one or more joints of the heat sealed bag breaks. If a bag joint breaks after reaching 90 to 95% of the bags tensile strength, this is evidence that the test temperature applied was high enough to form a bag joint that can work as desired for a bulk bag, and low enough to not damage the bag.

In one or more embodiments, the temperature applied during heat sealing is high enough to produce a bond between coatings that has at least 90 to 95% of the bag strength and low enough to not damage or reduce the strength of the bag fabric.

In one or more embodiments, the temperature applied during heat sealing is about 290 degrees F. (143 degrees Celsius) and can be used when heat sealing a bag that will have at least 90 to 95% of the bag strength and low enough to not damage or reduce the strength of the bag fabric.

In one or more embodiments, the temperature applied during heat sealing can be about 225 to 290 degrees F. (107 to 143 degrees Celsius), and can be used when heat sealing a bag that will have at least about 90 to 95% of the bag strength and low enough to not damage or reduce the strength of the bag fabric.

As described herein, preferably the heat seal bar extends past the edge of the joint to be formed which can help ensure nongraspable edges are formed. When sealing a lift loop patch to the bag body, preferably the end of the patch ends about a quarter inch (0.64 cm) before an edge of the heat element. This allows heat to be absorbed by the outer edge of the patch and by the surface of the body. When this occurs, a portion of the coating can bubble out and harden past the edge of the overlapped fabrics and this can add additional strength to the bond.

In some embodiments, a patch coating can have a thickness of 3 to 3.5 mils (0.08 to 0.089 millimeters).

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIGS. 1A-1B display a chart showing comparative data from test results on prior art seams for bulk bag construction using standard sewing seam methods on both weft and warp direction yarns of the fabric;

FIG. 25 is a perspective view of a heat sealed bag discharge tube roll-up in an alternative preferred embodiment of the present invention;

FIG. 25A is a front view of a heat sealed bag discharge tube roll-up in an alternative preferred embodiment of the present invention;

FIG. 25B is a rear view of a heat sealed bag discharge tube roll-up in an alternative preferred embodiment of the present invention;

FIG. 25C is a side view of a heat sealed bag discharge tube roll-up in an alternative preferred embodiment of the present invention;

FIG. 25D is a detail view of FIG. 25C showing a heat sealed bag discharge tube roll-up in an alternative preferred embodiment of the present invention;

FIG. 26 is a perspective view of a heat sealed bag with a bottom cover or diaper in an alternative preferred embodiment of the present invention;

FIG. 26A is a front view of a heat sealed bag with a bottom cover or diaper in an alternative preferred embodiment of the present invention;

FIG. 26B is a rear view of a heat sealed bag with a bottom cover or diaper in an alternative preferred embodiment of the present invention;

FIG. 26C is a side view of a heat sealed bag with a bottom cover or diaper in an alternative preferred embodiment of the present invention;

FIG. 26D is a detail view of FIG. 26C showing a heat sealed bag with a bottom cover or diaper in an alternative preferred embodiment of the present invention;

FIG. 40 is a perspective view of a lift loop cut for use on a heat sealed bag in an alternative preferred embodiment of the present invention;

FIG. 40A is a front view of a lift loop cut for use on a heat sealed bag in an alternative preferred embodiment of the present invention;

FIG. 56 is a perspective view of a table frame sub-assembly of a cover/document pouch impulse heat sealer in accordance with a preferred embodiment of the present invention;

FIG. 56A is a top view of a table frame sub-assembly of a cover/document pouch impulse heat sealer in accordance with a preferred embodiment of the present invention;

FIG. 56B is a front view of a table frame sub-assembly of a cover/document pouch impulse heat sealer in accordance with a preferred embodiment of the present invention;

FIG. 56C is a side view of a table frame sub-assembly of a cover/document pouch impulse heat sealer in accordance with a preferred embodiment of the present invention;

FIG. 56D is a detail view of a table frame sub-assembly of a cover/document pouch impulse heat sealer in accordance with a preferred embodiment of the present invention;

FIG. 63 is a perspective view of a spout/top/bottom/body impulse heat sealer assembly in accordance with a preferred embodiment of the present invention;

FIG. 64 is a perspective view of a table sub-assembly of a spout/top/bottom/body impulse heat sealer in accordance with a preferred embodiment of the present invention;

FIG. 64A is a side view of a table sub-assembly of a spout/top/bottom/body impulse heat sealer in accordance with a preferred embodiment of the present invention;

FIG. 64B is a top view of a table sub-assembly of a spout/top/bottom/body impulse heat sealer in accordance with a preferred embodiment of the present invention;

FIG. 64C is a top view of a table sub-assembly of a spout/top/bottom/body impulse heat sealer in accordance with a preferred embodiment of the present invention;

FIG. 64D is a bottom view of a table sub-assembly of a spout/top/bottom/body impulse heat sealer in accordance with a preferred embodiment of the present invention;

FIG. 65 is a perspective view of a table frame sub-assembly of a spout/top/bottom/body impulse heat sealer in accordance with a preferred embodiment of the present invention;

FIG. 65A is a top view of a table frame sub-assembly of a spout/top/bottom/body impulse heat sealer in accordance with a preferred embodiment of the present invention;

FIG. 65B is a front view of a table frame sub-assembly of a spout/top/bottom/body impulse heat sealer in accordance with a preferred embodiment of the present invention;

FIG. 65C is a side view of a table frame sub-assembly of a spout/top/bottom/body impulse heat sealer in accordance with a preferred embodiment of the present invention;

FIG. 65D is a detail view of a table frame sub-assembly of a spout/top/bottom/body impulse heat sealer in accordance with a preferred embodiment of the present invention;

FIG. 66 is a perspective view of a spout to top/bottom frame sub-assembly of a spout/top/bottom/body impulse heat sealer in accordance with a preferred embodiment of the present invention;

Figure 67:
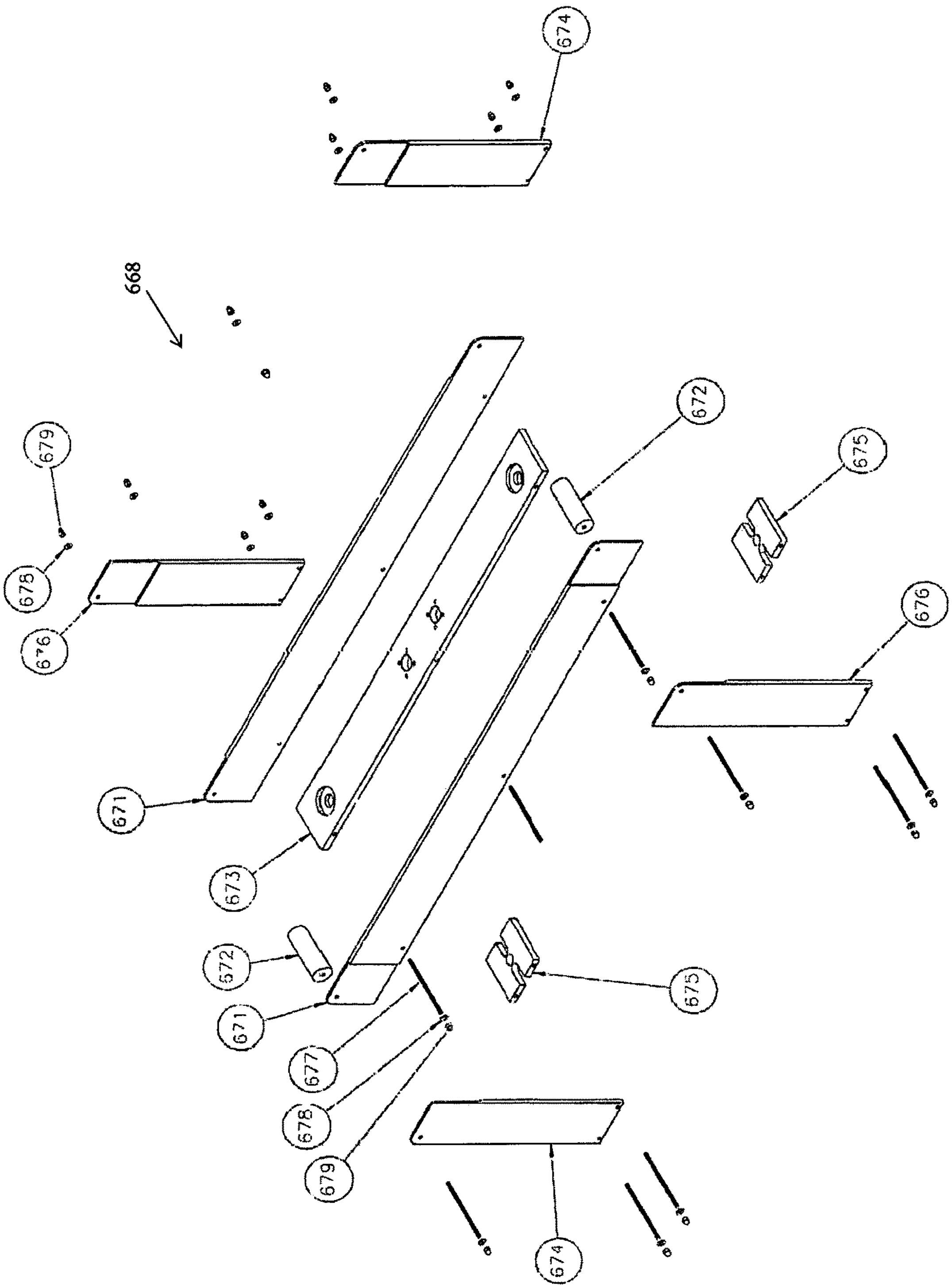
Figure 68:
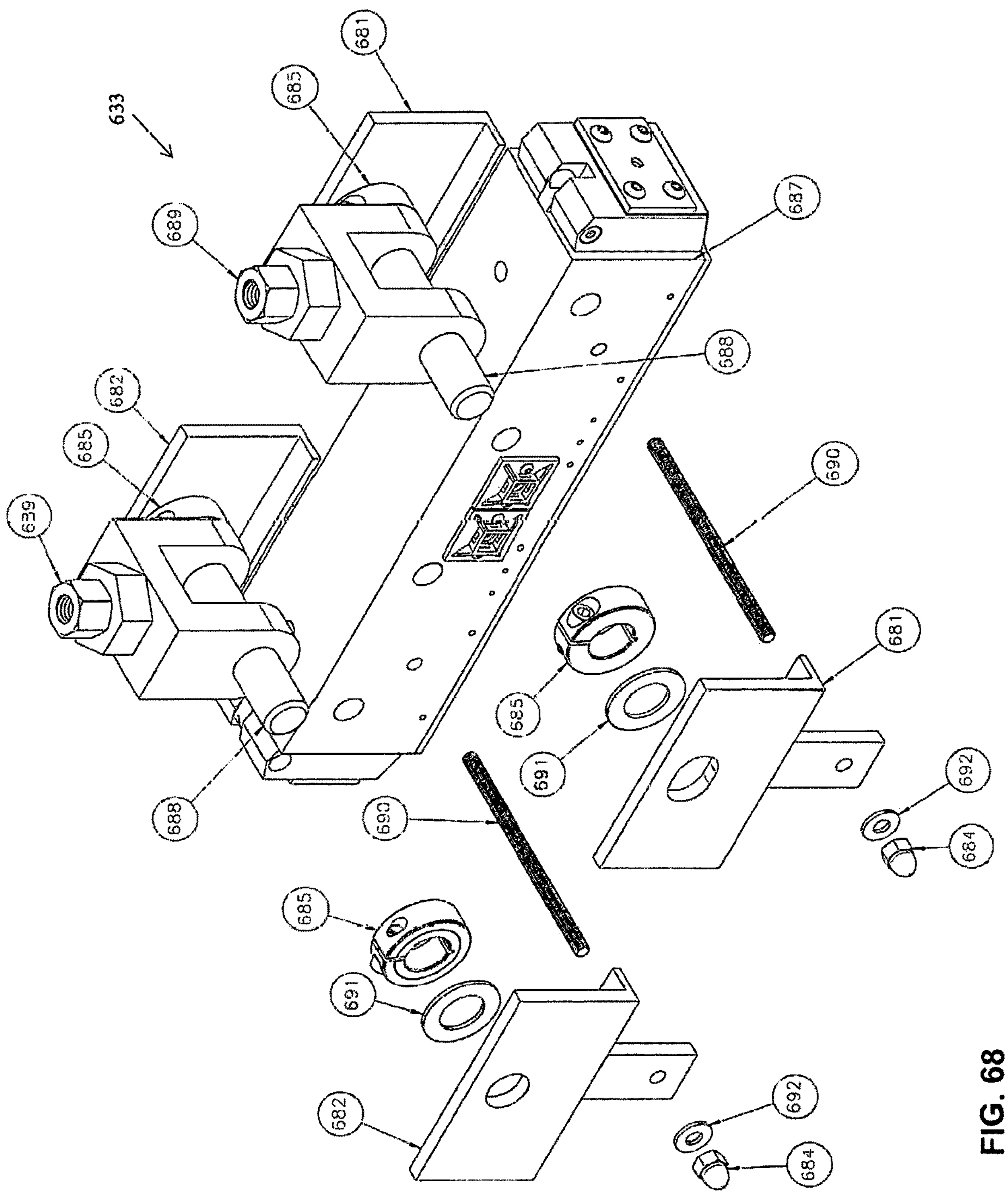
Figure 69:
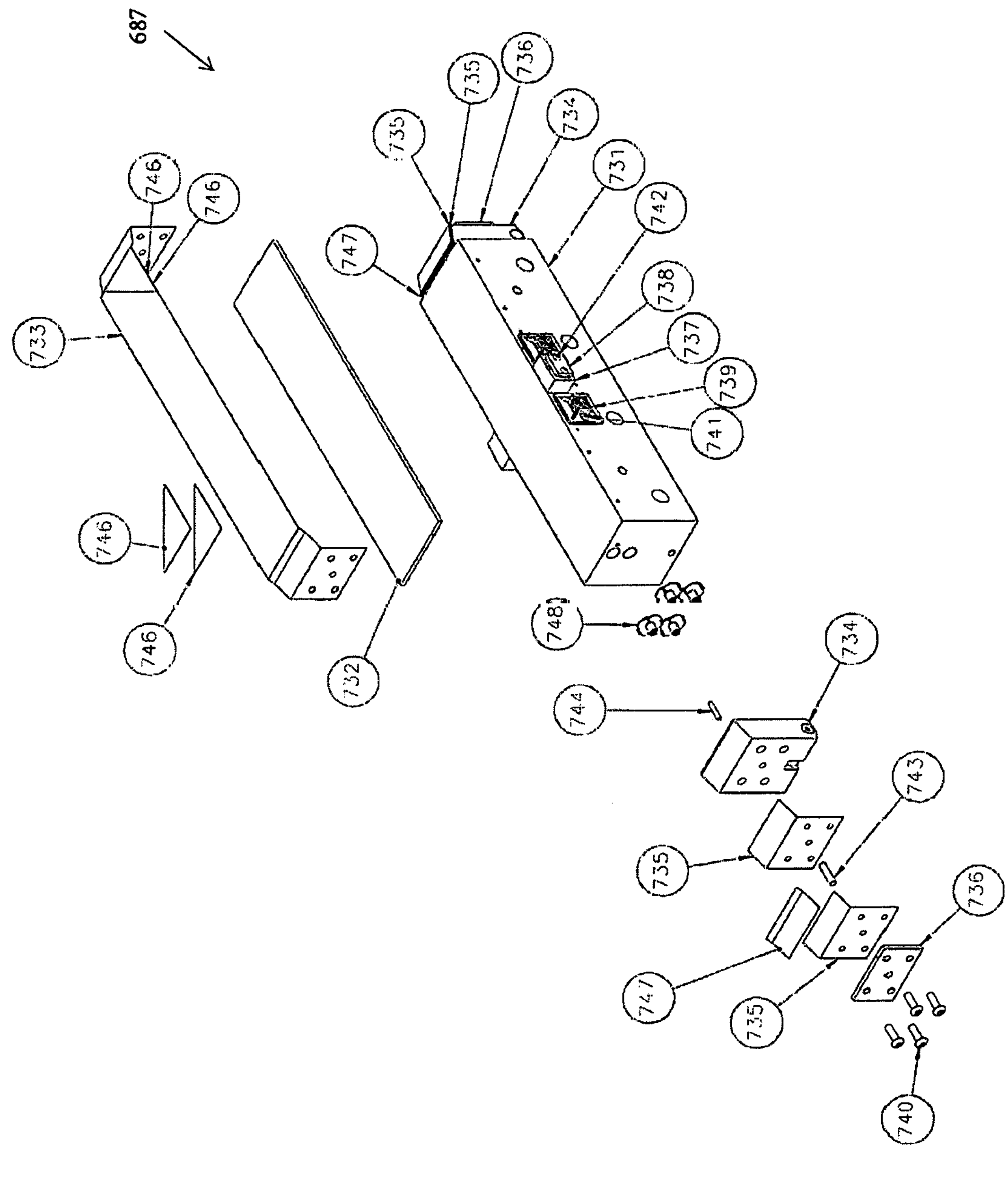
Figure 70:
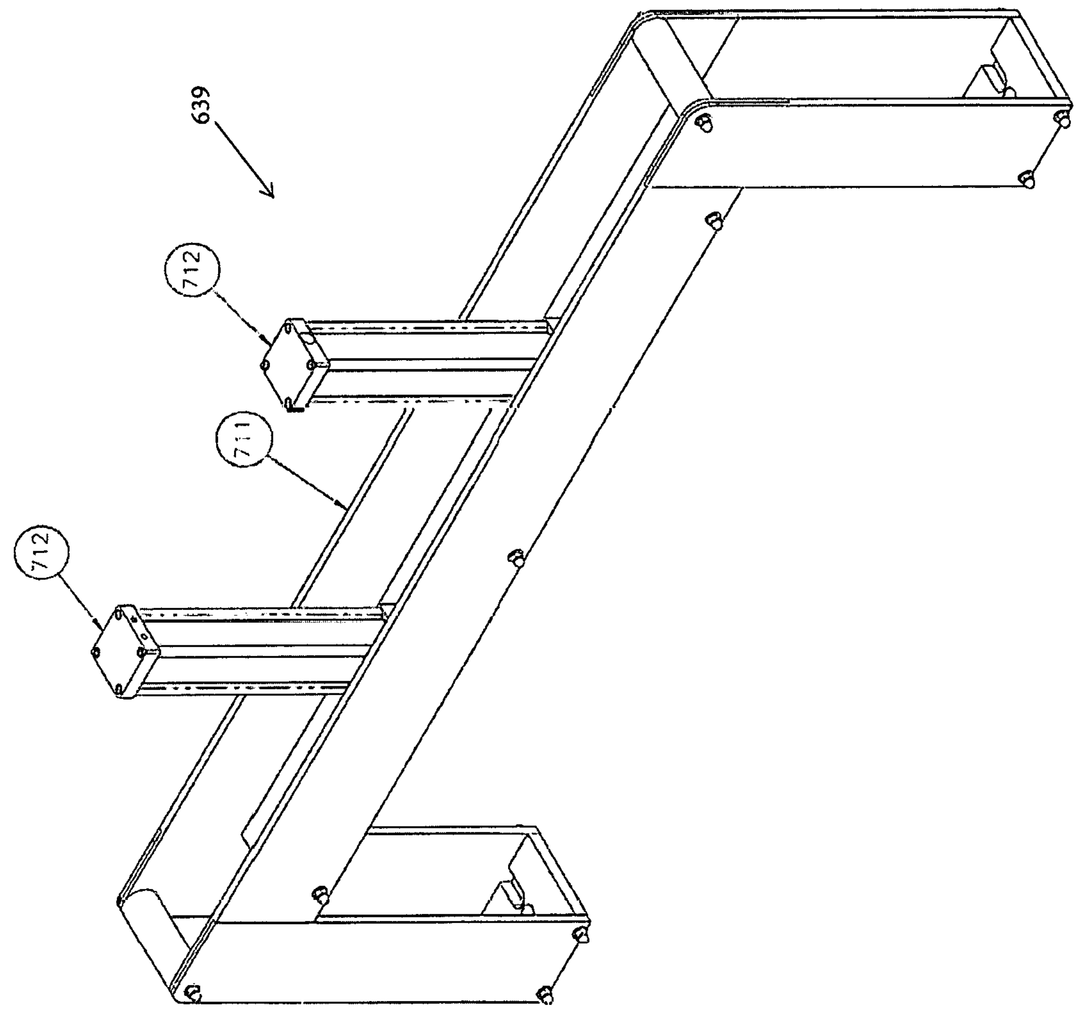
Figure 71:
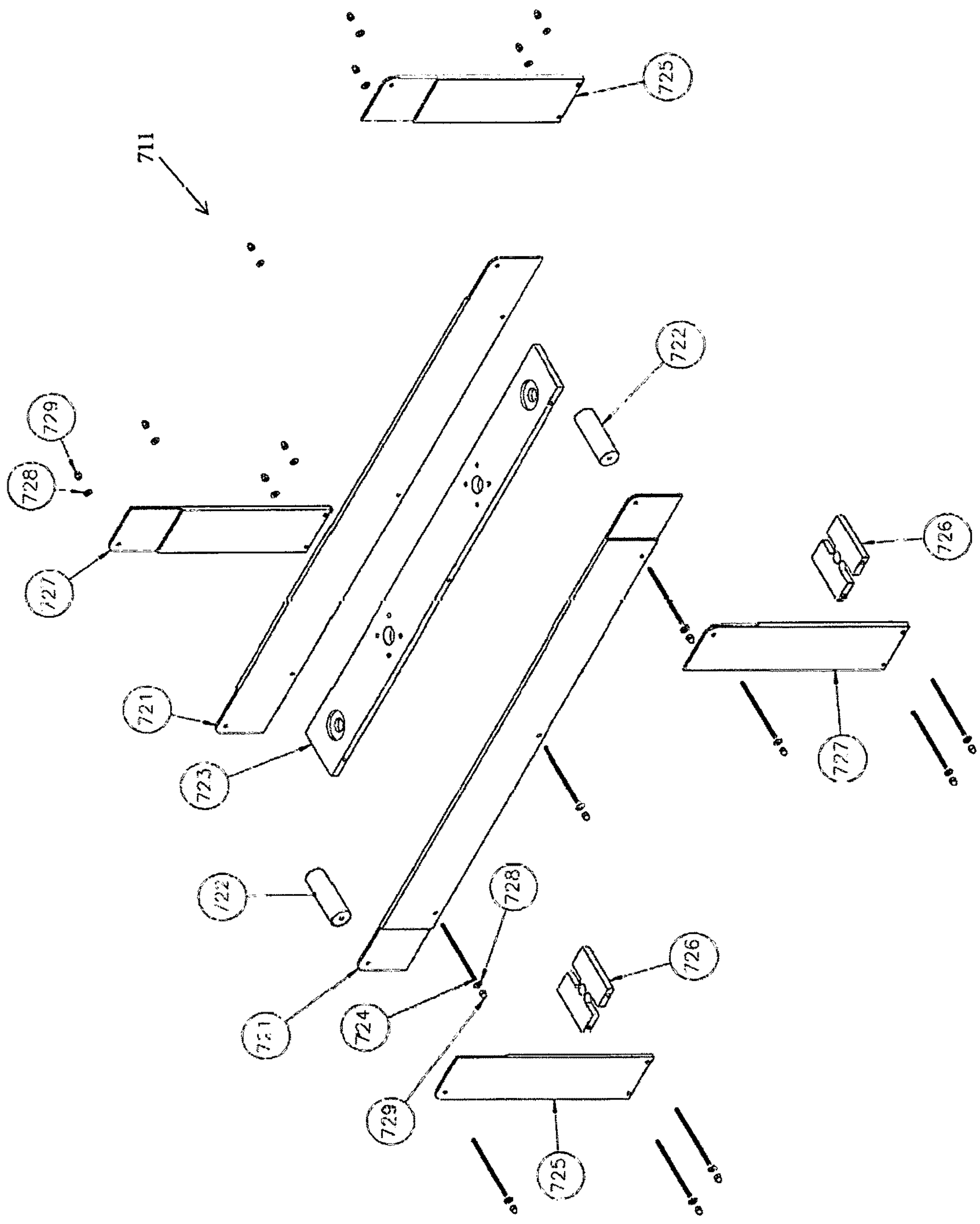
Figure 72:
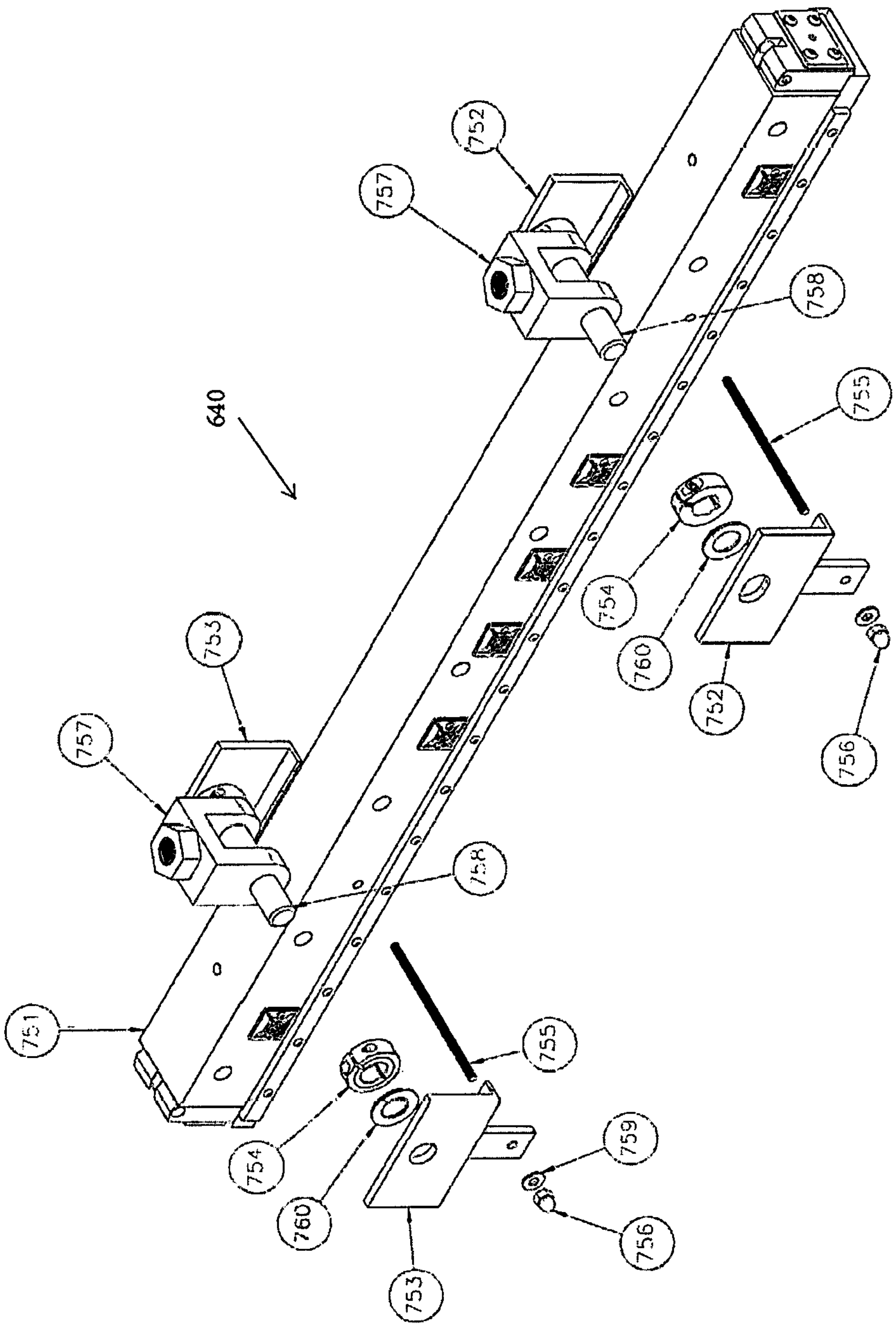
Figure 73:
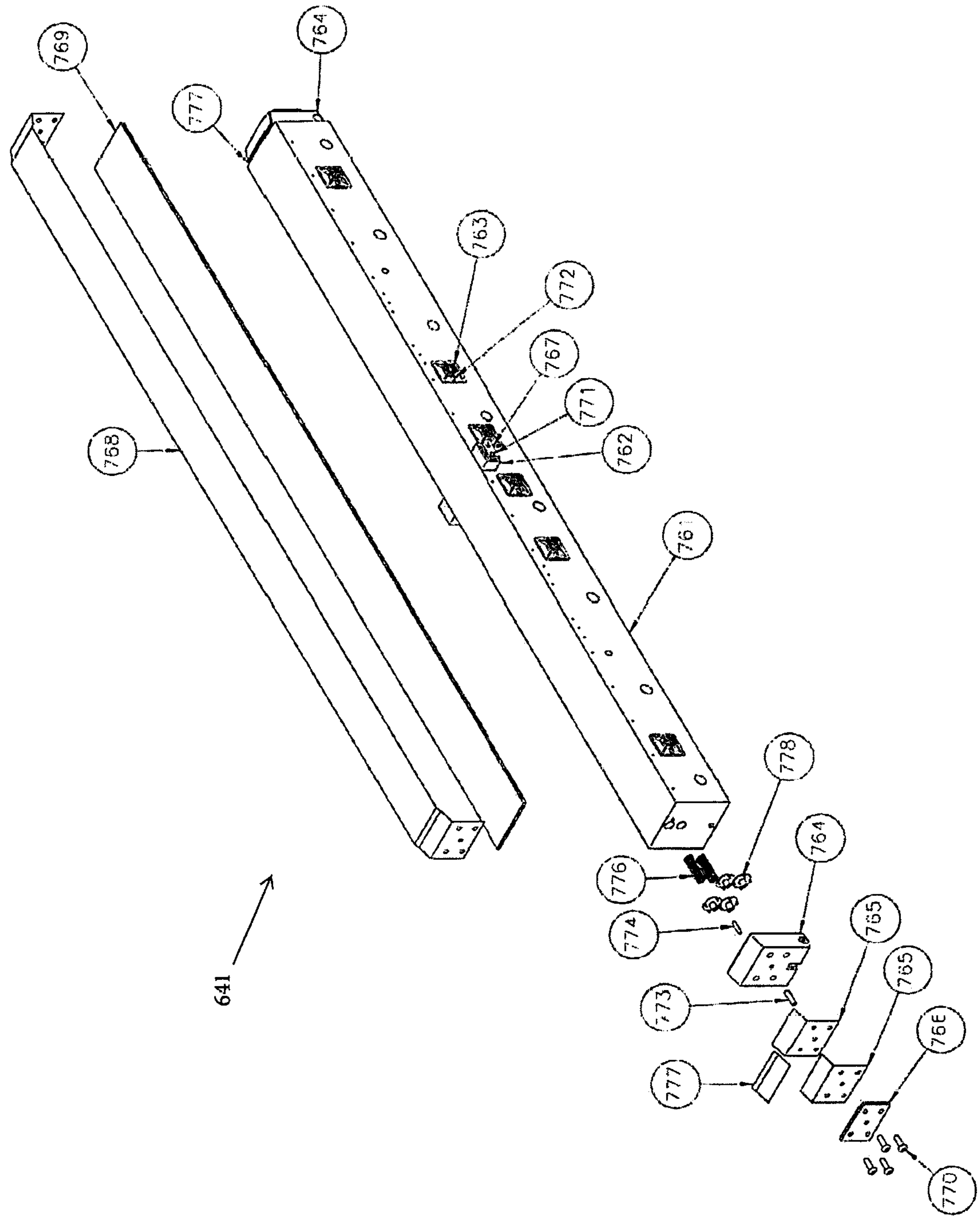
Figure 74:
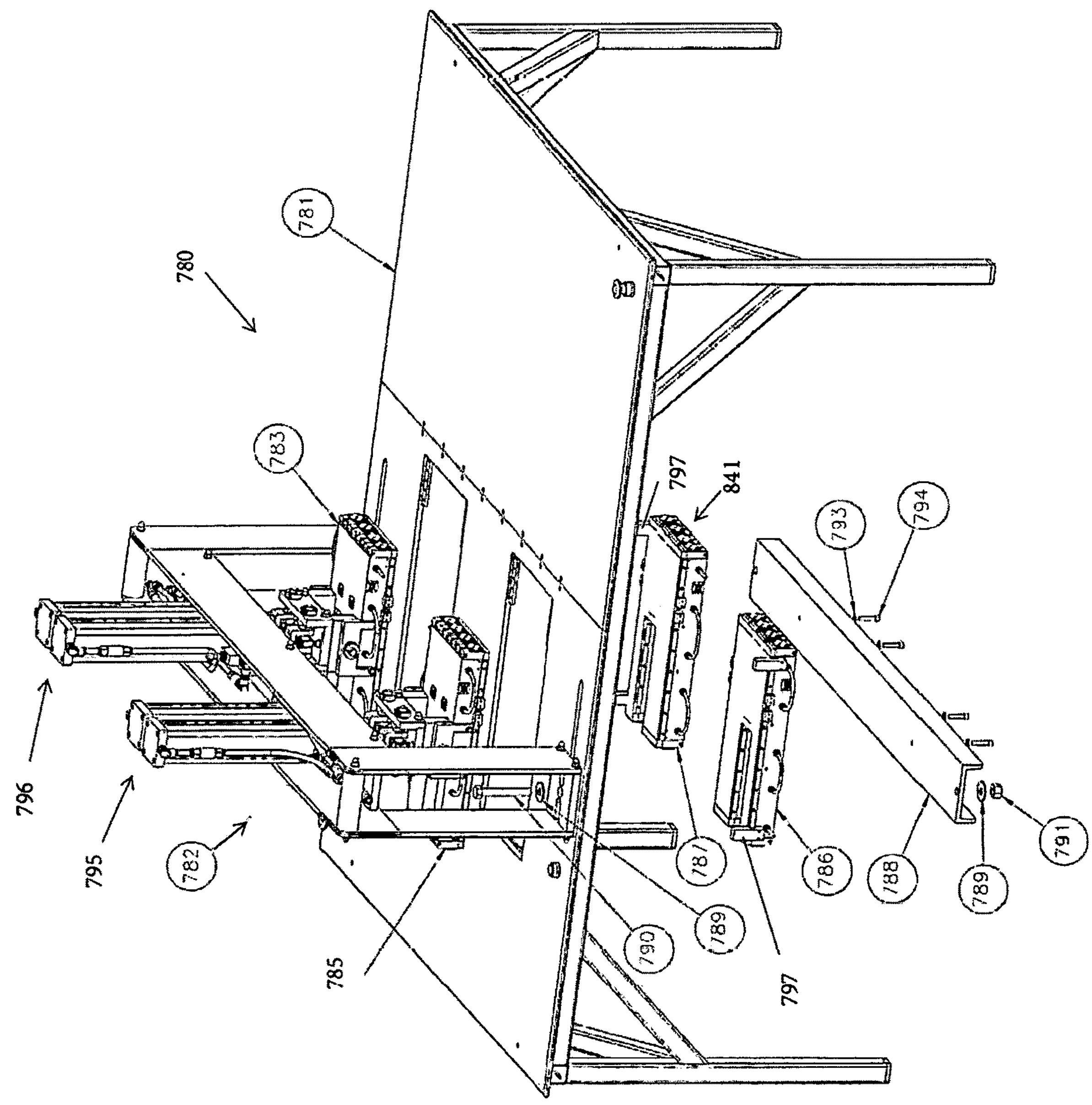
Figure 75:
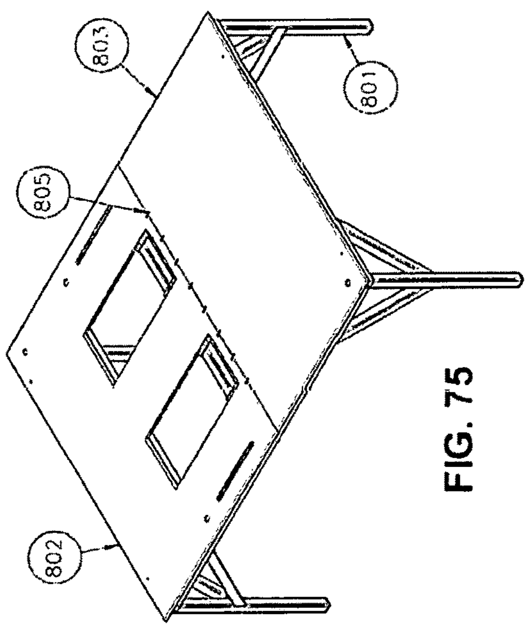
Figure 75B:
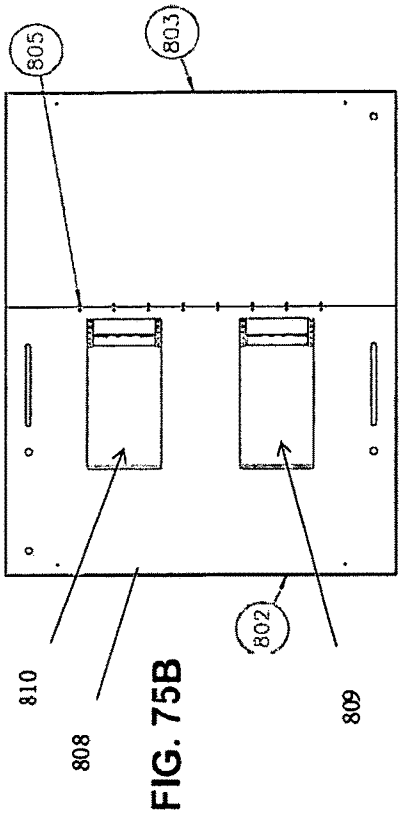
Figure 75C:
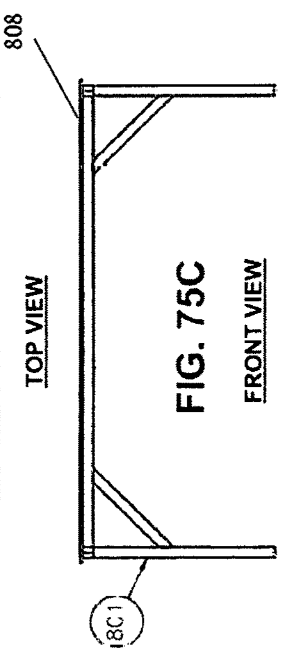
Figure 75A:
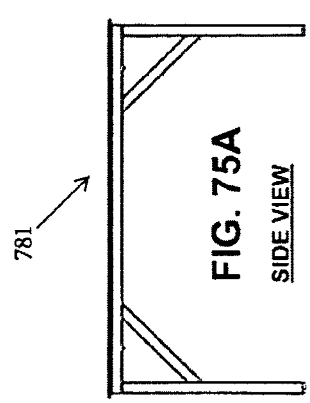
Figure 75D:
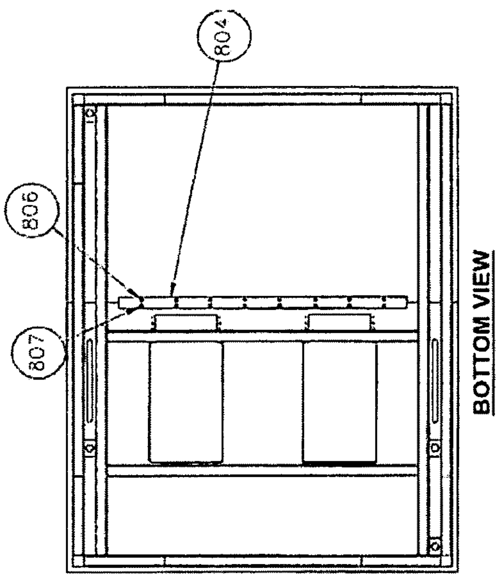
Figure 77:
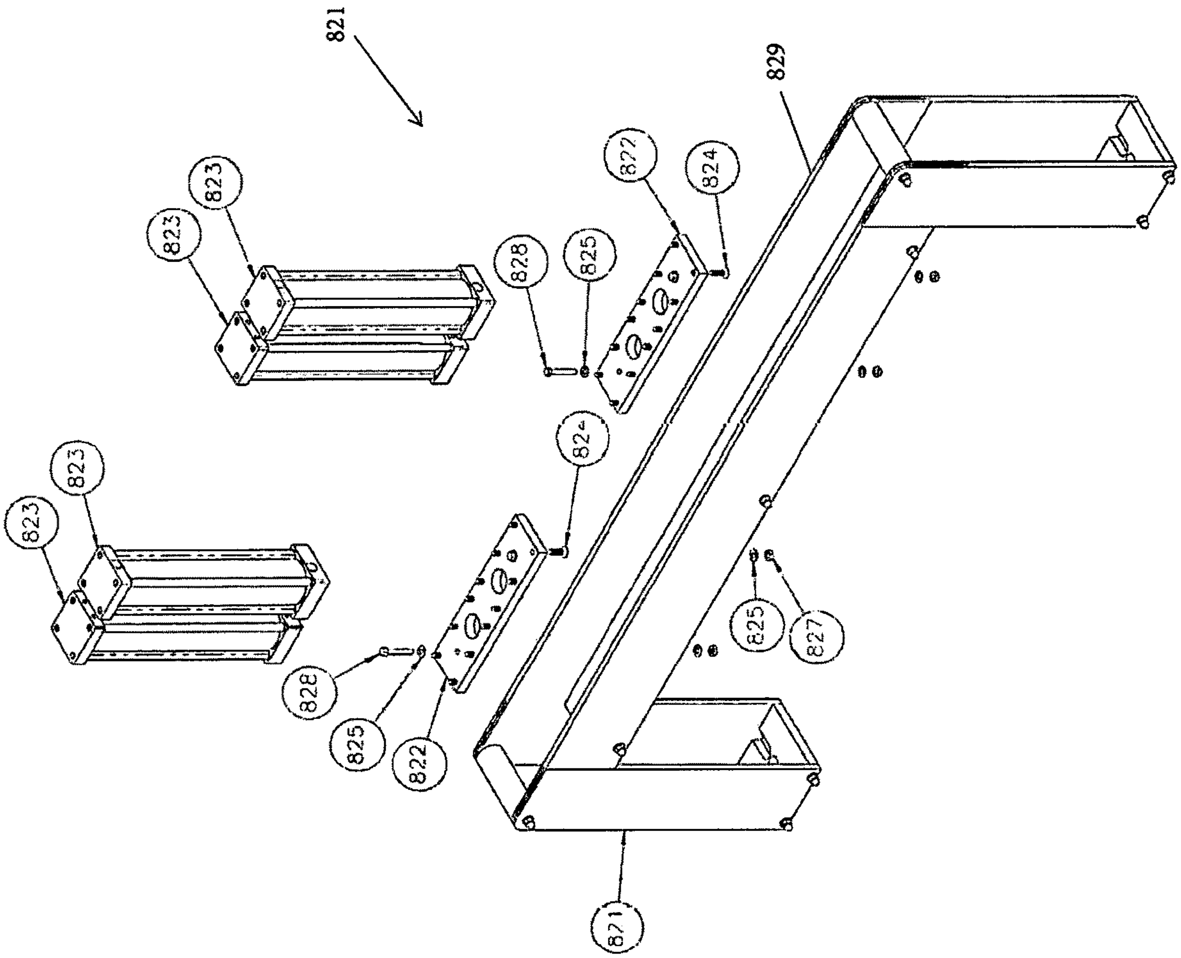
Figure 78:
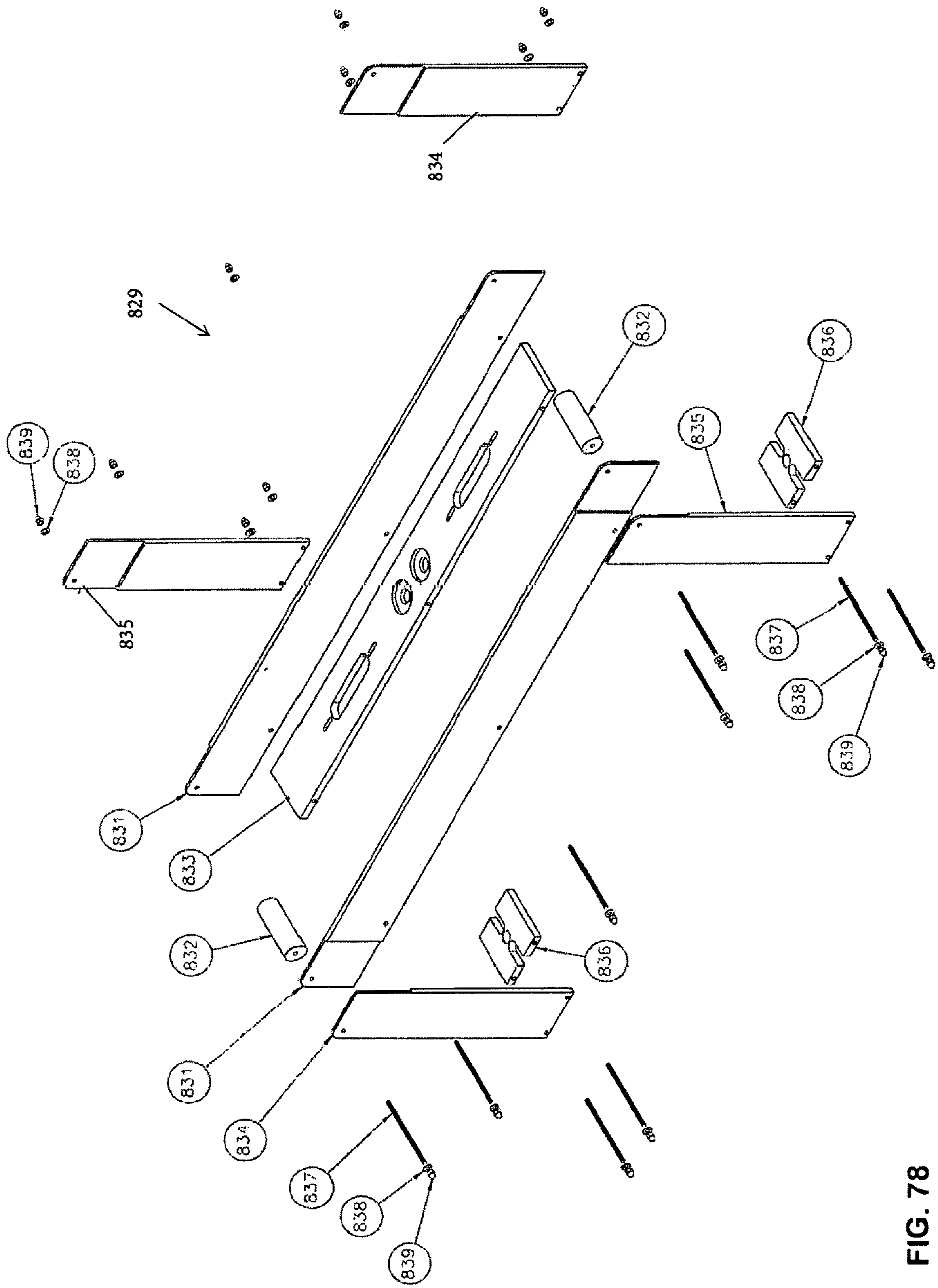
Figure 79:
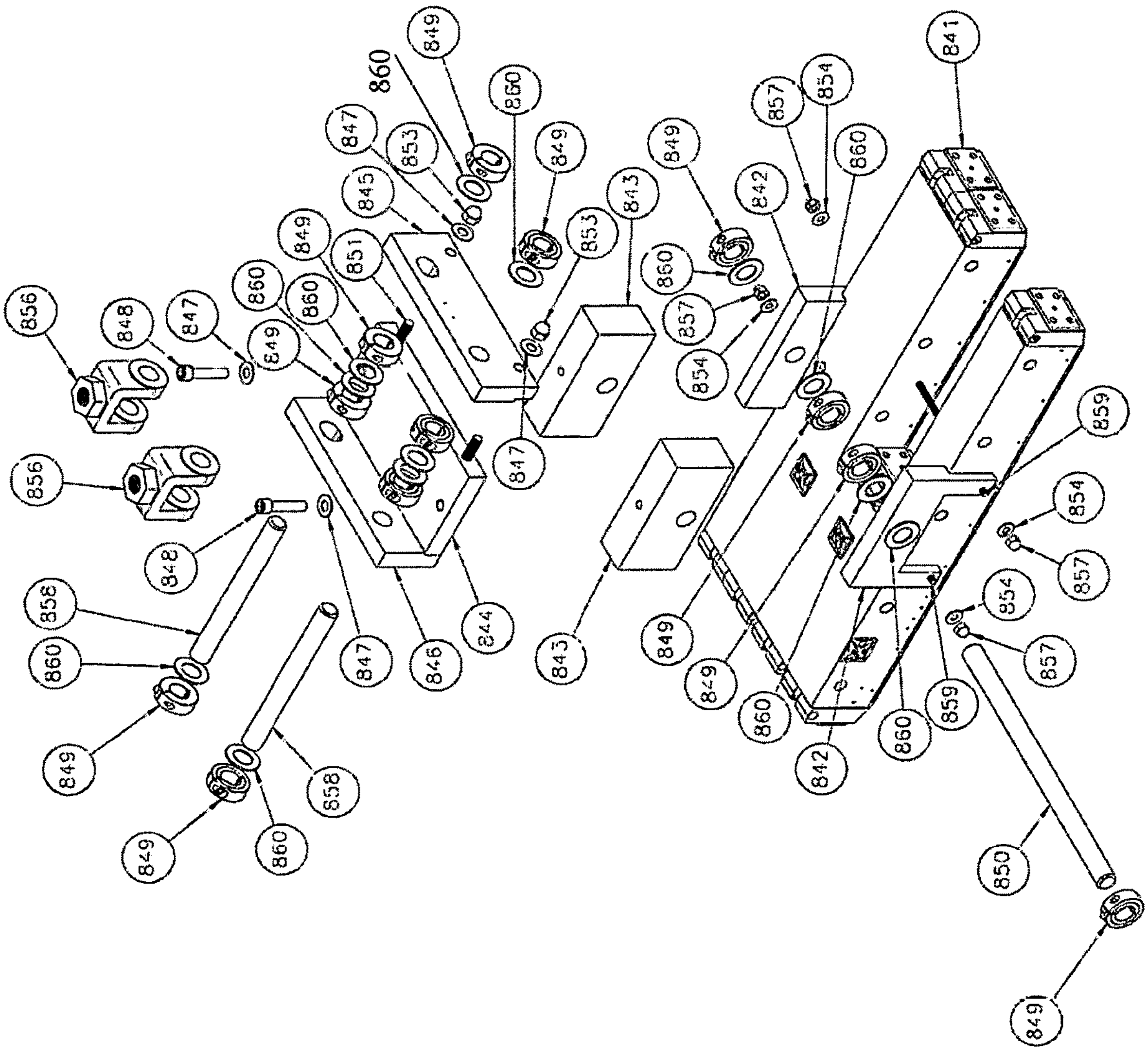
Figure 80:
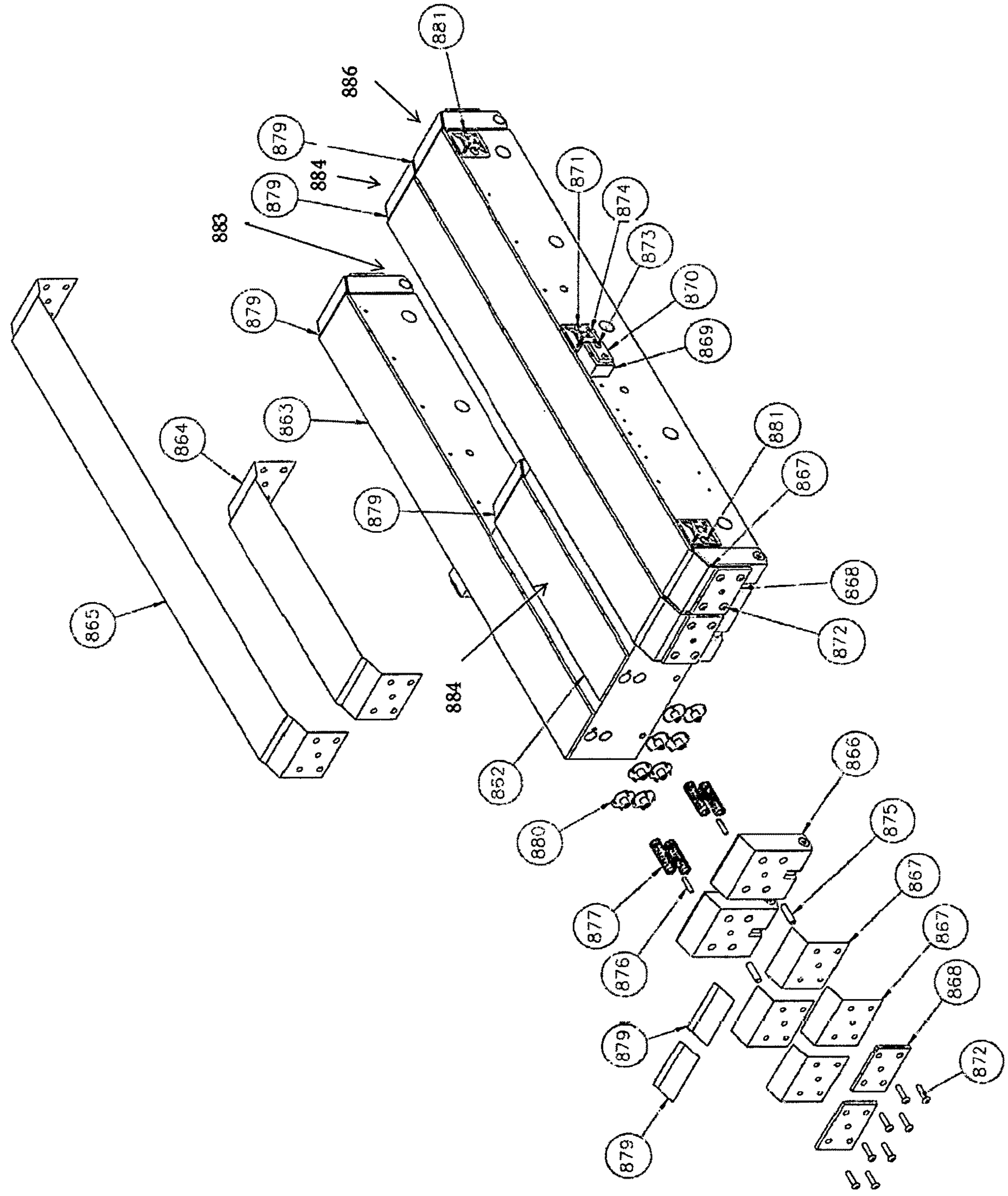
Figure 81:
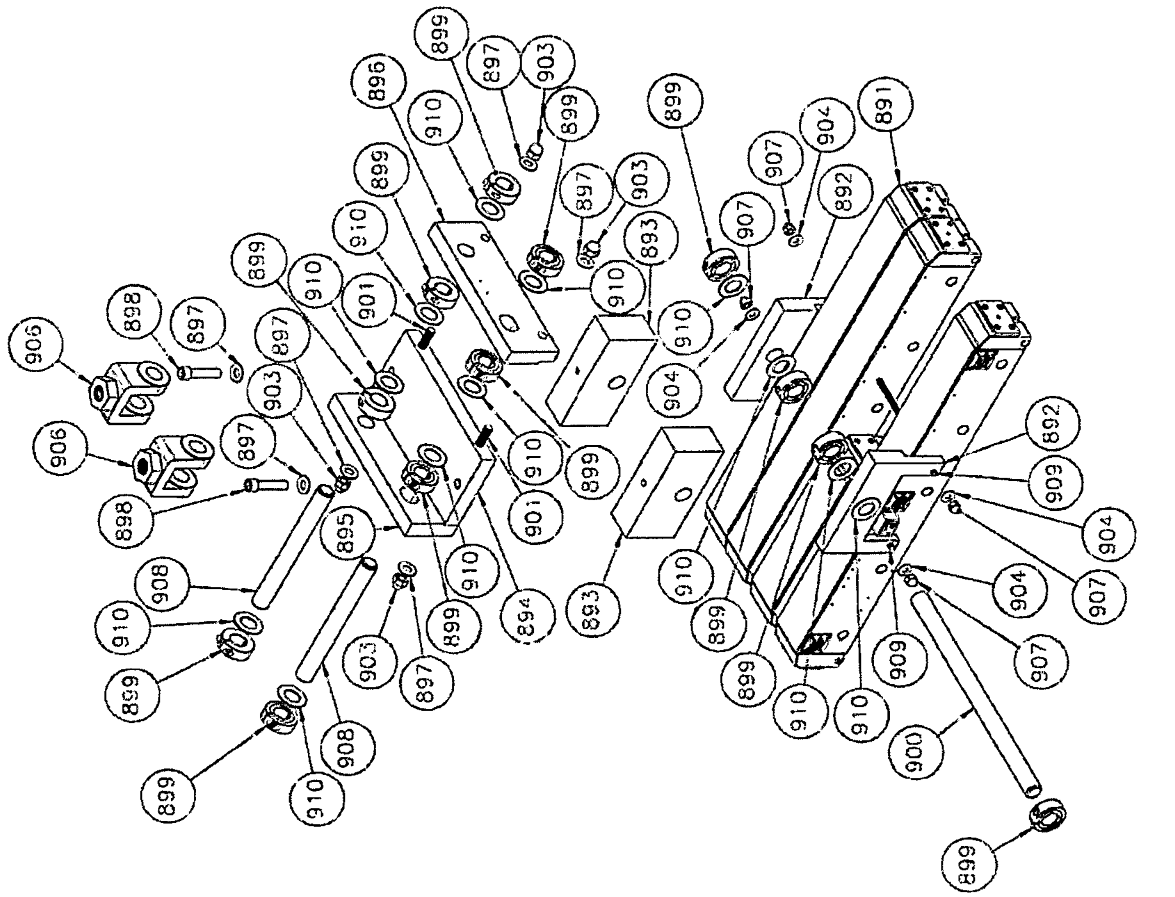
Figure 82:
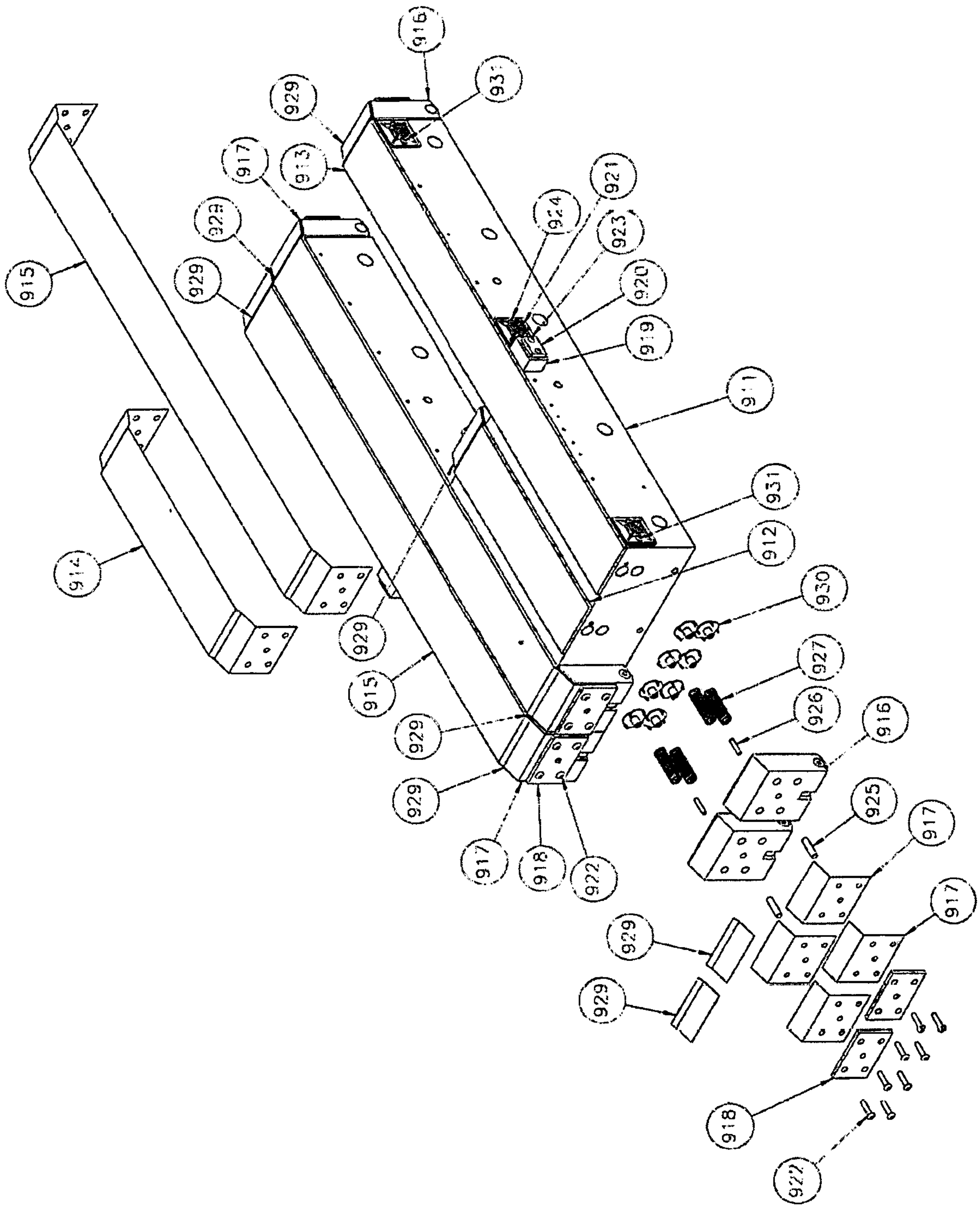
Figure 83:
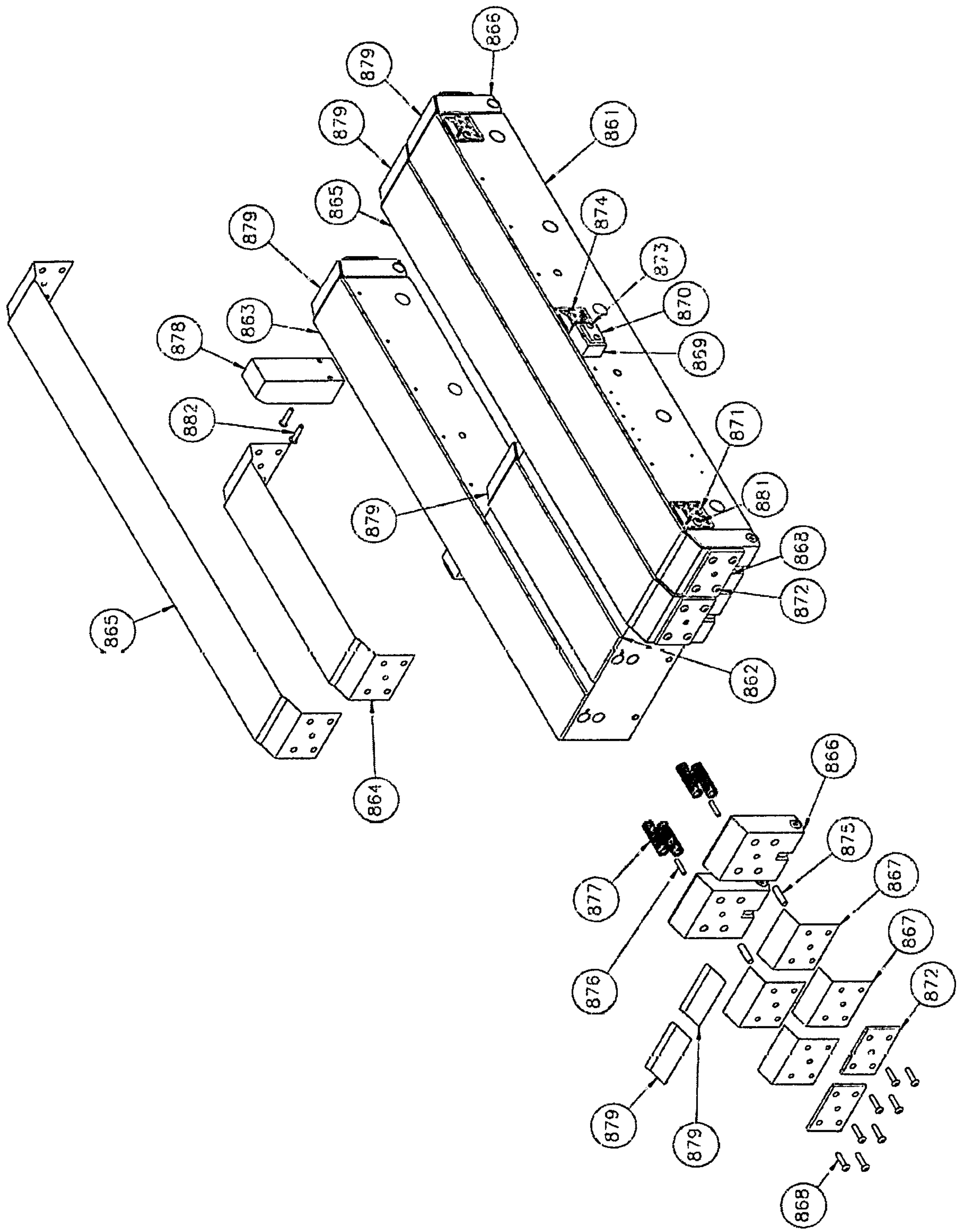
Figure 84:
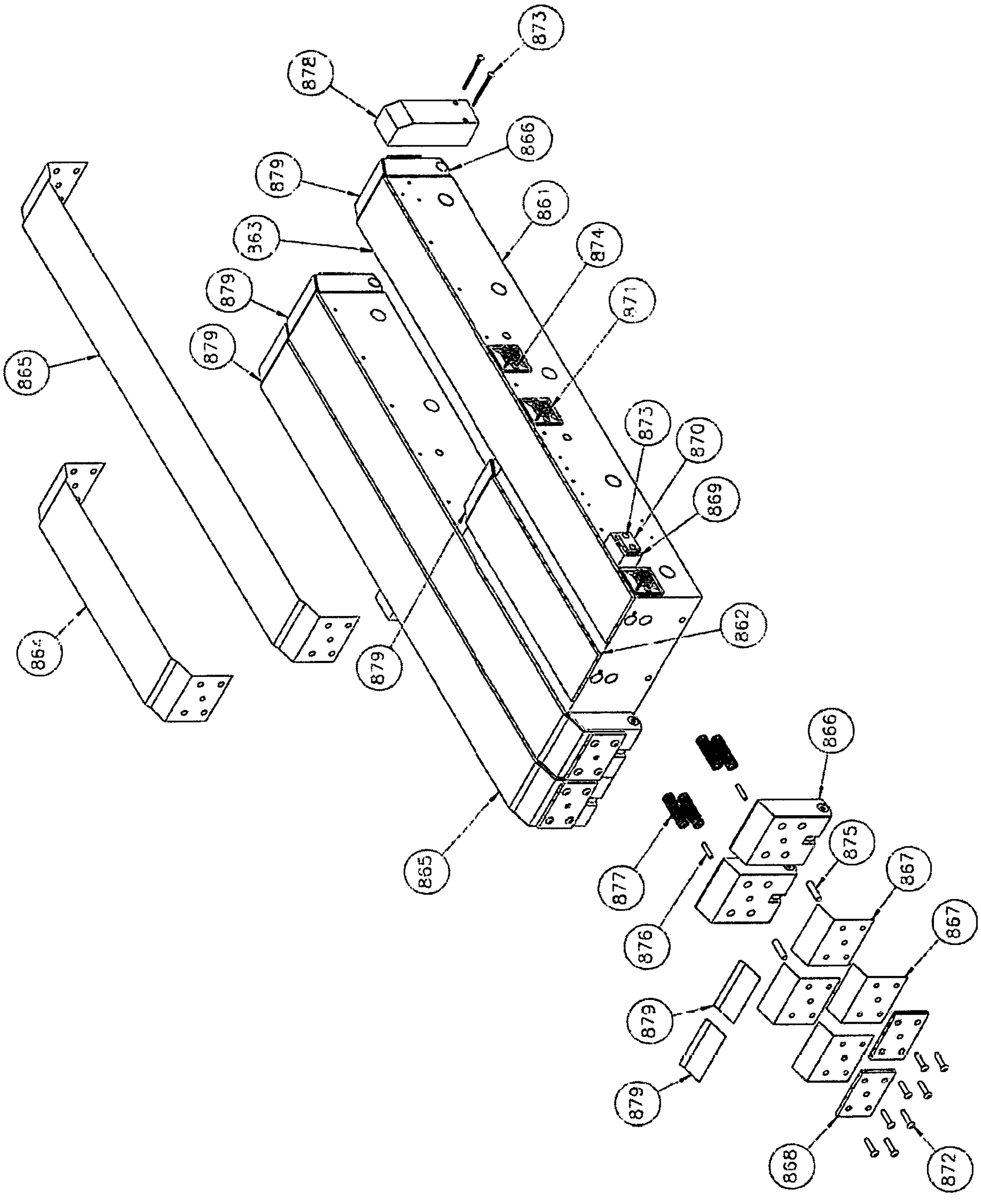
Figure 85:
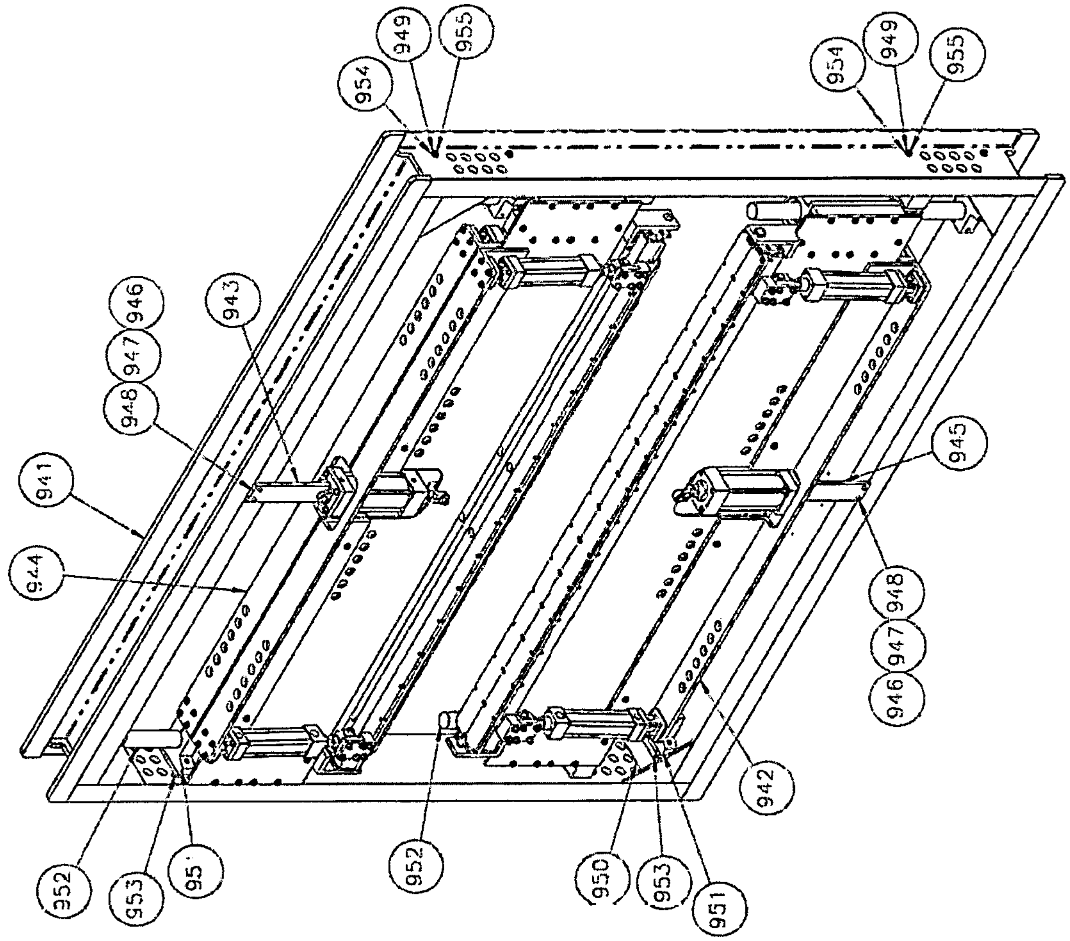
Figure 86:
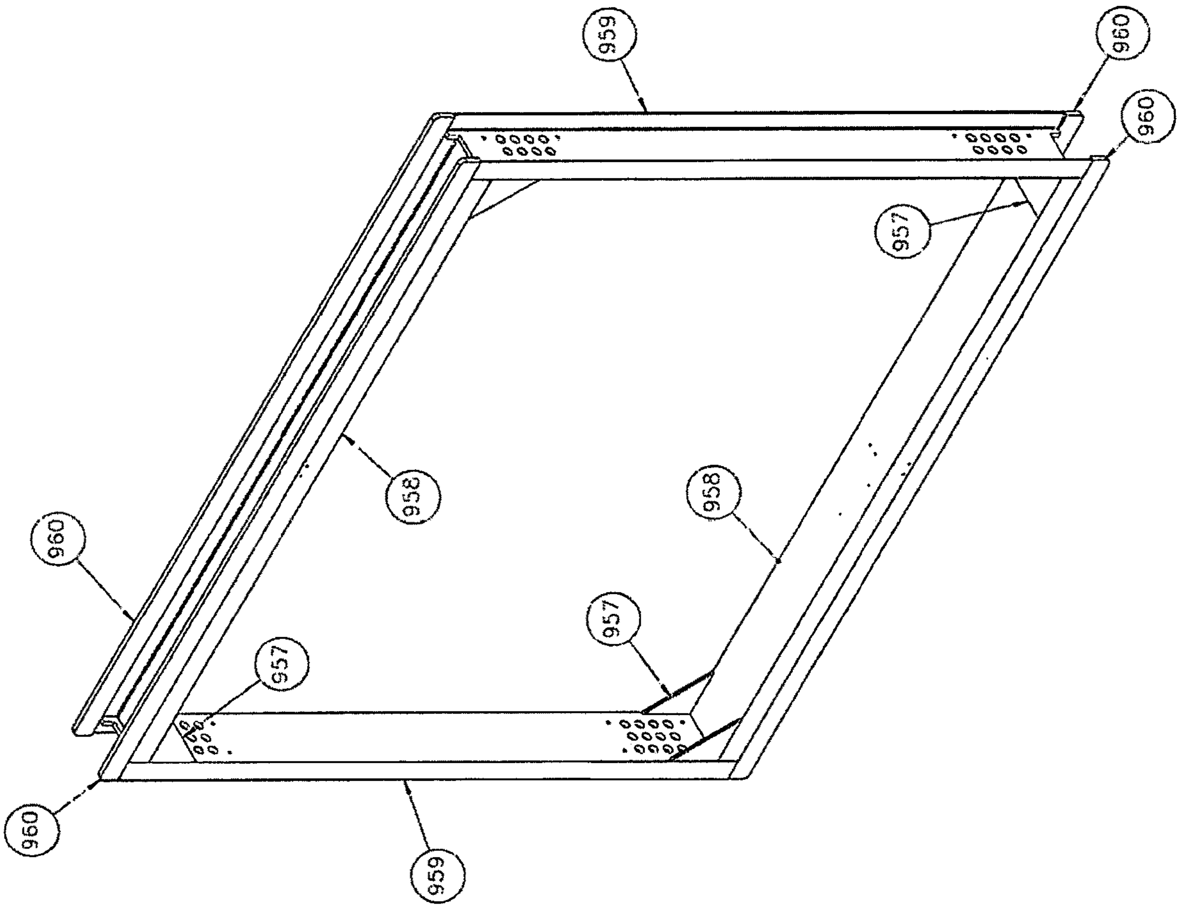
Figure 87:
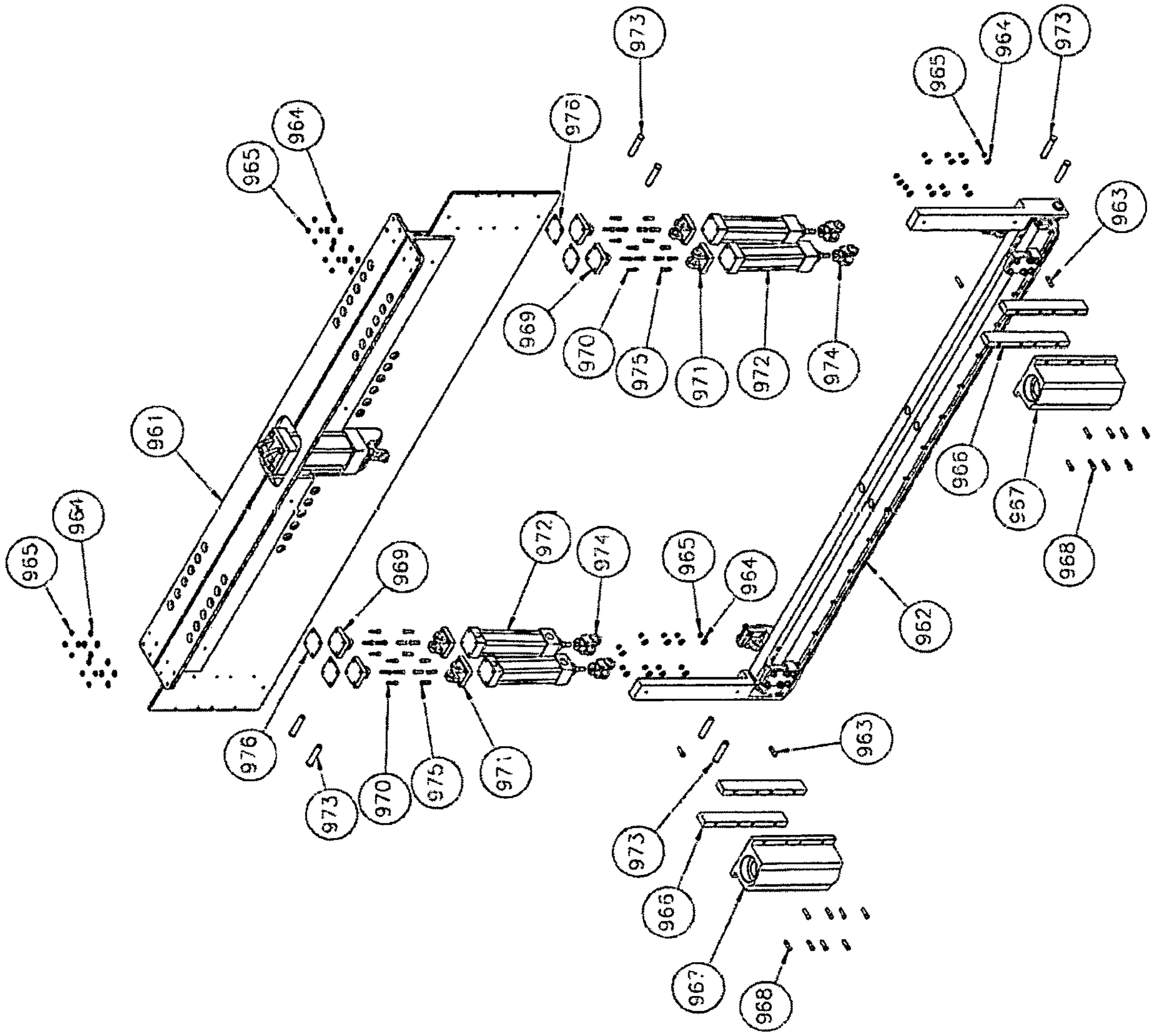

FIG. 67 is an exploded perspective view of a seal bar frame sub-assembly of a spout/top/bottom/body impulse heat sealer in accordance with a preferred embodiment of the present invention;

FIG. 68 is an exploded perspective view of an upper spout to top/bottom heat sealing bar of a spout/top/bottom/body impulse heat sealer in accordance with a preferred embodiment of the present invention;

FIG. 69 is an exploded perspective view of an assembly of an impulse heat sealing bar in accordance with a preferred embodiment of the present invention;

FIG. 70 is a perspective view of a throat and bag frame sub-assembly spout/top/bottom/body impulse heat sealer in accordance with a preferred embodiment of the present invention;

FIG. 71 is an exploded perspective view of a seal bar frame sub-assembly of a spout/top/bottom/body impulse heat sealer in accordance with a preferred embodiment of the present invention;

FIG. 72 is an exploded view of an upper top/bottom to body heat sealing bar of a spout/top/bottom/body impulse heat sealer in accordance with a preferred embodiment of the present invention;

FIG. 73 is an exploded view of an assembly of an impulse heat sealing bar in accordance with a preferred embodiment of the present invention;

FIG. 74 is an exploded view of a loop impulse heat sealer assembly in accordance with a preferred embodiment of the present invention;

FIG. 75 is a perspective view of a table assembly of a loop impulse heat sealer in accordance with a preferred embodiment of the present invention;

FIG. 75A is a side view of a table assembly of a loop impulse heat sealer in accordance with a preferred embodiment of the present invention;

FIG. 75B is a top view of a table assembly of a loop impulse heat sealer in accordance with a preferred embodiment of the present invention;

FIG. 75C is a front view of a table assembly of a loop impulse heat sealer in accordance with a preferred embodiment of the present invention;

FIG. 75D is a bottom view of a table assembly of a loop impulse heat sealer in accordance with a preferred embodiment of the present invention;

FIG. 76 is a perspective view of a table frame sub-assembly of a loop impulse heat sealer in accordance with a preferred embodiment of the present invention;

FIG. 76A is a top view of a table frame sub-assembly of a loop impulse heat sealer in accordance with a preferred embodiment of the present invention;

FIG. 76B is a front view of a table frame sub-assembly of a loop impulse heat sealer in accordance with a preferred embodiment of the present invention;

FIG. 76C is a detail view of a table frame sub-assembly table leg of a loop impulse heat sealer in accordance with a preferred embodiment of the present invention;

FIG. 76D is a side view of a table frame sub-assembly of a loop impulse heat sealer in accordance with a preferred embodiment of the present invention;

FIG. 77 is an exploded perspective view of a pneumatic cylinder assembly and installation of a loop impulse heat sealer in accordance with a preferred embodiment of the present invention;

FIG. 78 is an exploded perspective view of a frame sub-assembly of a loop impulse heat sealer in accordance with a preferred embodiment of the present invention;

FIG. 79 is an exploded perspective view of a right-hand upper heating head sub-assembly of a loop impulse heat sealer in accordance with a preferred embodiment of the present invention;

FIG. 80 is an exploded perspective view of a left handed assembly of a loop impulse heat sealing bar in accordance with a preferred embodiment of the present invention;

FIG. 81 is an exploded perspective view of a left-hand upper heating head sub-assembly of a loop impulse heat sealing bar in accordance in a preferred embodiment of the present invention;

FIG. 82 is an exploded perspective view of a right hand assembly of a loop impulse heat sealing bar in accordance with a preferred embodiment of the present invention;

FIG. 83 is an exploded perspective view of a left hand assembly of a loop impulse heat sealing bar in accordance with a preferred embodiment of the present invention;

FIG. 84 is an exploded perspective view of a left handed sub-assembly of a loop impulse heat sealing bar in accordance with a preferred embodiment of the present invention;

FIG. 85 is a perspective view of a gusseting assembly in accordance with a preferred embodiment of the present invention;

FIG. 86 is a perspective view of a frame assembly of a gusseting assembly in accordance with a preferred embodiment of the present invention;

FIG. 87 is an exploded perspective view of an upper creasing sub-assembly of a gusseting assembly in accordance with a preferred embodiment of the present invention.

Figure 88:
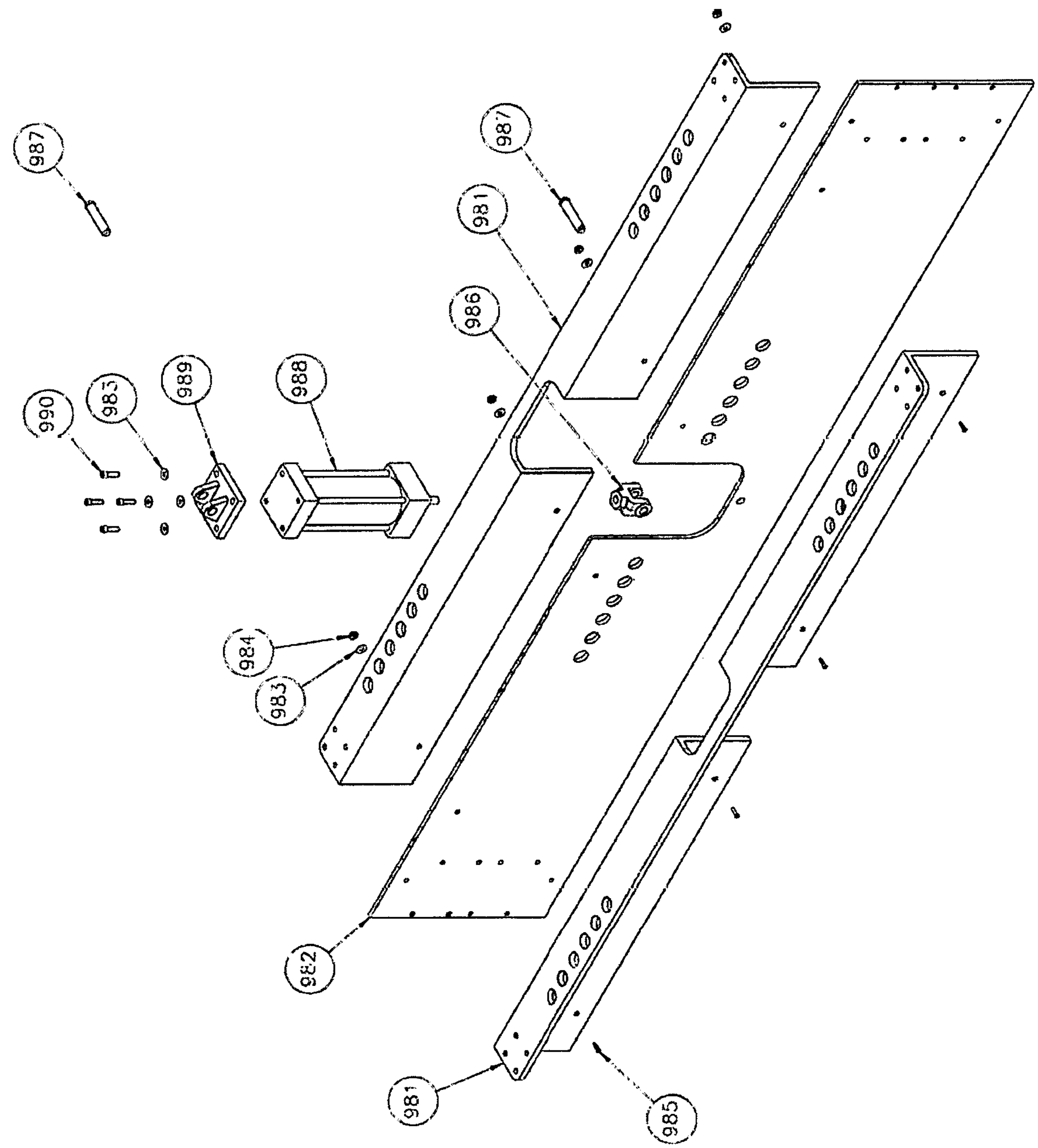
Figure 89:
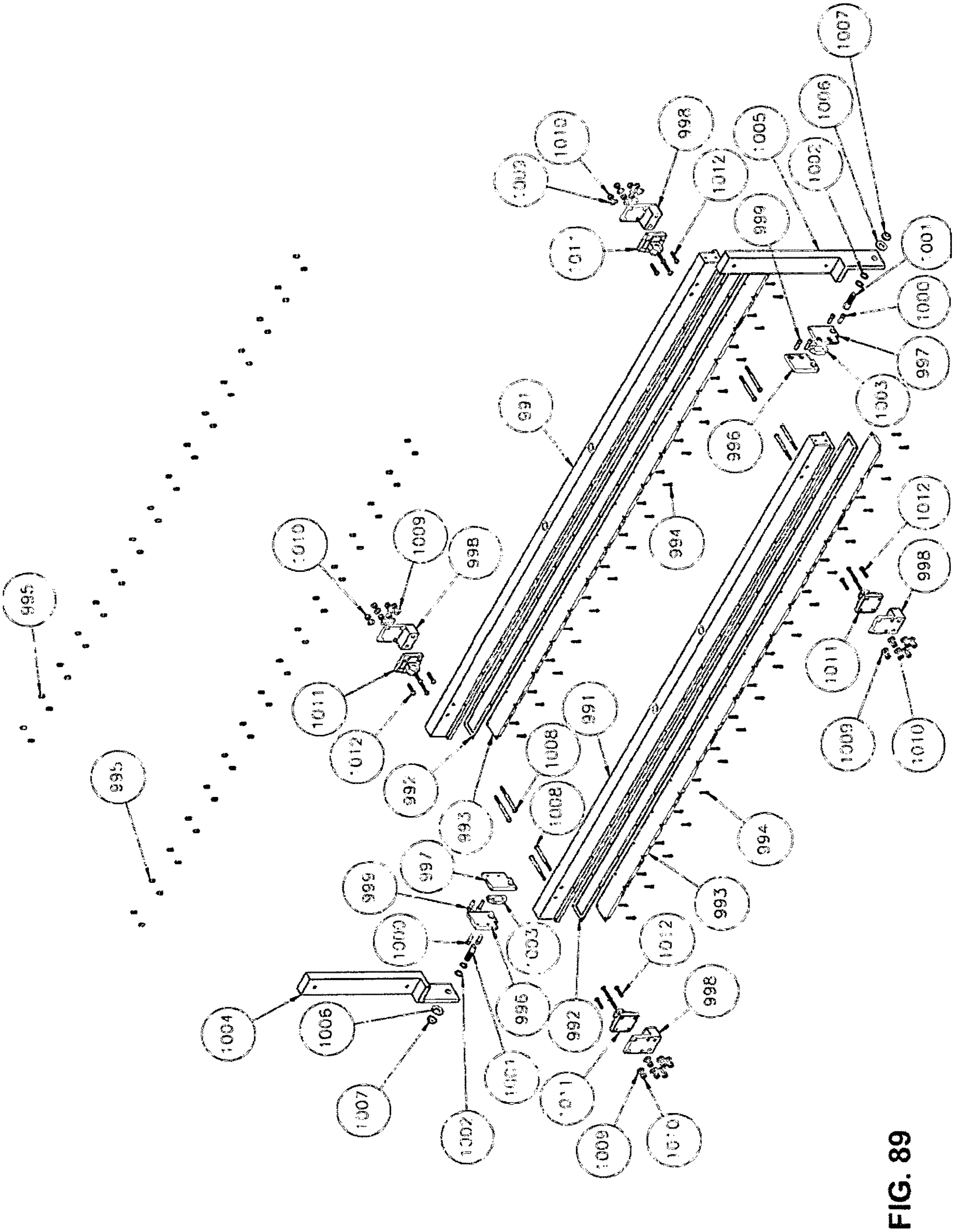
Figure 90:
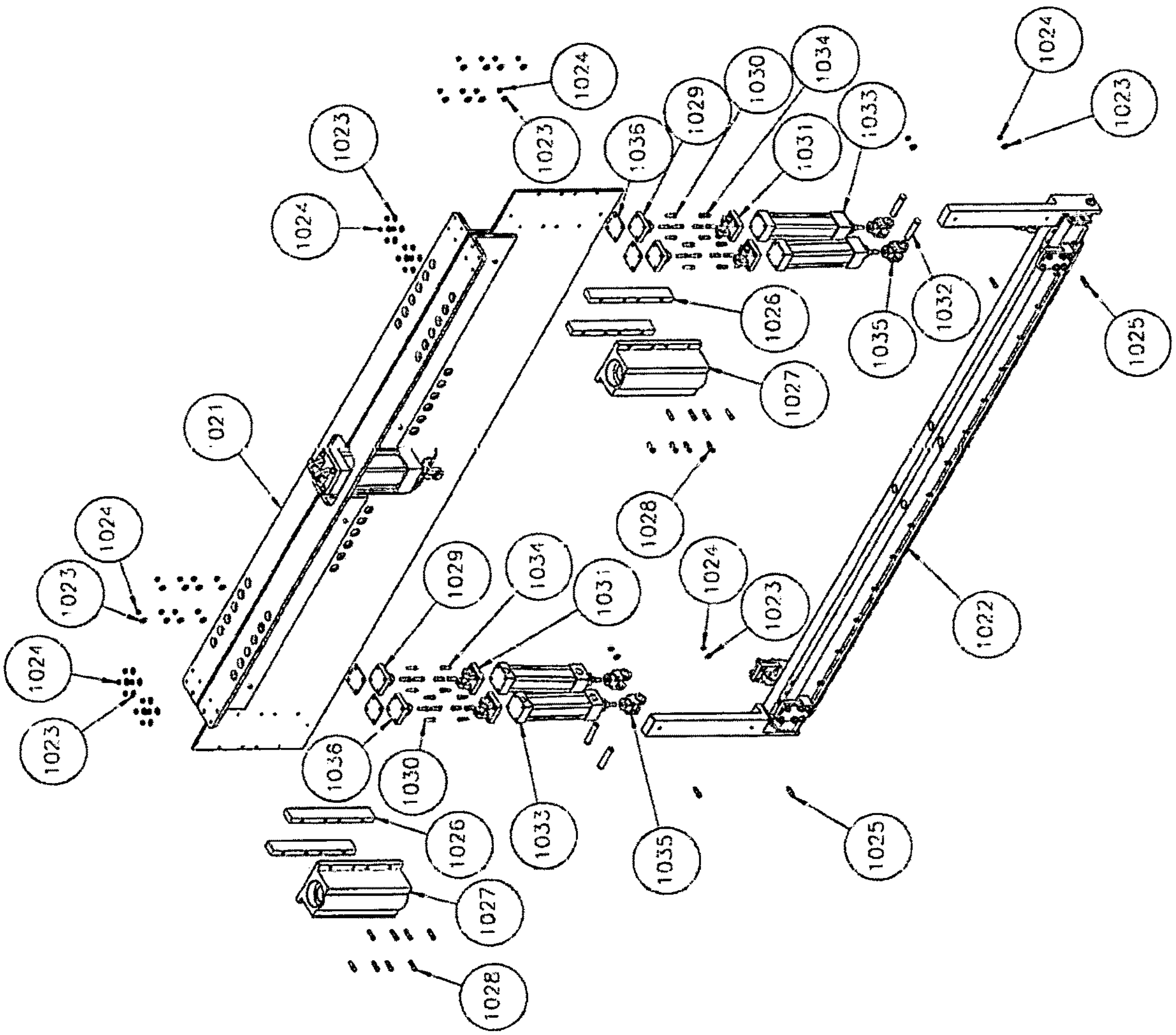
Figure 91:
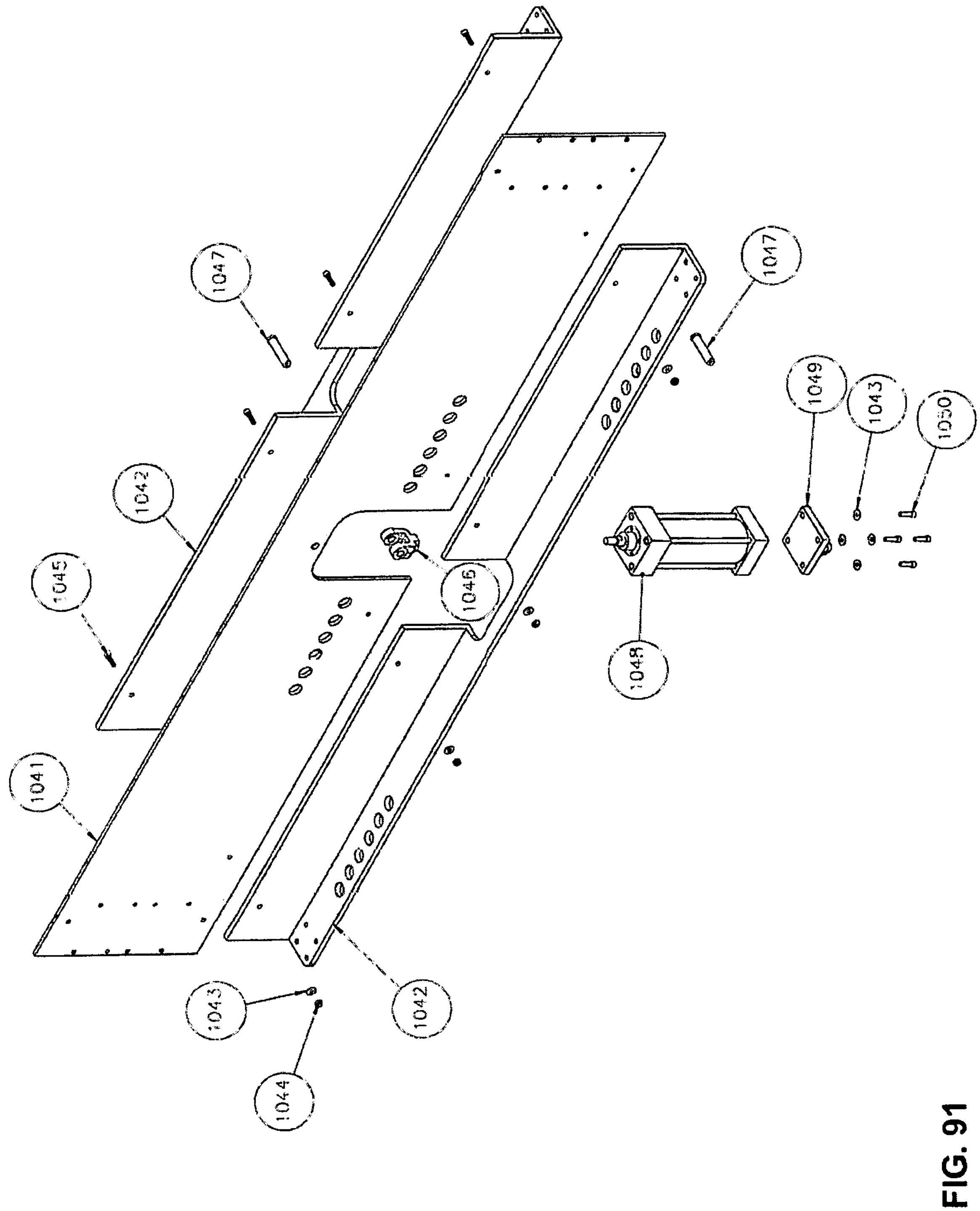
Figure 92:
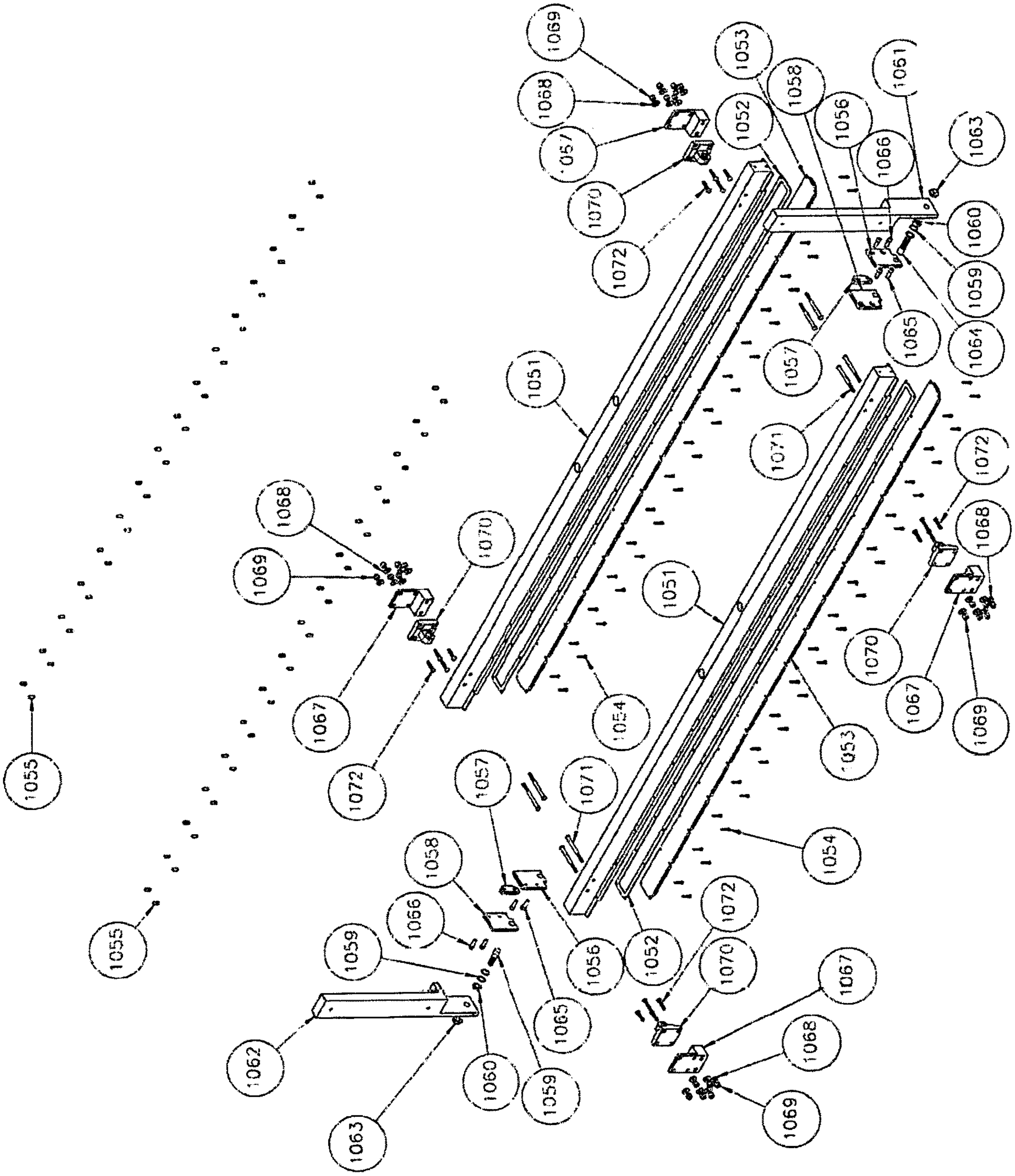
Figure 93:
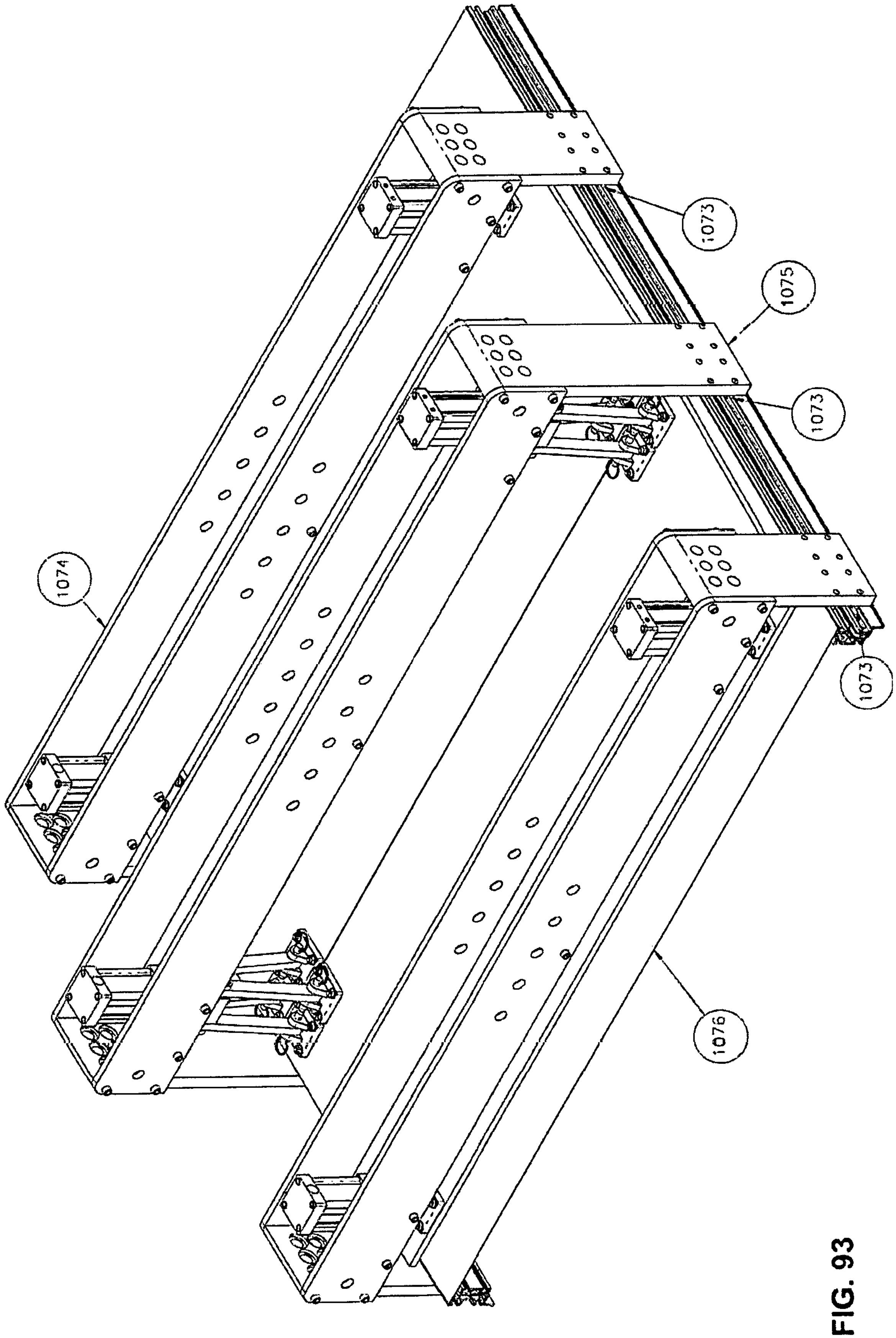
Figure 94:
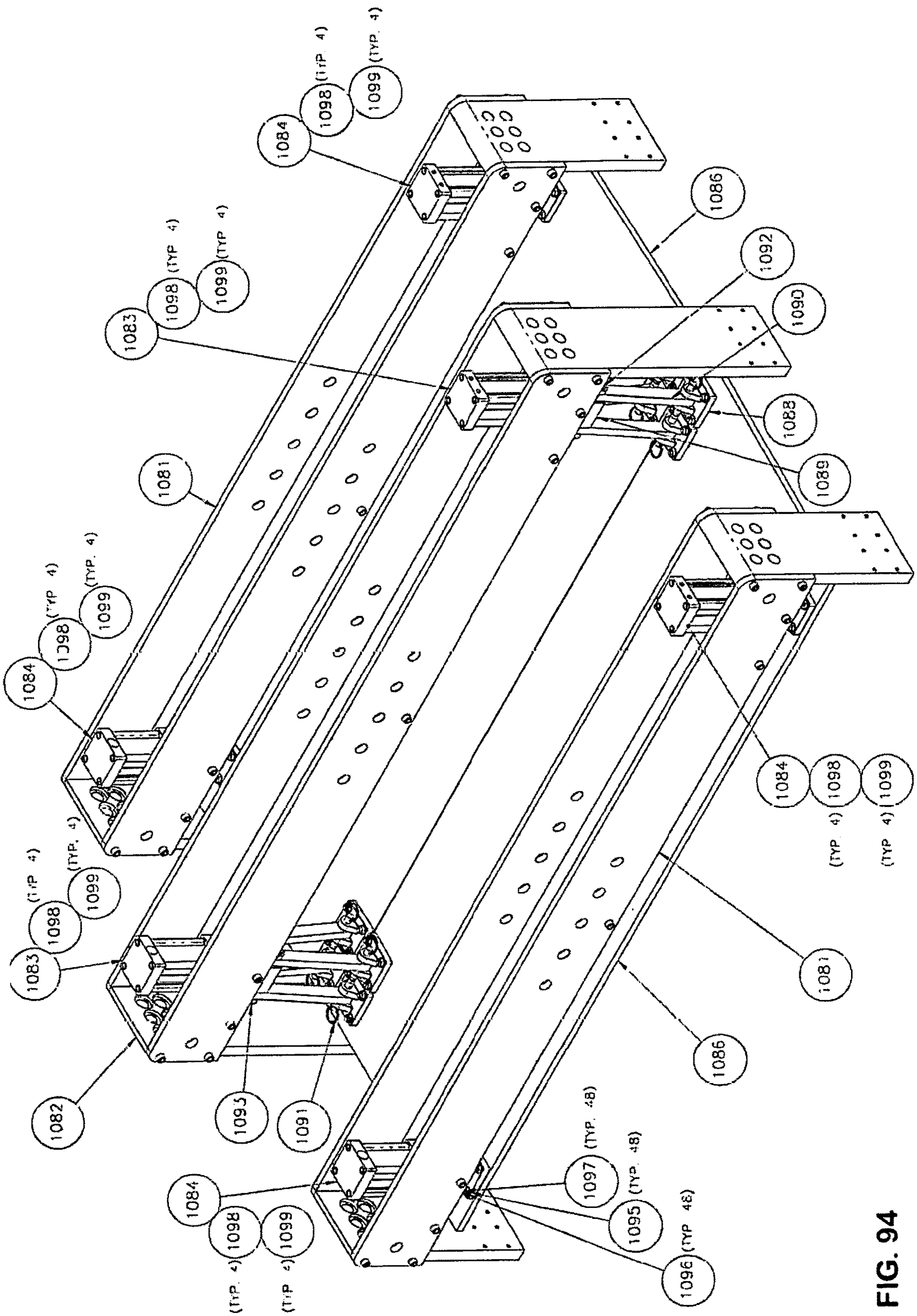
Figure 95:
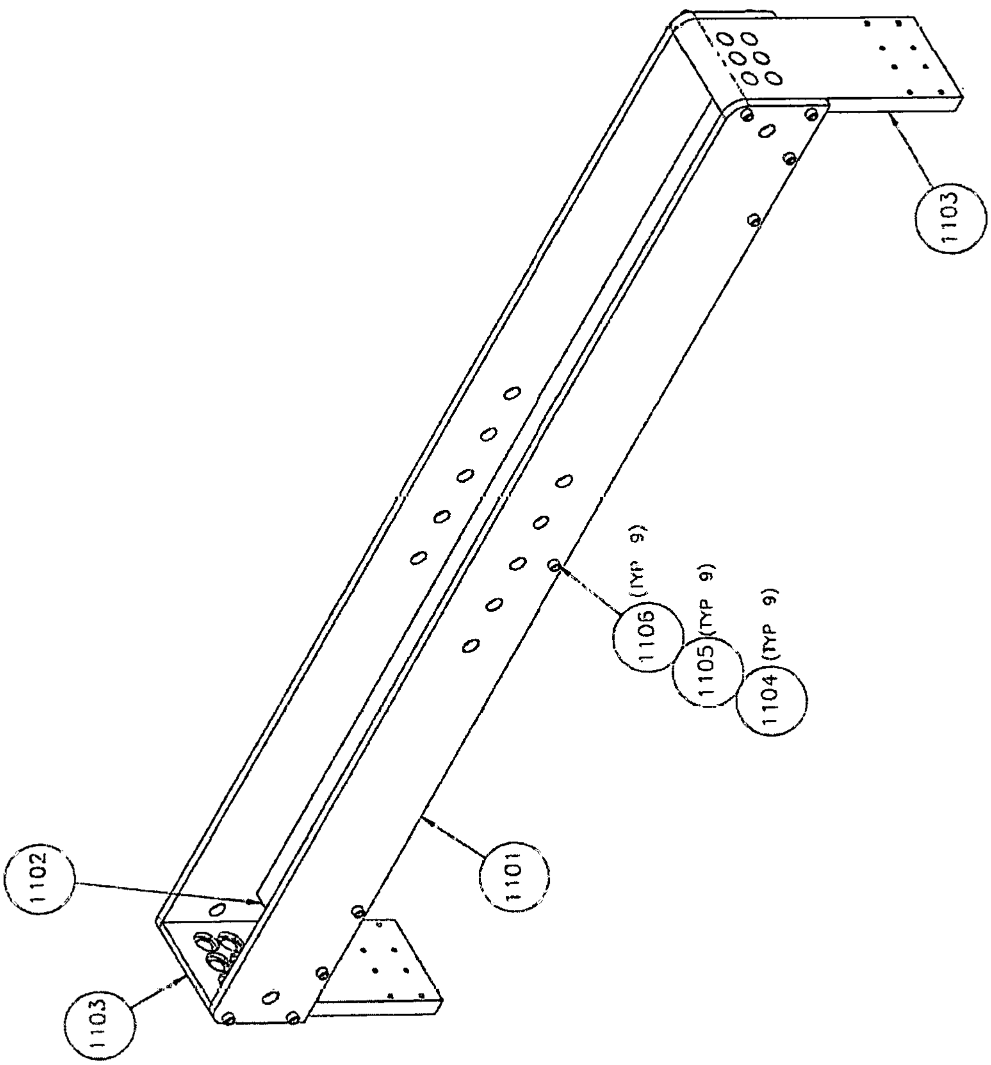
Figure 96:
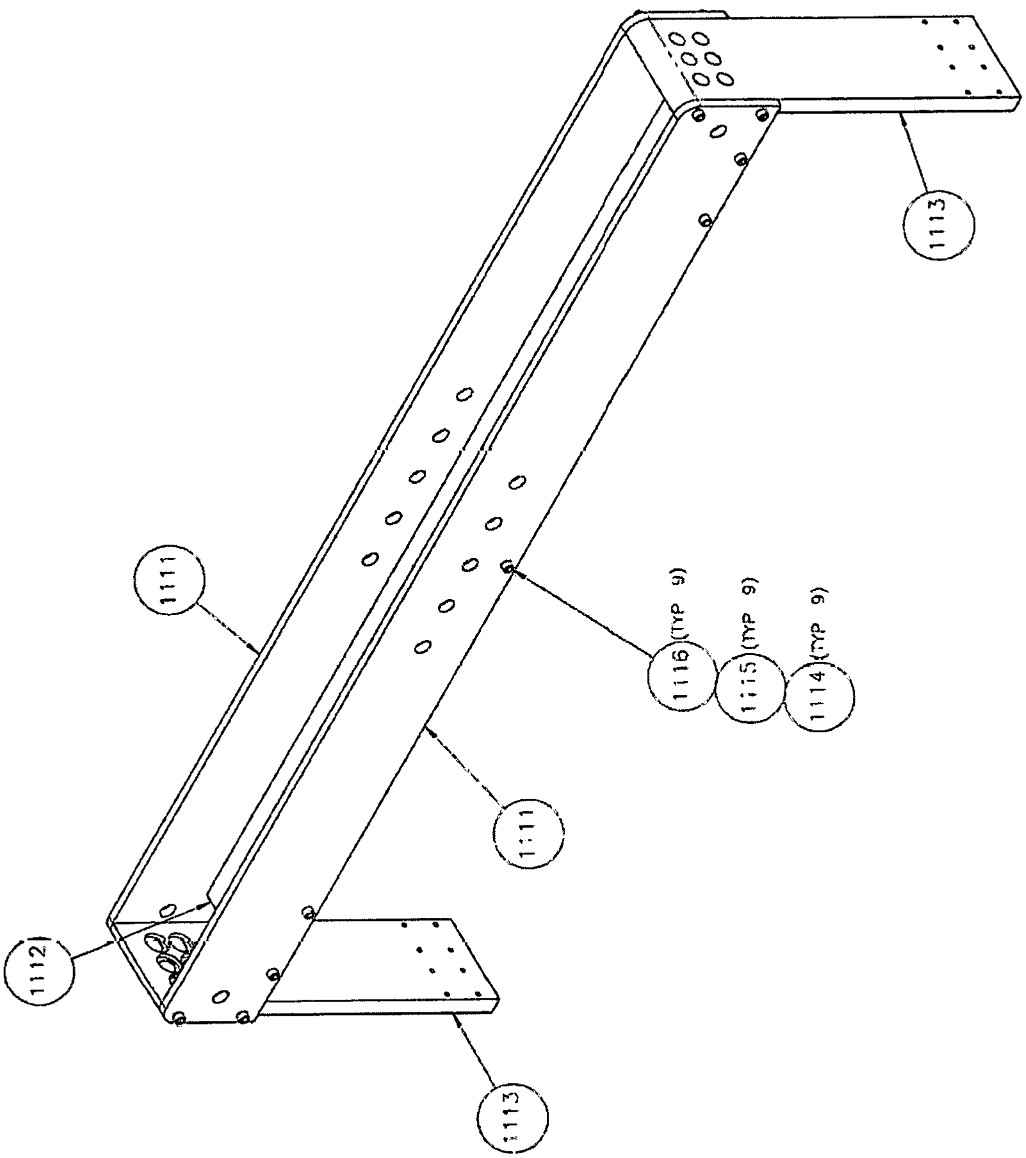
Figure 97:
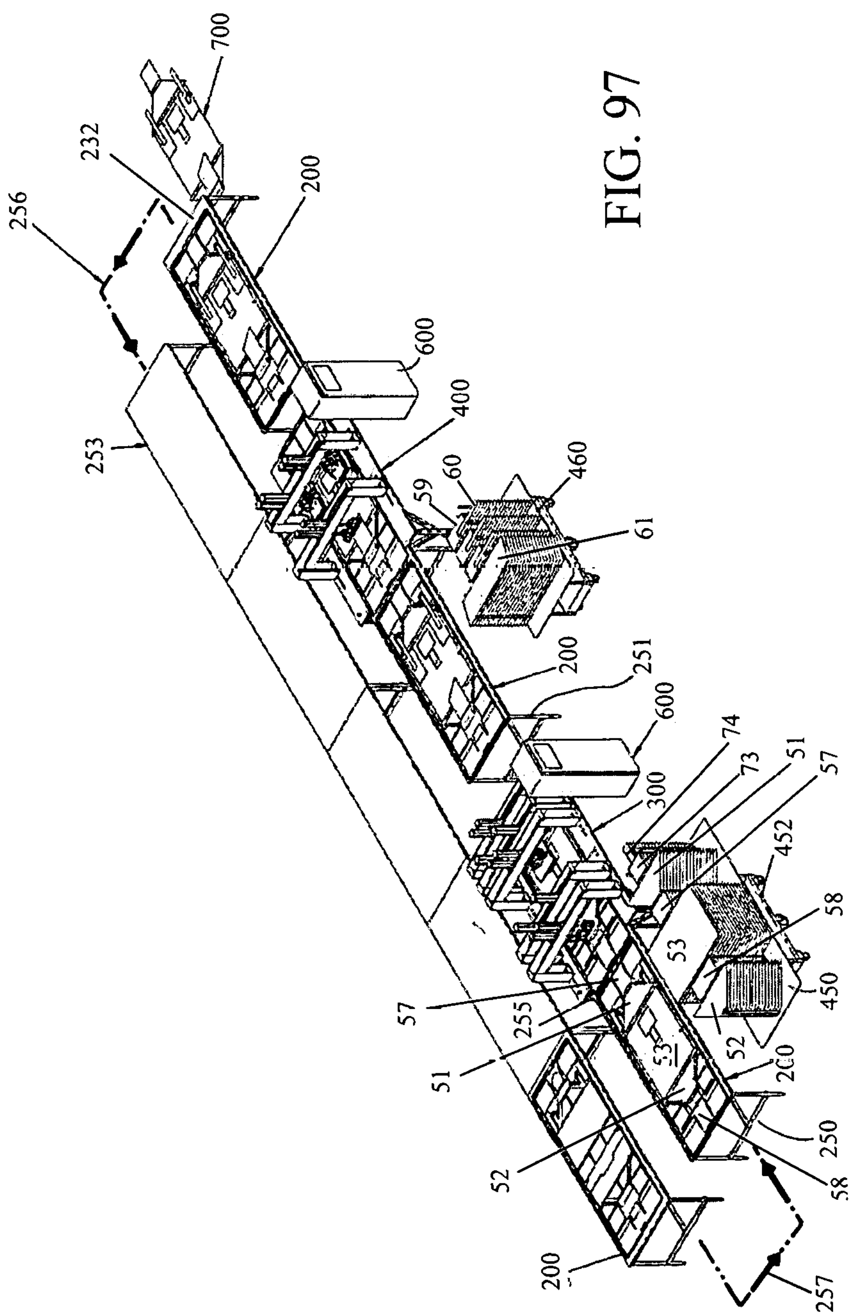
Figure 98:
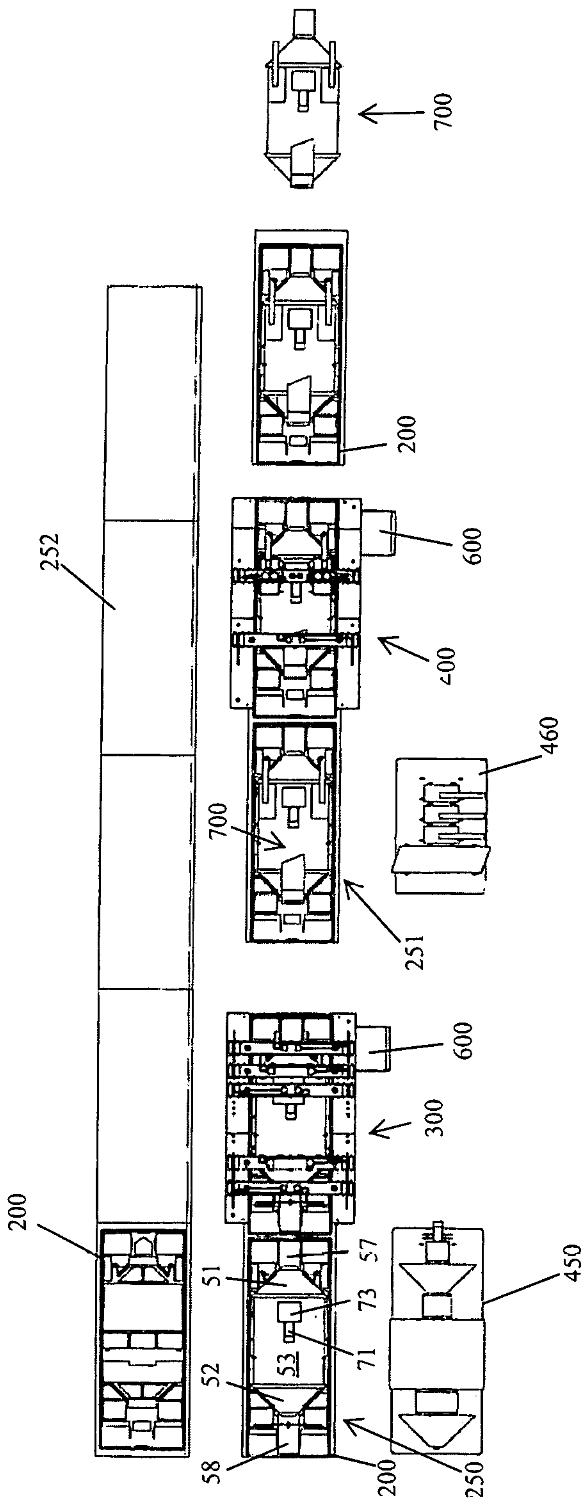
Figure 99:
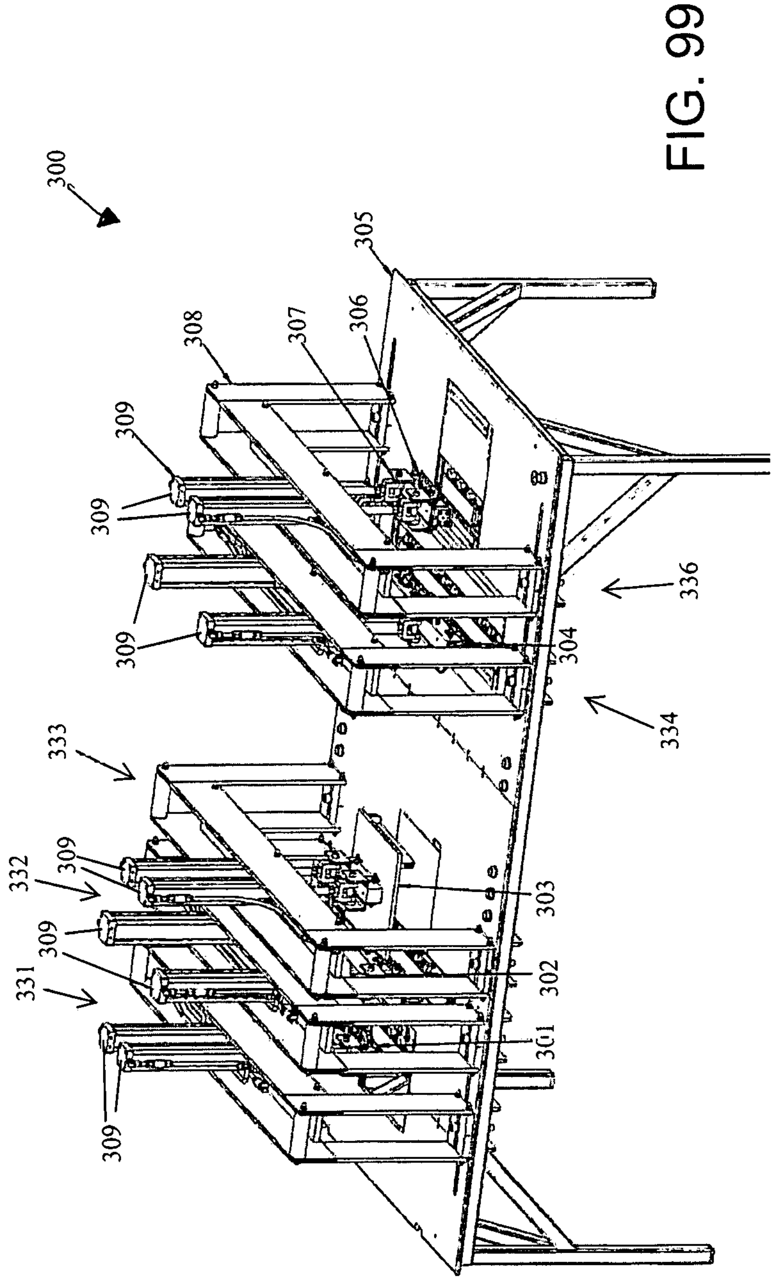
Figure 100:
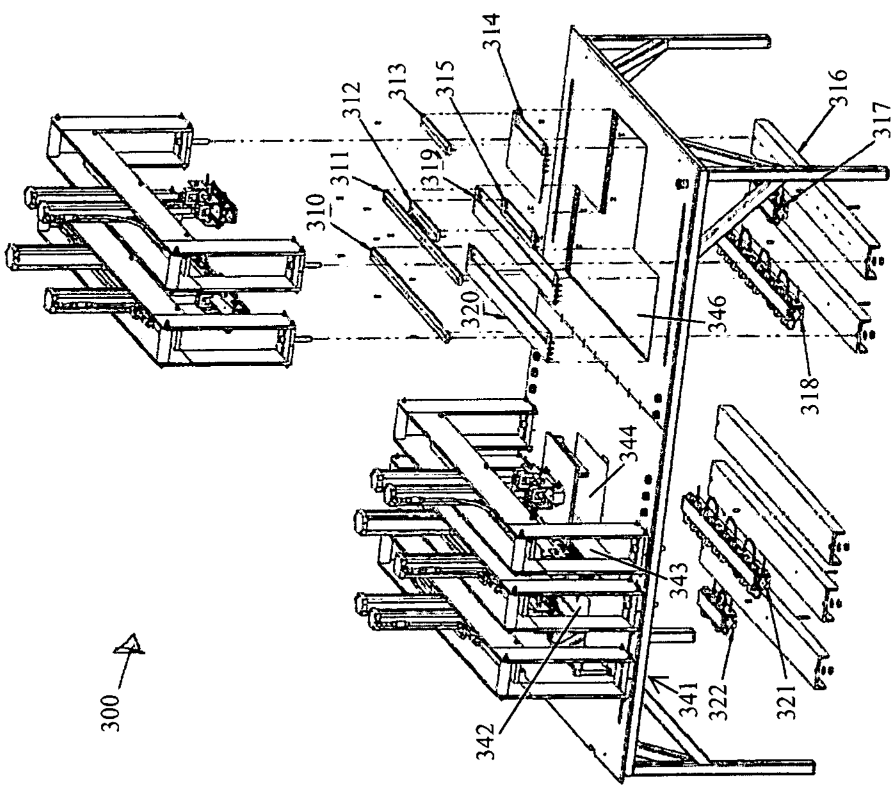
Figure 101:
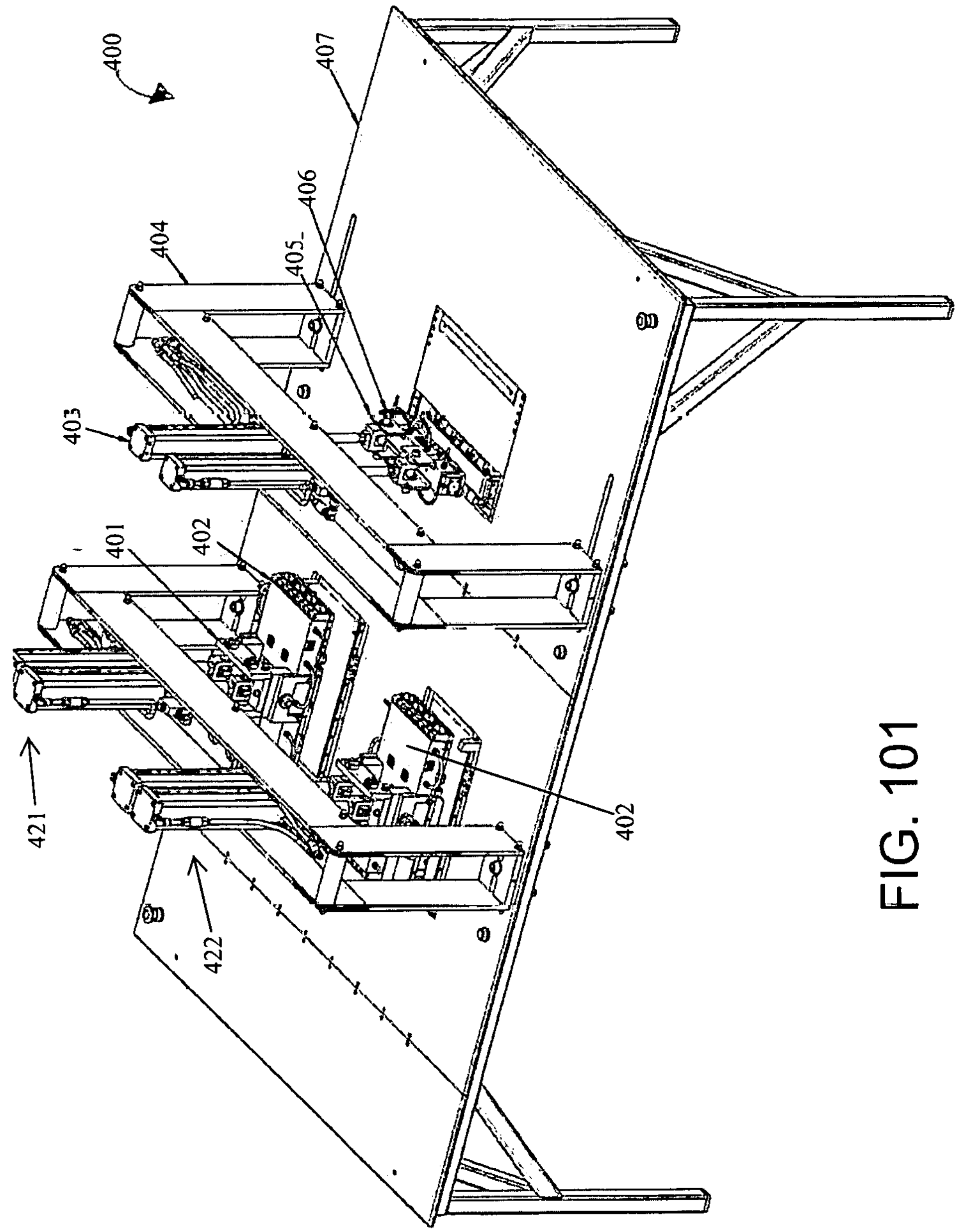
Figure 102:
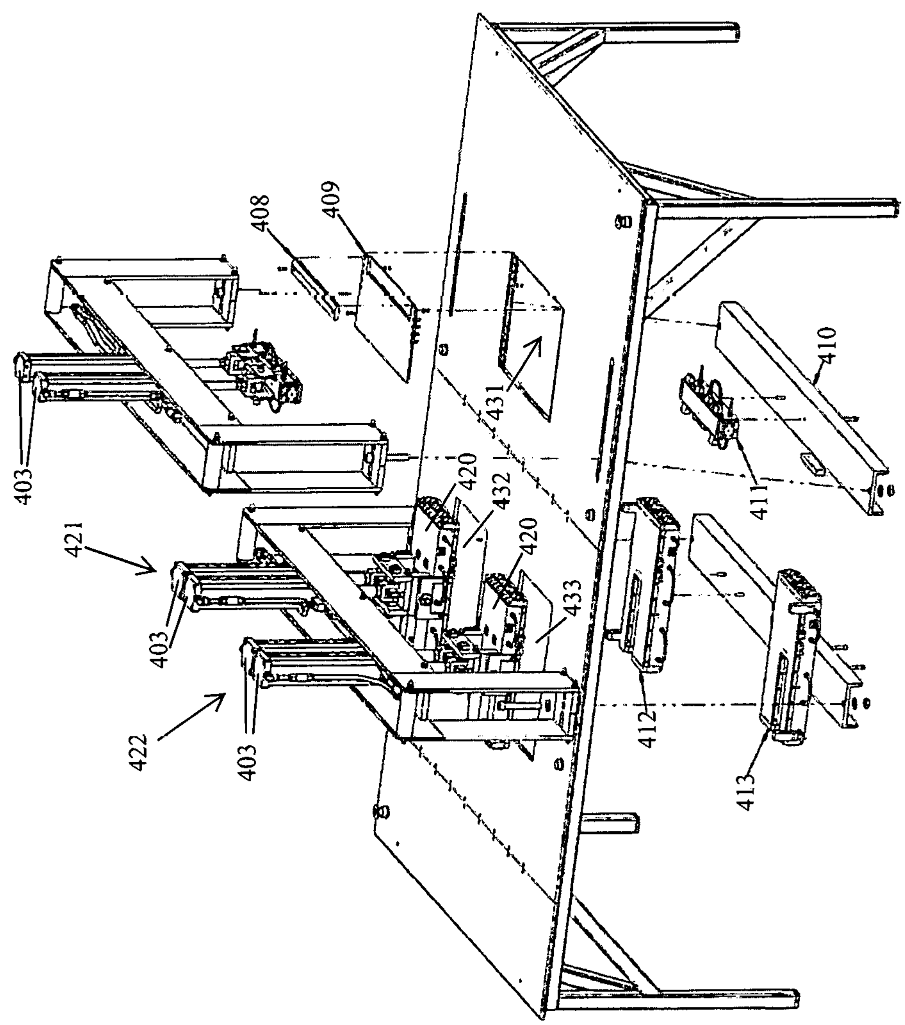
Figure 103A:
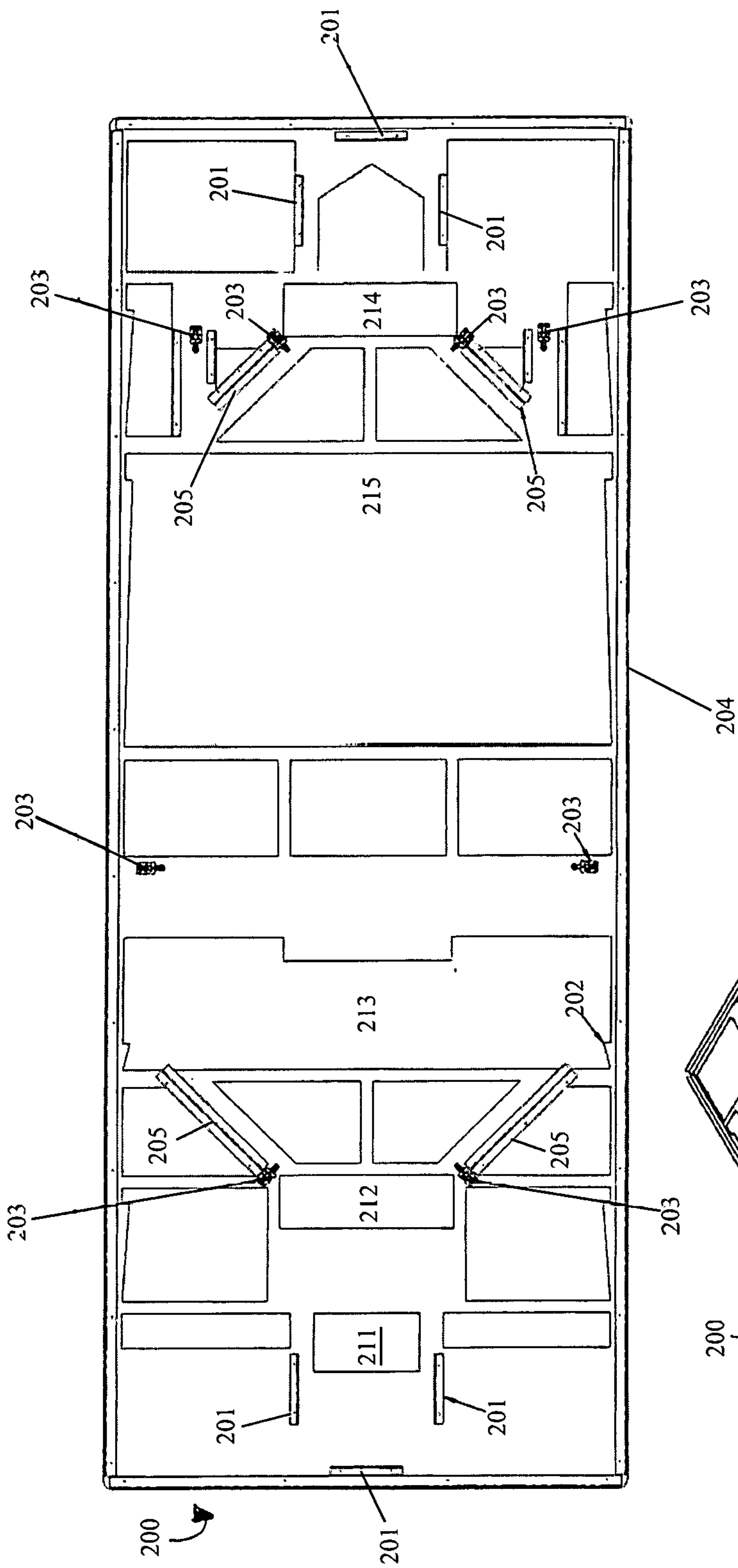
Figure 103B:
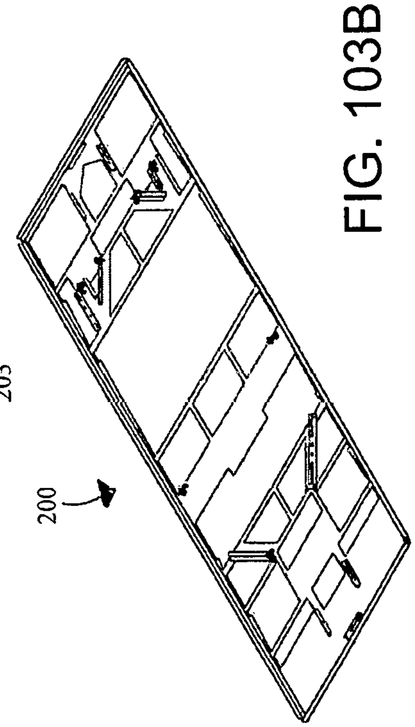
Figure 104:
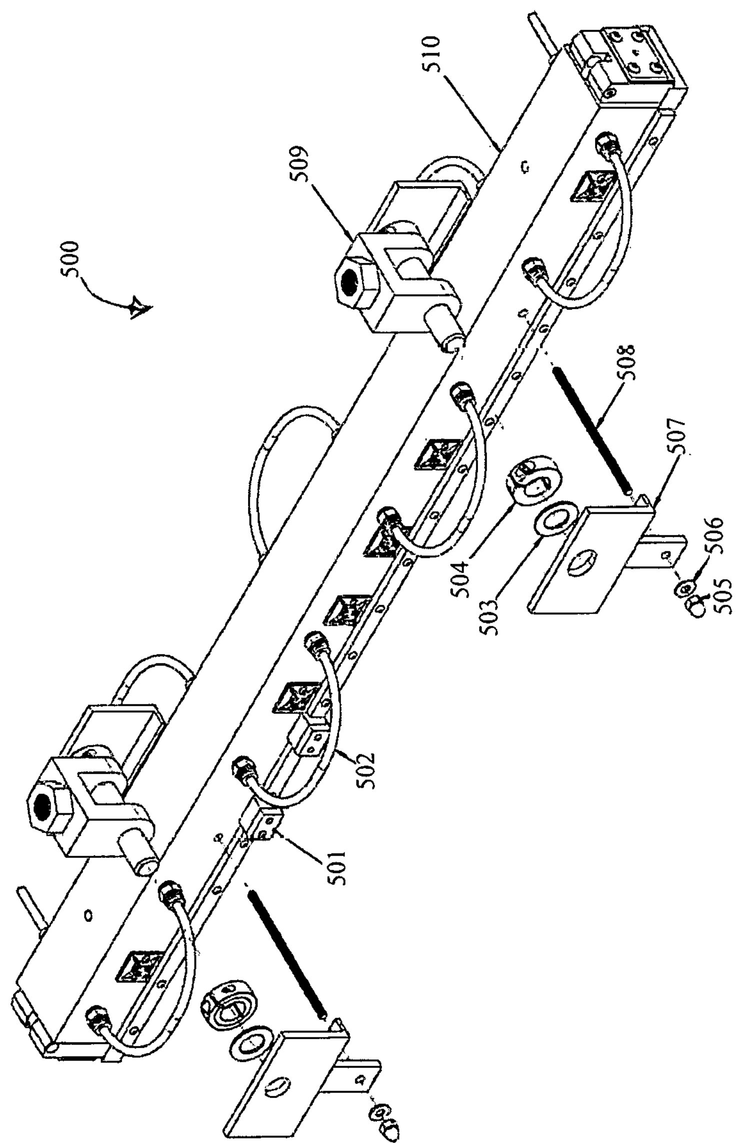
Figure 105:
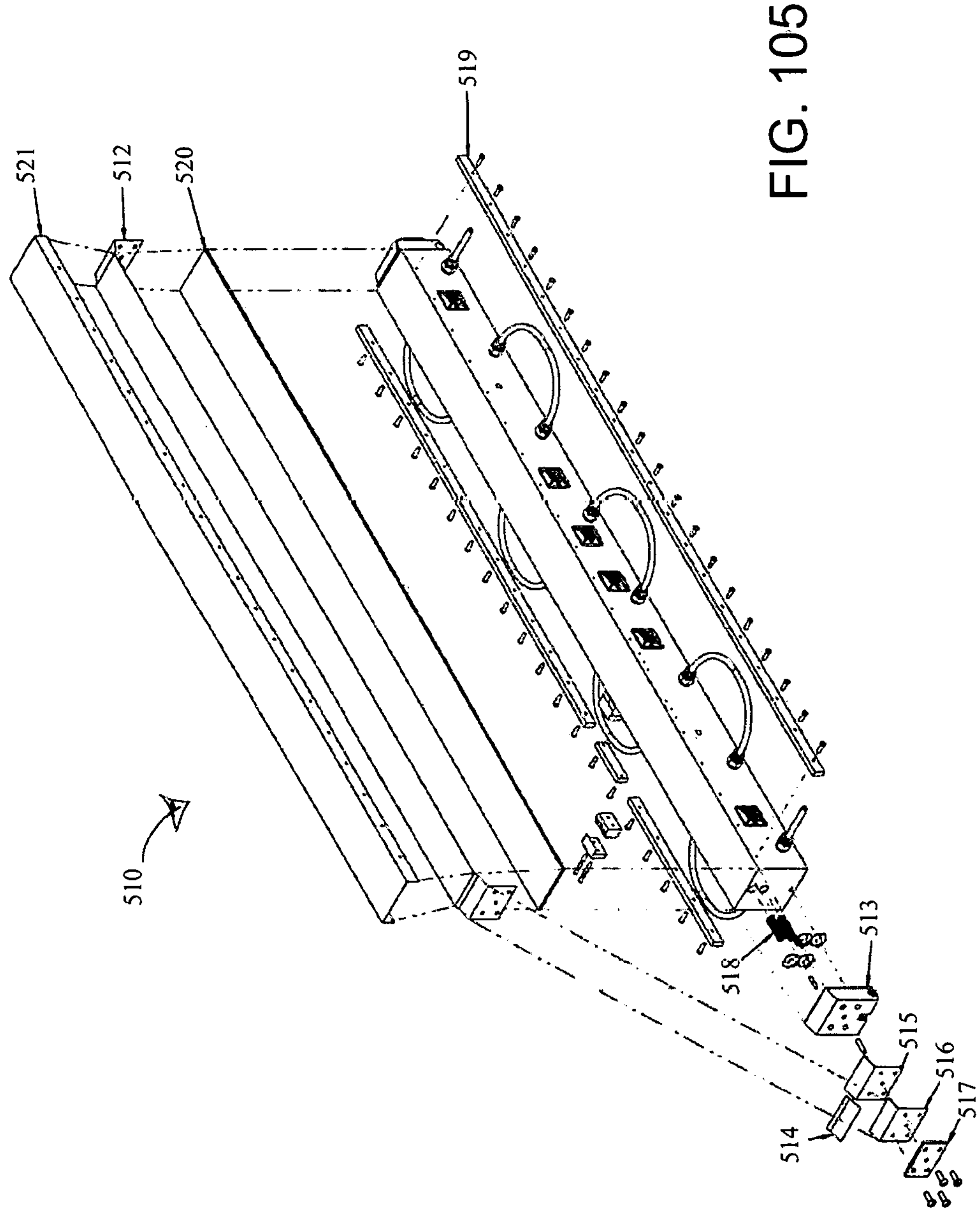
Figure 106:
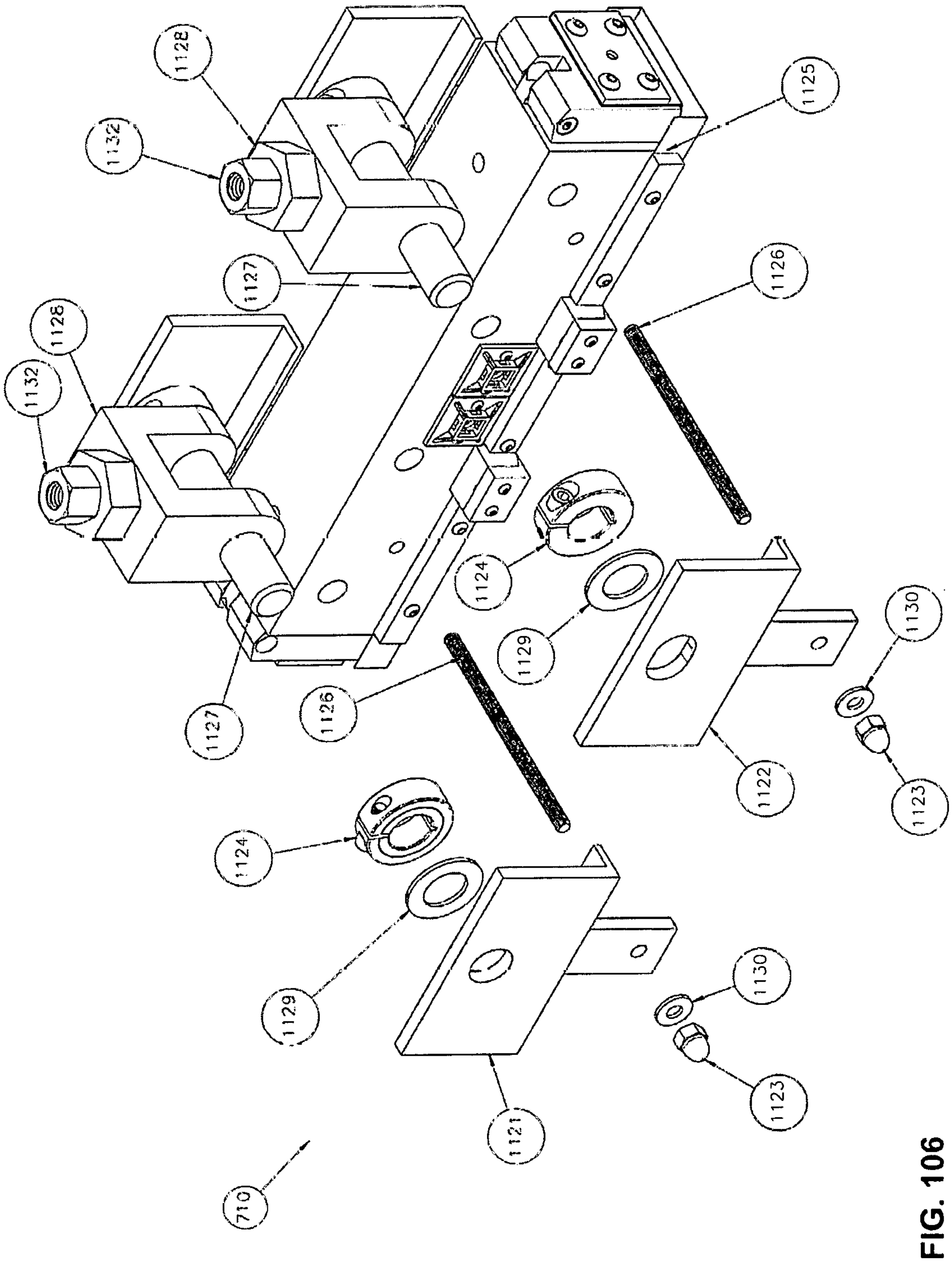
Figure 107:
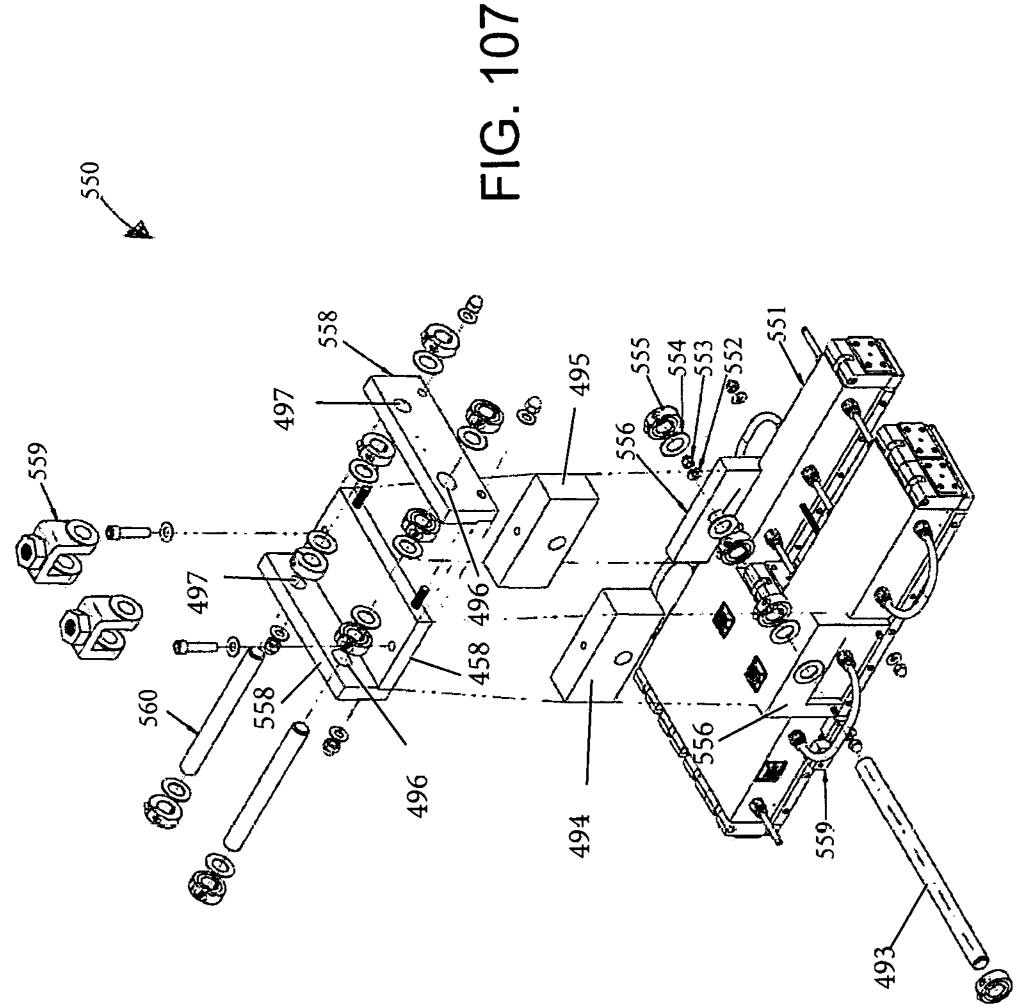
Figure 108:
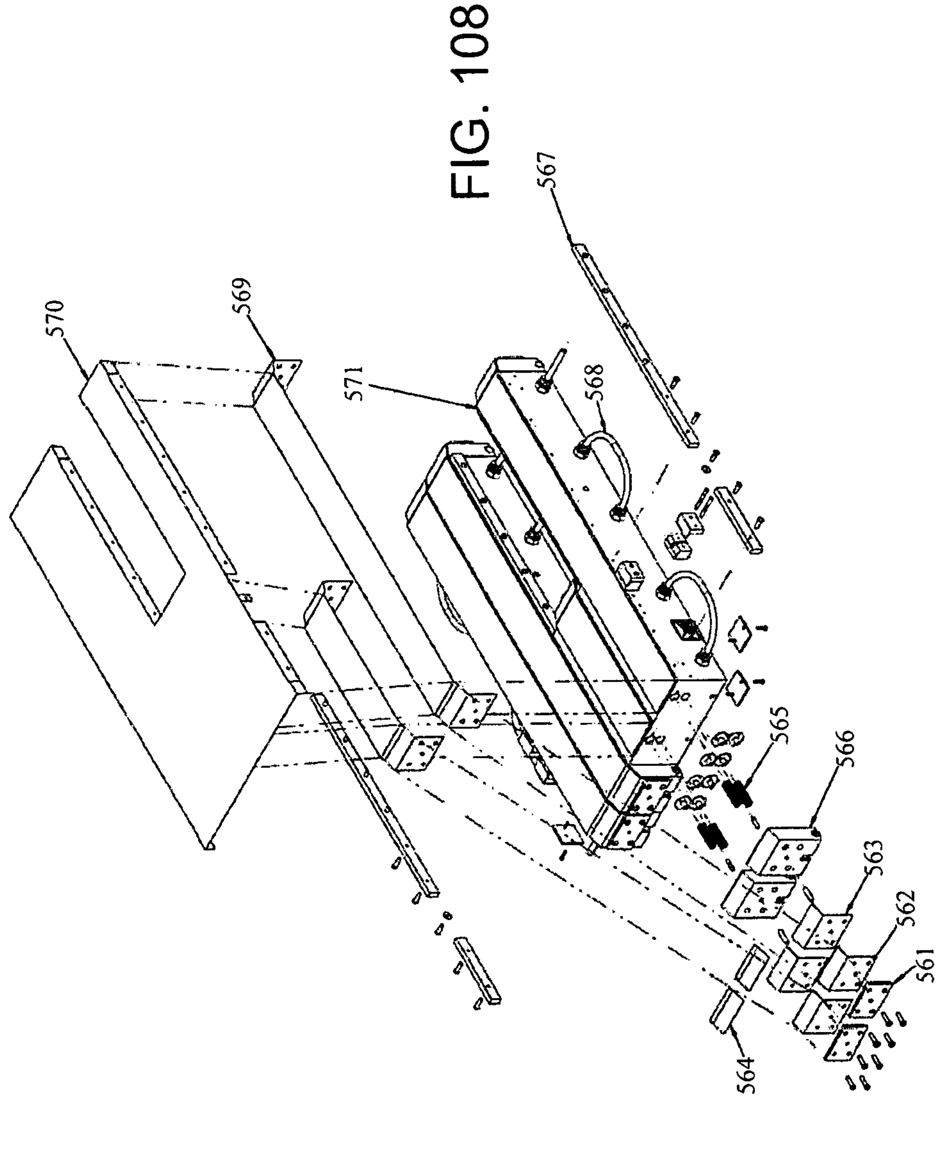
Figure 109:
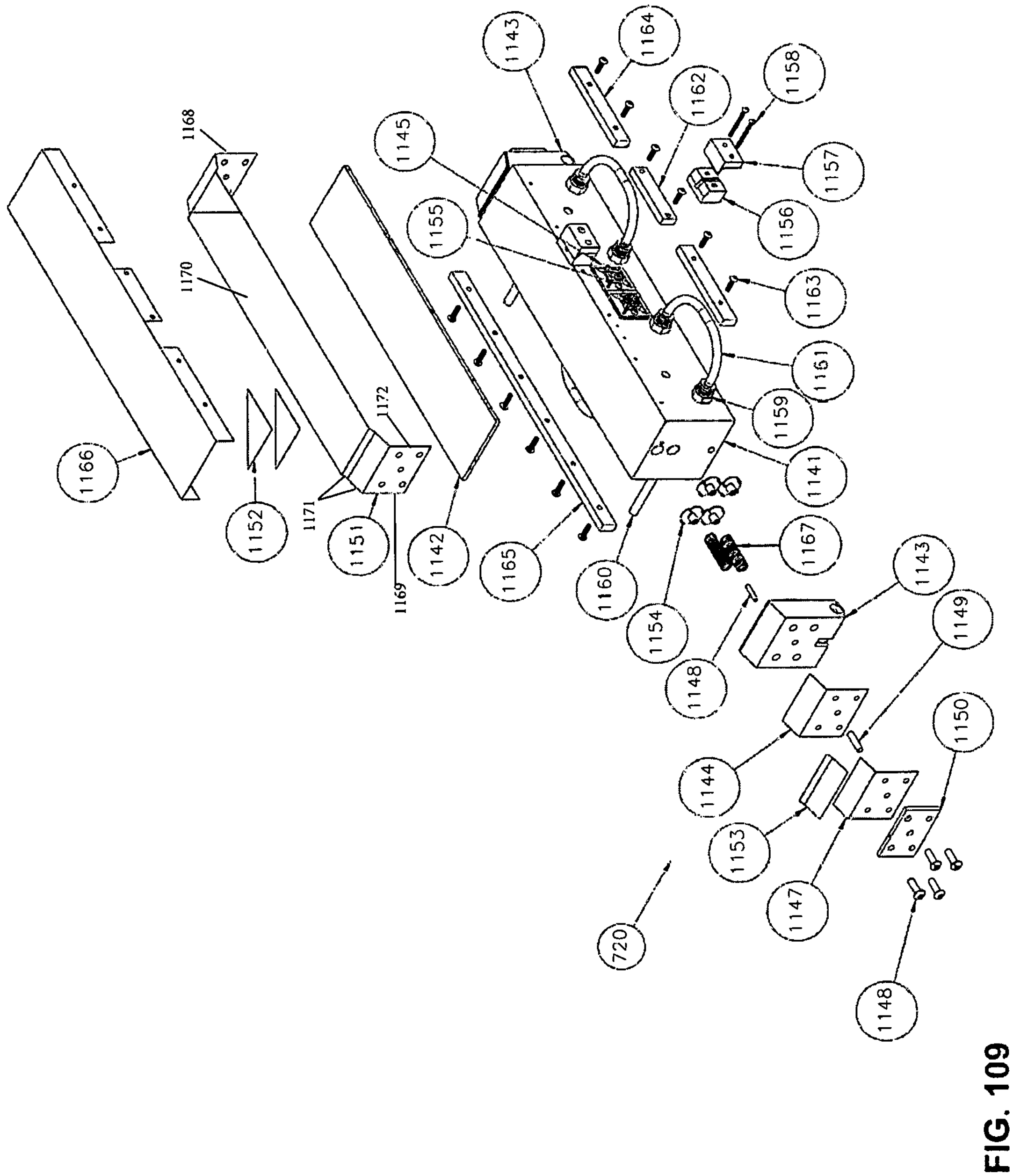
Figure 110:
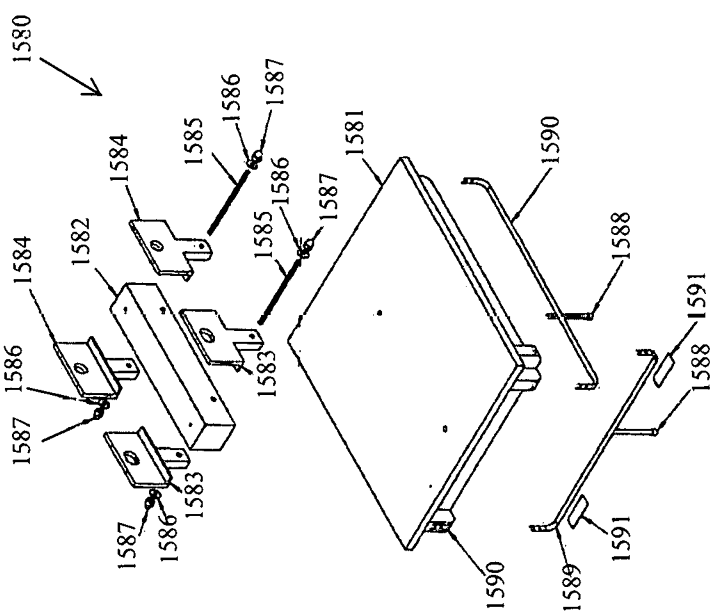
Figure 111:
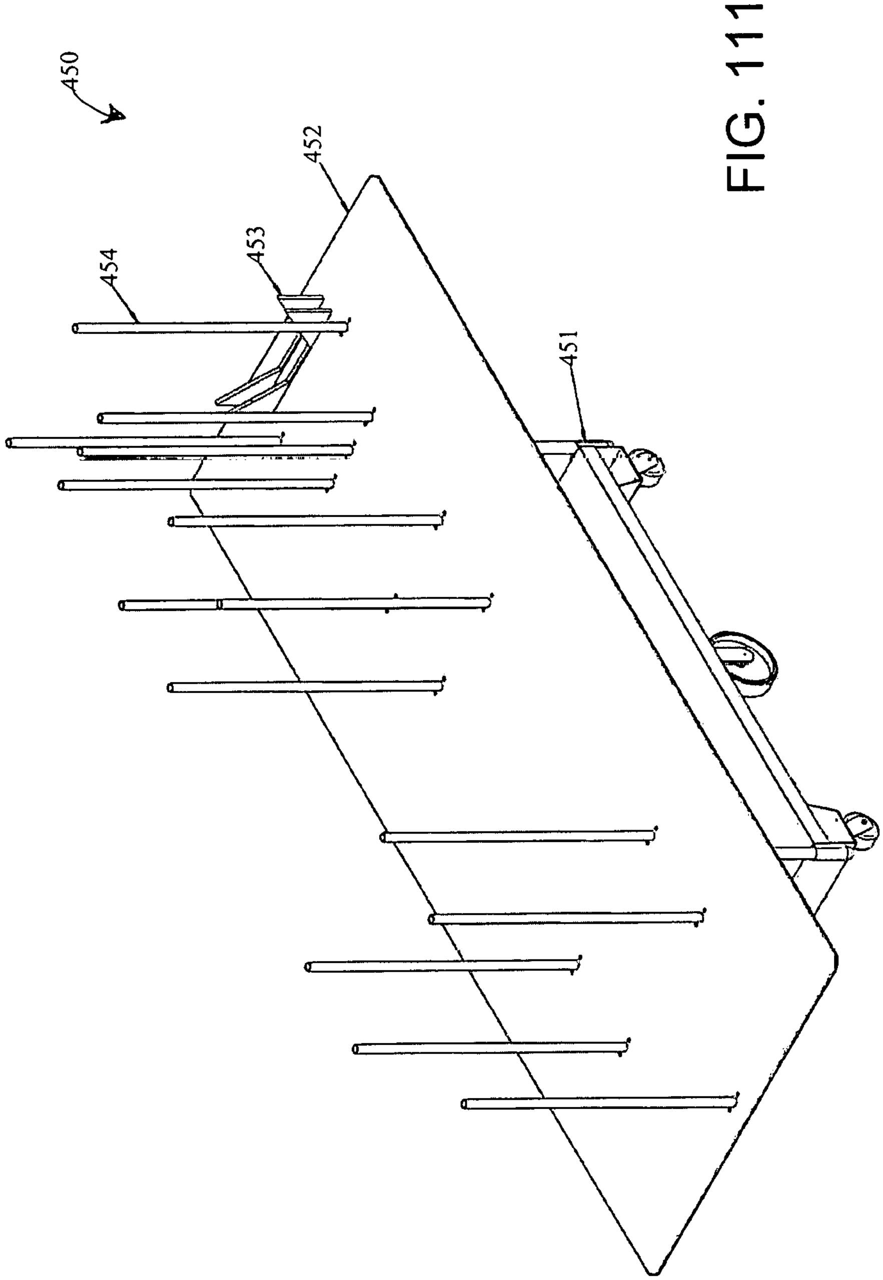
Figure 112:
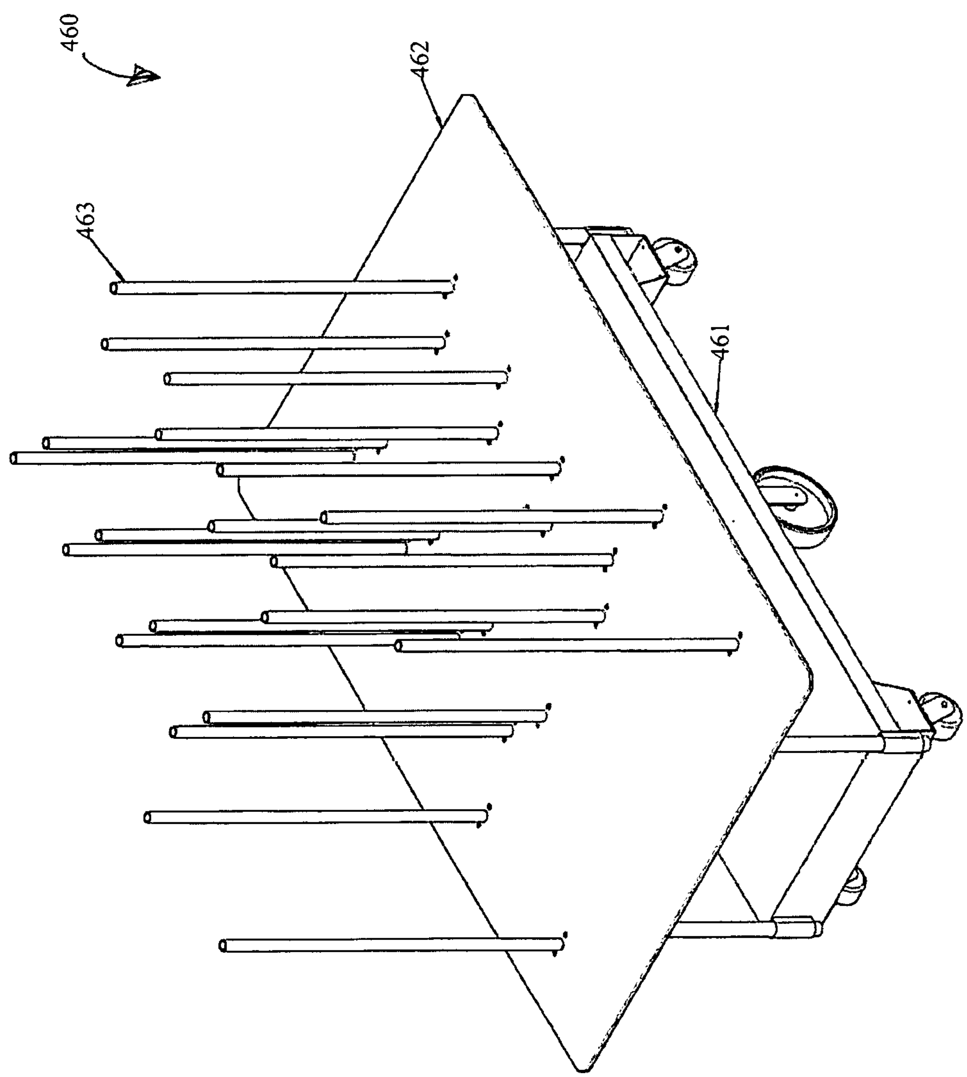
Figure 113:
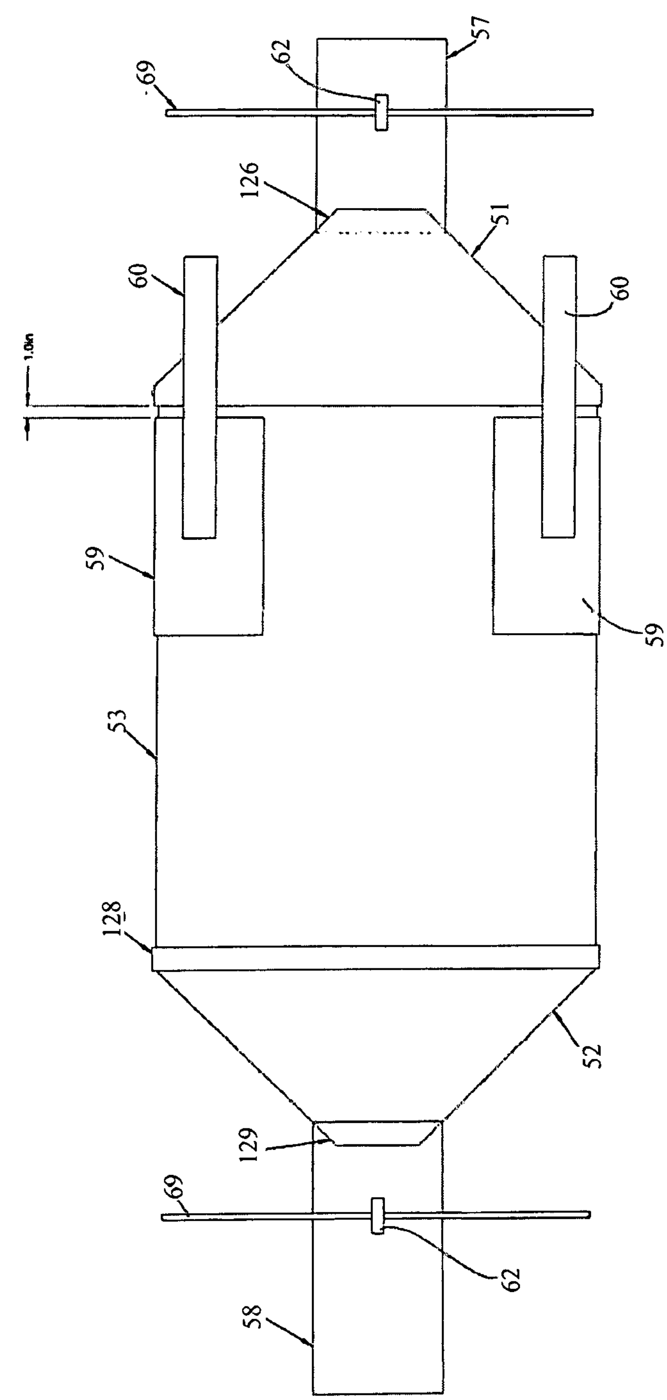
Figure 114:
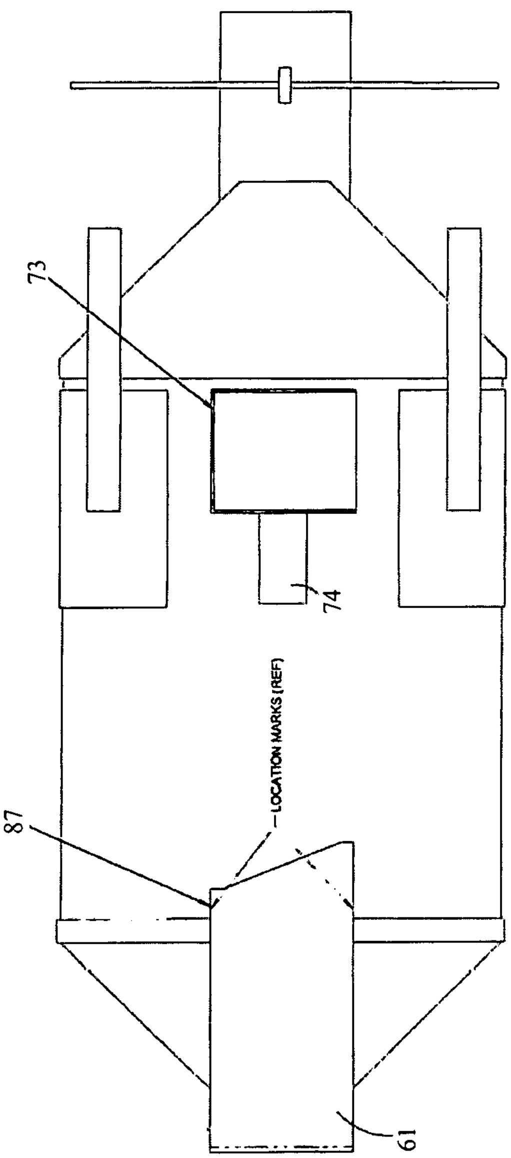
Figure 115A:
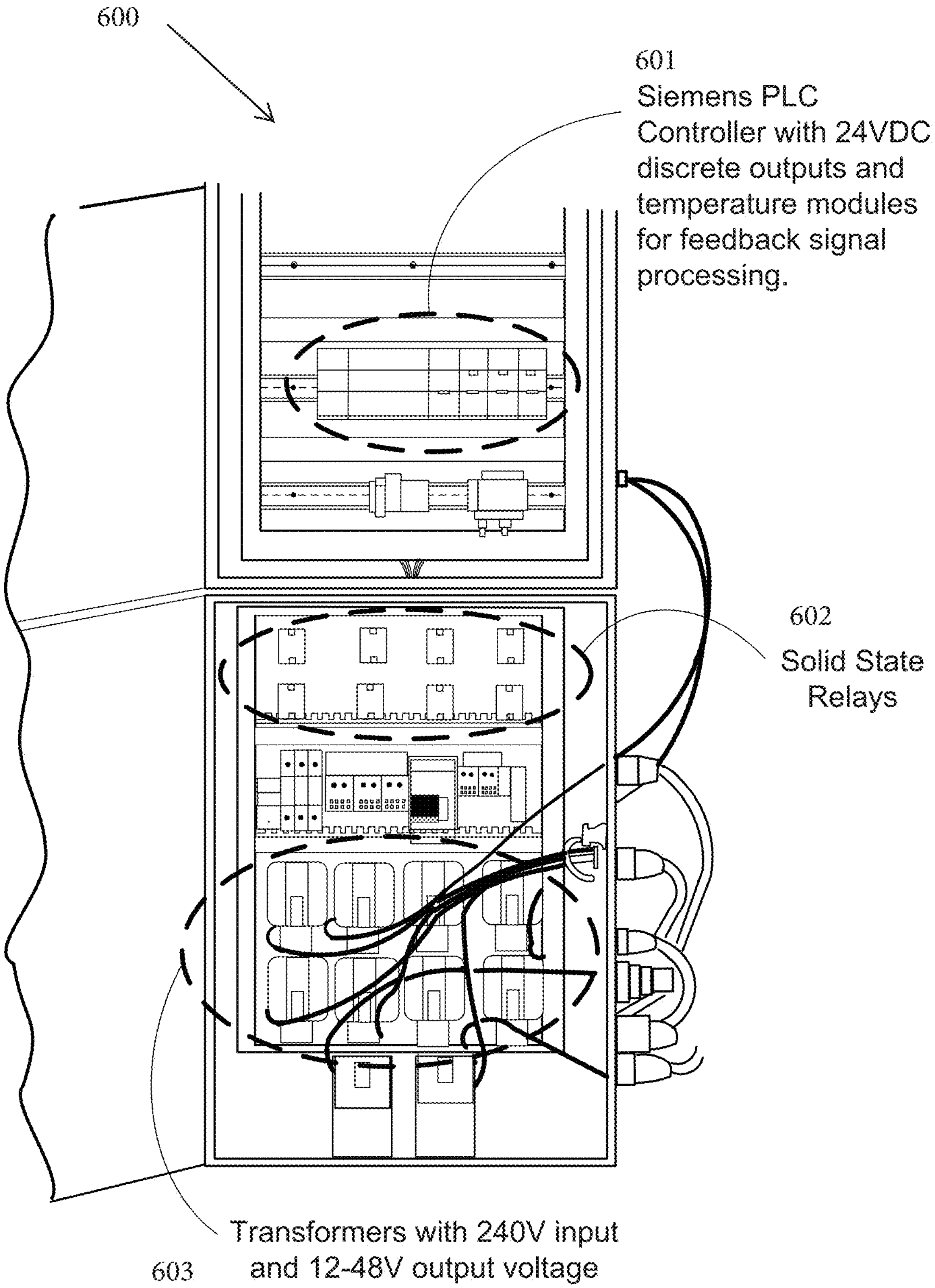
Figure 115C:
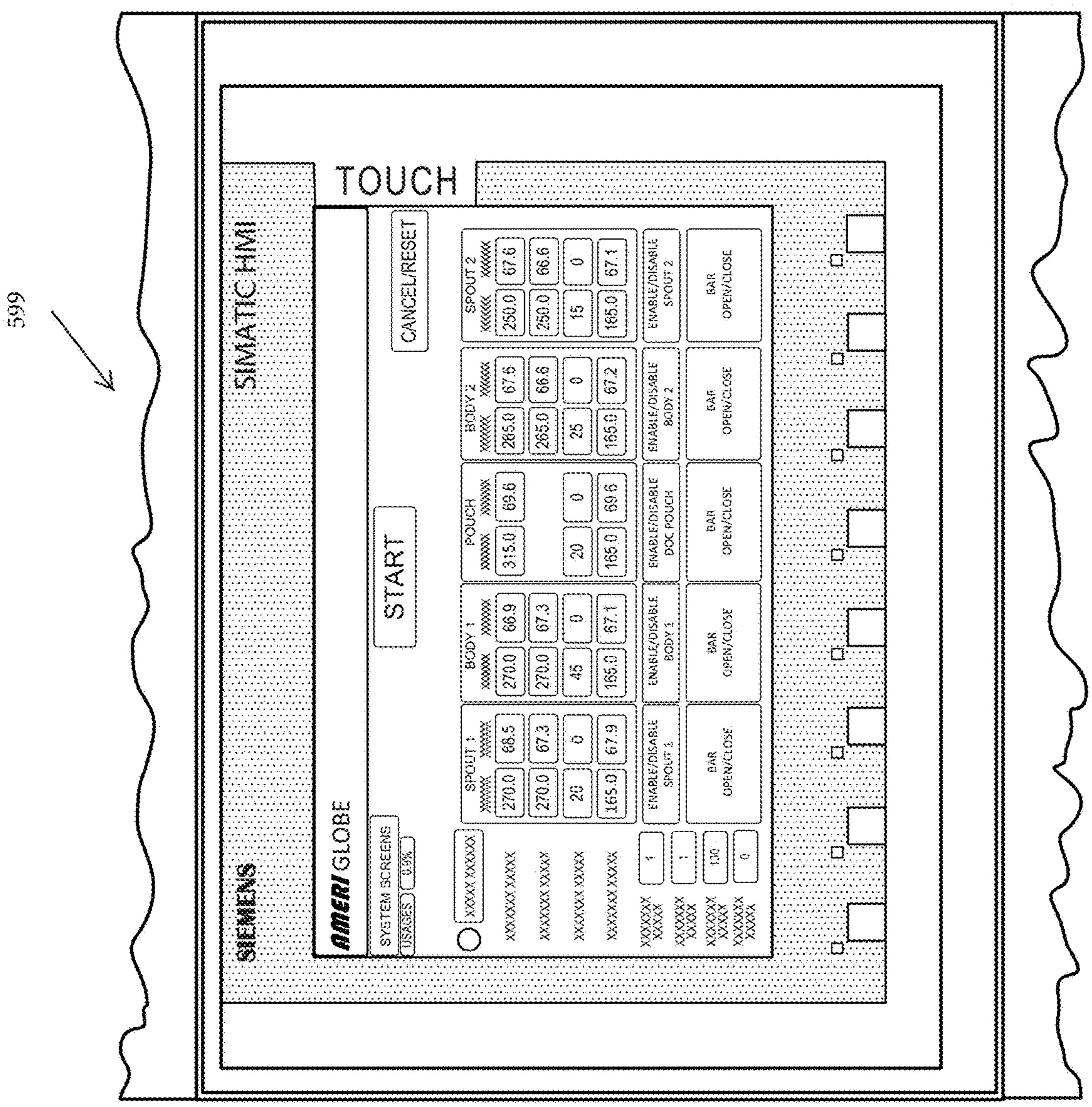
Figure 115B:
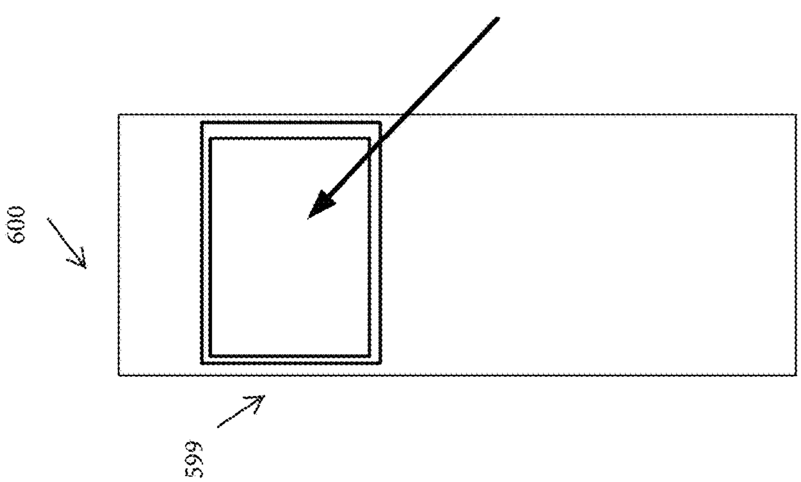
Figure 116:
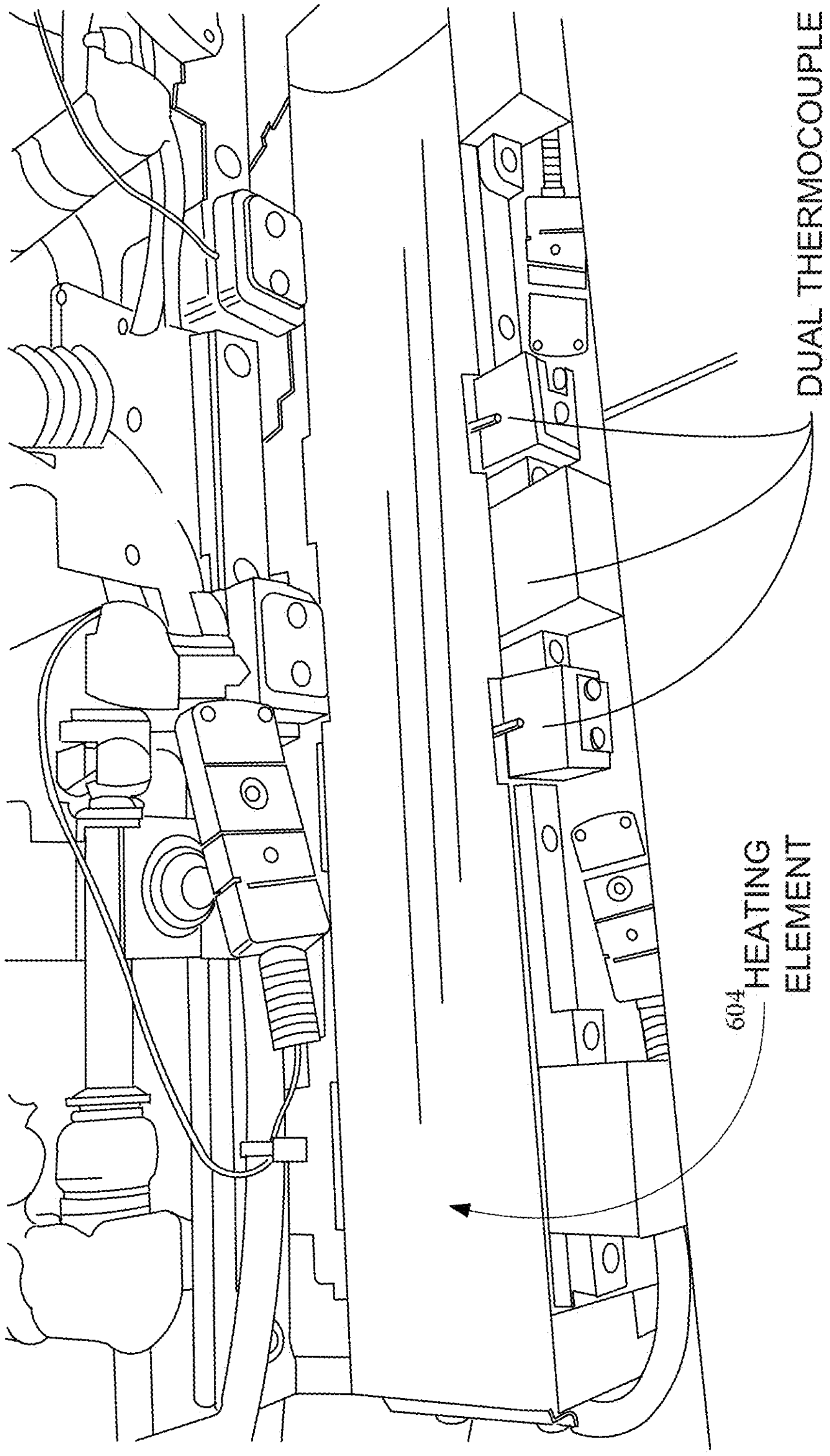
Figure 117:
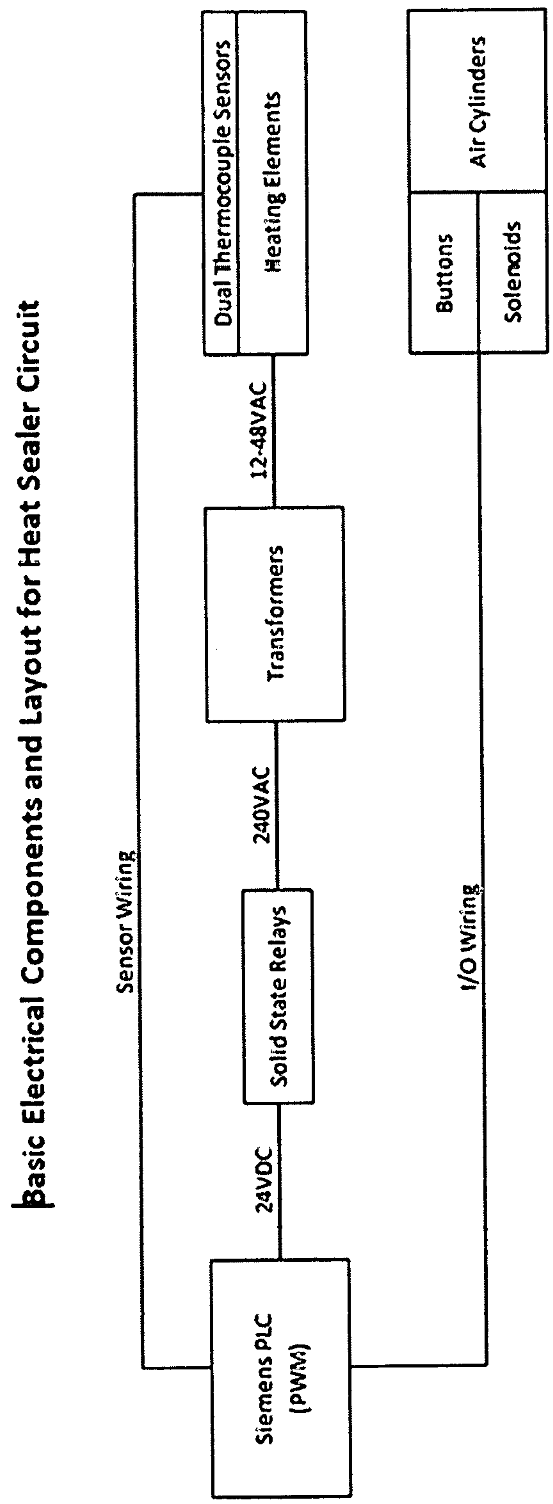
Figure 118:
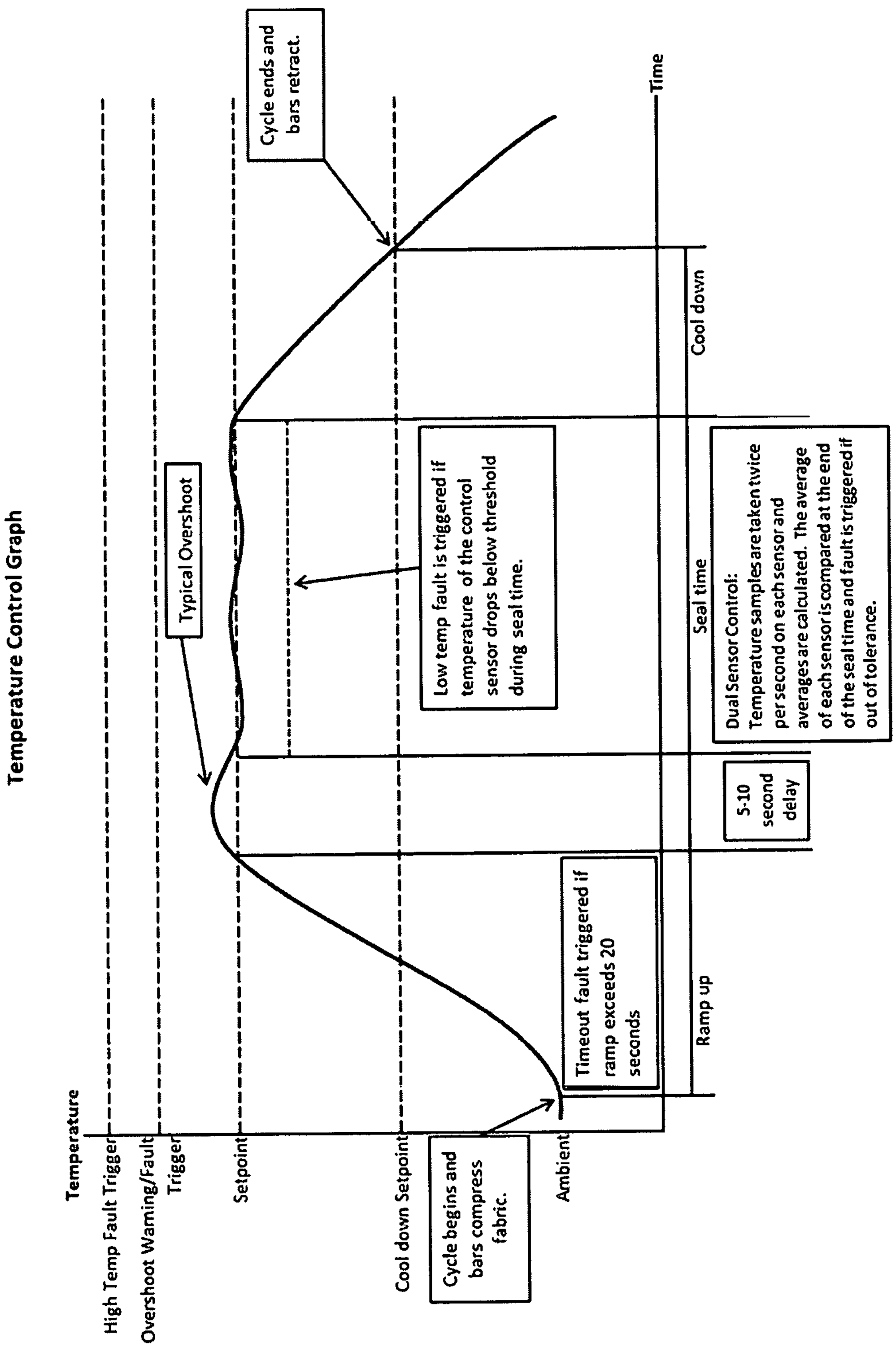
Figure 121:
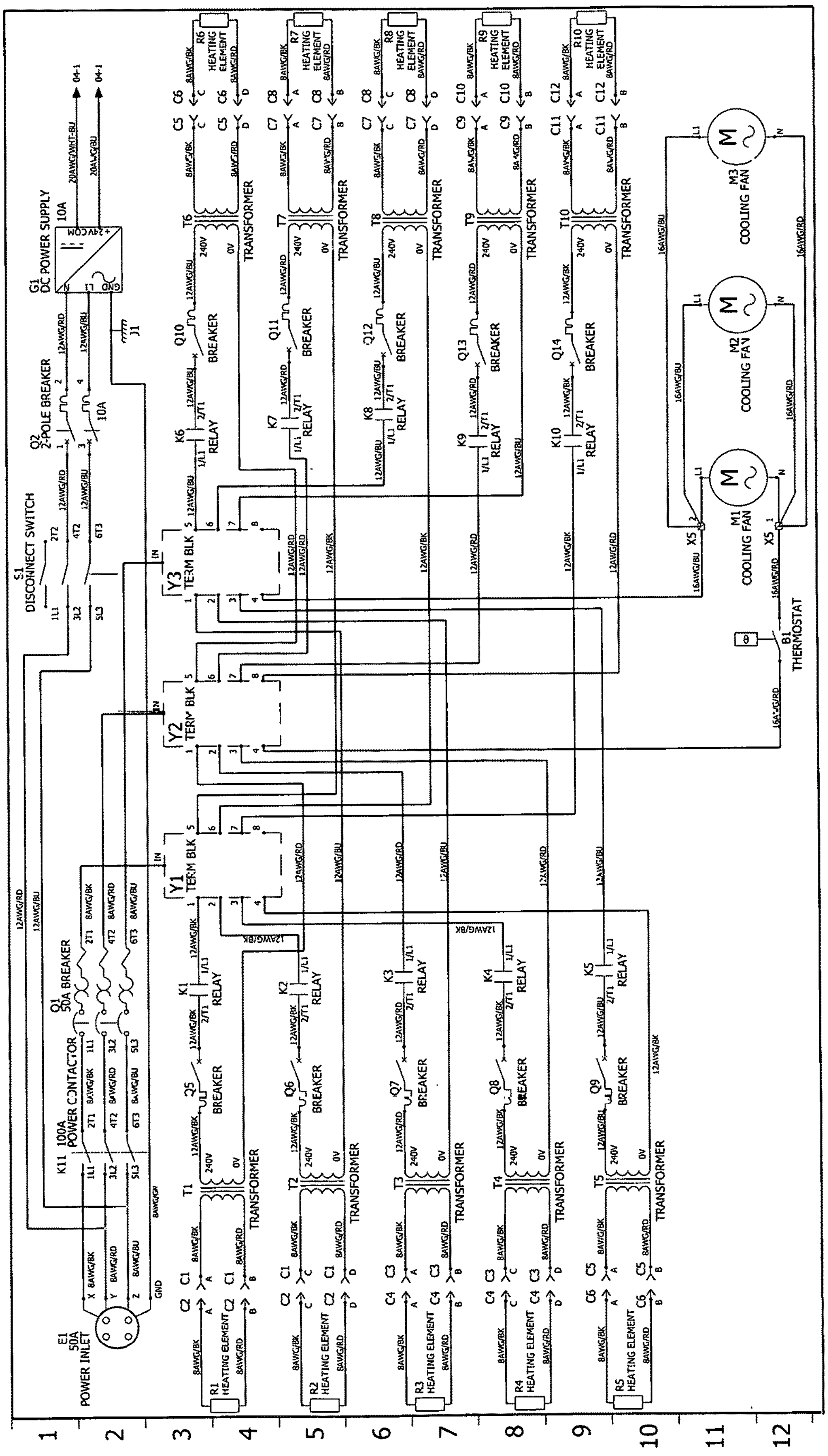
Figure 122:
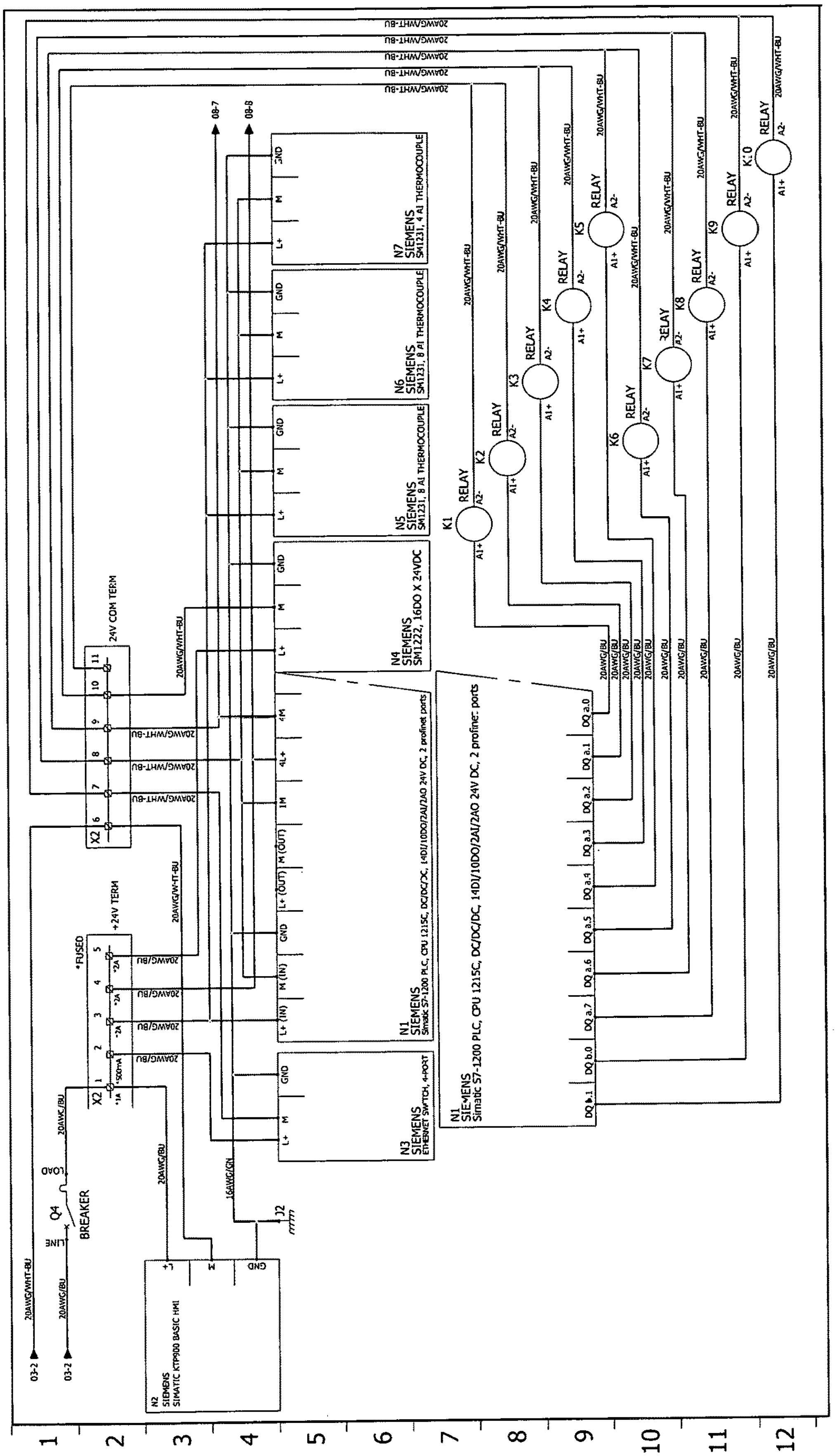
Figure 123:
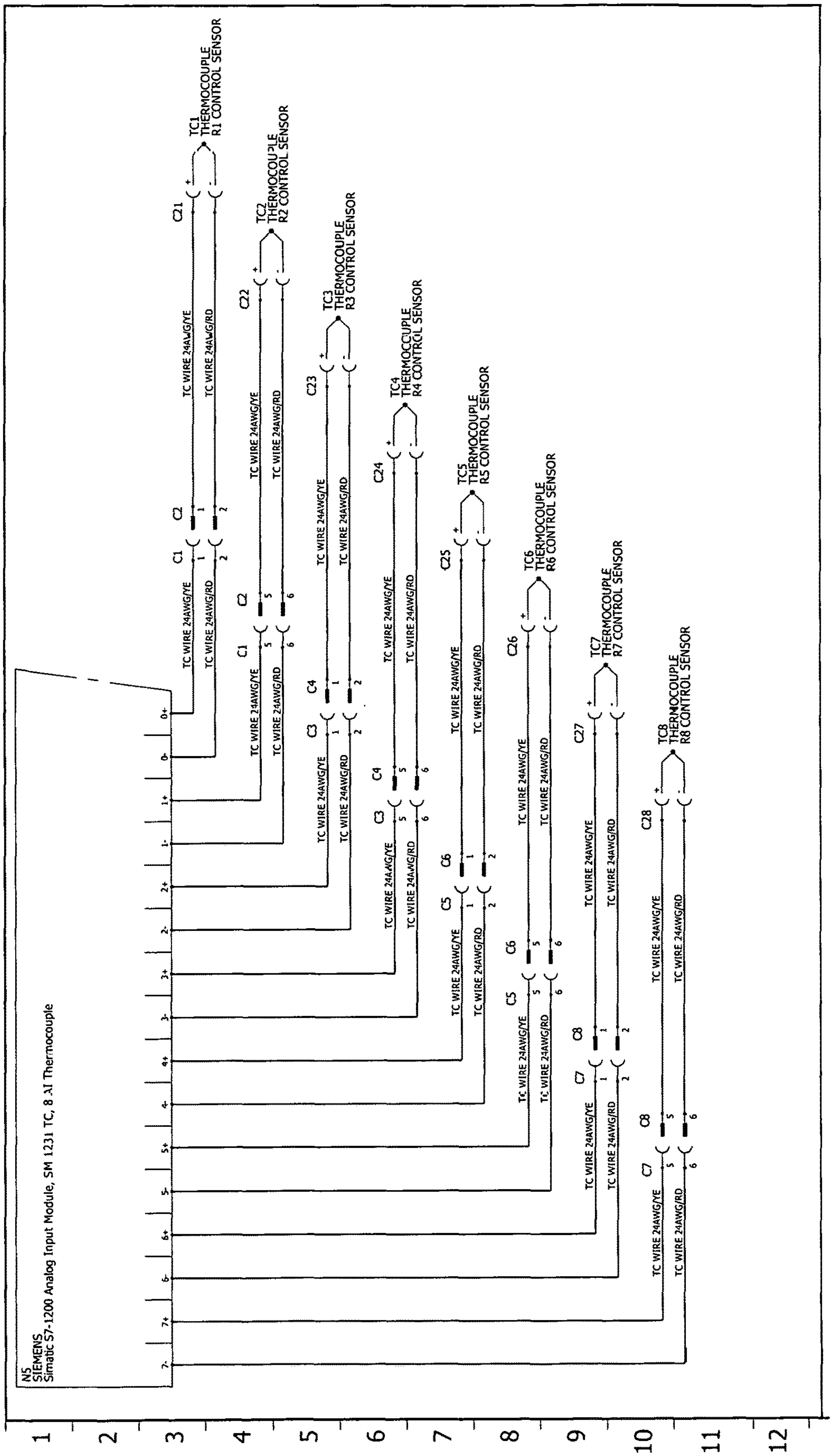
Figure 124:
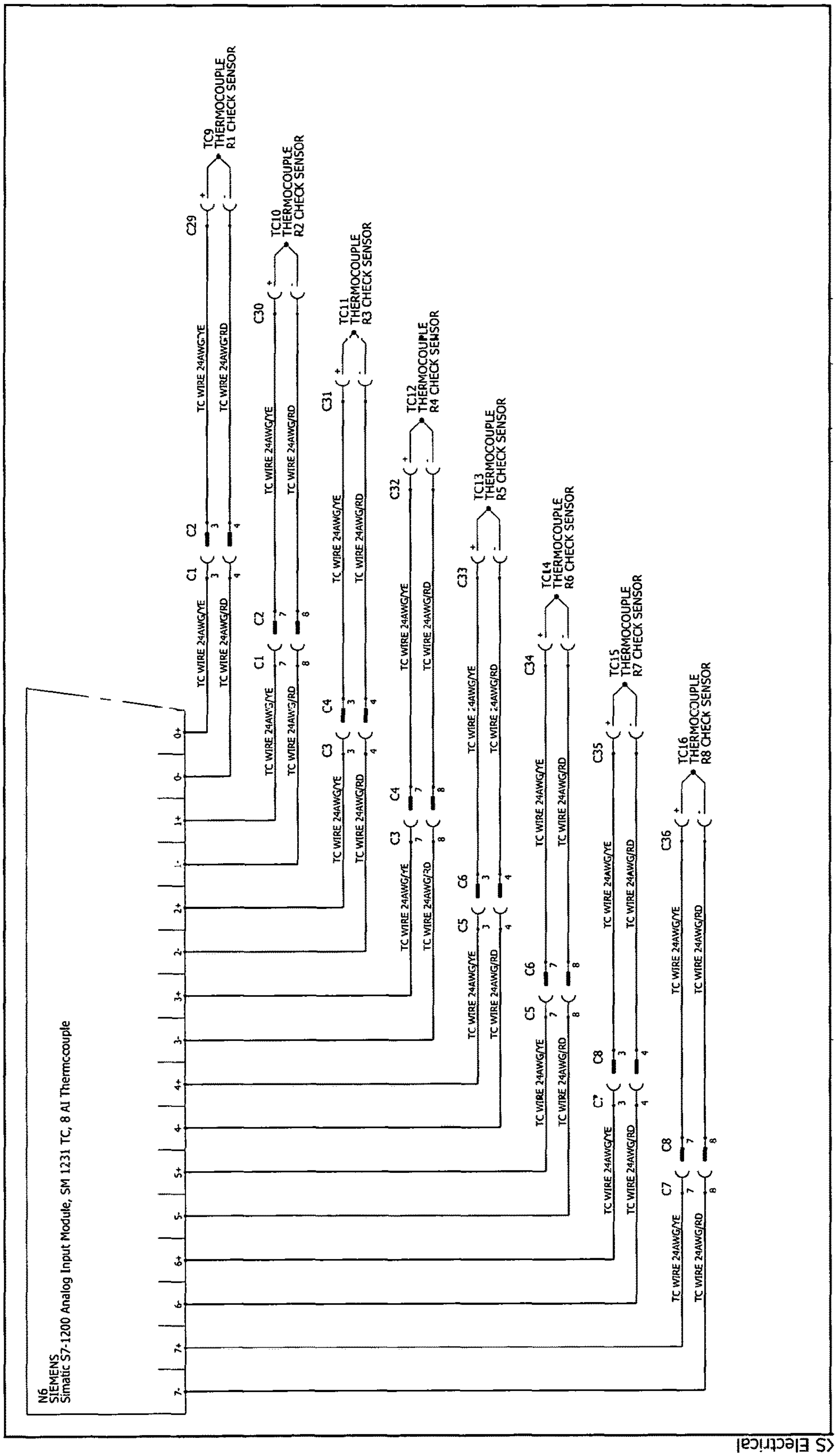
Figure 125:
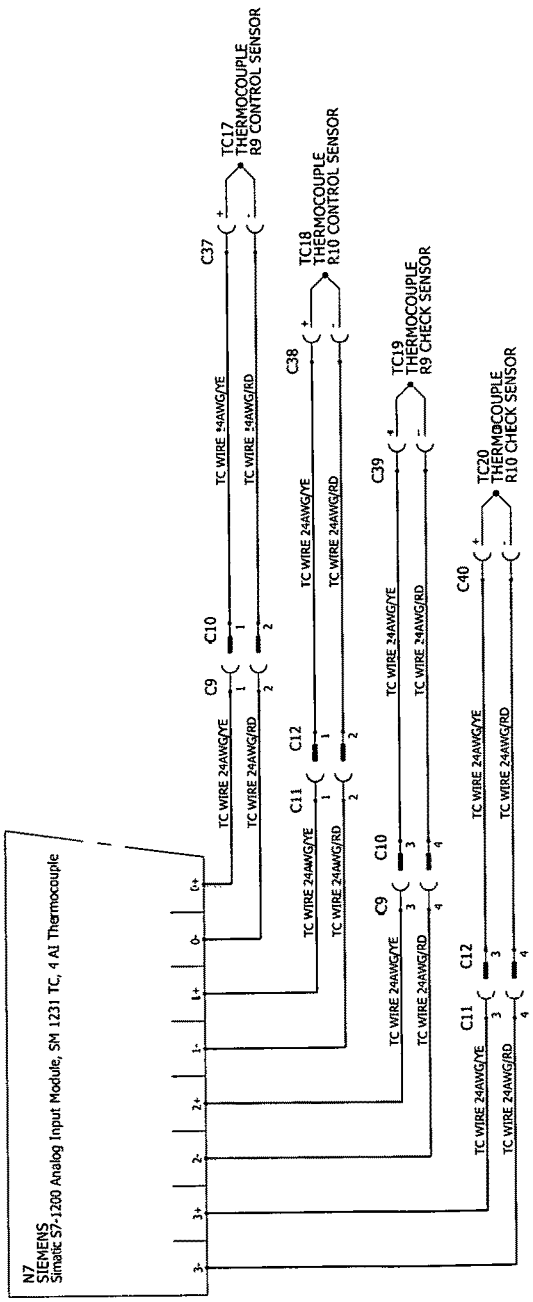
Figure 126:
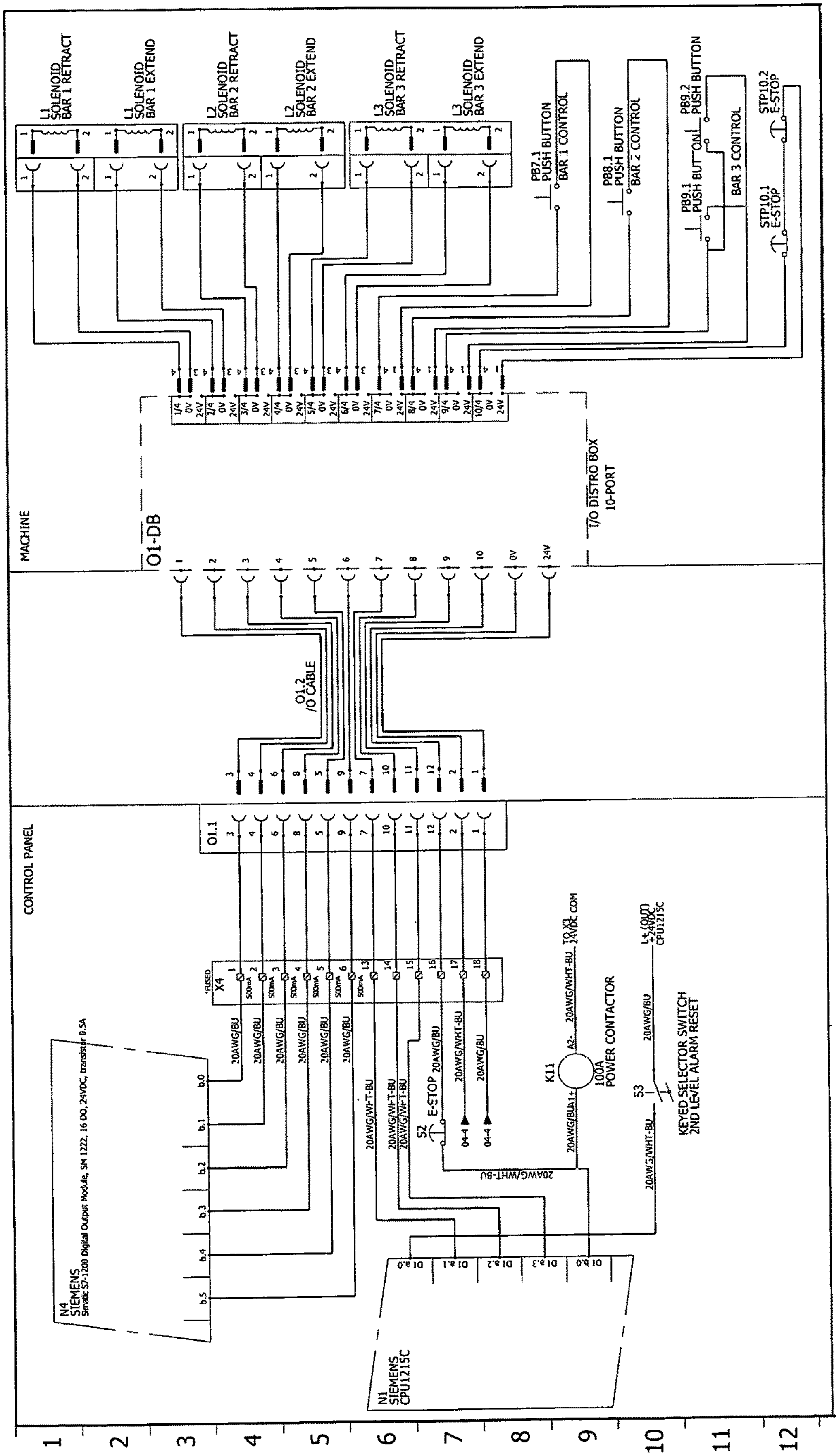
Figure 127:
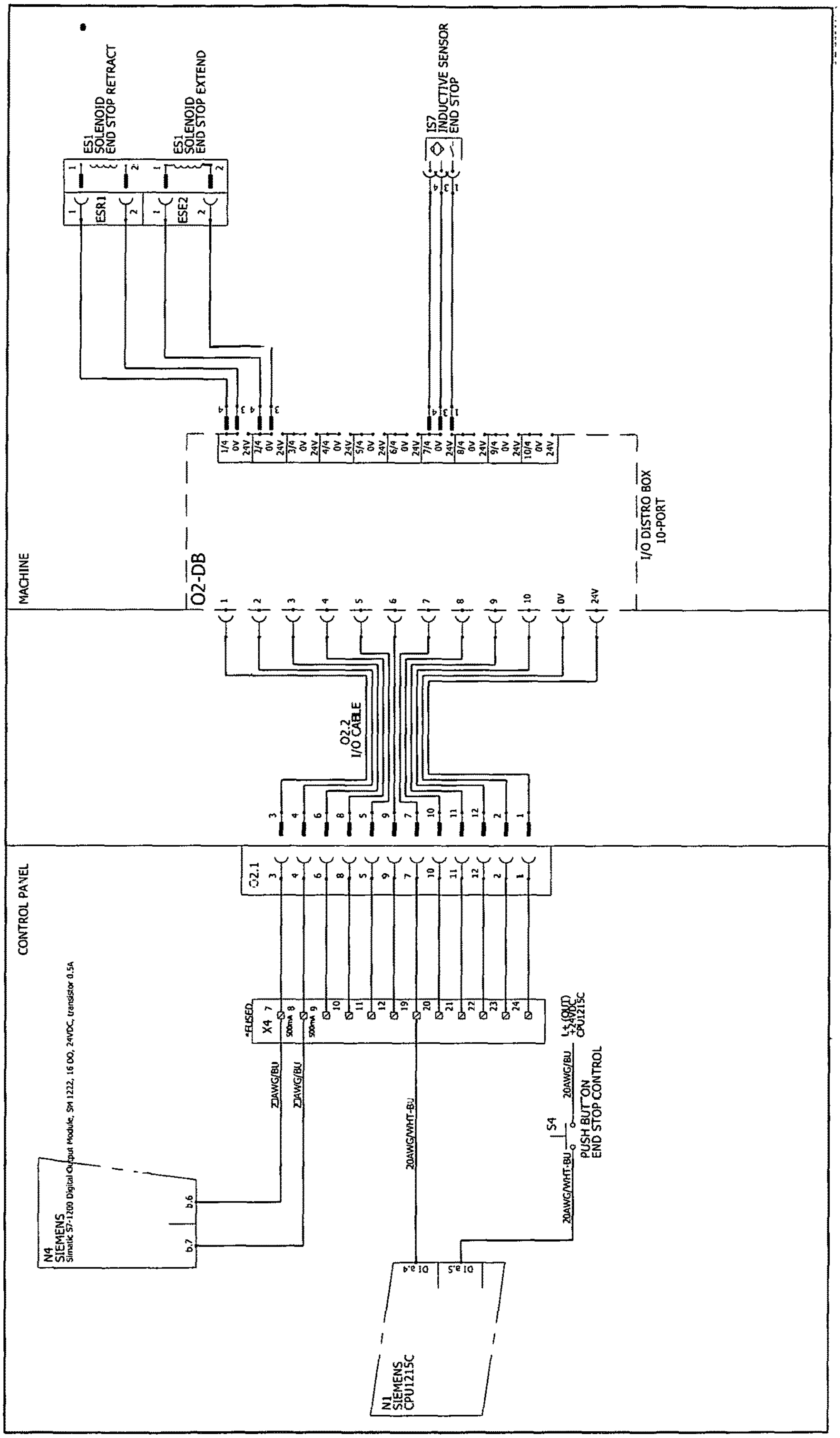
Figure 128:
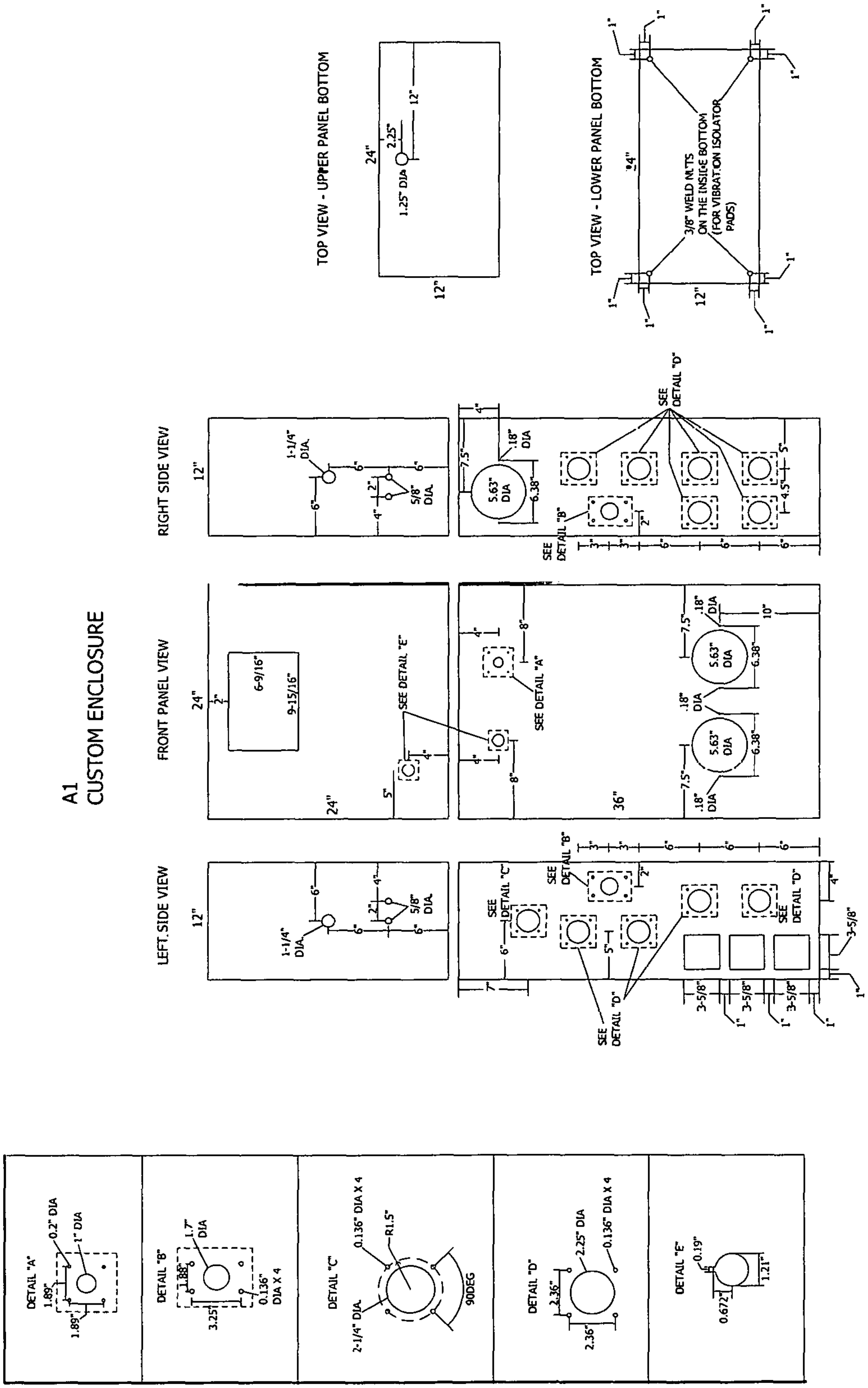
Figure 129:
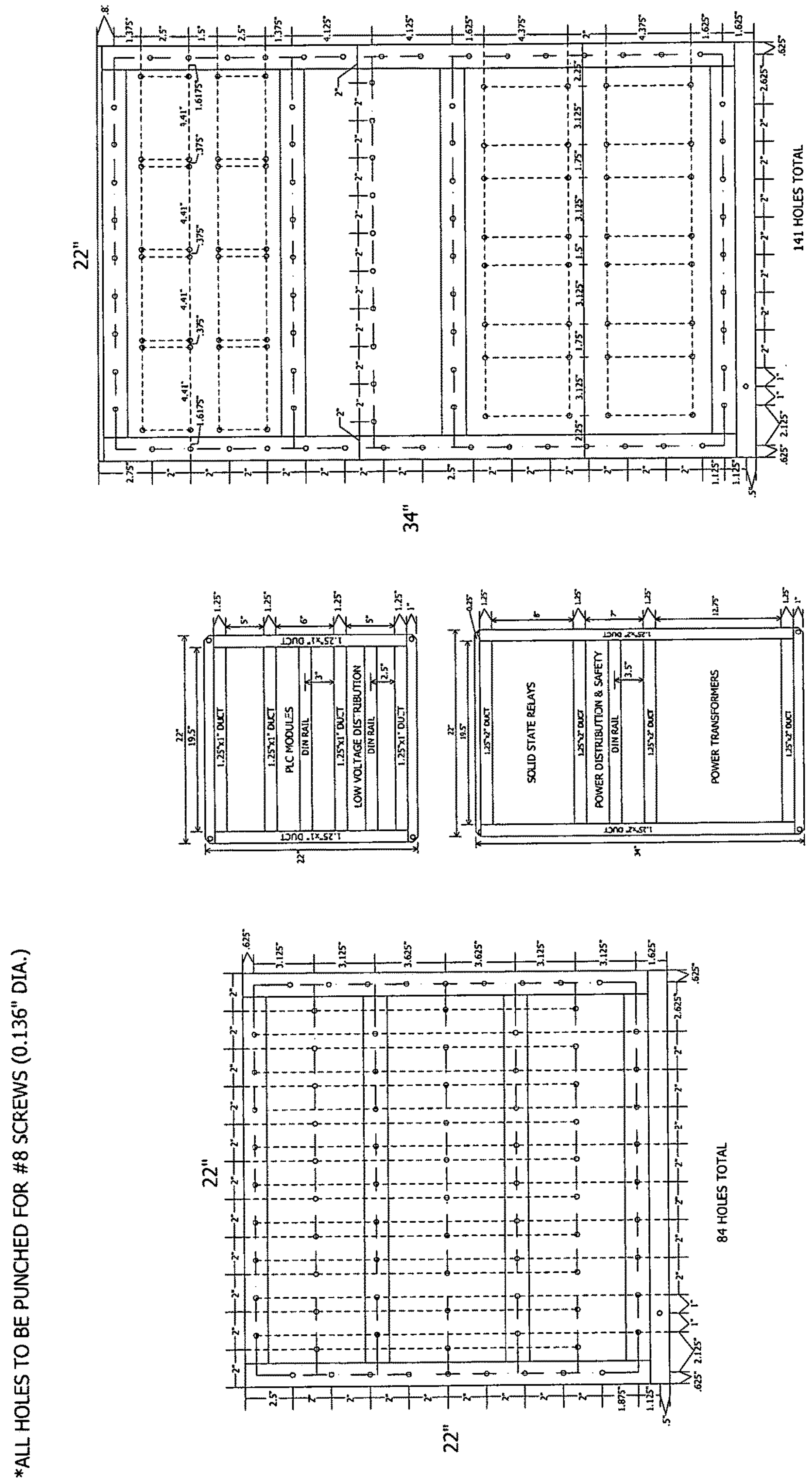
Figure 130:
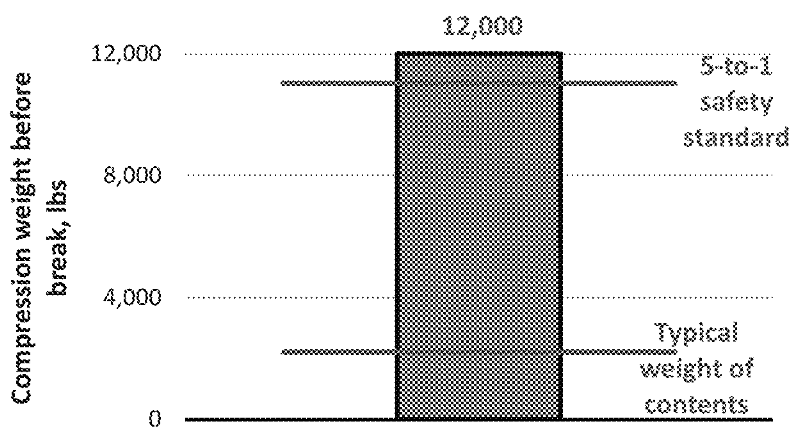
Figure 132:
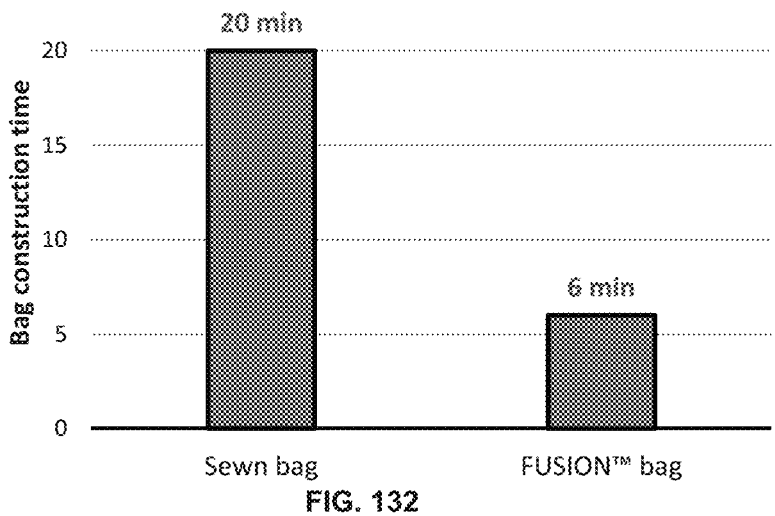
Figure 133:
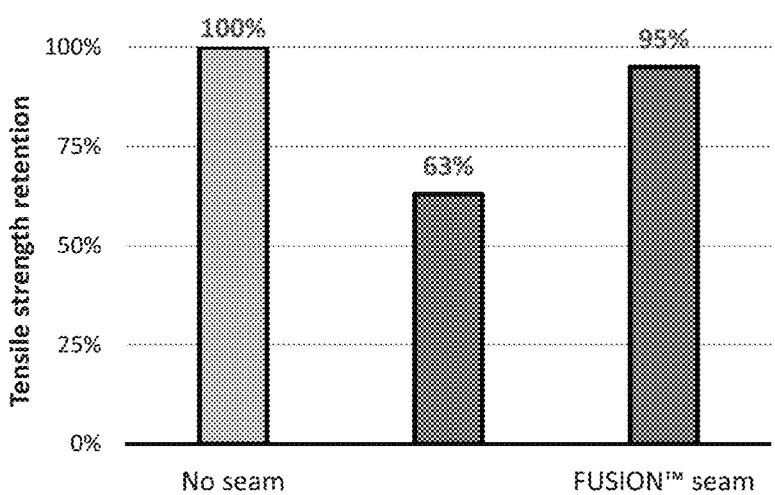
Figure 134:
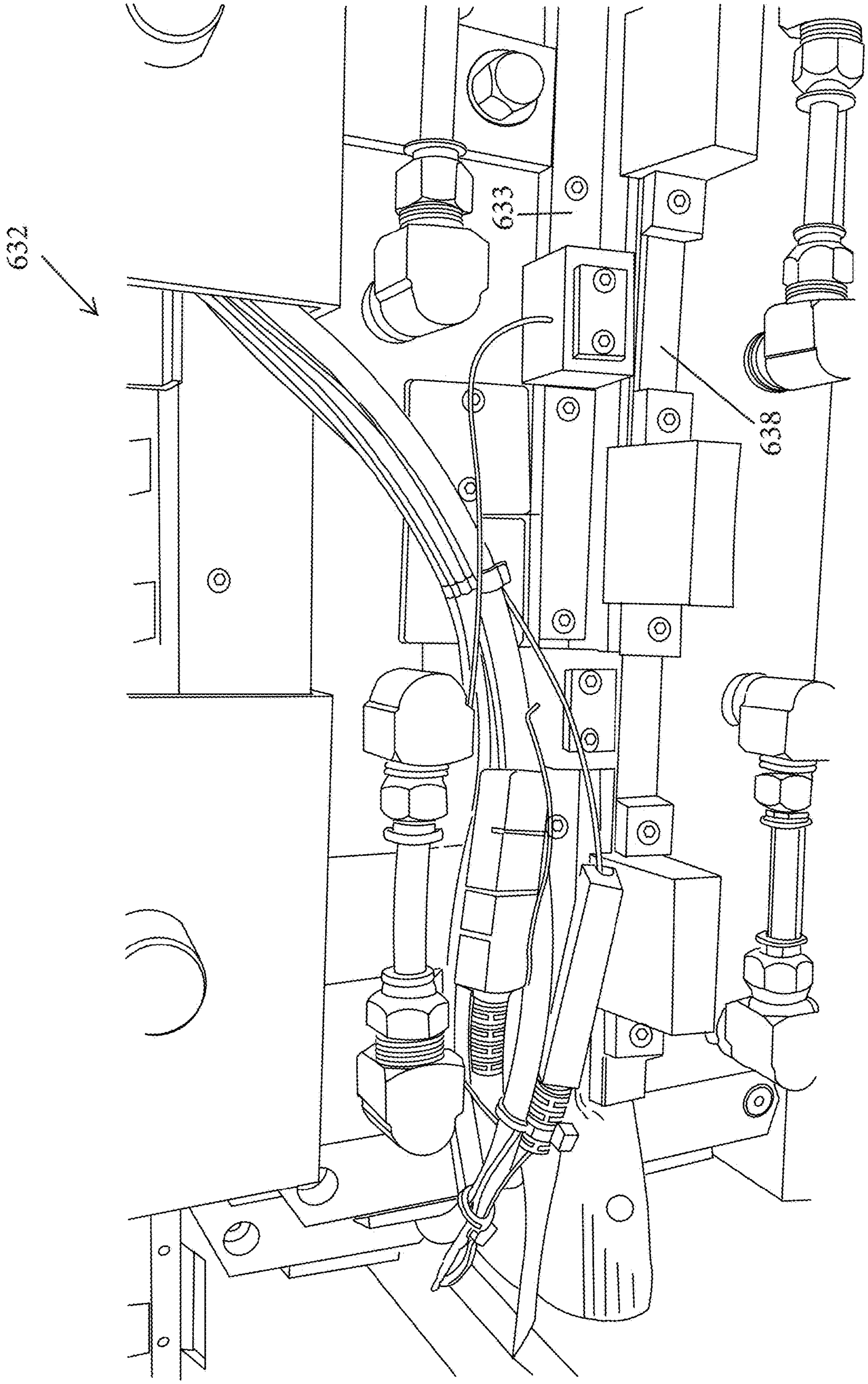
Figure 135:
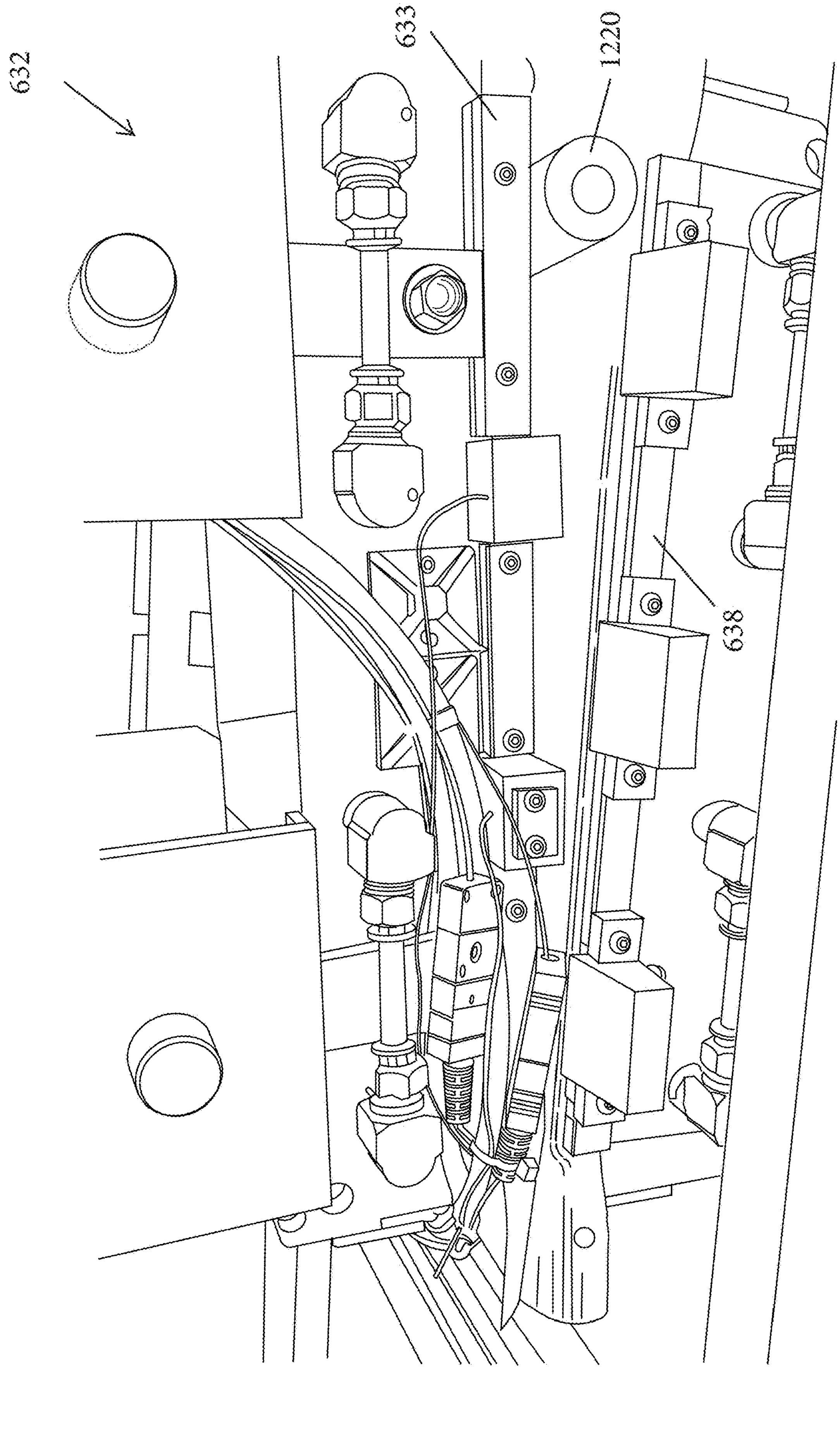
Figure 136:
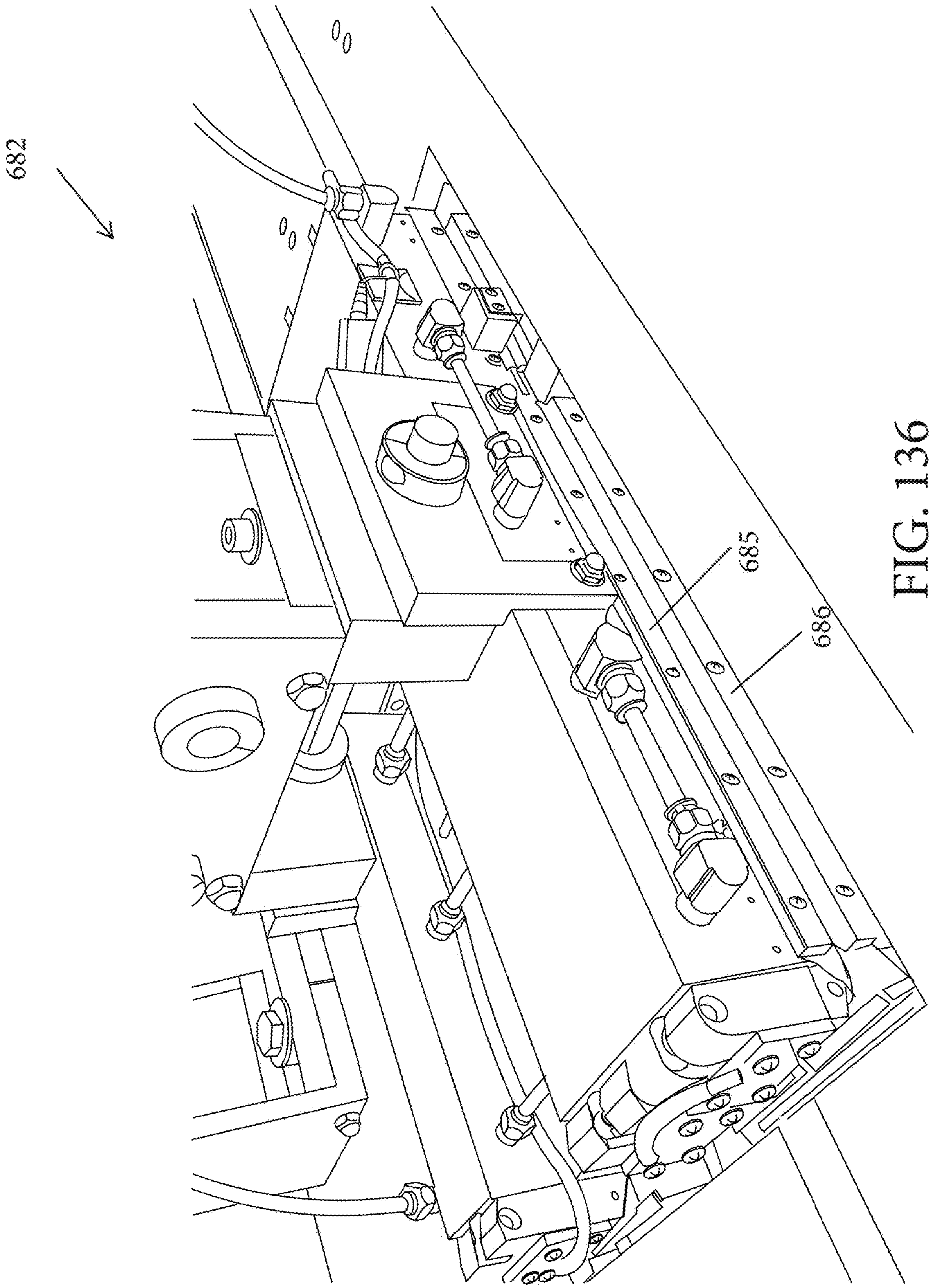
Figure 137:
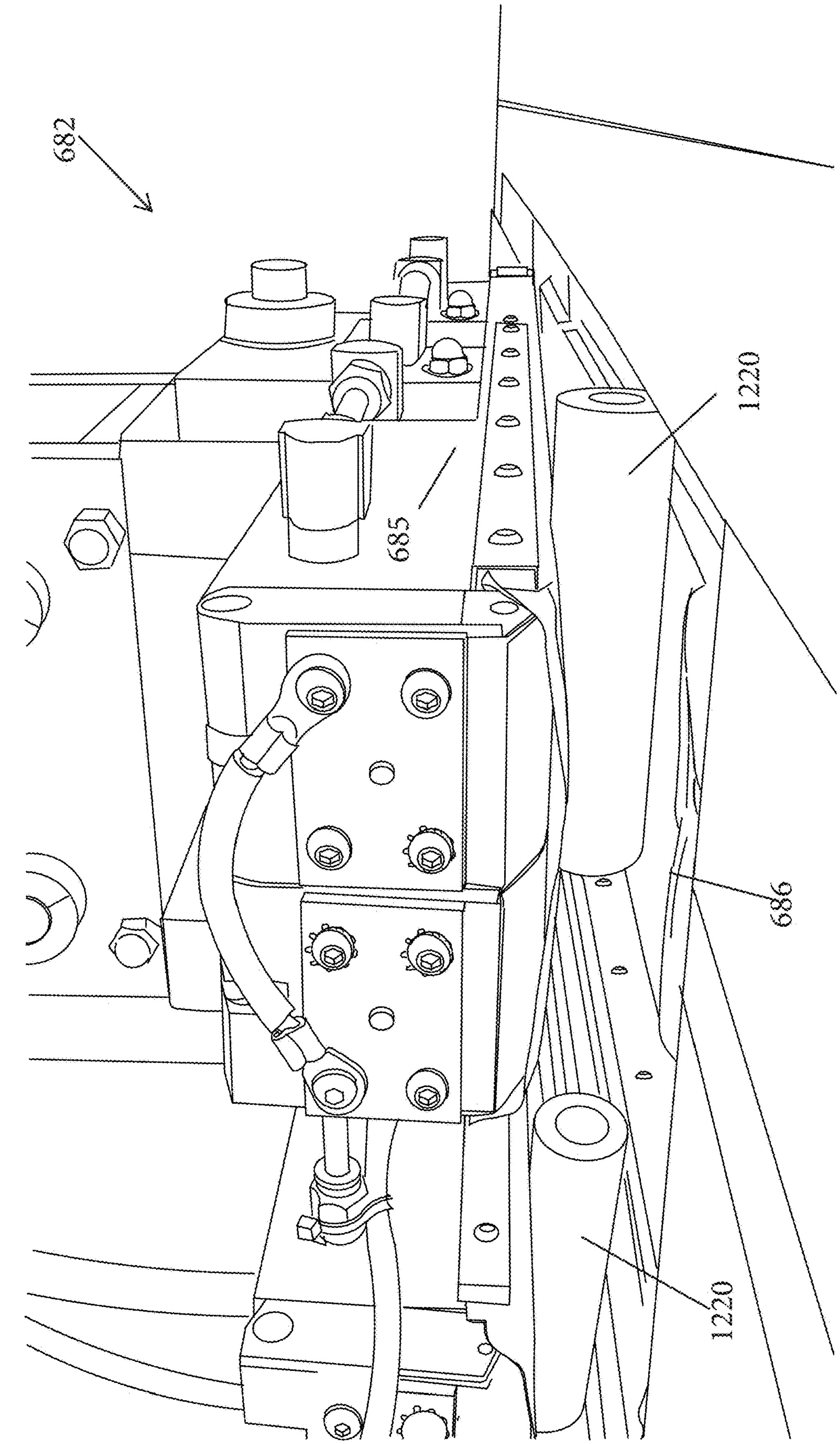
Figure 138:
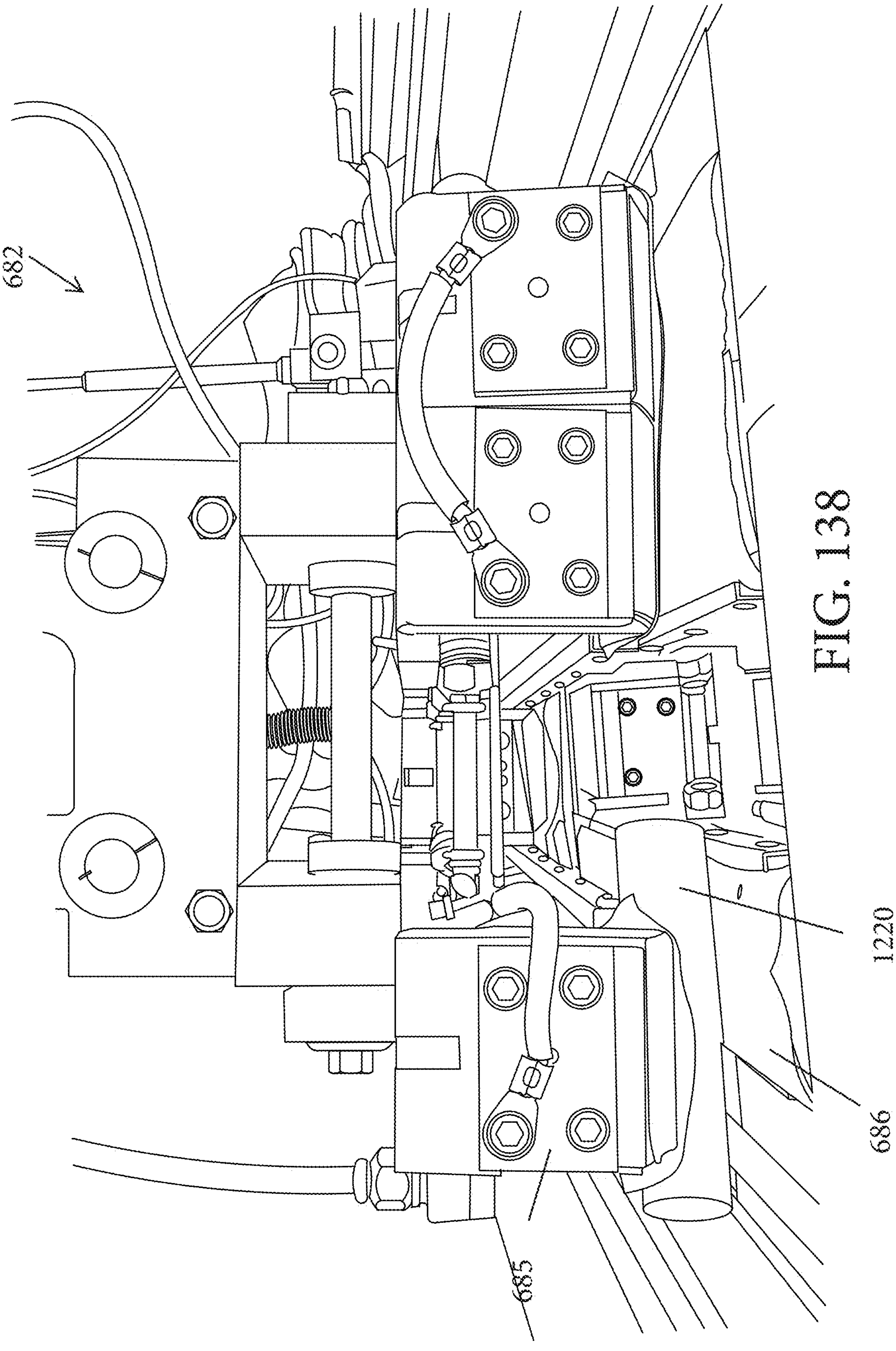
Figure 139:
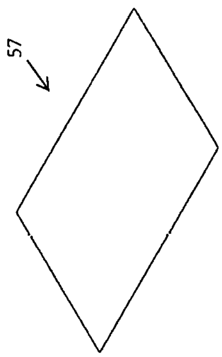
Figure 139B:
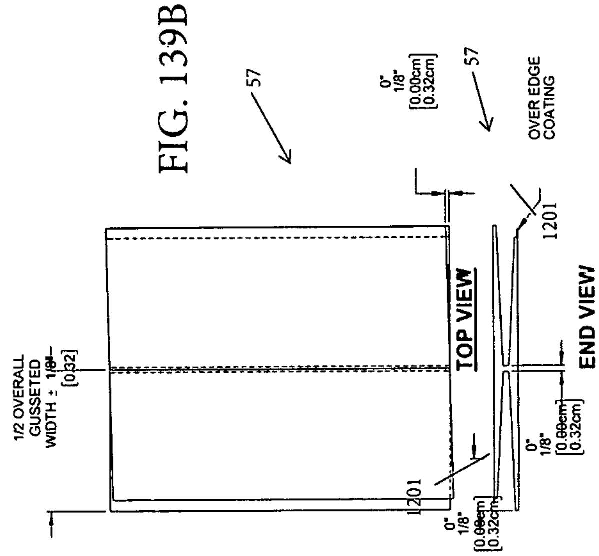
Figure 139A:
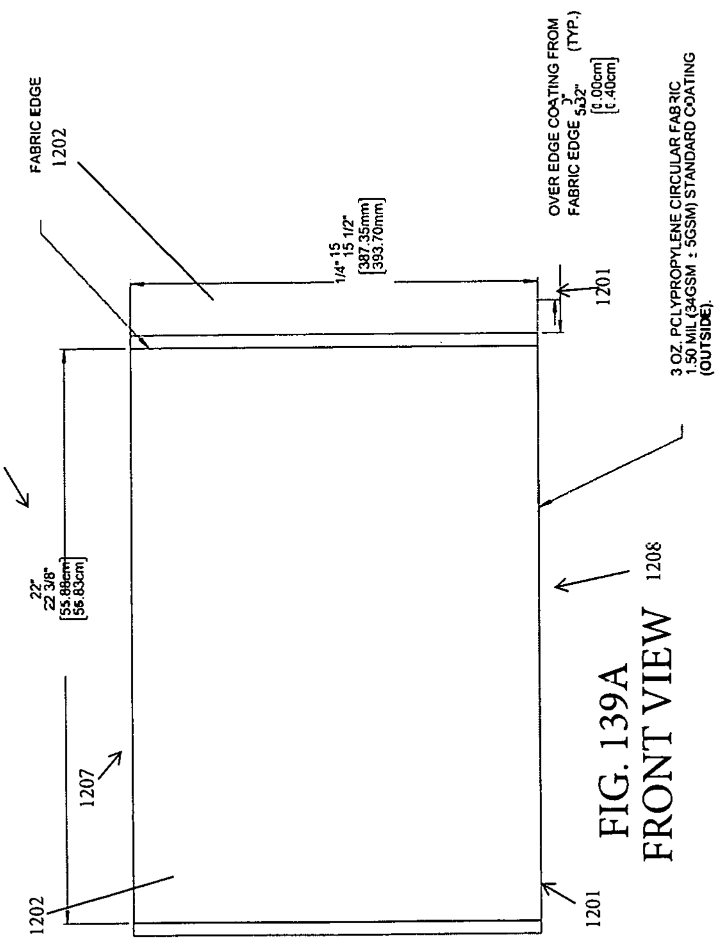
Figure 140:
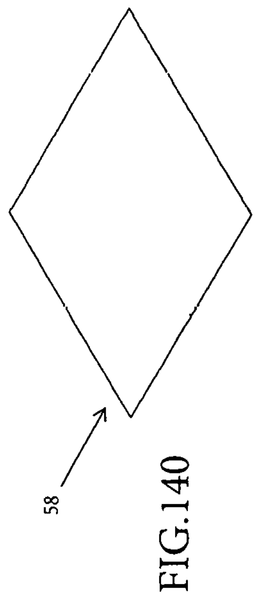
Figure 140B:
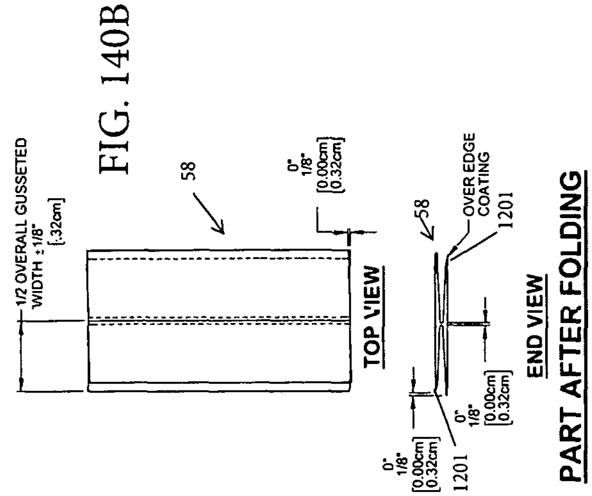
Figure 140A:
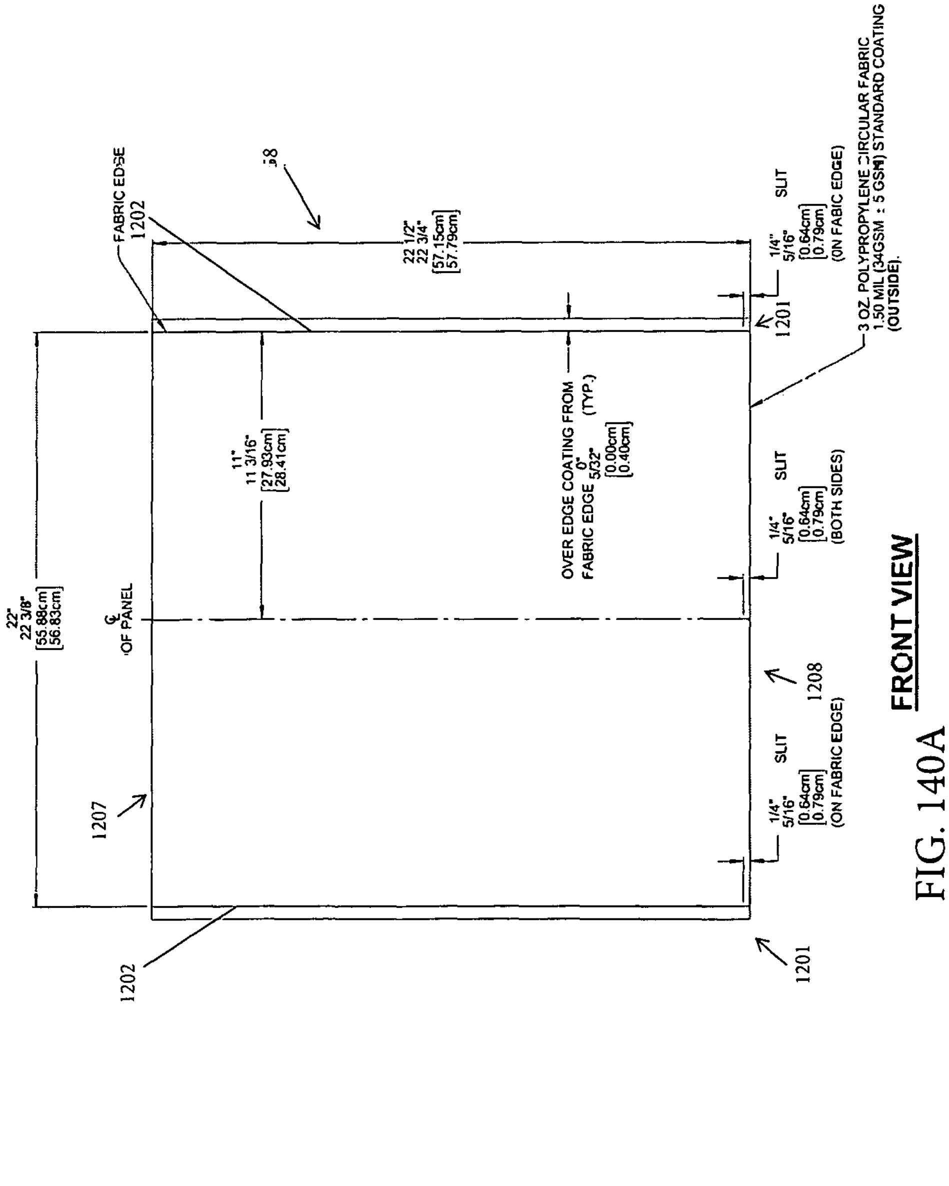
Figures 141, 141A:
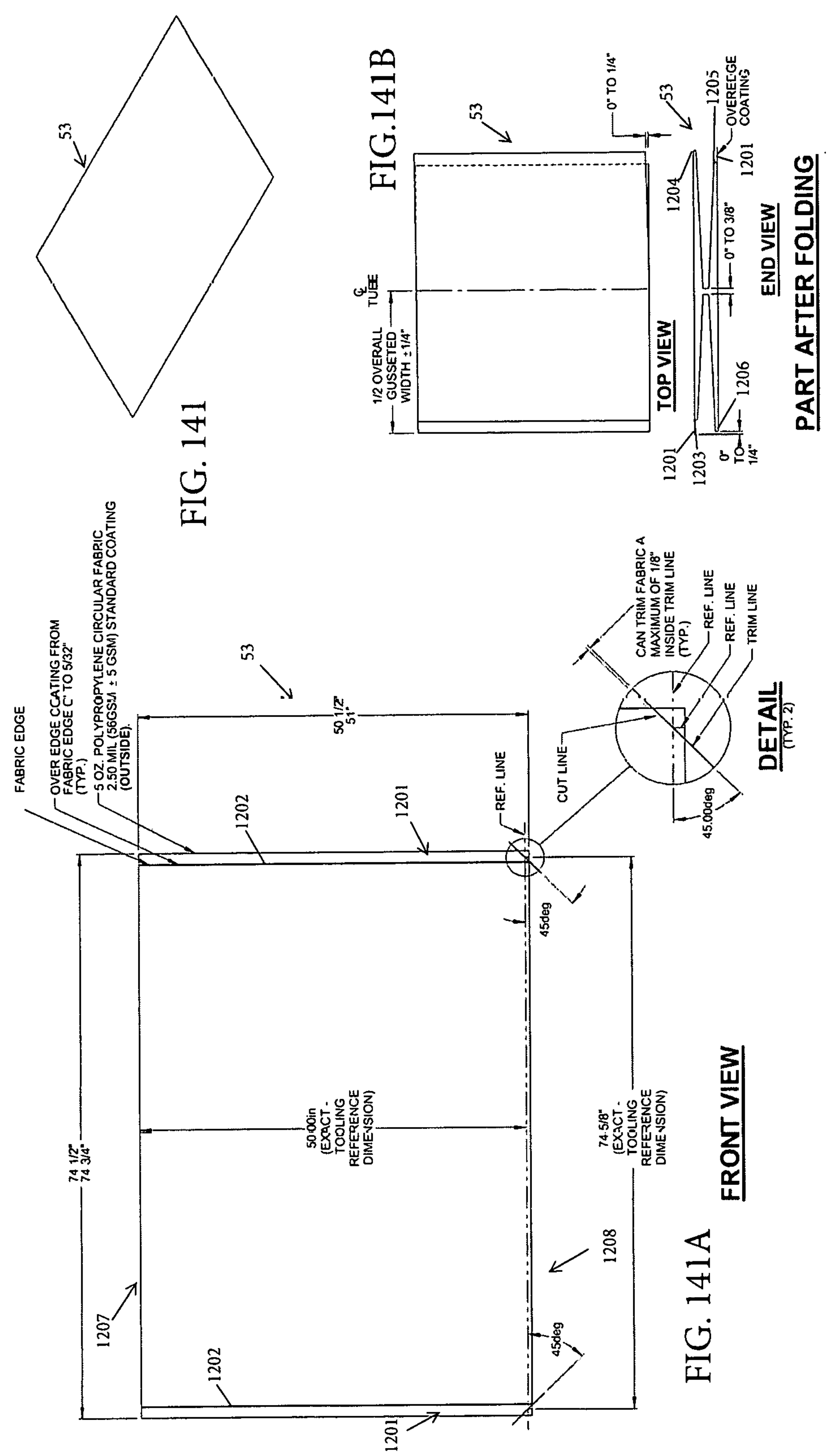
Figure 142B:
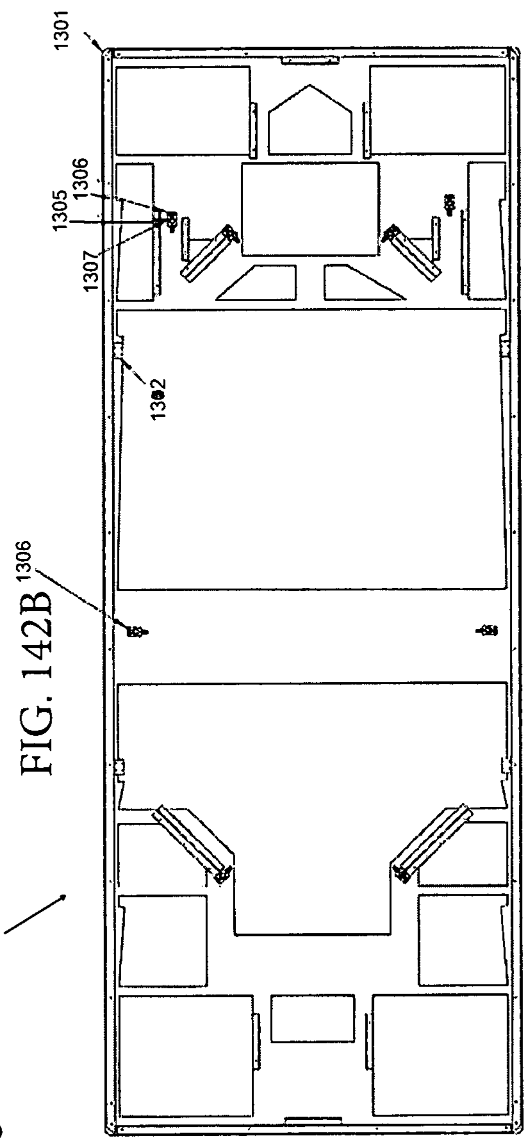
Figure 142A:
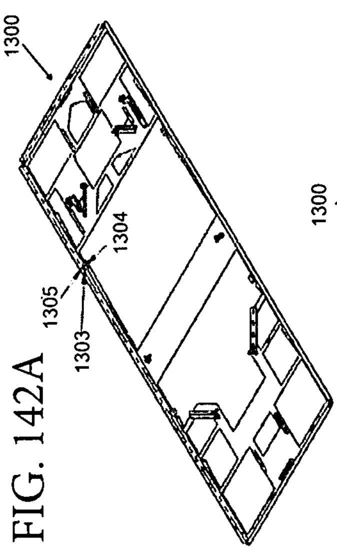
Figure 143:
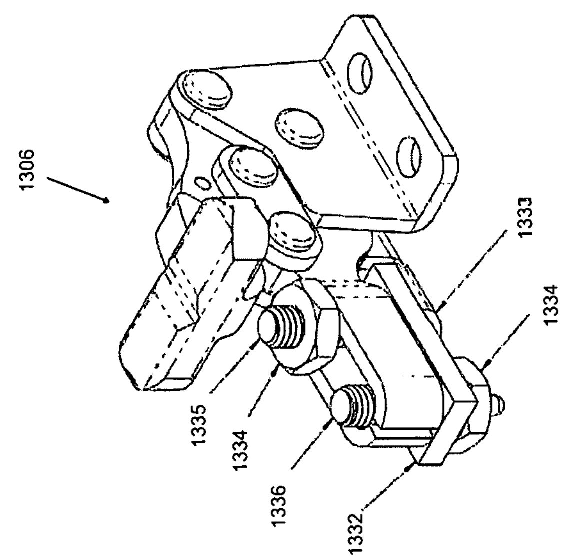
Figure 144:
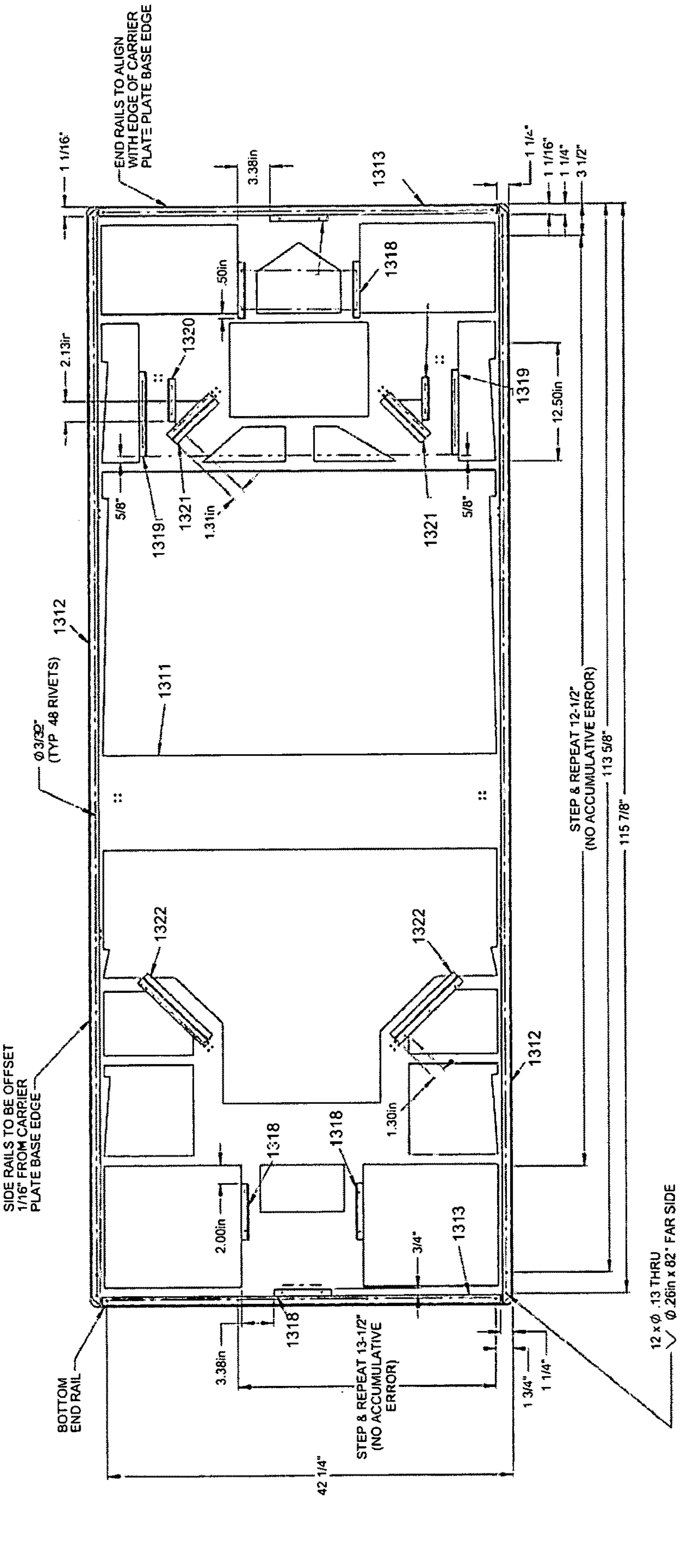
Figure 145:
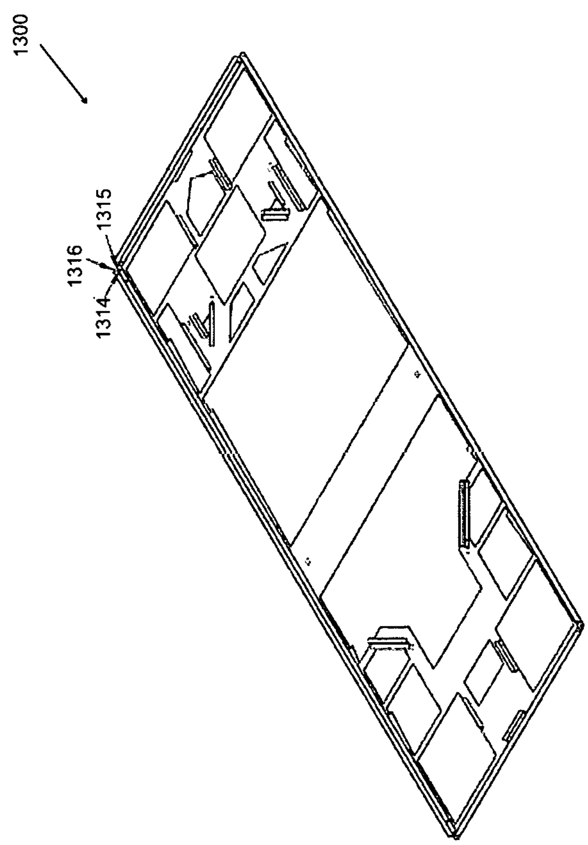
Figures 146A, 146B, 146C, 146D:
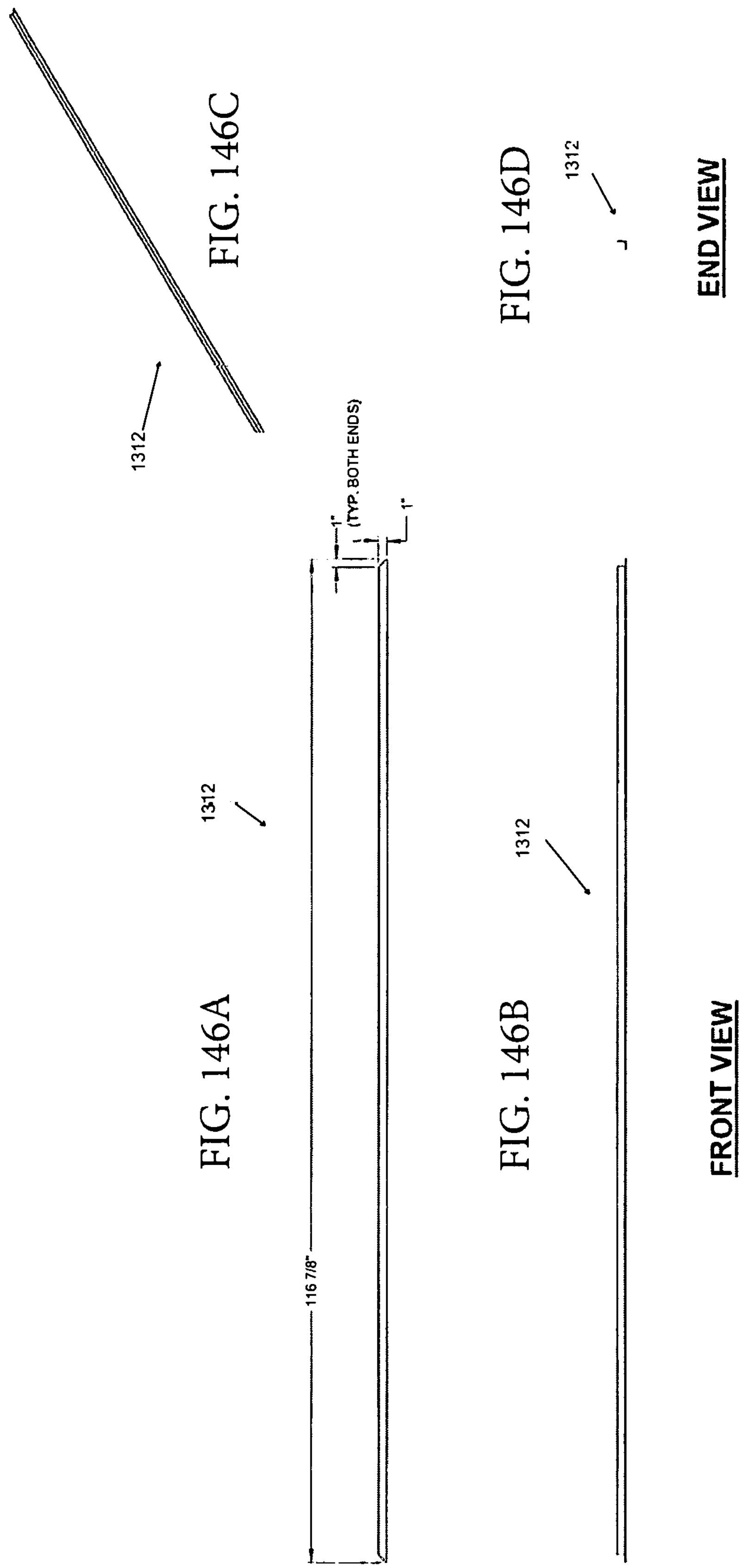
Figure 147B:
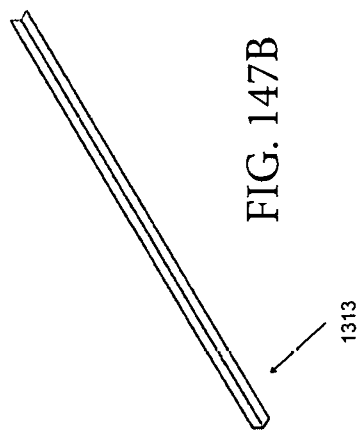
Figure 147C:
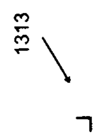
Figure 147A:
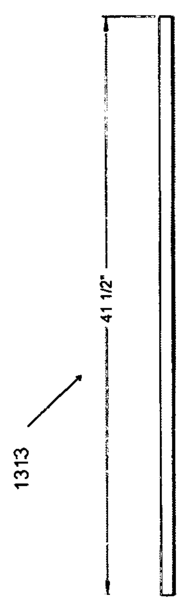
Figure 148C:
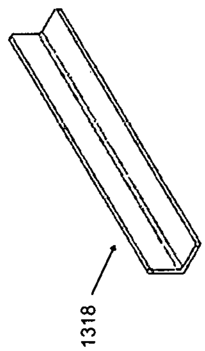
Figure 148D:
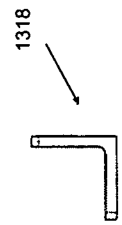
Figure 148A:
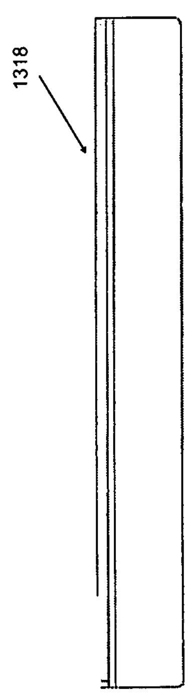
Figure 148B:
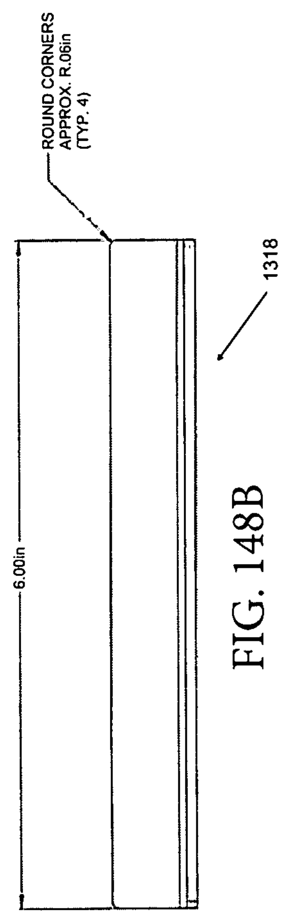
Figure 149C:
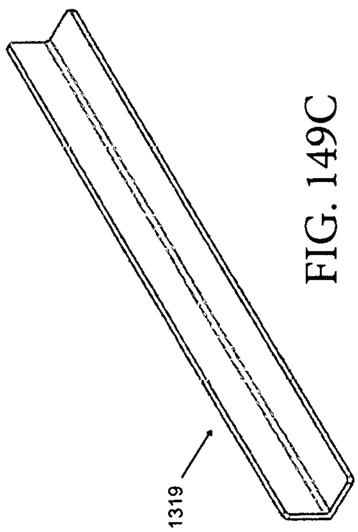
Figure 149D:
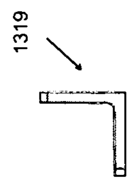
Figure 149A:
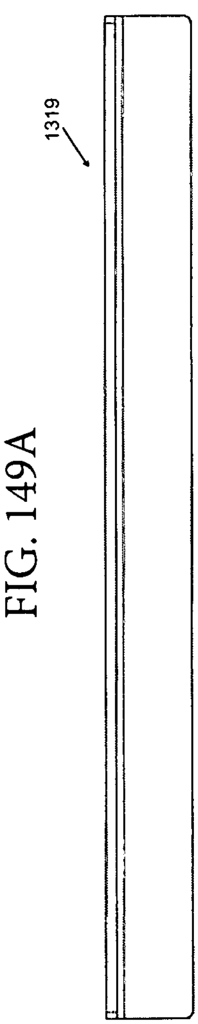
Figure 149B:
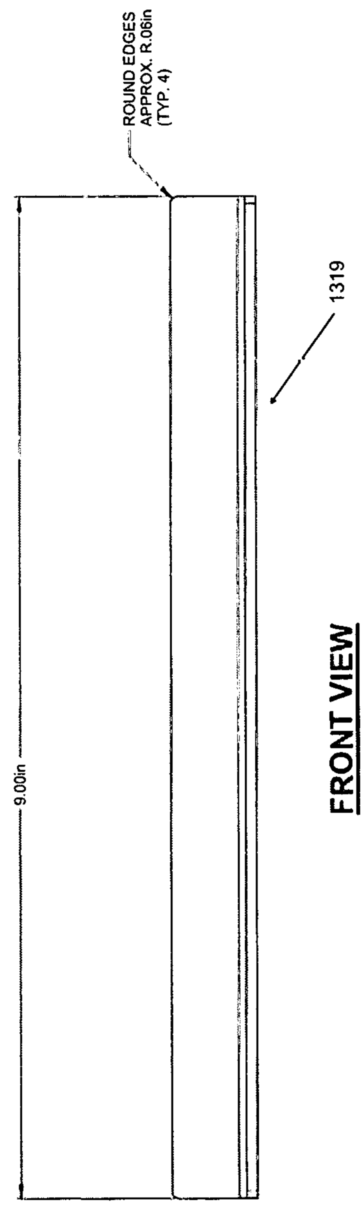
Figure 150C:
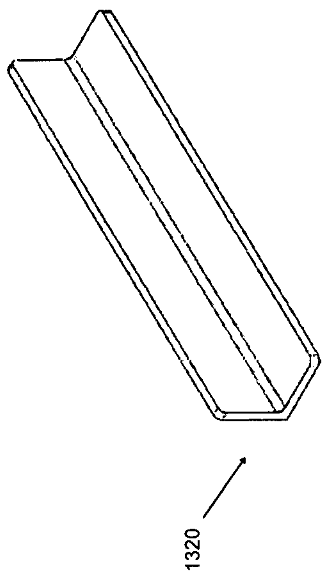
Figure 150D:
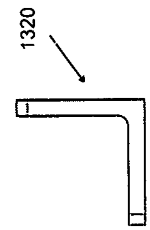
Figure 150A:
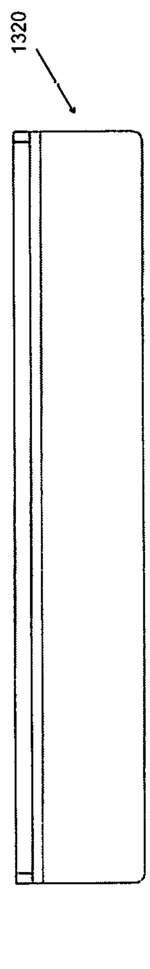
Figure 150B:
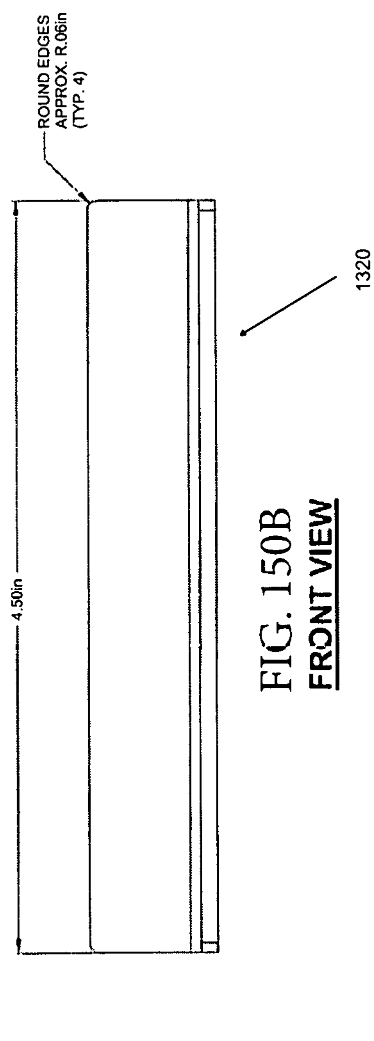
Figure 151C:
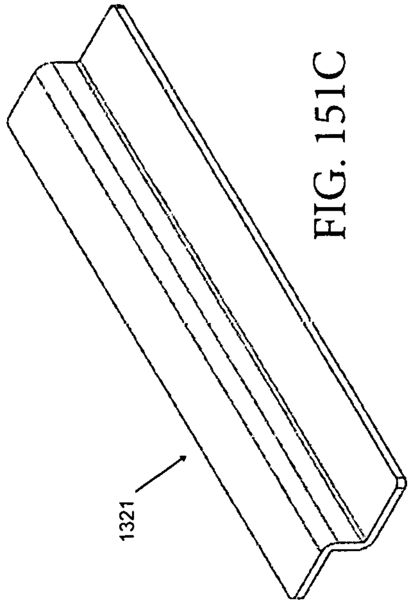
Figure 151D:
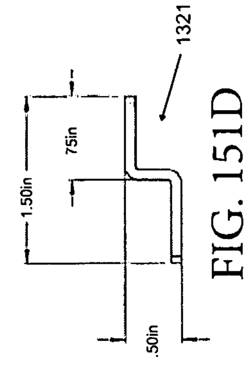
Figure 151A:
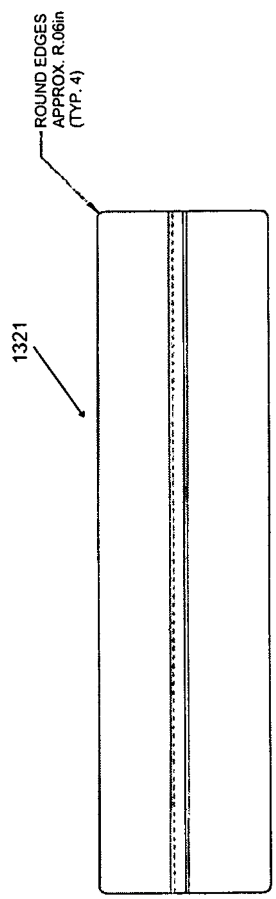
Figure 151B:
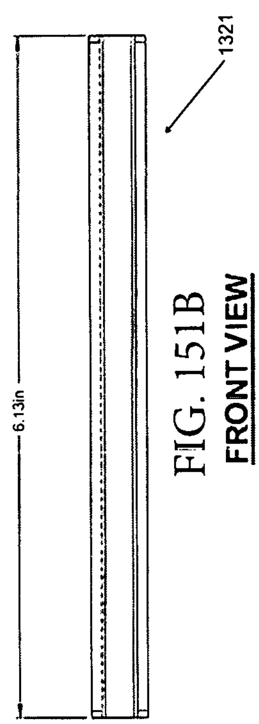
Figure 152A:
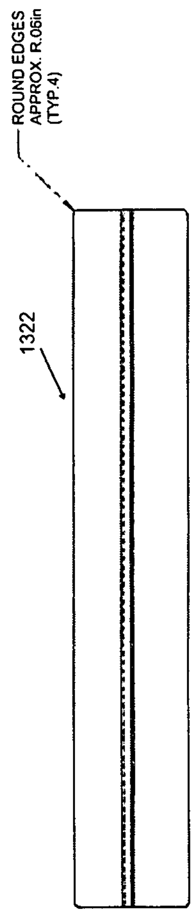
Figure 152B:
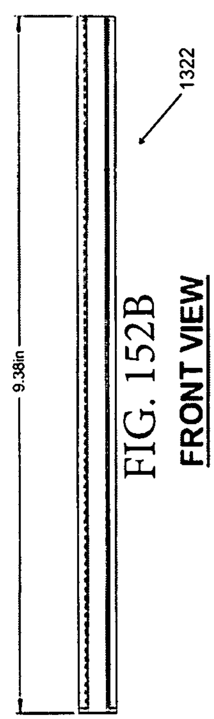
Figure 152C:
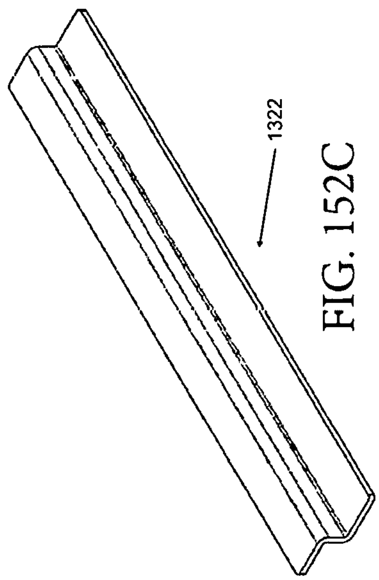
Figure 152D:
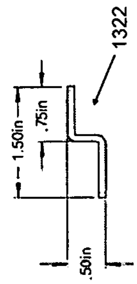
Figure 153C:
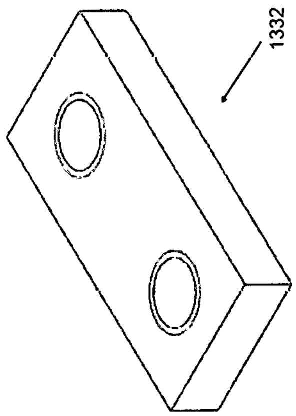
Figure 153D:
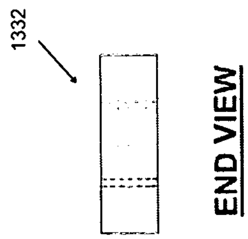
Figure 153A:
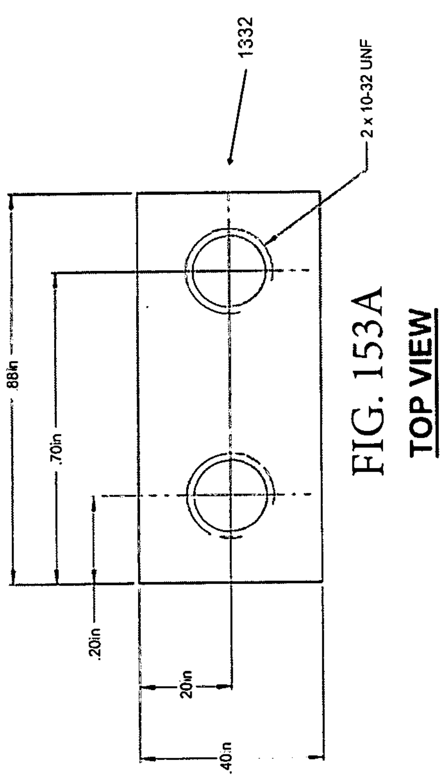
Figure 153B:
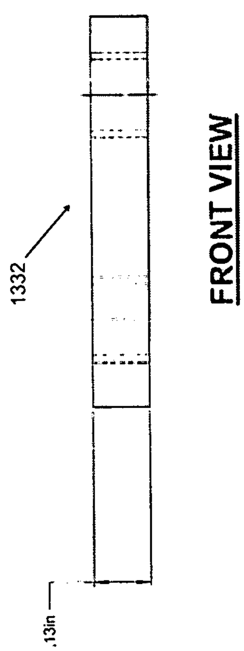
Figure 154C:
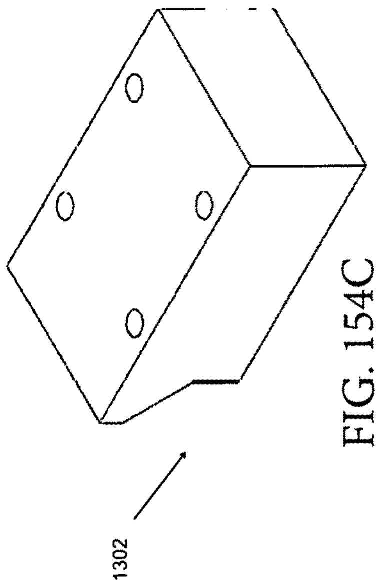
Figure 154D:
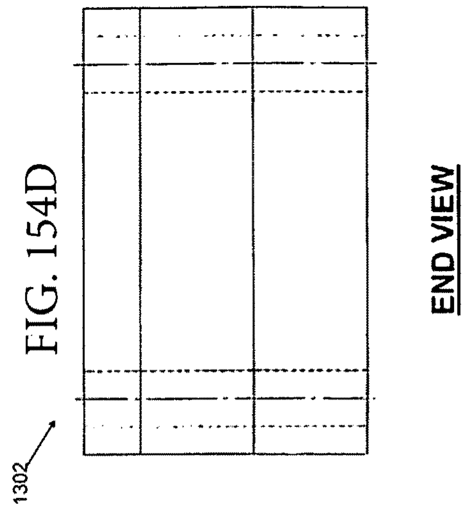
Figure 154A:
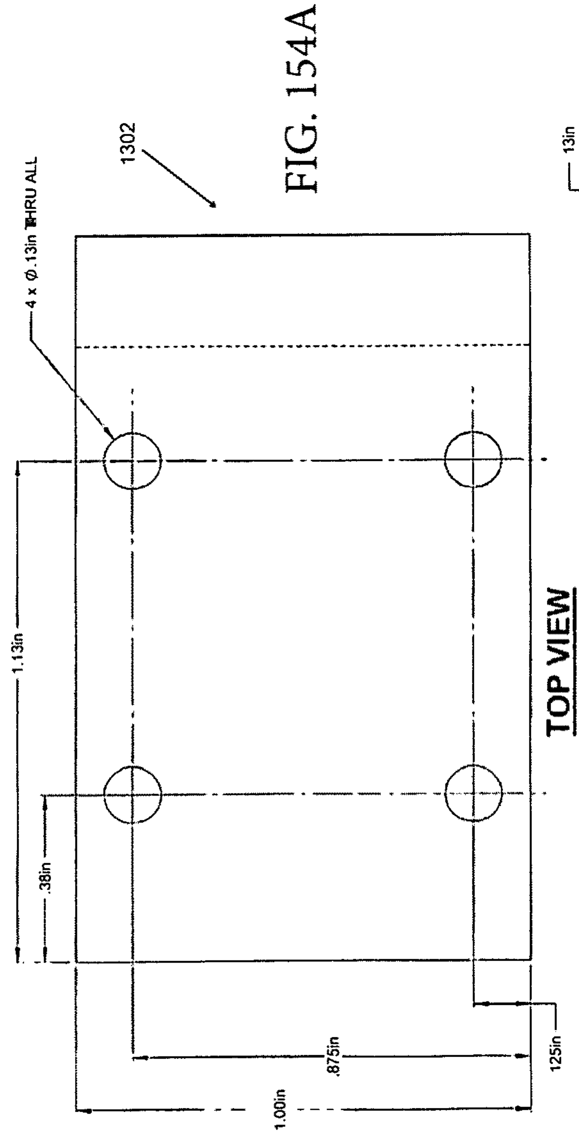
Figure 154B:
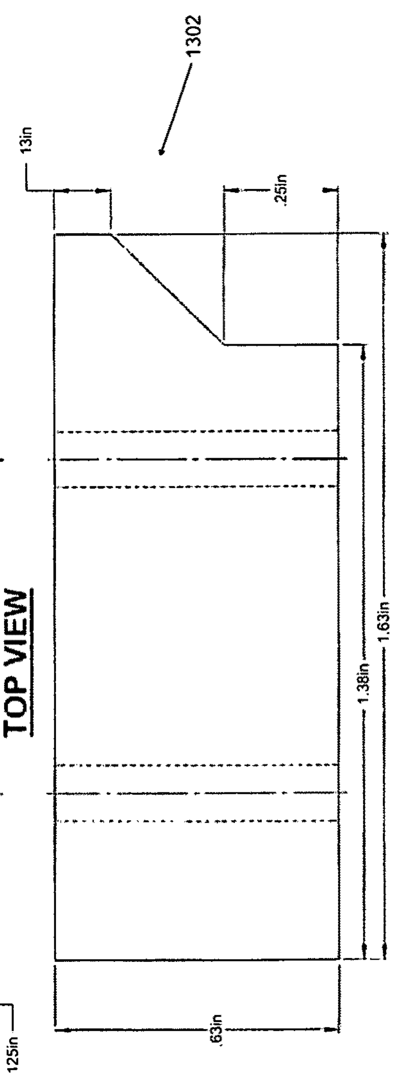
Figure 155:
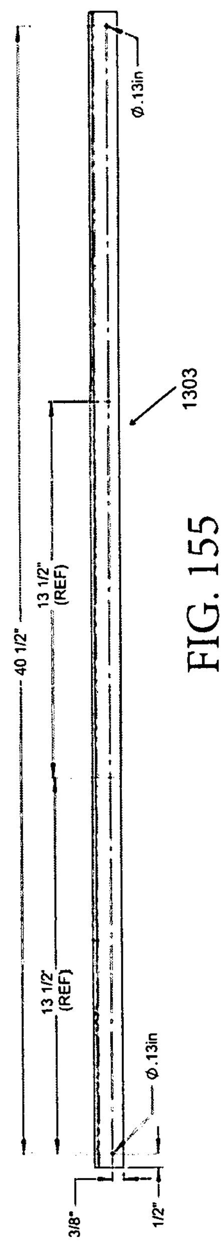
Figure 156:
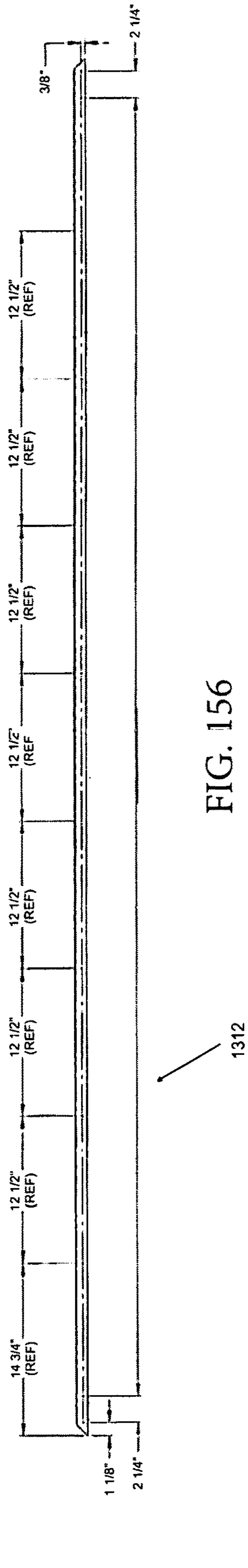
Figure 177:
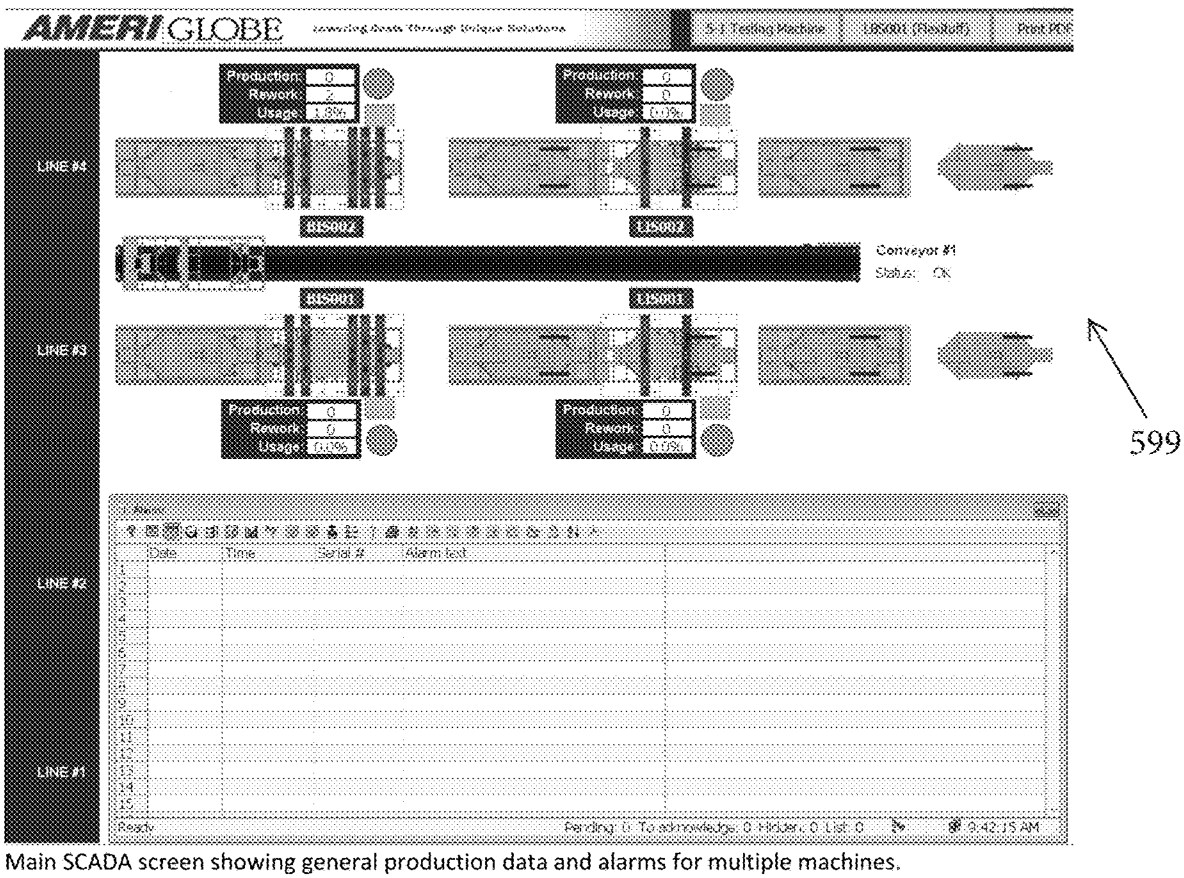
Figure 178:
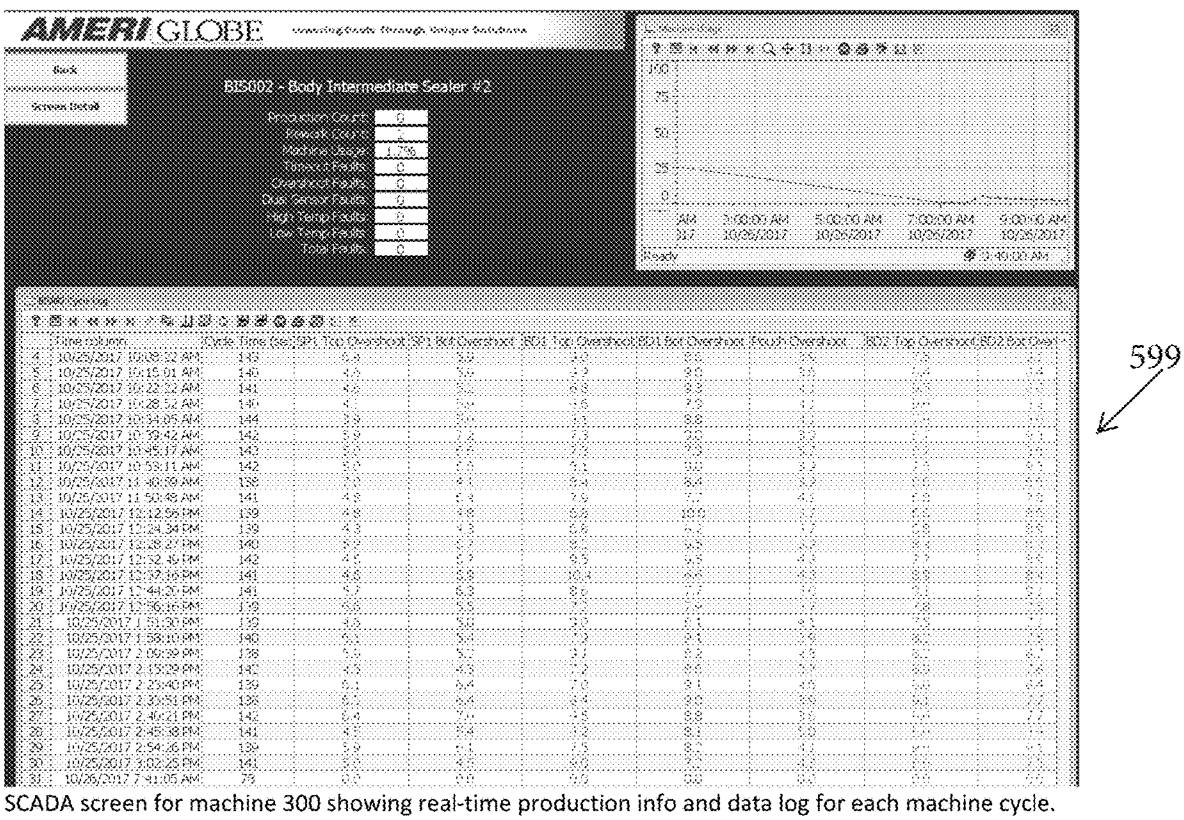
Figure 179:
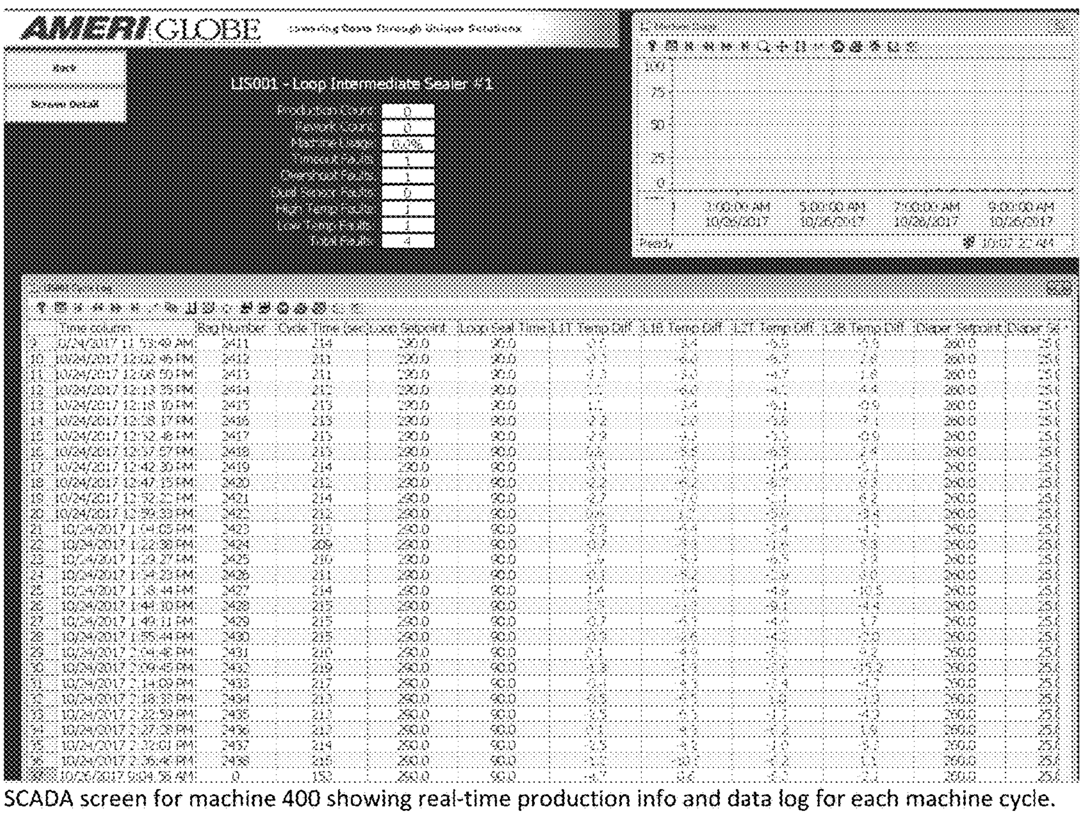
Figures 180, 181, 181A, 181B:
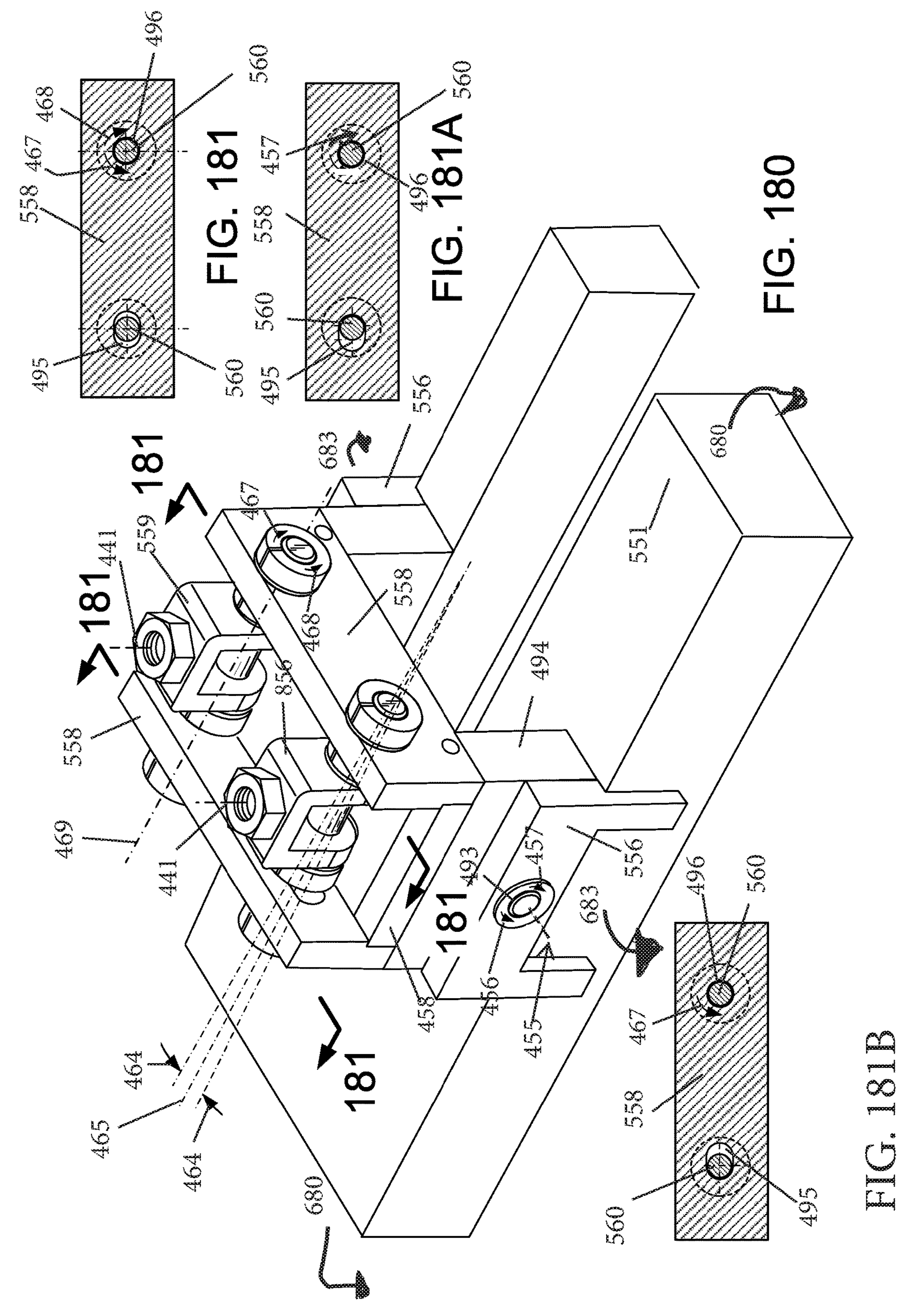
Figure 182:
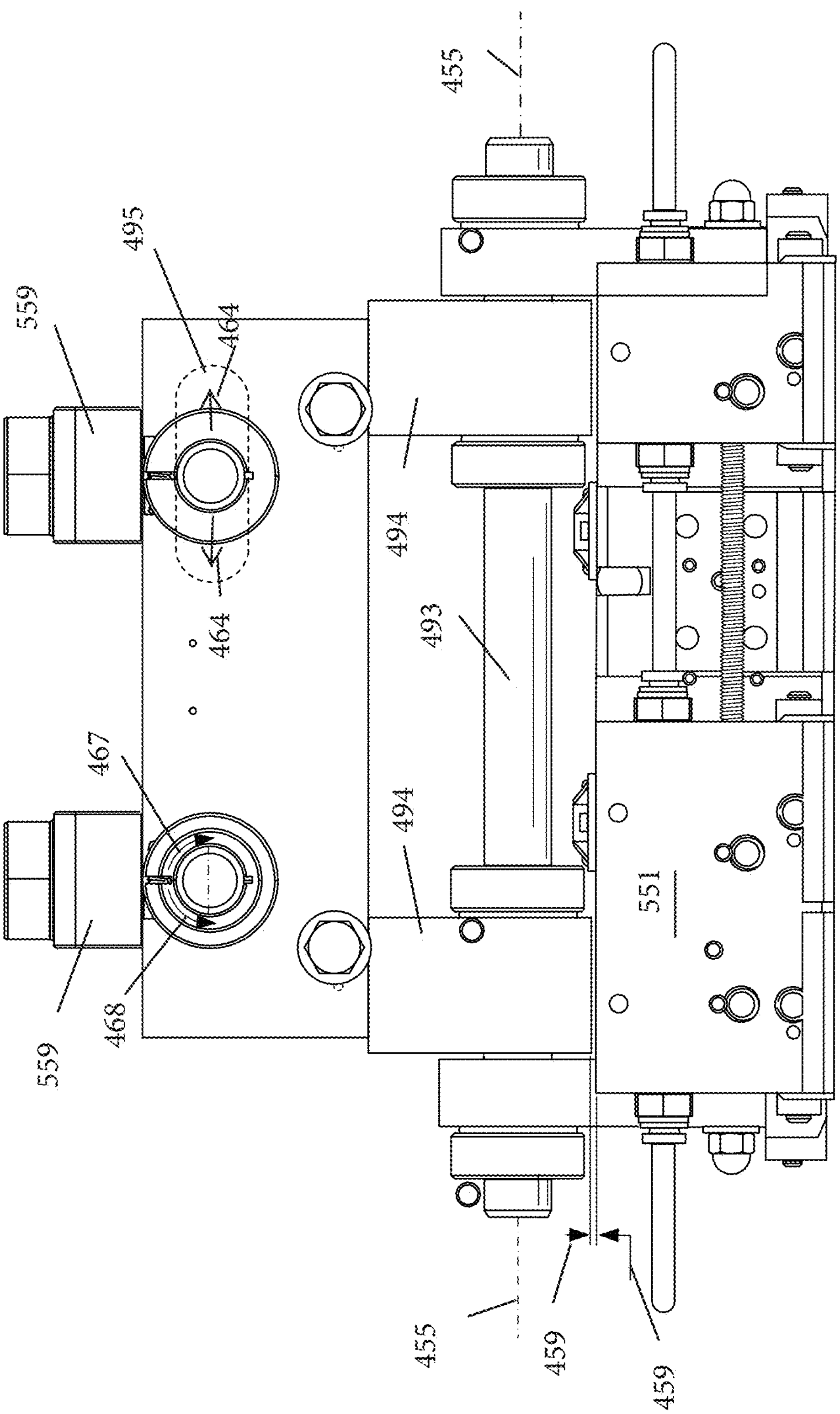
Figure 183:
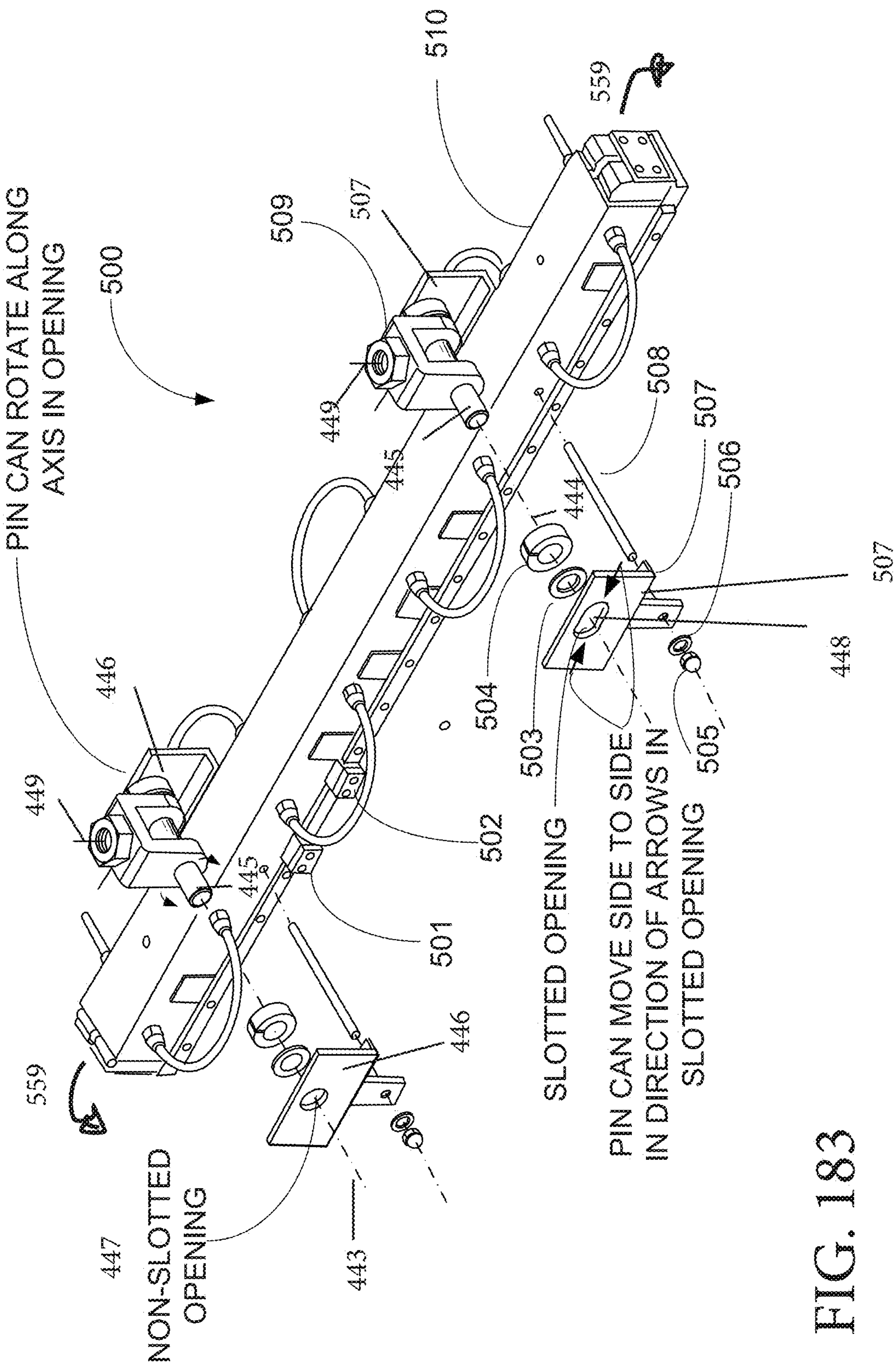
Figure 184:
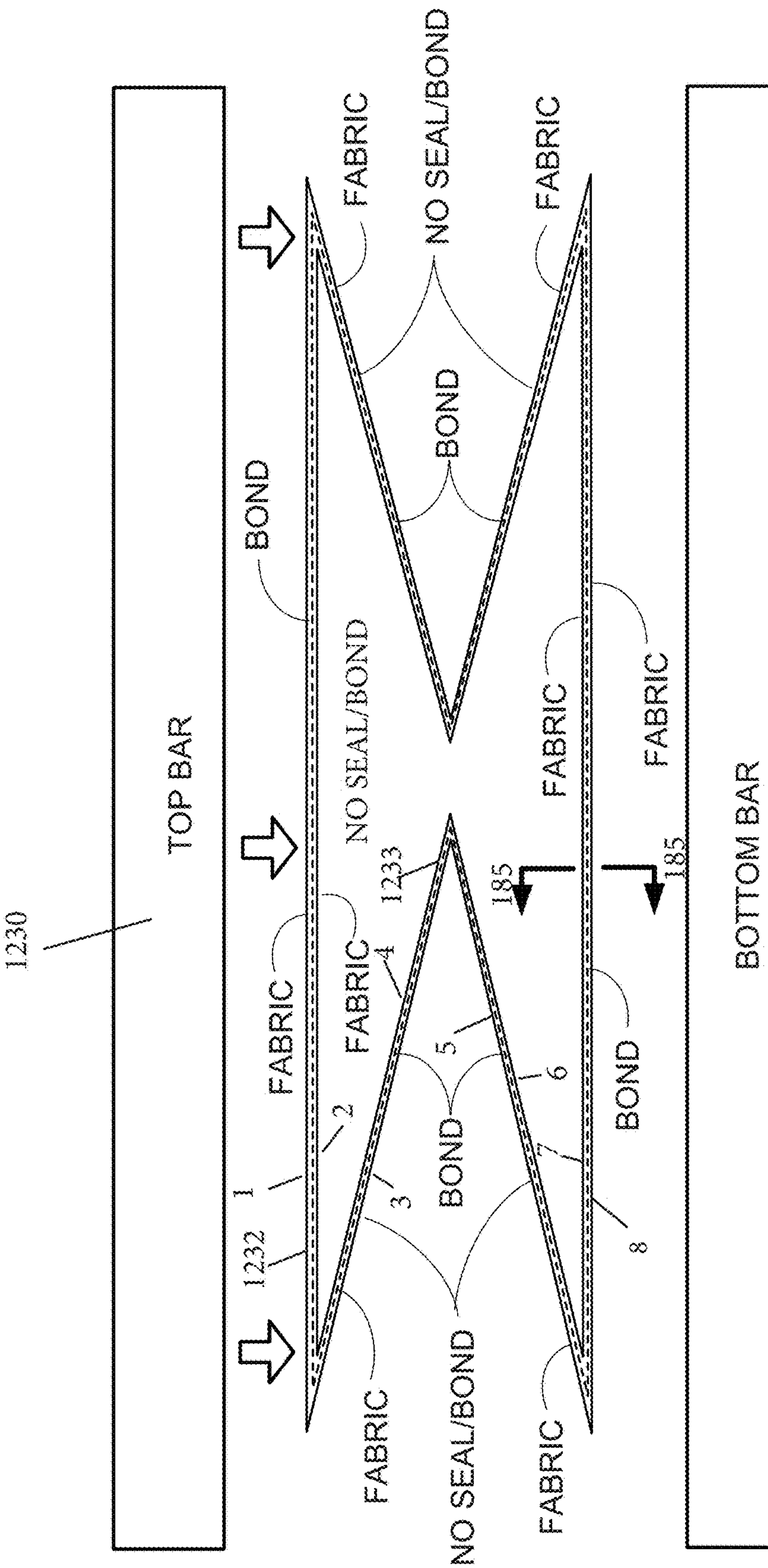
Figure 185:
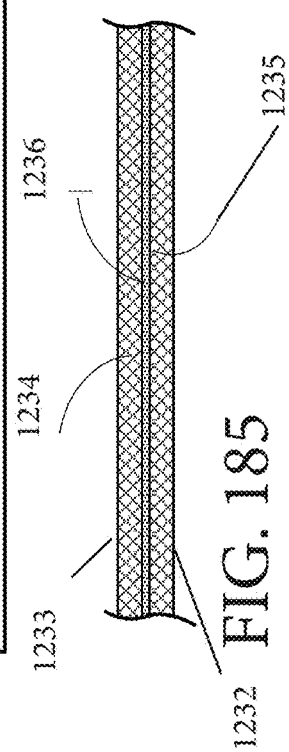

FIG. 88 is an exploded perspective view of an upper vertical platform sub-assembly of a gusseting assembly in accordance with a preferred embodiment of the present invention;

FIG. 89 is an exploded perspective view of an upper creasing bar sub-assembly of a gusseting assembly in accordance with a preferred embodiment of the present invention;

FIG. 90 is an exploded perspective view of a lower creasing sub-assembly of a gusseting assembly in accordance with a preferred embodiment of the present invention;

FIG. 91 is an exploded perspective view of a lower vertical platform sub-assembly of a gusseting assembly in accordance with a preferred embodiment of the present invention;

FIG. 92 is an exploded perspective view of a lower creasing bar sub-assembly of a gusseting assembly in accordance with a preferred embodiment of the present invention;

FIG. 93 is a perspective view of a mounting assembly of an internal creasing press in accordance with a preferred embodiment of the present invention;

FIG. 94 is a perspective view of an assembly of an internal creasing press in accordance with a preferred embodiment of the present invention;

FIG. 95 is a perspective view of a press A sub-assembly of an internal creasing press in accordance with a preferred embodiment of the present invention;

FIG. 96 is a perspective view of a press B sub-assembly of an internal creasing press in accordance with a preferred embodiment of the present invention;

FIG. 97 is an isometric view of a preferred embodiment of a single production line equipment layout;

FIG. 98 is a top view of a preferred embodiment of a single production line equipment layout;

FIG. 99 is a perspective view of a main body impulse sealer machine in an alternative preferred embodiment of the present invention;

FIG. 100 is an exploded view of a main body impulse sealer machine in an alternative preferred embodiment of the present invention;

FIG. 101 is a perspective view of a lift loop assembly and diaper/bottom cover sealer machine in an alternative preferred embodiment of the present invention;

FIG. 102 is an exploded view of a preferred embodiment of a lift loop assembly and diaper/bottom cover sealer machine;

FIG. 103A is a top view of a preferred embodiment of a carrier plate;

FIG. 103B is a perspective view of a preferred embodiment of a carrier plate;

FIG. 104 is an exploded view of a preferred embodiment of a spout/top/bottom/body heat sealing bar in a preferred embodiment of the present invention;

FIG. 105 is an exploded view of a preferred embodiment of a heat sealing bar assembly shown in FIG. 104;

FIG. 106 is an exploded view of a preferred embodiment of a heat sealing bar for sealing a spout or tube to the top or bottom of a bulk bag body;

FIG. 107 is an exploded view of a left hand upper heating head sub-assembly for a lift loop assembly in a preferred embodiment of the present invention;

FIG. 108 is an exploded view of loop impulse heat sealing bar right-handed assembly in a preferred embodiment of the present invention;

FIG. 109 is an exploded view of an impulse heat sealing bar assembly, which can be an 18.5 inch (46.99 cm) assembly;

FIG. 110 is an exploded view of a cover/document pouch impulse heat sealer bar assembly that can be used in a main body heat sealer as shown in FIG. 100;

FIG. 111 is a perspective view of a preferred embodiment of a main body carrier cart assembly;

FIG. 112 is a perspective view of a preferred embodiment of a loop and diaper carrier cart assembly;

FIG. 113 is a top view of an alternative embodiment of a bulk bag including heat fused seams;

FIG. 114 is a top view of a bag as shown in FIG. 113 and including a bottom cover;

FIGS. 115A-115C illustrate a control panel that can be used in conjunction with heat sealing machinery of FIGS. 97-110;

FIG. 116 illustrates a heating element and dual thermocouple sensors that can be used in one or more embodiments of heat sealing machinery of the present invention;

FIG. 117 is a schematic diagram showing basic electrical layout for a heat sealer circuit;

FIG. 118 depicts a temperature control graph;

FIG. 119 is a graph including controller fault information;

FIG. 120 is a drawing list for FIGS. 121-129;

FIG. 121 illustrates a high voltage power schematic for a control panel as illustrated in FIGS. 115A-115C;

FIG. 122 illustrates a PLC control power schematic for a control panel as illustrated in FIGS. 115A-115C;

FIGS. 123-125 illustrates sensor wiring for an analog input module for a control panel as illustrated in FIGS. 115A-115C;

FIGS. 126-127 illustrates control wiring for a digital output module for a control panel as illustrated in FIGS. 115A-115C;

FIG. 128 illustrates an enclosure layout for a control panel as illustrated in FIGS. 115A-115C;

FIG. 129 illustrates an inner panel layout for the control panel of FIG. 115;

FIG. 130 is a table including information on compression weights before breaking for a bag produced in an assembly line of FIG. 97, for example;

FIG. 131 is a table comparing sewn prior art bulk bags and a bag with heat sealed seams, for example produced in the assembly line as shown in FIG. 97;

FIG. 132 is a chart comparing production time for a prior art sewn bag versus a heat sealed bag, for example, produced in the assembly line of FIG. 97;

FIG. 133 is a chart comparing tensile strength retention in highly oriented polypropylene fabric without a seam, with a prior art sewn seam and for a heat sealed seam, for a bag, for example, produced in the assembly line of FIG. 97;

FIG. 134 illustrates a spout seal bar assembly in a closed position;

FIG. 135 illustrates a side to side rocking function of a spout seal bar;

FIG. 136 illustrates a loop seal bar assembly in closed position;

FIG. 137 illustrates an end to end rocking function of a loop seal bar assembly;

FIG. 138 illustrates a side to side rocking function of a loop seal bar assembly;

FIGS. 139-139B illustrate overedge coating of a fill spout;

FIGS. 140-140B illustrate overedge coating of a discharge tube;

FIGS. 141-141B illustrate overedge coating of a body portion;

FIG. 142A-142B illustrate preferred embodiment of a carrier plate that can be used in one or more embodiments of the invention as shown and described herein;

FIG. 143 illustrates a clamp that can be used with a carrier plate in one or more embodiments of the invention as shown and described herein;

FIGS. 144-145 illustrate an embodiment of carrier plate side rails, end rails, and guides location sub-assembly, including example dimensions, that can be used in one or more embodiments of the present invention;

FIGS. 146A-146D illustrate perspective, front and end views of a carrier plate side rail that can be used in one or more embodiments of the present invention;

FIGS. 147A-147C illustrate perspective, front and end views of a carrier plate end rail that can be used in one or more embodiments of the present invention;

FIGS. 148A-148D illustrate perspective, top, front and end views of a carrier plate spout guide rail that can be used in one or more embodiments of the present invention;

FIGS. 149A-149D illustrate perspective, top, front and end views of a carrier plate loop outboard guide rail that can be used in one or more embodiments of the present invention;

FIGS. 150A-150D illustrate perspective, top, front and end views of a carrier plate loop inboard guide rail that can be used in one or more embodiments of the present invention;

FIGS. 151A-151D illustrate perspective, top, front and end views of a carrier plate top sheet guide that can be used in one or more embodiments of the present invention;

FIGS. 152A-152D illustrate perspective, top, front and end views of a carrier plate bottom sheet guide that can be used in one or more embodiments of the present invention;

FIGS. 153A-153D illustrate perspective, top, front and end views of a carrier plate spring plunger mount that can be used in one or more embodiments of the present invention;

FIGS. 154A-154D illustrate perspective, top, front and end views of a carrier plate edge guide that can be used in one or more embodiments of the present invention;

FIG. 155 illustrates carrier plate end rail rivet locations, and example dimensions, that can be used in one or more embodiments of the present invention;

FIG. 156 illustrates carrier plate side rail rivet and screw locations, and example dimensions, that can be used in one or more embodiments of the present invention;

FIGS. 157-179 illustrate various screen views and data that can be viewed and stored at a control panel or at a computer monitoring station;

FIGS. 180-182 illustrate views of a loop seal bar assembly and rocking ability of a seal bar assembly;

FIG. 183 illustrates a rocking ability of a spout/top/bottom/body/cover heat seal bar assembly;

FIG. 184 illustrates overlapped fabric layers to be heat sealed as a bag joint; and FIG. 185 is detailed view of layers in a heat-sealed joint, taken along lines 185-185 of FIG. 184.

DETAILED DESCRIPTION OF THE INVENTION

Unless otherwise noted herein, the specific parts and materials included in the description and in the figures are examples of parts and materials that may be used in various embodiments of the invention as shown and described herein. Other suitable parts and materials as known in the art may also be used in various embodiments of the inventions as shown and described herein.

One or more embodiments of the apparatus of the present invention relates to a stitchless bulk bag that includes heat sealed joints. In preferred embodiments, a containment area of the bag, e.g., surfaces that can come into contact with material in the bag, includes no stitching, stitch holes, or threads.

In one or more embodiments of the method of the present invention, what is provided is a heat sealing method that does not substantially damage the strength of the polypropylene fabric yet still gets a final joint strength equal to or exceeding the strength of the current sewing methods. During testing, products produced using the method of the present invention have achieved joint strengths of about 90 to 102% of the strength of the polypropylene fabrics which is considerably above the joint strengths of seams achieved through sewing. Another embodiment of the present invention provides joint strengths of about 100 to 102% of the strength of the polypropylene fabrics.

In a preferred embodiment of the present invention, the invention will aid and enable the automation of bulk bag production, thus freeing up the location of factories around the world. Due to the improved joint strength, this invention will enable the use of thinner materials that what is used in the prior art, and accomplish the lifting of similar weights.

In one or more embodiments of the present invention, a suitable bonding coating, for example VERSIFY™ 3000, a product produced by The Dow Chemical Company is applied to the polypropylene fabrics or similar fabrics, and provides up to about 240 lbs of hold or grip per lineal inch (4,286 kilogram/meter) to the polypropylene fabric from a heat seal of about 1½ inches (3.81 cm) across the joint area. In another embodiment, a coating, for example VERSIFY™ 3000, a product produced by The Dow Chemical Company is applied to the polypropylene fabrics or similar fabrics, and provides up to about 200 lbs of hold or grip per lineal inch (3,572 kilogram/meter). In a preferred embodiment, the coating has a melting point which is lower than the melting point of the fabrics being joined together. The method of heat sealing is an improvement over the known art in the woven fabrics industry today.

The dimensions of the joint or sealed areas may vary based on the particular application for which the joined fabric will be used.

A suitable bonding coating can be a propylene plastomer and elastomer, for example Versify™ 3000. The coating may contain for example about 50% to 90% polypropylene based polymer and about 10%-50% polyethylene, by weight.

In a coating to be used in a preferred method of the present invention for heat joining polypropylene fabric, one can use about 10-99%, preferably about 20-95%, more preferably about 30-95%, and most preferably about 75-90% propylene plastomers, elastomers, or combinations thereof;

one can use about 0-5% additives for color, anti-static, or other purposes (these do not materially affect the performance of the coating, and are typically minimized as they are more expensive than the propylene and polyethylene);

the balance is preferably polyethylene plastomers, elastomers, or combinations thereof.

Preferably, the propylene plastomers, elastomers, or combinations thereof have a density of about 0.915 to 0.80 grams per cc, and more preferably about 0.905 to 0.80 grams per cc. Preferably, the polyethylene plastomers, elastomers, or combinations thereof have a density of about 0.91 to 0.925 grams per cc. Typically, one should use at least about 5% low density polyethylene to make the coating run, and preferably at least about 10%.

EXAMPLE

In one or more preferred embodiments of the present invention, the fabrics are only being heated to the melting point of the coating which is lower than the melting point of the fabrics being joined together. In one or more preferred embodiments of the present invention, the joining temperatures are at least about 5 degrees less than the melting point of the polypropylene fabrics to be joined. Different polypropylene fabrics will have different melting points, and in one or more embodiments of the method of the present invention, the joining temperatures are at least about 5 degrees less than the melting point of the particular polypropylene fabrics to be joined. An example polypropylene fabric may have a melting point of about 320 degrees Fahrenheit (176.7 degrees Celsius), and thus in an embodiment of the present invention, the coating will be heated to about 315 degrees Fahrenheit (157.22 degrees Celsius). By using a lower heat than the polypropylene fabrics, the method of the present invention does not damage or reduce the strength of the fabric as typically happens when using the prior art high heat formulas for heat welding. Further, in one or more embodiments of the present invention, the clamping pressure used to make the seal is designed to be low enough (for example about 7 psi (48 kilopascal)) to leave the coating largely in place and the materials to be joined, largely separated by the coatings. Clamping pressures may also be lower, for example under about 2 psi (13.8 kilopascal). Typically, in the prior art heat sealing methods, the clamping process is designed to purposefully melt and push aside any coatings on the fabric and join the fabric yarns directly. Naturally, when any part of the fabric yarns are heated to and past their melting point and that is combined with high pressure (for example 20 psi (137.9 kilopascal)), the yarns are thinned out, weakened and partially crystallized.

It is an objective of the present invention to heat fuse fabrics together. In one or more preferred embodiments of the present invention, fabrics are not being heated up past their melting points, which is useful in preventing degradation of the strength of the fabric.

In the present invention, using low heat and low pressure, only the coatings are being joined. This leaves the fabric completely undamaged and unweakened. In fact, the strength of the coating now can add to the overall joint strength rather than being squeezed out in the current methods. With the resulting joint strengths, the present invention enables lifting of higher weights with less material, than can be done with the prior art methods of sewing fabrics together.

As previously, discussed, in one or more preferred embodiments, the coating materials have a melting point lower than the fabrics to be joined. In one or more embodiments, the coating materials in the process may be any suitable material or materials which may be used to successfully carry out the process, and can be selected from a range of coating materials. A suitable coating, for example, may be a propylene plastomer and elastomer, for example VERSIFY™ 3000, a product produced by The Dow Chemical Company. A suitable coating may contain about 50% to 90% polypropylene based polymer and about 10%-50% polyethylene, by weight. VERSIFY™ is a registered trademark of The Dow Chemical Company for propylene-ethylene copolymers used as raw materials in the manufacture of films, fibers and a wide variety of molded plastic objects; propylene-ethylene copolymers used as raw materials in the manufacture of compounds to make coated fabrics, artificial leather, soft touch grips, shoe stiffeners and flexible roofing membranes.

In one or more preferred embodiments of the present invention, for a bonding coating, the method utilizes a mixture of a minimum of about 70% pure VERSIFY™ 3000 and about 25% polyethylene and about 5% of additives such as UV protection and colors. In testing, when using about 100% pure VERSIFY™ 3000, the method of the present invention achieved up to about 96% to 102% joint efficiency in a shear joint tensile test, while at about 70% VERSIFY™ 3000, about 91% to 95% joint efficiency has been obtained in the same test. (The resulting percentages are based on the average strength of the fabric tested. There is generally approximately about a 5% variable strength in any section of fabric tested.)

Figure 2:
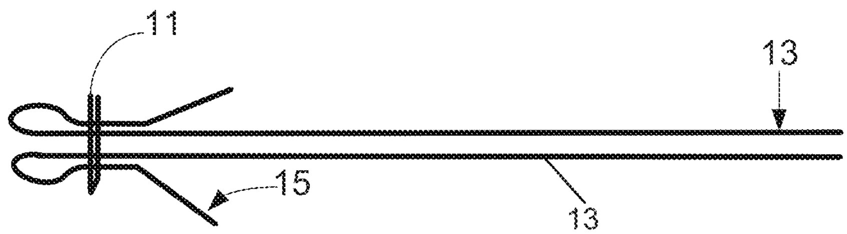
FIG. 2 illustrates a simple sewn seam of the prior art.

Turning now to the figures, the chart shown in FIGS. 1A-1B, illustrates comparative data and results from testing performed on seams made for bulk bag construction using both the standard sewing seam methods on both weft and warp direction yarns of the fabric. There are several ways to make prior art seams in the bulk bag industry. In FIGS. 2-3, the most common seams are depicted.

FIG. 2 depicts a simple sewn seam. In FIG. 2, fabric pieces 13 are shown, with sewing stitch seam 11, and fabric fold 15, wherein a fabric piece 13 is folded back on itself to create a seam. As shown, the simple seam is formed by just a folding back of the two pieces of fabric 13 to be stitched together. This simple seam prevents the interlocking weave from simply slipping off the edge of the fabric under the extreme pressures that are often found in bulk bag usage. This seam generally creates about a 58% joint strength.

Figure 3A:
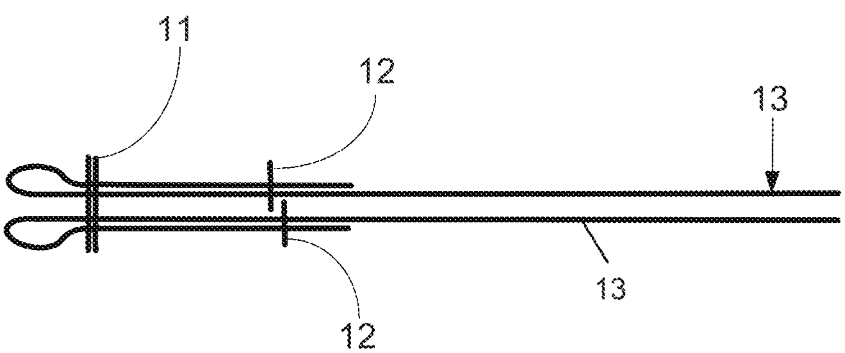
FIG. 3A illustrates a pre-hemmed sewn seam of the prior art.

FIG. 3A depicts a pre-hemmed seam, which is created by not only folding the fabric back prior to making the seam, but by sewing the folded back portion of the fabric to itself. FIG. 3A shows fabric 13 with sewing stitch seam 11 and stitch to hold the hem 12, wherein the folded back portion is sewn to the fabric itself. This extra step generally creates a seam with an average strength of 63%. 63% over 58% is a strength increase of about 8.5%. Even though there is extra labor to hem the fabrics, a strength increase gain of this size is often considered important in the industry.

Figures 3B, 4:
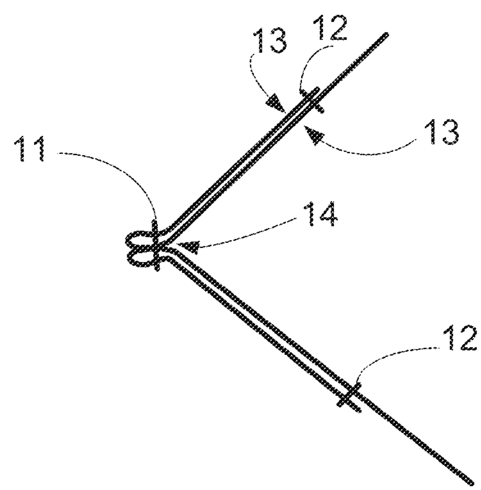
FIG. 3B illustrates a prior art pre-hemmed sewn seam of a bag in a filled position.
FIG. 4 is a chart showing test results of a heat sealed bulk bag of the present invention.

After the bag is made and filled, the pre-hemmed seam will be in the position shown in FIG. 3B. FIG. 3B depicts the sewn seam 14. This means that the majority of the time, the seam is basically in a peel position whose strength is largely determined by the strength of the thread being used. When seams are able to withstand forces only equal to 63% of the fabrics, then the fabrics must be overbuilt to take into account the seam's inefficiency.

When labor is taken into account as well, it is easily seen that the sewing operation is a very large factor in determining the final cost of making bulk bags.

Taking the same fabrics, and using the fusion heat seal seam method of the present invention, the graph shown in FIG. 4 shows that the seam strengths achieved, over 4 sets of tests, about averaged 95.75% strength retention. This is a significant increase of strength retention with these fabrics.

When 95% of the original strength is being maintained through the fabric connections, equal fabrics may be used to carry heavier loads, or less fabric can be used to carry the same load. An embodiment of the present invention thus may provide a 50% gain in strength over the sewn seams.

The fusion heat seal seam or joint not only creates a stronger seal, but it does it in a significantly different manner. The fusion heat seal seam or joint of the present invention enables new bulk bag designs that will be able fill the needs of the bulk bag industry.

Figure 6:
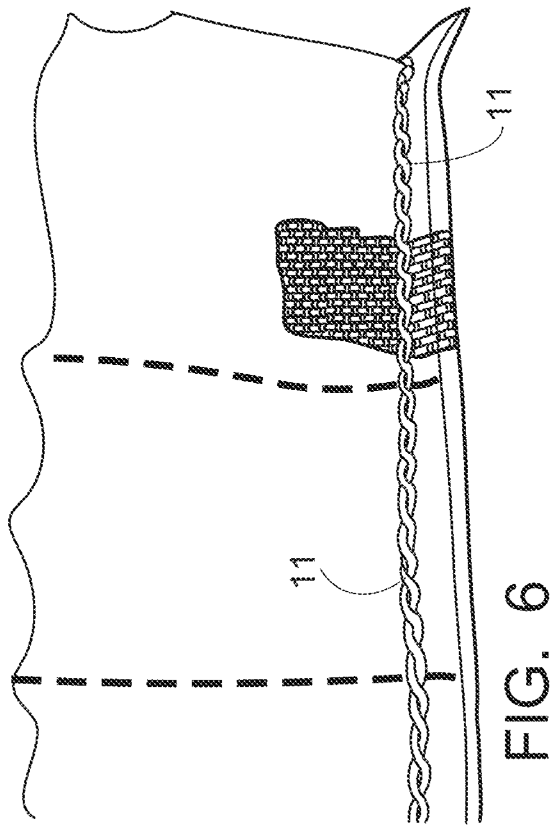
FIGS. 6-7 are prior art partial views of a sewn seam bulk bag, and of a sewing process of the prior art.
Figure 5:
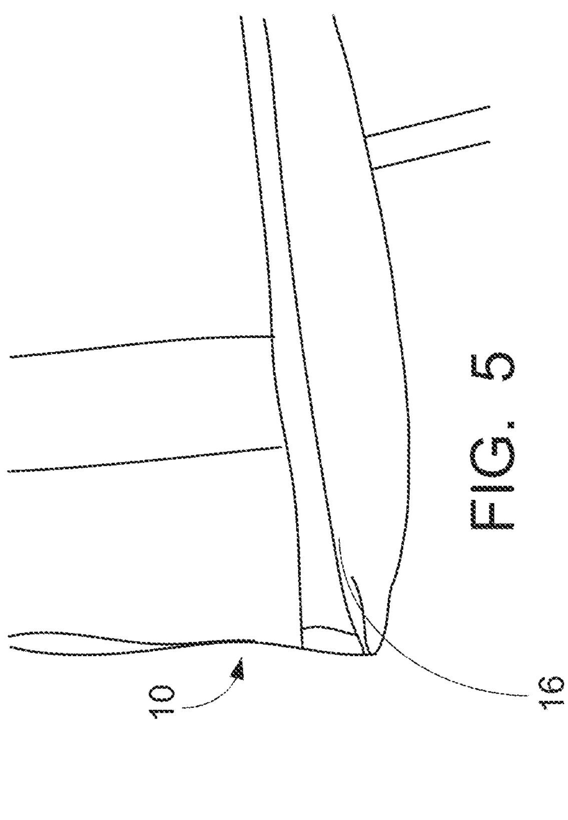
FIG. 5 is a perspective partial view of an embodiment of a bulk bag of the present invention with heat sealed seams or joints.
Figure 7:
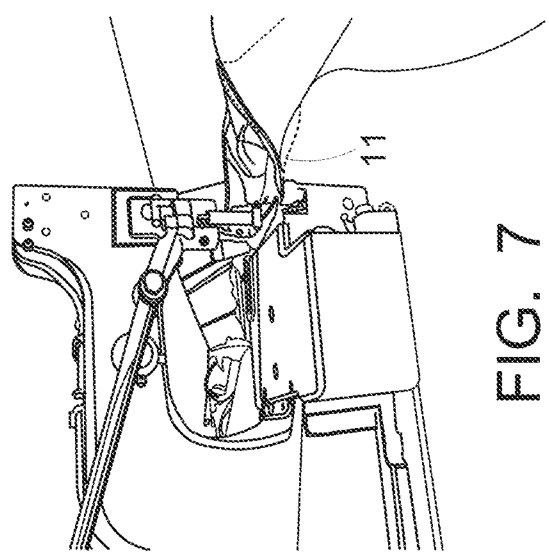

In the prior art, due to the nature of sewing machines and the size of bulk bags, the vast majority of seams must be sewn in an edge to edge peel position. The throat of a sewing machine is not big enough to easily allow an entire bulk bag to pass through the throat of the machine. Therefore, sewing is typically designed to place all seams in an edge to edge position as shown in FIGS. 6-7. FIG. 5 depicts a fusion heat seal seam 16 of the fusion heat seal bag 10. FIG. 6 illustrates a prior art sewn or stitch seam 11.

Once a sewn seam prior art bag is made and filled, the sewn seam then is put into a peel position that depends entirely on the strength of the combination of the thread and needle punctured fabrics.

Figure 9:
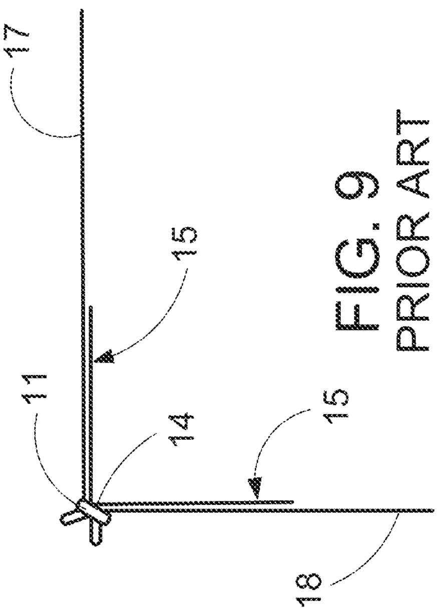
FIG. 9 illustrates the position of a prior art sewn seam when a bag is full.
Figure 8:
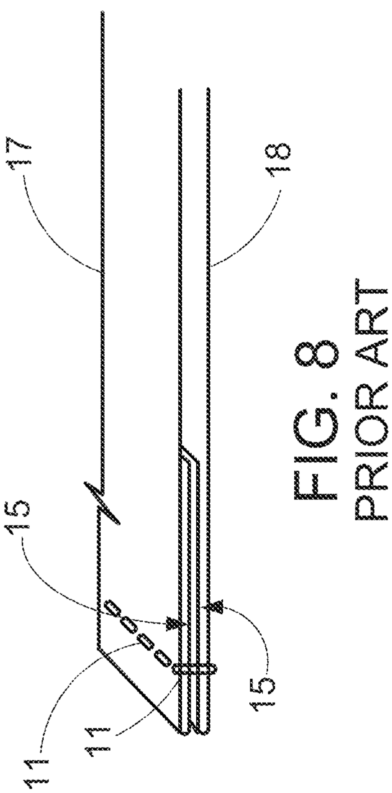
FIG. 8 illustrates the position of a prior art seam as sewn.

In FIG. 8, you can see the positions of the fabric as it was stitched by the machine in FIG. 7. Stitch seam 11 is shown stitching together bag sidewall 17 and bag bottom wall 18. Fabric folds 15 are positioned so that fabric fold 15 of sidewall 17 is in contact with fabric fold 15 of bottom wall 18. In FIG. 9 the position of the stitch and fabric when the bag is in use are shown. Sewn stitch 11 and sewn joint or seam 14 are shown, wherein sidewall 17 and bottom wall 18 are attached. The fabric folds 15 of each wall 17, 18 are shown in an interior of the bag. Typically, a minimal fabric fold 15 will be about 2 inches (5.08 cm) in depth on each side. This means the average sewn seam has about 4 inches (10.16 cm) of doubled fabrics.

Figure 10:
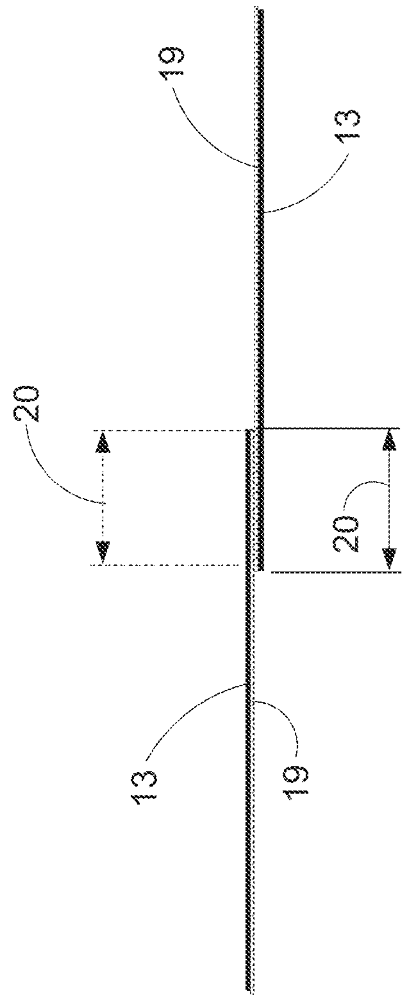
FIG. 10 illustrates a heat sealed seam or joint in a preferred embodiment of the present invention.

The fusion heat seal seam or joint of one or more embodiments of the present invention is preferably formed by overlapping the fabrics to give the seal a wide shear area for strength. In an embodiment of the present invention, the fusion seam will get about 95% of the original fabric strength. In one or more preferred embodiments, there will be an overlap of about 1½ to 2 inches (3.81 cm to 5.08 cm). This saves a minimum of about 2 inches (5.08 cm) of fabric in every joint as the prior art sewn method has about 2 inches (5.08 cm) of doubled fabric layers on both sides of the seam. FIG. 10 depicts a fusion heat seal seam or joint of the present invention. In FIG. 10, fabric pieces 13 are shown as a dark line. Coating or lamination 19 on the fabrics is shown as a dotted line. Line 20 depicts the sealed or joined area of the fabrics 13, which may be about 1½ to 2 inches (3.81 cm to 5.08 cm).

In one or more embodiments of the present invention the width of the overlap can be much smaller, for example 0.5 inches (1.25 cm) to save even more fabric.

It is preferable that the seams be sealed in a manner so that no graspable edge is left on any exterior seams of the bag. This will discourage any attempt to rip the seal open in the peel position which is the weak direction of the fusion joint.

Figure 11:
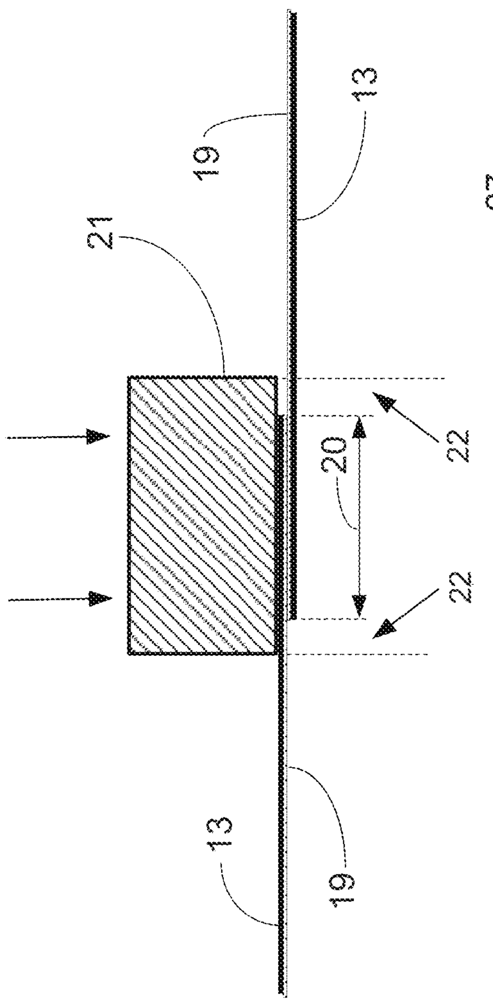
FIG. 11 illustrates use of a heat seal bar in a preferred embodiment of a heat sealing method of the present invention.

In one or more embodiments of the present invention, a preferred method is to overlap the fabric portions only about 1½ inches (3.81 cm) and to center this overlapped area under a seal bar 21, which can be about 2 inches (1.25 cm) wide, for example, as shown in FIG. 11. In FIG. 11, line 20 depicts the sealed area, which may be about 1½ inches (3.81 cm) wide. This intentionally, preferably, leaves about a ¼ inch (0.64 cm) gap or transitional area, which is represented by arrow 22, on either side of the joint or sealed area depicted by line 20. This insures that the ending edges of the two halves of the fabric in the sealed area or joint are sealed to the very edge. This leaves no graspable edge that could create an easily peelable area.

About a ¼ inch (0.64 cm) transitional area, for example, is small enough to prevent damaging heat from overcoming the smaller material volume of the single layer and allows for some small misplacement of the fabric edge lineup. Alternatively, a transitional area can be about ⅛ to ¼ inches (0.32 to 0.64 cm).

In one or more embodiments of the method of the present invention, a pulse heat process is used. By using impulse heat, the top or highest temperature can be controlled and held to a desired amount of heat, in a desired range of temperature, for a desired amount of time. This then allows the process to bring the material temperatures up to the desired level without going so high as to damage the fabrics but to also hold the temperature there long enough to allow a thorough and even heating of the joint area. In one or more embodiments, the heat seal bar can remain in place on the fabric during a cooling time. This can help to ensure that a bond is formed between the fabrics. A cooling time can be 30 to 90 seconds, for example.

It is also useful to the process to keep equal amounts of materials under the seal at all times. The impulse heat process is injecting equal heat throughout the sealing process. If an uneven amount of materials under the seal bar is too diverse, then areas with less materials may absorb more heat than desired and material damage can occur.

In FIGS. 10-11, with only a single seal being made, the amount of heat applied is minimal enough that the about ¼ inch (0.64 cm) transitional area or gap 22 allows enough heat dissipation to provide a very good seal without damage to the surrounding materials.

One or more embodiments of the present invention involves stacking this process and creating multiple seals simultaneously. When stacking the process, placement of materials should be considered and keeping material amounts equal throughout will enable safe repeatability of the sealing process.

It is a further object of the present invention that a product made by heat sealing versus sewing will have many advantages such as reduced or no sifting in a bag containment area, reduced manpower, thinner materials, reduced or no contamination and improved repeatability through automation.

What has been described and shown so far is the difference between sewing seams and heat sealing to make a simple seam using polypropylene fabrics. Hereafter, the construction of bulk bags, that may routinely carry one ton of dry flowable materials, for example, will be discussed.

An objective of the present invention is to find ways to reduce the cost of making a product commonly called by several names. These names include bulk bags, Flexible Intermediate Bulk Containers or FIBCs, Big Bags or even Super Sacks (a trademark name of B.A.G. Corporation). Herein the product has been and will be referred to mostly as bulk bags.

The present invention has useful applications with bulk bag production, and is also useful to a number of other packages or products, for example smaller bags used to carry about 25 to 100 pounds (11 to 45 kilograms). The present invention can also be useful in production of bags designed to carry about 100 to 500 pounds (45-226 kilograms) of material. Other products that will benefit from the present invention include products stored or transported in flexible fabric packaging, wherein a sterile and air tight package is preferred.

Current bulk bag technology using sewing machines typically travels stitch by stitch around every inch or (2.54 cm) of seam on every part of the bag on an individual basis. In one or more embodiments of the present invention, the invention can simplify this process to create a productive system that can seal or join the fill spout to the top sheet, the top sheet to the bag body, the bottom sheet to the bag body, and the bottom discharge spout to the bottom sheet in a single moment or step. This eliminates a tremendous amount of labor and time.

Further, in one or more embodiments of the present invention each heat sealed seam can be approximately 50% stronger than the sewn seam. Because each heat sealed joint or seam requires less fabric than the sewn seam, the present invention enables production of a fabric bag that is demonstrably less expensive and more economical to make.

Use of heat sealing is known in the art. No matter what the shape of the seal to be made is, heat bars can be shaped to accomplish that seal and that shape. In one or more embodiments of the present invention, a square formed heat bar and structures can be used to hold the fabric in place to allow the joining of the bottom of the bag to the sidewalls to make a joint. Such equipment, however, may be large, bulky and expensive. Additional steps to complete the product and additional machines may be needed.

In one or more embodiments of the present invention, the method comprises using the fusion heat sealing method of the present invention for production of bulk bags, wherein individual joints are sealed sequentially, one after another. In another embodiment of the present invention, fewer steps and machines are used in fusion heat sealing a bulk bag. An objective of the present invention is to simplify the number of steps when producing a bulk bag, as compared to prior art sewing methods.

There are many prior art designs in the bulk bag market but most of these designs fall into two basic categories. The body of the bag may be made from numerous pieces of flat panels sewn together or the body of the bag may be made from a single piece of tubular fabric that has no vertical seams.

All of the basic designs can be made using one or more embodiments of the system and method of the present invention. A preferred embodiment of the present invention will start with a tubular woven body.

Figure 12A:
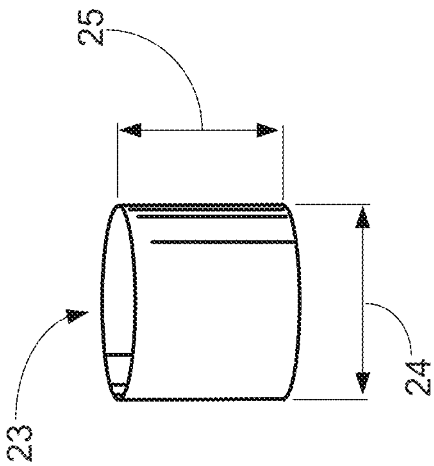
FIG. 12A illustrates a fill and/or discharge spout of an embodiment of a heat sealed bag of the present invention.

Many bulk bags have a fill spout, a top panel, a circular woven body panel, a bottom panel and a discharge spout. The two spouts can be made with tubular fabric with no seams. The body of the bag may be made with tubular fabric with no seams. The top and bottom panels are generally square flat panels with a hole or opening cut into them to accommodate the spouts that must be attached to them. FIG. 12A depicts a spout 23, which can be either a fill or discharge spout for a bulk bag 10. Line 24 represents, for example, about a 22 inch (55.88 cm) width for a spout or tube 23, lying flat. Line 25 represents, for example, about an 18 inch (45.72 cm) long fill or discharge spout 23.

Figure 12C:
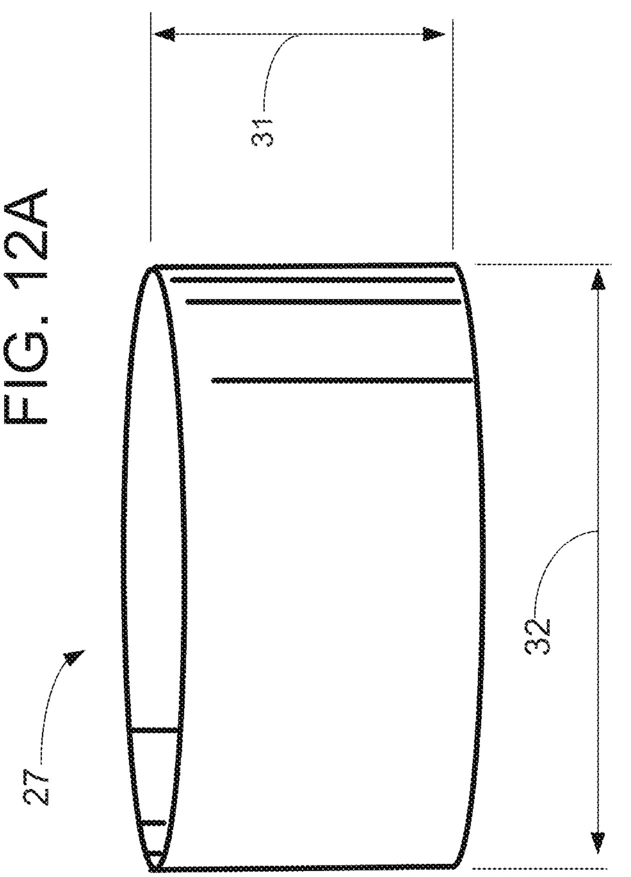
FIG. 12C illustrates a tubular body panel of an embodiment of a heat sealed bag of the present invention.
Figure 12B:
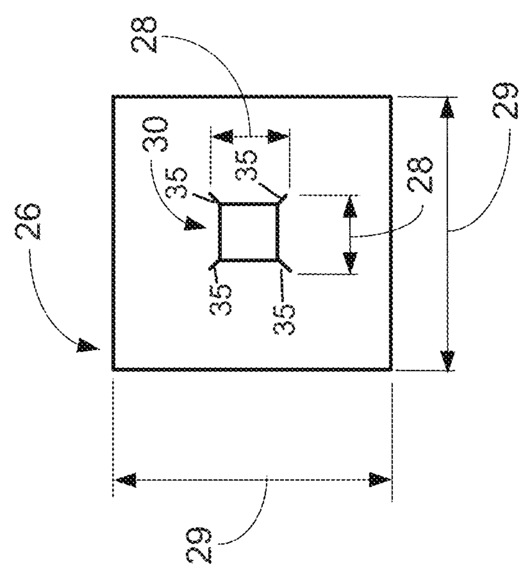
FIG. 12B illustrates a top or bottom panel of an embodiment of a heat sealed bag of the present invention.

FIG. 12B depicts an example panel 26, which can be a top or bottom panel for a bulk bag 10. In FIG. 12B the top or bottom panel 26 is relatively square with sides being about 41 inches (104.14 cm), for example, as represented by lines 29. Area 30 represents a connection area for the fill or discharge spout 23, with lines 28 being about 11 inches (27.94 cm) for example.

FIG. 12C depicts a tubular fabric 27 without seams, which can be used as a body panel. Line 31 may represent about a 45 inch (114.30 cm) height, for example, and line 32 may represent about a 74 inch (187.96 cm) width, when the tubular fabric 27 is lying flat.

Thus, FIGS. 12A-12C depict five potential pieces of fabric forming a bag 10, a fill spout the same or similar to the spout 23 as shown in FIG. 12A, a discharge spout the same or similar to the spout 23 shown in FIG. 12A, a top panel the same or similar to the panel 26 shown in FIG. 12B, a bottom panel the same or similar to the panel 26 shown in FIG. 12B, and a tubular body fabric piece 27 the same or similar to that shown in FIG. 12C.

In one or more embodiments of the present invention, a bulk bag may be produced, using a fusion heat seal process, in a single step. In preferred embodiments, the fabric pieces will be gusseted and placed in position for the heat fusion sealing process. The FIGS. 13A-13D depict the final form of the fabrics portions shown in FIGS. 12A-12C, in folded/gusseted form, in a preferred embodiment, just prior to making the basic bag.

In a preferred embodiment the coating side of the fabrics is on the outside of the tubes and on the inside of the flat panels, so that the coatings will be facing each other when the bag is formed.

These coating positions can be reversed and put inside of the tubes and outside of the flat panels for top and bottom, but since coating naturally comes on the outside of tubular fabric, a preferred method is the one shown in the drawings.

Figure 13A:
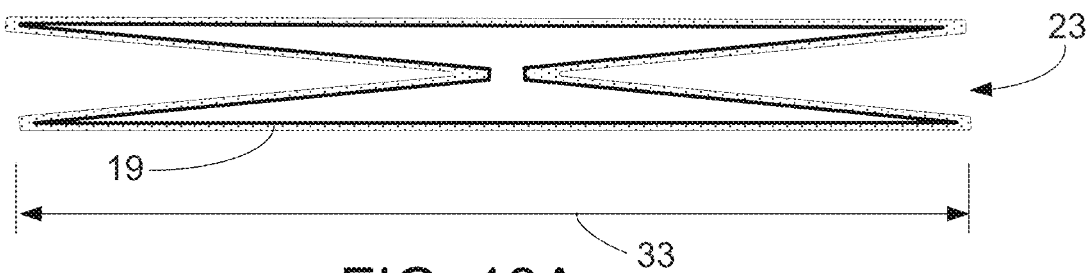
FIG. 13A illustrates an end view of a folded/gusseted fill or discharge spout of an embodiment of a heat sealed bag of the present invention.
Figure 13B:
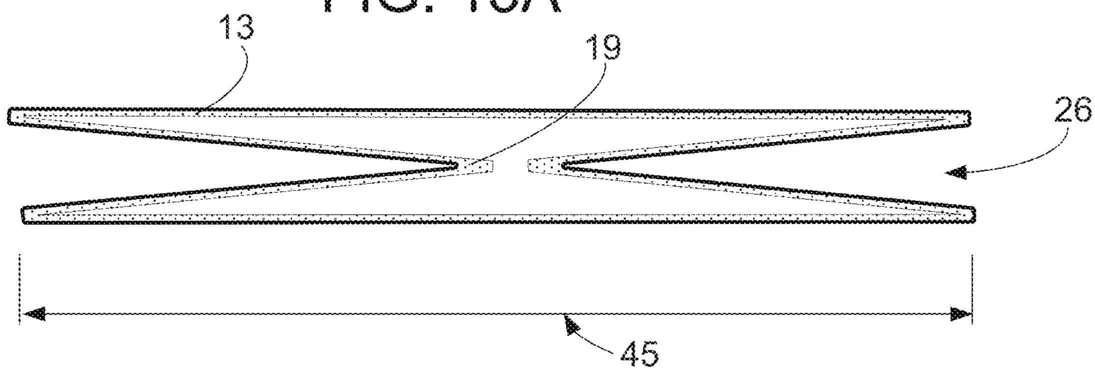
FIG. 13B illustrates an end view of a folded/gusseted top or bottom panel of an embodiment of a heat sealed bag of the present invention.
Figure 13C:
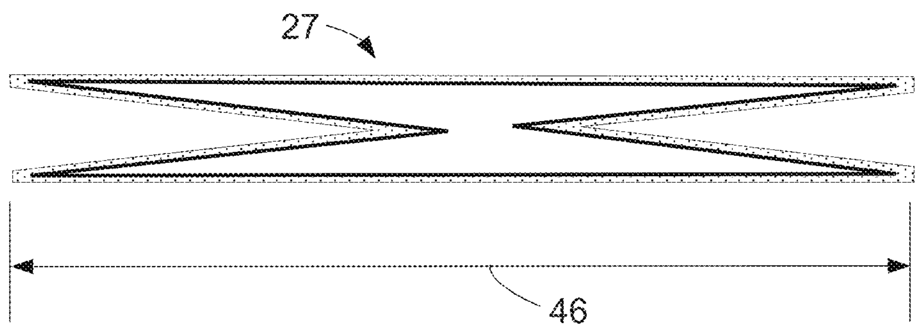
FIG. 13C illustrates an end view of a folded bag body of an embodiment of a heat sealed bag of the present invention.
Figure 13D:
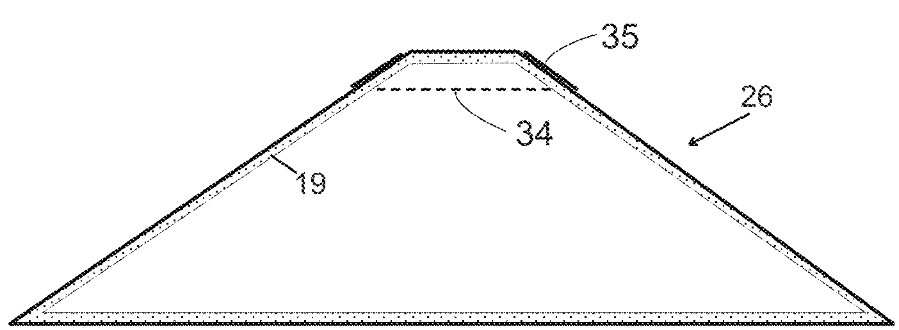
FIG. 13D illustrates a side view of a folded top or bottom panel of an embodiment of a heat sealed bag of the present invention.

FIGS. 13A-13C depict folding the bulk bag parts prior to heat sealing in a single step. As shown in FIGS. 13A-13C, the folded shape of every piece can be basically the same shape. FIG. 13A depicts an end view of a folded fill or discharge spout 23, wherein the coating or lamination 19 is on the outside of the spout 23. Line 33 depicts about an 11 inch (27.94 cm) width area, for example. FIG. 13B illustrates an end view of a folded or gusseted top or bottom panel 26 wherein the coating or lamination 19 is on the inside of the folded/gusseted panel. Line 45 depicts about a 41 inch (104.14 cm) area, for example. FIG. 13C illustrates an end view of a folded/gusseted tubular bag body 27 wherein the coating or lamination 19 is on the outside. Line 46 depicts about a 37 inch (93.98 cm) area. FIG. 13D depicts a side view of a folded top or bottom panel 26, wherein coating 19 is on the inside of panel 26. Dotted line 34 represents a future fold line. Corner slits 35 are also shown. Approximately a 45 degree angle may be formed.

Figure 14:
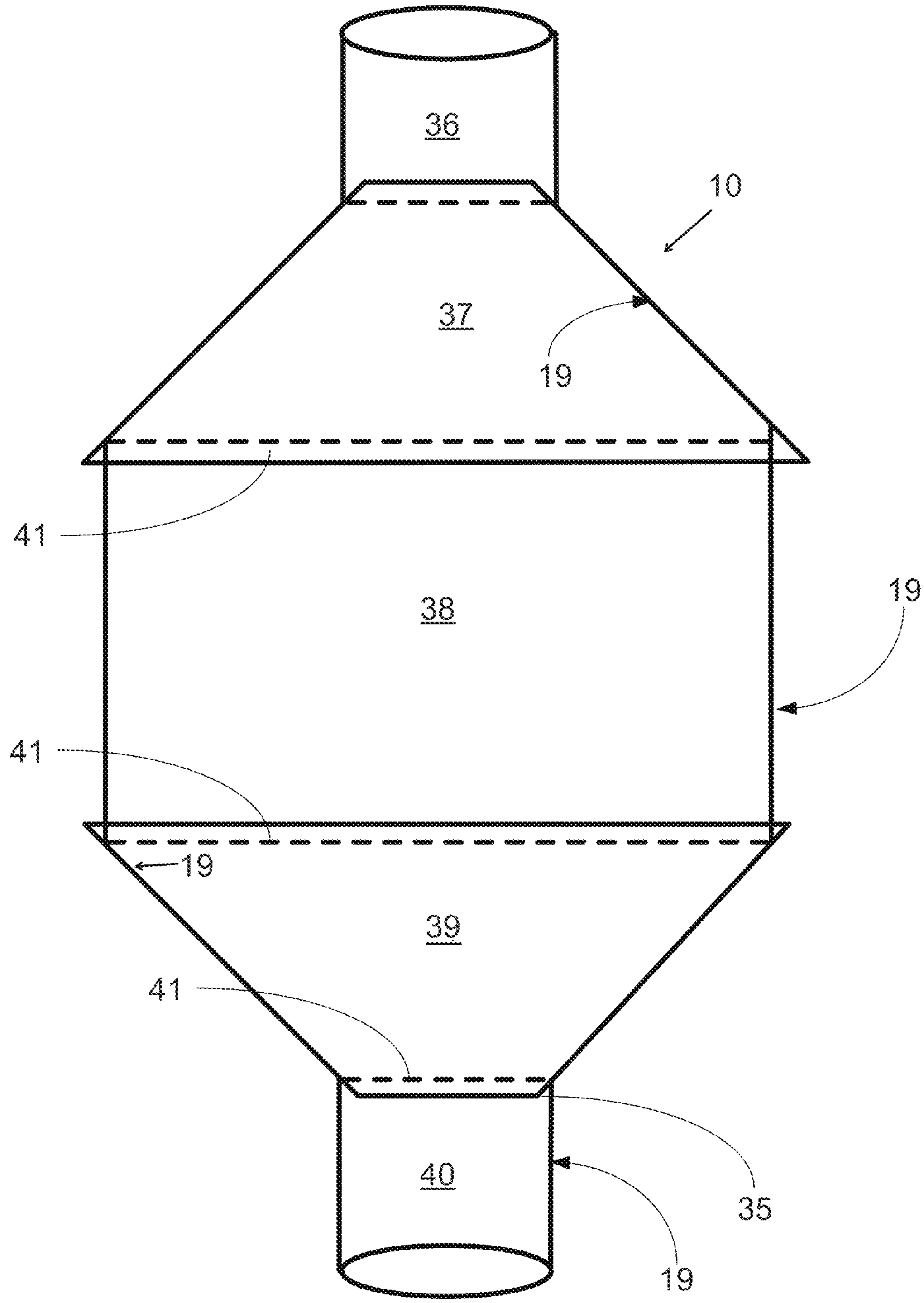
FIG. 14 illustrates an overall view of an embodiment of a heat sealed bag of the present invention with four heat sealed joints or seams and illustrating overlapping of joint areas.

The folding arrangement as described above enables each piece to fit inside or around the piece it will be connected to in the production process, to form the desired overlap areas for a bag joint, as shown in FIG. 14.

Fill spout 36 as shown in FIG. 14 can be folded or gusseted like spout 23 as shown in FIG. 13A prior to be assembled to form bag 10. Discharge tube 40 can be folded or gusseted like spout 23 as shown in FIG. 13A prior to be assembled to form bag 10. Top 37 as shown in FIG. 14 can be folded or gusseted as shown for panel 26 in FIGS. 13B and 13D prior to be assembled to form bag 10. Bottom 39 as shown in FIG. 14 can be folded or gusseted as shown for panel 26 in FIGS. 13B and 13D prior to be assembled to form bag 10. Body 38 as shown in FIG. 14 can be folded or gusseted like body portion 27 as shown in FIG. 13C prior to be assembled to form bag 10.

Figure 15:
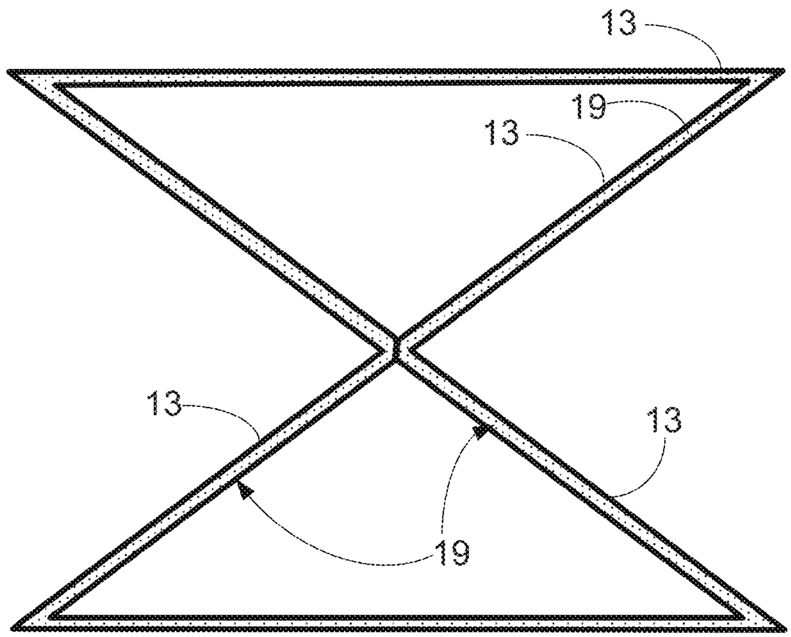
FIG. 15 illustrates layering of fabrics in an embodiment of the heat sealing method of the present invention.
Figure 16:
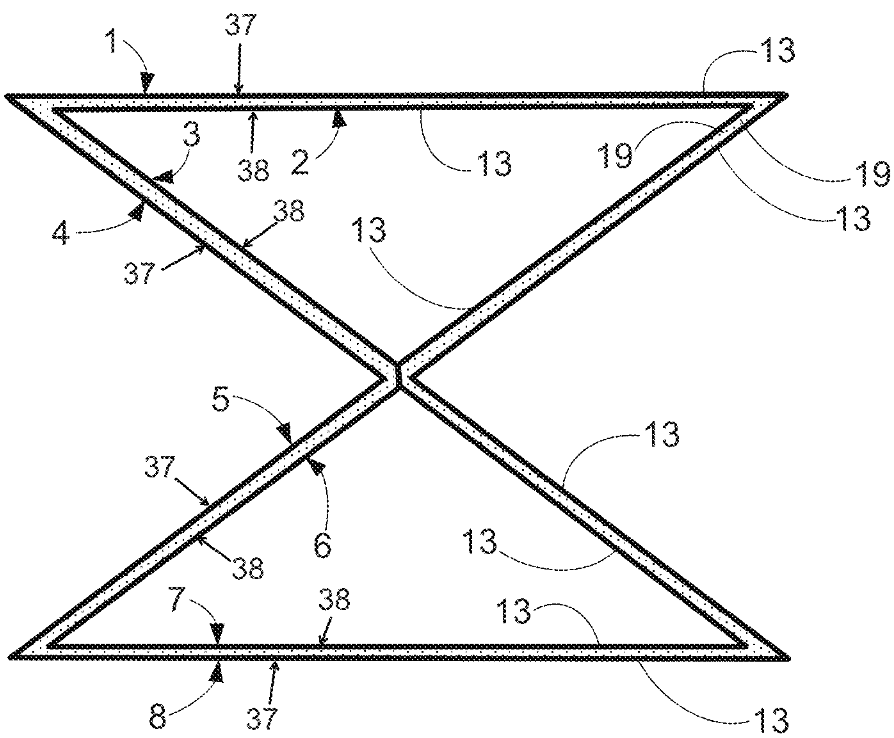
FIG. 16 illustrates layering of fabrics in an embodiment of the heat sealing method of the present invention.

Once the fabrics portions are positioned together with desired overlap areas for desired bag joints, a bag 10 is ready to seal as shown in FIG. 14. At each of the four fusion heat seal areas or joints 41, the parts are positioned with the outer part having the coating 19 facing inward and the inner part having the coating 19 facing outward as shown in FIGS. 15-16.

Coating 19 can be a bonding coating, e.g., a propylene based plastomers or elastomers coating such as VERSIFY™ 3000, or coating 19 can be a standard polypropylene fabric coating. In the overlapped joint areas 41, a bonding coating on piece of fabric can face another bonding coating on another piece of fabric, or a bonding coating on one piece of fabric can face a standard polypropylene fabric coating on another piece of fabric. Note that a bag joint will not be formed in areas where a standard polypropylene fabric coating on one piece of fabric is facing a standard polypropylene fabric coating on another piece of fabric. A buffer material can be positioned in areas between a bonding coating and a bonding coating, or in areas between a bonding coating and standard polypropylene coating if a bag joint is not desired in the area and heat might travel to or through that area.

This results in a total of 8 layers of fabric at all points from bottom to top. In FIGS. 15-16, layers 1-8 are shown.

Example; Connection of Top to Body of Bag

| | | | |
|---|---|---|---|
| 1. | Top layer | Top Panel | flat side |
| 2. | Second layer | Body Panel | flat side |
| 3. | Third Layer | Body Panel | Gusset side |
| 4. | Fourth layer | Top Panel | Gusset Side |
| 5. | Fifth layer | Top Panel | Gusset Side |
| 6. | Sixth Layer | Body Panel | Gusset Side |
| 7. | Seventh Layer | Body Panel | Flat Side |
| 8. | Eighth Layer | Top Panel | Flat Side |

By lining up multiple layers in this fashion, the heat sealing method of the present invention is able to completely join the top to the body panel in a single action. When the structure as depicted in figures in 15-16 is collapsed, the structure is always coating 19 to coating 19 for joint creation and fabric 13 to fabric 13 for not creating a joint. In the drawings the gussets may be positioned so as to fit together and during production, fabrics are collapsed to a flat condition.

All four joints are made in the same manner.

Various embodiments of the method of the present invention using impulse sealing to make joints with heat traveling through multiple fabric layers and without exceeding the safe temperature limit, comprises controlled heating that will not rise above the desired level which is less than the melting point of the polypropylene fabric.

In preferred embodiments, in order to get the entire group of intended joints to the right temperature level without damaging the fabric strength, time will be employed to allow the required heat to become universal throughout the 8 layers of materials.

Further, it will be useful if the heat mechanisms are mirrored on the top and bottom so that heat may need to travel only 50% of the total thickness. This process may also be achievable with one heating element by using a greater time for the heat to travel throughout the entire stack of layers of fabrics. A preferred method uses heating elements on both top and bottom of the stack.

In an embodiment of the present invention, a single machine with 4 heating elements on top and four heating elements on the bottom can effectively seal, in a single action, all four of the joints shown in FIG. 14 of a complete heat sealed bag.

The fabrics can be placed and positioned under the sealing mechanisms so that the heat sealing bars cover the area to be joined plus preferably about a ¼ inch (0.64 cm) overlap, for example, to enable sealing of all edges and to also make them ungraspable. In an embodiment of the present invention, the mechanisms can control heat, time and pressure. When this is done, the bags can be put together in a completely repeatable and dependable fashion with this stage of production requiring a single automatable machine.

When making bulk bags in this manner, different sizes of bags can be made by simply changing the length of the body panel. This would require only the movement of two heating elements to match the new distance between the top and bottom panel attachments. The relationship or distance between the spout joints and the top and bottom panel would be unchanged, in this embodiment.

The method of the present invention may also be used to create different designs of bulk bags, for example baffle bags or bags with lifting loops, with heat fused seals or joints.

Preferred embodiments of the heat sealing system eliminate the need for threads and the resulting contamination that often occurs when a cut piece of thread is left inside a bag. Preferred embodiments also reduce contamination from machinery, e.g., prior art sewing machines, coming into contact with various parts of the bag. Heat sealing equipment in the present invention also preferably do not make contact with interior surfaces of the bag. Preferred embodiments also reduce or eliminate human contact with the inner surfaces of the bag.

Since the heat sealed seams or joints are solid without any needle holes, the method and system of the present invention eliminate any need for sift-proofing that is often required for stitched bulk bags. The method of the present invention provides a bag that is at least nearly air tight or is air tight.

Due to the airtightness and the cleanliness, the present invention can eliminate the need for polyethylene liners that are often added to the inside of the bulk bag for cleanliness and/or moisture control. This will reduce the amount of plastic used in the industry and therefore reduce the amount of materials eventually going into landfill.

Notably all four of the seams shown in a preferred embodiment of FIG. 14 for example, put the final seams in the shear position to withstand the forces of the heavy weights that bulk bags carry. Further, the act of carrying the weight will always stress these seams in only the shear position.

Thus, in the method of the present invention for automating production of flexible bags, packages or containers, it should be understood that this method can cover all kinds of flexible bags, packages or containers.

As previously discussed, the bulk bag industry uses a highly oriented woven polypropylene fabric. This is based on a cost versus strength matrix. Polypropylene has historically been lower in cost per pound (kilogram) and historically stronger than similar polyethylene fabric by about 30% in tensile strength. While it was always possible to use a thicker polyethylene material to make bulk bags, there has been limited interest in using that material due to the ensuing cost of getting the needed strength. Further, polyethylene fabrics have a lower melting point than polypropylene fabrics so once again, polypropylene has been a preferred material for nearly 40 years in this industry. Polypropylene is also a very inert material. It is unaffected by almost every chemical. This also makes it a good choice for making packaging bags. With all of these benefits for the industry, one area where polypropylene falls short of polyethylene, has been the result of polypropylene's inertness and its strength due to high levels of orientation.

Because of this inertness, the entire industry has relied upon a physical connection of materials for the container construction. It has relied nearly 100% on sewing as the method of construction.

One of the common alternate methods of connection to sewing that is automatable has been to use heat to form joints. When polyethylene fabrics are used, this is very common. But polypropylene crystallizes at the level of heat needed to form a joint. This crystallization destroys the joint strength rendering this method previously unusable with polypropylene fabrics. There are currently no known methods of heat sealing polypropylene fabrics together that create usable seams for the construction of polypropylene bags such as bulk bags that can carry tremendous weights, e.g., about 5,000 pounds (2,268 kilograms).

As stated earlier, the sewing process is very labor intensive and very poorly suited for any form of automation. Sewing machines have very high speed parts moving to allow sewing stitches to be applied at thousands of stitches per minute. At these speeds, even if the machines were operated robotically, needles and threads are continually breaking and needing human repair to be put back into operation. Therefore, due to the inability to run without constant human support, the bulk bag industry has never been able to automate its production in an efficient and cost effective manner. This has led to the loss of all of these jobs to overseas plants located in low labor cost countries.

Therefore, there is a need for an automatable system of bulk bag construction that will reduce the high levels of labor currently required in the construction of bulk bags. This will allow the production to be positioned close to the end users and eliminate the extremely long lead times and high inventory needs that the industry suffers with under the current sewing construction methods.

An embodiment of the method of the present invention comprises a method of constructing woven fabric bags using a novel and unique heat sealing method. Use of a heat sealing process is well known and quite common in the joining of woven polyethylene fabrics. It is commonly understood that a joint efficiency of 80% to 85% is an extremely good joint efficiency level. Many operations accept much lower joint efficiencies that range down into the 70's of the percentage of efficiencies.

In the sewn seams, the efficiency is often only 65%. The strength of the polypropylene fabric takes these joint efficiencies into consideration when choosing the strength of the fabric that will be used in the construction of the final container.

Current methods of heat sealing usually involve high enough heat and high enough applied pressure to melt the basic fabrics and join them together. This method purposefully, melts any applied coating and squeezes it aside through the high pressure levels so that the base woven materials can be joined together. This method has been successful, with polyethylene fabrics for example, for several decades. It was necessary because the strength being relied upon came from the woven fabrics. The coatings that were generally applied, were applied for the purpose of providing dust and/or moisture control.

Because polypropylene is so inert, the coatings being applied had low attachment strength to the woven fabrics. Therefore, if they were to be used as the attachment point by welding the applied coatings together, the resulting strength would have no real relationship to the strength of the fabric. The resulting joint strength would only be related to the strength of the coating's attachment to the woven fabrics. When conducting testing with regard to the present invention, of making joints that relied on the strength of the coating's attachment using the present technology, results showed about a 27% joint efficiency on the particular strength of materials tested. In these tests, it was never the fabric that broke. It was always the coating detaching from the fabric that caused the joint to fail.

In the present invention, a coating that can be applied in a standard extrusion coating method attaches so completely to the polypropylene fabrics that it is no longer necessary to apply high pressure that will squeeze the coating out from under the heated jaws of the sealing mechanism. In fact, by sealing under less than 10 psi (68.9 kilopascal), it is an objective of this invention to utilize the strength of the applied coating as part of the strength of the final heat seal. The fabric itself is nearly undamaged during this heat sealing method. In an embodiment of the present invention, only the coating is intended to be melted to create the joint. Tests results show achievement of over 90% joint strengths. Some tests results are running up as high as 100% of the strength of the coated materials that have not been sealed. However, the resulting strength of the joints many times exceeds the strength of the original fabric itself prior to it having been coated.

Therefore, in an embodiment of the method of the present invention, the method of heat sealing creates seams that are sometimes actually stronger than the original fabric before any process begins. Considering that the current methods are working with sewn seams that have a 65% joint efficiency, it is an objective of the present invention that this heat sealing method will make heat sealed joints with minimal damage to the original fabric, if any, and will allow not only lower costs through automation to reduce labor costs, but will provide many opportunities to reduce fabric weights and thicknesses used in making bulk bags while providing similar overall strengths through the higher seam efficiencies. An example would be as follows; if the sewn fabric had a tensile strength of 200 pounds per inch (3,572 kilograms/meter), after being sewn the seam would have a strength of 65% of the 200 pounds per inch (3,572 kilograms/meter) or only 130 pounds (58 kilograms). With a 90% joint efficiency, a fabric that had an original strength of 150 pounds per inch (2,678 kilograms/meter) would still create a seam strength of 135 pounds per inch (2,410 kilograms/meter). This would allow a 25% reduction in the strength of the fabric to create an equal seam. This obviously then will lead to long term reductions on the amount of fabrics needed with this system to create bags with similar strengths.

All seams have at least two measurements that are critical to its success. These are generally called shear and peel tests.

In the shear tests, the joint is made with two ends of the material being joined at opposite ends of the joint area. When the free ends of the materials are pulled in opposite directions, the entire sealed area supports the joint efficiently. This results in the highest possible demonstration of the sealed joint efficiency.

In the peel test, two free ends of the test materials are on the same side of the joint. In this case, when the two free ends are pulled apart, only one edge of the seal is stressed at any one time. This results in the peeling of the joint as the ends are pulled apart. This typically results in the lowest joint efficiency.

Figure 17:
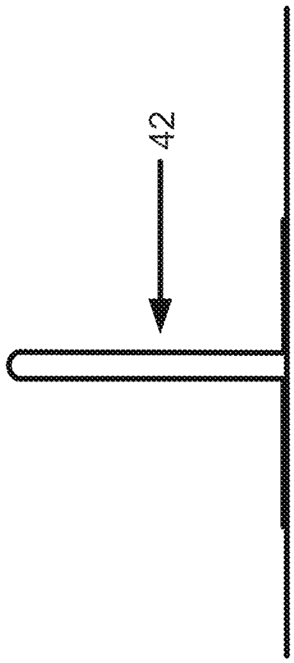
FIG. 17 illustrates an example of a heat sealed seam of the present invention wherein the fabric of the wall is doubled.
Figure 19:
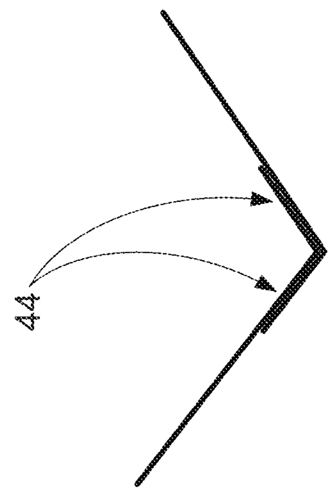
FIG. 19 illustrates an isolated view of a heat sealed seam or joint of the present invention wherein the edges of the fabric at the point of the seal are overlapped.
Figure 18:
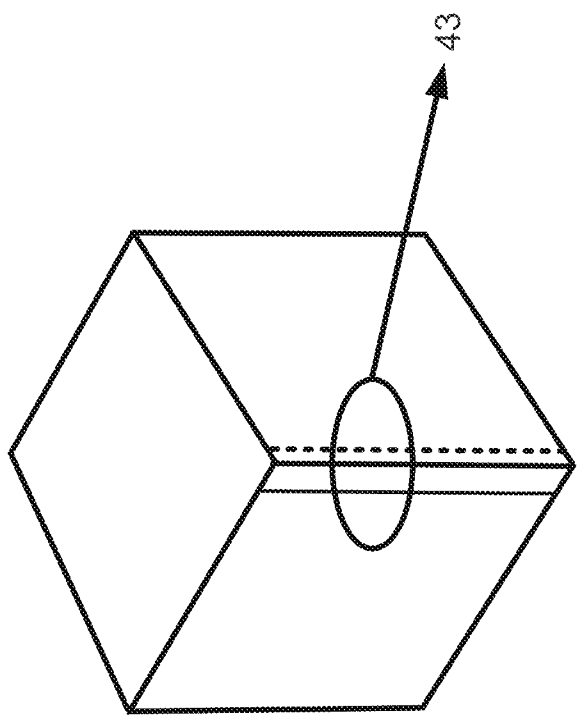
FIG. 18 illustrates an overall view of an embodiment of a heat sealed fabric bag of the present invention.

An embodiment of the present invention is illustrated in FIGS. 17-19. FIG. 17, depicts a joint wherein the fabric wall is doubled, to form a double fabric wall 42 in an upside down "T" shape construction. As the fabric meets the end wall, one leg goes to each side, and pressure from either side protects the opposite side with its shear strength. In FIG. 18, a fusion heat sealed bulk bag 10 can be designed in a manner such that lap seams 43 as shown can be used. The product will always be pushing the joint in the shear direction, as illustrated by arrows 44 in FIG. 19, which depict pressure being applied from product held within a bag.

Figure 20:
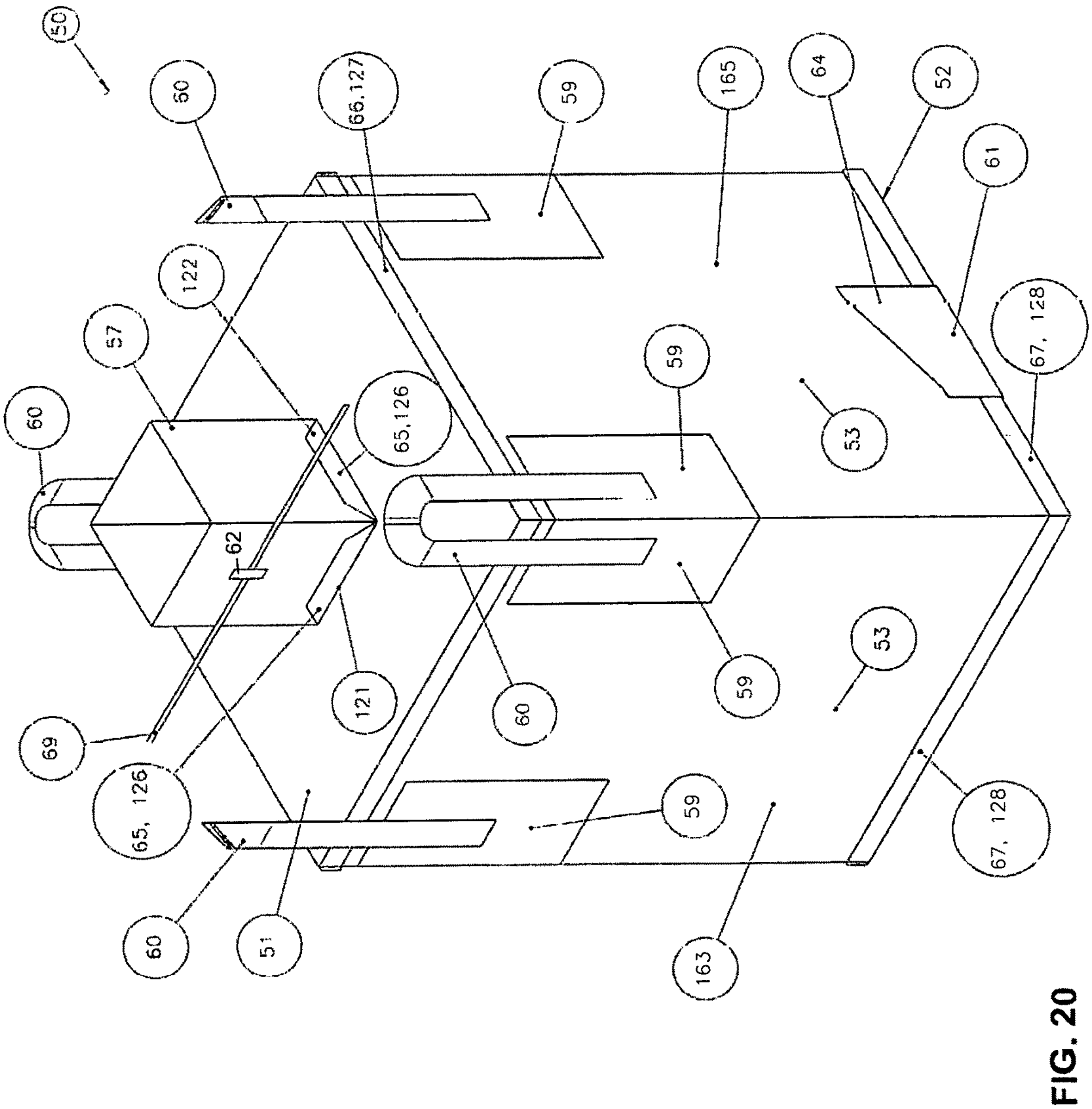
FIG. 20 is a perspective view of a full assembly of a heat sealed bag in a preferred embodiment of the present invention.

FIGS. 20-48I represent a preferred embodiment of a stitchless bulk bag 50 of the present invention made with heat fused joints or seams. Lift loop assemblies 56 and a bottom cover 61, sometimes referred to herein as a diaper, are included in the embodiment as depicted in FIG. 20. In other embodiments, a bag 50 can be assembled without a lift loop assembly 56. In other embodiments a bag 50 can be assembled without a bottom cover 61. In other embodiments, a bag 50 can be assembled without a lift loop assembly 56 and/or without a bottom cover 61. In other embodiments a different lift loop assembly or bottom cover assembly can be included on a bag 50.

A stitchless bag 50 preferably has no stitches or sewn seams in a containment area of the bag, i.e., on a surface of the bag 50 that comes into contact with bulk material contained within the bag 50. In a preferred embodiment the bag 50 has no vertical or longitudinal seams or joints in a containment area. Preferably the bag 50 has horizontal or transversely extending joints around a circumference of the bag at connections between a fill spout 57 and top 51, a top 51 and body 53, a body 53 and bottom 52, and a bottom 52 and discharge tube portion 58. Preferably bulk bag 50 comprises highly oriented polypropylene fabric. As shown in FIGS. 20-32 stitchless bulk bag 50 preferably includes a fill spout 57, a top 51, body 53, bottom 52 and discharge tube 58.

Fill spout 57 preferably comprises a first side 112, second side 113, front side 115 and back side 116, with unsealed or open top 80 and open bottom 54 portions (see FIGS. 20-21, 22A, 33-33A, 43). Fill spout 57 also preferably includes an interior surface 130 extending around an entire interior circumference of fill spout 57, and exterior surface 131 extending around an entire exterior circumference of fill spout 57. Preferably a tie strap or string 69 is provided on fill spout 57 for closing off fill spout 57, e.g., after stitchless bulk bag 50 is filled with bulk material. Tie strap 69 can be preferably secured to fill spout 57 via fabric tape 62, for example. An example of fabric tape, or other similar materials, that can be used is polypropylene fabric tape with a non-solvent adhesive, wherein preferably the adhesive remains active.

Preferably exterior surface 131 of fill spout 57 comprises a heat sealing coating or layer at least in lower portion 111 of fill spout 57, which can be a fusion coating 191 or a standard polypropylene fabric coating 192. As will be discussed further below in describing construction of bag 50, preferably exterior surface 131 of fill spout 57 comprises a standard industry coating 192 at least in a lower portion 111 of fill spout 57 which can form part of fusion area 65 and joint 126 with top 51. (See FIGS. 21-23, 27, 28.)

Similarly, discharge tube 58 comprises a first side 171, second side 172, front side 173 and back side 174, with unsealed or open top 175 and bottom 176 portions (see FIGS. 20-21, 22E, 34-34A, 44). Discharge tube 58 also preferably includes an interior surface 138 extending around an entire interior circumference of discharge tube 58, and exterior surface 139 extending around an entire exterior circumference of discharge tube 58. Preferably a tie strap or string 69 is provided on discharge tube 58 for closing off discharge tube 58, e.g., after stitchless bulk bag 50 is filled with bulk material. Tie strap 69 can be secured to discharge tube 58 via fabric tape 62, for example. Preferably exterior surface 139 of discharge tube 58 comprises a heat sealing coating or layer at least in upper portion 177 of discharge tube 58, which can be a fusion coating 191 or a standard polypropylene fabric coating 192. As will be discussed further below in describing construction of bag 50, preferably exterior surface of upper portion 177 of discharge tube 58 comprises a standard industry coating 192 at least in upper portion 177 of discharge tube 58 which can form part of fusion area 68 and joint 129 with bottom 52. (See FIGS. 21-23, 27, 28.)

Figure 21:
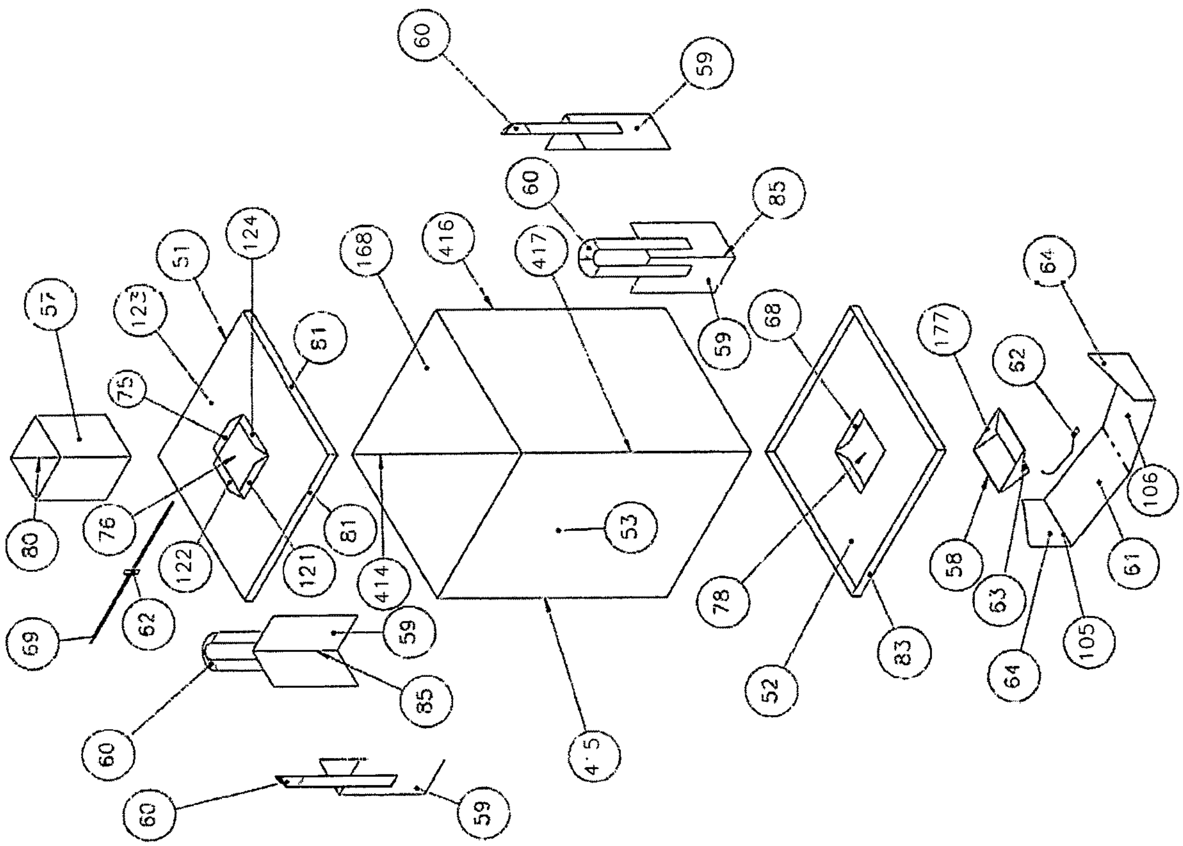
FIG. 21 is an exploded perspective view of a heat sealed bag with a discharge tube pull tab option in an alternative preferred embodiment of the present invention.
Figure 22C:
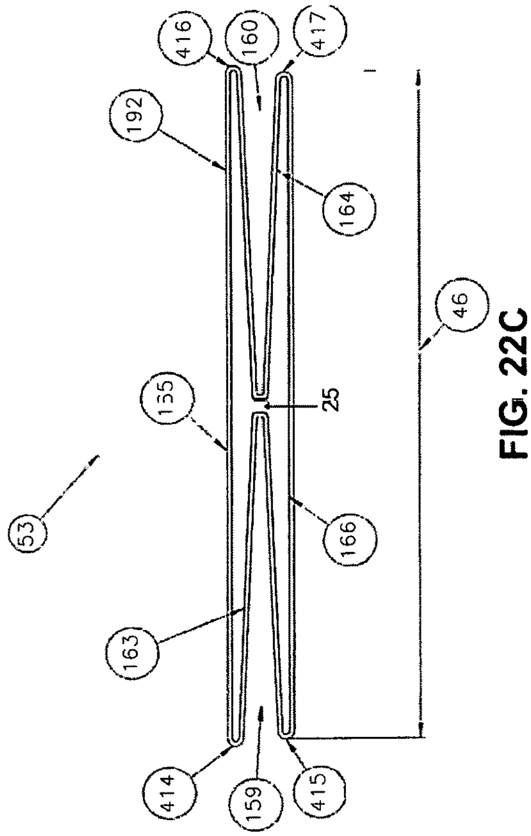
FIG. 22C illustrates an end view of a folded bag body portion in an alternative preferred embodiment of a heat sealed bag of the present invention.
Figure 22D:
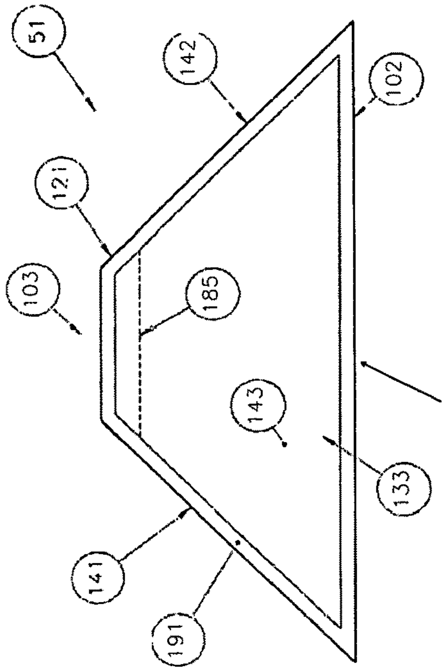
FIG. 22D illustrates a side view of a folded top in an alternative preferred embodiment of the present invention.

Top 51 preferably starts with a piece of fabric having a bottom side 100 and upper side 101 and can comprise four tabs or flaps 121, 122, 123, 124 on upper side 101, positioned around an opening 76 (see FIGS. 21, 22B, 22D, 23, 36-36A, 46-46B). Flaps or tabs 121, 122, 123, 124 can be formed by providing four slits 75 in upper side 101 extending away from opening 76 and then folding portions of top 51 that extend between any of two said slits backwards, e.g., at a fold line 185 (see FIG. 22D) towards exterior surface 133 of upper side 101. Bottom side 100 also has a surface which is referred to herein as interior surface 132 per a preferred folding of top 51 as further described below. When top 51 is folded in a triangular shape as shown in FIG. 22D, top 51 can have open or unsealed bottom portion 102.

Figure 22A:
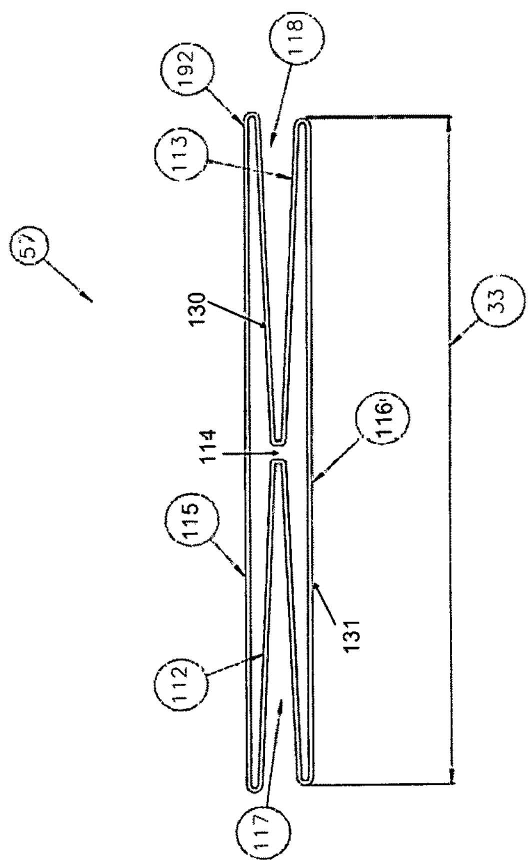
FIG. 22A illustrates an end view of a folded fill spout in an alternative preferred embodiment of a heat sealed bag of the present invention.
Figure 22B:
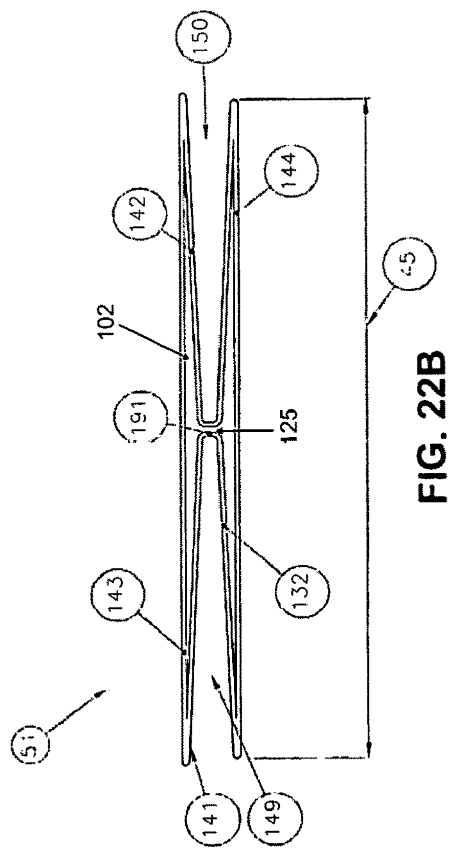
FIG. 22B illustrates an end view of a folded top in an alternative preferred embodiment of a heat sealed bag of the present invention.

FIG. 22B illustrates a view of top 51 including lower portion 81, and depicting forming gussets 149, 150 for top 51 when in triangular folded form. In the triangular folded position, top 51 can have fold 141, fold 142, front side 143 and back side 144 with interior surface 132 extending around an entire circumference of folded top 51 including on tabs or flaps 121, 122, 123, 124 if present. Exterior surface 133 also extends along an entire exterior circumference of top 51 in folded triangular position. Flaps 121, 122, 123, 124 of top 51 can be heat fused to lower portion 111 of fill spout 57 on each side of fill spout 57, forming a joint 126 in fusion area 65 between top 51 and fill spout 57. Although not shown in the figures, top 51 can alternatively include an opening 76 on upper side 101 without any flap or tab portions, and with a heat fusion or sealing area preferably on the interior side of the top at least at or near opening 76 which can form a heat fused joint with fill spout 57 in a similar manner as described above. When opening 76 is a substantially square shape, including slits 75 is beneficial because the slits 75 enable some expansion of the opening going from a smaller square to a larger circular shape, for example. In some embodiments, and opening 76 can be a shape other than substantially square.

Top 51 further includes lower portion 81 extending around a circumference of interior surface 132 of top 51 which can be heat fused to upper portion 161 of body 53 to form joint 127 in heat sealing or fusion area 66, around an entire circumference of body 53 (see FIGS. 20-21, 30, 31, 46-46B).

Preferably interior surface 132 of top 51 comprises a heat sealing coating or layer at least on flaps 121, 122, 123, 124, that will form a joint with portion 111, which can be a fusion coating 191, or a standard polypropylene fabric coating 192. Preferably interior surface 132 of top 51 also comprises a heat sealing coating or layer in lower portion 81 for forming a joint with upper portion 161 of body 53. As will be discussed further below in describing construction of a bag 50, preferably interior surface 132 of top 51 has a bonding coating 191 at least on interior surface 132 of flaps 121, 122, 123, 124 and in lower portion 81, which allows for the least amount of fabric with the more expensive fusion coating in the overall bag construction and is important for cost reduction in bag production.

Figure 22G:
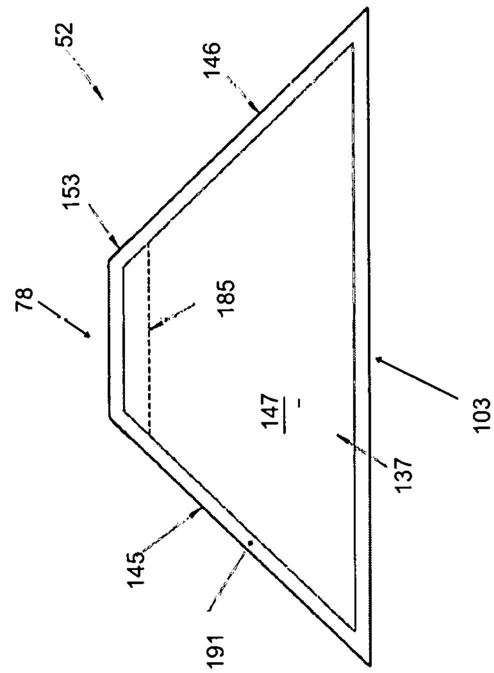
FIG. 22G illustrates a side view of a folded bottom in an alternative preferred embodiment of the present invention.
Figure 22E:
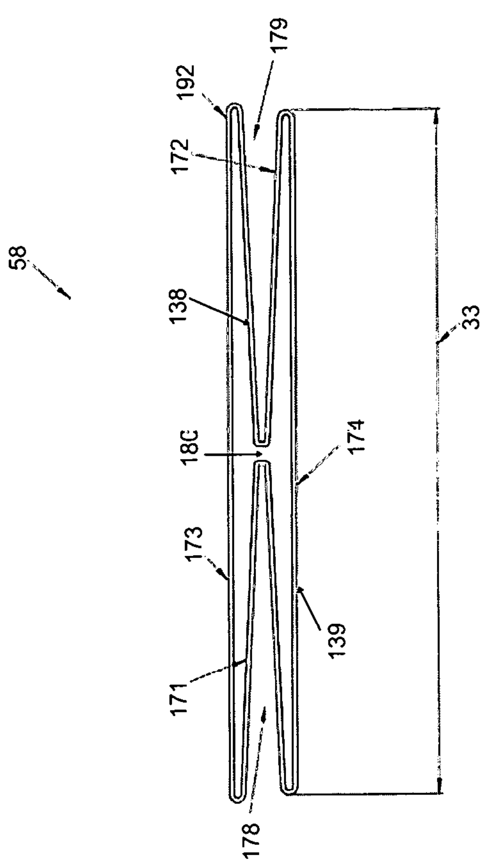
FIG. 22E illustrates an end view of a folded discharge tube in an alternative preferred embodiment of a heat sealed bag of the present invention.
Figure 22F:
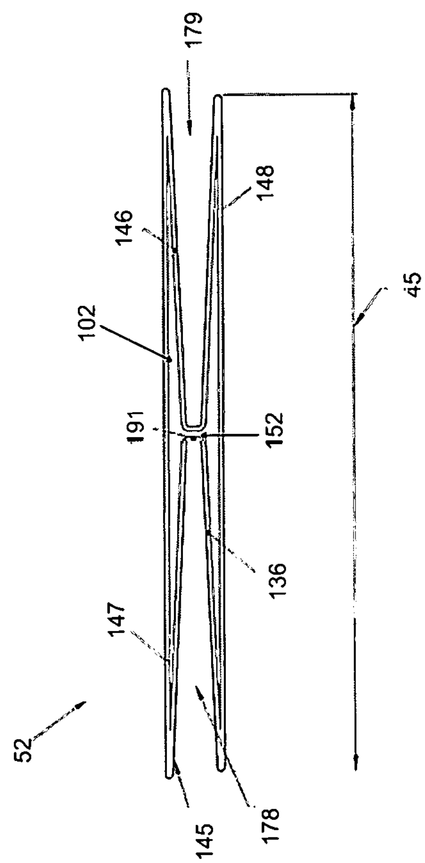
FIG. 22F illustrates an end view of a folded bottom in an alternative preferred embodiment of a heat sealed bag of the present invention.

Bottom 52 preferably starts with a piece of fabric having a bottom side 104 and upper or top side 94 and can comprise four tabs or flaps 153, 154, 155, 156, positioned around an opening 78 (see FIGS. 20-21, 30, 31, 37, 47-47A. Flaps or tabs 153, 154, 155, 156 can be formed by providing four slits 77 in bottom 52 extending away from opening 78 and then folding portions of bottom 52 extending between two of any of said slits 77 backwards, e.g., at fold line 185. When in folded triangular position as shown in FIG. 22G, bottom 52 also preferably includes an open or unsealed bottom portion 103. In triangular folded position bottom 52 can include first fold 145, second fold 146, front side 147 and back side 148. FIG. 22F illustrates a view of bottom 52 including upper portion 83, and depicting forming gussets 178, 179 in bottom 52 when in triangular folded form. Bottom 52 also preferably has an interior surface 136 extending around an entire interior circumference of bottom 52 in folded triangular condition including on an interior surface of flaps 153, 154, 155, 156. Bottom 52 also preferably has an exterior surface 137 extending around an entire exterior circumference of bottom 52 in triangular folded condition. Flaps 153, 154, 155, 156 can be heat fused to discharge spout 58 on each side of discharge spout 58 wherein a joint 129 is formed in fusion area 68 around an entire circumference of discharge spout 58. Although not shown in the figures, bottom 52 can alternatively include opening 78 on upper side 94 without any flap or tab portions with a heat fusion or sealing area preferably on the interior surface 136 of the bottom at least at or near opening 78 which can form a heat fused joint with discharge tube 58 in a similar manner as described above. When opening 78 is a substantially square shape, including slits 77 is beneficial because the slits 77 enable some expansion of the opening going from a smaller square to a larger circular shape, for example. In some embodiments, and opening 78 can be a shape other than substantially square.

Bottom 52 preferably includes upper portion 83 around a circumference of interior surface 136 that can be heat sealed to lower portion 162 of body 53 forming joint 128 in fusion or sealing area 67 around an entire circumference of body 53 on lower portion 162 of body 53 (see FIGS. 27-28, 45-47).

Preferably interior surface 136 of bottom 52 comprises a heat sealing coating or layer at least on flaps 153, 154, 155, 156, which can be a fusion coating 191 or a standard polypropylene fabric coating 192. Preferably interior surface 136 of bottom 52 also includes a heat sealing coating or layer in upper portion 83 for forming a joint with lower portion 162 of body 53. As will be discussed further below in describing construction of bag 50, preferably interior surface 136 of bottom 52 comprises a fusion coating 191 or layer at least on interior surface 136 of flaps 153, 154, 155, 156, on interior surface 136 in upper portion 83 which allows for the least amount of fabric with the more expensive fusion coating in the overall bag construction.

Body 53 preferably includes an open or unsealed top portion 168 and open or unsealed bottom portion 169, a first side 163, second side 164, front side 165 and back side 166. Body 53 also preferably has an upper portion 161 on exterior surface 135 that can be included in fusion or sealing area 66, and placed in contact with lower portion 81 of top 51 at a desired location where joint 127 can be formed on stitchless bag 50. Body 53 also preferably includes a lower portion 162 on exterior surface 135 that can be included in fusion or sealing area 67, and positioned in contact with upper portion 83 of bottom 52 at a desired location for forming joint 128.

It should be noted that as described herein with regard to a fusion bag 50 and the method for forming same, a standard polypropylene fabric coating 192 will only act as a heat sealing coating in any given fusion or sealing area, when it is positioned in contact with a bonding coating 191. If a standard polypropylene fabric coating 192 is present on fabric in areas that are not fusion areas, wherein a standard polypropylene fabric coating 192 is in contact with another standard polypropylene fabric coating 192, the standard coatings do not act as a heat sealing coating that can form a heat fused joint for a bulk bag as described herein. When a standard fabric polypropylene heat sealing coating 192 is in contact with another standard fabric polypropylene heat sealing coating 192 and heat is applied, any bond formed is not strong enough to act as a bag joint and if the bond is broken the bag fabric has minimal or no damage.

Joint 126 preferably provides an air tight sealed connection between fill spout 57 and top 51. Joint 126 can be formed in fusion or heating sealing area 65 and is preferably a heat sealed joint between fill spout 57 and top 51 (see FIGS. 20, 27-28).

To form a joint 126, fill spout 57 can be positioned on a surface with back side 116 resting on the surface, and front side 115 facing upwards (see FIG. 22A). Fill spout 57 is folded to form gussets 117 and 118, wherein interior surface 130 of first side 112 is drawn towards center 114 to form gusset 117 and interior surface 130 of second side 113 is drawn towards center 114 to form gusset 118 (see FIG. 22A). Preferably interior surface 130 of each side 112 and 113 is drawn near center 114 but does not reach center 114 and interior surface 130 of each side 112 and 113 do not contact one another. Preferably after forming gussets 117 and 118, fill spout 57 is pressed so that fill spout 57 with gusseted portions 117 and 118 lies substantially flat on the surface. By folding fill spout 57 as discussed, a two-dimensional configuration is provided.

Top 51 is preferably folded in a triangular configuration and positioned on a surface so that top back side 144 rests on the surface with top front side 143 facing upwards (See FIGS. 22B, 22D). Flaps 121 and 123 can be aligned so that interior surface 132 of flap 121 rests on interior surface of flap 123. Interior surface 132 of flap 122 can be drawn towards a center 125 (not shown) and interior surface of flap 124 can be drawn towards a center p 125, without either flap extending all the way to center 125. As shown in FIG. 22D, fold sides 141 and 142 can also be drawn towards center 125, without making contact with another, and forming gussets 149 and 150, while maintaining a triangular folded configuration. By folding top 51 as discussed, top 51 is in a two-dimensional configuration. Top 51 is preferably pressed after folding.

Folded lower portion 111 of fill spout 57 can be positioned through opening 76 of folded top 51, preferably extending to about the bottom of flaps 121, 122, 123, 124, wherein interior surface 132 of flaps 121, 122, 123, 124 are in contact with exterior surface 131 of lower portion 111 including within gussets 117, 118. When positioned in this manner, the heat sealing coating which is preferably a bonding coating 191 on interior surface 132 of each flap is in contact with a heat sealing coating or layer, which preferably is a standard industry coating 192, on lower portion 111. The overlapped fabric layers of flaps 121, 122, 123, 124, and lower portion 111 can form heat sealing or fusion area 65.

Heat is preferably applied to heat fusion or sealing area 65 with heating travelling from exterior surface 133 of top 51 to each coating on each layer of fabric in heat fusion or sealing area 65. Given the two-dimensional configuration and positioning of fill spout 57 within opening 76 of top 51, this enables formation of joint 126 around an entire circumference of fill spout 57 or on each side of fill spout 57, e.g., if flaps are used, in one heat sealing step. Preferably low enough heat is applied so that the polypropylene fabric is not melted or damaged, but high enough heat is applied so that heat travels through each layer of fabric in fusion or sealing area 65. Heat can be applied to fusion or sealing area 65, via a heat sealing bar. Preferably heat is applied with a heat sealing bar having a rocking motion which helps ensure even application of heat to all layers in a heat fusion or sealing area. Heat can be applied from either upper or lower directions, or both directions to heat sealing area 65.

Lower portion 111 of fill spout 57, which preferably extends transversely around a circumference of exterior surface 131 of fill spout 57 preferably has a longitudinal length of about 1.5 inches (3.81 cm), and can be measured starting from a bottom most point of fill spout 57. Lower portion 111 can also have a longitudinal length of about 1 to 2 inches (2.54 to 5.08 cm) or any other desired length. Flaps 121, 122, 123, 124 also preferably have a longitudinal length of about 1.5 inches (3.81 cm), or can also have a longitudinal length of about 1 to 2 inches (2.54 to 5.08 cm), or other desired longitudinal length. The longitudinal length of flaps 121, 122, 123, or 124 can be measured from the bottom most point of each flap, e.g., at fold line 185 or the bottom of a slit 75. Preferably the longitudinal length of flaps 121, 122, 123, 124 corresponds to a longitudinal length of lower portion 111, and the dimensions of an overlapped portion of flaps 121, 122, 123, 124, can define the dimensions of fusion or sealing area 65.

Figure 27:
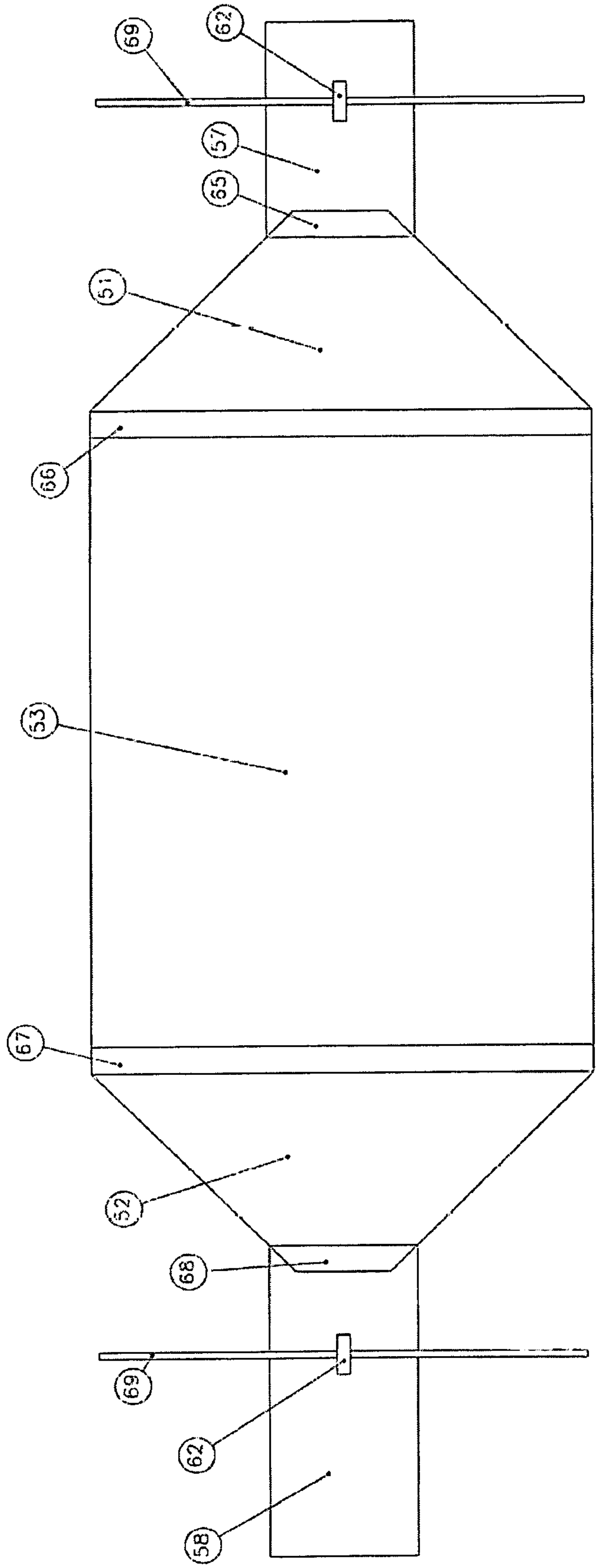
FIG. 27 is a top view of a heat sealed bag of the present invention in gusseted, substantially flat condition, showing heat sealed joints and overlap areas or locations in a preferred embodiment of the present invention.
Figure 28:
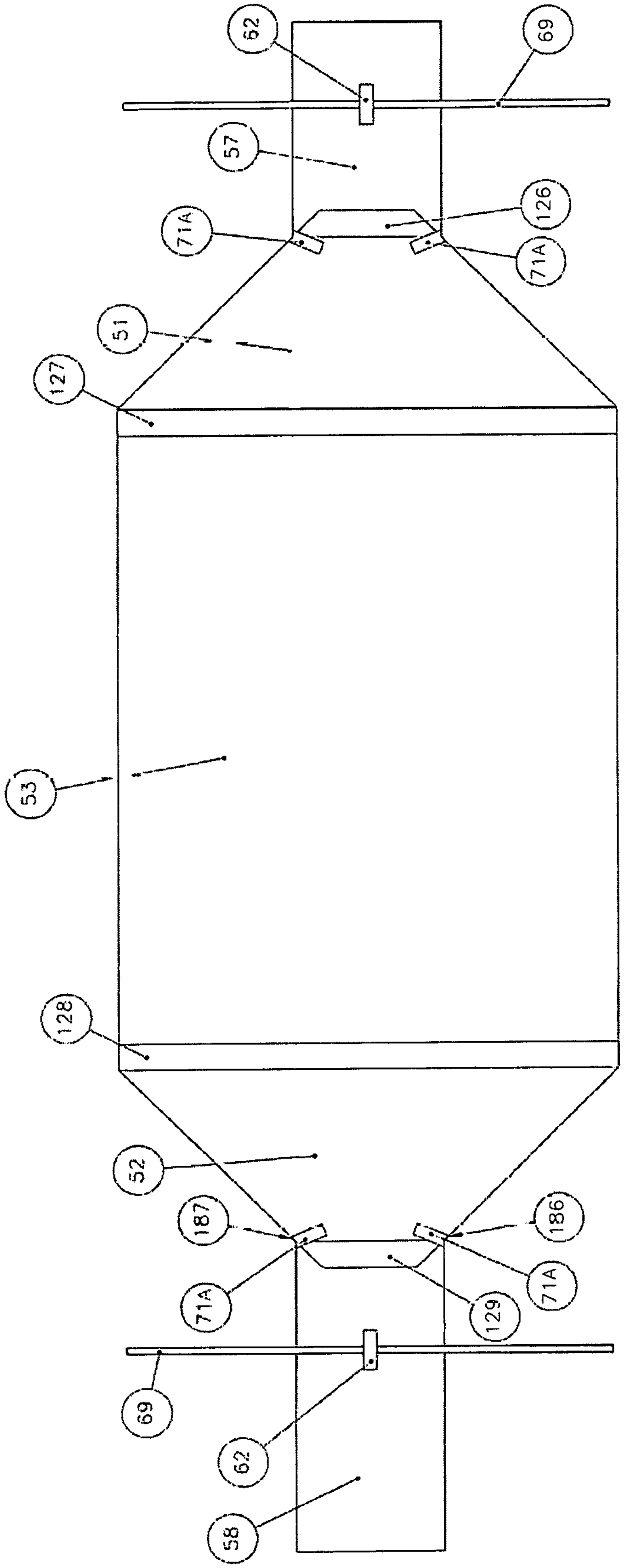
FIG. 28 is a top view of a heat sealed bag of the present invention in gusseted, substantially flat condition, including zero point tape locations.

Similarly, joint 129 preferably provides an air tight, or at least a nearly air tight, sealed connection between discharge tube 58 and bottom 52 (see FIGS. 27, 28). Joint 129 can be formed in fusion area 68 and is preferably a heat sealed joint between discharge tube 58 and bottom 52, around an entire circumference of exterior surface 139 of discharge tube 58, or on each side of discharge tube 58, e.g., if flaps 153, 154, 155, 156 are used. To form a joint 129 discharge tube 58 can be positioned on a surface with back side 174 resting on the surface, and front side 173 facing upwards (see FIGS. 22E, 22F). Discharge tube 58 is folded to form gussets 178, 179 wherein interior surface 138 of first side 171 is drawn towards center 180 to form gusset 178 and interior surface 138 of second side 172 is drawn towards center 180 to form gusset 179 (see FIG. 22F). Preferably interior surface 138 of each side 171, 172 is drawn near center 180 but does not reach center 180 and interior surface 138 of each side 171, 172 do not contact one another. Preferably after forming gussets 178, 179, discharge tube 58 is pressed so that discharge tube 58 with gusseted portions 178, 179 lies substantially flat on the surface. By folding discharge tube 58 as discussed a two-dimensional configuration is provided.

Bottom 52 is preferably folded in a triangular configuration and positioned on a surface so that bottom back side 148 rests on the surface with bottom front side 147 facing upwards. Flaps 153 and 155 can be aligned so that interior surface 136 of flap 153 rests on interior surface 136 of flap 155. Interior surface of flap 154 can be drawn towards a center 152 and interior surface of flap 156 can also be drawn towards center 152, without either flap extending all the way to center 152. As shown in FIG. 22F, in this embodiment, interior surface 136 of fold sides 145 and 146 can also be drawn towards center 152 extending near to center 152 but without touching center 152, maintaining a triangular shape folded configuration of bottom 52, and forming gussets 178 and 179. By folding bottom 52 as discussed, bottom 52 is in a two-dimensional configuration and is preferably then pressed.

Upper portion 177 of folded discharge tube 58 can be positioned through opening 78 of folded bottom 52, preferably extending to about the bottom of flaps 153, 154, 155, 156, wherein interior surface 136 of flaps 153, 154, 155, 156 are in contact with exterior surface 139 of upper portion 177 of discharge tube 58 including within gussets 178, 179. When positioned in this manner, a heat sealing coating which is preferably a bonding coating 191 on interior surface 136 of each flap 153, 154, 155, 156 is in contact with a heat sealing coating or layer which preferably is a standard industry coating 192 on upper portion 177, with fabric without heat sealing coatings being in contact with other fabric without heat sealing coatings. The overlapped fabric layers of flaps 153, 154, 155, 156, and upper portion 177 can form heat sealing or fusion area 68.

Heat is preferably applied to exterior surface 137 of bottom 52 traveling through fusion or sealing area 68 to each coating on each layer of fabric in heat fusion or sealing area 68. Given the two-dimensional configuration and positioning of discharge tube 58 within opening 78 of bottom 52, which is also in two-dimensional configuration, this enables formation of joint 129 around an entire circumference of discharge tube 58 and/or on each side of discharge tube 58 if flaps are use, at once, in one heat sealing step. Heat can be applied from either upper or lower directions, or both directions to heat sealing area 68.

Preferably low enough heat is applied so that the highly oriented polypropylene fabric is not melted or damaged, but high enough heat is applied so that heat travels through each layer of fabric in fusion or sealing area 68. Heat can be applied to fusion or sealing area 68, via a heat sealing bar. Preferably heat is applied with a heat sealing bar having a rocking motion which helps ensure even application of heat.

Upper portion 177 of discharge tube 58, which preferably extends transversely around a circumference of exterior surface 139 of discharge tube 58, preferably has a longitudinal height of about 1.5 inches (3.81 cm) and can be measured starting from an upper most point of discharge tube 58. Upper portion 177 also can also have a longitudinal height of about 1 to 2 inches (2.54 to 5.08 cm), or any desired height. Flaps 153, 154, 155, 156 also preferably have a longitudinal height of about 1.5 inches (3.81 cm), and can be measured from the bottom most point of each flap, e.g., at fold line 185 or the bottom of a slit 77, or can also have a height of about 1 to 2 inches (2.54 to 5.08 cm) or other desired height. Preferably the height of flaps 153, 154, 155, 156 corresponds to the height of upper portion 177, and the dimensions of the overlapped portion of flaps 153, 154, 155, 156 and upper portion 177 can define the dimensions of fusion area 68.

Top 51 and bottom 52 can simultaneously be connected to body 53, or alternatively in sequence.

Gussets are also preferably formed in body 53, wherein interior surface 134 of first side 163 of body 53 is drawn towards center 170 to form gusset 159, and interior surface 134 of second side 164 is drawn towards center 170 to form gusset 160. Preferably the interior surface 134 of each side 163, 164 is drawn near center 170 but does not contact center 170. Also, preferably exterior surface 135 of body 53 has a heat sealing coating or layer at least in upper and lower portions 161 and 162 that can be a fusion or bonding coating 191 or a standard polypropylene fabric coating 192. Preferably when top 51 and bottom 52 have a fusion of bonding coating 191 on interior surfaces 132, 136, body 53 has a standard industry coating 192 on exterior surface 135.

To form joint 127, upper portion 161 in two-dimensional configuration of body 53 is placed within bottom open portion 102 of top 51 in two-dimensional folded configuration, wherein interior surface 132 of lower portion 81 of top 51, including in gussets 149, 150 are in contact with exterior surface 135 of upper portion 161 of body 53, including in gussets 159, 160. The overlapped fabric areas of lower portion 81 of top 5 land upper portion 161 of body 53 can define heat fusion area 66. Heat is preferably applied to heat fusion area 66 with heating travelling from exterior surface 133 of top 51 in lower portion 81 to the heat sealing coating on each layer of fabric in fusion area 66. Given the two-dimensional configuration and positioning of upper portion 161 of body 103 in contact with lower portion 81 of top 51, through open portion 102 of top 51, this enables formation of joint 127 around an entire circumference of upper portion 161 of body 53 at one time, in one heat sealing step. Preferably low enough heat is applied so that the polypropylene fabric is not melted or damaged, but high enough heat is applied so that heat travels through each layer of fabric in fusion area 66. Heat can be applied to fusion area 66, via a heat sealing bar. Preferably heat is applied with heat sealing bar having a rocking motion which helps ensure even application of heat to all fabric layers in the heat fusion area. Heat can be applied from either upper or lower directions, or both directions to heat sealing area 66.

To form joint 128, lower portion 162 in two-dimensional configuration of body 53 is placed within upper open portion 103 of bottom 52 in two-dimensional folded configuration, wherein interior surface 136 of upper portion 83 of bottom 52, including in gussets 178, 179 are in contact with exterior surface 135 of lower portion 162 of body 53, including in gussets 159, 160. The overlapped fabric areas of upper portion 83 and lower portion 162 can define heat fusion or sealing area 67. Heat is preferably applied to heat fusion area 67 with heating traveling from exterior surface 137 of bottom 52 in upper portion 83 to the heat sealing coating on each layer of fabric in fusion or sealing area 67. Given the two-dimensional configuration and positioning of lower portion 162 of body 53 in contact with upper portion 83 of bottom 52, through open portion 103 of bottom 52, this enables formation of joint 128 around an entire circumference of lower portion 162 of body 53 at one time, in one heat sealing step. Preferably low enough heat is applied so that the highly oriented polypropylene fabric is not melted or damaged, but high enough heat is applied so that heat travels through each layer of fabric in fusion area 67. Heat can be applied to fusion area 67, via a heat sealing bar. Preferably heat is applied with heat sealing bar having a rocking motion which helps ensure even application of heat. Heat can be applied from either upper or lower directions, or both directions to heat sealing area 67.

Upper portion 161 of body 53 preferably has a longitudinal length of about 1.5 inches (3.81 cm) and extends transversely along the circumference of body 53. Upper portion 161 can also have a longitudinal length of about 1 to 2 inches (2.54 to 5.08 cm) or any desired longitudinal length. Similarly, lower portion 81 of top 51 preferably has a longitudinal length of about 1.5 inches (3.81 cm). Lower portion 81 can also have a longitudinal length of about 1 to 2 inches (2.54 to 5.08 cm) or any desired longitudinal length. When lower portion 81 is overlapped with upper portion 162, it can define the dimensions of fusion or sealing area 66.

Lower portion 162 of body 53 preferably has a longitudinal length of about 1.5 inches (3.81 cm). Lower portion 162 can also have a longitudinal length of about 1 to 2 inches (2.54 to 5.08 cm) or any desired longitudinal length. Similarly, upper portion 83 of bottom 52 preferably has a longitudinal length of about 1.5 inches (3.81 cm). Upper portion 83 can also have a longitudinal length of about 1 to 2 inches (2.54 to 5.08 cm) or any desired longitudinal length. When upper portion 83 is overlapped with lower portion 162, it can define the dimensions of fusion or sealing area 67.

As indicated, top 51 and bottom 52 can simultaneously be connected to body 53 with use of two different sealing bars, one applying heat in fusion or sealing area 66, and one applying heat in fusion or sealing area 67, simultaneously.

In various embodiments, each joint 126, 127, 128, 129 can be formed in sequence. In other embodiments, two or more joints of joints 126, 127, 128, 129 can be formed simultaneously. In other embodiments, three or more joints 126, 127, 128, or 129 can be formed simultaneously. In yet other embodiments, all joints 126, 127, 128, 129 can be formed simultaneously.

In various embodiments, each step of folding each of the top 51, bottom 52, body 53, fill spout 57, and discharge tube 58 is done manually. In various embodiments, each step of folding each of the top 51, bottom 52, body 53, fill spout 57, and discharge tube 58 is fully automated and accomplished via machinery and/or robots. In various embodiments, one or more of the steps of folding each of the top 51, bottom 52, body 53, fill spout 57, and discharge tube 58 is done manually while one or more of the steps is accomplished through automation, e.g., with machinery and/or robots.

In various embodiments, each step of forming fusion or sealing areas 65, 66, 67, 68 is done manually. In various embodiments, each step of forming fusion areas 65, 66, 67, 68 is fully automated, e.g., accomplished via machinery and/or robots. In various embodiments, one or more of the steps of forming fusion areas 65, 66, 67, 68 is done manually while one or more of the steps of forming fusion areas 65, 66, 67, 68 is accomplished through automation, e.g., with machinery and/or robots.

In various embodiments, each step of forming joints 126, 127, 128, 129 is done manually. In various embodiments, each step of forming joints 126, 127, 128, 129 is fully automated, e.g., accomplished via machines. In various embodiments, one or more of the steps of forming joints 126, 127, 128, 129 is done manually while one or more of the steps of forming joints 126, 127, 128, 129 is accomplished through automation, e.g., with machinery.

In various embodiments, each of the folding steps, formation of heat fusion or sealing areas, and heat sealing to form joints is done manually. In other embodiments, each of the folding steps, formation of heat fusion areas, and heat sealing to form joints is fully automated. In yet other embodiments one or more of the folding steps, formation of heat fusion areas, and heat sealing to form joints is done manually, and one or more of the folding steps, formation of heat fusion areas, and heat sealing to form joints is automated.

In one or more preferred embodiments, a bottom flap or bottom cover 61 is included on bag 50 to provide further support for the bottom of a bag 50, and to help prevent sifting or leaking of bulk material from the bottom of a bag 50 (see FIGS. 21-22, 23, 41-41A).

In a preferred embodiment, bag 50 includes a bottom flap or cover 61 providing additional support to bag 50. Bottom flap or cover 61 is also sometimes referred to herein as a diaper. Bottom cover 61 preferably extends from opposing sides of bag 50 across bottom 107 of bag 50, e.g., extending from a first side 162, across a width of bottom 52, over discharge tube 58, and to a second side 163. Alternatively, diaper 61 could extend from front side 165 to back side 166 across a width of bottom 52, and over discharge tube 58.

Cover 61 can have a fold 105 at the location where it extends from bottom 52 over joint 128 to one side, e.g., side 165 (see FIG. 20) and fold 106 where diaper 61 extends from bottom 52 over joint 128 to another side, e.g. side 166. Although the distance between folds 105 and 106 can be equal to the width of bag bottom portion 107, preferably the distance between fold 105 and fold 106 is shorter than the width of bottom portion 107 so that when diaper or bottom cover 61 extends across a width of bottom 107 to opposing sides of body 53, it cinches a bottom area 107 of bag 50, and causes an uplift of the bag bottom 107 which provides even more support to bag 50. Bottom cover 61 also provides a flatter surface for a bottom of the bag.

Discharge tube 58 preferably is covered by cover 61. Cover 61 can therefore also help prevent any sifting or leaking of contents from discharge tube 58 of bag 50.

Figure 23:
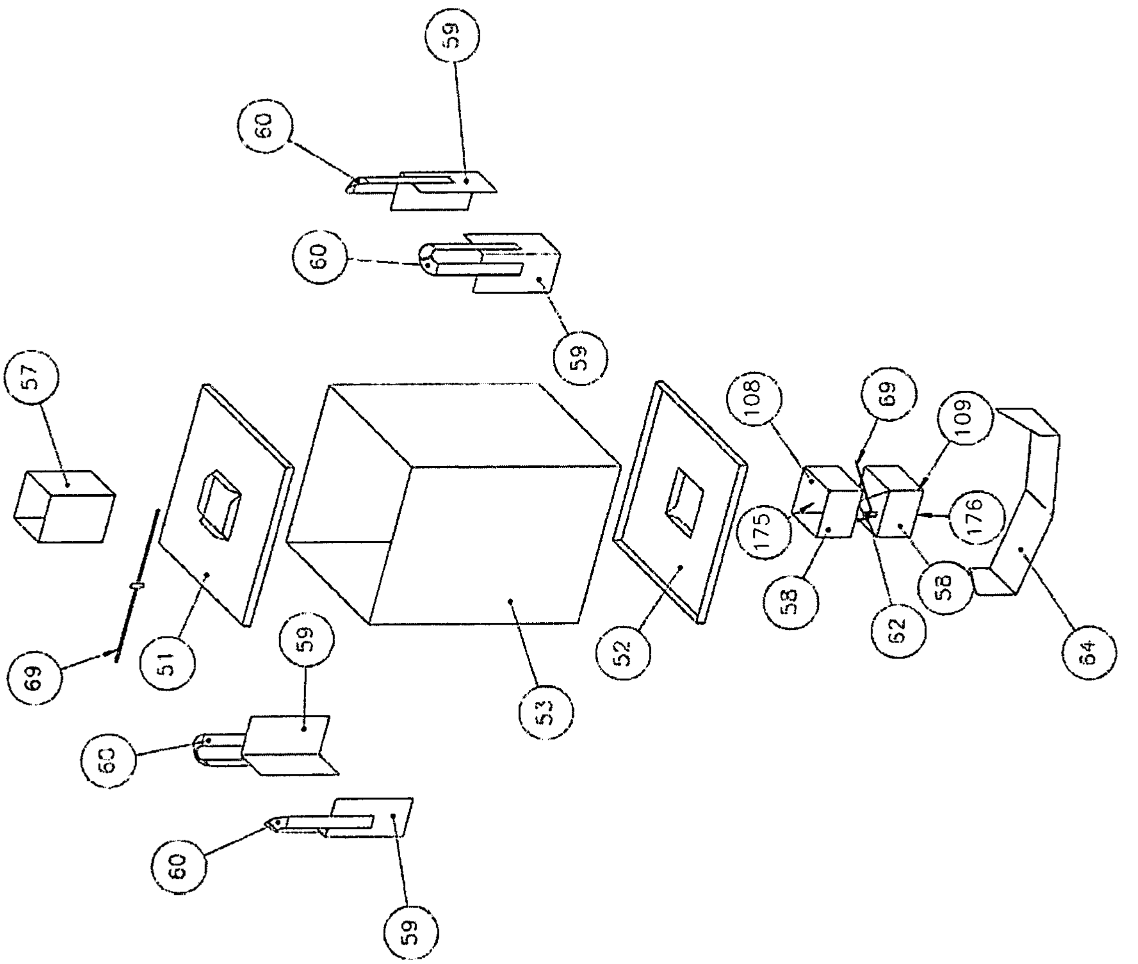
FIG. 23 is an exploded view of a heat sealed bag with a discharge tube tie-off option in an alternative preferred embodiment of the present invention.
Figure 24:
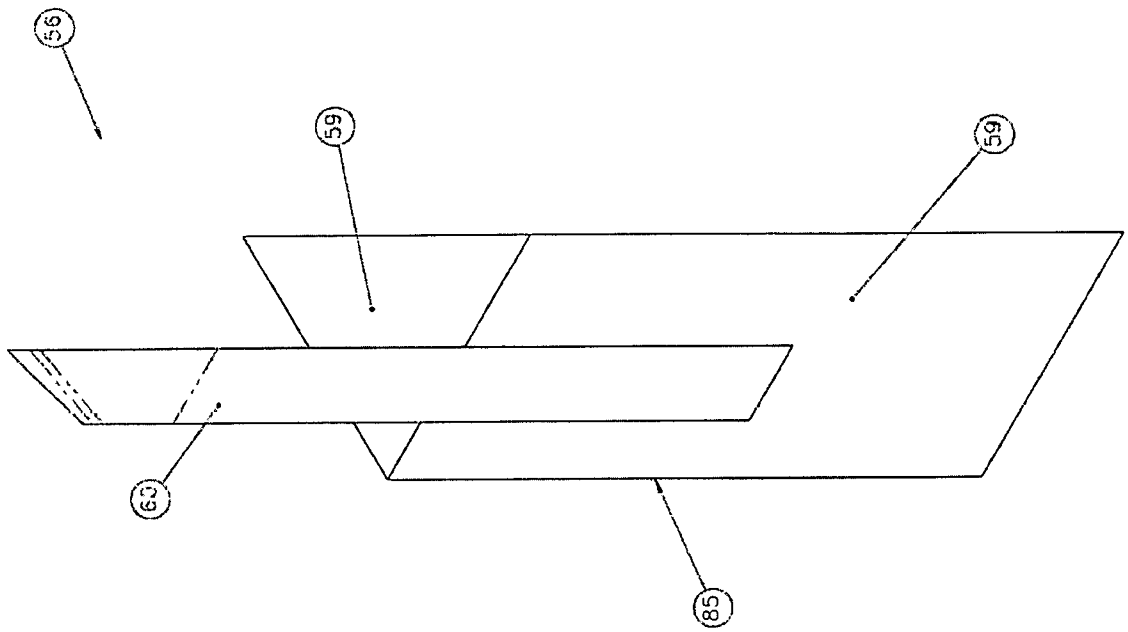
FIG. 24 is a perspective view of a heat sealed bag lift loop sub-assembly in an alternative preferred embodiment of the present invention.

FIGS. 21 and 25-26D, illustrate an embodiment of a discharge assembly that can include a discharge tube 58. In the embodiment of FIGS. 25-26D, and tie strap 69 can be eliminated. As depicted in FIGS. 21, and 25-25D, a bottom portion 109 of discharge tube 58 can be rolled up, forming rolled portion 63. Tape 55 can be secured to rolled portion 63, extending from one side of discharge tube 58, across rolled portion 63 to a second opposing side of discharge tube 58. Alternatively, as shown in FIG. 23, bottom portion 109 of discharge tube 58 below a tie strap 69 can be left unrolled. If left unrolled, when cover 61 is connected to bag 50, bottom portion 109 of discharge tube 58 below tie strap 69 can be folded to lay adjacent to top portion 108 of discharge tube 58 above tie strap 69.

Testing has shown increased bag strength of over 50% percent when a cover 61 is attached to bag 50 with a shorter width between folds 105 and 106 than the width of the bag bottom. A rolled discharge tube assembly 63 with a cover 61 having a distance between cover 61 folds 105 and 106 that is about equal to the distance between two opposing bottom edges of a bag 50 passed the required 5 to 1 safety ratio tests. A discharge tube assembly that is pinch closed, however, as depicted in FIG. 23, with a cover 61 having a distance between folds 105 and 106 that is equal to the distance between opposing first and second bottom edges of a bag 50 however, only passed the require 5 to 1 safety tests 50% of the time. As the distance between cover folds 105 and 106 becomes shorter, or less than equal, a heat fused bag with a pinch closed discharge assembly was able to pass the 5 to 1 safety lifting requirements.

In the FIBC/bulk bag industry, based on the 5 to 1 safety ratio requirements, a bag that will be carrying 2,000 pounds (907 kilograms) of material, for example, must pass testing with 10,000 pounds (4536 kilograms) of pressure applied, before the bag breaks. To test the bag, the bag is hung from its lift loops and hydraulic pressure is applied from a top of the bag to measure the force needed to break the bag.

In testing, a bag designed to hold 2,000 pounds (907 kilograms) of bulk material and having a heat fused discharge tube and bottom, and a rolled discharge tube or pinched tube in a closed configuration failed when applying 7,000 pounds (3,175 kilograms) of pressure to the bag. When a cover 61 was added to form a discharge assembly having a rolled or pinched closed configuration, the bag designed to hold 2,000 pounds (907 kilograms) of bulk material with a heat fused joint connecting a discharge tube and bottom was able to withstand 13,000 pounds (5897 kilograms) of pressure applied to the bag during testing. A cover 61 can thus increase the strength of the bag by over 50%.

Reference is made to U.S. patent application Ser. No. 15/345,452, filed on Nov. 7, 2016, titled, INDUSTRIAL BAG DISCHARGE SPOUT, incorporated herein by reference thereto, for additional information on discharge tube assemblies and bottom covers that can be used with a bag 50.

As discussed with earlier embodiments, heat fused joints of bag 50 preferably are formed by applying heat below the melting point of the fabric of the bag and low pressure, wherein preferably a fusion or bonding coating 191 comprising propylene based elastomers and plastomers, e.g., VERSIFY™ 3000, is on one side of the fabric to be joined in the fusion area, and a standard industry coating 192 is on one side of the other piece of fabric to be joined in a fusion area, wherein the standard coating 192 and fusion coating 191 are in contact with another so that when heat is applied to melt the standard and fusion coatings, a bond between the standard and fusion coatings is formed to establish the bag joint.

As discussed, a standard industry coating for polypropylene fabrics, which is sometimes referred to herein as a standard coating, generally comprises a majority percentage of polypropylene and a small percentage of polyethylene. Preferably, a standard polypropylene fabric coating used with one or more embodiments of the present invention has about 70-85 percent polypropylene with a balance of polyethylene, i.e., 15 to 30 percent polyethylene. More preferably, a standard polypropylene coating used in various embodiments of the present invention has about 70-85 percent polypropylene, with a balance of polyethylene and some UV inhibitors, and other additives.

For prior art bulk bags, generally a standard coating is applied at about 1 mil (0.03 millimeters) thickness. Preferably for a stitchless bag of the present invention a standard coating is applied at about 2.5 mil (0.064 millimeters) thickness. A standard coating can also be applied at about 1 to 2.5 mil (0.03 to 0.064 millimeters) thickness or over about 2.5 mil (0.064 millimeters) thickness.

Preferably a fusion coating is also applied at about 2.5 mil (0.064 millimeters) thickness. In other embodiments a fusion coating can be applied at about 1 to 2.5 mil (0.03 to 0.064 millimeters) thickness or over about 2.5 mil (0.064 millimeters) thickness. Given the high cost of a fusion coating, preferably a fusion coating is not applied above about 2.5 mil (0.064 millimeters) thickness, although it can be applied at a greater thickness.

In various embodiments, a coating on a particular bag portion, e.g., on a fill spout, top, body, bottom or discharge tube, can be applied at one thickness, while a coating on another bag portion can be applied at a different thickness. In various embodiments, a standard polypropylene fabric coating on one bag portion e.g., on a fill spout, top, body, bottom or discharge tube, can be applied at one thickness, while a standard polypropylene fabric coating on another bag portion can be applied at a different thickness. In various embodiments, a bonding coating on one bag portion e.g., on a fill spout, top, body, bottom or discharge tube, can be applied at one thickness, while a bonding coating on another bag portion can be applied at a different thickness. In various embodiments, a propylene based plastomers or elastomers coating on one bag portion e.g., on a fill spout, top, body, bottom or discharge tube, can be applied at one thickness, while a propylene based plastomer or elastomer coating on another bag portion can be applied at a different thickness.

When viewed under an electron microscope the bond created between a bonding coating that included VERSIFY™ 3000 and a standard polypropylene fabric coating is millionths of an inch (2.54 cm) thick. Experimentation has shown that this bond is even stronger than a bond formed between two fabric pieces of fabric that each contain a VERSIFY™ 3000 coating. The bond between a VERSIFY™ 3000 coating and a standard coating is also preferred given lower cost as each fabric piece does not need the more expensive VERSIFY™ 3000 coating. In one or more preferred embodiments, only fill spout, body, and discharge tube fabric pieces, have a bonding coating, e.g., VERSIFY™ 3000, whereas the remainder of the bag fabric can have a less expensive polypropylene standard industry fabric coating that only acts as a heat sealing coating to form a bag joint in a fusion or heat sealing area when in contact with a bonding coating. In one or more preferred embodiments, only top and bottom portions of a bag have a bonding coating, e.g., VERSIFY™ 3000, whereas the remainder of the bag fabric can have a less expensive polypropylene standard industry coating that only acts as a heat sealing coating to form a bag joint in a fusion or heat sealing area when in contact with a bonding coating.

Experimentation has established that (1) heat applied to highly oriented polypropylene fabric pieces with standard coating to standard coating in a fusion area does not create a joint that can hold even low weights; (2) heat applied to highly oriented polypropylene fabric pieces with a standard coating to a fusion coating in a fusion area creates a very strong joint; (3) heat applied to highly oriented polypropylene fabric pieces with fusion coating to fusion coating in a fusion area creates a strong joint.

Another advantage of forming a joint with a bond between bonding and standard coatings is that the majority of fabric, e.g., on the body, discharge and fill spouts, can have standard coating on the exterior. Only where a standard and bonding coating overlap will a seal be formed when applying heat. This is important in bag formation because if a heating bar is misapplied, the bag will not be destroyed/flawed by unwanted joints or connections. If a bonding coating is on the exterior surface of the body, discharge tube and fill spout, and also on the interior surface of the bottom and top, a fusion heat seal will be formed between two pieces of fabric wherever the heat is applied, and if the bar is not aligned right, or the pieces are not aligned right in the fusion area, unwanted joints and seals can be formed that interfere with the bag integrity or usefulness.

With the bag configuration as shown in FIGS. 20-32, body 53, fill spout 57 and discharge tube 58 can comprise standard industry coatings on both interior and exterior portions of the fabric if so desired, when top 51 and bottom 52 have a coating on an interior surface comprising propylene-ethylene copolymers, e.g. VERSIFY™ 3000. The coating on the exterior surface of top 51 and bottom 52 can be a standard industry polypropylene fabric coating. With this coating arrangement, the bonding coating, e.g., an interior propylene-ethylene copolymer coating will be on portion 81 of top 51 that is positioned in contact with a standard fabric coating on the upper portion of exterior of body 53 in the designated fusion or sealing area so that when heat is applied in the fusion or sealing area 66 a joint 127 is formed between the standard fabric coating on an exterior side of body 53 and the propylene-ethylene copolymer coating on the interior of top 81.

In other embodiments, the coatings can be switched, e.g., a fusion coating 191 can be on the exterior surfaces of the fill spout, body, and discharge tube fabrics and a standard coating 192 on the interior surface of the top and bottom fabrics. However, this is less cost effective as more bonding coating on the fabric will be utilized. In a preferred embodiment only top and bottom fabric layers have a more expensive bonding coating whereas other portions can have less expensive standard fabric coatings on each fabric layer. As discussed with earlier embodiments, a fusion coating 191 can also be provided as the only heat sealing coating provided on the fabric layers.

It is also possible to use fabrics with a fusion coating on both interior of top of and bottom portions and exterior sides of body, fill spout and discharge tube portions. However, preferably a standard coating is fused with a bonding coating in all fusion areas to not only form a stronger bond but also to be more cost effective. When a standard coating is fused with a bonding coating it helps prevent total loss of a bulk bag, given misalignment for example of a heating element because only the portion containing a bonding coating where heat is applied will be heat sealed to form a joint. Any portions with heat applied on the standard coating to standard coating will not form a bag joint or permanent bond or create fused areas in non-designated fusion or sealing areas.

In various embodiments, a lift loop assembly 56 can be heat sealed to a bag 50 (see FIGS. 20-21, 23, 24, 39-40A). A lift loop assembly can include a lift loop 60 coupled to a fabric piece or patch or panel 59. Patch 59 can be substantially square or rectangular or other desired shape. Lift loops 60 can be sewn to fabric or patch 59. In some embodiment, wherein there is a lift loop 59 sewn to patch or panel 59, this can be the only sewing on the entire bag 50, and with no stitch holes penetrating a containment area of bag 50. Alternatively loops 60 can be heat fused or sealed to a piece of fabric or patch 59 or to the bag 50 itself. Patch 59 can be sealed to the bag 50 with a heat sealing bar. A lift loop 60 coupled to a patch 59 forms a lift loop assembly 56. Preferably loops 60 are configured so as to not be perfectly parallel when coupled to patch 59. Preferably patch 59 is folded at or near a center fold position 85 between ends of a lift loop 60 and positioned on a corner of bag 50 in folded gusseted form, preferably like an envelope, at fold line 85 (see, e.g., FIGS. 21, 23-24). Referring to FIG. 22C showing a bag body portion in gusseted formation, a folded patch 59 can be positioned on bag body 53 while in folded/gusseted form wherein fold 85 of patch 59 can be placed at an edge 414, 415, 416, 417 with one portion of the folded patch 59 extending along a gusseted fold of the bag 53, and with the other portion of the folded patch 59 extending either along a top or bottom surface of bag 53. After heat sealing the patch 59 to a bag 53, the patches can be located on a completed bulk bag as shown in FIG. 20 and in exploded views in FIGS. 21, 23. Preferably a bottom surface of patch 59 includes a fusion coating 191 and can be heat sealed to body 53 exterior surface 135 when body 53 exterior surface 135 has a standard coating 192 or a fusion coating 191 thereon. Alternatively, patch 59 can include a standard coating on a bottom surface when body 53 exterior surface includes a fusion coating 191.

Reference is made to U.S. patent application Ser. No. 15/383,841, filed on 19 Dec. 2016, titled INDUSTRIAL BAG LIFT LOOP ASSEMBLY, by the same inventors and incorporated herein by reference thereto, for additional information on a lift loop assembly that can be used with a bag 50.

Turning to FIGS. 28-32, 48-48A there is illustrated a reinforcing taping configuration which preferably can be provided over a portion of joint 129 connecting a discharge spout 58 to bottom 52 at or near corners 186, 187. The tape configuration can help prevent blow out of the bottom portion 107 of a bag 50 when carrying very heavy bulk material loads.

The taping configuration, for example, can be beneficial in embodiments of a heat fused bag wherein a bottom portion opening 78 is constructed with four slits. In this configuration, a zero point area can occur at the 90 degree angle point in the slit area, wherein two portions of fabric are at 90 degrees respective to each other, going from the horizontal to the vertical, at the bottom portion slit areas, which are weak areas in a heat sealed bag. Taping configurations as described herein can overcome the weak area at the zero point.

Figure 29:
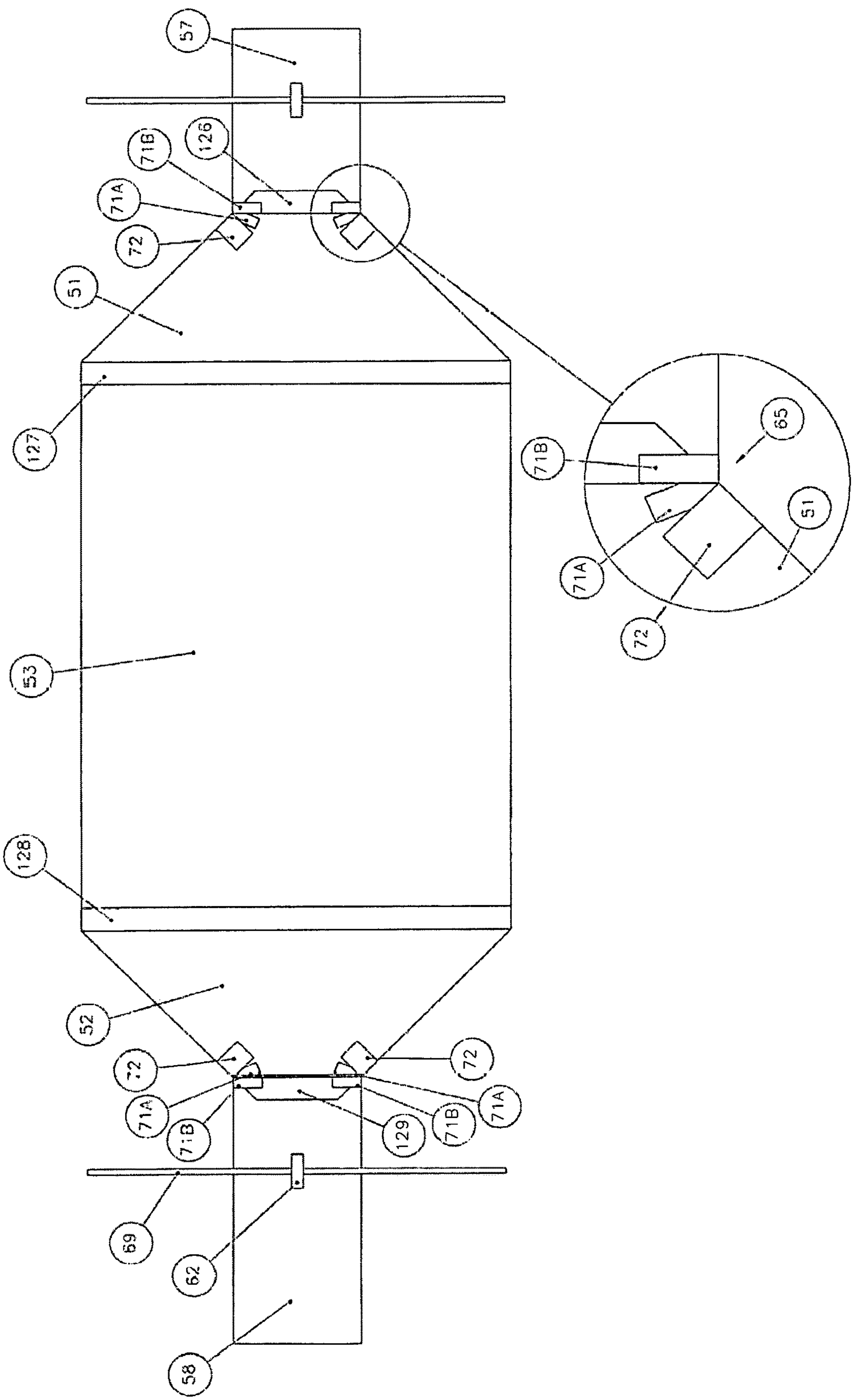
FIG. 29 shows top and detail views of reinforcing tape locations on a heat sealed bag in an alternative preferred embodiment of the present invention.
Figure 30:
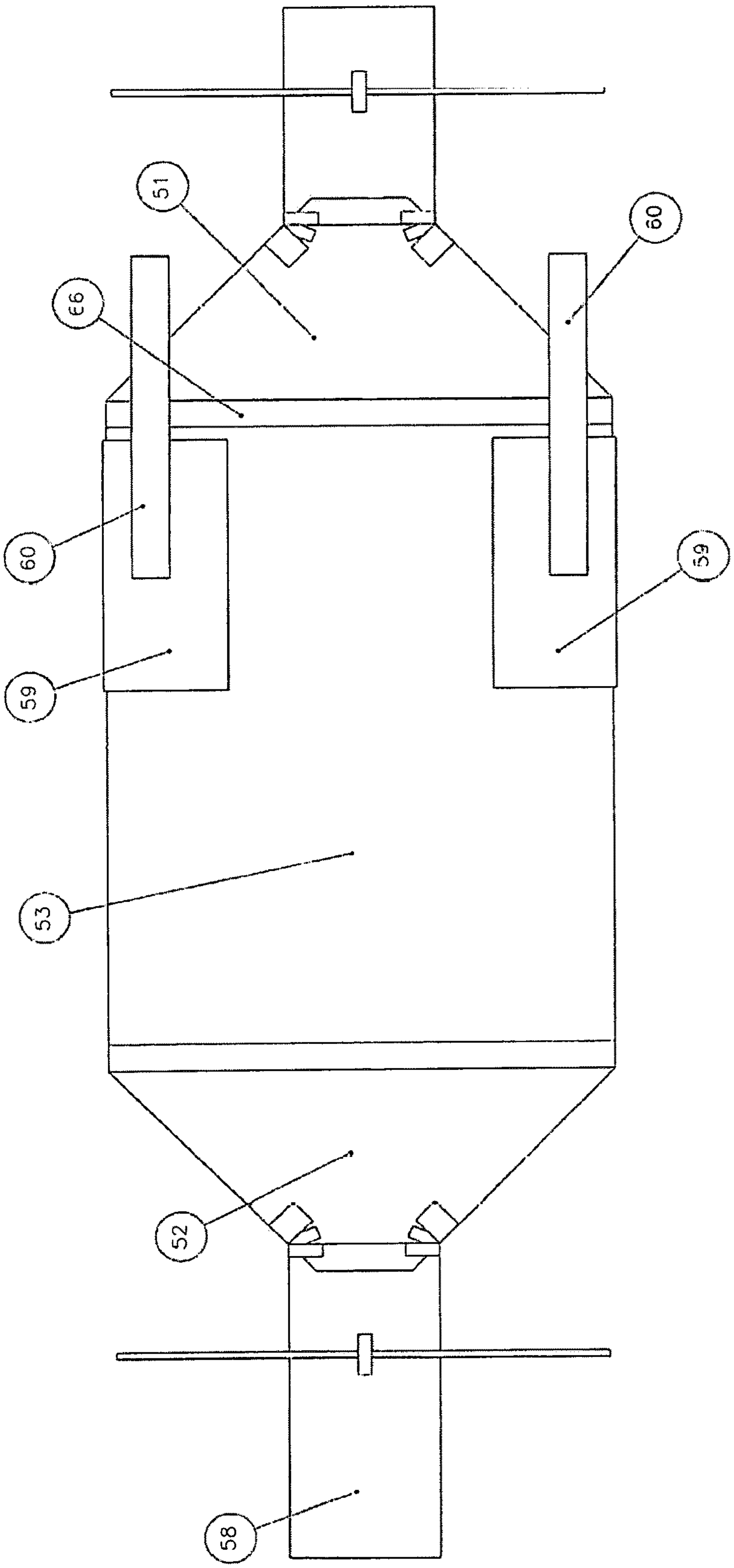
FIG. 30 is a top view illustrating lift loop assembly locations on a heat sealed bag in an alternative preferred embodiment of the present invention.
Figure 31:
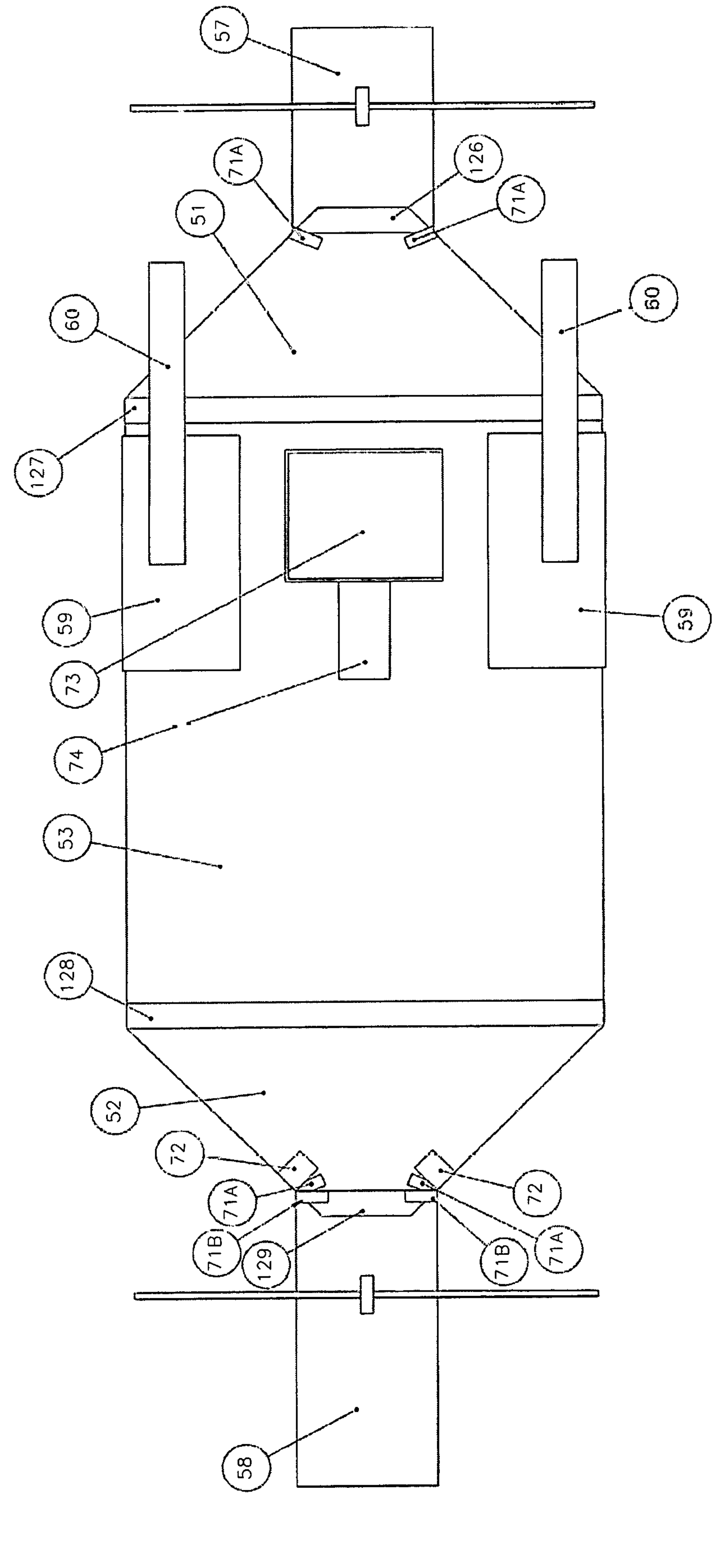
FIG. 31 is a top view illustrating a document pouch location on a heat sealed bag in an alternative preferred embodiment of the present invention.

In other embodiments, the taping configuration may not be needed, e.g., when a discharge tube in gusseted form is positioned through the bottom opening 78 and sealed to the bottom flaps wherein the slit between bottom flaps is not located at or near a corner of the gusseted discharge tube in folded and flattened configuration. For example, the discharge tube and bottom flaps can be fused together wherein the bottom slits are located at or about centrally between the corners of the discharge tube in folded and gusseted form. When sealed in this manner, the weak areas do not result in a blowout point for the bag, e.g., when heavier contents are included therein. A taping configuration as shown in the figures, however, can still be used in this embodiment if desired for providing additional reinforcement to the joint connecting the discharge tube and bottom If including a tape configuration as shown in FIG. 29 for example, after forming joints 126, 127, 128, 129, a bulk bag 50 that is still in folded, gusseted, two-dimensional form can be placed on a surface. A first tape 71*a* is preferably applied at an angle at each corner 186, 187, extending from bottom back side 148 to bottom front side 147 and across a portion of joint 129. A second tape 71*b* is applied right at, or near the edge of joint 129 extending laterally across joint 129 from back side 148 to front side 147 of bottom 52, overlapping a portion of tape 71*a* as shown in FIG. 29. Tape 71*a* and 71*b* preferably are the same size, e.g., about 1 inch (2.54 cm) wide. A third layer of tape 72, which preferably is wider than tape 71*a* and 71*b*, e.g., about 2 inches (5.08 cm) wide, is applied at an angle over a portion of tape 71*a* extending from back 148 to front 147 sides of bottom 52. Preferably a corner 188 of tape 71*b* is in contact with a corner 189 of tape 72.

In other embodiments, the tape configuration can be applied after forming a joint 129 between a discharge tube 58 and bottom portion 52, possibly before completing other bag joints.

This tape configuration preferably is applied to both corners at the bottom of the bag when lying flat in folded gusseted form. The same tape configuration as illustrated in FIG. 29 can also be applied to both corners at the top of the bag over joint 126. However, such as tape configuration can also be left off joint 126, or only one layer of tape, e.g., just tape 71*a*, can be applied at each corner of joint 126, because joint 126 is subject to very little force or pressure from the weight of the bulk material within the bag 50, as compared to joint 129 which supports at least the majority of the load of bulk material in the bag.

Figure 32:
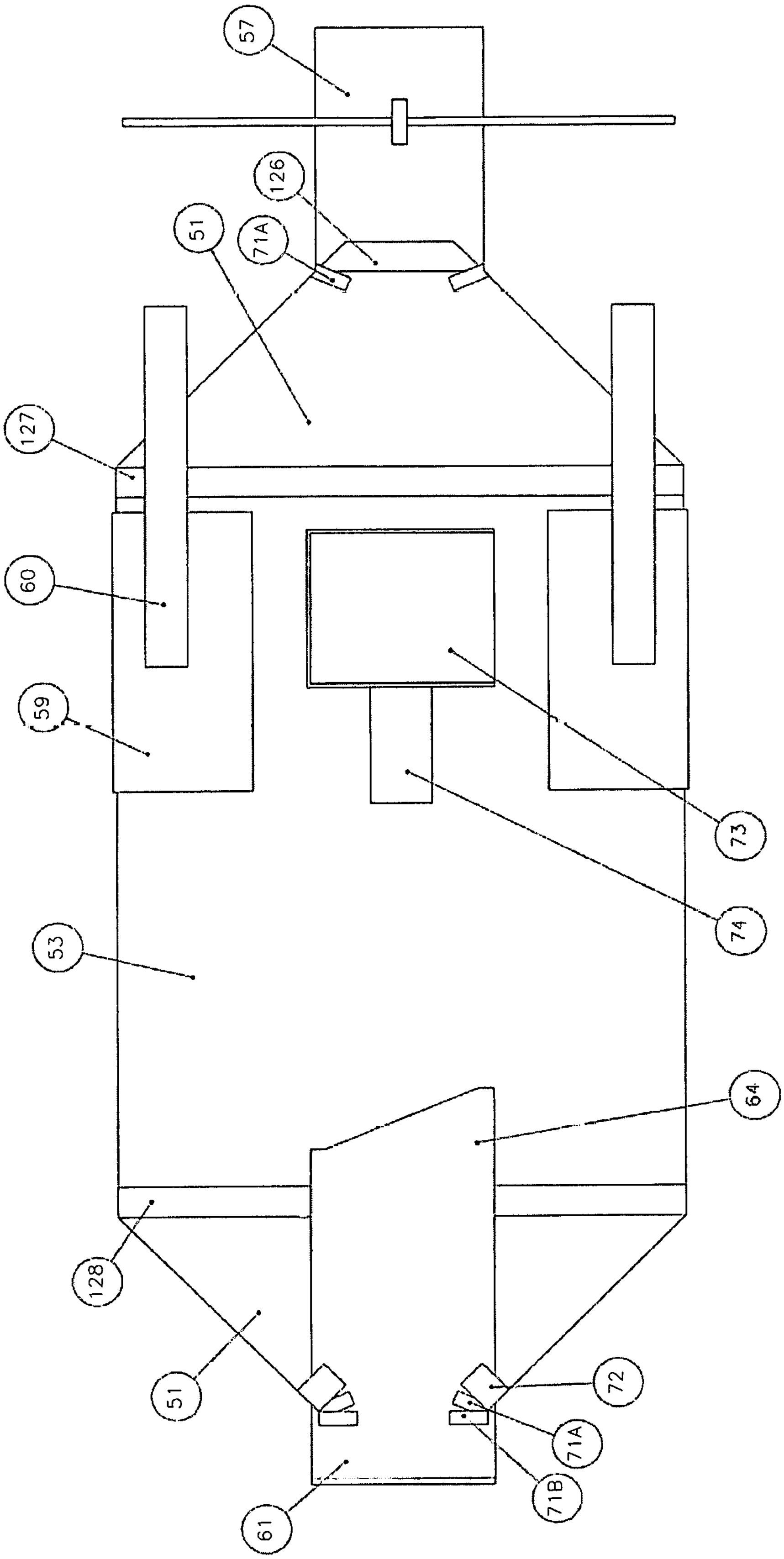
FIG. 32 is a top view illustrating a bottom flap or cover location on a heat sealed bag in accordance with a preferred embodiment of the present invention.

As previously mentioned, in some embodiments a bonding or standard coating is applied to the tubular fabric portions when the tubes are flattened, with the coating extending beyond the folded edge or close to the folded edge or over tape applied on the folded edge. When forming heat sealing or fusion areas, the said folded edge of a discharge tube portion or a body portion for example can be positioned about centrally so that a diaper cover will cover the said folded edge portion when it is applied to the bag, as shown in FIG. 32, for example. In this embodiment, the taping configuration also is not necessary but can still be used if additional reinforcement is desired. In general, a diaper or bottom cover 61 can also be used for added reinforcement of a joint 129 and 128 either alone or with an additional reinforcement measure also included.

FIGS. 49-53 illustrate a zero point taping press, which can be used in applying the tape configuration as show in FIGS. 28-32. Some experimentation has shown that when a stitchless bulk bag 50 held heavy bulk material, e.g., weights of about 7000 pounds (3,175 kilograms) in a bag designed to hold 2,000 pounds (907.2 kilograms) of material, there was a zero point, as described herein, on the bottom of the bag that failed. In various embodiments, each piece of tape, 71*a*, 71*b*, 72 can be aligned, e.g., manually, on a folded gusseted bag 50 after body containment area joints are heat sealed. Body containment area joints can include joints connecting the fill spout to the top, the top to the body, the body to the bottom, and the bottom to the discharge tube.

After positioning each piece of tape, pressure can be applied to couple the tape to the bag. Pressure can be applied via the machinery as shown in FIGS. 49-53. Pressure is applied preferably at about 24 lbs (10.9 kilograms) to form a sealed connection with the bag 50. Each piece of tape 71, 71*b*, and 72 can be applied separately in sequence. The tape configuration of 71*a*, 71*b*, and 72 can prevent a bottom blow out of the bag. Although the tape configuration with tape 71*a*, 71*b*, and 71*c* can be applied to the top and fill spout joint as well, it generally is not necessary as the same amount of pressure is not applied to the top joint 126, so the top can just be closed off, to prevent leakage, with no additional tape reinforcement, in many desired applications or uses of a heat sealed bag.

A zero point tape press assembly 260 as shown in FIGS. 49-53, can include a table assembly 261 and a bridge with press bar assembly 262.

Figure 49:
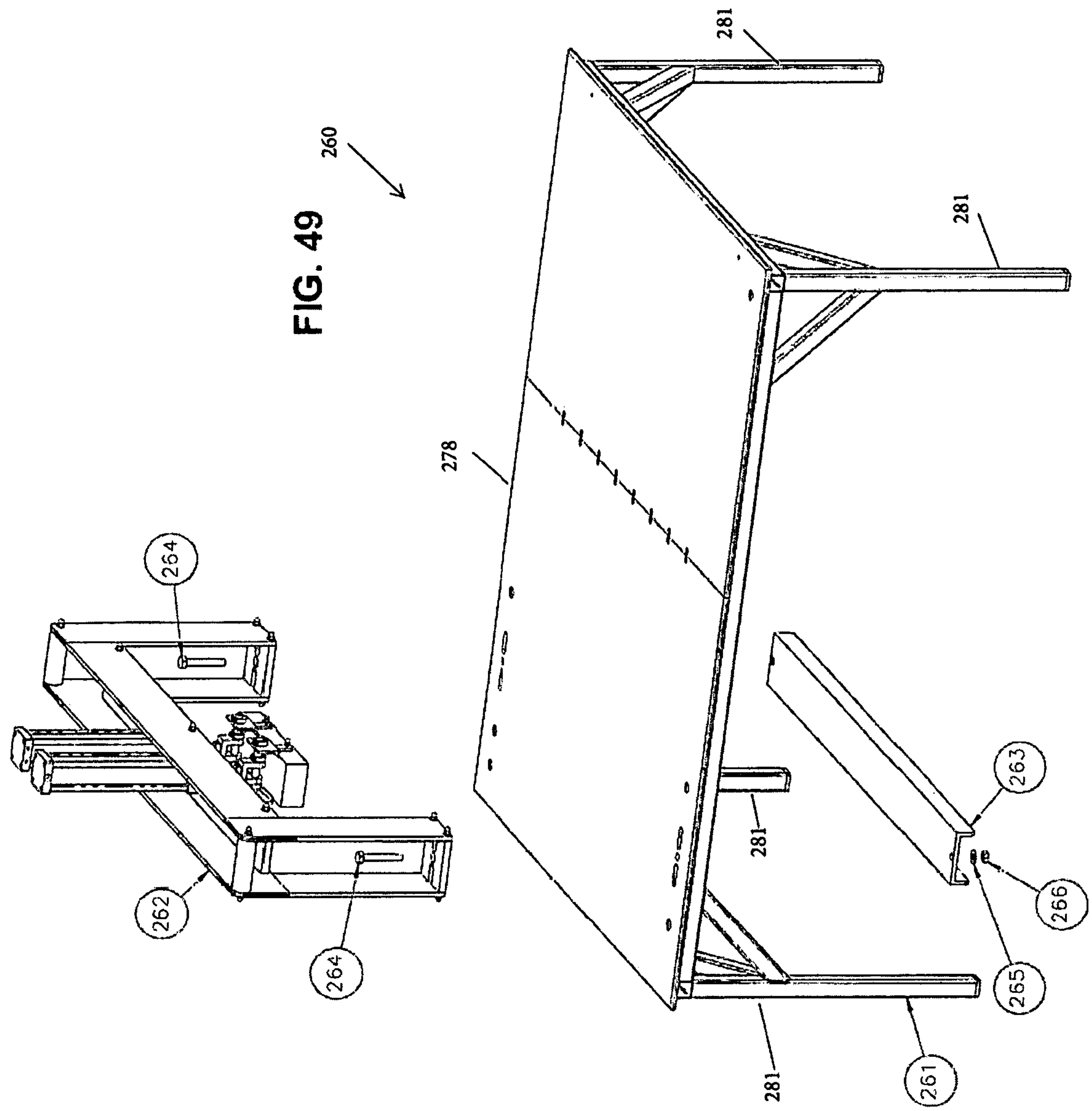
FIG. 49 is an exploded perspective view of a zero point taping press assembly in accordance with a preferred embodiment of the present invention.
Figure 50:
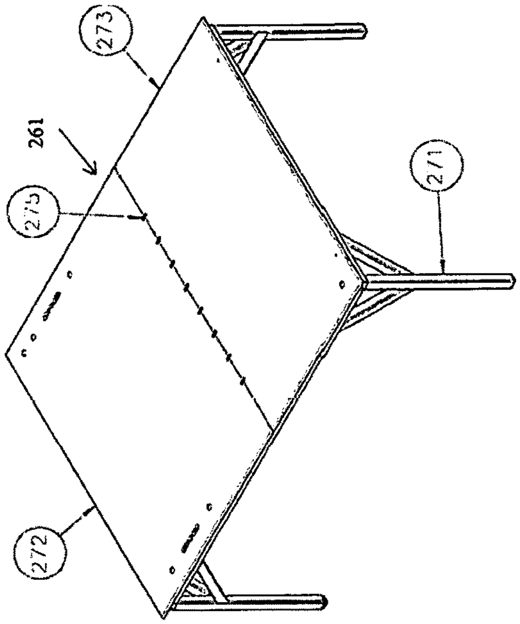
FIG. 50 is a perspective view of a table assembly of a zero point taping press in accordance with a preferred embodiment of the present invention.

Table 261 can include a frame 271 with four legs 281. A lower bracket support 263 can be used to couple press bar assembly 262 to table 261, e.g., with a bolt 264, washer 265, nut 266 as shown in FIGS. 49-50. Table assembly 261 can just be used for the tape pressing, or can also include one or more other machine assemblies as described herein. In some embodiments, for example, a table 261 can be used for both tape pressing and loop assembly sealing for a bag 50.

Figure 50B:
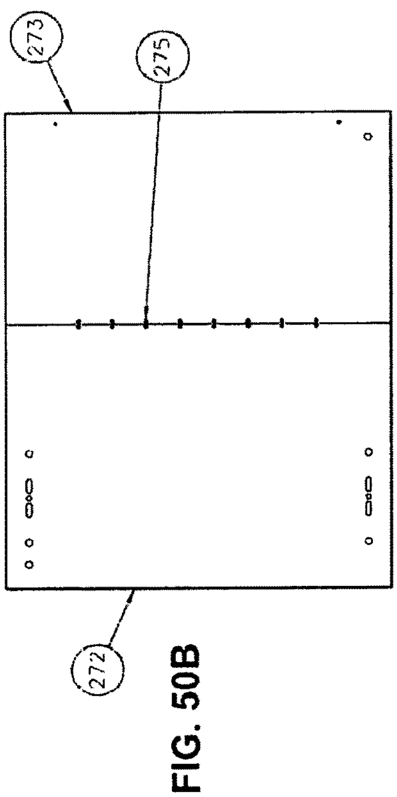
FIG. 50B is a top view of a table assembly of a zero point taping press in accordance with a preferred embodiment of the present invention.
Figure 50C:
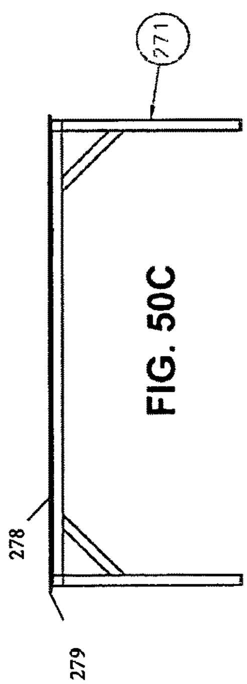
FIG. 50C is a front view of a table assembly of a zero point taping press in accordance with a preferred embodiment of the present invention.
Figure 50A:
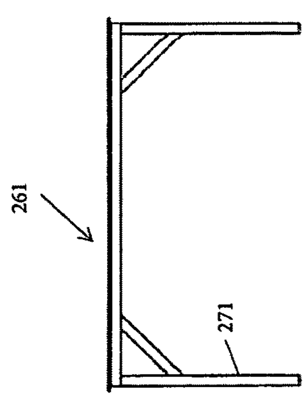
FIG. 50A is a side view of a table assembly of a zero point taping press in accordance with a preferred embodiment of the present invention.
Figure 50D:
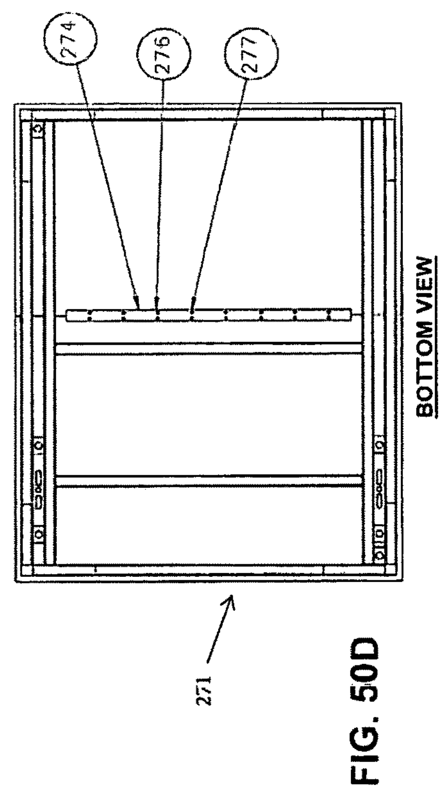
FIG. 50D is a bottom view of a table assembly of a zero point taping press in accordance with a preferred embodiment of the present invention.

In one or more embodiments, a table used with one or more of the machine assemblies as shown and/or described herein can be assembled by selecting a first table portion to be coupled to another table portion. In one or more embodiments, a table used with one or more of the machine assemblies as shown and/or described herein can be assembled by selecting a first table end portion, one or more middle portions, and another table end portion. Selected end portions can be coupled together at splice plate locations, e.g., at splice plate 274 as shown in FIGS. 49, 50B, and 50D. At splice plate 274 two frame table top 279 portions can be coupled together with a screw 275, washer 276 and hex nut 277, for example, as shown in FIGS. 50-50D.

A table 261 height can preferably be about 34.50 inches (87.6 cm). A table 261 can also have other desired heights. A table top 278 can have a portion 279 that extends a distance past frame 271, e.g., about 1 inch (2.54 cm) past frame 271 on each side of frame 271. In other embodiments, a portion 279 does not need to be included, or portion 279 can have another desired dimensions.

Figure 51:
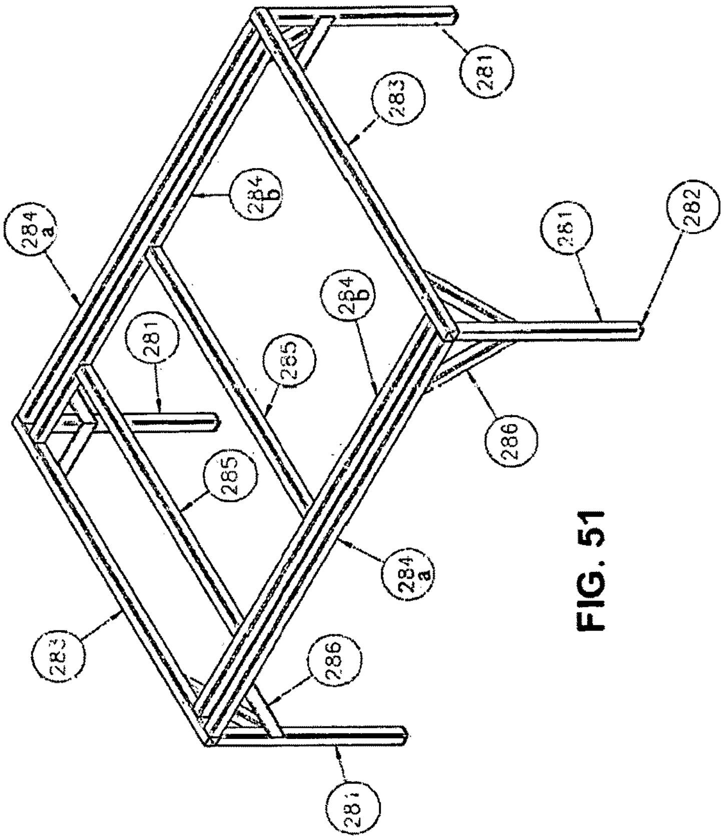
FIG. 51 is a perspective view of a table frame sub-assembly of a zero point taping press in accordance with a preferred embodiment of the present invention.
Figure 51A:
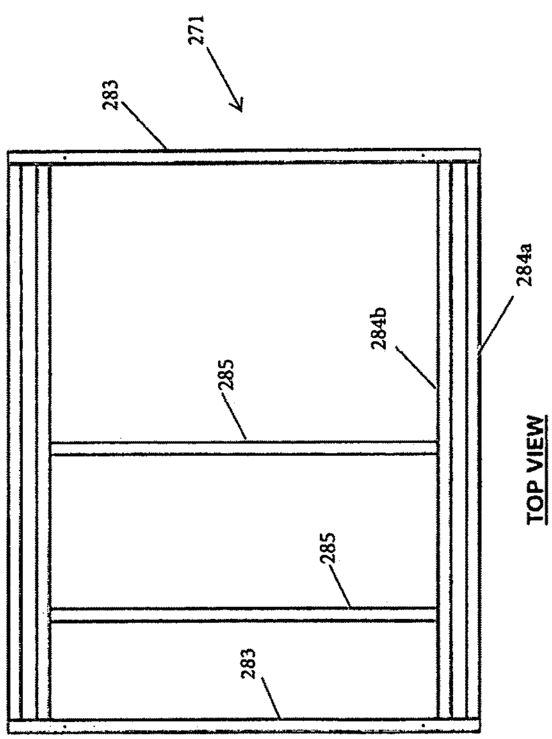
FIG. 51A is a top view of a table frame sub-assembly of a zero point taping press in accordance with a preferred embodiment of the present invention.
Figure 51B:
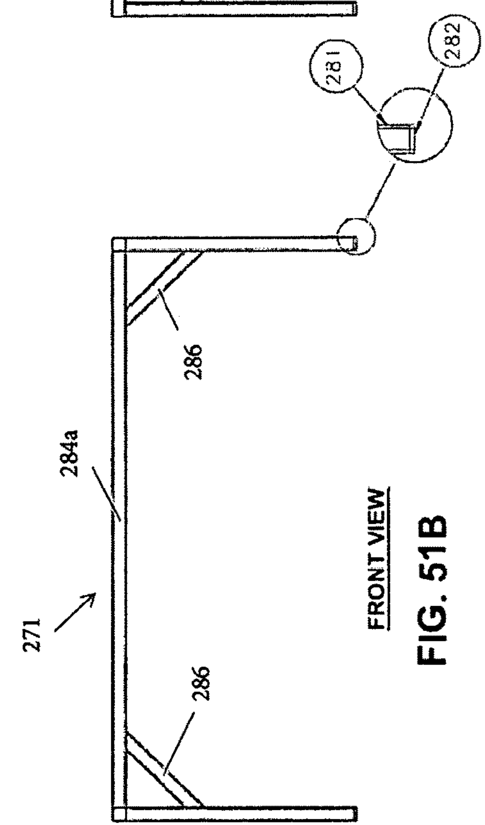
FIG. 51B is a front view of a table frame sub-assembly of a zero point taping press in accordance with a preferred embodiment of the present invention.
Figure 51C:
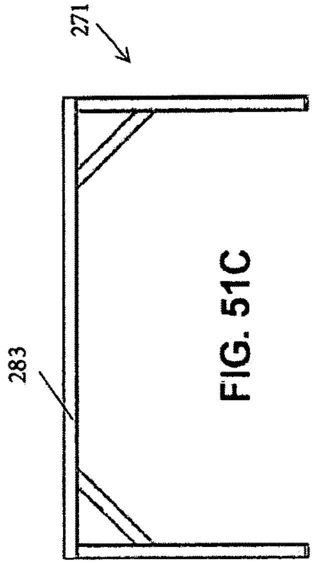
FIG. 51C is an end view of a table frame sub-assembly of a zero point taping press in accordance with a preferred embodiment of the present invention.

A frame 271 can include legs 281. Each leg 281 can have a base pad 282 (see FIGS. 51-51C). Frame 271 can also have end cross members 283 coupled to front and back cross members 284*a* along an outer perimeter of the frame 271. Additional front and back cross members 284*b* can be included on an interior side of front and back cross members 284*a*, which can also be coupled to end cross members 283 and spaced a distance away from cross members 284*a*, e.g., about 4 to 6 inches (10.2 to 15.2 cm) away. Interior mid-brace members 285 can extend between and be coupled to cross members 284*b* on a zero point tape press side 272 of frame 271. Corner braces 286 can also be included on Frame 271, extending from a leg 281 to an end cross member 283 or to a front or back cross member 284*a*.

In a preferred embodiment, an end of frame 271 can be about 66 inches (167.6 cm) long. Front and back sides of a frame 271 can be about 84 inches (213.4 cm) long. The distance between a cross member 283 on a loop impulse sealer side to a first mid-brace member 285 can be about 42 inches (106.7 cm). The distance from a cross member 283 on loop impulse sealer side to a second mid brace member 285 can be about 66 inches (167.6 cm). The distance between the location where a corner brace 286 is coupled to a leg 281 and to the top of the frame 271 can be about 13 inches (33 cm). Other desired dimensions can also be used for a frame 271 and its parts.

Figure 52:
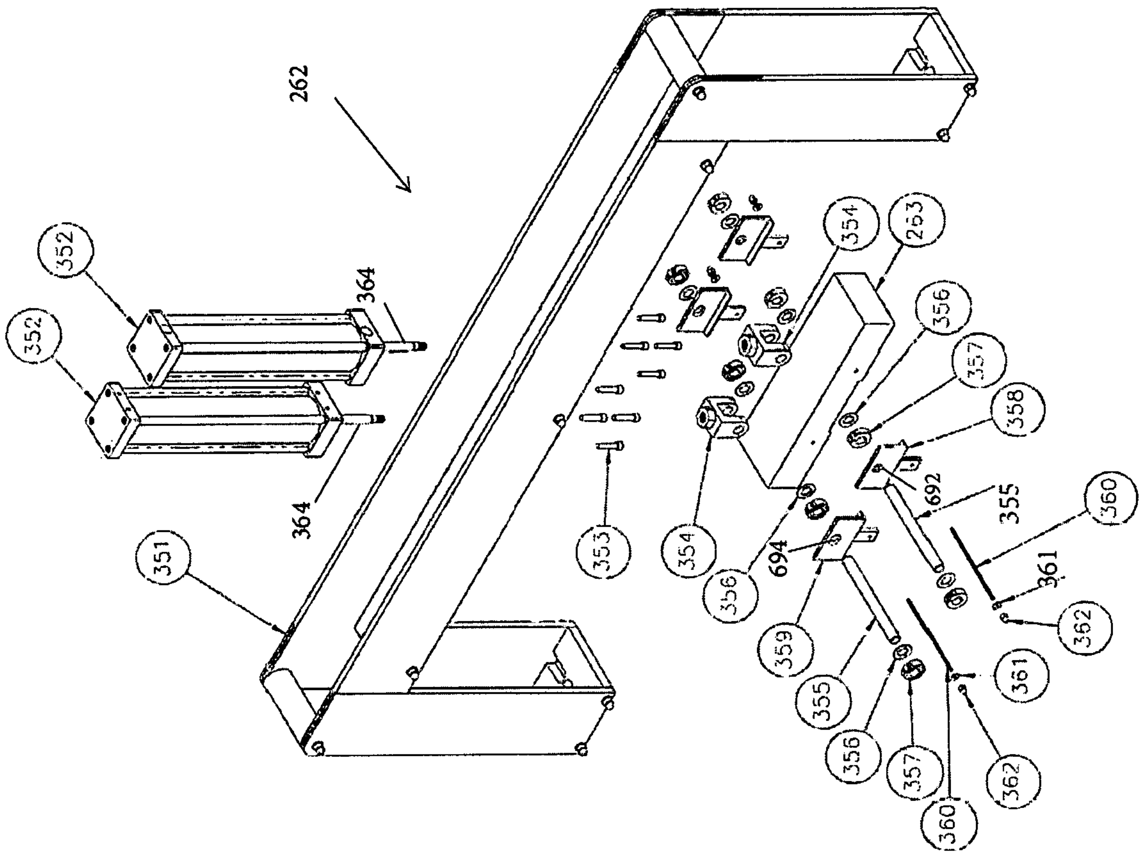
FIG. 52 is an exploded perspective view of a bridge with press bar sub-assembly of a zero point taping press in accordance with a preferred embodiment of the present invention.
Figure 53:
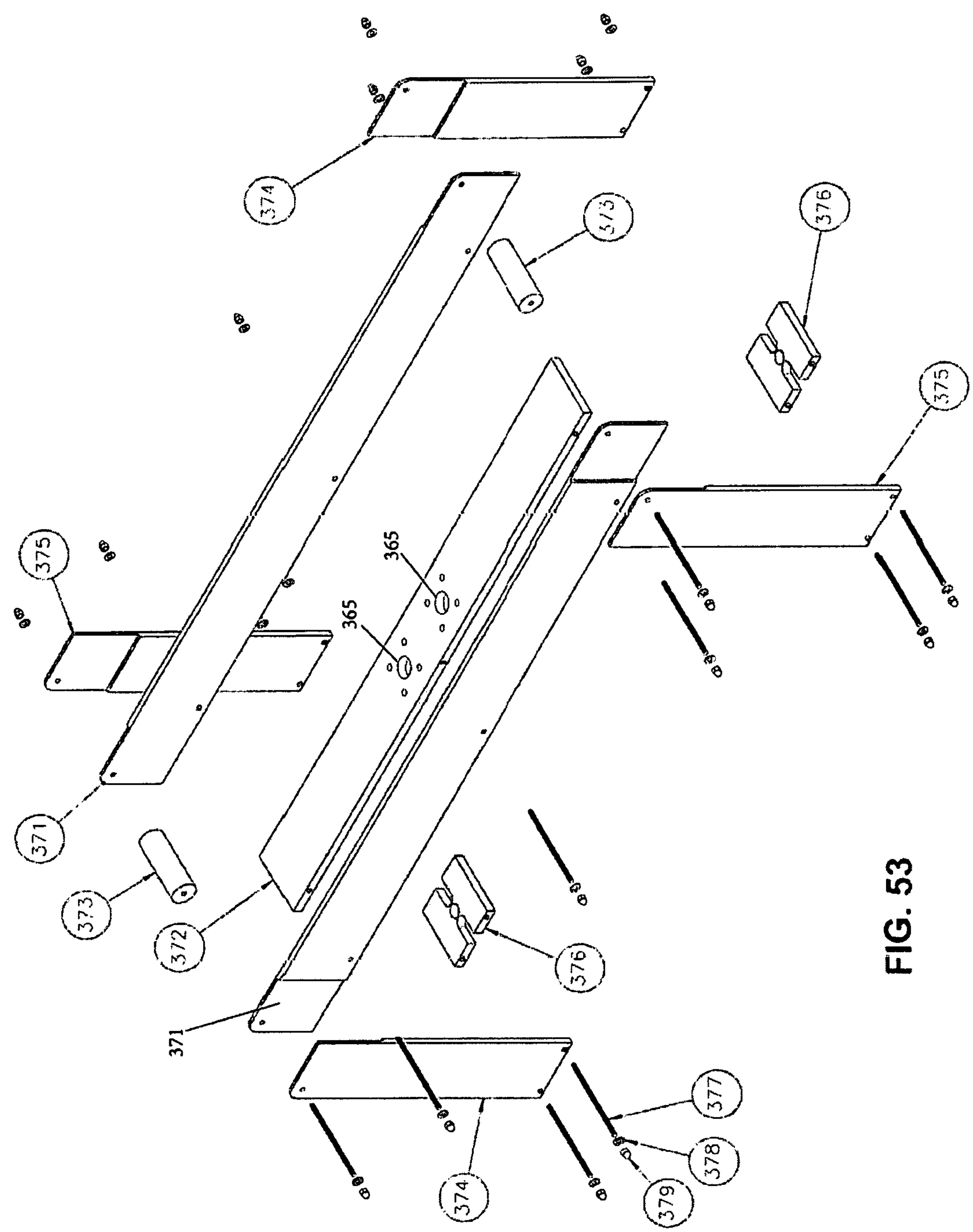
FIG. 53 is an exploded perspective view of a bridge sub-assembly of a zero point taping press in accordance with a preferred embodiment of the present invention.

FIGS. 52 and 53 illustrate a zero taping press bridge with press bar assembly 262. Press bar assembly 262 can include a bridge sub-assembly 351, and pneumatic cylinders 352 for raising and lowering press block 363. Sub-assembly 351 can include top cross supports 271, left and right vertical or longitudinal supports 374, 375, frame spacers extending between top cross supports 271, bottom brackets 376, and a cylinder mount bracket 372.

One spacer 373 can be coupled between cross supports 271 at an upper location on cross supports 271, with cross supports 271 coupled between left longitudinal supports 374 on a left side of cross supports 271 with a thread rod 377, washers 378 and cap nuts 379, for example, as shown in FIG. 53. Similarly, another spacer 373 can be coupled between cross supports 271 with cross supports 271 coupled between right longitudinal supports 374 on a right side of cross supports 271 with a thread rod 377, washers 378 and cap nuts 379, for example, as shown in FIG. 53.

Cylinder mount bracket 372 can be coupled between cross supports 271 on a lower location of cross supports 371 with thread rods 377, washers 378 and cap nuts 379 as shown in FIG. 53.

One bottom bracket 376 can be coupled between left longitudinal supports 374 at a bottom location of left longitudinal supports via two thread rods 377 and washers and cap nuts as shown in FIG. 53. Similarly, another bottom bracket 376 can be coupled between right longitudinal supports 375 at a bottom location of right longitudinal supports 375 via two thread rods 377, washers 378 and cap nuts 379 as shown in FIG. 53.

Pneumatic cylinders 352 can be coupled to cylinder mount bracket 372 of taping press sub-assembly 351 with cap screws 353, for example, and with ends 364 of pneumatic cylinders extending through openings 365 of cylinder mount bracket 372. Clevises 354 can be used to couple cylinders 353 to the seal bar or press block 363. For example, two devises 354 can receive ends 364 of cylinders at top opening 375 of devises 354. Clevises 354 can also be coupled to sealing bar or block 363, for example with positioning brackets 358, 359, shafts 355, shaft collars 357, flat washers 356, thread rods 360, washers 361, and cap nuts 362, as shown in FIG. 52. Pneumatic cylinders can also be coupled to tape press sub-assembly 351 and block 363 via other means known in the art.

Preferably a pair of positioning brackets 358 each has an opening 693 sized to receive a shaft 355 and to allow for little or no movement of shaft 355. Preferably a pair of positioning brackets 359 has an opening that is larger than the opening of brackets 358, and can be a slotted opening 694, for example. With this configuration, when lowering the press block 363 to make contact with the fabric, brackets 693 hold press block 363 in a substantially fixed position over the bag and tape to be pressed, while slotted brackets 694 enable a left to right rocking motion of the press block. The rocking motion can help ensure even pressure is applied even in areas where the fabric of the bag or tape has different densities. Preferably slotted openings are not included in each positioning bracket 358 to 359 because this could then allow for the press block to not stay in a substantially fixed position over the bag and tape configuration.

After arranging tape 71*a*, 71*b*, and 72 on a bag 50, the bag 50 can be placed on table portion 278 with the tape configuration under seal bar or press block 363. Cylinders 352 can lower block 363 onto the tape configuration to apply pressure and effect connection of the tape 71*a*, 71*b*, 72 to bag 50.

Figure 33:
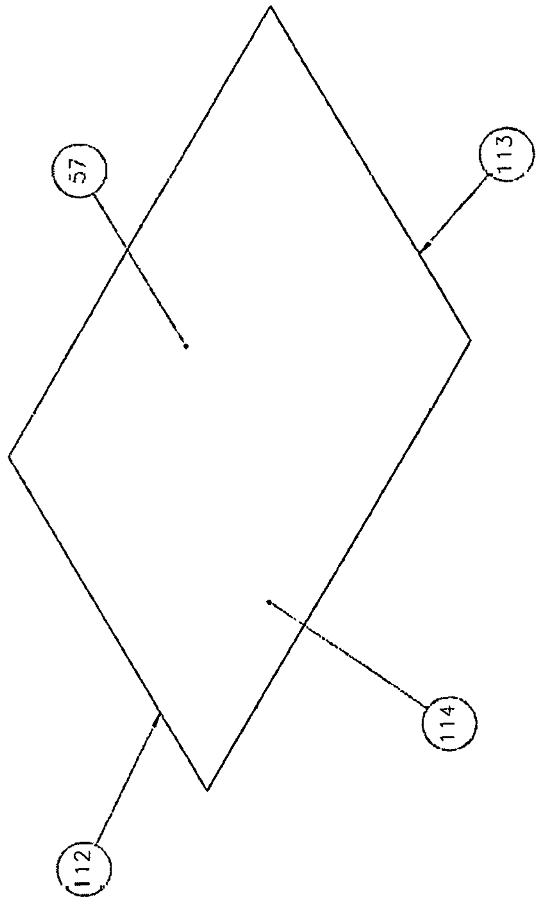
FIG. 33 is a perspective view of a fill tube cut of a heat sealed bag in an alternative preferred embodiment of the present invention.
Figure 33A:
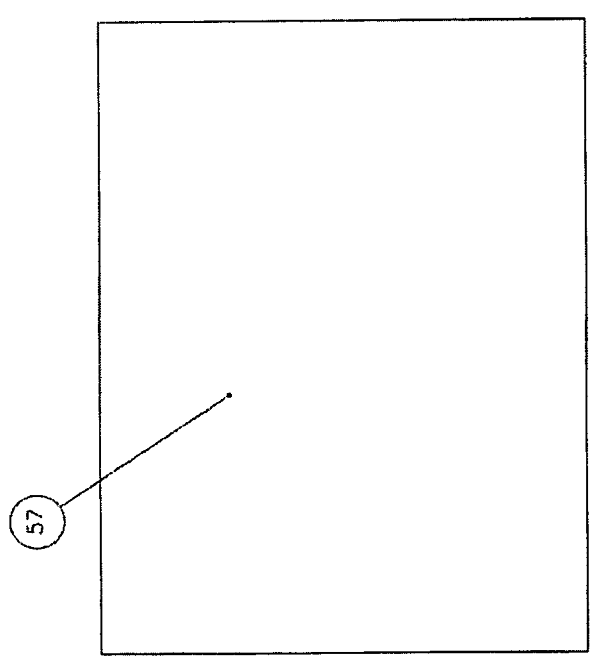
FIG. 33A is a top view of a fill tube cut of a heat sealed bag in an alternative preferred embodiment of the present invention.
Figure 34:
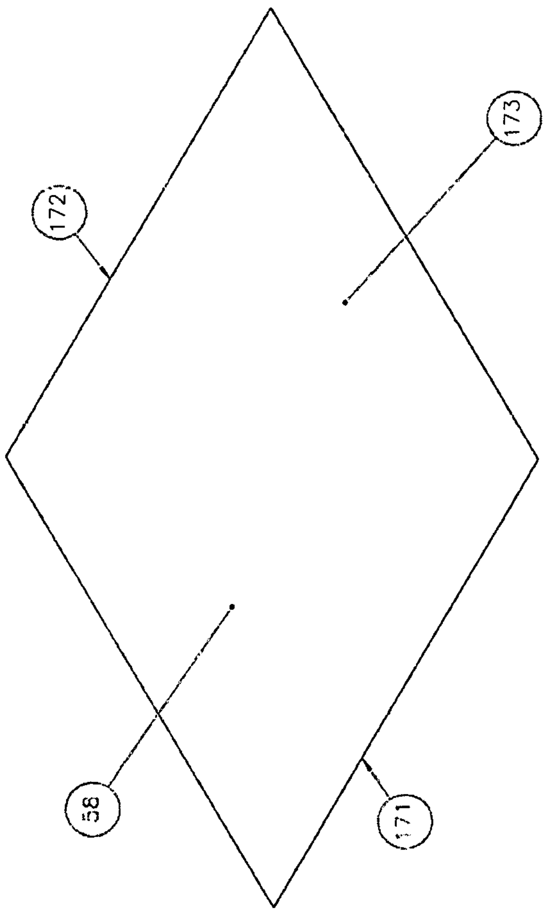
FIG. 34 is a perspective view of a discharge tube cut of a heat sealed bag in an alternative preferred embodiment of the present invention.
Figure 34A:
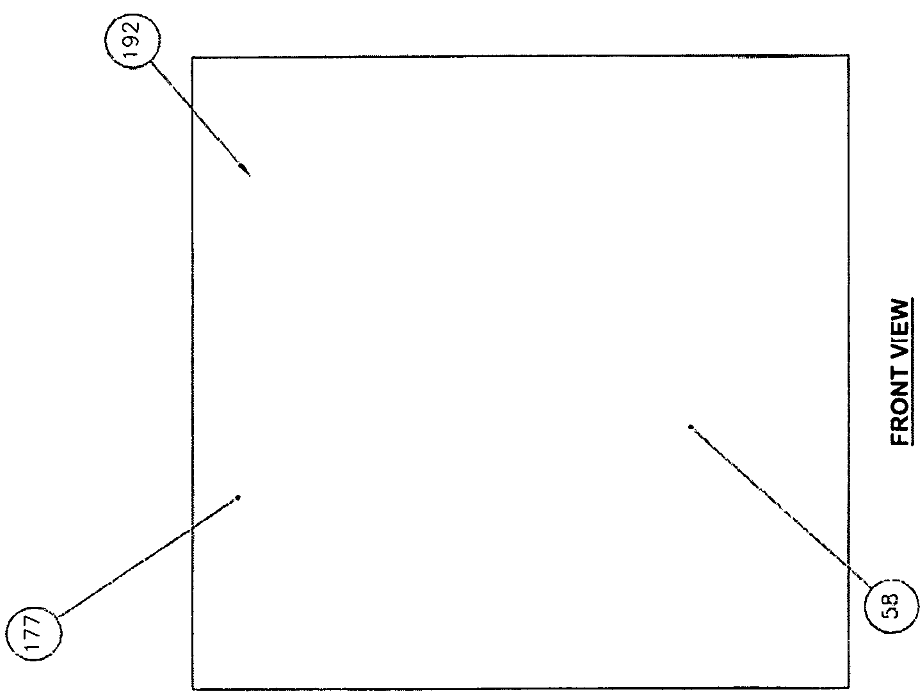
FIG. 34A is a top view of a discharge tube cut of a heat sealed bag in an alternative preferred embodiment of the present invention.
Figure 35:
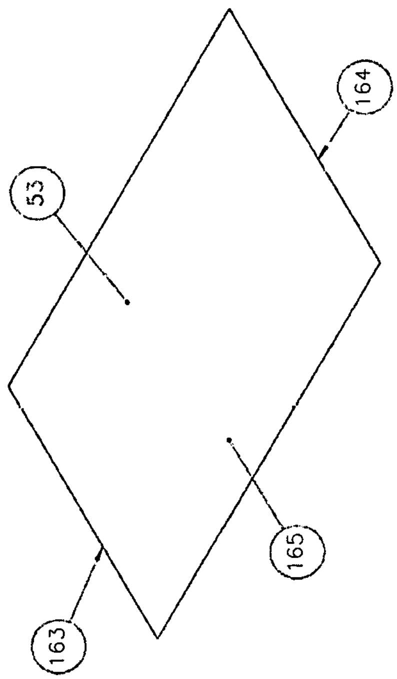
FIG. 35 is a perspective view of a main body tube cut of a heat sealed bag in an alternative preferred embodiment of the present invention.
Figure 35A:
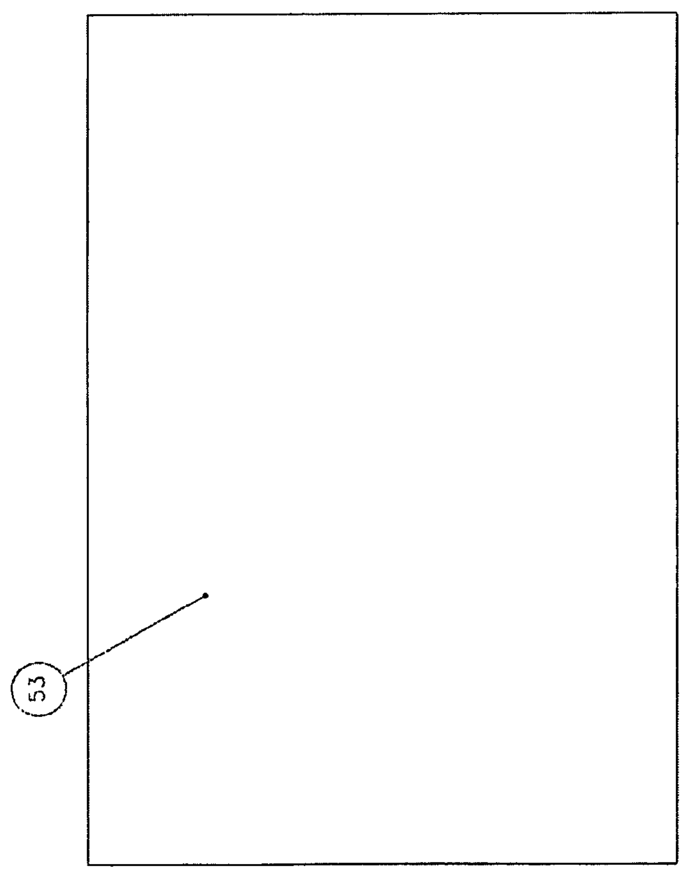
FIG. 35A is a front view of a main body tube cut of a heat sealed bag in an alternative preferred embodiment of the present invention.
Figure 36:
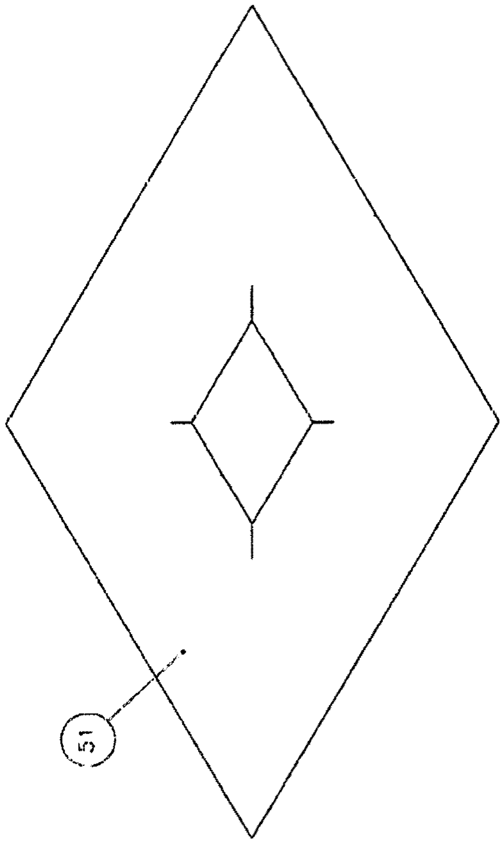
FIG. 36 is a perspective view of a top sheet of a heat sealed bag in an alternative preferred embodiment of the present invention.
Figure 36A:
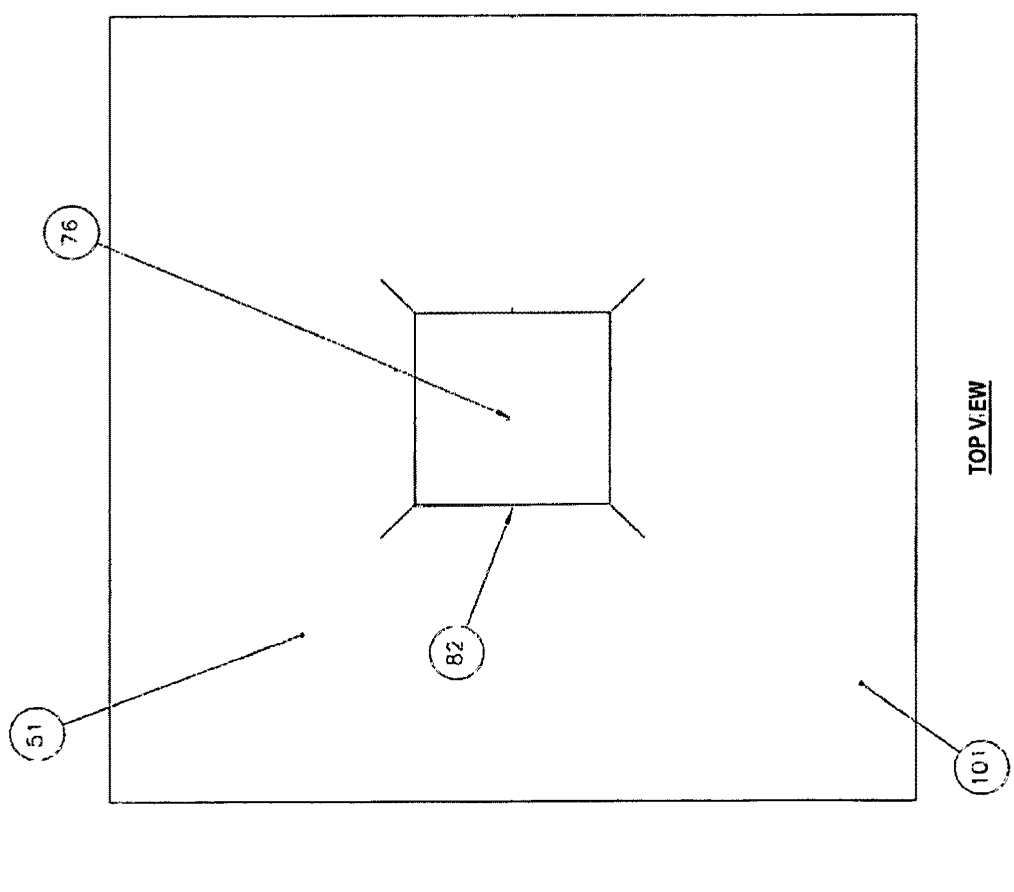
FIG. 36A is a top view of a top sheet of a heat sealed bag in an alternative preferred embodiment of the present invention.
Figure 37:
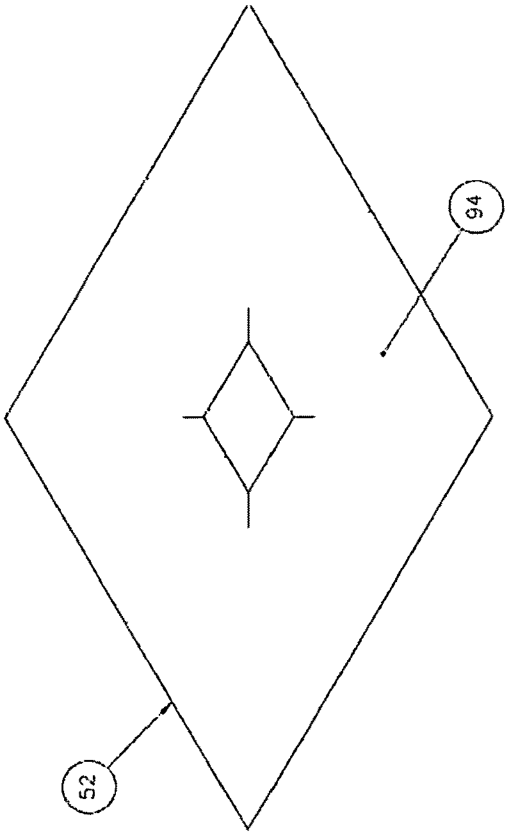
FIG. 37 is a perspective view of a bottom sheet of a heat sealed bag in an alternative preferred embodiment of the present invention.
Figure 37A:
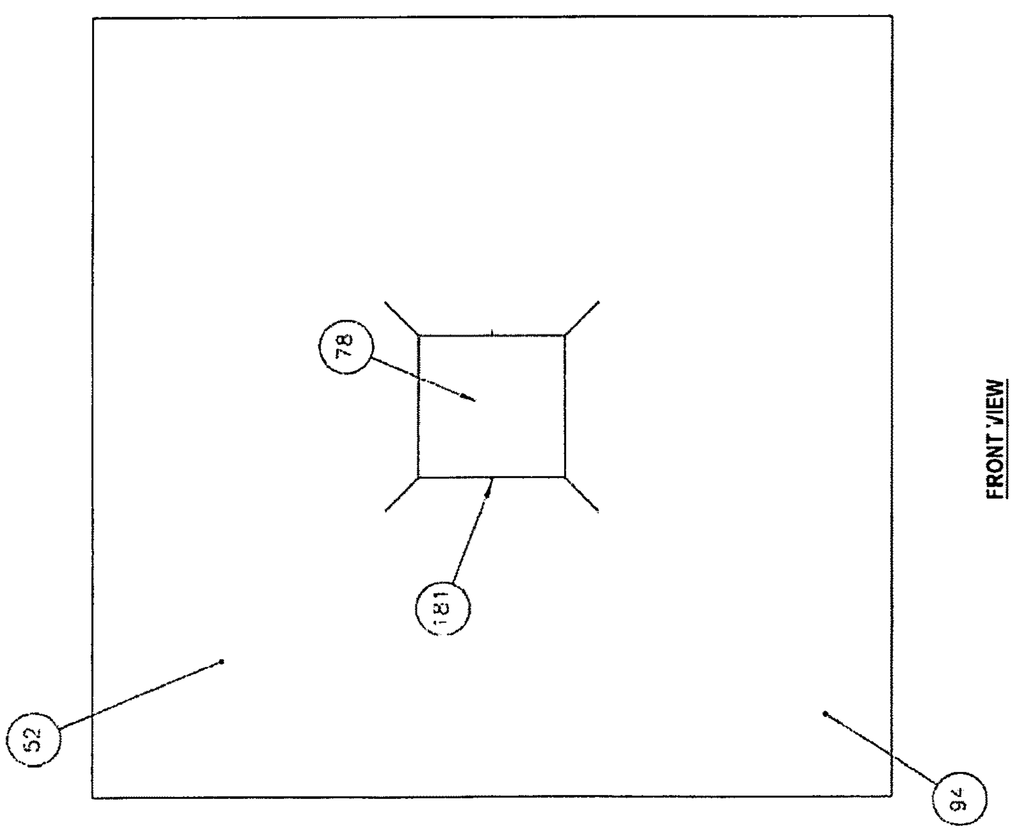
FIG. 37A is a top view of a bottom sheet of a heat sealed bag in an alternative preferred embodiment of the present invention.
Figure 38:
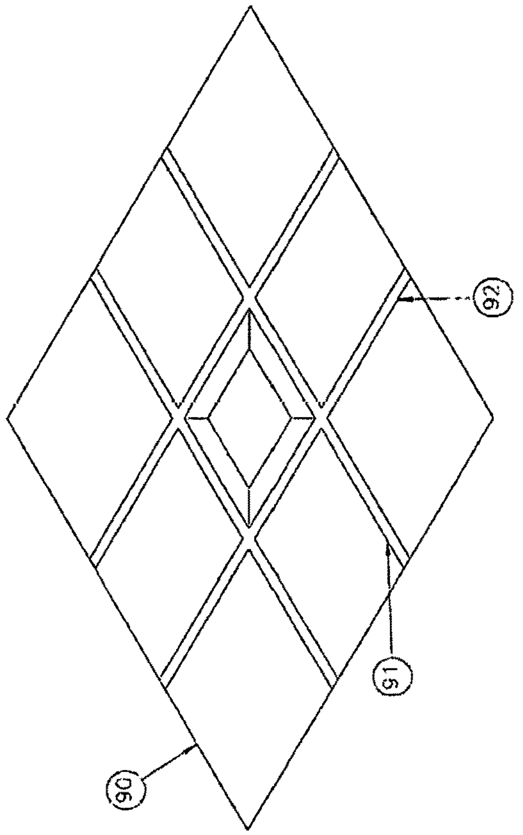
FIG. 38 is a perspective view of a reinforced bottom sheet of a heat sealed bag in an alternative preferred embodiment of the present invention.
Figure 38A:
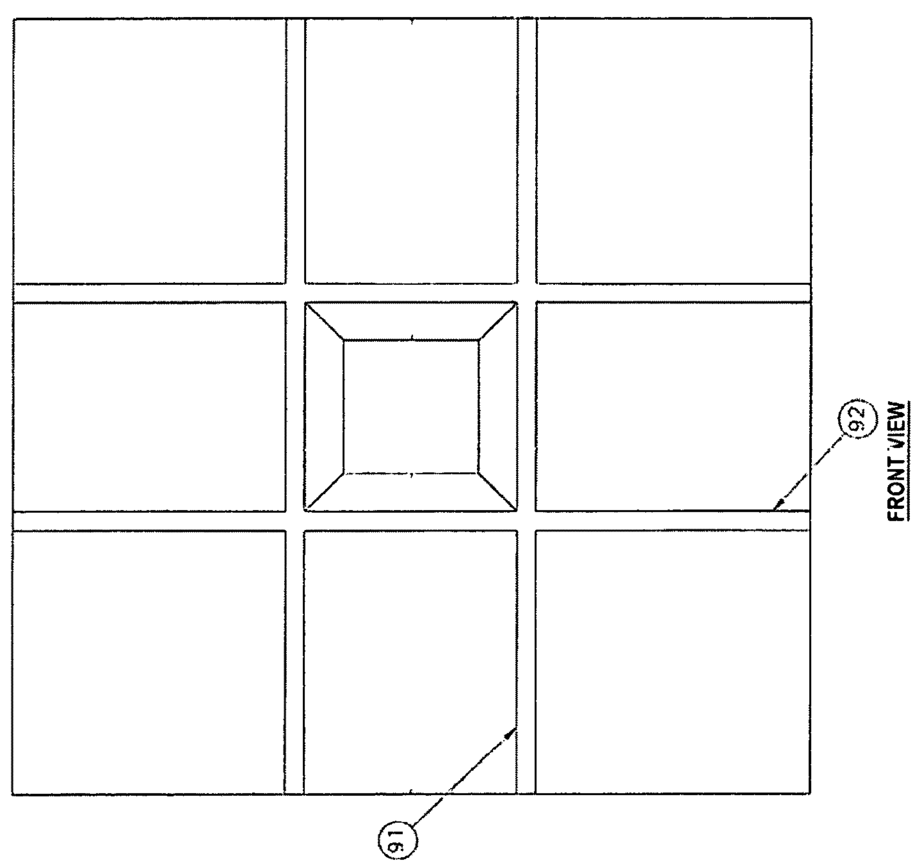
FIG. 38A is a top view of a reinforced bottom sheet of a heat sealed bag in an alternative preferred embodiment of the present invention.
Figure 39:
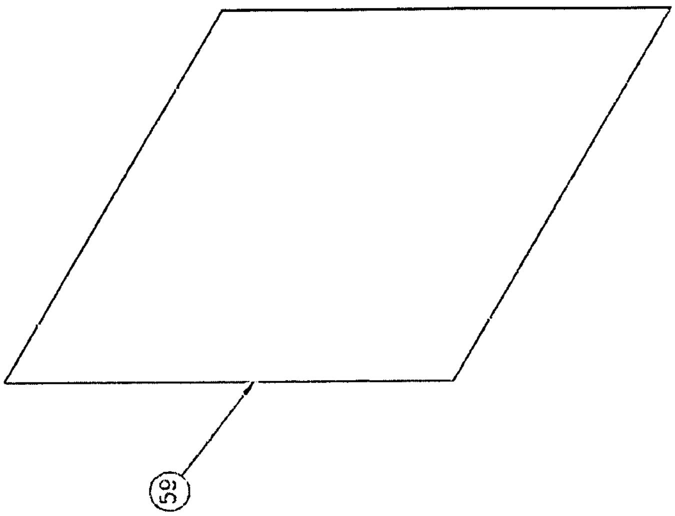
FIG. 39 is a perspective view of a lift loop panel cut for use on a heat sealed bag in an alternative preferred embodiment of the present invention.
Figure 39A:
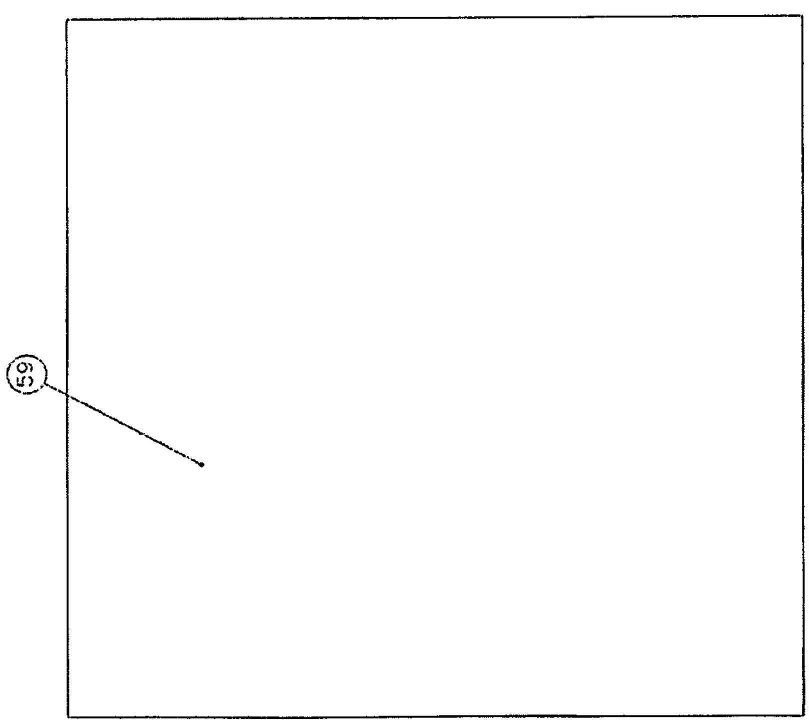
FIG. 39A is a front view of a lift loop panel cut for use on a heat sealed bag in an alternative preferred embodiment of the present invention.
Figure 41:
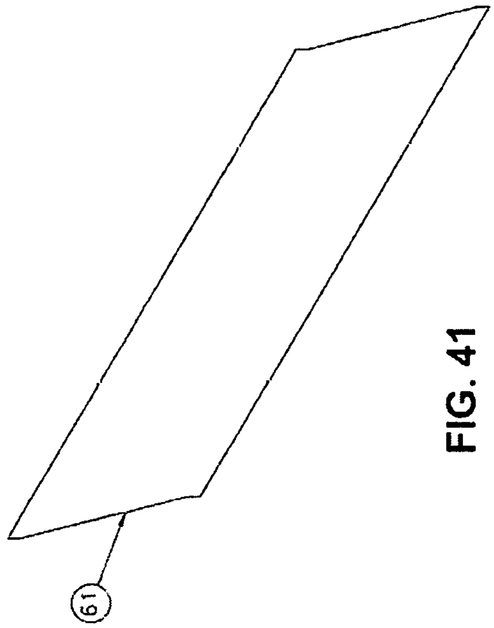
FIG. 41 is a perspective view of a diaper cut for use on a heat sealed bag in accordance with a preferred embodiment of the present invention.
Figure 41A:
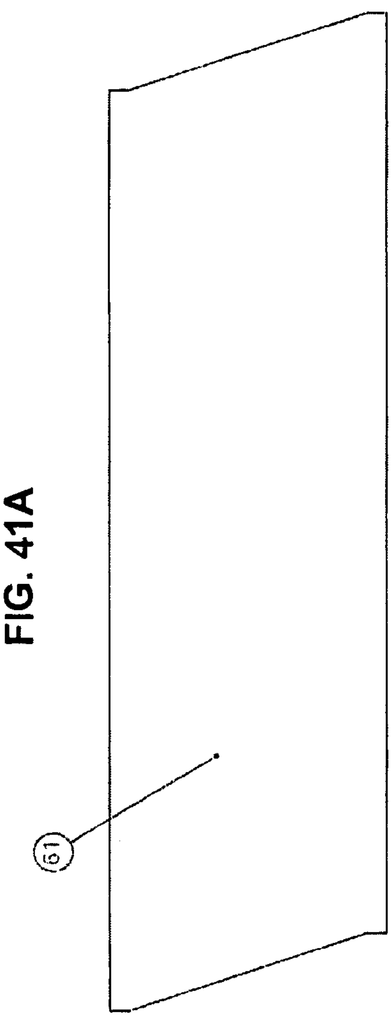
FIG. 41A is a top view of a diaper cut for use on a heat sealed bag in an alternative preferred embodiment of the present invention.
Figure 42:
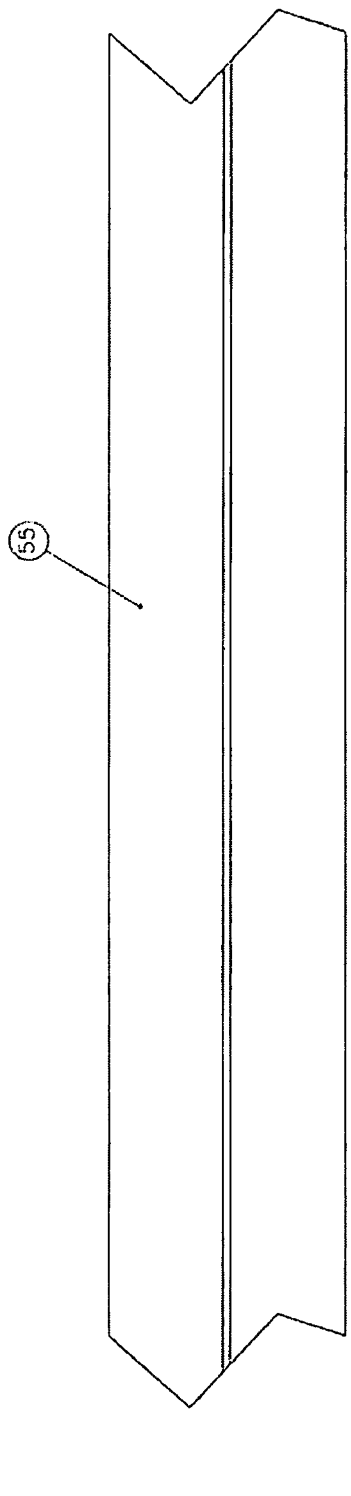
FIG. 42 is a top view of an adhesive tape center line mark in an alternative preferred embodiment of the present invention.
Figure 43:
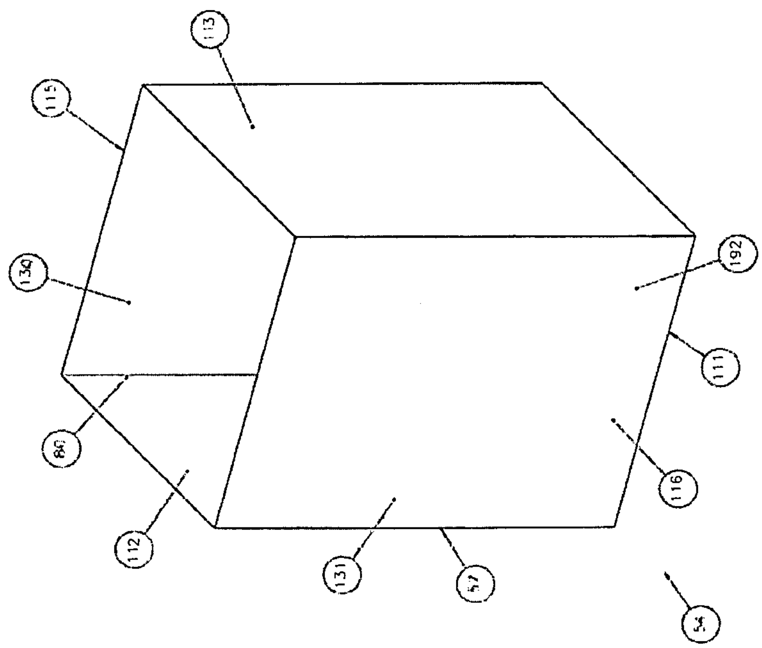
FIG. 43 is a perspective view of a fill tube of a heat sealed bag in an open position in an alternative preferred embodiment of the present invention.
Figure 44:
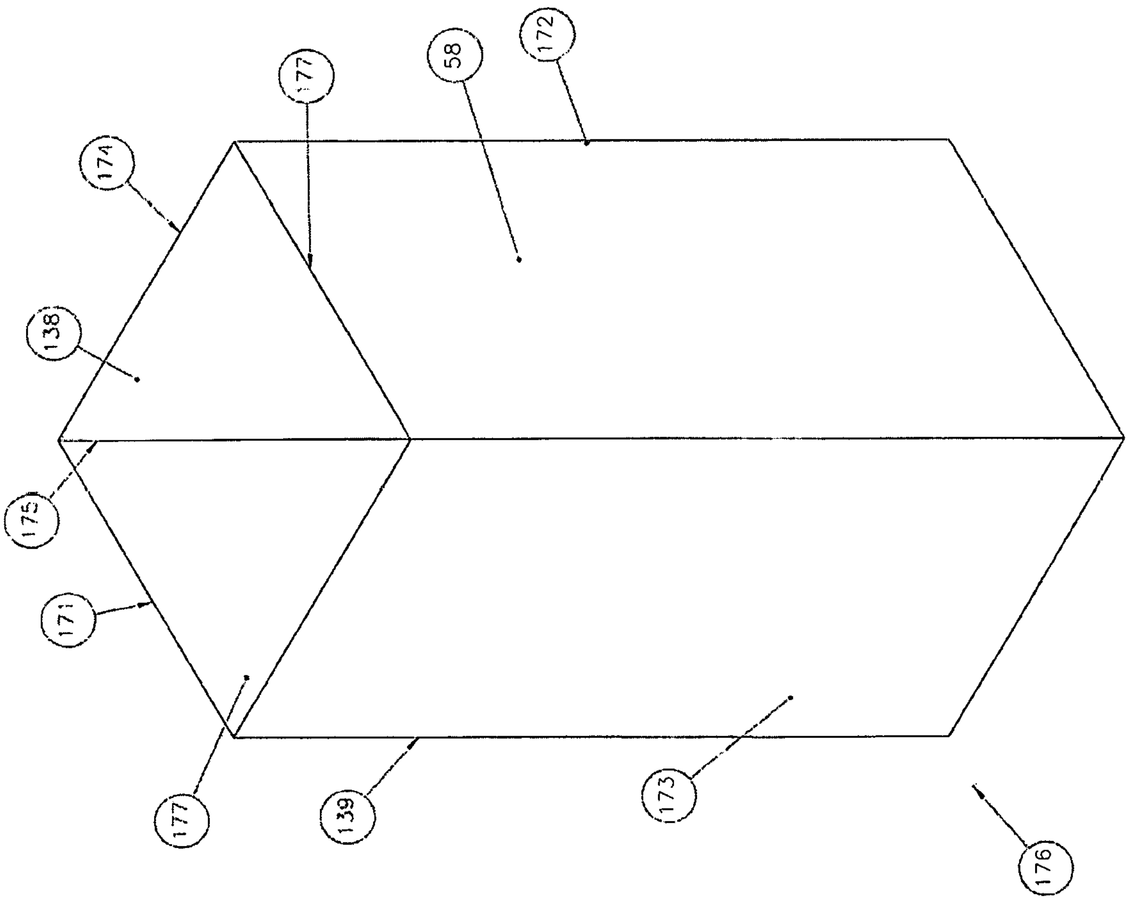
FIG. 44 is a perspective view of a discharge tube of a heat sealed bag in an open position in an alternative preferred embodiment of the present invention.
Figure 45:
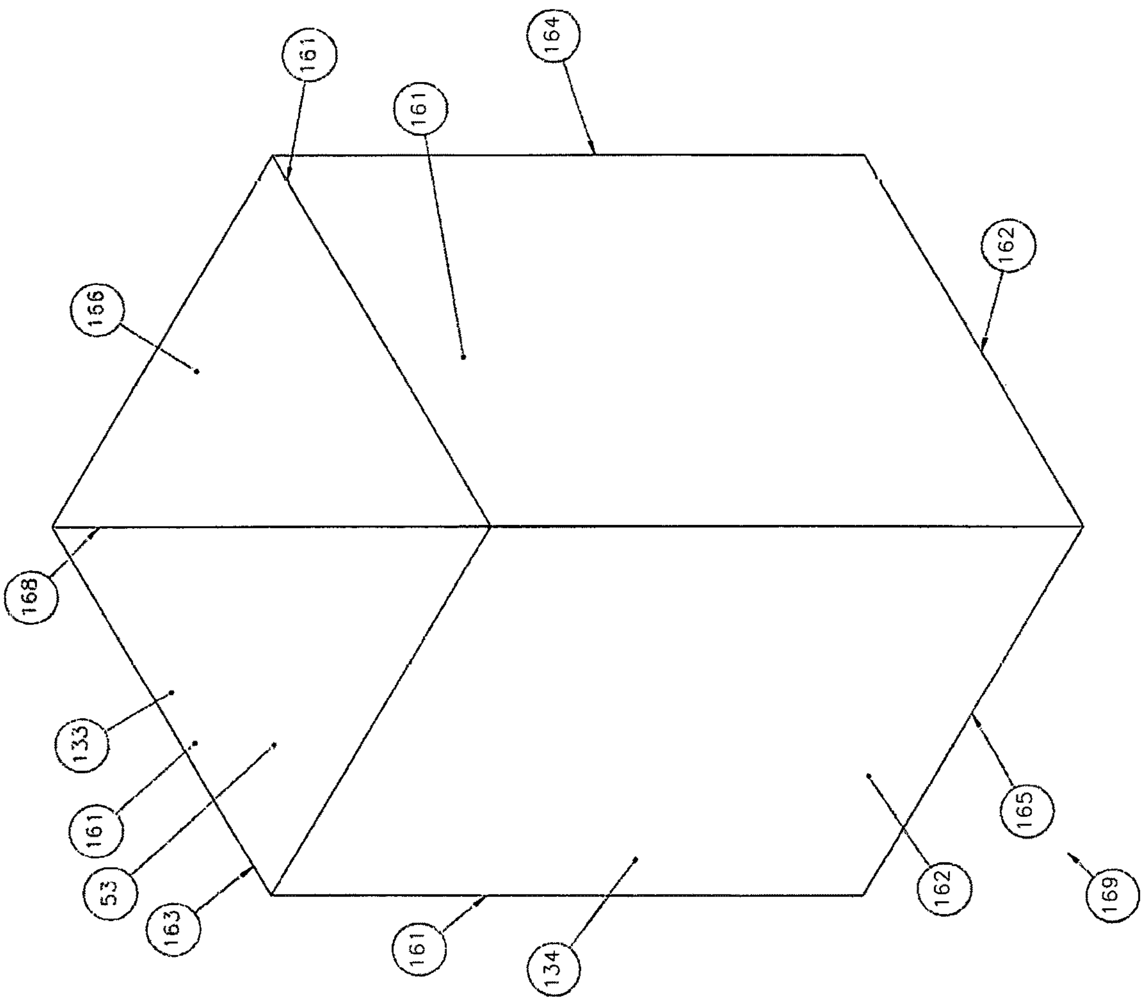
FIG. 45 is a perspective view of a main body tube of a heat sealed bag in an open position in an alternative preferred embodiment of the present invention.
Figure 46:
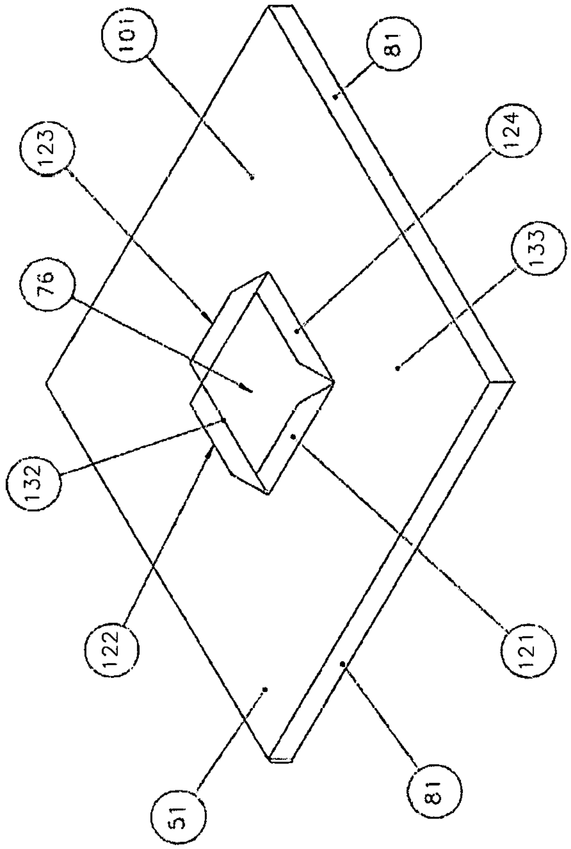
FIG. 46 is a perspective view of a top sheet of a heat sealed bag in an open position in accordance with in an alternative preferred embodiment of the present invention.
Figure 46A:
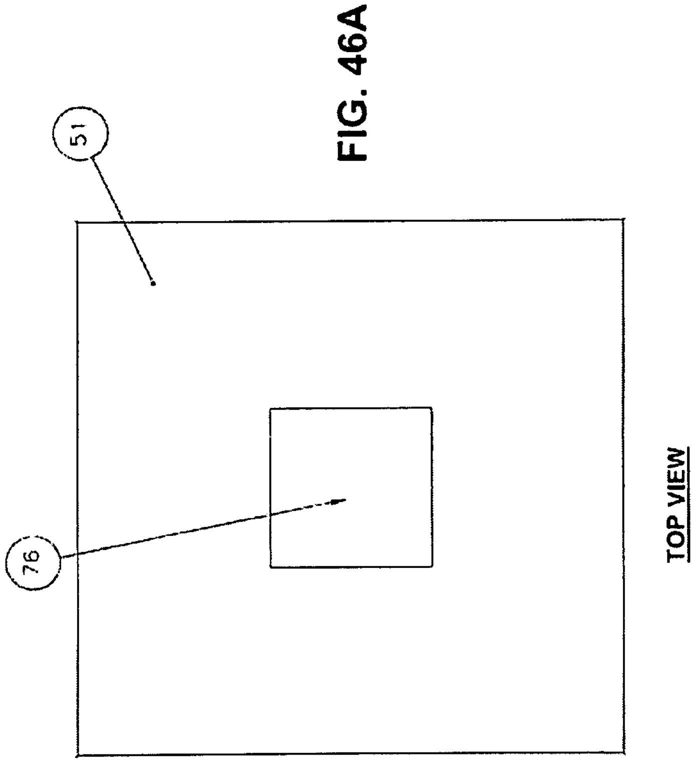
FIG. 46A is a top view of a top sheet of a heat sealed bag in an open position in an alternative preferred embodiment of the present invention.
Figure 46B:
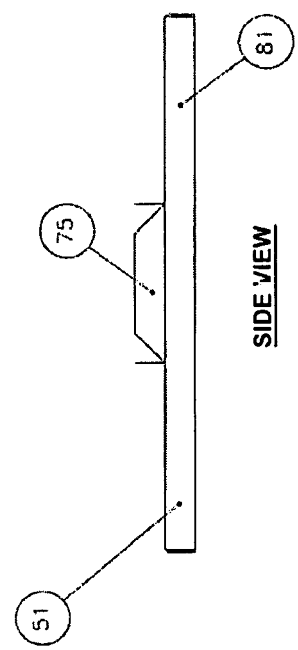
FIG. 46B is a side view of a top sheet of a heat sealed bag in an open position in an alternative preferred embodiment of the present invention.
Figure 47:
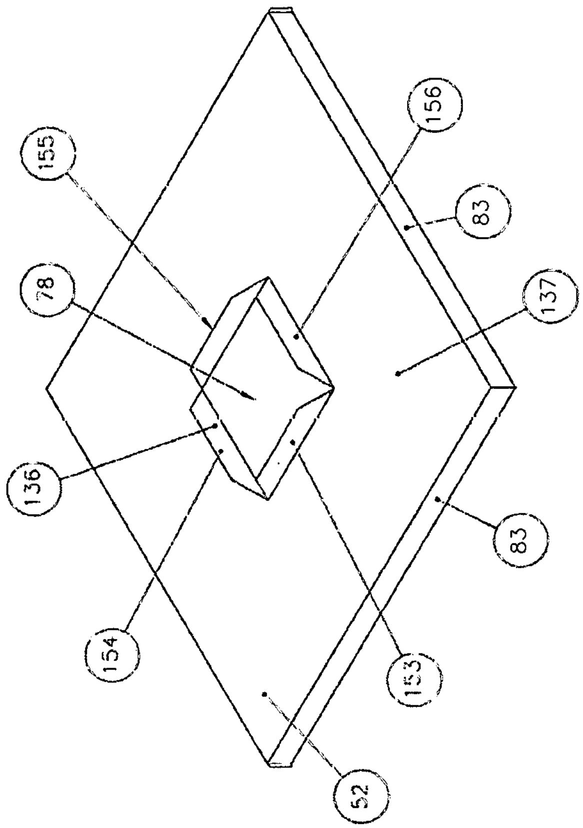
FIG. 47 is a perspective view of a bottom sheet of a heat sealed bag in an open position in an alternative preferred embodiment of the present invention.
Figure 47A:
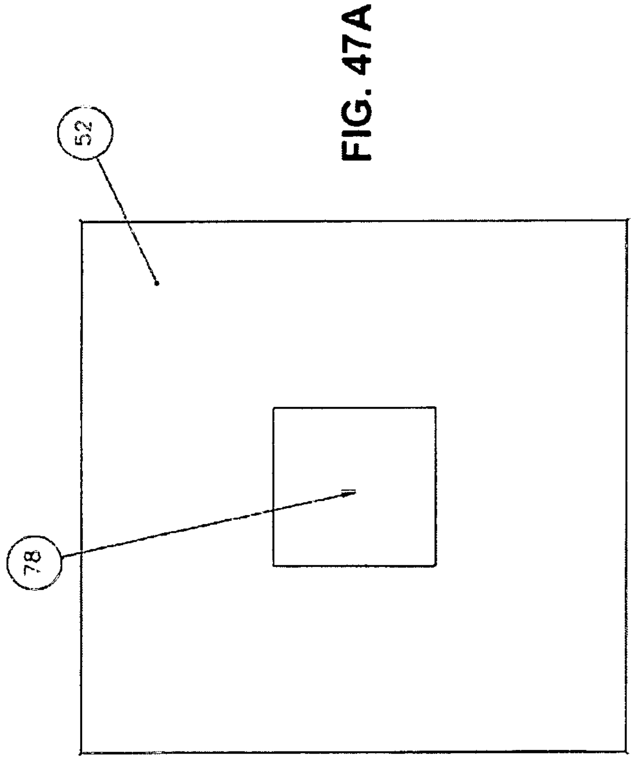
FIG. 47A is a bottom view of a bottom sheet of a heat sealed bag in an open position in an alternative preferred embodiment of the present invention.
Figure 47B:
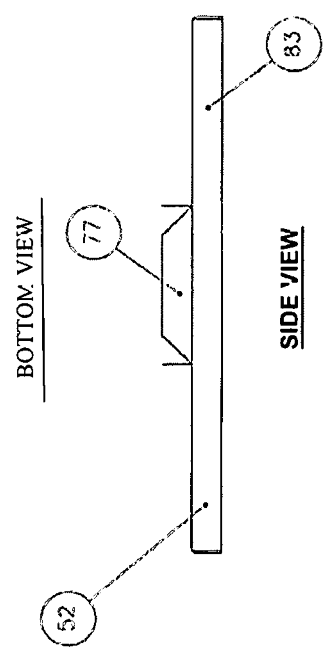
FIG. 47B is a side view of a bottom sheet of a heat sealed bag in an open position in an alternative preferred embodiment of the present invention.
Figure 48:
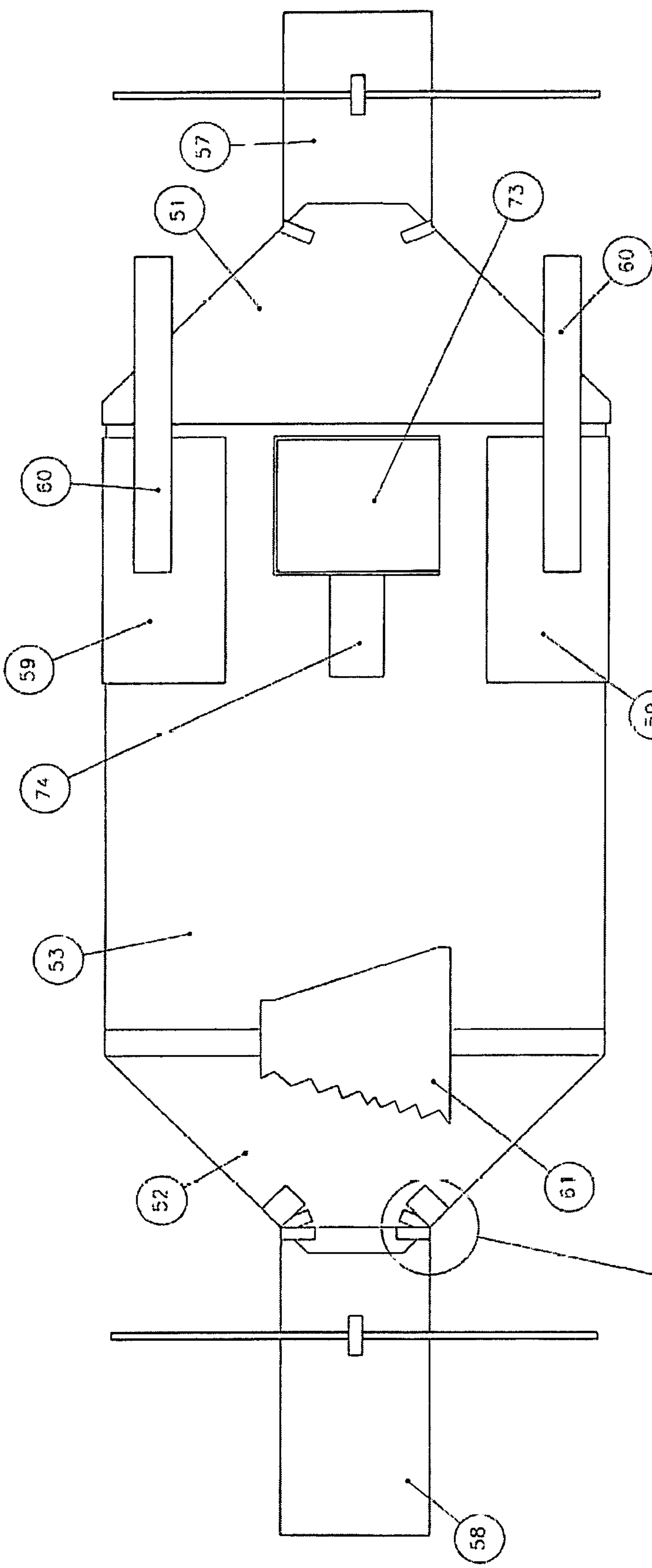
FIG. 48 is a schematic view of assembly tolerance specifications of a heat sealed bag in an alternative preferred embodiment of the present invention.
Figure 48C:
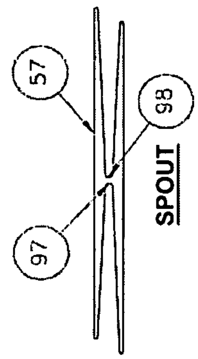
FIG. 48C is an end view of assembly tolerance specifications of a folded spout of a heat sealed bag in an alternative preferred embodiment of the present invention.
Figure 48B:
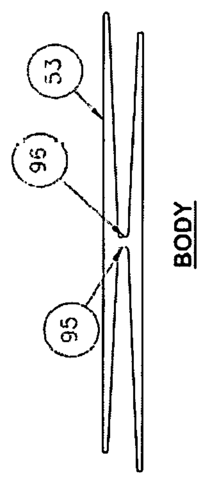
FIG. 48B is an end view of assembly tolerance specifications of a folded body of a heat sealed bag in an alternative preferred embodiment of the present invention.
Figure 48A:
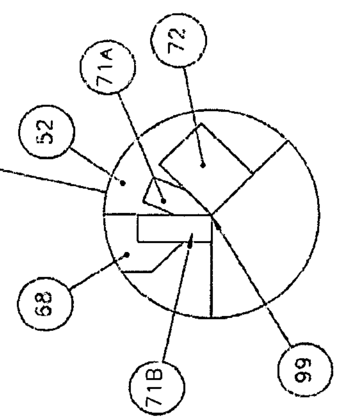
FIG. 48A is a detail view of assembly tolerance specifications of crossover point of outside tapes on a heat sealed bag in accordance with a preferred embodiment of the present invention.
Figure 48D:
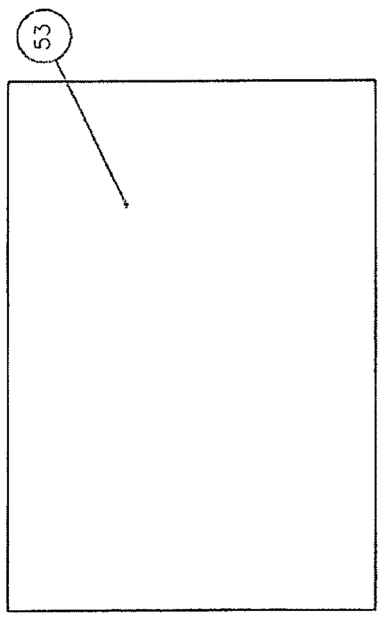
FIG. 48D is a view of component tolerance specifications of a main body of a heat sealed bag in an alternative preferred embodiment of the present invention.
Figure 48E:
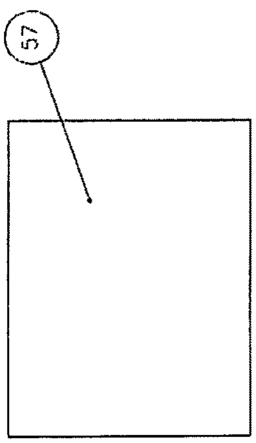
FIG. 48E is a view of component tolerance specifications of a fill tube of a heat sealed bag in an alternative preferred embodiment of the present invention.
Figure 48F:
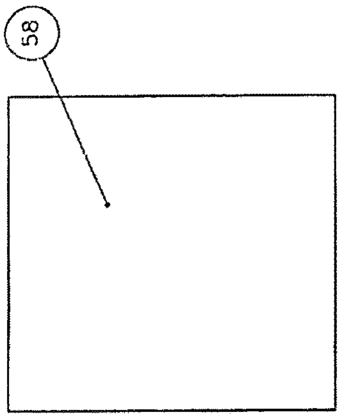
FIG. 48F is a view of component tolerance specifications of a discharge tube of a heat sealed bag in an alternative preferred embodiment of the present invention.
Figure 48G:
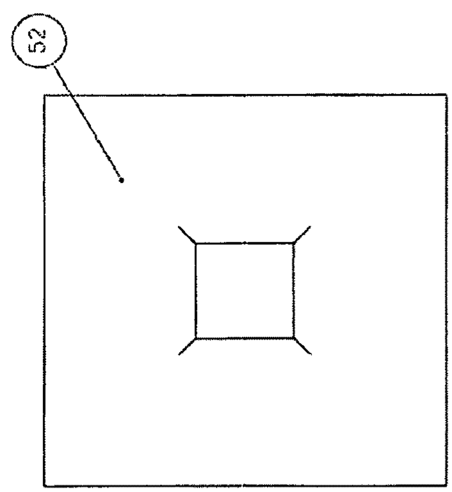
FIG. 48G is a view of component tolerance specifications of a top/bottom sheet of a heat sealed bag in an alternative preferred embodiment of the present invention.
Figure 48H:
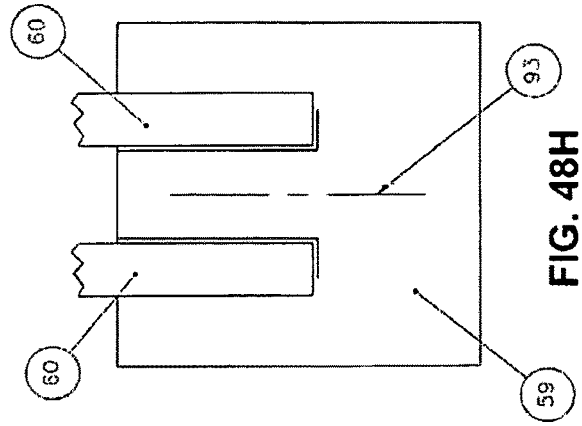
FIG. 48H is a view of component tolerance specifications of a lift loop panel of a heat sealed bag in an alternative preferred embodiment of the present invention.
Figure 48I:
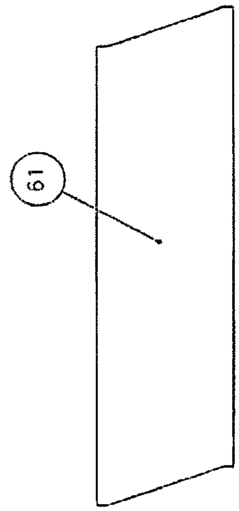
FIG. 48I is a view of component tolerance specifications of a diaper or bottom cover of a heat sealed bag in an alternative preferred embodiment of the present invention.
Figure 54:
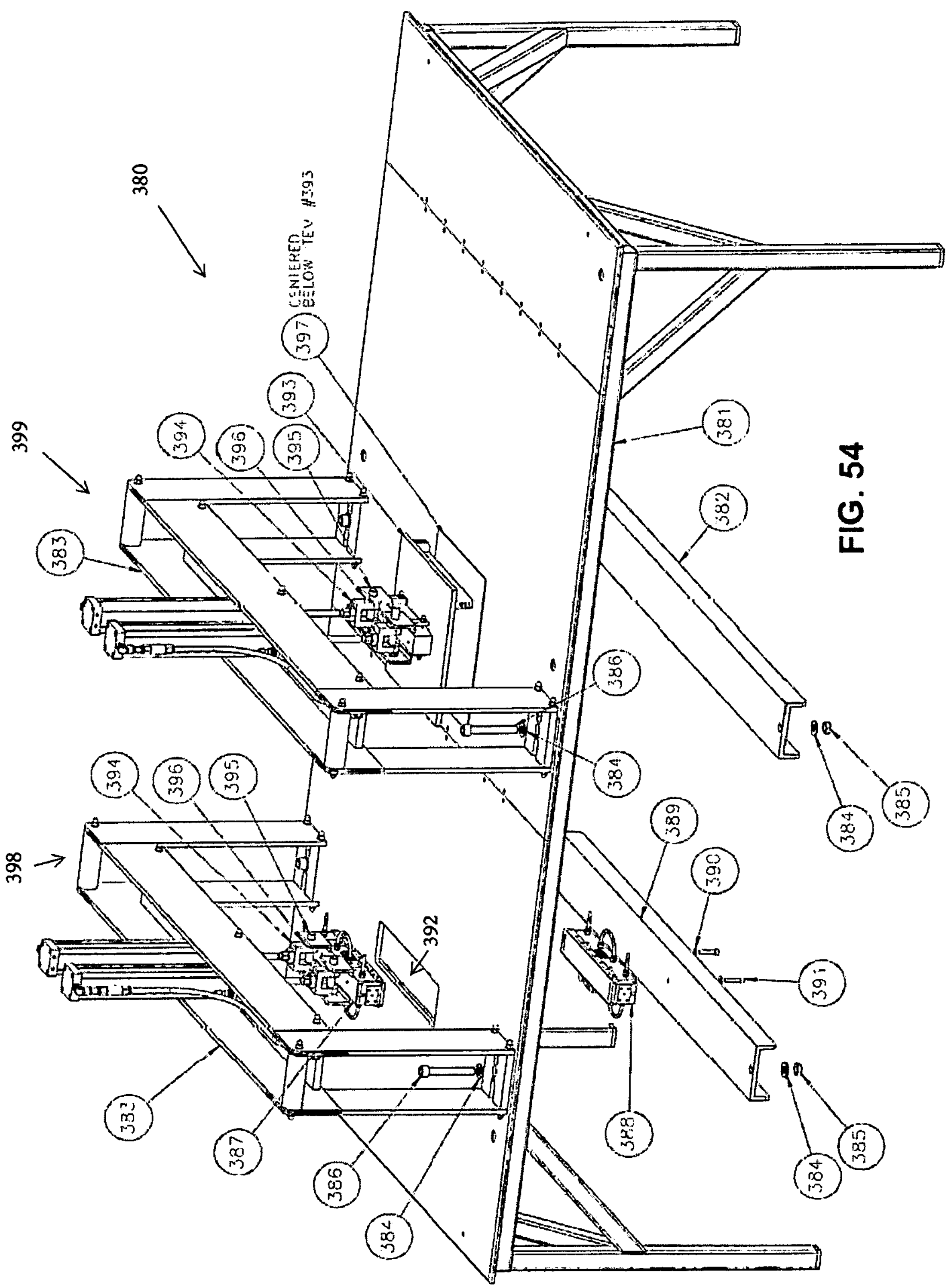
FIG. 54 is a perspective view of a cover/document pouch impulse heat sealer assembly in accordance with a preferred embodiment of the present invention.
Figure 55B:
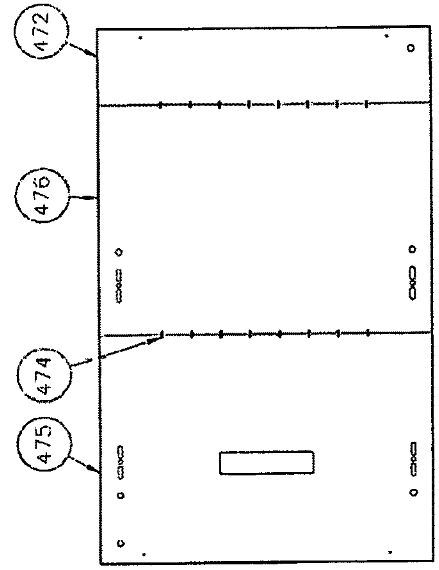
FIG. 55B is a top view of a table sub-assembly of a cover/document pouch impulse heat sealer in accordance with a preferred embodiment of the present invention.
Figure 55C:
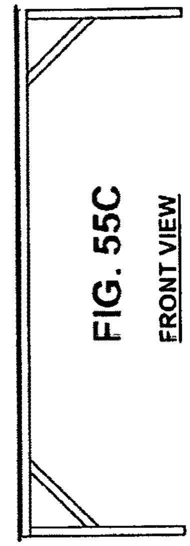
FIG. 55C is a front view of a table sub-assembly of a cover/document pouch impulse heat sealer in accordance with a preferred embodiment of the present invention.
Figure 55D:
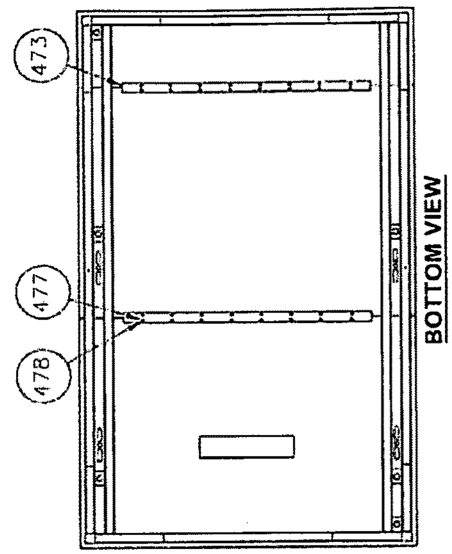
FIG. 55D is a bottom view of a table sub-assembly of a cover/document pouch impulse heat sealer in accordance with a preferred embodiment of the present invention.
Figure 55A:
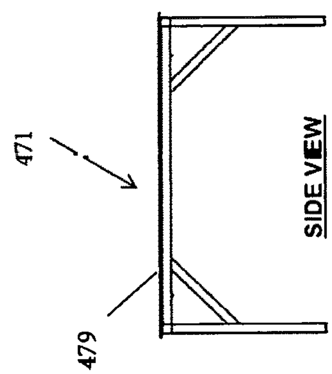
FIG. 55A is a side view of a table sub-assembly of a cover/document pouch impulse heat sealer in accordance with a preferred embodiment of the present invention.
Figure 55:
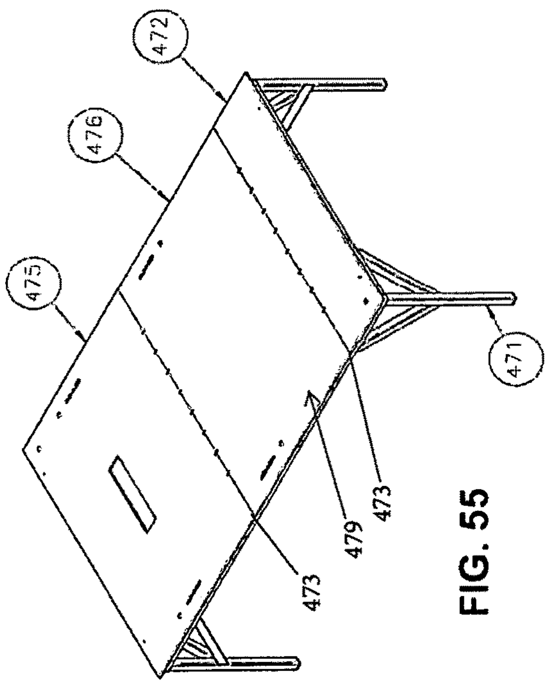
FIG. 55 is a perspective view of a table sub-assembly of a cover/document pouch impulse heat sealer in accordance with a preferred embodiment of the present invention.

FIGS. 54-62 illustrate a cover/document pouch impulse heat sealer and components thereof, which can be used in various embodiments of the method of the present invention, e.g., to seal a pouch 73 and/or label or warning 74 to a bag 50 (e.g., see FIGS. 32-33). Label or warning 74 can be sealed with an upper portion of the label 74 positioned under pouch 73 and with the rest of warning 74 not connected to the bag (e.g., see FIG. 31). Pouch 73 can have fusion coating 191 on a bottom surface and can be heat sealed to exterior surface 135 of body 53 which can have a standard coating 192 or fusion coating 191 thereon. The machine as illustrated in FIGS. 54-55D can also be used to heat seal a bottom cover 61 to bag 50 at the same time the document pouch 73 and label or warning 74 is heat sealed to bag 50.

FIG. 54 illustrates a cover/document pouch impulse heat sealer assembly 380, including a table assembly 381, a bottom cover heat sealing assembly 398 and a document pouch heat sealing assembly 399. Bottom cover heat sealing assembly 398 and document pouch heat sealing assembly 399 can each be coupled to table assembly 381 supported by a lower bracket 382. A bottom cover heat sealing assembly can also be provided as a separate heat sealing station, or as part of a different heat sealing station for sealing one or more other desired bag joints or parts, e.g., as shown in FIG. 97 for example. A document pouch heat sealing assembly can also be provided as a separate heat sealing station or as part of another heat sealing station for sealing one or more different bag joints or parts, e.g., as shown in FIG. 97.

Referring to FIGS. 55-55D and 56-56D, table assembly 381 can include a frame 471 with a table top 479 that can include a table right section 472, table left section 475, table middle section 476 and splice plates 473, with screws 474, washers 477, and nuts 478 as shown in FIGS. 55B and 55D.

The left section 475 of table top 479, can include bottom cover heat sealer assembly 398 with an opening 392. Heat sealer assembly 398 can include lower 388 heat seal assembly and upper 387 mating heat sealing assembly. Lower assembly 388 can be positioned below opening 392. Upper assembly 387 can be positioned above opening 392. Both upper 387 and lower 388 assemblies of bottom cover assembly 398 can include a heat seal bar assembly 434 as shown in exploded view in FIG. 60.

The middle section 476 of table top 479 can include a document pouch heat sealer assembly 399 with heat sealer sub-assembly 393 and insulation pad 397 centered below. Right section 472 of table top 479 can be provided to increase a length of table assembly 381 as needed, or to provide a table top portion for assembling or holding bag parts or portions.

As shown in FIGS. 56A-56C, table frame 471 can include frame legs 481, each of which can have a base pad 482. Frame 471 can have transverse end cross members 483 coupled to front and back cross members 484*a* along an outer perimeter of the table frame 471. Additional internal front and back cross members 484*b* can be included on an interior side 486 of front and back cross members 484*a*. Cross members 484*b* can also be coupled to end cross members 483 and spaced a distance away from front and back cross members 484*a*, e.g., about 4 to 6 inches (10.2 to 15.2 cm) away. Internal transverse cross members 487 can extend between and be coupled to cross members 484*b* on the left side 475 of frame 471 that will include the document cover heat sealing assembly 398. Corner braces 485 can also be included on frame 471, extending from a leg 481 to an end cross member 483 or to a front or back cross member 484*a*.

In a preferred embodiment, a frame 471 end side can be about 66 inches (167.6 cm) long. Front and back sides of a frame 471 can be about 110 inches (279.4 cm) long. The distance between left side end cross member 483 and a first cross member 487, can be about 24 inches (61 cm). The distance between left side end cross member 483 and a second cross member 487, can be about 30 inches (76.2 cm). Measuring from a cross member 483 on left side 475 to a third cross member 487 can be about 38 inches (96.5 cm). The distance between left side end cross member 483 and a third cross member 487, can be a distance of about 49 inches (124 cm). The distance between left side end cross member 483 and a fourth cross member 487, can be about 16 inches (40.6 cm). The distance between the location where a corner brace 485 is coupled to a leg 481 and to the top of the frame 471 can be about 16 inches (40.6 cm). Other desired dimensions can also be used for a frame 471, e.g., to accommodate a bag and its respective parts to be heat sealed.

Figure 57:
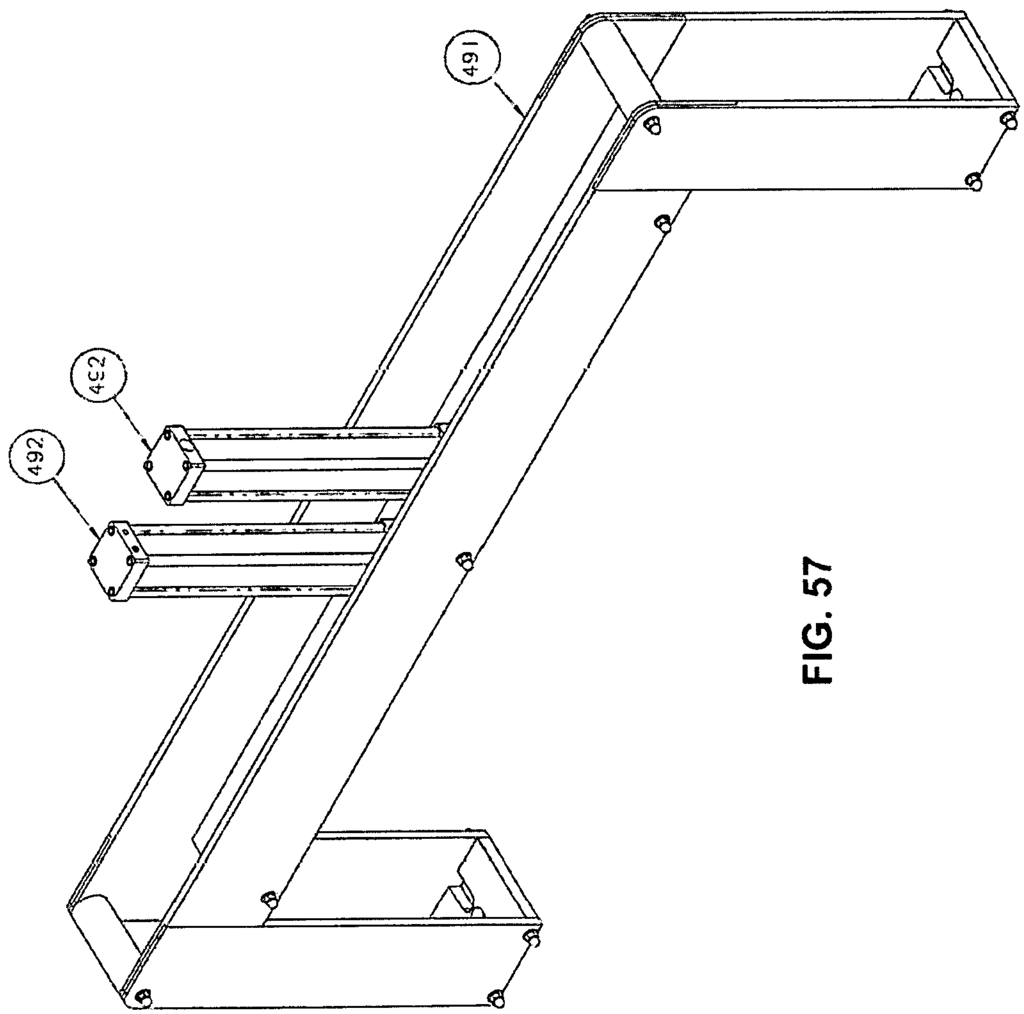
FIG. 57 is a perspective view of a bottom cover or a spout to top/bottom frame sub-assembly in accordance with a preferred embodiment of the present invention.
Figure 58:
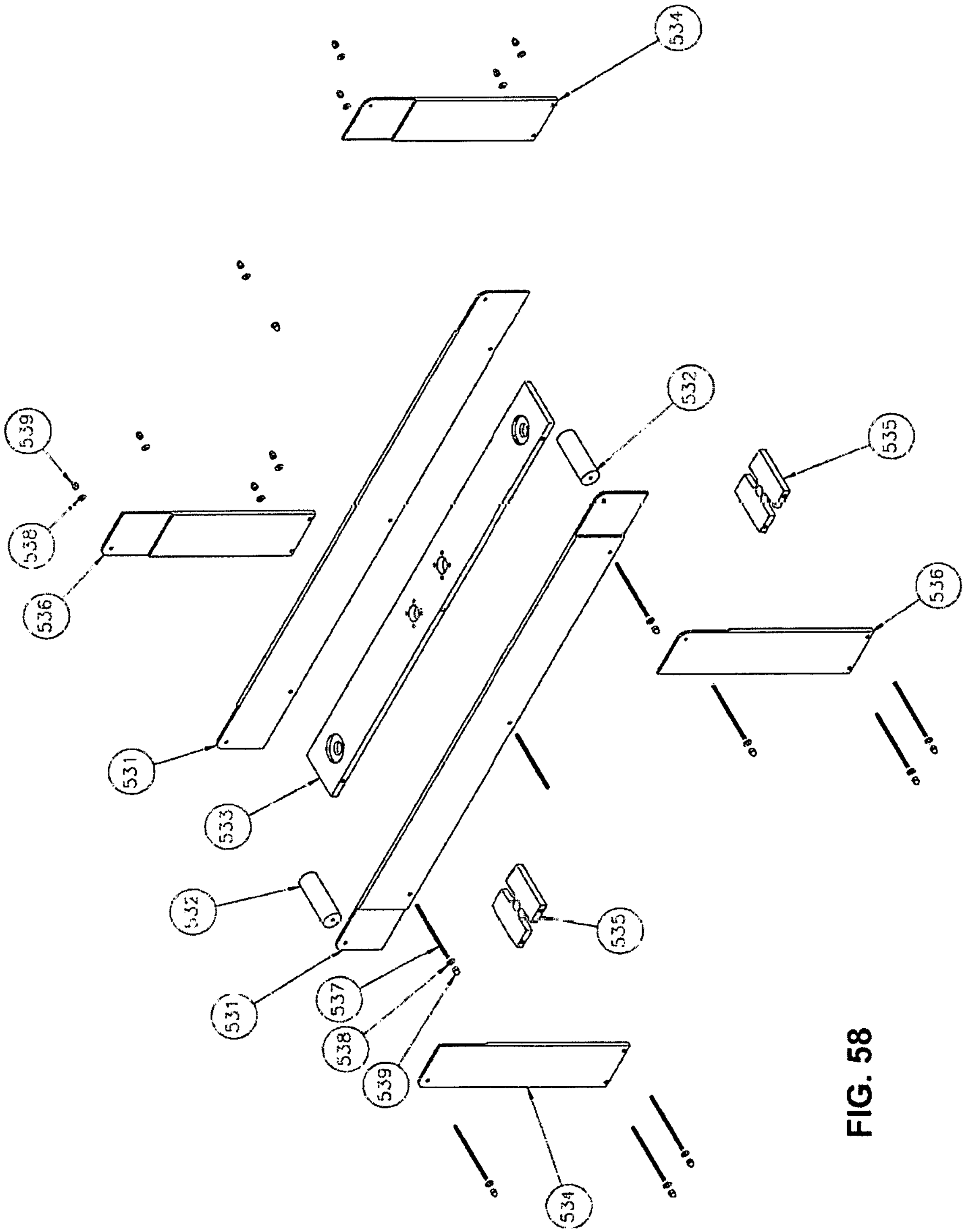
FIG. 58 is an exploded perspective view of a seal bar frame sub-assembly of a bottom cover or a spout/top/bottom/body impulse heat sealer in accordance with a preferred embodiment of the present invention.

A heat sealer frame assembly 383 is shown in FIG. 57, and can include a frame assembly 491 and air or pneumatic cylinders 492. Frame assembly 491 can include top cross supports 531 that are spaced apart by frame spacers 532, vertical or longitudinal left and right supports 534, 536, bottom brackets 535, and a cylinder bracket 533. Frame assembly 491 can be assembled using thread rods 537, washers 538 and cap nuts 539, for example, as shown in FIG. 58, and in the same or a similar manner as described with regard to frame assembly 351 as shown in FIG. 53.

Figure 59:
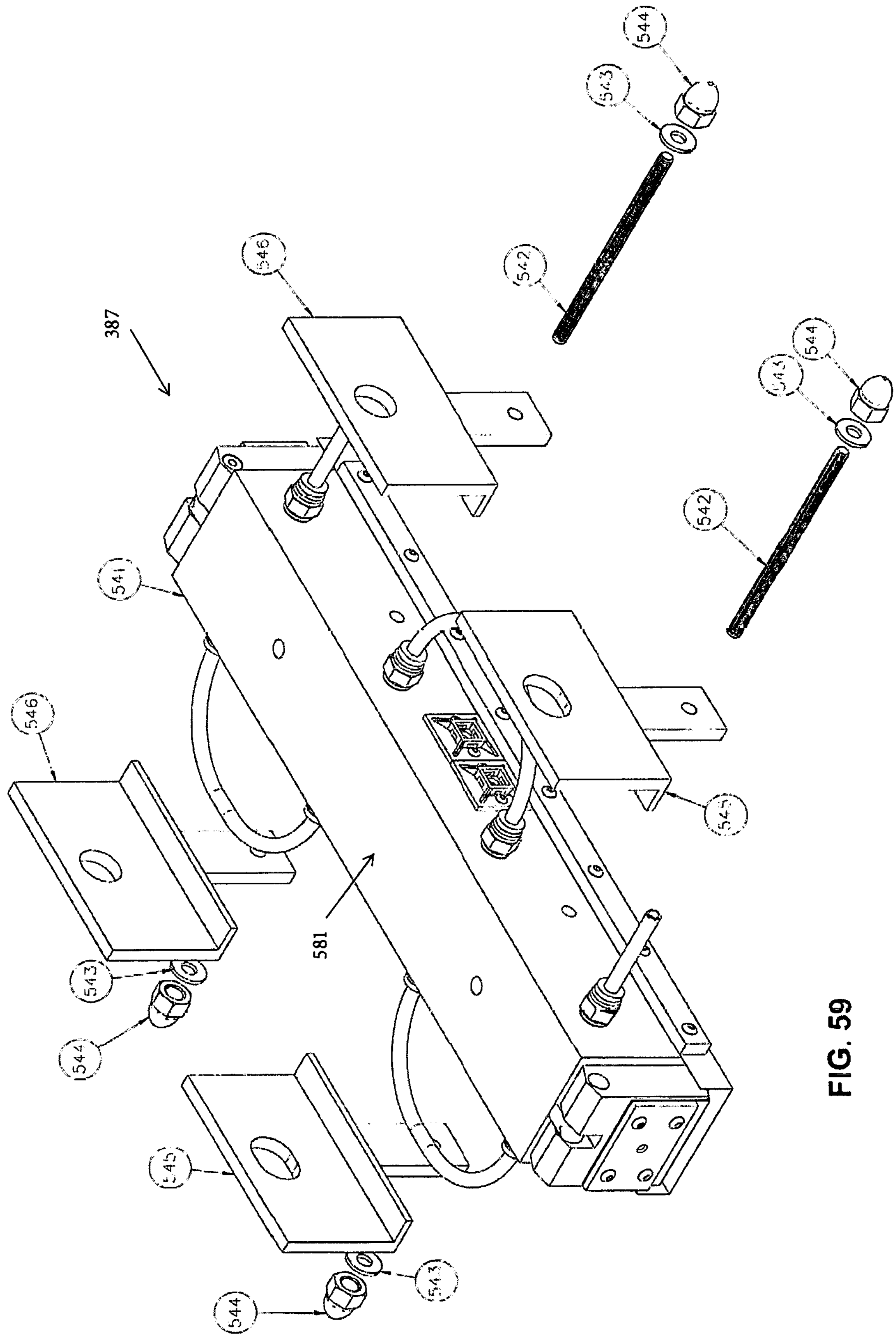
FIG. 59 is an exploded perspective view of a cover heat seal bar with mounting brackets sub-assembly which can be used with a cover/document pouch impulse heat sealer in accordance with a preferred embodiment of the present invention.

FIGS. 54, 59 illustrate upper heat sealing portion 387 of bag cover heat sealing assembly 389. Upper heat sealing portion 387 can include heat seal bar assembly 541, which can be coupled to cylinders 492, and which said cylinders 492 can be coupled to heat sealer frame 491. Heat sealer frame 491 can be coupled to document pouch/cover table assembly frame 471 with a lower bracket support 389, washer 384, 390, screw 391, hex nut 385 and bolt 386, for example, as shown in FIG. 54.

Heat seal bar assembly 541 can be coupled to cylinders 492 with devises 394, shafts 395, shaft collars 16, seal bar position brackets 545, slotted seal bar position brackets 546, thread rods 542, washers 543 and nuts 544, as shown in FIGS. 54 and 59. Cylinders 492 can raise and lower heat sealing bar assembly 541.

Preferably a pair of positioning brackets 545 each has an opening 572 sized to receive a shaft and to allow for little or no movement of the shaft. Preferably a pair of positioning brackets 546 has an opening that is larger than the opening of brackets 545, and can be a slotted opening 573, for example. With this configuration, when lowering the upper heat sealing bar assembly 541 to make contact with the fabric in the joint area, brackets 545 hold press block in a substantially fixed position over the bag pressed, while slotted brackets 546 enable a left to right rocking motion of the sealing bar. The rocking motion can help ensure even pressure is applied while heating through all layers of the joint area, even in areas where the fabric of the bag has different densities. Preferably slotted openings are not included in each positioning bracket 545, 546 because this could then allow for the sealing bar to not stay in a substantially fixed position over the bag when heat sealing the joint.

Figure 60:
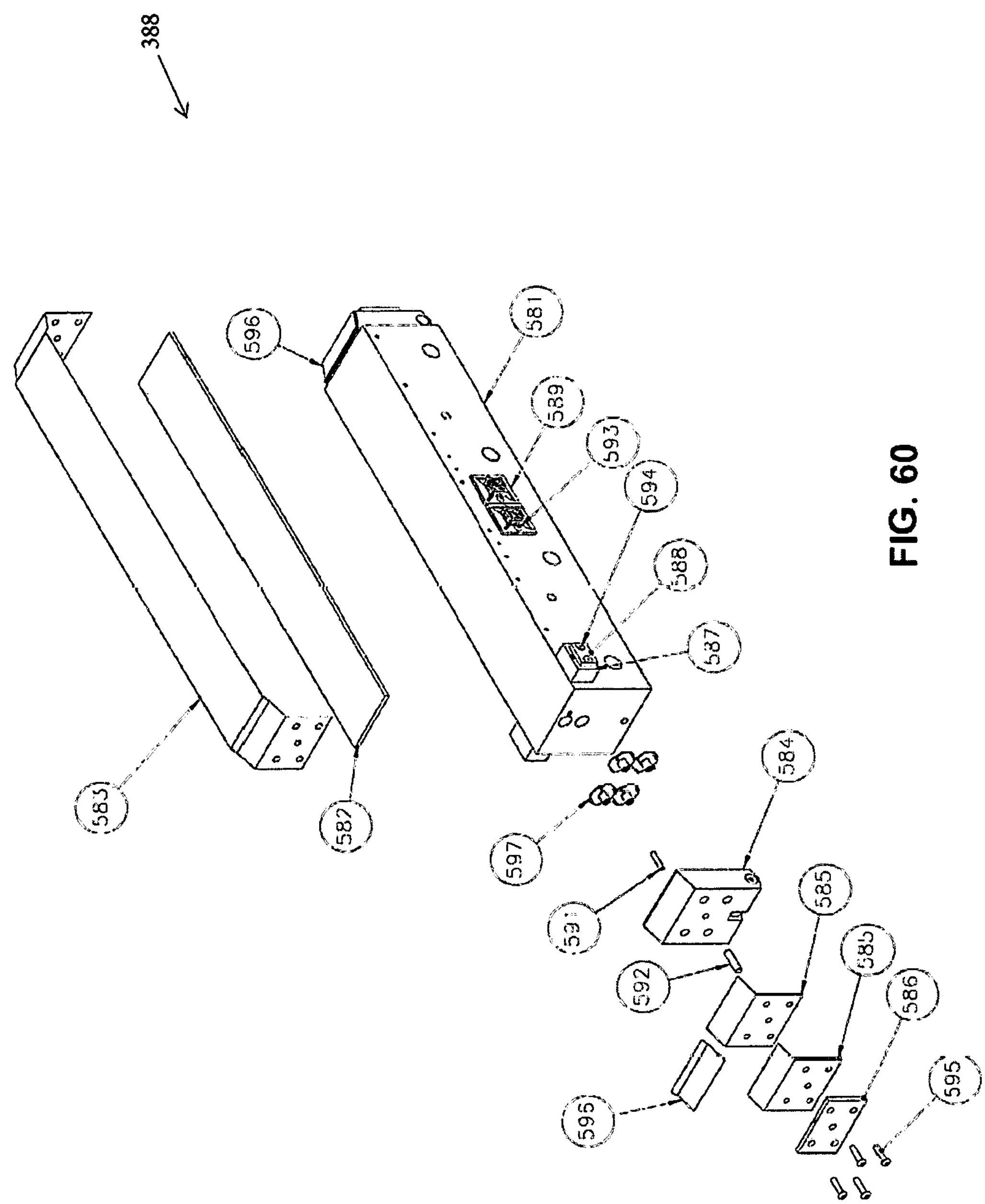
FIG. 60 is an exploded perspective view of a cover heat seal bar sub-assembly for a cover/document pouch in accordance with a preferred embodiment of the present invention.

A bottom cover heat sealing assembly 434, which can be used in upper and lower heat sealing assemblies 387 and 388 is shown in FIG. 60. Heating sealing assembly 434 can include a main body portion 581, heat insulating pad 582, preferably a single piece heating element 583, heat strip tension sub-assemblies 584, heat strip mounting end 585, heat strip retaining cap 586 (which preferably can be reusable, e.g., if heating element 583 needs to be replaced), stand off block 587, double washer 588, wire tie wraps 589, pins 591 and 592, screws 593, 594, 595, cloth tape 596 which can be a PTFE Teflon cloth tape, and tee nut inserts for wood 597.

Figure 61:
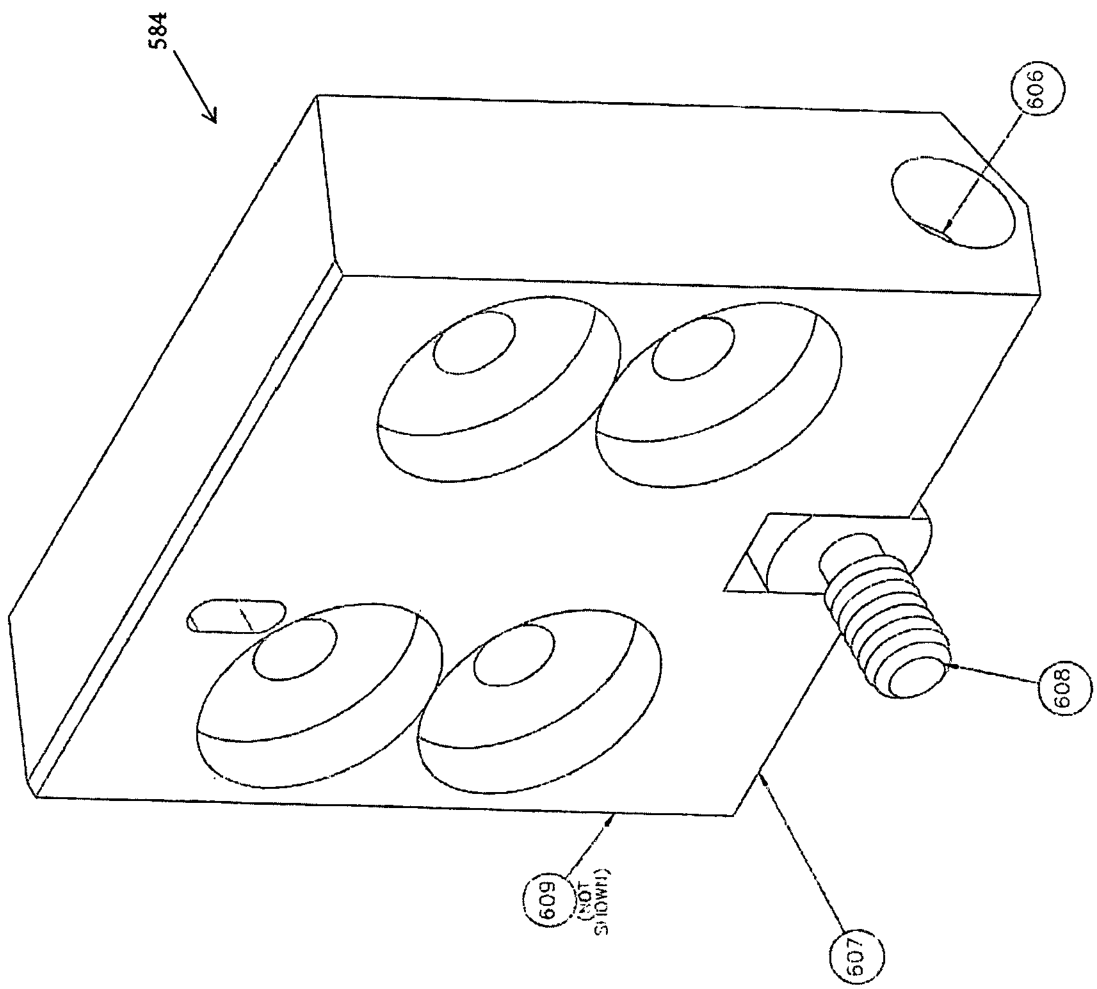
FIG. 61 is a perspective view of a heat strip tension subassembly of an impulse heat sealing bar in accordance with a preferred embodiment of the present invention.

In FIG. 61, a heat strip tension sub-assembly 584 is depicted, which can be an about 11 inch (27.9 cm) sub-assembly, and can be included in one or more embodiments of heat sealing bar assemblies as described herein. Heat strip tension sub-assembly 584 can include, for example, a 316 stainless steel shoulder screw 606, tension end caps 607, pivot pegs 608, and a nut 609. A heat strip tension sub-assembly 584 can be included on both end portions of a main body portion 588. The tension sub-assemblies and springs (not shown in FIG. 60) can hold the heating element in place in and in tension, e.g., during a cooling time. Ends of the heating element can be positioned between heat strip mounting ends 585. Pin 592 can be a locating pin. The pins 591 and 592 hold individual parts of the heat bar assembly together and in position. Without the pins, precision would be lost.

When attaching a bottom cover 61, after positioning the cover 61 on a bag 50, the bag 50 can be positioned on table 479 with the desired joint area for the document cover positioned over opening 392. Cylinders 492 can lower heat seal bar assembly 541 to make contact with the document cover 61 on the upper side of the bag 50, which can mate with lower heat seal bar portion 388 which can be in contact with the bottom cover 61 on the backside of bag 50. In the embodiment as shown, lower heat seal bar portion 388 is not raised or lowered. The dimensions of cover heat assembly 398 can define the dimension of a bottom cover joint on both front and backsides of bag 50. Preferably the joint begins below cover pull tab or flap 64 of cover 61 so that tab or flap 64 is not coupled to bag 50 and can be pulled to release cover 61 from the bag 50 when discharging contents of bag 50.

Figure 62:
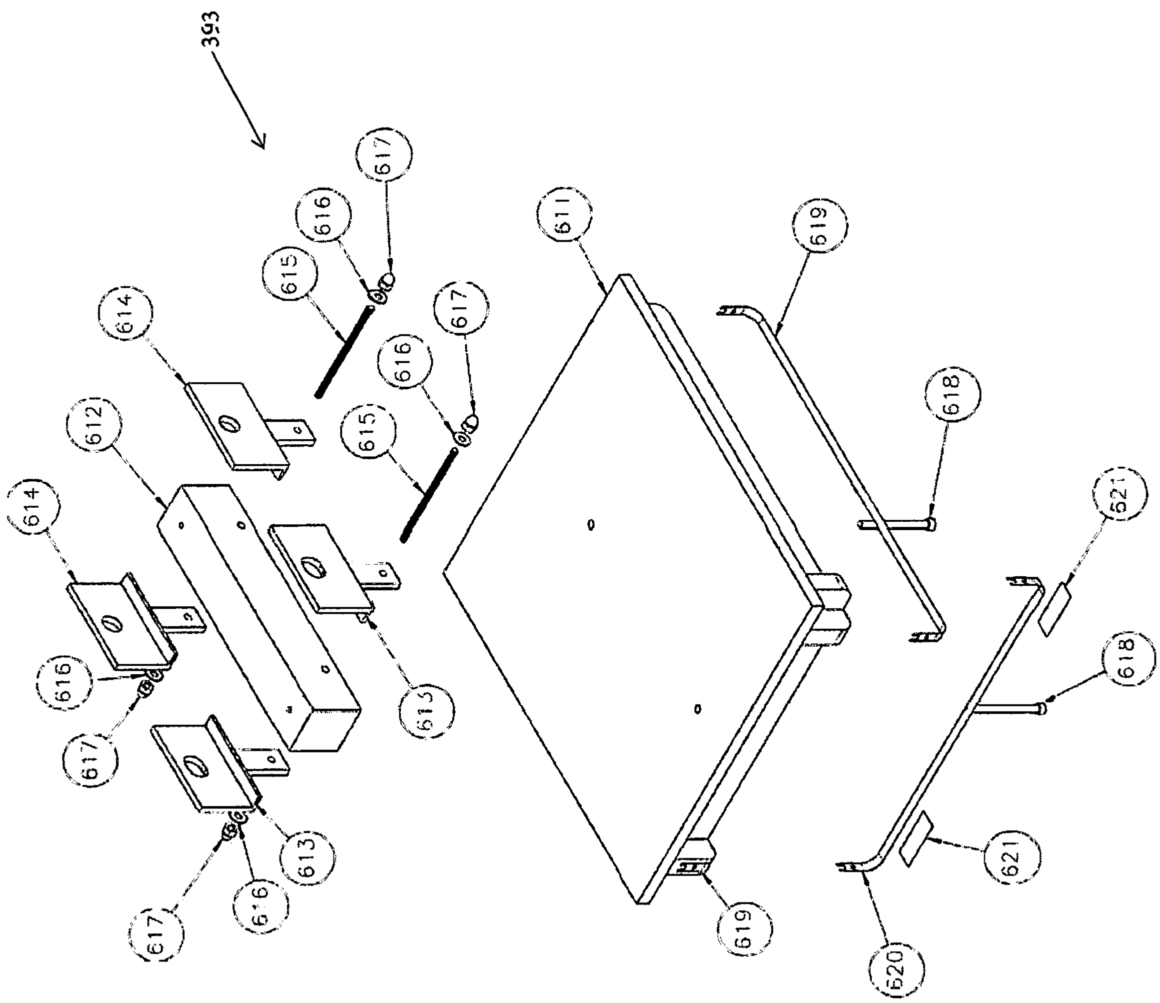
FIG. 62 is an exploded perspective view of a toss document pouch heat seal bar sub-assembly that can be included in a cover/document pouch impulse heat sealer in accordance with a preferred embodiment of the present invention.

FIG. 62 illustrates a document pouch heat seal bar assembly 383, which can be coupled to cylinders 492 of a heat sealer frame 383, with devises 394, shaft 395, shaft collar 396, seal bar slotted position brackets 613, seal bar position bracket 614, thread rods 615, washers 616, nuts 617, and cap screws 618. As shown in FIG. 62, document pouch heat seal bar assembly 383 can include an attachment plate 611, yoke attachment 612, seal bar slotted position brackets 613, seal bar position bracket 614, thread rods 615, washers 616, nuts 617, cap screws 618, heating elements 619 and 620, and cloth tape 621, which can be PTFE coated Teflon cloth tape.

FIGS. 63-73 illustrate a fill spout/top/body/bottom/discharge tube impulse heat sealer 630, which can be used in various embodiments of the method of the present invention. In various embodiments, top 51 in 2D, folded or gusseted configuration can be manually overlapped, for example, with body 53 to form fusion area 66. Top 51 can be temporarily attached to the bag body 53 in 2D configuration, e.g., with removable tape. Fill spout 57 in 2D configuration can also be manually overlapped with top 51 to form fusion area 65 and be non-permanently attached to top 51, e.g., with tape. Each fusion area 65 and 66 is can be positioned under a heat sealing bar of the heat sealing machine 630. In some embodiments, as described further with regard to FIGS. 97 and 142-156, a carrier plate can be used to assemble one or more fusion areas and temporarily hold them in place.

Similarly, a heat sealer machine 630 can be used to form joints between a bag body 53 and bottom 52, and between a bottom 52 and discharge tube or spout. In various embodiments, bottom 52 in 2D, folded or gusseted configuration can be manually overlapped, for example, with body 53 to form fusion area 67. Bottom 52 can be temporarily attached to the bag body 53 in 2D configuration, e.g., with removable tape. Discharge tube 58 in 2D configuration can also be manually overlapped with bottom 52 to form fusion area 68 and be non-permanently attached to bottom 52, e.g., with removable tape. Each fusion area 67 and 68 is can be positioned under a heat sealing bar of the heat sealing machine 630.

Figure 63:
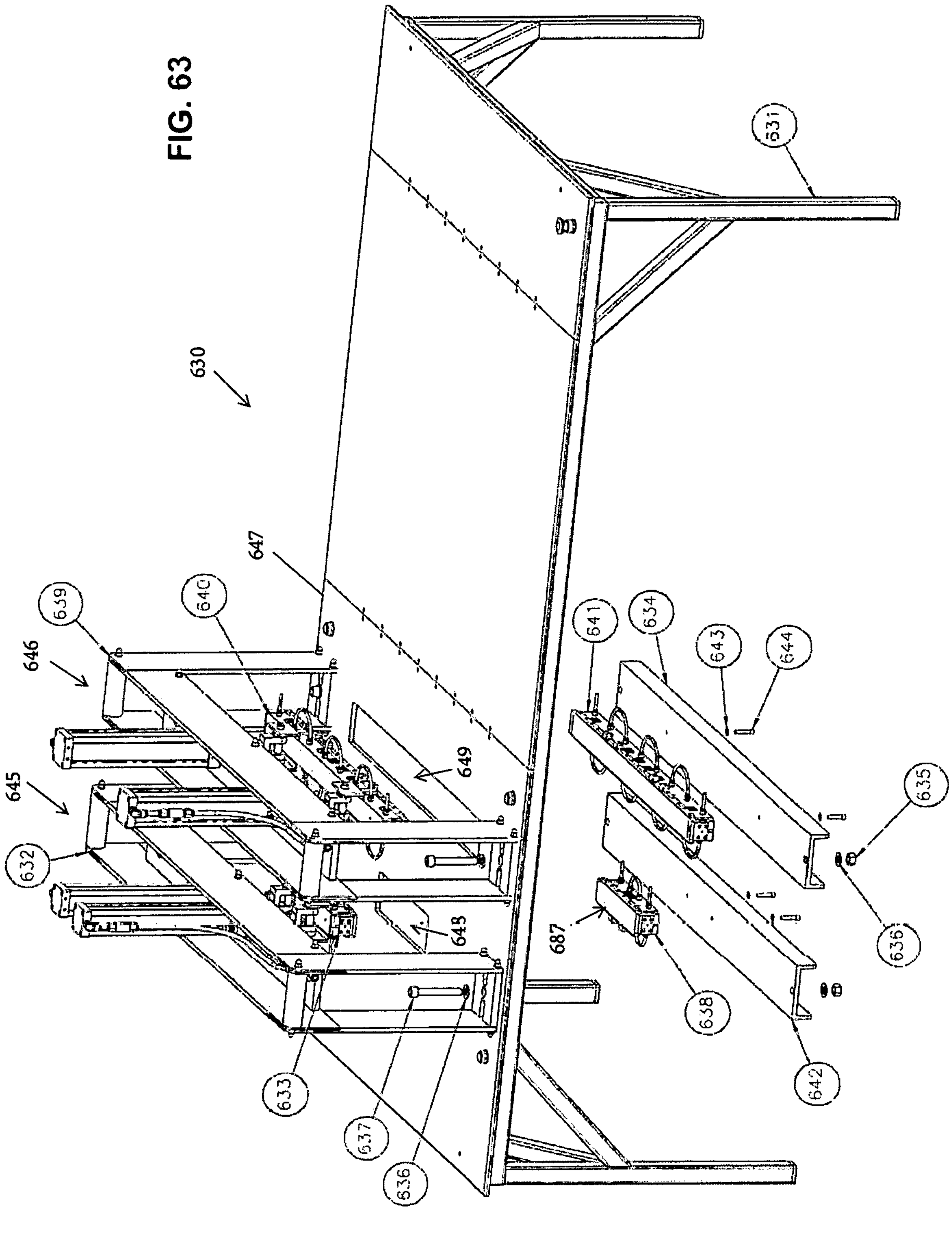
Figure 64:
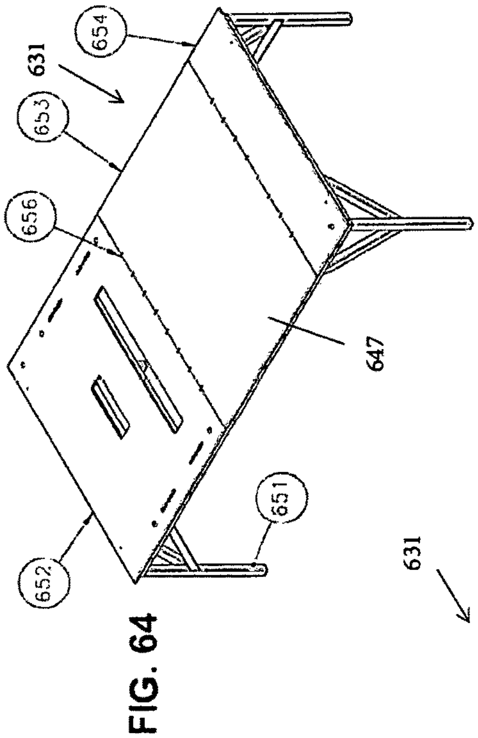
Figure 64A:
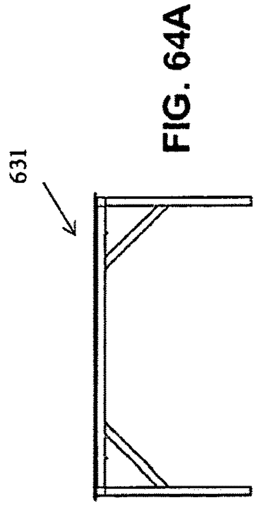
Figure 64B:
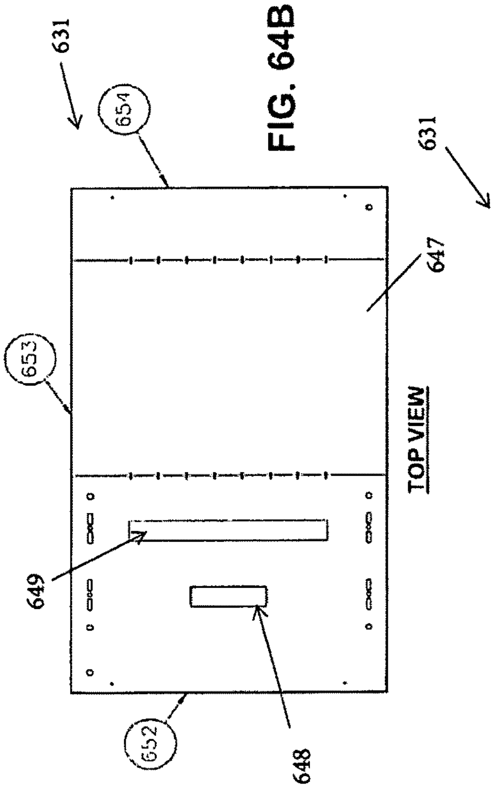
Figure 64C:
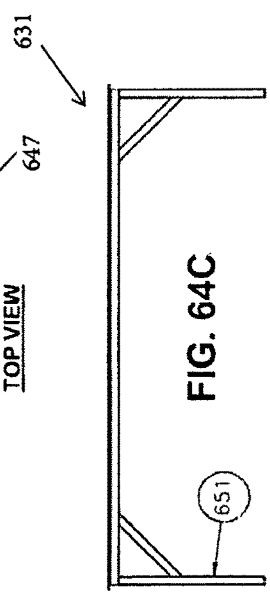
Figure 64D:
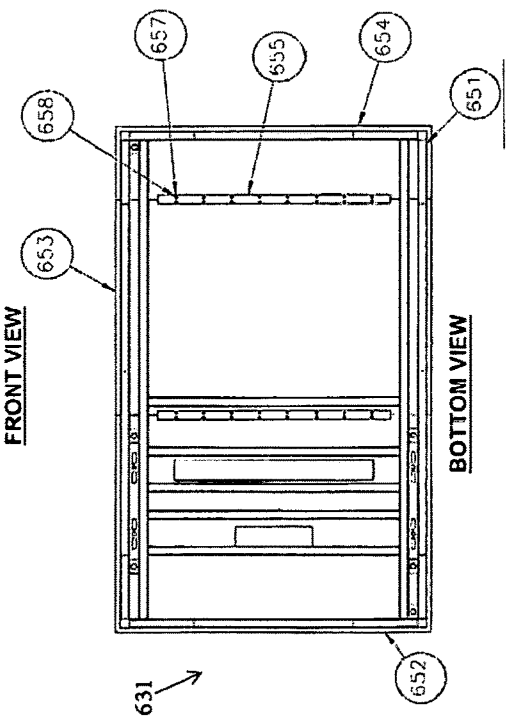
Figure 65:
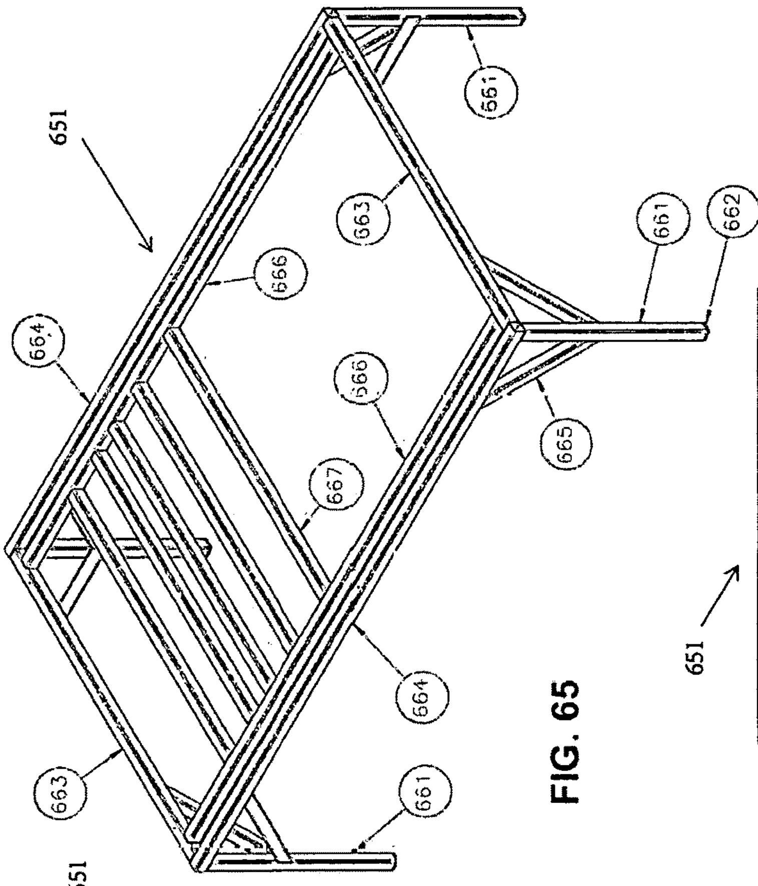
Figure 65C:
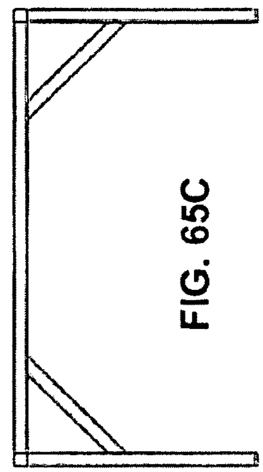
Figure 65A:
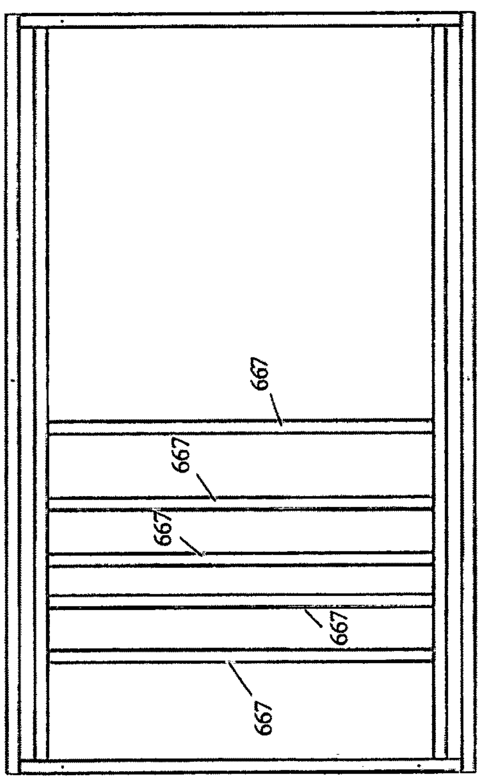
Figure 65B:
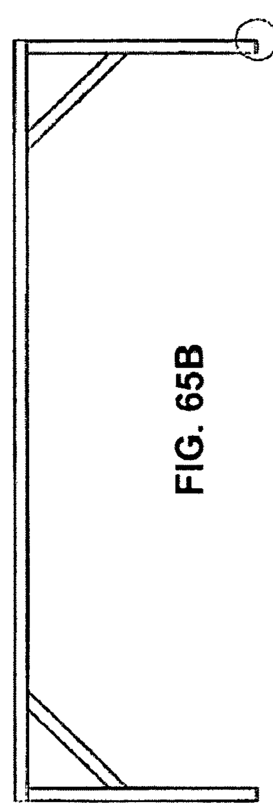
Figure 65D:
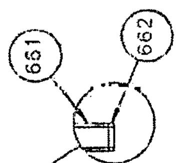

A spout/top/body/bottom/tube heat sealing assembly 630 can include a table assembly 631 with a spout/tube to top/bottom heat sealing portion 645 and a top/bottom to body heat sealing portion 646. Spout/tube to top/bottom heat sealing portion 645 can be coupled to table assembly 631 with heat sealing frame 632, lower bracket support 642 and nuts 635, washers 636, 643 and screws 637, 644 as shown in FIG. 63. Top/bottom to body heat sealing portion 646 can be coupled to table assembly 631 with heat sealing frame 639, lower bracket support 634, and nuts 635, washers 636, and screws 637, as shown in FIG. 63.

FIGS. 64-64D and 65-65D illustrate table assembly 631, which includes a table frame 651 having legs 661, each of which can have a base pad 662. Table assembly 631 can have a table top 647 including a left side 652 which can include both the spout/tube to top/bottom heat sealing portion 645 and the top/bottom to body heat sealing portion 646, and openings 648 and 649. Table top 647 can also a middle section 653, a right section 654, and a splice plate 655 along with screws 656, washers 657, and nuts 658.

Spout/tube to top/bottom heat sealing portion 645, can include upper heat sealer assembly 633 and mating lower heat sealer assembly 638. Lower assembly 638 can be positioned below opening 648. Upper assembly 633 can be positioned above opening 648.

Top/bottom to body heat sealing portion 646, can include upper heat sealer assembly 640 and mating lower heat sealer assembly 641. Lower assembly 641 can be positioned below opening 649 in table top 647. Upper assembly 640 can be positioned above opening 649 in table top 647.

Frame 651 can have transverse end cross members 663 coupled to front and back cross members 664 along an outer perimeter of the table frame 651. Additional internal front and back cross members 666 can be included on an interior side of front and back cross members 664. Cross members 666 can also be coupled to end cross members 663 and spaced a distance away from front and back cross members 664, e.g., about 4 to 6 inches (10.2 to 15.2 cm) away. Internal transverse cross members 667 can extend between and be coupled to cross members 666 on the left side 652 and middle 653 of frame 651. Four cross members 667 for example on be on left side 652 of frame 651. One cross member 667 for example can be in the middle section of frame 652. Corner braces 665 can also be included on frame 651, extending from a leg 661 to an end cross member 663 or a front or back cross member 664.

Figure 66:
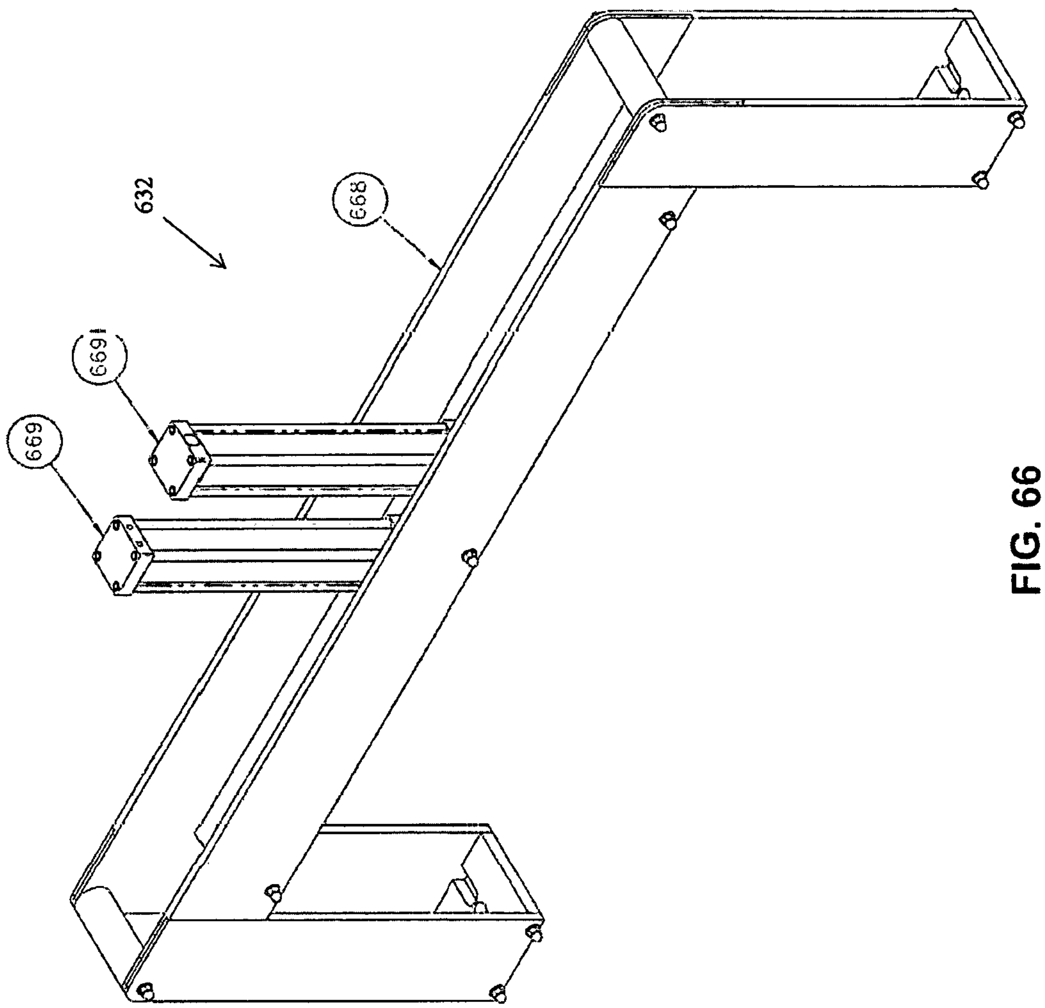

In a preferred embodiment, a frame 651 end side can be about 66 inches (167.6 cm) long. Front and back sides of a frame 651 can be about 110 inches (279.4 cm) long. The distance between left side end cross member 663 and a first cross member 667, can be about 16 inches (40.64 cm). The distance between left side end cross member 663 and a second cross member 667, can be about 24 inches (61 cm). The distance between left side end cross member 663 and a third cross member 667, can be about 30 inches (76.2 cm). The distance between left side end cross member 663 and a fourth cross member 667, can be about 38 inches (96.5 cm). The distance between left side end cross member 663 and a fifth cross member 667, can be about 49 inches (124.5 cm). The distance between where a corner brace 665 is attached to a leg 661 and the top of the frame 651 can be about 16 inches (40.6 cm). Other desired dimensions can also be used for a frame 651 and its parts. FIGS. 66-67 illustrate a heat sealing frame 632, including a frame assembly 668 and air cylinders 669. Frame assembly 668 can include top cross supports 671 that are spaced apart by frame spacers 672, vertical or longitudinal left and right supports 674, 676, bottom brackets 675, and a cylinder bracket 673. Frame assembly 668 can be assembled using thread rods 677, washers 678 and cap nuts 679 as shown in FIG. 67, and in the same or a similar manner as described with regard to frame assembly 351 as shown in FIG. 53.

Referring to FIGS. 63 and 68-69, a spout/tube to top/bottom heat sealing assembly 645 can include an upper heat sealing assembly 633 with a heat seal bar assembly 687 that can be coupled to cylinders 669 with a clevis 689, shaft 688, shaft collar 685, a pair of seal bar position brackets 681, a pair of slotted seal bar position brackets 682, thread rods 690, washers 691 and 692 and nuts 684, as shown in FIGS. 63, 69. Cylinders 669 can raise and lower upper heat sealing assembly 645. Heat seal bar assembly 687 can be a about 16.5 inch (41.91 cm) heat seal bar assembly, for example, as depicted in FIG. 69.

A spout/tube to top/bottom heat sealing assembly 645 can also include a lower heat sealing assembly 638, with a heat seal bar assembly 687, a preferred embodiment of which is shown in exploded view in FIG. 69.

Heat seal bar assembly 687 can include a main body 731, heat insulating pad 732, preferably a single piece heating element 733, and lower bracket support heat strip tension sub-assemblies 734 on each end of main body 731. A heat strip tension sub-assembly 734 can be coupled to a main body end 731. Ends of the heating element 733 can be positioned between heat strip mounting ends 735. A heat strip retaining cap 736 can be positioned at ends of the assembly 687. Preferably retaining cap 736 is reusable, e.g., if heating element 733 needs to be replaced.

An assembly 687 can be coupled together with pins 743, 744, button head socket cap screws 740, and tee nut inserts for wood 748. Springs also are preferably included and positioned through two holes of heat strip sub assembly 584, as shown in FIG. 109, springs 1167, for example. Pin 744 helps prevent rotation from left of right and pin 743 helps provide accurate positioning. Pin 743 centers the parts together and helps keep the parts vertically and horizontally in position.

In various embodiments, a heat strip sub-assembly, e.g., heat strip sub assembly 584, holds tension springs in the two larger holes and keeps tension on heating element 583.

A heat seal bar 687 can also include stand off block 737, washers 738, wire tire wraps 739, button head socket cap screw 742, flat head cap screws 741, pin 743, PTFE coated cloth tape 746 and 747, and tee nut inserts for wood 748, as shown in FIG. 69.

Heat strip tension sub-assembly 734 can be the same as, or similar to, the tension sub-assembly depicted in FIGS. 60, 61, and can be an about 11 inch (27.9 cm) sub-assembly. Heat strip tension sub-assembly 734 can include, for example, a 316 stainless steel shoulder screw 606, tension end caps 607, pivot pegs 608, and a nut 609 not shown. A heat strip tension sub-assembly 734 including springs can be included on both end portions of a main body portion 731 and helps keeps tension on the heating element.

FIGS. 70-71 illustrate a heat sealing frame 639, including a frame assembly 711 and air cylinders 712. Frame assembly 711 can include top cross supports 721 that are spaced apart by frame spacers 722, vertical or longitudinal left and right supports 725, 727, bottom brackets 726, and a cylinder bracket 723. Frame assembly 668 can be assembled, for example, using thread rods 724, washers 728 and nuts 729 as shown in FIG. 71, and in the same or a similar manner as described with regard to frame assembly 351 as shown in FIG. 53.

Referring to FIGS. 63 and 72-23, a top/bottom to body heat sealing assembly 646 can include an upper heat sealing assembly 640, a preferred embodiment of which shown in FIG. 72. Upper heat sealing bar assembly 640 can include a heat seal bar assembly 751 that can be coupled to cylinders 712 with a clevis 757, shaft 758, shaft collar 754, seal bar position brackets 752, slotted seal bar position brackets 753, thread rods 755, washers 759 and 760 and nuts 756, as shown in FIGS. 63, 72. Cylinders 712 can raise and lower heat sealing bar assembly 646.

A spout/tube to top/bottom heat sealing assembly 645 can also include a lower heat sealing assembly 641 including a seal bar assembly 751, a preferred embodiment of which is shown in exploded view in FIG. 73. Lower heat sealing bar assembly 645 can be a about 37.5 inch (95.3 cm) impulse heat sealing bar assembly and can include a main body 761. Main body 761 can include standoff block 762 with double washers 767 and screw 771, which can be a flat head screw with an about ¾ inch (1.9 cm) length. Main body 761 can also include wire tie wraps 763 with screws 772, which can be a flat head screw with an about 3/64 inch (0.0091 cm) length.

Each end of a main body 761 can include a lower bracket support heat strip tension assembly 764, which can be the same or similar to the tension sub-assembly depicted in FIG. 61, and can be an about 11 inch (27.9 cm) sub-assembly. Heat strip tension sub-assembly 761 can include, for example, a 316 stainless steel shoulder screw 606, tension end caps 607, pivot pegs 608, and a nut 609.

A heat strip sub-assembly 764 can be coupled to a main body end with heat strip mounting ends 765, a heat strip retaining cap 766, compression springs 776, tee nut inserts for wood 778, pin 773,774, and screws 770, which can be button head socket cap screws. Preferably a cloth tape 777, e.g., PTFE coated cloth tape, is positioned on top of an angled portion of heat strip mounting end 765 when coupled to main body 761. A heat insulating pad 769 can be placed on top of main body 761. Heating element 768 can be placed on top of heat insulating pad 769 and can have an angled portion that corresponds to the location of the PTFE coated cloth tape 777 on a heat strip mounting end 765. Ends of heating element 768 can be coupled between mounting ends 765 as shown in FIG. 73.

Preferably at least one of the mating heat sealing bar assemblies used in one or more embodiments of a heat sealing machine has a rocking motion during the heat sealing process which helps form a complete and even seal for all fabric layers in a fusion area. A rocking motion can be effected by a pivot yoke axis that enables rotation of a pin along a pin axis as described further herein with regard to FIGS. 134-138. Any given piece of fabric, e.g., polypropylene fabric, can have different densities in different areas of the piece of fabric, and said rocking motion helps achieve equal pressure applied to all areas of the piece of fabric. The rocking motion helps achieve equal pressure being applied to all areas of the fabric piece.

A bracket including a slotted opening e.g., brackets 613, can enable a rocking motion of a seal bar assembly. When a pin or shaft goes through the slotted opening and through the cylinder yoke, the slotted opening allows the assembly to self-adjust on the fabric with multiple layers of fabric that can be uneven. With the rocking motion, even where the fabric is uneven, an equal pressure is applied to all the fabric in the joint area. The rocking motion allows the upper and lower heat sealing assemblies to mate in a perfectly parallel, or almost perfectly parallel fashion.

If equal pressure is not applied, in higher areas of the fabrics hot spots or bright spots or shiny spots can develop during heat sealing, where those higher areas start to melt or the heat starts to damage to the fabric. If each positioning bar had a circular opening similar to that of positioning brackets 682, which is preferably sized to receive a shaft 688, for example, but to allow little or no movement of shaft 688 during heat sealing, when the heat seal bar came down at different levels it would bind up and hit the surface unevenly and would not rock and self-adjust or self-align. With the slotted opening, as an angle increases when coming down on a mismatched area, the slotted bar allows for the rocking and self-adjusted so binding up of the seal bar does not occur.

In the embodiments of heat sealing assemblies as shown in the drawings, the upper heat sealing assemblies have a rocking motion, while the mating lower heat sealing assemblies do not have a rocking motion and remain stationary.

In a preferred embodiment the heating bar has two pivot points. A first pivot point can preferably be set to no rocking, e.g., wherein the pivot point holds the seal bar in a substantially horizontal fixed position. A second pivot point preferably includes a slot which enables the desired rocking motion and rotation of the pin at the first pivot point that is set to no rocking and holds the seal bar in the fixed horizontal location.

A sealing bar that can be used in one or more embodiments of the present invention also preferably has reusable end caps, e.g., end caps 586 and 736 as shown in FIGS. 60, 69. A sealing bar can stamp down within about five thousands of an inch thick (2.54 cm). The end cap feature of the present invention has a valve pin and cuts cost by about 75% given that it can be reused, and is much more reliable.

Preferably one or more embodiments of a heat sealing machine that can be utilized in the present invention can control temperature, length of heating and pressure applied in a heat sealing or fusion area. Preferably a heat sealing machine also has at least a double sensor fail safe. A first sensor can monitor temperature, pressure and time. A second sensor can monitor the first sensor.

The use of impulse heating helps to prevent crystallization of the fabric. The temperature is preferably held within a desired range, e.g., about a 5 degree range, or a about 5 to 10 degree range. If the temperature varies more than the desired range, e.g., more than about 10 degrees, the machine can be set to automatically shut off Δn acceptable range for the temperature during heat sealing a joint can be programmed for a given machine, and if the temperature moves outside of the acceptable range the machine can be set to automatically shut off. For a heat sealing machine that seals more than one joint, the machine can be set to include parameters for temperature, time and pressure for heat sealing one particular joint, and can be set to include different, or the same, parameters for temperature, time, and pressure for heat sealing another joint. Having different parameters for different bag joints may be desired given the size of the joint area, the number of layers in the joint area, and/or if fabric pieces of one joint area have different densities than fabric pieces of another joint area.

Preferably the amount of time a heat seal bar or heat seal bar assembly is held over a heat fusion area for a spout to top, top to body, body to bottom or bottom to tube joint is long enough to heat through 8 layers of fabric, e.g., per the gusseting and 2-dimensional folded configurations previously described, without damaging the fabric itself. The time can be held per preferred testing values, so that a machine can heat seal area through each fabric area in the fusion area, e.g., 8 layers of fabric, at one time.

A heat sealing bar or heat sealing bar assembly that can be used in one or more embodiments of a heat sealing machine preferably are sized to extend a distance beyond the desired fusion area, e.g., a heat sealing bar can extend about ½ to 2½ inches (1.27 to 6.35 cm) on either side of a fusion area. This enables formation of non-graspable edge to the joints so that the fabric near the joint edge cannot be pulled or caught on something, wherein no fabric is left unsealed that could be grasped and pulled. The heat sealing bar extending beyond the fusion area can also ensure no leakage at the joint and an airtight seal. Note in one or more preferred embodiments when a fusion area includes a standard fabric coating and a bonding coating, because the fusion coating is only in contact with standard coating in the fusion area, even when the heat seal bar extends beyond the fusion area, the joint formed does not extend pass the desired fusion area given that beyond the fusion area only standard to standard coatings are in contact when under the heat seal bar.

Preferably each joint formed in a stitchless bag 50 is in a shear direction when a bag 50 is standing upright and ready to be filled, or is filled with bulk material. Preferably, fabric to be joined via heat sealing has a standard industry fabric coating in contact with a standard industry fabric coating in areas that extend beyond a desired seal or fusion area, and the heat bar can extend beyond the seal area to ensure no leakage and provide non-graspable edges of a heat sealed joint.

In one or more embodiments a triangular shaped edge can also be formed on a bag 50, e.g., at corners of the bag when upright, that will also help prevent leakage (see, e.g., FIG. 14).

For example, in one or more embodiments, the top and bottom portions of a bag can be sized so that when coupled to the bag body a portion of the top and bottom will extend a distance beyond the bag body on each side of the bag body, and this portion that extends beyond the bag body can be a generally triangular shape given the gusseted and folded position of the bag bottom and top portions (see FIG. 14, area 47). This configuration can help ensure a nongraspable edge on all sides of the bag joint.

FIGS. 74-84 illustrate an embodiment of loop impulse heat sealer machinery that can be used in one or more embodiments of the method of the present invention, e.g., when heat sealing a lift loop patch or panel 59 with loops 60 thereon to stitchless bag 50. As previously discussed lift loops 60 can be sewn to a piece of fabric or patch 59, wherein this can be the only sewing on the entire bag 50, and with no stitch holes penetrating a containment area of a bag 50. Alternatively, loops 60 can be heat fused or heat sealed to a piece of fabric or patch 59, or heat fused or sealed to the bag 50 itself. Patch 59 can be sealed to the bag 50 with a heat sealing bar. A lift loop 60 coupled to a patch 59 can form a lift loop assembly 56. Preferably loops 60 are configured so as to not be perfectly parallel when coupled to a patch 59. Preferably patch 59 is folded at a center position 85, at a location between ends of a loop 60 and positioned on a corner of bag 50 in folded gusseted form, preferably like an envelope, at a fold 85 (see FIG. 21). Referring to FIG. 22C showing a bag body portion in gusseted formation, a folded patch 59 can be positioned on bag body 53 while in folded/gusseted form wherein fold 85 of patch 59 can be placed at an edge 414, 415, 416, or 417 with one portion of the folded patch 59 extending along a gusseted fold of the bag 53, and with the other portion of the folded patch 59 extending either along a top or bottom surface of bag body 53. After heat sealing the patch 59 to a bag body 53, the patches can be located on a bulk bag as shown in an open configuration in FIGS. 21, 23. Preferably a bottom surface of patch 59 includes a fusion/bonding coating 191 and can be heat sealed to body 53 exterior surface 135 when body 53 has a standard coating 192 or a fusion/bonding coating 191 thereon. Alternatively, patch 59 can include a standard coating on a bottom surface when body 53 includes a fusion coating 191.

In FIG. 74, an embodiment of impulse loop heat sealer 780 is shown. Loop heat sealer 780 can include a table assembly 781 and loop heat sealing assembly 782. Loop heat sealing assembly 782 can be coupled to table assembly 781 with heat sealing frame 821, lower bracket support 788 and nuts 791, washers 789, 793 and screws 790, 794 as shown in FIG. 74.

Loop heat sealing assembly 782, can include left and right heat sealer assemblies 795 and 796. Left heat sealer assembly 795 can include left upper heat sealer subassembly 785 and mating left lower heat sealer subassembly 786. Left lower heat sealer subassembly 786 can be positioned below opening 809. Left upper heat sealer assembly 785 can be positioned above opening 809. Right heat sealer assembly 796 can include right upper heat sealer subassembly 783 and mating right lower heat sealer subassembly 787. Right lower heat sealer subassembly 787 can be positioned below opening 810. Right upper heat sealer assembly 783 can be positioned above opening 810.

FIGS. 75-75D and 76-76D illustrate table assembly 782, which can include a table frame 801 having legs 811, each of which can have a base pad 812. Table assembly 782 can have a table top 808 including a left side 802 which can include loop heat sealing assembly 782, and openings 809 and 810. Table top 808 can also a right side 803, and a splice plate 804, screws 805, washers 806, and nuts 807.

Table frame 801 can have transverse end cross members 813 coupled to front and back cross members 814*a* along an outer perimeter of the table frame 801. Additional internal front and back cross members 814*b* can be included on an interior side of front and back cross members 814*a*. Cross members 814*b* can also be coupled to end cross members 813 and spaced a distance away from front and back cross members 814*a*, e.g., about 4 to 6 inches (10.2 to 15.2 cm) away. Internal transverse cross members 816 can also be included and extend between and be coupled to cross members 814*b* on the left side 802 of frame 801. Corner braces 815 can also be included on frame 801, extending from a leg 811 to an end cross member 813 or from a leg 811 to a front or back cross member 814*a*.

In a preferred embodiment, a frame 801 end side can be about 66 inches (167.64 cm) long. Front and back sides of a frame 651 can be about 84 inches (213.4 cm) long. The distance between a right side end cross member 813 and a first cross member 816, can be about 42 inches (106.7 cm). The distance between a right side end cross member 813 and a second cross member 816, can be about 66 inches (167.6 cm). The distance between where a corner brace 665 is attached to a leg 811 and the top of the frame 801 can be about 16 inches (40.6 cm). Other desired dimensions can also be used for a frame 801 and its parts.

FIGS. 77-78 illustrate a heat sealing frame 821, including a frame assembly 829 and air or pneumatic cylinders 823. Frame assembly 829 can include top cross supports 831 that are spaced apart by frame spacers 832, vertical or longitudinal left and right supports 834, 835, bottom brackets 836, and a cylinder combined bracket 833. Frame assembly 668 can be assembled using thread rods 837, washers 838 and cap nuts 839 as shown in FIG. 67, and in the same or a similar manner as described with regard to frame assembly 351 as shown in FIG. 53.

Two pairs of cylinders 823 can be provided. Each pair of cylinders 823 can be coupled to cylinder mount 822 using hex head screws 828, washers 825, nut 827, flat head socket screws 824, for example. The pairs of cylinders 823 can be coupled to cylinder bracket 833 of frame assembly 829.

Referring to FIGS. 74 and 79-84, a loop heat sealing assembly 782, can include left 795 and right 796 heat sealer assemblies. A right heat sealer assembly 796 can include an upper heat sealing subassembly 783, which can include a left heat seal bar assembly 841 that can be coupled to cylinders 823 with devises 856, shafts 858, shaft collars 849, upper right bracket 845, upper left bracket 846, lower brackets 842, lower mount brackets 843, 844 thread rods 851, 859, socket head cap screw 848, shafts 850, cap nuts 853, cap nuts 857, flat washers 847, flat washers 854, flat washers 860, and nuts 684. A right pair of cylinders 823 can raise and lower right upper heat sealing assembly 796.

Right lower heat sealer subassembly 787 can also include left heat seal bar assembly 841 and brackets 797 as shown in FIG. 74.

An embodiment of a left heat seal bar assembly 841 that can be used with right heat sealer assembly 796 is shown in FIG. 80. A left heat seal bar assembly 841 can be used with both the right upper 783 and lower 783 heat sealing assemblies. Left heat seal bar assembly 841 is used in the right heat sealing assembly 796 based on the orientation of the left heat seal bar assembly 841 on loop heat sealer 780.

A left heat seal bar assembly 841 as shown in FIG. 80 can include a seal bar assembly 861 that can include more than one seal bar assembly, e.g., seal bar assemblies 883, 884, 885, 886. Seal bar assemblies 883 and 884 are shown in exploded view in FIG. 80. Seal bar assemblies 885 and 886 can be of similar construction to seal bar assembly 883.

As shown in FIG. 80, seal bar assemblies 883, 884, 885 and 886 can all comprise a similar structure, with the same or similar component parts, but assembly 884 can have a shorter length than assemblies 883, 885 and 886. When heat sealing a lift loop assembly 56 with a lift loop 60 already coupled to a patch 59, a first lift loop assembly can be positioned on a right side of a gusseted body portion 53, between right upper 383 and lower 387 heat sealing assemblies so that when the first lift loop assembly 56 is folded as shown in FIG. 21 and positioned on a gusseted bag body as described with regard to FIG. 22C at a fold 416, a lift loop leg on a top of the patch 59 is in the opening or space 887 between assemblies 883 and 885. A lift loop leg on the lower portion of the folded patch in the gusseted area of body 53 can also be positioned under the upper lift loop leg an under the opening or space 887 of left seal bar assembly 841. Similarly lift loop legs on a second lower patch 56 positioned on a right side of bag body 53 at fold 417 can be positioned under the space or opening 887. In other embodiments, loop heat seal bar assemblies could be manufactured as a single assembly, instead of with separate seal bar assemblies 883, 884, 885 and 886. In other embodiments, a loop seal bar assembly can comprise any desired shape. In other embodiments a loop seal bar assembly could be without a space 887, e.g., if a lift loop material would not be damaged by the heat of a heat seal bar.

A heat seal bar assembly 883, 884, 885 and/or 886 can have the same or similar structure as a heat seal bar assembly shown and described with regard to FIGS. 59-61, 68, 69, 72 and/or 73. One or more water cooling lines can extend through aligned openings of the seal bar assemblies 883, 884, 885, 886 (e.g., see FIGS. 74, 107). Heat strip tension sub-assembly 734 can be the same as the tension sub-assembly depicted in FIG. 61, and can be an 11 inch (27.9 cm) sub-assembly. Heat strip tension sub-assembly 734 can include, for example, a 316 stainless steel shoulder screw 606, tension end caps 607, pivot pegs 608, and a nut 609. A heat strip tension sub-assembly 734 can be included on both end portions of a main body portion 731. Guides on a machine as shown in the figures are preferably not perfectly parallel, preferably with about a ⅝ inch (1.59 cm) difference. If kept perfectly parallel, burnt edges can result on a bag 50. Preferably a fusion coating, e.g., a fusion coating 191, is on the bottom side of patch 59 to fuse with a standard coating on exterior surface 135 of the bag body 53. In this machinery, the heat sealing bar preferably has a four way rock, because the machine is sealing more square inches (cm) than anywhere else on a bag 50. Lift loops are preferably in shear position and can lift very heavy weights, e.g. about 500 to 5000 lbs (226.8 to 2,268 kilograms) of bulk material. In testing, the lift loops secured in this manner to a bag 50 have been able to lift an RV (Recreation Vehicle camper).

Regarding FIGS. 81-84, FIG. 81 is an exploded perspective view of a left-hand upper heating head sub-assembly of a loop impulse heat sealing bar. FIG. 82 is an exploded perspective view of a right hand assembly of a loop impulse heat sealing bar. FIG. 83 is an exploded perspective view of a left hand assembly of a loop impulse heat sealing bar, and FIG. 84 is an exploded perspective view of a left handed sub-assembly of a loop impulse heat sealing bar. The assemblies as shown can be constructed and function in a similar way to other loop seal bar assemblies described and shown herein.

FIGS. 85-96 illustrate cutter, gusseting pressing machinery that can be used in various embodiments of the method of the present invention, for automated cutting of fabric portions, automated gusseting or folding of a bag portion, and automated pressing of a gusseted bag portion. A Cutter/Gusseting/Press assembly can include a cutter portion that holds a spool of fabric, e.g., highly oriented polypropylene fabric, which can be cut to form a body 53 of a bag 50 or 700, for example. The fabric is preferably in a tubular shape, and when cut, has open end areas. The fabric can be provided with two sealed portions so that it forms a tubular shape, or can be a continuous tubular fabric. Preferably the fabric is kept in a flat position at all times during the gusseting process. The cutter portion can have an edge controller wherein a tray is moveable to keep the fabric in the same position at all times. The cutter portion preferably pulls the fabric tight/taut before making a cut to help ensure the fabric is cut at desired dimensions. The cutter portion preferably can feed the cut fabric to the gusseting portion of the assembly. LED lights and software on the cutter portion can help measure the fabric cut area, e.g., within about ⅛ inch (0.32 cm) of a desired size. The LED lights and software on the cutter portion can also be in communication with the gusseting portion.

After a fabric portion is fed to the gusseting portion, two more seals can be made in the fabric. A novel feature of the machine includes a hinge without a bolt, wherein it pivots on an infinite center point (a zero point pivot). After additional seals are made, gussets in the body can be formed manually or automated, wherein the two newly sealed areas are pulled internally towards the center, e.g. sides 163, 164 of body 53.

The fabric is then preferably fed through a portion of the gusseting machine that is bifurcated (has double motion) to push the fabric materials to center and line them up, the fabric can go through a rolling motion, which is an important novel feature because such a rolling motion helps ensures the gussets in the fabric line up perfectly without touching. Without the rolling motion, the fabric would not line up perfectly, and misplacements or touching of the gussets of the interior surfaces of gusseted portions could occur, which can result in formation of unwanted seals during the heat sealing process.

After gussets are lined up, preferably fabric and gussets are pressed to lie flat by the press part of the machinery.

FIGS. 85-91 illustrate a gusseting assembly that can be part of gusseting machinery. FIG. 85 illustrates an overall view of a gusseting assembly 940 FIG. 86 depicts a gusseting frame assembly. FIG. 87 depicts a gusseting upper creasing sub-assembly. FIG. 88 depicts a gusseting upper vertical platform sub-assembly. FIG. 89 depicts a gusseting upper creasing bar sub-assembly. FIG. 90 illustrates a gusseting lower creasing bar sub-assembly. FIG. 91 illustrates a gusseting lower vertical platform sub-assembly. FIG. 92 illustrates a gusseting lower creasing bar sub-assembly. Parts and materials, including example materials and dimensions, that can be included in the assemblies as shown in FIGS. 85-91 are set out in the Parts List herein.

FIG. 93 depicts an internal creasing press mounting assembly. FIG. 94 depicts an internal creasing press assembly 1074. FIG. 95 illustrates an internal creasing press A sub-assembly 1081. FIG. 96 illustrates an internal creasing press B sub-assembly 1082. Parts and materials, including example materials and dimensions, that can be included in the assemblies as shown in FIGS. 93-96 are set out in the Parts List herein.

Additional machinery that can be used in the method of the present invention are top/bottom die press machinery, which can cut the bottom and top fabric portions of the bag. Preferably the top and bottom are die cut for extreme accuracy, e.g., within about 1/16 of an inch (0.16 cm) of accuracy.

Top/bottom portion gusseting machines may also be provided. Preferably the top and bottom of the bag fabric portions comprise the same dimensions. Gussets in top and bottom portions can be manually folded, or folded via machinery and then brought to other heat sealing machinery, either manually or by a conveyor for example, to form joints with a body and or fill or discharge tube.

Preferably the method includes a final quality check step, wherein a stitchless bag 50 is checked for any burn marks, which can be indicative of fabric damage; for proper tape configuration; that all joints have an air tight seal, and that there are no lips.

In various embodiments different machines can be provided to make bags of varying widths. Preferably the length of a bag at any given width can be adjusted with use of any given machine.

Preferably a stitchless bag of the present invention is food safe without any sifting holes.

Preferably a stitchless bag of the present invention eliminates the need for a liner within the bag, e.g., a polyethylene liner.

One or more preferred embodiments of the method of the present invention enable minimal amounts of fabric to create a bag 50 because it does not requiring extra fabric to form a seam as is done in sewn bags. The joint formation also does not involve folding over of fabric, e.g. from a front side over an edge to a back side, to form a joint area, which reduces use of fabric as well.

Turning now to FIGS. 97-129, a preferred embodiment of an intermediate stage bulk bag heat sealed closed loop production line system and method is illustrated. The figures illustrate a preferred embodiment of a novel FIBC or bulk bag automated manufacturing system that includes a continuous sequential closed loop flow of product for production of a non-sewn FIBC bag with heat sealed joints.

As part of the system and method, first fabric pieces for respective bag portions, e.g., fabric pieces for a fill tube, top, body, bottom and discharge tube, are prepared in substantially flat, folded (2-D) construction, which in turn allows for automation and precision (e.g., within =/− about 1/16 inch (0.16 cm)) in the FIBC manufacturing.

The automated system enables production of bulk bags with no manufacturing equipment/tools being inside the bag, or on interior surfaces of the bag, during manufacturing.

Heat sealing machinery preferably includes two and three axes impulse heat sealing heads which allow full self-alignment and full self-adjusting during the heat sealing process.

Preferably single piece heating elements are utilized which have lower costs and lower maintenance change-over time.

Preferably dual fail-safe sensor controls are provided over the set temperature points, which provides another quality check.

A multiple purpose carrier tray system is preferably used for (a) parts assembly, (b) tooling set-up and (c) quality checks of parts during assembly.

In the embodiment as illustrated in FIGS. 97-129, during the manufacturing process, the FIBC bag as it is being manufactured never has to leave the carrier plate that it is attached to, which insures a high degree of parts placement control. In FIGS. 97-129, a machine 300 is used to form 5 bag joints at one time. A machine 400 is also used to heat seal lift loop patches and other bag joints. In other assembly line embodiments for heat sealing a bag, heat sealing machines of other configurations for heat sealing one or two or three or four or five or more bag joints at a particular heat sealing station can be included. For example, one or machine assemblies as discussed with regard to FIGS. 49-96 could also be included in an assembly line. Or one or more different machines can be included with one or more heat sealing assemblies to enable heat sealing any desired bag joints or parts at a single heat sealing station. FIGS. 97 and 98 illustrate an overall view of a closed loop production line system and method that can be used to produce an automated heat sealed bulk bag 700, including bag parts or portions (e.g. highly oriented polypropylene gusseted fabric bag portions and/or parts such as document pouches, or bag portions of other fabric material) as shown in FIGS. 113-114, for example. Individual parts that will be used to manufacture a bag 700 can be stored on a cart 450, e.g., which can be a main body cart for holding fabric portions that will form the bag body. Cart 450 as shown in FIGS. 97 and 111, for example, can include a platform 451, e.g., a U-Boat truck platform, a parts platform 452, a document pouch holder 453, and a plurality of parts cage rods 454. The cart 450 preferably is designed to exacting dimensions to hold a full day's production of bag fabric pieces or parts in repeatable accurate positioning. The cage rods 454 preferably are spaced on the parts platform 452 so that a plurality of folded and flattened bag pieces can fit within and/or between respective cage rods 454 as shown in FIG. 97, for example.

FIGS. 97 and 111 illustrate an embodiment of how substantially flattened and folded or gusseted main bag body fabric parts can be arranged on a cart 54. As illustrated, one or more bottom 52 fabric portions, one or more discharge tube 58 fabric portions, one or more body 53 fabric portions, one or more fill tube 57 fabric portions, and one or more top 51 fabric portions can be arranged on the parts platform 452 within certain of the respective cage rods 454 and between certain respective cage rods 454. Cart 450 can also accommodate a document pouch 73 and warning label portions 74.

Preferably the folded bag portions on a cart 450 are pre-marked to designate overlap locations or specifications to help assemble a bag on a carrier plate 200 with overlapped locations for forming fusion areas or other heat sealing areas on a bulk bag. For example, a discharge tube 58 can have a mark at the desired width of the overlap area of discharge tube 58 and bottom 52. Bottom 52 likewise can have a mark to designate the desired overlap area for the fusion joint area to be formed with discharge tube 58 and bottom 52. Similarly a bag body 53 can have a mark to designate where it should overlap with a top 51 and a mark to designate where it should overlap with a bottom 52. Body 53 can also have one or more marks to designate where a document pouch 73 should be placed on body 53. Body 53 can also have one or more marks to designate how and/or where lift loop assemblies 56 and a diaper or cover 61 should be positioned on the body 53 while on a carrier plate 200.

In other embodiments lasers as part of the machinery can be utilized to designate how bag portions should be assembled, either alone or also in conjunction with markings on the bag portions. Other suitable means known in the art can also be used to help designate overlap areas or joint areas between bag fabric portions and other bag parts.

In various embodiments, more than one carrier plate 200 can be provided as part of the method, e.g., 2, 3, 4, 5, 6, 7, 8, 9, 10, and/or more carrier plates 200 provided so that more than one bag can be assembled and heat sealed in sequence.

Preferably a cart 450 is designed to be unloaded from any side. Preferably at least one or more of the folded and gusseted bag fabric portions on the cart 450 include a coated side with a bonding coating so that when fusion areas are formed on the carrier plate, as discussed further below, at least one of the fabric pieces in at least one fusion area has a bonding coating. The other fabric piece in the said fusion area can have either a bonding coating or a standard fabric laminate coating.

In some embodiments, a bag can be formed with only one heat fused joint.

In other embodiments, a bag can be formed with more than one heat fused joint.

In preferred embodiments, a bag is formed with all heat fused joints, at least in a containment area of the bag.

In some embodiments, a first station in an automated production line can be form forming one heat fused joint for a bag.

In other embodiments, a first station in an automated production line can be for forming more than one heat fused joint.

In preferred embodiments, a first step in an automated production line can be for forming at least 4 heat sealed main bag body joints at one time.

In FIG. 97, a first station in the assembly includes forming 4 main bag body heat sealed joints, and also a fifth joint for a document pouch.

In other embodiments, cage rods 454 could also be arranged differently to accommodate other desired arrangements or sequence of the bag fabric pieces. Preferably such a cart 450 will hold all the bag fabric pieces that will be heat-sealed by the respective heat sealing machine in the sequence of the automation process for at least a day's work.

The bag fabric pieces held on cart 450 can be assembled by an operator on a carrier plate 200, which is shown on top of a main body assembly table 250 in FIGS. 97 and 98. A carrier plate 200 preferably is made from one solid sheet (e.g., one solid sheet of aluminum or other metal or plastic material for example). Being made from one solid sheet helps insure precise milling and accuracy for the quality check functions it provides. A carrier plate 1300 as shown in FIGS. 142A-146 can also be used in a heat sealing system as shown as in FIGS. 97 and 98. Additional carrier plate embodiments can be manufactured for use with bag parts assembly and heat sealing machinery, for example, as shown in FIGS. 49-84.

Referring to FIGS. 103A and 103B, and 142A-146 a carrier plate 200 or 1300 is preferably precision milled within =/– about 0.01 inch (0.0254 cm).

As mentioned earlier, a carrier plate 200 or 1300 can serve as a (a) precision parts assembly platform, (b) tooling plate for machine set-up and (c) material quality check during assembly. A carrier plate can be constructed based on desired bag dimensions, and desired bag portion or parts assembly. A heat sealing machine can be constructed based on the carrier plate dimensions. A carrier plate 1300, including example dimensions in FIGS. 42A-146 can be used for assembling a 37×45-60 inch (114.3-152.4 cm) bulk bag.

A carrier plate 200 can include spout guides 201 which can provide a quality check function; tooling location points 202 which can provide a quality check function; holding clamps 203; body guides or stiffening support 204 which can serve a quality check function; and top/bottom guides 205, which can serve a quality check function. Body guides or stiffening support 204 can be the side edges of the carrier plate Preferably a carrier plate 200 includes three spout guides 201 for guiding placement of a fill spout 57 on a second end 255 of the carrier plate 200 and three spout guides 201 for aiding in placement of a discharge tube 58 at a first end 254 of the carrier plate 200. To guide proper placement of a fill tube 57 fabric portion on carrier plate 200, one spout guide 201 is preferably positioned laterally at second end 255 of the carrier plate 200 and two other spaced apart spout guides 201 are preferably positioned longitudinally on the carrier plate a distance away from the laterally positioned spout guide 201 at second end 255. An operator can place a fill tube 57 fabric piece on the carrier table so that upper portion 110 of the fill spout 57 makes contact with the lateral spout guide 201 at the second end 255 of carrier plate 200 and so that respective sides of the folded and gusseted fill spout 57 make contact with the respective longitudinal spout guides 201 at second end 255.

Likewise, for guiding the proper placement of a discharge tube 58 on carrier plate 200 one spout guide 201 is preferably positioned laterally at a first end 254 of carrier plate 200 and two other spaced apart spout guides 201 are preferably positioned longitudinally on the carrier plate 200 a distance away from the laterally positioned spout guide on first end portion 254. An operator can place a discharge tube fabric piece on the carrier plate 200 so that bottom portion 109 of the discharge tube 58 makes contact with the lateral spout guide 201 on the first end 454 and so that respective sides of the folded/gusseted discharge tube 58 make contact with respective longitudinal spout guides 201 on the first end 254.

Preferably the longitudinally placed spout guides 201 are spaced a distance away from one another on the carrier plate 200 to match the selected width of a discharge tube 58 and fill tube 57 for a bulk bag 700 that will be produced. In this manner the spout guides 201 act as a quality check for the fabric pieces and can provide an indication as to whether the fill and discharge tube fabric pieces are the proper dimensions for the bulk bag 700 to be manufactured. If the fill and discharge tubes do not make contact with the spout guides or if a width of the fill and discharge tubes extend beyond the spout guides 201, then this provides information as to whether the fabric pieces are under or oversized and whether they should be utilized in making the bulk bag 700.

The laterally placed spout guides 201 also provide a quality control function. The carrier plate 200 is preferably designed to hold an assembled bulk bag prior to heat sealing wherein the bag fabric pieces can be positioned on the carrier plate 200 and the overlapped desired fusion areas for the bag joints can be formed. If an operator positions the fill spout 57 and discharge tube 58 so that the bottom portion 109 of the discharge tube 58 is in contact with the lateral spout guide 201 at first end 254 and so that upper portion 110 of the fill tube 57 is in contact with the lateral spout guide 201 at second end 255, this helps ensures that the desired overlap locations, or fusion areas for bag joints will be properly aligned.

Top and bottom fabric portions guides 205 are also preferably provided on the carrier plate 200. Guides 205 on first end portion 254 of carrier plate 200 preferably are spaced away from each other and positioned on carrier plate 200 at an angle to match the narrow triangular shape and width of a bottom portion 52 in folded or gusseted form. An operator can position a bottom 52 end portion 103 between the guides 205 on first end portion 254 of carrier plate 200, with the respective sides of the bottom portion fabric piece making contact with the guides 205. Guides 205 on second end portion 255 of carrier plate 200 preferably are spaced away from each other and positioned at an angle to match the shape and width of the narrow triangular shape of top portion 51 in folded or gusseted form. An operator can position the narrow triangular portion 101 of a folded top 51 between the guides 205 on second end portion 255, with the respective sides of the top portion fabric piece making contact with the guides 205.

Guides 205 also provide quality check functions for the bottom 52 and top 51 fabric pieces. The guides 205 are preferably placed on the carrier plate 200 to match the width of the folded top and/or bottom triangular form starting at the narrow end of the folded triangular form. The guides 205 are also preferably positioned on the carrier plate 200 to guide the formation of fusion area 68 between the discharge tube 58 and bottom 52, and to guide formation of fusion area 65 between the fill spout 57 and top 51.

Preferably when the discharge tube 58 is positioned so that bottom portion 109 is in contact with the lateral spout guide 201 on first end 254 of carrier plate 200 and bottom 52 is positioned so that the narrow triangular portion 103 of the folded bottom 52 is in contact with the top most portion of the bottom guides 205, upper portion 177 of folded discharge tube 58 can be positioned through opening 78 of folded bottom 52. The carrier plate 200 guides 201 and 205 can help define the overlapped area between a fill spout and top, and between a discharge tube and bottom. When a top and fill spout of selected dimensions are positioned on the carrier plate between the respective guides, an overlap area will form and the overlap area that forms can be checked based on additional markings or lasers provided that can also designate desired dimensions of the overlap areas.

In a similar way, preferably when the fill spout 57 is positioned so that upper portion 110 is in contact with the lateral spout guide 201 on second end 255 of carrier plate 200 and top 51 is positioned so that the narrow triangular portion of the folded top 51 in contact with the top most portion of the top guides 205, lower portion 111 of folded fill spout 57 can be positioned through opening 76 of folded top 51. The carrier plate 200 guides 201 and 205 can help define the overlapped area between a fill spout and top, and between a discharge tube and bottom. When a top and fill spout of selected dimensions are positioned on the carrier plate between the respective guides, an overlap area will form and the overlap area that forms can be checked based on additional markings or lasers provided that can also designate desired dimensions of the overlap areas.

Body guides or stiffening support 204, can be sides of the carrier plate. An operator can position a body portion 53 between body guides or stiffening support 204 and center body portion 53 between top 51 and bottom 52 positioned on the carrier plate 200. The distance between body guides or stiffening support 204 preferable corresponds to the width of a body portion 53 to be included in bag 700. Body guides or stiffening support 204 also therefore provide a quality check function for the dimensions of a body portion 53 to be part of a bag 700.

Body portion 53 can also potentially be centered on carrier plate 200 between tooling locations 202 at the first 254 and second 255 ends of carrier plate 200. Upper portion 161 of body 53 can be placed at or about tooling location 202 on the second end 255 of carrier plate 200, and lower portion 162 of the folded body portion 53 can be place at or about the tooling location 202 on the carrier plate 200. The distance between the tooling locations 202 can be sized to correspond to a length of body portion 53 to be used in a bag 700. Tooling locations 202 thus can also serve a quality control function for a bag 700 and body portion 53. Tooling locations 202 can also also utilized to position the carrier plate in heat sealing machinery as discussed further herein. To form a fusion area 66, upper portion 161 of folded body 53 on carrier plate 200 can be placed within lower portion opening 102 of top 51. Alternatively, or in conjunction carrier plate guides, marks on the fabric portions and/or use of lasers can help guide the formation of desired overlap areas.

To form a fusion area 67 lower portion 162 of body 53 can be placed through open wider portion 104 of bottom 52 while on carrier plate 200 to form an overlapped fusion area 67. Alternatively, or in conjunction with body guides, marks on the fabric portions and/or use of lasers can help guide the formation of desired overlap areas.

Preferably one or more holding clamps 203 are provided on the carrier plate to help securely hold one or more of the bag fabric pieces or other parts in place on the carrier plate 200 after aligning the respective bag pieces or parts with respective tooling 202 or guides 201, 204, or 205, or markings or lasers. This important to help ensure fusion areas of the bag are properly aligned in heat sealing machine.

A document pouch 73 and label 74 can also be positioned on the body portion 53 while on carrier plate 200. Document pouch 73 and label 74 can be held in place during assembly via fabric tape for example, or with other known suitable means.

Carrier plate 200 preferably has openings at least in the fusion areas 65, 66, 67 and 68 so that when placed in a heat sealing machine, e.g., in machine 300, upper and lower mating heat seal bars can come into contact with top and bottom surfaces of the respective heat fusion areas 65, 66, 67, 68. Carrier plate 200 also preferably has openings that correspond to designated lift loop assembly 56 locations for a bag and a diaper or cover 61 location for a bag, so that when a bag including lift loop assemblies 56 and a bottom cover or diaper 61 assembled thereon is moved into a heat sealing machine 400, for example, as discussed further herein, respective upper and lower mating heating sealing bars can come into contact with a lift loop assembly upper surface and a lift assembly bottom surface, and with a diaper upper and bottom surfaces and form a heat sealed joint in the designated connection areas for the lift loop assemblies 56 and diaper 61.

In addition to use of clamps 203 to hold the fabric pieces in position on the carrier plate, tape can also be used to temporarily couple one or more, or all, of the fabric pieces and bag parts in appropriate position, e.g., for a document pouch 76 or lift loop assembly 56.

After assembling the bag fabric pieces on a carrier plate 200, the assembled bag pieces, while still clamped onto carrier plate 200 can be moved into position in an impulse heat sealing machine, e.g., in main body impulse sealer machine 300 (see FIGS. 99-100). Tooling 202 can be used to help position carrier plate 200 with the bag fabric pieces thereon in machine 300 so that respective heat sealing bars 301, 302, 304, 306 are aligned above the respective fusion areas 66, 67, 68 and 69, and so that document pouch heat sealing bar 303 is above the document pouch 73. Preferably a sensor is provided on machine 300 which can detect when the carrier plate is in proper position, e.g., per tooling 202 on the carrier plate 200. Center and/or end stops can also be used to help make sure carrier plate 200 is in proper position. Once carrier plate 200 is in position, the cycle of machine 300 can be initiated at a control panel 600, e.g., by an operator.

One or more stops can be provided on a machine 300, e.g., a center stop to aid in properly aligning a carrier plate 200 in the machine 300. Preferably a safety feature will be included, e.g., programmed by a control program 600, wherein a sensor can sense when the carrier plate 200 is properly aligned, and wherein a heating cycle will not be able to start until a carrier plate 200 is properly aligned in the machine 300.

As shown in FIGS. 99 and 100 preferably machine 300 has a frame or mounting table 305 and five heat sealing systems. Heat sealing system 331 preferably includes upper fill spout heat seal bar 301 and lower fill spout heat seal bar 322 and is preferably positioned in machine 300 so that it can heat seal fusion area 65 of overlapped fill spout 57 and top 51 fabric portions while positioned on carrier plate 200. Heat seal system 332 preferably includes upper top heat seal bar 302 and lower top heat seal bar 321 and is preferably positioned in machine 300 so that it can heat seal fusion area 66 of overlapped top 51 and body 53 fabric portions while positioned on carrier plate 200. Heat seal system 334 preferably includes upper bottom heat seal bar 304 and lower bottom heat seal bar 318 and is preferably positioned in machine 300 so that it can heat seal fusion area 67 of overlapped body 53 and bottom 52 fabric portions while positioned on carrier plate 200. Heat seal system 336 preferably includes upper discharge spout seal bar 306 and lower discharge spout seal bar 317 and is preferably positioned in machine 300 so that it can heat seal fusion area 68 of overlapped bottom 52 and discharge tube 58 fabric portions while positioned on carrier plate 200. Heat seal system 334 preferably includes an upper document pouch sealing bar 304 an is positioned in machine 300 so that it can heat seal document pouch 73 on body portion 53, while on the carrier plate 200.

Preferably mounting table 305 has openings 341, 342, 343, 344, 346 that correspond to locations of the heat sealing systems 331, 332, 333, 334, 336 so that the respective heat sealing bars can come into contact with bottom and upper surfaces of the fusion areas 65, 66, 67, and 68 when the respective heat seal bars are lowered into position.

Preferably each of the heat sealing systems 331, 332, 334 and 336 have upper and lower mating heat sealing bars. Document pouch sealing bar 304 can have only an upper heat sealing bar. After a cycle is initiated at a control panel 601, the five upper heat seal bars 301, 302, 303, 304, and 306 are pushed downward by respective pneumatic cylinders 309 (e.g., preferably at 30 psi (207 kilopascal)). Upper bar 301 is pushed downward to contact a top surface of fusion area 65 and to mate with lower bar 322 which is in contact with a bottom surface of fusion area 65. Upper bar 302 is pushed downward to contact a top surface of fusion area 66 and to mate with lower bar 321 which is in contact with a bottom surface of fusion area 66. Upper bar 304 is pushed downward to contact a top surface of fusion area 67 and to mate with lower bar 318 which is in contact with a bottom surface of fusion area 67. Upper bar 306 is pushed downward to contact a top surface of fusion area 68 and to mate with lower bar 317 which is in contact with a bottom surface of fusion area 67. Upper bar 303 is pushed downward to contact an upper surface of document pouch 73.

The upper heat sealing bars 301, 302, 303, 304 and 306 and lower heat sealing bars 317, 318, 321 and 322 can heat seal at the five heat fusion areas for discharge spout, bottom, top, fill spout and document pouch.

In various embodiments, lower heat sealing bars can be constructed similar to upper heat sealing bars.

The pneumatic cylinders 309 preferably remain in the extended position during a temperature ramp-up period, a temperature bake time and a cool-down time. At the completion of the temperature times including the cool-down time, the pneumatic cylinders can then retract and are ready for the next cycle. A cooling time is preferably included to ensure that the bond between bonding coatings on fabric pieces in the fusion area, or between a bonding coating and standard fabric laminate coating in a heat fusion area is formed. Preferably pressure is still applied during the cool-down time to help ensure that a solid bond/fabric joint is made between the bonding coating and standard fabric coating, or bonding coating and bonding coating, on the respective fabric pieces in the fusion area that is being heat-sealed.

A ramp up time frame to get to the desired temperature can be 8 to 12 seconds. Heat sealing time can vary depending on the thickness of the materials to be fused together. For example with machine 300, a heat sealing time can be variable at each heat sealing assembly. A ramp up time to get to temperature and cool down time can also be variable for each heat sealing assembly on a single heat sealing machine or single heat sealing station. For example, sealing time can be longer at the bottom to body joint if the bottom has a thicker fabric than the top, than for a top to body joint. Cool down time can also be variable at each heat sealing assembly in a given machine. In production, assembly of the bag on an assembly table through heat sealing in the machine can typically be about 2.5 minutes, for each machine 300 and 400.

As shown in FIG. 100, a machine 300 also preferably includes two axes pivot yoke 307 (qty of 5) and can have bridge assemblies 308 (qty of 5); pneumatic cylinders 309 (qty of 10); long nylon ramp 310; long nylon ramp 311; short nylon ramp 312; short nylon ramp 313; short wide spacer plate 314; short narrow spacer plate 315; support channel 316 (qty of 5); long narrow spacer plate 319; and long narrow spacer plate 320.

A table or frame for a machine 300 can be similar to a table or frame previously described with regards to machinery depicted in FIGS. 49-84.

After the cooling time in machine 300, joint 126 in fusion area 65, joint 127 in fusion area 66, joint 128 in fusion area 67, and joint 129 in fusion area 68 will have formed for a bulk bag 700. Document pouch 73 can also be heat sealed to the body portion 53. The carrier plate 200 with the heat sealed bag 700 thereon can now be removed from machine 300 and transferred to a lift loop and diaper/bottom cover assembly table 251. Preferably a loop assembly and diaper cart 460 is located near table 251. Cart 460 preferably is designed to exacting dimensions to hold a full day's production of lift loop assemblies 56 that preferably include a lift loop panel 59 and lift loop 60. Lift loop 60 preferably is already attached to lift loop panel 59, e.g., via sewing or heat sealing. Preferably lift loop assemblies 56 are in folded configuration when placed on cart 460. Diaper/bottom covers 61 can also be placed on cart 460 in flat unfolded configuration.

In various embodiments, a lift loop panel assembly 56 can be assembled on the bulk bag body so that, when using a substantially rectangular shaped patch that is positioned on each gusseted edge of bag body portion, the longer length sides of a panel 56 are positioned substantially vertically on a the bulk bag body. Loop guides can also be included on a carrier plate to aid in positioning the loop assemblies on a bag. When arranged in this manner, it is preferred to also include tape, e.g., polypropylene or polyethylene fabric tape, along an inner vertical edge of the lift panel 59. Tape can also be included along each edge. The tape can be attached on the bag body via an adhesive backing on the tape. During experimentation, stress lines can develop from the top point of sewing of the loop to about 45 degrees downward of the lift loop, and the bag fabric can break around the center of the patch line. In such instances it goes into peel and weft horizontal influence is higher. By adding the tape along an inner edge of the patch, this prevents it from going into peel. Testing has shown that, a bag including tape along an inner edge of the lift loop patch can hold 9000 to 12000 pounds (4,082.3 to 5,443.1 kilograms). The tape along the lift loop panel 59 also helps prevent curling of the bag fabric around the lift loop panel 59 which can occur during heat sealing. The tape helps prevent center yarn stretching which can occur during heating.

In other embodiments, a lift loop assembly 56 can be placed on the bag body 53 so that the longer sides of the panel are substantially horizontal on the bag body 53 with the lift loops sewn to at or near the center of the panel 59 when in this horizontal orientation. In this embodiment, tape can be eliminated. The orientation of the patch in this embodiment prevents going into a peel position and prevents the bag tearing as discussed above when positioned in a substantially vertical orientation. With sewing lift loops on bags, it is noted that threads on lift loops typically fail or break below the lift loop. In a heat sealed bag as described in one or more embodiments herein, stress on the loop comes from above the loop and not below the loop causing it to go into peel pressure. Tape can potentially still be utilized though, along with horizontal orientation of the patch, to help prevent the fabric from curling or wrinkling along the panel edges if desired.

Cart 460 is preferably designed to be unloaded from any side. Cart 460 can include a platform 461, e.g., a U-Boat truck platform, a parts platform 462 and a plurality of parts cage rods 406. The parts cage rods 406 can be positioned on the parts platform 462 so as to hold a plurality of lift loop assemblies 56 and diapers or bottom covers 61 in spaces between the cage rods 406, as shown in FIG. 97 or example. The cage rods can also be arranged in other configurations as desired. The bag portions that will be gusseted can be on a cart already in gusseted formation.

Preferably the heat sealed assembled bag 700, while still clamped onto carrier plate 200, can be moved from machine 300 onto the loop/diaper assembly table 251. The lift loop assemblies 56 and diaper 61 can then be placed in their proper position on the bag 700 while still on carrier plate 200. As discussed with other embodiments, the diaper and lift loop patch can be highly oriented polypropylene fabric, or other fabrics can also be used. A lift loop assembly 56, wherein the lift loop panel 59 is folded at a fold line 85 can be placed so that fold line 85 is in contact with edge 414, 415, 416, and 417 of body 53, with one portion of the folded patch 59 extending along a gusseted fold of the bag 53, and with the other portion of the folded patch 59 extending either along a top or bottom surface of bag 53. When assembling the patch 59 on a body 53, the patches can be located on body 53 as shown in an open configuration in FIG. 21. Preferably, patch 59 can include a standard coating on a bottom surface when body 53 includes a fusion coating 191. Alternatively, a bottom surface of patch 59 can include a fusion coating 191 and can be heat sealed to body 53 exterior surface 135 when body 53 has a standard coating 192 or a fusion coating 191 thereon. Marks on the fabric portions can be added to aid in placement of the lift loop assemblies 56 on gusseted body 53.

Bottom cover 61 also can be positioned on the bag 700 while on carrier plate 200. Preferably cover 61 is positioned so that it extends from opposing sides of bag 700 across a bottom 107 of the bag, e.g., extending from a first side 163, across a width of bottom 52, over discharge tube 58, and to a second side 164. Marks on the fabric portions can add in placement of the cover 61. As previously discussed herein, preferably cover 61 is positioned so that when the bag is in an open configuration the distance between a fold 105 (at the location where cover 61 extends from bottom 52 over joint 128 to one side 163 of bag 700) and a fold 106 (where cover 61 extends from bottom 52 over joint 128 to a second side 164) is shorter than a width of bottom 52 so that when cover 61 extends across a width of bottom 52 to opposing sides of body 53, it cinches a bottom area 107 of bag 700, and causes an uplift of the bag bottom which provides even more support to bag 52. It also provides a flatter surface for a bottom of the bag.

After positioning the lift loop assemblies 56 and cover 61 on the bag 700, the carrier plate 200 can be moved into position in a heat sealing machine, e.g., a loop diaper impulse sealer machine 400, as shown in FIGS. 97-98. Preferably the heat sealed assembled bag 700, while still clamped onto carrier plate 200 is moved into position in the machine 400. Tooling 202 on carrier plate 200 can be used for aligning the carrier plate 200 in machine 400. Once carrier plate 200 is in position (which can be detected by a sensor on machine 400), the cycle of machine 400 can be initiated at a second control panel 600 by an operator. Alternatively, a single control panel can be used to monitor more than one heat sealing station or machine.

A machine 400 for sealing lift loop assemblies and a diaper 61 can have a frame or mounting table 407 and three heat sealing assemblies. Heat sealing assembly 421 has an upper first loop heat sealing bar 402 and a lower mating first loop heat sealing bar 412. Heat sealing assembly 422 has a second upper loop sealing bar 420 and a second lower mating loop heat sealing bar 413. Heat sealing assembly 423 has an upper diaper heat sealing bar 406 and a lower mating diaper heat sealing bar 411. Preferably frame 407 has an opening 431 positioned so that upper diaper seal bar 406 and lower diaper seal bar 411 can be moved into contact with one another. Preferably frame 407 has an opening 432 positioned so that upper first loop seal bar 401 and lower first loop seal bar 412 can be moved into contact with one another. Preferably frame 407 also has an opening 433 positioned so that upper second loop seal bar 420 and lower second loop seal bar 413 can be moved into contact with one another.

Preferably carrier plate 200 is positioned in machine 400 so that heat sealing assembly 421 can heat seal two lift loop assemblies to bag 700 at one time, e.g., when lift loop assemblies are positioned at edges 416 and 417 of a gusseted body 53. Preferably lift assemblies around edges 416 and 417 are positioned on the carrier plate and over opening 432. Preferably carrier plate 200 also has an opening under designated lift loop assembly 56 locations. When positioned in machine 400 in this manner pneumatic cylinders 403 can lower the first upper loop heat seal bar 401 to contact an upper surface of a top lift loop assembly 56 while lower first loop heat seal bar 412 is in contact with a bottom surface of another lift loop assembly 56.

Similarly, preferably carrier plate 200 is positioned in machine 400 so that heat sealing assembly 422 can heat seal two lift loop assemblies to bag 700 at one time, e.g., when lift loop assemblies are positioned at edges 414 and 415 of a gusseted bag body 53. Preferably lift assemblies 56 around edges 416 and 417 are positioned on the carrier plate and over opening 433. Preferably carrier plate 200 also has an opening under the said designated lift loop assembly locations. When positioned in machine 400 in this manner pneumatic cylinders 403 can lower the second upper loop heat seal bar 420 to contact an upper surface of a top lift loop assembly 56 while lower second loop heat seal bar 413 is in contact with a bottom surface of another lift loop assembly 56.

Regarding heat seal assembly 423, preferably diaper 61 is positioned on bag 700 on carrier plate 200 so that it is over an opening in the carrier plate 200 that can accommodate the shape and dimensions of the diaper fusion area and the seal bar. Preferably when carrier 200 is positioned in machine 400 the diaper 61 on carrier plate 200 is also positioned over opening 431. When positioned in machine 400 in this manner pneumatic cylinders 403 can lower the upper diaper heat seal bar 406 to contact an upper surface of diaper 61 assembled on bag 700 while lower first loop heat seal bar 411 is in contact with a bottom surface of diaper 61 assembled on bag 700.

Preferably the three upper side heat sealing bars 402, 420 and 406 are pushed downward (e.g., at 30 psi (207 kilopascal)) by pneumatic cylinders 403 to the mating three lower side heat sealing bars 412, 413, 411 with bag 700 having the lift loop assemblies and diaper positioned thereon between the said respective upper and lower heat sealing bars.

As shown in FIGS. 101 and 102, machine 400 can also include three axes pivot yoke 401 (e.g., qty of two); bridge assemblies 404; two axes pivot yoke 405; short nylon ramp 408; short narrow spacer plate 409; and seal bar support channel 410 (e.g., qty of 2).

Lower heat sealing bars can be of similar construction to upper heat sealing bars.

One or more stops can be provided on a machine 400, e.g., a center stop to aid in properly aligning a carrier plate 200 in the machine 400. Preferably a safety feature will be included, e.g., programmed by a control program 600, wherein a sensor can sense when the carrier plate 200 is properly aligned, and wherein a heating cycle will not be able to start until a carrier plate 200 is properly aligned in a machine 400.

Once positioned in the machine 400, a machine cycle can be started at a second control panel 600 wherein the pneumatic cylinders 403 are lowered into position. The pneumatic cylinders 403 preferably remain in an extended position during a temperature ramp-up period, a temperature bake time and a cool-down time. At the completion of the temperature times, the pneumatic cylinders can then retract and are ready for the next cycle. A cooling time is preferably included to ensure that the bond between bonding coatings on fabric pieces in the lift loop assembly and diaper connection areas, or between a bonding coating and standard fabric laminate coating in the lift loop assembly and diaper connection areas is formed.

After the cooling time, the lift loop assemblies 56 and diaper 61 will be heat sealed to the bag 700 with a heat sealed joint formed between a bonding coating and standard laminate coating on the respective fabric pieces in the respective connection areas, or between a bonding coating and a bonding coating on the respective fabric pieces in the respective connection areas.

The assembled bag 700, while still clamped onto the carrier plate 200 can then be moved out of machine 400 and onto a finished bag unload table 232. At this time, the bag 700 can be unclamped from the carrier plate 200 and can be folded for storage or transport and moved to a finished bag area. The carrier plate 200 can then be moved, e.g., in the direction of arrow 256 onto a conveyor system or conveyor table 253 where it can automatically be returned to a starting position to begin anew bag assembly cycle, wherein carrier plate 200 can be removed from conveyor 253 and move, e.g., in the direction of arrow 257 onto main assembly table 250. The carrier plate 200 can also be manually returned or slid on table 253 back to a starting position.

Referring to FIGS. 142A-146, a carrier plate 1300 can also be used with machines 300 and 400 and for bag portion and bag parts assembly. Carrier plate 1300 can include spout guides 1318, top sheet guides 1321, and bottom sheet guides 1322. Loop outboard guides 1319 and loop inboard guides 1320 are also labeled and depicted in the figures. The loop outboard 1319 and inboard 1320 guides can guide loop patch positioning on a bag on a carrier plate 1300 prior to heat sealing in a machine 400, for example.

A carrier plate end rail and side rail sub-assembly 1301 is also depicted (see FIGS. 142A and 142B), including end rails 1313, side rails 1312 and edge guides 1302. Edge guides can help locate all, or at least some, portions of a bag so the bag portions will be located in proper position to be heat sealed. A carrier base plate 1311 is also depicted.

Preferably, side and end rail pop rivet and screw mounting holes are drilled through both the base plate and the rails after the rails are secured in, e.g., with clamps.

FIG. 143 illustrates a clamp 1306, which can be a toggle clamp with spring plunger, and which can be used on a carrier plate 1300 to securely hold bag portions together after positioning on the carrier plate and forming the joint heat sealing areas to be heat sealed. Clamp 1306 can include spring plunger mount 1332, and a spring plunger 1336, which can be without thread lock.

Additional parts and materials labeled in FIGS. 142A-156 and which can used in a carrier plate 1300 are listed in the Parts List.

The figures depicting carrier plates 200 and 1300 depict a preferred embodiment of the guides and locations on a carrier plate that can be used with the invention. Other parts and materials known in the art potentially can be included to form suitable guides to help with bag portion positioning, and guides potentially could include other configurations, on a carrier plate to be used in one or more embodiments of the invention.

As part of the automation process, carrier plates comprising different dimensions can be fabricated based on desired bulk bag dimensions. Different machines 300 and 400, for example, can also be fabricated to correspond to dimensions of respective carrier plates. In one or more embodiments, the same machines 300 or 400 can be used to form bulk bags of differing dimensions, e.g., if the bags have differing heights so only the length of a body for example is changed. One or more heat sealing bar assemblies, for example, may be moveable within a machine to allow for use of a one machine to heat seal bag joints for bags having different dimensions.

In various embodiments a carrier plate can have one or more extendable and retractable portions to change the dimensions of the carrier plate, e.g., in length or width, or both length and width.

In various embodiments bag dimensions and tolerances can be modified by changing the length of the bag body portion. In various embodiments, carrier plates of more than one dimension corresponding to different bag body portion lengths can be fabricated. In various embodiments, carrier plates of more than one dimension corresponding to different bag fabric portion dimensions can be fabricated.

In various embodiments, one or more carrier plates can be extended or reduced in length to accommodate different bag fabric portions with differing dimensions, e.g., bag body portions of differing lengths. In various embodiments, one or more carrier plates can be extended or reduced in width to accommodate different bag fabric portions with differing dimensions.

In various embodiments a machine 300 or 400, or other machines as shown and described herein, can be extended or reduced in length to accommodate carrier plates of different lengths or other dimensions, wherein one or more of the heat sealing bars are movable to a location to correspond to carrier plates of different sizes and to fusion or bonding areas of bag fabric pieces on the carrier plate. In various embodiments a machine 300 or 400 can be extended or reduced in width to accommodate carrier plates of different widths, wherein one or more of the heat sealing bars are movable to a location to correspond to carrier plates of different sizes and to fusion or bonding areas of bag fabric pieces on the carrier plate. In various embodiments a machine 300 or 400 can be extended or reduced in length and/or width to accommodate carrier plates of different lengths and/or widths, wherein one or more of the heat sealing bars are movable to a location to correspond to carrier plates of different sizes and fusion or bonding areas of bag fabric pieces on the carrier plate.

In various embodiments, tables 250, 251, 252 and frame/table 305 and 407 of machines 300 and 400 can have longitudinal guides to facilitate sliding of the carrier plate 200 from one table or machine to another.

Turning now to FIGS. 104-110, the figures depict detailed views of sub-assemblies and support equipment that can be used with heat sealing machines 300 and/or 400, respectively.

FIG. 104 depicts an upper heat sealing bar assembly 500, which for example can be used in heat sealing systems 332 and 334 for sealing a top and bottom portion to a body portion of the bag. Preferably a heat sealing system 500 has an about 2 inch (5.08 cm) wide seal bar construction. Preferably the sealing system 500 bar can be water cooled by water cooling lines 502 to decrease the cool-down time during the heating sealing process. Preferably a sealing system 500 has twin fail-safe sensor controls 501 to monitor and regulate tight temperature control during the heat sealing process (e.g., within about +/−1 degree). In other embodiments, more than two fail-safe sensor controls can be utilized. In other embodiments, only one fail-safe sensor can be used, although preferably at least two fail safe sensor controls 501 are provided in case a control 501 malfunctions.

FIG. 105 is an exploded view of a heat sealing bar assembly 510, which for example, can be part of a heat sealing system 500. A heat sealing bar assembly 510 can be part of an upper heat sealing assembly 302 and part of a lower heat sealing assembly 321 Preferably a sealing bar 510 has a two axis pivot yoke 511, which can help achieve uniform pressure applied to a joint area during the heat sealing process when pressed against its mating lower seal bar by the two pneumatic air cylinders 309.

Preferably upper seal bar 501 includes a heating element cover 521, which can be a Teflon cover, and which can be held in place by clamp bars 519. Preferably heating element 512 is a single piece construction and is held in place by a pivoting clamping assembly comprising parts sealing element pivot mount 513, insulation tape 514, interior mounting flange 515, exterior mounting flange 516, and clamping plate 517. The heating element 512 can be stretched to proper tension by two springs 518.

Preferably heating element 512 is insulated from the seal bar by a rubber insulation material 520, which can be rubber.

A heat sealing bar system 500 can include the following parts as shown in FIGS. 104-105; twin fail-safe temperature sensors 501; water cooling lines 502; nylon washer 503; clamping collar 504; acorn nut 505; washer 506; pivot mounting plate 507; threaded rod 508; pivot yokes 509; seal bar assembly 510; seal bar pivot yoke assembly 511; single piece heating element 512; sealing element pivot mount 513; insulation tape 514; interior mounting flange 515; exterior mounting flange 516; clamping plate 517; springs 518; clamp bars 519; insulation pad 520; and heating element cover 521, which can be a Teflon cover.

Heat seal assemblies 331 and 336 can include upper seal bar assemblies similar to those shown in FIGS. 104 and 105, with dimensions of the assemblies changed based on desired joint areas for the fill spout to top joint and discharge tube to bottom joint. Heat seal assemblies 331 and 336 can be the same or similar to heat seal assembly 645 of FIGS. 63-69.

In the prior art, Teflon covers can be included with heat seal bars but they are attached with an adhesive, e.g., tape, to a heating element. During the heating process the Teflon typically start peeling off. In a preferred embodiment of heat sealing assemblies in one or more embodiments of machinery as described herein, a Teflon cover is clamped on or over a heating element which can eliminate the problem of peeling off of Teflon in the prior art. This also eliminates the problem of adhesive sticking to the heating element that often is scrapped off in the prior art.

FIG. 106 illustrates a heat sealing system 710 that can be used with a heat sealing system 331 or 336 to heat seal a fill or a discharge spout to a top or a bottom of a bag. Heat sealing system can have a same or similar construction as heat sealing bar system 500 with a heating bar 510. Part descriptions for the system 710 are included in FIG. 106. Example parts and materials that can be used in the assembly of FIG. 106 are also listed in the Parts List herein.

FIGS. 107 and 108 depict a heat sealing system 550 that can be used to heat seal lift loop assemblies, e.g., which can be used for heat sealing systems 421 and 422 in machine 400. A heat sealing system 550 can have a typical about 18 inch×18 inch (45.7 cm×45.7 cm) loop seal bar construction. Preferable the seal bar assembly 551 can be water cooled via one or more water cooling lines 568 to decrease the cool-down time during the process of heat sealing lift loop assemblies 56 to a bag 700. Preferably heat sealing system 550 has twin fail-safe sensor controls 557 that can monitor and regulate tight temperature control (e.g., preferably within +/−1 degree). In other embodiments, more than two fail-safe sensor controls can be utilized. In other embodiments, only one fail-safe sensor can be used, although preferably at least two fail safe sensor controls 501 are provided in case a control 501 malfunctions.

An upper heat seal bar assembly preferably has a three axis pivot yoke that can include the seal bar assembly 551, a washer 552, acorn nut 553, nylon washer 554, clamping collar 555, yoke mount 556, pivot mounting plate 558, pivot yoke 559, and pivot rod 560. A three axis pivot yoke assembly can help insure uniform pressure during the heat sealing process when the upper heat sealing bar is pressed against its mating lower seal bar by the two pneumatic air cylinders.

A seal bar heating element cover 570, which can be Teflon, can be held in place by clamp bars 567. Preferably the heating element 569 is single piece construction. Heating element 569 can be held in place by a pivoting clamping assembly that can include clamping plate 561, exterior mounting flange 562, interior mounting flange 563, insulation tape 564, springs 565 and sealing element pivot mount 566. The heating element 569 can be stretched to its proper tension by two springs 565.

Preferably a heating element 569 is insulated from the seal bar by a rubber insulation material 571.

A heat sealing system as shown in FIGS. 107 and 108 can include a seal bar assembly 551, washers 552, acorn nuts 553, nylon washers 554, clamping collar 555, yoke mount 556, twin fail-safe temperature sensors 557, pivot mounting plate 558, pivot yoke 559, pivot rod 560; clamping plate 561, exterior mounting flange 562, interior mounting flange 563, insulation tape 564, springs 565, sealing element pivot mount 566, clamp bars 567, water cooling lines 568, single piece heating element 569, heating element cover 570 and insulation pad 571.

A heat sealing system as shown in FIGS. 107 and 108 can include more than one heat seal bar assembly, which preferably can include one or more different lengths. For example, as seen in FIGS. 107 and 108, in may be desirable that a heat sealing bar does not come into contact with a lift loop. In such embodiments, 3 longer heat sealing assemblies may be included, e.g., similar to or the same as what is shown in FIG. 105 or 106, and a shorter heat sealing bar 720 (e.g., see FIG. 109) can be coupled together as part of a heat sealing system 550 wherein each of the heat sealing bars can be covered by cover 570. Example parts and materials that can be used in the assembly of FIG. 109 are also listed in the Parts List herein.

FIG. 110 illustrates a heat sealing system 1580 that can be a heat sealing system 326 for sealing a document pouch to a bag body 53. It can include an attachment plate 1581, yoke attachment 1582, seal bar slotted position bracket 1583, seal bar position bracket 1584, thread rod 1585, flat washer 1586, acorn head nut 1587, cylinder front bracket 1588, about 17 inch (43.2 cm) heating element 1589, about 18.5 inch (46.7 cm) heating element 1590, and Teflon fabric tape overlap insulation portion 1591. In various embodiments of heat sealing assemblies that can be used in heat sealing machines, one or more heating elements which can be constructed in a similar manner as shown in the figures can be provided of varying dimensions, wherein the dimensions of a heat sealing bar assembly alone or in combination with one or more additional heat sealing bar assemblies can be selected based on the desired size of a heat sealed joint to be obtained on the bag to couple one or more bag portions or parts together. The heat sealing bar assemblies can be sized so that they will heat seal a desired fusion or connection area and to provide a desired size heat seal joint that couples together fabric pieces or other parts of a bulk bag.

In one or more embodiments, an overlapped fusion area can determine the dimensions of a heat sealed joint, even if the heat seal bars extend a distance beyond the heat sealed joints, e.g., when a standard coating to bonding coat joint or seam is formed in the seal area. If a seal bar extends beyond the area where a bonding coating and standard fabric laminate coating are in contact, a bag joint will form where the standard coating and bonding coating are in contact, but not where a standard and standard coating are in contact. As discussed, this can be desirable to help ensure nongraspable edges along a bag joint.

In various embodiments heat sealing machinery and tables through or on which carrier plates can be transferred include step guides at the beginning and end of the table or machine that facilitate one-way travel in the assembly line sequence, wherein entrances can point down and exits can point up. Preferably, each next step guide is slightly higher than a previous step guide. At table transition points, the angle at the top of a step guide can be about ⅛ inch (0.32 cm) higher, for example, than the table surface.

In preferred embodiments, heat sealing machinery includes one or more lasers or lights that can provide an outline of desired fusion areas and help ensure fabric pieces are overlapped properly and that positioning tape, if utilized, is in the correct position.

For lift loop and diaper heat sealing machines, 10 transformers can be included based on the different structure of the heating elements and configuration of the heat sealers.

FIGS. 115-129, and 157-179 relate to a control panel 600 and electrical aspects of an automated system for producing a bulk bag in accordance with principles as described herein. As discussed herein, a control panel 600 can initiate a heat sealing process for a machine 300 or 400. Temperature control of each heat sealing system in a machine 300 or 400 can be performed by a programmable logic controller (PLC) 601, which can use pulse wave modulation (PWM) with 24 VDC discrete signal outputs. Discrete PLC outputs are preferably wired to solid state relays 602 controlling 240 VAC input power to transformers 603. (See FIGS. 115-116.)

Transformers 603 can step down voltage from 240 VAC to 12-48 VAC, which powers the heating elements.

The PLC 601 preferably uses software that uses a PID (proportional/integral/derivative) closed loop algorithm to control temperature ramp and stability during the heating process. The PID algorithm must be tuned for each element size. The tuning involves the setting of the proportional, integral and derivative values used by the PID algorithm.

In some embodiments, a single PLC 601 can control multiple different control panel units 600 and/or multiple different machines, e.g., 2, 3, 4, 5, or more different control panels and/or 2, 3, 4, 5 or more machines.

In various embodiments, a PLC can provide information on control panels and units that are at another location for heat sealing.

In various embodiments, a PLC can control 5 different units and 9 different elements, e.g. 9 different transformers and 9 different relays.

Temperature ramp up during the heat sealing process is performed with seal bars closed and fabric under pressure to ensure stability with ramp up.

Preferably each heating element has two (2) thermocouple sensors monitoring the temperature of the element. One sensor can be used for control and the other can be used as a fail-safe check.

Soft padding material, e.g., silicon rubber, is preferably installed under each sensor to ensure good pressure applied to both the control and check sensors. Sensor readings tend to vary with varied pressure and padding can help to equalize the pressure across the sensors.

Once the heat seal desired temperature is reached there is preferably a delay, e.g., a five (5) second delay, to allow the temperature to stabilize, and then the PLC 601 calculates temperature averages for the control and check sensors for the remainder of the heat seal time. Samples are preferably taken twice per second. At the end of the heat seal time the averages for the control and check sensors are preferably compared by the PLC 601, and a dual sensor fault is triggered if the values are out of a specified tolerance. In the event of a dual sensor alarm, the heat sealing cycle can be allowed to complete but engineering is preferably notified to check the machine and clear the alarm.

Preferably a timeout fault is triggered and a heat sealing cycle is terminated if a set-point temperature is not reached within a desired time frame, e.g. within 10 to 20 seconds. In such a situation, engineering is preferably notified to check the machine and clear the alarm.

An overshoot warning can be triggered if the overshoot exceeds the overshoot warning threshold which varies per heating element. The cycle can be allowed to complete. The operator can clear the alarm, but preferably is advised to check the bag for damage. An overshoot can be, for example, if the temperature goes about 5 to 10 degrees above desired temperature during ramp up time. If the overshoot lasts for a split second, for example, it should not be harmful to the bag, but if the overshoot lasts too long, it can cause burning or weakening of bag fabric.

An overshoot fault is preferably triggered by three (3) consecutive overshoot warnings. The cycle can be allowed to complete, however engineering is preferably notified to check the machine and clear the alarm.

A high temperature fault can be triggered if either the control or check sensor exceeds the high temperature trigger at any point in the cycle. The cycle can be terminated and engineering is preferably notified.

A low temp fault can be triggered if the control sensor temperature drops below a set threshold during the heat sealing time. The cycle preferably is terminated and engineering notified.

An end-stop equipped with a positioning sensor can ensure correct positioning of the carrier plate within the machine. Preferably the end-stop sensor must be triggered by the carrier plate prior to the operator initiating the heat seal cycle. This ensures that the carrier plate is in correct position and that heat sealing bars are aligned with desired heat seal locations for desired heat sealed joints.

Preferably all machines can be networked together. All machines can be monitored using Siemens SCADA software, for example. Faults as well as other critical data values are preferably logged into a central database. Real-time production values can be viewed and monitored by management or users and reports can be automatically generated. Fault notifications are preferably automatically sent to maintenance personnel in the event of machine faults.

Preferably every element has 2 sensors, and can have 1 control for a PLC and 2 fail safes to make sure the PLC does not malfunction.

In various embodiments, the monitoring during the process and data recorded lets an operator know whether a heat sealed joint or bond is of good quality or as desired. An operator in most cases cannot tell by just looking at a heat sealed joint if it was sealed properly. If temperature was too high, an operator may be able to tell by looking at the fabric which may have evidence of burning, but if the temperature was too low, an operator will not be able to tell if the joint is of desired quality.

In various embodiments, different temperature set points for each heating bar are possible, e.g., about 265 degrees (129 degrees Celsius) may be a targeted temperature for sealing, and about 165 degrees (74 degrees Celsius) may be a targeted temperature for end of cool down time and lifting of the seal bars.

One or more alarms can be red flashing, or other color flashing light.

In some embodiments, 20 seconds is the targeted time for a heat seal bar to reach the targeted temperature. If not reached in that time an alarm can sound or the machine can shut down, e.g., be set to automatically shut down.

Preferably all data during heat sealing, including time frames, temperatures, pressure, etc. and faults or alarms are recorded.

Each control panel preferably is networked to a main computer, e.g., with Siemens software.

A screen 599 on a control can display multiple views and different data being collected or monitored on one or more machines, including on off location machines. FIGS. 157-179 display some possible screen views.

A default screen can be included with a control panel 600 which can monitor what is happening with every machine and electrical component of the system.

FIG. 117 illustrates a basic electrical layout for a heat sealer circuit that can be used in one or more embodiments of the automated system and method. The PLC preferably uses PID closed loop control to control the temperature of each element. The controller can send slow voltage pulse output signals to solid state relays 602 which open and close voltage to the transformers 603 powering the heating elements. The output voltage of each transformer can vary from 12-48 VAC based on the size of each heating element. The PID algorithm used preferably is a standard Siemens function block, however the block must be tuned for each heating element or bar size. The tuning involves the setting of the proportional, integral and derivative values used by the PID algorithm.

FIG. 118 illustrates an example temperature control graph during a sample heat sealing cycle.

FIG. 119 is a chart exampling control faults that are preferably incorporated within the system and method.

FIGS. 120-129 illustrate electrical schematics, wiring, and inner and outer panel layouts for a control panel 600.

In various embodiments of the intermediate stage fusion closed loop production line system and method, a bulk bag with heat fused seams can be manufactured in about 2.5 minutes.

In various embodiments of the intermediate stage fusion closed loop production line system and method, the assembly process and heating sealing process for each machine 300 or 400, can take about 2.5 minutes, for a total of about 5 minutes to manufacture a complete bag 700. During an assembly line production, both machines 300 and 400 can be in operation at one time so that two different bags can be being prepared sequentially with some of the same overlap time. Output of a completed bag therefore can be at about every 2.5 minutes during assembly line production.

In various embodiments of the intermediate stage fusion closed loop production line system and method, a bulk bag 700 with heat fused joints can be manufactured in under 2 minutes, or between 2 to 10 minutes.

In various embodiments of the intermediate stage fusion closed loop production line system and method, a bulk bag with heat fused joints can be manufactured in under 2 minutes.

In various embodiments of the intermediate stage fusion closed loop production line system and method, a bulk bag with heat fused joints can be manufactured in under 2 minutes, 2 to 7 minutes, or over 7 minutes.

Although not shown in the figures, a conveyor system can also be included that sends a carrier plate 200 from the finish/unload table 252 to the conveyor table 253, and also a conveyor that can send the carrier plate 200 from the conveyor table 253 to the main assembly table 250. In various embodiments, a carrier plate from machine 300 can also automatically be conveyed to the lift loop assembly table prior to entering machine 400.

In various embodiments operators for assembling one or more bags on a carrier plate and operating heat sealing machinery throughout the automated process can be trained in about two hours. In other embodiments they can be trained in under 2 hours. In other embodiments they can be trained in about 2 to 7 hours. In other embodiments that can be trained in one day. In the prior art of sewing bulk bags, training periods typically are about 90 days to learn how to sew the bags.

In various embodiments, one-way stops can be included on the carrier plate, wherein the stop includes a ramp and wherein it insures that the corner from the top to bottom and spout to top is always perpendicularly aligned. If a fabric piece goes over the stop, it is an indication the fabric piece is oversized. It can also provide information as to whether a fabric piece is undersized.

Preferably one or more embodiments of heat sealing machinery as shown and described herein can include center stops and end stops for positioning of the carrier plate.

In preferred embodiments of heat sealing machinery, heat sealing bars can be coupled to the machinery with quick connect and disconnect features to facilitate changing out the sealing bars as needed.

A quick disconnect feature can include removing bolts, and pulling out rods, after disconnecting electrical components at top. To re-connect, the rods, bolts and electrical can be re-assembled together.

In various embodiments, a carrier plate can function as a quality check tool for bag parts assembly, machine set-up tooling, and an inspection tool for assembly of the bags and machinery. By combining these three functions in one component, it helps keep close tolerances in the bag formation, accuracy and quality control. If different tools are used as a quality check for assembly, machine set-up tooling, and inspection, such tolerances can be lost.

In various embodiments, a carrier plate can function as a quality check tool for bag parts assembly, machine set-up tooling, and/or an inspection tool for assembly of the bags and machinery.

In the heat sealing machinery, multiple axes, e.g., 2 or 3 axes, can be utilized to help ensure equal pressure during heating sealing and to helps sensor sense the pressure. In the prior art, if multiple axes are utilized it was for the purpose of alignment or to move the parts at different angles.

Referring now to FIGS. 130-133, FIG. 130 includes information on compression weights before breaking for a bag produced, for example, in the method and system of FIG. 97 for example.

FIG. 131 is a table comparing sewn prior art bulk bags and a bag with heat sealed seams, for example, produced in the method and system of FIG. 97.

FIG. 132 is a chart comparing production time for a prior art sewn bag versus a heat sealed bag, for example, produced in the method and system of FIG. 97.

FIG. 133 is a chart comparing tensile strength retention in highly oriented polypropylene fabric without a seam, with a prior art sewn seam and for a heat sealed seam, for a bag, for example, produced in the assembly line of FIG. 97.

As shown in the Figures, different configurations of heat sealing stations, and/or different configurations of heat sealing machinery included at one or more heat sealing station can be provided. In one or more embodiments, one or more heat sealing assemblies can be included at one or more heat sealing station. The one or more heat sealing assemblies provided at a heat sealing station can be the same as an embodiment shown in the drawings or different from what is shown in the drawings. For example, in one or more embodiments, a document pouch heat sealing assembly can be included at a different heat sealing station and not at a first heat sealing station as shown in FIG. 97.

An overall heat sealing assembly line can also be modified if desired, from what is shown in FIG. 97, e.g., if it is desired to use one or more machine assemblies as shown in FIGS. 49-96 in a heat sealing assembly production line.

In one are more embodiments, heat sealing machinery and bag or bag portion or parts configurations as described and shown herein can be used to heat seal polypropylene fabric bags. In other embodiments, the same or similar machinery and bag or parts configurations can also be used to heat seal bag of other fabric material, e.g., polyethylene bags. Parameters of the various machines could be adjusted, e.g., heat sealing temperatures based on the type of fabric being sealed. Coatings on the various bag parts can also be selected based on the type of fabric being heat sealed, e.g. a polyethylene standard fabric coating on some polyethylene bag parts could be used instead of a polypropylene standard fabric coating.

In preferred embodiments of one or more heat sealing assemblies as shown and described herein, at least one heat sealing bar assembly (e.g., an upper heat sealing bar assembly) of a pair of mating heat sealing bar assemblies is operable to have a rocking motion during the heat sealing process to help ensure that even pressure is applied on an entire heat sealing joint area during the heat sealing process.

In preferred embodiments of heat sealing assemblies for forming a joint at a fill spout to top, top to body, body to bottom, bottom to discharge tube, and/or diaper/bottom cover joint locations, an upper heat seal bar assembly can have to two pin axes, e.g., at the locations where a heat seal bar assembly is coupled to the pneumatic cylinders.

Referring to FIGS. 99, 104 and 183 for example, a first pin central longitudinal axis 443 is shown. In FIG. 183 a shaft or pin 445 is positioned through lower opposing openings of clevis 509 which can be coupled to a first pneumatic cylinder (see arrow 449) and shaft or pin 445 is also positioned through opposing openings 447 of a pair of brackets 446, with the brackets 446 also coupled to the heat seal bar assembly 510. Preferably, the diameter of each opening 447 of brackets 446 is sized to receive a shaft or pin 445 therethrough but to allow no, or very little, movement of shaft or pin 445 in a left to right direction, or in an up to down direction, but sized to allow angular rotation of shaft or pin 445 in a clockwise or counter clockwise direction along pin axis 443.

A second pin central longitudinal axis 444 is also shown. A shaft or pin 445 is positioned through lower opposing openings of clevis 509 which can also be coupled to a second pneumatic cylinder at arrow 449, and wherein the shaft or pin 445 is also positioned through opposing openings 448 of a pair of opposing brackets 507, with the brackets 507 also coupled to the heat sealing bar assembly 510. The openings 448 of opposing brackets 507 are preferably slotted, e.g., oval with a diameter across the width of the openings that is larger than the diameter across a width of the shaft or pin 445, which can define a slotted opening 448. Preferably the slotted openings 448 allow some left to right movement of pin or shaft 445 in the slotted opening, but minimal or no up and down movement in the slotted openings 448. With this configuration, when pin or shaft 445 is in openings 448 the pin 445 can move in a left or right direction in the opposing slotted openings 448, the movement enables angular rotation of the pin or shaft 445 in non-slotted openings 447 of brackets 446 along pin axis 443, while the heat seal bar assembly 510 is maintained in a relatively fixed horizontal location over the heat sealing area. The angular rotation along pin axis 443 can be between about 0 to 3 degrees, for example, which enables a side to side or left to right rocking of the seal bar assembly 510 along a central seal bar axis.

With this configuration the brackets 446 are operable to hold the heat sealing bar assembly 510 in a relatively fixed location, e.g., a substantially horizontal location, over the heat sealing joint area of the bag, while the brackets 507 enable the angular rotation along pin axis 443 that can effect rocking of seal bar 510 in a left to right, or side to side direction designated by arrows 559, as the heat seal bar is heat sealing a bag joint.

The center distances between devises 509 is fixed, and the slotted openings 448 of brackets 507 allows no stress to be placed on the center distance between devises 509 when the cylinders are pushing down seal bar 510 onto fabric to be sealed. As the seal bar comes down on uneven fabric surfaces the angular rotation along axis 443 allows the angle to increase so the cylinders don't bind up, and allows even pressure to be applied to the fabric surfaces.

As indicated, a pair of opposing slotted positioning brackets as shown in one or more embodiments of the heat sealing bar assemblies, e.g., slotted brackets 359, 448, 545, 613, 681, 752, 1122, and/or 1583 enable a rocking motion of the heat seal bar assembly. When a shaft or pin is positioned through the slotted openings and through the cylinder yoke, the slotted openings allow rotational movement of the pin or shaft that is positioned through non-slotted brackets, e.g., brackets with non-slotted openings 358, 446, 546, 614, 682, 753, 1121, 1584, which allows the heat sealing bar assembly to self-adjust, or self-align, on the fabric during heat sealing, even when different levels of thickness or densities are present in the multiple layers of fabric in a given heat sealing area. With the rocking motion, even where the fabric is uneven, an equal pressure, or at least substantially equal pressure can be applied to all the fabric in the joint area. The rocking motion allows the upper and lower heat sealing assemblies to mate in a perfectly parallel, or at least almost perfectly parallel fashion, while heat sealing a joint.

If equal pressure is not applied during heat sealing, e.g., at locations including higher areas of fabrics, then hot spots, or bright spots, or shiny spots can develop during heat sealing, where those higher areas start to melt, or where the heat starts to damage to the fabric.

If a pair of slotted opposing openings where not present in the brackets, e.g., in brackets 507 or 1121, when the heat seal bar came down at different levels of thickness on the fabric, the cylinders would bind up. This can occur because when the heat seal bar came down at different levels of thickness on the fabric, the cylinders will bind up when trying to push the heat seal bar down in parallel position. If no rocking is allowed, e.g., if pin or shaft 445 cannot rotate on pin axis 443, the seal bar will try to go in at an angle and try to push the cylinders' center distance apart which binds them up and causes the heat seal bar to hit the surface unevenly, with no ability to rock or self-adjust or self-align. When a pair of positioning brackets with opposing slotted openings is included, when the cylinders are pushing down the heat seal bar, as an angle increases when the heat seal bar comes down on a mismatched area, the slotted opening allows for the angular rotation of a pin or shaft 445 for example along pin axis 443 and rocking and self-adjusting of the heat bar so binding up of the cylinders does not occur.

A pair of positioning brackets 446 for example with non-slotted openings 447 therefore can keep the seal bar in a relatively fixed horizontal location, while the brackets 507, for example, enable rocking of the seal bar, e.g., in a left to right direction during the sealing process at the fixed location.

Preferably the angle of rotation along a pin central longitudinal axis, e.g., pin axis 443 is in a range that will accommodate the total differences in the material thicknesses in the heat sealing area. The angle of rotation along pin axis 443 can be 0 to 3 degrees. A 3-degree angle generally can accommodate differences in the material thicknesses in a heat sealing area. In many applications of heat sealing, the rocking may be at an angle of less than 1 degree.

If the seal bar rocks too far in any one direction, this can also cause binding up of the cylinders and damage of the fabric. This potentially can occur if two pairs of brackets with slotted openings are provided.

In the embodiments as shown in the drawings, the upper heat sealing bar assemblies can have a rocking motion, while the mating lower heat sealing bar assemblies do not have a rocking motion and remain stationary.

Referring to FIGS. 74 and 79-81, and 102, 107-108, and 180-182, preferably a lift loop patch heat sealing assembly has 3 pin central longitudinal axes 455, 465, and 469 as labeled in FIG. 180. The pin axes are described below with regard to FIGS. 107-108. The loop seal bar assemblies of FIGS. 74, and 79-81 can function in a same or similar manner.

As shown in FIGS. 107-108 and 180-182, a pair of brackets 558 are provided, each including a generally circular opening 496 for receiving a pin or shaft 560 that is also positioned through lower opposing openings of clevis 559 which can be coupled to a cylinder at arrow 441 for example. Brackets 558 also include opposing slotted openings 495 that can receive a pin or shaft 560 that is also positioned through lower opposing openings of a clevis 856 which can be coupled to a second cylinder at arrow 441. The circular or non-slotted openings 496 are preferably sized for a tight tolerance fit, e.g., to receive a pin or shaft 560 and so that pin 560 can rotate along axis 469, but sized so that pin 560 has very little or no movement in left to right or up and down directions. A pin 560 positioned through slotted openings 495 preferably can move in a left to right direction in openings 495 as shown in FIGS. 181-181B when a pin 560 moves in the direction of an arrow 467 or 468, respectively, in opening 496, and which can be in a same or similar manner as described above with reference to brackets 448 or 1122 that allow for left to right movement of the pin or shaft in the slotted opening.

When pin 560 moves in slotted openings 495, this enables rotation of pin 560 in non-slotted openings 496 along pin central longitudinal axis 469, and rocking of the seal bar assembly 551 in a side to side or left to right direction designated by arrows 683.

It is also possible that two pairs of brackets could be included for connecting to the air cylinders, one pair with slotted openings and one pair without slotted openings. A pair of single brackets that each include a slotted and non-slotted opening is easily incorporated with the loop bar assembly given a shorter distance between the devises in the loop bar assembly when compared to the seal bar assembly of FIG. 183 for example. It should be noted that the brackets 558 could be turned around so that the opposing slotted openings could be on the other side of the seal bar instead of as shown.

In various embodiments, one cylinder is preferably coupled to the seal bar with a pin through opposing slotted openings in opposing brackets, and another cylinder is preferably coupled to the seal bar with a pin through opposing non-slotted openings in a pair of opposing brackets.

A third central longitudinal axis 455 can also be provided wherein shaft or pin 493 is positioned through opposing lower brackets 556, and opposing lower brackets 494 (see FIGS. 180, 182). The pin or shaft 493 positioned through the brackets 556 can rotate along pin axis 455 in the direction of arrows 456 or 457, which enables a rocking of the heat seal bar in the direction from end to end of the heat sealing bar assembly as designated by arrows 680. The slotted opening 495 shown in FIG. 182 is not scale. Typically, the collar will cover the slotted opening in the end view.

Referring to FIG. 182, it is an end view of a loop seal bar assembly in FIG. 180.

As shown, a space or clearance designated between 459 is shown, which can be about a 0.140 inch (0.36 cm) clearance between brackets 494 and seal bar assembly 551. The space or clearance can also be about 0.12 to 0.18 inches (0.304 to 0.46 centimeters). The space or clearance between brackets 494 and seal bar assembly 551 allows rotation of pin 493 in opposing openings 470 of brackets 556 along axis 455 at a desired angular rotation. Openings 470 are preferably sized to receive pin or shaft 493 and allow rotation of shaft 490 along axis 455, but to allow little or no movement of pin or shaft in left to right or up and down directions. When pin 493 rotates counter clockwise on axis 455, the clearance goes from neutral position of about 0.140 inches (0.36 cm) to about 0. When pin 493 rotates clockwise starting from neutral position of about 0.140 (0.36 cm), the clearance goes from about 0.140 to 0.280 inches (0.36 to 0.71 cm). This enables an angular rotation along axis 455, e.g. about 0 to 3 degrees angular rotation. A same or similar clearance or space can also be included between brackets 892 and the loop seal bar assembly as shown in FIGS. 79-84, for example.

The 2 axis rotation in the loop seal bar embodiment enables rocking of the seal bar in 4 directions, e.g., at an angle of about 0 to 3 degrees in the direction of arrows 680 and 683 in FIG. 180. Having rotation along more than one pin axis is desirable for the lift loop assembly sealing given the larger fabric area of the joint to be sealed.

Generally, when a level surface comes down on uneven fabric surfaces, there may be four uneven points. The level surface will hit the highest point and not make contact with the other three points. The 2 axis rotation enables the level surface to make contact with a minimum of three uneven surfaces and given the compressibility of the fabric as pressure is applied it can make contact with all four points of uneven surfaces.

FIGS. 134-138 depict the rocking ability of upper heat seal bar assemblies, in exaggerated view. FIG. 134 illustrates a spout heat sealing assembly, e.g., spout heat sealing assembly 632, with upper seal bar assembly 633 and lower heat seal bar assembly 638. In FIG. 130, the upper seal bar assembly 633 and lower seal bar assembly 638 are in a closed position, wherein the upper seal bar assembly 633 is pushing down on the lower seal bar assembly 638 with equal force on all sides/areas. In FIG. 135, a tubular member 1220 is shown between one side of upper seal bar assembly 633 and one side of lower seal bar assembly 638 to depict the rocking capability. If the tubular member was positioned on the other side of the assembly, a similar or the same angle would be present. This view is an exaggerated view of the back and forth, or side to side rocking that is capable. When heating sealing a joint, the differences in fabric thickness that may be encountered are generally in thousandths of an inch (cm) ranges.

FIG. 136 illustrates a loop patch heat sealing assembly, e.g., a loop patch heat sealing assembly 782 including an upper loop heat sealing bar assembly 785 and a lower loop heat seal bar assembly 786. In FIG. 136, loop patch heat sealing assembly 782 in a closed position with upper loop heat sealing bar assembly 785 pushing down on lower loop heat seal bar assembly 786 with equal force on all sides/areas. FIG. 137 illustrates a rocking motion based on rotation of pin 900 in brackets 892. The tubular members 1220 are inserted between the upper and lower seal bar assemblies to show in exaggerated view the rocking capability.

FIG. 138 illustrates a rocking motion based on angular rotation along a pin axis in non-slotted openings of brackets 845-846 of a bracket loop seal bar assembly as described above, e.g., wherein left or right movement of the pin in the slotted openings of brackets 845 and 846, enable angular rotation of the pin in the non-slotted openings of brackets 845 and 846, enabling the seal bar to rock back and forth, from side to side, or left to right. The tubular member 1220 is inserted between the upper and lower seal bar assemblies to show in exaggerated view the rocking capability. If the tubular member 1220 in FIG. 134 were moved to the other side of the assembly, a similar or the same angle would be effected. With the loop seal bar assembly's ability to rock in all directions, e.g., from end to end and from side to side, even if there is uneven material at all four points, equal pressure is applied at all four points during heat sealing.

In one or more embodiments a document pouch heat seal bar assembly as shown in FIGS. 62 and 110, for example, can also rock in a side to side direction during heat sealing along a pouch seal bar central axis. Referring to FIG. 62, a pin positioned through slotted brackets 613 that can move in a left to right direction in slotted openings of the slotted brackets, can enable rotation of a pin positioned through openings of brackets 614 along a central longitudinal pin axis, in a similar manner as described above, and which can effect a rocking motion of the document pouch seal bar along a central axis extending from side to side of the seal bar. A pin moving in slotted openings of slotted brackets in FIG. 110 can also cause rotation of a pin in nonslotted openings in nonslotted brackets along a central pin longitudinal axis, which can effect rocking of the seal bar along a central axis extending from side to side of the seal bar.

In one or more embodiments, pin movement in slotted openings of a pair of brackets attached to a cylinder is operable to cause pin rotation in non-slotted openings of a pair of brackets attached to another cylinder, which is operable to cause rocking of a seal bar along a central axis of the seal bar.

In one or more embodiments, clearance or a space provided between a seal bar and lower brackets coupled to the seal bar can effect rotation of a pin along a central longitudinal axis when the pin is positioned through the brackets that are coupled to the lower seal bar, within a desired angular range of rotation, e.g., within about 0 to 3 degrees angular rotation of the pin. The angular rotation of the pin is operable to cause rocking of the seal bar along a central axis of the seal bar.

In one or more heat sealing bar assemblies of the present invention as shown and described herein, preferably a heating element, e.g., heating elements 733, 768, 865, 864, 1151, 1520 as shown in the figures, is manufactured as a single piece including end couplers on the single piece construction. Referring to heating element 1151, for example, single piece element 1151 can include an element portion 1170 and end couplers 1168 and 1169 as an integral part of the heat element 1151, e.g., as shown in exploded view in FIG. 109. A heat sealing element preferably is sized to be positioned over heat insulating pad 1142 which is positioned on main body 1141. Side end couplers 1168 and 1169 extend from element 1170 at an angle and are preferably sized so that end couplers 1168 and 1169 can be coupled between upper heat strip mount 1147 and lower strip mount 1144.

As shown in FIG. 109, an end assembly can be included on each side of the heat sealing bar assembly 720. An end assembly can include a heat strip tension block 1143 and springs 1167 threaded though openings therein. Tension block 1143 can be coupled between lower heat strip mount 1144 and main body 1141. Heating element end couplers 1168 and 1169 can be coupled between upper heat strip mount 1147 and 1144. Upper heat strip mount 1147 can be coupled between retaining cap 1150 and lower heat strip mount 1144.

The pins 1149 and 1148 hold individual parts of the assembly together and in position. Without the pins, precision would be lost. Pin 1149 can function as a locating pin, centering the parts together and keeping the ends of the assembly in vertical and horizontal position. Pin 1148 can function to prevent left to right rotation of the end assembly.

End cap assemblies including a heat strip tension block assembly 1143, for example, can be included on both ends of a main body portion 1141. Springs 1167 are provided to hold the heating element in place and to keep it in tension. The springs 1167 provide tension on pivot for 1143. Keeping the element in tension can be important to prevent the heating element from folding back on itself when cooling down for example. Preferably a pair of springs 1167 are included with both end cap assemblies.

As mentioned, and as shown in FIG. 109, preferably heating element 1151 is manufactured as a single piece including element portion 1170 and end couplers 1168 and 1169. End couplers 1168 and 1169 can include an angled upper portion 1171 extending at angle from element 1170 and a bracket portion 1172. Angled upper portion 1171 can have about a 45-degree angle rise, for example. In the prior art, a heating element does not include couplers 1168 and 1169 as an integral part as shown. Instead expensive and heavy clamps, e.g., made of brass, are soldered onto the element at the ends. Every time a heating element needs to be changed, new heavy and expensive clamps are soldered on the new element.

In FIG. 109, the end coupler bracket portions 1172 are coupled to the main body between the end mounts 1147 and 1144, and a retaining cap 1148 is also coupled to the assembly. The retaining cap 1148 can be about 8-inch (20.3 cm) brass. When all the pieces are coupled together as shown in FIG. 109, the advantage of heavy brass is included as a terminal strip while still having the element 1151 as a single piece. Using a single piece element as shown and retaining caps 1150 can cut considerable cost. Retaining caps 1150 can be reused. If element 1151 needs to be replaced, a new element is included in the assembly and retaining caps 1150 can be reused in the assembly.

Preferably an insulator, which can be coated tape, e.g., PTFE Teflon coated tape 1152, is provided on element 1170 end locations as shown in FIG. 109. An insulator, which can be teflon coated tape 1153, can also be included on top of angled portion 1171 of an end coupler 1168 or 1169. An insulator, e.g., Teflon coated tape, is preferably provided at locations on a heat sealing assembly wherein the heating element can come into contact with, or where heat will travel through, fewer layers of fabric, or less thick fabric, in a heat sealing joint area. The insulator or coated tape can help isolate the heat so the fabric is not damaged in the less thick areas. Preferably the coated tape is provided at a 20-mil (0.51 millimeter) thickness, or at 10 to 30 mil (0.254 0.762 millimeter) thickness. More than one piece of coated tape can be used as an insulator to get the desired tape thickness if needed, e.g., as shown in FIG. 109, tape portions 1152. Other suitable materials known in the art can also be included instead of Teflon coated tape to help isolate or insulate the heat in such areas.

A heat bar cover 1160 also preferably is provided in one or more heat seal bar assemblies as shown and described herein. Heat bar cover 1160 can be positioned over the coated tape 1152 on element 1170, and can be coupled to main body 1141. A cover 1160 is preferably provided to prevent the heat bar from sticking to the bag fabric which can occur even if the bag fabric is not melted. A cover 1160 preferably is coated with a non-stick material, e.g., Teflon. Although not shown in FIGS. 69, 73, 80, 82, 83 and 84, for example, a heat bar cover similar to cover 1160 can be included in those embodiments, that preferably is coated with a non-stick material. Tape 1152 can also be included between a heating element and a heat bar cover in FIGS. 69, 73, 80, 82, 83 and 84, where needed to help isolate heat joint areas with thinner fabric or fewer layers of fabric.

Reference is now made to FIGS. 139-141B depicting the manner in which a coating, e.g., a bonding coating or a standard fabric laminate coating (e.g., standard polypropylene fabric coating) can be applied. As previously discussed, in some embodiments it is desirable to include fabric tape along one or more lift loop edges to reinforce the lift area and help prevent tearing or breakage at a lift loop panel or lift loop joint. Also, as previously discussed, a fabric coating can be applied to a tubular piece of fabric wherein the coating extends past one or more fabric edges.

In FIGS. 139-141B the coating extending past a fabric edge 1202 of a fill spout 57, discharge tube 58 or body portion 53 is depicted at areas designated by 1201.

When applying the coating a tubular fabric portion 57, 58 or 53, the tubular fabric portion can be positioned on a substantially flat surface. The tubular bag fabric portion 57, 58 and/or 53 can have two open end portions 1207 and 1208, and two edge portions 1202 that are not open. Coating can be applied on a first side wherein it extends past each coated edge 1202 in an over edge coating area 1201, which can be 0 to 0.4 centimeters, example. The coating can also be applied on a second side of the tubular fabric portion 57, 58, 53 in the same manner so that it extends beyond each edge 1202 in an over coated area 1201. When coating is applied to the second side, the over edge portion of the second side will adhere to the over edge portion of the first side coating.

In a final coated tubular fabric portion, two overedge coating areas 1201 will be present. Each tubular piece can be gusseted so that a first over edge portion 1201 is on a top side of a gusset edge, and the second over edge portion 1201 is on a bottom side gusset edge, as shown in FIGS. 139B, 140B, and 141B.

When a bag body portion, for example, is gusseted as is shown in FIG. 141B, four lift loop panels can be positioned on each gusseted edge 1203, 1204, 1205, 1206 of the bag, including on the gusseted edges 1203 and 1205 with overedge coating area 1201. The lift loop panels can then be heat sealed to the bag. The overedge coating gusseted configuration as shown can eliminate the need for adding fabric tape at one or more lift loop patch edges. The overedge coating gusseted configuration provides additional strength and reinforcement at the lift loop and lift loop patch joints to help prevent tearing or breakage.

Applying a coating with an overedge coating portion as described herein can be used for both a bonding coating or a standard fabric laminate coating, e.g., a standard polypropylene fabric coating.

When a applying a coating to bag fabric portions, the coating is applied in a liquid sheet that can be about 2 to 5 mils (0.05 to 0.13 millimeter) thick. For a body portion for example, an about 48 inch (376 cm) tube is flattened to about 74 inches (188 cm) and the outer edges get stronger at the center.

Referring now to FIGS. 184 and 185, the figures represents an overlapped fusion area and joint between two overlapped bag portions 1232 and 1233, in folded, gusseted form. As shown, outer bag portion 1232 in gusseted form has 4 layers, 1, 3, 5, 8. Bag portion 1233 also has four layers in gusseted form, 2, 4, 6, 7. When overlapped, 8 fabric layers or surfaces are present in the fusion area. FIG. 185 is a detail view taken along lines 185 of FIG. 184. It shows a bag portion 1233 fabric layer, a first coating 1234 layer, a second coating 1235 layer, and a bag portion 1232 fabric layer. Coating 1234 can be different from coating 1235. For example, coating 1234 can be a standard polypropylene fabric laminate coating and coating 1235 can be a bonding coating.

The dashed line in FIGS. 184-185 represents a bond 1236 formed between first coating 1234 and second coating 1235. As shown, preferably a bond 1236 or bag joint is only formed in areas where a first bag portion coating is in contact with a second bag portion coating. Surfaces or layers of first bag portion 1232, e.g., surfaces or layers 3, 5, are in contact but are not heat sealed together and do not form a bag joint even though these layers are in contact under heat and pressure from the seal bars. Surfaces or layers of second bag portion 1233 that are in contact, e.g., surfaces or layers 2, 4 are also not heat sealed and do not form a bag joint, even though these layers are in contact under heat and pressure from the seal bars during heat sealing of bond or joint 1236.

Surfaces that are not heat sealed together to form a bag joint can be fabric surfaces, or standard laminate fabric coating surfaces. If in a fold location a bonding and standard coating, or a bonding and bonding coating will be in contact in an area where a bond is not wished to be formed, a buffer material, e.g., wax paper can be included.

If it is desirable in some bag configurations to form a bond in a fold area between one or more layers under heat and pressure, a bond can be formed by having a bonding to bonding coating in contact, or a standard to bonding coating in contact when under heat and pressure, for layers to be heat sealed together.

The heat sealing configuration as shown in FIG. 184, enables the bag joint to be formed in 2-dimensional configuration for a bag that can open up into a 3-dimensional configuration.

PARTS LIST

| PART NUMBER | DESCRIPTION |
|---|---|
| 1 | layer |
| 2 | layer |
| 3 | layer |
| 4 | layer |
| 5 | layer |
| 6 | layer |
| 7 | layer |
| 8 | layer |
| 10 | heat sealed bulk bag |
| 11 | stich seam |
| 12 | stich to hold hem |
| 13 | fabric |
| 14 | sewn joint |
| 15 | fabric fold |
| 16 | fusion heat sealed seam |
| 17 | side wall |
| 18 | bottom wall |
| 19 | coating/lamination |
| 20 | line |
| 21 | heat seal bar |
| 22 | transitional gap |
| 23 | fill/discharge spout |
| 24 | line |
| 25 | line |
| 26 | top/bottom panel |
| 27 | body tubular fabric |
| 28 | line |
| 29 | line |
| 30 | connection area |
| 31 | line |
| 32 | line |
| 33 | line |
| 34 | future fold line |
| 35 | corner slit |
| 36 | gusseted fill spout |
| 37 | gusseted top panel |
| 38 | gusseted body |
| 39 | gusseted bottom panel |
| 40 | gusseted discharge spout |
| 41 | fusion seal area |
| 42 | double fabric wall |
| 43 | lap seam |
| 44 | pressure from bag contents |
| 45 | line |
| 46 | line |
| 47 | triangular area |
| 48 | first coating |
| 49 | second coating |
| 50 | stitchless bulk bag |
| 51 | top |
| 52 | bottom |
| 53 | body |
| 54 | open bottom fill spout |
| 55 | tape |
| 56 | lift loop assembly |
| 57 | fill/top spout |
| 58 | discharge spout/tube |
| 59 | lift loop panel/patch |
| 60 | lift loop |

-continued

| PART NUMBER | DESCRIPTION |
|---|---|
| 61 | bottom cover/diaper/bottom flap |
| 62 | fabric tape (e.g., ½ × 1 inch) (1.27 × 2.54 cm) |
| 63 | rolled up discharge tube portion |
| 64 | diaper/bottom flap pull tab |
| 65 | fusion area fill spout/top |
| 66 | fusion area top/body |
| 67 | fusion area bottom/body |
| 68 | fusion area bottom/discharge tube |
| 69 | string/tie strap |
| 71 | tape |
| 71a | tape (e.g., 1-inch) (2.54 cm) |
| 71b | tape (e.g., 1-inch) (2.54 cm) |
| 72 | tape (e.g., 2-inch) (5.08 cm) |
| 73 | document pouch |
| 74 | label/warning |
| 75 | slit |
| 76 | opening |
| 77 | slit |
| 78 | opening bottom |
| 79 | opening |
| 80 | opening |
| 81 | top lower portion |
| 83 | bottom upper portion |
| 84 | tape fold |
| 85 | fold line loop patch |
| 90 | fabric |
| 91 | weft |
| 92 | warp |
| 94 | bottom upper side |
| 100 | open wider side top |
| 101 | open narrower side top |
| 102 | open narrower portion bottom |
| 103 | open wider portion bottom |
| 104 | bottom side bottom |
| 105 | diaper fold |
| 106 | diaper fold |
| 107 | bottom portion of bag |
| 108 | top portion discharge tube |
| 109 | bottom portion discharge tube |
| 110 | upper portion fill spout |
| 111 | lower portion fill spout |
| 112 | first side fill spout |
| 113 | second side fill spout |
| 114 | center |
| 115 | front side fill spout |
| 116 | back side fill spout |
| 117 | fill spout gusset |
| 118 | fill spout gusset |
| 121 | top flap |
| 122 | top flap |
| 123 | top flap |
| 124 | top flap |
| 125 | center point top |
| 126 | joint fill spout/top |
| 127 | joint top/body |
| 128 | joint body/bottom |
| 129 | joint bottom/discharge tube |
| 130 | interior surface fill spout |
| 131 | exterior surface fill spout |
| 132 | interior surface top |
| 133 | exterior surface top |
| 134 | interior surface body |
| 135 | exterior surface body |
| 136 | interior surface bottom |
| 137 | exterior surface bottom |
| 138 | interior surface discharge tube |
| 139 | exterior surface discharge tube |
| 141 | top first fold side |
| 142 | top second fold side |
| 143 | top front side |
| 144 | top back side |
| 145 | bottom first fold side |
| 146 | bottom second fold side |
| 147 | bottom front side |
| 148 | bottom back side |
| 149 | top gusset |

-continued

| PART NUMBER | DESCRIPTION |
|---|---|
| 150 | top gusset |
| 152 | center point |
| 153 | bottom flap |
| 154 | bottom flap |
| 155 | bottom flap |
| 156 | bottom flap |
| 159 | body gusset |
| 160 | body gusset |
| 161 | upper portion body |
| 162 | lower portion body |
| 163 | first side body |
| 164 | second side body |
| 165 | front side body |
| 166 | back side body |
| 168 | open top portion |
| 169 | open bottom portion |
| 170 | center |
| 171 | discharge tube first side |
| 172 | discharge tube second side |
| 173 | discharge tube front side |
| 174 | discharge tube back side |
| 175 | open top portion discharge tube |
| 176 | open bottom portion discharge tube |
| 177 | discharge upper portion |
| 178 | bottom gusset |
| 179 | bottom gusset |
| 180 | center |
| 185 | fold line top/bottom |
| 186 | corner |
| 187 | corner |
| 188 | corner |
| 189 | corner |
| 191 | fusion coating |
| 192 | standard coating |
| 200 | carrier plate |
| 201 | spout guides |
| 202 | tooling location points |
| 203 | holding clamps |
| 204 | body guides/or stiffening support |
| 205 | top/bottom guides |
| 211 | opening |
| 212 | opening |
| 213 | opening |
| 214 | opening |
| 215 | opening |
| 232 | finish/unload table |
| 250 | main body assembly table |
| 251 | diaper/lift loop assembly table |
| 253 | return/conveyer table |
| 254 | first end carrier plate |
| 255 | second end carrier plate |
| 256 | arrow |
| 257 | arrow |
| 260 | zero point tape press assembly |
| 261 | zero point taping press table assembly |
| 262 | bridge with press bar sub-assembly |
| 263 | lower bracket support (e.g., 16" (40.64 cm) seal bar) |
| 264 | hex head bolt (e.g., ¾-10, 4½" (10.2-1.27 cm), stainless steel) |
| 265 | flat washer (e.g., ¾ stainless steel) |
| 266 | hex nut (e.g., ¾-10 stainless steel) |
| 271 | table frame |
| 272 | zero point taping press table top left side |
| 273 | loop impulse heat sealer table top right side |
| 274 | spout/top/bottom/body impulse heat sealer-table top-splice plate |

-continued

| PART NUMBER | DESCRIPTION |
|---|---|
| 275 | flat head socket cap screw (e.g., ¼-20, 1½" (2.5-1.3 cm) L stainless steel) |
| 276 | flat washer (e.g., ¼" (.64 cm) stainless steel) |
| 277 | hex nut (e.g., ¼-20 stainless steel) |
| 278 | table top |
| 279 | table portion |
| 281 | loop impulse heat sealer table leg |
| 282 | loop impulse heat sealer table base pad |
| 283 | loop impulse heat sealer table end cross member |
| 284a | loop impulse heat sealer table side cross member |
| 284b | loop impulse heat sealer table internal side cross member |
| 285 | loop impulse heat sealer table frame-mid brace |
| 286 | table frame corner brace |
| 300 | body impulse sealer machine |
| 301 | upper fill spout seal bar assembly |
| 302 | upper top seal bar assembly |
| 303 | document pouch seal bar |
| 304 | upper bottom seal bar assembly |
| 305 | mounting table |
| 306 | upper discharge spout seal bar assembly |
| 307 | two axes pivot yoke |
| 308 | bridge assemblies |
| 309 | pneumatic cylinders |
| 310 | long nylon ramp |
| 311 | long nylon ramp |
| 312 | short nylon ramp |
| 313 | short nylon ramp |
| 314 | short wide spacer plate |
| 315 | short narrow spacer plate |
| 316 | seal bar support channel |
| 317 | lower discharge spout seal bar assembly |
| 318 | lower bottom heat seal bar |
| 319 | long narrow spacer plate |
| 320 | long narrow spacer plate |
| 321 | lower top heat seal bar assembly |
| 322 | lower fill spout seal bar assembly |
| 331 | heat sealing system |
| 332 | heat sealing system |
| 333 | heat sealing system |
| 334 | heat sealing system |
| 336 | heat sealing system |
| 341 | opening |
| 342 | opening |
| 343 | opening |
| 344 | opening |
| 346 | opening |
| 351 | zero point taping press - bridge sub-assembly |
| 352 | pneumatic cylinder speedaire (e.g., #5VLH2) |
| 353 | hex head cap screw (e.g., ⅜-16, 11¼" L stainless steel) |
| 354 | Clevis (e.g., McMaster-Carr #6211K66) |
| 355 | hardened precision shaft (e.g., ¾", 8" L steel - McMaster-Carr #6061K105) |
| 356 | flat washer (e.g., ¾" (1.9 cm) nylon -McMaster-Carr #92150A112) |
| 357 | one piece clamp-on shaft collar (e.g., ¾" (1.9 cm) aluminum - McMaster-Carr #6157K16) |
| 358 | seal bar position bracket |
| 359 | seal bar slotted position bracket |
| 360 | all thread rod (¼-20 × 7 L) |

-continued

| PART NUMBER | DESCRIPTION |
|---|---|
| 361 | flat washer (e.g., ¼" (.635 cm) stainless steel) |
| 362 | cap nut (e.g., ¼-20 steel, nickel plated) |
| 363 | press block |
| 365 | opening |
| 371 | top cross support |
| 372 | cylinder mount bracket |
| 373 | frame spacer |
| 374 | left vertical longitudinal support |
| 375 | right vertical longitudinal support |
| 376 | bottom bracket |
| 377 | long all thread rod (e.g., ⅜-16 × 7¾) |
| 378 | flat washer (e.g., ⅜" (.95 cm) stainless steel) |
| 379 | cap nut (e.g., ⅜-16 steel, nickel plated) |
| 380 | cover/document pouch assembly |
| 381 | table assembly |
| 382 | lower bracket support (e.g., 16" (40.6 cm) seal bar) |
| 383 | spout to top/bottom frame sub-assembly |
| 384 | flat washer (e.g., ¾" (1.9 cm) stainless steel) |
| 385 | hex nut (e.g., ¾-10 stainless steel) |
| 386 | hex head bolt (e.g., ¾-10, 5" L stainless steel) |
| 387 | cover heat seal with brackets sub-assembly |
| 388 | cover heat seal bar sub-assembly |
| 389 | lower bracket support - spout to top/bottom seal bar |
| 390 | flat washer (e.g., ⅜" (.95 cm) stainless steel) |
| 391 | socket head cap screw (e.g., ⅜-16, 1⅝" L stainless steel) |
| 392 | opening |
| 393 | toss document pouch heat seal bar sub-assembly |
| 394 | clevis, e.g., McMaster Carr #6211K66 |
| 395 | shaft, e.g., hardened precision shaft (¾" φ, 5" L steel - McMaster-Carr #6061K44) |
| 396 | shaft collar, e.g., one piece clamp on shaft collar (¾" φ, aluminum McMaster Carr #6157K16) |
| 397 | document pouch heat insulation pad |
| 398 | bottom cover heat sealing assembly |
| 399 | document pouch heat sealing assembly |
| 400 | loop/diaper impulse sealer machine |
| 401 | three axes pivot yoke |
| 402 | loop seal bar |
| 403 | pneumatic cylinders |
| 404 | bridge assemblies |
| 405 | two axes pivot yoke |
| 406 | diaper seal bar |
| 407 | mounting table |
| 408 | short nylon ramp |
| 409 | short narrow spacer plate |
| 410 | seal bar support channel |
| 411 | lower diaper seal bar |
| 412 | right lower loop seal bars |
| 413 | second lower loop seal bars |
| 414 | edge |
| 415 | edge |
| 416 | edge |
| 417 | edge |
| 420 | second upper heat sealing bar |
| 421 | heat sealing assembly |

-continued

| PART NUMBER | DESCRIPTION |
|---|---|
| 422 | heat sealing assembly |
| 423 | heat sealing assembly |
| 431 | opening |
| 432 | opening |
| 433 | opening |
| 434 | bottom cover heat seal bar assembly |
| 441 | arrow |
| 443 | pin axis |
| 444 | pin axis |
| 445 | pin/shaft |
| 446 | pin/shaft |
| 447 | opening |
| 448 | slotted opening |
| 449 | arrow |
| 450 | main body cart |
| 451 | platform, e.g., U-Boat truck platform |
| 452 | parts platform |
| 453 | document pouch holder |
| 454 | parts cage rods |
| 455 | pin axis |
| 456 | arrow |
| 457 | arrow |
| 458 | bracket |
| 459 | arrow |
| 460 | loop/diaper cart |
| 461 | platform, e.g., U-Boat truck platform |
| 462 | parts platform |
| 463 | parts cage rods |
| 464 | arrow |
| 465 | pin axis |
| 467 | arrow |
| 468 | arrow |
| 469 | pin axis |
| 470 | opening |
| 471 | spout/top/bottom/body impulse heat sealer - table frame sub-assembly |
| 472 | spout/top/bottom/body impulse heat sealer - table top - right section |
| 473 | spout/top/bottom/body impulse heat sealer - table top - splice plate |
| 474 | screw, e.g., flat-head socket cap screw (¼-20, 1⅛" L stainless steel) |
| 475 | spout/to/bottom/body impulse heat sealer-table top - left section |
| 476 | spout/top/bottom/body impulse heat sealer - table top - middle section |
| 477 | flat washer (e.g., ¼" (.64 cm) stainless steel) |
| 478 | hex nut (e.g., ¼-20 stainless steel) |
| 479 | table top |
| 481 | table frame leg |
| 482 | table frame leg - base pad |
| 483 | table frame horizontal - cross member |
| 484a | table frame front or back side horizontal member |
| 484b | table frame interior front or back side horizontal member |
| 485 | table frame brace |
| 486 | table frame internal horizontal member |
| 487 | table frame internal horizontal cross member |
| 491 | bar frame sub-assembly (e.g., 16" steel (40.6 cm)) |
| 492 | air cylinder (e.g., Speedaire #5VLC4) |
| 493 | shaft or pin |

-continued

| PART NUMBER | DESCRIPTION |
|---|---|
| 494 | lower bracket |
| 495 | slotted opening |
| 496 | opening |
| 497 | opening |
| 500 | heat sealing bar system |
| 501 | twin fail-safe temperature sensors |
| 502 | water cooling lines |
| 503 | nylon washer |
| 504 | clamping collar |
| 505 | acorn nut |
| 506 | washer |
| 507 | pivot mounting plate |
| 508 | threaded rod |
| 509 | pivot yoke |
| 510 | seal bar assembly |
| 511 | seal bar pivot yoke assembly |
| 512 | single piece heating element |
| 513 | sealing element pivot mount |
| 514 | insulation tape |
| 515 | interior mounting flange |
| 516 | exterior mounting flange |
| 517 | clamping plate |
| 518 | springs |
| 519 | clamp bars |
| 520 | insulation pad |
| 521 | heating element cover (e.g., of Teflon) |
| 531 | top cross support |
| 532 | frame spacer |
| 533 | cylinder combined bracket (e.g., 7" (17.8 cm) spacing) |
| 534 | left vertical support |
| 535 | bottom bracket |
| 536 | right vertical support |
| 537 | long all threaded rod (e.g., ⅜-16 × 7¾ L) |
| 538 | flat washer (e.g., ⅜" (.95 cm) stainless steel) |
| 539 | cap nut (e.g., ⅜-16 steel, nickel plated) |
| 541 | upper cover heat seal bar assembly |
| 542 | all thread rod (¼-20, 5" L) |
| 543 | flat washer (e.g., ¼ stainless steel) |
| 544 | crown nut (e.g., ¼-20 stainless steel) |
| 545 | seal bar position bracket |
| 546 | seal bar slotted position bracket |
| 550 | heat sealing system |
| 551 | seal bar assembly |
| 552 | washer |
| 553 | acorn nut |
| 554 | nylon washer |
| 555 | clamping collar |
| 556 | yoke mount/bracket |
| 557 | twin fail-safe temperature sensors |
| 558 | pivot mounting plate |
| 559 | pivot yoke/clevis |
| 560 | pivot rod/shaft/pin |
| 561 | clamping plate |
| 562 | exterior mounting flange |
| 563 | interior mounting flange |
| 564 | insulation tape |
| 565 | springs |
| 566 | sealing element pivot mount |
| 567 | clamp bars |
| 568 | water cooling lines |
| 569 | single piece heating element |
| 570 | heating element cover (e.g., of Teflon) |
| 571 | insulation pad |
| 572 | opening |
| 573 | slotted opening |
| 581 | main body/attachment plate |
| 582 | heat insulating pad |
| 583 | heating element |

-continued

| PART NUMBER | DESCRIPTION |
|---|---|
| 584 | heat strip tension sub-assembly |
| 585 | heat strip mounting end |
| 586 | heat strip retaining cap |
| 587 | stand off block |
| 588 | double washer |
| 589 | wire tie wraps |
| 591 | dowel pin (e.g., ⅛" φ, ⅝ L stainless steel) |
| 592 | dowel pin (e.g., 3/16" φ, ¾" (1.9 cm)L stainless steel) |
| 593 | flat head screw (e.g., 4-40, 7/16" L stainless steel) |
| 594 | flat head screw (e.g., 4-40, ¾" (1.9 cm) L stainless steel) |
| 595 | button head socket screw (e.g., 10-24, ⅝" L stainless steel) |
| 596 | PTFE coated cloth tape (e.g., 11.7 mil (.29 mm) thick) |
| 597 | tee nut insert for wood (e.g., 10-24 stainless steel) |
| 599 | screen |
| 600 | control panel |
| 601 | PLC controller |
| 602 | solid state relay |
| 603 | transformer |
| 604 | heating element |
| 605 | thermocouple sensor |
| 606 | 316 stainless steel shoulder screw (e.g., 3/16" diameter × 1½" long shoulder, 8-32 thread) |
| 607 | tension end cap |
| 608 | pivot peg |
| 609 | 316 stainless steel 8-32 hex nut |
| 610 | impulse heat seal bar heat strip tension sub-assembly |
| 611 | modified toss document attachment plate |
| 612 | yoke attachment |
| 613 | seal bar slotted position bracket |
| 614 | seal bar position bracket |
| 615 | all threaded rod (e.g., ¼-20, 5" L) |
| 616 | flat washer (e.g., ¼" (.64 cm) stainless steel) |
| 617 | cap nut (e.g., 1/−20 stainless steel) |
| 618 | socket head cap screw (e.g., ¼-20, 1½" L stainless steel) |
| 619 | (nominal) heating element (e.g., 18½") |
| 620 | (nominal) heating element (17") (43.2 cm) |
| 621 | PTFE coated cloth tape (e.g., 11.7 mil (.29 mm) thick) |
| 630 | spout/top/body/bottom heat sealer assembly |
| 631 | table sub-assembly |
| 632 | spout/tube to top/bottom heat sealing frame assembly |
| 633 | spout to top/bottom heat bar upper sub-assembly |
| 634 | lower bracket support-top/bottom to body seal bar |
| 635 | hex nut (e.g., ¾" (1.9 cm) stainless steel) |
| 636 | flat washer (e.g., ¾" (1.9 cm) stainless steel) |
| 637 | hex head screw (e.g., ¾-10, 5" L stainless steel) |
| 638 | impulse heat sealing bar assembly (e.g., 16.5" (41.9 cm)) |
| 639 | top/bottom to body frame sub-assembly |
| 640 | top/bottom to body heat bar upper sub-assembly |
| 641 | impulse heat sealing bar assembly (e.g., 43.5" (110.5 cm)) |

-continued

| PART NUMBER | DESCRIPTION |
|---|---|
| 642 | lower bracket support-spout/tube to top/bottom seal bar |
| 643 | flat washer (e.g., ⅜" (.95 cm) stainless steel) |
| 644 | HX-SHCS (e.g., 0.375-16 × 1.625-N) |
| 645 | spout/tube to top/bottom heat sealing assembly |
| 646 | top/bottom to body heat sealer assembly |
| 647 | table top |
| 648 | opening |
| 649 | opening |
| 651 | spout/top/bottom body impulse heat sealer-table frame sub-assembly |
| 652 | spout/top/bottom/body impulse heat sealer- table top-left section |
| 653 | spout/top/bottom/body impulse heat sealer - table top-middle section |
| 654 | spout/top/bottom/body impulse seat sealer - table top -right section |
| 655 | spout/top/bottom/body impulse heat sealer - table top - splice plate |
| 656 | flat head socket screw (e.g., ¼-20, 1⅛" L |
| 657 | flat washer (e.g., ¼" (.64 cm) stainless steel) |
| 658 | hex nut (e.g., ¼-20 stainless steel) |
| 559 | arrow |
| 661 | table frame leg |
| 662 | table frame leg - base pad |
| 663 | table frame horizontal cross member end |
| 664 | table frame horizontal member front and back sides |
| 665 | table frame brace |
| 666 | table frame internal horizontal member front and back sides |
| 667 | table frame internal horizontal cross member |
| 668 | seal bar frame sub-assembly (e.g., 16" (40.6 cm)) |
| 669 | air cylinder, Speedair #5VLC4 |
| 671 | top cross support |
| 672 | frame spacer |
| 673 | cylinder combined bracket (e.g., 7" (17.8 cm) spacing) |
| 674 | left vertical support |
| 675 | bottom bracket |
| 676 | right vertical support |
| 677 | long all threaded rod (e.g., ⅜-16 × 7¾) |
| 678 | flat washer e.g., (⅜" (.95 cm) stainless steel) |
| 679 | cap nut (e.g., ⅜-16 steel, nickel plated) |
| 680 | arrows |
| 681 | seal bar positioned bracket |
| 682 | seal bar slotted position bracket |
| 683 | arrow |
| 684 | crown nut (e.g., ¼-20 steel, nickel plated) |
| 685 | one piece clamp on shaft collar (e.g., ¾" φ, aluminum - McMaster-Carr #6157K16) |
| 686 | bottom seal bar |
| 687 | impulse heat sealing bar assembly (e.g., 16.5" (41.9 cm)) |
| 688 | hardened precision shaft (e.g., ¾ φ, 5" L steel) |
| 689 | Clevis-McMaster-Carr #6211K66 |
| 690 | all threaded rod (e.g., ¼-20, 5" L) |

-continued

| PART NUMBER | DESCRIPTION |
|---|---|
| 691 | flat washer (e.g., ¾" (1.9 cm) nylon -McMaster-Carr #92150A112) |
| 692 | flat washer (e.g., ¼" (.64 cm) stainless steel) |
| 693 | opening |
| 694 | slotted opening |
| 700 | automated heat sealed bulk bag |
| 710 | heat sealing system |
| 711 | seal bar frame sub-assembly (e.g., 43" (109.2 cm)) |
| 712 | air cylinder, Speedaire #5VLH2 |
| 720 | heat sealing bar |
| 721 | top cross support |
| 722 | frame spacer |
| 723 | cylinder combined bracket (e.g., 21" (53.3 cm) spacing |
| 724 | all thread rod (e.g., ⅜, 16 × 7¾ long) |
| 725 | left vertical support |
| 726 | bottom bracket |
| 727 | right vertical support |
| 728 | flat washer (e.g., ⅜ stainless steel) |
| 729 | crown nut (e.g., steel, ⅜, 16 nickel-plated) |
| 731 | main body |
| 732 | heat insulating pad |
| 733 | heating element |
| 734 | heat strip tension sub-assembly |
| 735 | heat strip mounting end |
| 736 | heat strip retaining cap |
| 737 | stand off block |
| 738 | double washer |
| 739 | wire tie wraps |
| 740 | button head socket cap screw (e.g., 10-24, ⅝" L stainless steel) |
| 741 | flat head cap screw (e.g., 4-40, ⅜" L stainless steel) |
| 742 | button head socket cap screw (e.g., 4-40, ¾" (1.9 cm) L stainless steel) |
| 743 | dowel pin (e.g., 3/16" φ, ¾" L stainless steel) |
| 744 | dowel pin (e.g., ⅛" φ, ⅝ L stainless steel) |
| 746 | PTFE coated cloth tape (e.g., 11.7 mil (.29 mm) thick) |
| 747 | PTFE coated cloth tape (e.g., 11.7 (.29 mm) mil thick) |
| 748 | tee nut insert for wood (e.g., 10-24 stainless steel) |
| 751 | impulse heat sealing bar assembly (e.g., 37.5" or 43.5" (95.2 or 110.5 cm)) |
| 752 | seal bar position bracket |
| 753 | seal bar slotted position bracket |
| 754 | one piece clamp-on shaft collar (e.g., ¾" (1.9 cm) aluminum) |
| 755 | thread rod (e.g., ¼, 20 × 4¼ L all thread rod) |
| 756 | crown nut (e.g., ¼" (.64 cm), 20 stainless steel |
| 757 | clevis |
| 758 | hardened precision shaft (e.g., ¾"φ, 5" L steel) |
| 759 | flat washer (e.g., ¼" (.64 cm) stainless steel) |
| 760 | flat washer (e.g., ¾" (1.9 cm) nylon) |
| 761 | main body |
| 762 | stand-off block |
| 763 | wire tie wraps |
| 764 | heat strip tension sub-assembly |
| 765 | heat strip mounting end |
| 766 | heat strip retaining cap |
| 767 | double washer |

-continued

| PART NUMBER | DESCRIPTION |
|---|---|
| 768 | heating element |
| 769 | heat insulating pad |
| 770 | button-head socket cap screw (e.g., 10-24, ⅝" (1.59 cm) L) |
| 771 | flat head screw, e.g., stainless steel (e.g., 4-40, ¾" (1.9 cm) L) |
| 772 | flat head cap screw (e.g., 4-40, ⅜" L) |
| 773 | dowel pin (e.g., 3/16" ϕ, ¾" (1.9 cm) L stainless steel) |
| 774 | dowel pin (e.g., ⅛" ϕ, ⅝" L stainless steel) |
| 776 | compression spring (e.g., 1¼" L, 360" o.d., .051) wire, zinc plated steel |
| 777 | ptfe coated cloth tape (e.g., 11.7 mil (.29 mm) thick) |
| 778 | tee nut insert for wood (e.g., 10-24, stainless steel) |
| 781 | loop impulse heat sealer table sub-assembly |
| 782 | frame with pneumatic cylinders & heat bar sub-assembly |
| 783 | right hand upper heating head sub-assembly |
| 785 | left hand upper heating head sub-assembly |
| 786 | right hand lower heat bar sub-assembly |
| 787 | right handed lower heating head sub-assembly |
| 788 | lower bracket support (e.g., 16" (40.6 cm) seal bar) |
| 789 | flat washer (e.g., ¾" (1/9 cm), stainless steel) |
| 790 | hex head cap screw (e.g., ¾-10, 5" L, stainless steel) |
| 791 | hex nut (e.g., ¾-10, stainless steel) |
| 793 | flat washer (e.g., ⅜" (.95 cm), stainless steel) |
| 794 | socket head cap screw (e.g., ⅜-16, 1⅝" L, stainless steel) |
| 795 | left loop heat sealer assembly |
| 796 | right loop heat sealer assembly |
| 801 | loop impulse heat sealer table frame sub-assembly |
| 802 | loop impulse heat sealer table top left side |
| 803 | loop impulse heat sealer table top right side |
| 804 | spout/top/bottom/body impulse heat sealer-table top-splice plate |
| 805 | flat-head socket cap screw (e.g., ¼-20, 1½" (3.8 cm) L, stainless steel) |
| 806 | flat washer (e.g., ¼, stainless steel) |
| 807 | hex nut (e.g., ¼-20, stainless steel) |
| 808 | table top |
| 809 | opening |
| 810 | opening |
| 811 | loop impulse heat sealer table leg |
| 812 | loop impulse heat sealer table base pad |
| 813 | loop impulse heat sealer table long top |
| 814 | loop impulse heat sealer table short cross member |
| 814a | interior side of front and back cross members |
| 814b | internal front and back cross members |
| 815 | table frame brace |
| 816 | loop impulse heat sealer table frame-mid brace |

| PART NUMBER | DESCRIPTION |
|---|---|
| 821 | loop impulse heat sealer heat bar frame sub-assembly |
| 822 | slew drive cylinder mount |
| 823 | pneumatic cylinder |
| 824 | flat head socket crew (e.g., 3/8-16, 1 1/4" L, stainless steel) |
| 825 | flat washer (e.g., 3/8" (.95 cm) stainless steel) |
| 827 | nut |
| 828 | hex head screw (e.g., 3/8-16, 2 1/4" L, stainless steel) |
| 829 | frame assembly |
| 831 | top cross support |
| 832 | frame spacer |
| 833 | cylinder combined bracket (e.g., 7" spacing) |
| 834 | left vertical support |
| 835 | right vertical support |
| 836 | bottom bracket |
| 837 | all thread rod (e.g., 3/8-16 × 7 3/4 long) |
| 838 | flat washer (e.g., 3/8" (.95 cm), stainless steel) |
| 839 | cap nut (e.g., 3/8-16, steel, nickel plated) |
| 841 | left hand lower heating head sub-assembly |
| 842 | slew drive lower bracket |
| 843 | slew drive lower mount bracket |
| 844 | slew drive lower mount bracket |
| 845 | slew drive upper right bracket |
| 846 | slew drive upper left bracket |
| 847 | flat washer (e.g., 3/8" (.95 cm), stainless steel) |
| 848 | socket head cap screw (e.g., 3/8-16, 1 3/4" (4.44 cm) L, stainless steel) |
| 849 | one piece clamp-on shaft collar, (e.g., 3/4" (1.9 cm) aluminum) |
| 850 | hardened precision shaft (e.g., 3/4" ϕ, 12" L, stainless steel) |
| 851 | thread rod (e.g., 1/4-20 × 6 1/8" L all thread rod) |
| 853 | cap nut (e.g., 3/8-16, steel, nickel plated) |
| 854 | flat washer (e.g., 1/4" (.64 cm), stainless steel) |
| 856 | clevis |
| 857 | cap nut (e.g., 1/4-20, steel, nickel plated) |
| 858 | shaft (e.g., hardened precision shaft, 3/4" ϕ, 7" L, steel) |
| 859 | thread rod (e.g., 1/4-20 × 10 5/8 long all thread rod) |
| 860 | flat washer (e.g., 3/4" (1.9 cm), nylon) |
| 861 | main body |
| 862 | heat insulating pad (e.g., 7.875" (20 cm)) |
| 863 | heat insulating pad (e.g., 18.625" (47.3) |
| 864 | heating element |
| 865 | heating element |
| 866 | heat strip tension sub-assembly |
| 867 | heat strip mounting pad |
| 868 | heat strip retaining cap |
| 869 | stand-off block |
| 870 | double washer |
| 871 | wire tie wraps |
| 872 | screw (e.g., button head socket cap screw, 10-24, 5/8" (1.59 cm) L, stainless steel) |
| 873 | screw (e.g., button head socket cap screw, 4-40, 3/4" (1.9 cm) L, stainless steel) |

| PART NUMBER | DESCRIPTION |
|---|---|
| 874 | screw (e.g., button head socket cap screw, 4-40, 3/4" (1.9 cm) L, stainless steel) |
| 875 | pin (e.g., dowel pin, 3/16" ϕ, 3/4" (1.9 cm) L, stainless steel) |
| 876 | pin (e.g., dowel pin, 1/8" ϕ, 5/8 L, stainless steel) |
| 877 | compression spring (e.g., 1 1/4" L, .360" o.d., .041" wire zinc plated steel) |
| 878 | seal bar edge guide |
| 879 | tape (e.g., ptfe coated cloth tape, 11.7 mil (.29 mm) thick) |
| 880 | tee nut insert for wood (e.g., 10-24, stainless steel) |
| 881 | flathead screw (e.g., 6-32, 7/16" L, stainless steel) |
| 882 | screw (e.g., button head socket screw, 6-32, 5/8" L, stainless steel) |
| 883 | loop seal bar assembly |
| 884 | loop seal bar assembly |
| 885 | loop seal bar assembly |
| 886 | loop seal bar assembly |
| 887 | space/opening |
| 891 | right handed lower heating head sub-assembly |
| 892 | slew drive lower bracket |
| 893 | slew drive lower mount bracket |
| 894 | slew drive lower mount bracket |
| 895 | slew drive upper right bracket |
| 896 | slew drive upper left bracket |
| 897 | flat washer (e.g., 3/8" (.95 cm), stainless steel) |
| 898 | socket head cap screw (e.g., 3/8-16, 1 3/4" L, stainless steel) |
| 899 | shaft collar (e.g., one piece clamp-on shaft collar, 3/4"(1.9 cm), aluminum) |
| 900 | shaft, e.g., hardened precision shaft (3/4"(1.9 cm) ϕ, 12" L, steel) |
| 901 | thread rod (e.g., 1/4-20 × 6 1/8" all thread rod) |
| 903 | cap nut (e.g., 3/8-16, steel, nickel plated) |
| 904 | washer (e.g., 1/flat washer, 1/4" stainless steel) |
| 906 | clevis |
| 907 | cap nut (e.g., 1/4-20, steel, nickel plated) |
| 908 | shaft (e.g., hardened precision shaft, 3/4" (1.9 cm) ϕ, 7" L, steel) |
| 909 | thread rod (e.g., 1/4-20 × 10 5/8 long all thread rod) |
| 910 | flat washer (e.g., 3/4" nylon) |
| 911 | upper main body |
| 912 | heat insulating pad (e.g., 7.875") |
| 913 | heat insulating pad (e.g., 18.625") |
| 914 | heating element |
| 915 | heating element |
| 916 | heat strip tension sub-assembly |
| 917 | heat strip mounting pad |
| 918 | heat strip retaining cap |
| 919 | stand-off block |
| 920 | double washer |
| 921 | wire tie wraps |
| 922 | screw (e.g., button head socket cap screw, 10-244, 5/8" L stainless steel) |
| 923 | screw (e.g., button head socket screw, 4-40, 3/4" (1.9 cm) L, stainless steel) |
| 924 | screw (e.g., button head socket screw, 4-40, 7/16" L, stainless steel) |
| 925 | pin (e.g., dowel pin, 3/16"ϕ, 3/4" (1.9 cm) L, stainless steel) |

-continued

| PART NUMBER | DESCRIPTION |
|---|---|
| 926 | pin (e.g., dowel pin, 1/8" φ, 5/8 L, stainless steel) |
| 927 | spring (e.g., compression spring, 1 1/4" L, .360" o.d., .041" wire, zinc plated steel) |
| 929 | tape (e.g., ptfe coated cloth tape, 11.7 mil (.29 mm) thick) |
| 930 | tee nut insert for wood (e.g., 10-24, stainless steel) |
| 931 | screw (e.g., flat head screw, 6-32, 7/16" L, stainless steel) |
| 940 | gusseting assembly |
| 941 | frame sub-assembly |
| 942 | upper creasing sub-assembly |
| 943 | upper bearing platform-upper cylinder bracket |
| 944 | lower creasing sub-assembly |
| 945 | lower bearing platform-lower cylinder bracket |
| 946 | flat washer (e.g., 1/4", stainless steel) |
| 947 | locknut (e.g., 1/4-20, stainless steel w/nylon insert) |
| 948 | screw (e.g., socket head cap screw, 1/4-20, 1" L stainless steel) |
| 949 | nut (e.g., lock nut, 5/16-18, stainless steel w/nylon insert) |
| 950 | rod bracket spacer (e.g., 2) |
| 951 | low profile block (e.g., 1 1/2") |
| 952 | shaft (e.g., 1 1/2" (3.8 cm) diameter carbon steel, 24" long) |
| 953 | rod bracket spacer (e.g., 3/8" (.95 cm)) |
| 954 | flat washer (e.g., 5/16, stainless steel) |
| 955 | screw (e.g., socket head cap screw, 5/16-18, 2 1/2" L, stainless steel) |
| 956 | screw (e.g., socket head cap screw, 5/16-18, 4 1/2" L, stainless steel) |
| 957 | frame- frame brace |
| 958 | frame- frame cross member |
| 959 | frame- side frame support |
| 960 | frame- reinforcing plate |
| 961 | upper vertical platform sub-assembly |
| 962 | upper creasing bar sub-assembly |
| 963 | screw (e.g., hex head cap screw 1/4-20, 1 1/2" (3.8 cm) L, stainless steel) |
| 964 | flat washer (e.g., 1/4" stainless steel) |
| 965 | nut (e.g., locknut, 1/4-20, stainless steel w/nylon insert) |
| 966 | bearing platform-vertical bearing spacer |
| 967 | screw (e.g., 1 1/2" (3.8 cm) bore, 9" (22.9 cm) long pillow block) |
| 968 | screw (e.g., hex head cap screw, 1/4-20, 2 1/2" L, stainless steel) |
| 969 | eye bracket |
| 970 | screw (e.g., hex head cap screw, bracket, 1/4-20, 1 1/4" L, stainless steel) |
| 971 | bracket (e.g., clevis bracket for 10 7/8" (27.62 cm) L stainless steel air cylinder) |
| 972 | air cylinder (e.g., 1 1/2"(3.8 cm) bore, 10 7/8" (27.62 cm) long air cylinder) |
| 973 | pin (e.g., 1/2" (1.3 cm) dia. × 2-14 L clevis pin) |
| 974 | rod clevis kit |
| 975 | screw (e.g., socket head cap screw, e.g., 1/4-20, 3/4" (1.9 cm) L, stainless steel) |
| 976 | bearing plate-spacer |
| 981 | upper bearing platform-cylinder mount |
| 982 | upper bearing platform-vertical bearing platform |
| 983 | washer (e.g., 1/4 preferred narrow flat washer) |
| 984 | locknut (e.g., 1/4-20, stainless steel w/nylon insert) |
| 985 | screw (e.g., button head socket screw, 1/4-20, 1 3/8" L, stainless steel) |
| 986 | rod clevis kit |
| 987 | pin (e.g., 1/2" dia. × 2-14 L clevis pin for items #9 & 15) |
| 988 | air cylinder (e.g., 2 1/2"(6.35 cm) bore × 10 1/2 (26.7 cm)" long stainless steel air cylinder) |
| 989 | clevis bracket |
| 990 | screw (e.g., socket head cap screw, 1/4-20, 7/8" (2.22 cm) L, stainless steel) |
| 991 | upper creasing bar-main body |
| 992 | creasing bar-gasket |
| 993 | creasing bar-cap plate |
| 994 | screw (e.g., socket head cap screw, 10-32, 7/8" (2.22 cm) L stainless steel) |
| 995 | standoff (e.g., aluminum standoff, 8-32, 1/2" (1.3 cm) L) |
| 996 | creasing bar-left pivot bracket |
| 997 | creasing bar-right pivot bracket |
| 998 | creasing bar-creasing cylinder front bracket |
| 999 | screw (e.g., socket head cap screw, 1/4-20, 3/4" (1.9 cm) L, stainless steel) |
| 1000 | screw (e.g., socket head cap screw, 1/4-20, 3/4" (1.9 cm) L, stainless steel) |
| 1001 | creasing bar-pivot bolt |
| 1002 | flat washer (e.g., 1/2" (1.3 cm), nylon) |
| 1003 | creasing bar-spacer |
| 1004 | creasing bar-left pivot mount |
| 1005 | creasing bar-right pivot mount |
| 1006 | flat washer (e.g., 1/2" (1.3 cm), stainless steel) |
| 1007 | lock nut (e.g., 1/2-13, stainless steel w/nylon insert) |
| 1008 | screw (e.g., socket head cap screw, 1/4-20, 2 3/4" (6.99 cm) L, stainless steel) |
| 1009 | flat washer (e.g., 1/4"(.64 cm), stainless steel) |
| 1010 | nut (e.g., hex nut, 14-20, stainless steel) |
| 1011 | bracket (e.g., modified speedaire #6X477 eye bracket) |
| 1012 | screw (e.g., button head socket screw, 1/4-20, 1" L, stainless steel) |
| 1013 | nut (e.g., hex nut, 1/2-13, stainless steel) |
| 1021 | lower vertical platform sub-assembly |
| 1022 | lower creasing bar sub-assembly |
| 1023 | washer (e.g., 1/4 preferred narrow flat washer) |
| 1024 | locknut (e.g., 1/4-20, stainless steel w/nylon insert) |
| 1025 | screw (e.g., socket head cap screw, e.g., 1/4-20, 1 1/2" (3.8 cm)L, stainless steel) |
| 1026 | bearing platform-vertical bearing spacer |
| 1027 | screw (e.g., 1 1/2" (3.8 cm) bore, 9" (22.9 cm) long pillow block) |

-continued

| PART NUMBER | DESCRIPTION |
|---|---|
| 1028 | screw (e.g., socket, head cap screw, ¼-20, 2½" L, stainless steel) |
| 1029 | eye bracket |
| 1030 | socket head cap screw (e.g., ¼-20, 1¼" L, stainless steel) |
| 1031 | clevis bracket (e.g., for 10⅞" (27.62 cm) L stainless steel air cylinder) |
| 1032 | pin (e.g., ½" (1.3 cm) dia. × 2-14 L clevis pin for items #9 & 15) |
| 1033 | air cylinder (e.g., 1½" (3.8 cm) bore, 10⅞" (27.62 cm) long air cylinder) |
| 1034 | screw (e.g., socket head cap screw, ¼-20, ¾" (1.9 cm) L, stainless steel) |
| 1035 | rod clevis kit |
| 1036 | bearing plate-spacer |
| 1041 | lower bearing platform-vertical bearing platform |
| 1042 | lower bearing platform-cylinder mount |
| 1043 | flat washer (e.g., ¼" (.64 cm), stainless steel) |
| 1044 | locknut (e.g., ¼-20, stainless steel w/nylon insert) |
| 1045 | screw (e.g., socket head cap screw, ¼-20, 1⅜" L, stainless steel) |
| 1046 | rod clevis kit |
| 1047 | pin (e.g., ½" dia. × 2-14 L clevis pin for items #9 & 15) |
| 1048 | air cylinder (e.g., 2½" bore × 10½" long stainless steel air cylinder) |
| 1049 | clevis bracket |
| 1050 | screw (e.g., socket head cap screw, ¼-20, ⅞" (2.22 cm) L, stainless steel) |
| 1051 | lower creasing bar-main body |
| 1052 | creasing bar-gasket |
| 1053 | creasing bar-cap plate |
| 1054 | screw (e.g., socket head cap screw, 8-32, ⅞" (2.22 cm) L, stainless steel) |
| 1055 | standoff (e.g., aluminum standoff, 8-32, ½" (1.27 cm) L) |
| 1056 | creasing bar-left pivot bracket |
| 1057 | creasing bar-spacer |
| 1058 | creasing bar-right pivot bracket |
| 1059 | flat washer (e.g., ½"(1.27 cm), nylon) |
| 1060 | hex nut (e.g., ½-13, stainless steel) |
| 1061 | creasing bar-left pivot mount |
| 1062 | creasing bar-right pivot mount |
| 1063 | lock nut (e.g., ½" (1.3 cm), stainless steel w/nylon insert) |
| 1064 | creasing bar-pivot bolt |
| 1065 | socket head cap screw (e.g., ¼-20, ¾" (1.9 cm) L stainless steel) |
| 1066 | socket head cap screw (e.g., ¼-20, 9/16" L, stainless steel) |
| 1067 | creasing bar-creasing cylinder front bracket |
| 1068 | flat washer (e.g., ¼" (.64 cm), stainless steel) |
| 1069 | hex nut (e.g., ¼-20, stainless steel |
| 1070 | modified speedaire #6x477 eye bracket) |
| 1071 | screw (e.g., socket head cap screw, e.g., ¼-20, 2¾" (6.99 cm) L, stainless steel) |
| 1072 | screw (e.g., button head cap screw, e.g., ¼-20, 1" L, stainless steel) |

-continued

| PART NUMBER | DESCRIPTION |
|---|---|
| 1073 | mounting clip for conveyor |
| 1074 | internal creasing press assembly |
| 1075 | button head socket screw (e.g., ¼-20, ⅜" L, stainless steel) |
| 1076 | partial conveyor top assembly |
| 1081 | press A sub-assembly |
| 1082 | press B sub-assembly |
| 1083 | air cylinder (e.g., 7½" (19.1 cm) long stainless steel air cylinder) |
| 1084 | air cylinder (e.g., 7" (17.8 cm) long stainless steel air cylinder) |
| 1085 | rod clevis kit |
| 1086 | press plate |
| 1087 | clevis bracket (e.g., for 2½" (6.35 cm) bore air cylinder) |
| 1088 | pivot bracket (e.g., for 2½" (6.35 cm) bore air cylinder) |
| 1089 | cylinder union bar |
| 1090 | tie rod |
| 1091 | pin (e.g., ½" (1.3 cm) dia × 2" long 18-8 stainless steel quick release pin) |
| 1092 | shaft (e.g., ½" (1.3 cm) dia. × 5" long 1566 steel) |
| 1093 | shaft, (e.g., type 303 stainless steel one-piece clamp-on shaft collar for 1/" dia. Shaft) |
| 1094 | flat washer (e.g., ½" (1.3 cm) nylon) |
| 1095 | washer, (e.g., ⅜ preferred narrow flat washer) |
| 1096 | locknut (e.g., 5/16-18, stainless steel w/nylon insert) |
| 1097 | screw (e.g., flat head socket screw, e.g., 5/16-18, 1⅜" L, stainless steel) |
| 1099 | screw (e.g., socket head cap screw, 5/16-18, 1⅜" L, stainless steel) |
| 1101 | top cross support |
| 1102 | cylinder platform |
| 1103 | support plate A |
| 1104 | flat washer (e.g., ⅜, stainless steel) |
| 1105 | lock nut (e.g., ⅜-16, stainless steel w/nylon insert) |
| 1106 | screw (e.g., socket head cap screw ⅜-16, 1½" (3.8 cm) L, stainless steel) |
| 1111 | top cross support |
| 1112 | cylinder platform |
| 1113 | support plate |
| 1114 | flat washer (e.g., ⅜-16, stainless steel) |
| 1115 | lock nut (e.g., ⅜-16, stainless steel with nylon insert) |
| 1116 | screw (e.g., socket head cap screw ⅜-16, 1½" L (3.8 cm), stainless steel) |
| 1121 | seal bar position bracket |
| 1122 | seal bar slotted position bracket |
| 1123 | cap nut (e.g., 14-20 stainless steel) |
| 1124 | steel collar (e.g., ¾ dia.) |
| 1125 | spout seal bar |
| 1126 | all thread rod (e.g., ¼-20, 5" L, stainless steel) |
| 1127 | steel shaft (e.g., ¾", 5" L) |
| 1128 | clevis (e.g., ¾-15 thread ¾" pin) |
| 1129 | flat washer (e.g., ¾" (1.9 cm) screw size, 0.765 id, nylon) |
| 1130 | flat washer (e.g., ¼" (.635 cm), stainless steel) |
| 1131 | retire |
| 1132 | bushing (e.g., reducing bushing, ¾" (1.9 cm) male × ½" (1.3 cm) female, stainless steel) |

-continued

| PART NUMBER | DESCRIPTION |
|---|---|
| 1141 | main body |
| 1142 | heat insulating pad |
| 1143 | heat strip tension block sub-assembly |
| 1144 | lower heat strip mount |
| 1145 | fastener-mount cable tie holder with adhesive back |
| 1146 | screw (e.g., stainless steel button head socket cap screw 10-24 × 0.625) |
| 1147 | upper heat strip mount |
| 1148 | pin (e.g., ⅛" (.32 cm) dia., ⅝" (1.59 cm) L, stainless steel) |
| 1149 | pin (e.g., 316 stainless steel dowel pin 3/16" (.48 cm) diameter ¾" (1.9 cm) length) |
| 1150 | heat strip retaining cap |
| 1151 | heating element |
| 1152 | tape (e.g., ptfe coated cloth tape 11.7 mil (.29 mm) thick) |
| 1153 | tape (e.g., ptfe coated cloth tape 11.7 mil (.29 mm) thick) |
| 1154 | tee nut insert (e.g., stainless steel, 10-24 thread) |
| 1155 | screw (e.g., button head socket cap screw 4-40, 7/15"(1.2 cm) L) |
| 1156 | lower transducer low angle wire restraint |
| 1157 | upper transducer low angle wire restraint |
| 1158 | screw (e.g., button head socket screw, 4-40, 1⅓" L, stainless steel) |
| 1159 | tube (e.g., straight male, ¼" (.64 cm) tube, ¼" (.64 cm) npt nickel plated brass) |
| 1160 | tubing (e.g., ¼" (.64 cm) od × 17" (.43 cm) id polyethylene tubing) |
| 1161 | tubing (e.g., ¼" (.64 cm) od × 17" (.43 cm) id polyethylene tubing) |
| 1162 | clip (e.g., 2¼" (5.715 cm) long clip) |
| 1163 | screw (e.g., button head socket screw, 6-32, ½" (1.3 cm) L, stainless steel) |
| 1164 | clip (e.g., 32" (82.3 cm) long clip) |
| 1165 | clip (e.g., 10⅝" long clip) |
| 1166 | cover (e.g., 11" (.28 cm) heat bar cover) |
| 1167 | wire (e.g., steel compression spring, zinc plated music wire, 1.25" long, 0.360 od, 0.041" wire) |
| 1168 | heating element coupler |
| 1169 | heating element coupler |
| 1170 | element portion |
| 1171 | angled portion |
| 1172 | bracket portion |
| 1201 | overedge coating area |
| 1202 | tubular bag portion edge |
| 1203 | gusset edge |
| 1204 | gusset edge |
| 1205 | gusset edge |
| 1206 | gusset edge |
| 1207 | open end |
| 1208 | open end |
| 1220 | tubular member |
| 1230 | top bar |
| 1231 | bottom bar |
| 1232 | first bag portion |
| 1233 | second bag portion |
| 1234 | first coating |
| 1235 | second coating |
| 1236 | bond |
| 1300 | carrier plate |

-continued

| PART NUMBER | DESCRIPTION |
|---|---|
| 1301 | carrier plate end side and end rails sub-assembly |
| 1302 | bag carrier edge guide |
| 1303 | screw (e.g., hex drive flat head screw 4-40, ⅞" (2.22 cm) L stainless steel) |
| 1304 | washer (e.g., split lock washer #4, stainless steel) |
| 1305 | nut (e.g., hex nut 4-40, stainless steel) |
| 1306 | clamp (e.g., hold-down toggle clamp with spring plunger) |
| 1307 | screw (e.g., hex drive flat head screw 4-40, 5/16 L stainless steel) |
| 1311 | carrier plate base |
| 1312 | carrier plate side rail (e.g., with mounting holes) |
| 1313 | carrier plate end rail (e.g., with mounting holes) |
| 1314 | screw (e.g., hex drive flat head screw 4-40, 5/16 L stainless steel) |
| 1315 | washer (e.g., split lock washer for #4 screw, stainless steel) |
| 1316 | nut (e.g., hex nut 4-40, stainless steel) |
| 1317 | pop rivet |
| 1318 | carrier plate spout guide |
| 1319 | carrier plate loop outboard guide |
| 1320 | carrier plate loop inboard guide |
| 1321 | carrier plate top guide |
| 1322 | carrier plate bottom guide |
| 1332 | spring plunger mount |
| 1333 | washer (e.g., washer #10) |
| 1334 | nut (e.g., hex nut 10-32, stainless steel |
| 1335 | screw (e.g., button head socket cap screw, 10-32, ¾" (1.9 cm) L, stainless steel) |
| 1336 | spring plunger (e.g., spring plunger without thread lock, steel body and stainless steel nose) |
| 1580 | heat sealing system |
| 1581 | attachment plate, |
| 1582 | yoke attachment |
| 1583 | slotted position bracket |
| 1584 | position bracket |
| 1585 | thread rod |
| 1586 | washer |
| 1587 | nut |
| 1588 | cylinder front bracket 1588 |
| 1589 | heating element (e.g., 17 inch heating element) (43.18 cm) |
| 1590 | heating element (e.g., 18.5 inch heating element) (47 cm) |
| 1591 | fabric tape (e.g., Teflon fabric tape overlap portion) |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the claims.

The invention claimed is:

1. A carrier plate for use in a heat sealing system for heat sealing flexible fabric parts together, the carrier plate comprising:

one or more first guides adapted for guiding parts positioning of the flexible fabric parts;

one or more second guides adapted for guiding positioning of the carrier plate in a machine that is adapted for heat sealing the flexible fabric parts together; and wherein the carrier plate has (a) a parts assembly function, (b) a tooling set-up function, and (c) a quality checks function adapted to quality check the flexible fabric parts during assembly.

2. The carrier plate of claim 1 wherein the carrier plate is adapted for use with the machine, which is operable to heat seal the flexible fabric parts together while on the carrier plate to form a bulk bag that can hold 500 to 5,000 pounds of bulk material.

3. The carrier plate of claim 1 wherein the carrier plate is adapted for use with the machine, which is operable to heat seal the flexible fabric parts together while on the carrier plate to form a bag that can hold under 500 pounds of bulk material.

4. The carrier plate of claim 1 wherein the carrier plate is adapted for use with the machine, which includes one or more heat sealing bars.

5. The carrier plate of claim 4 wherein the parts assembly function is adapted to align the flexible fabric parts on the carrier plate such that one of said flexible fabric parts overlaps another of said flexible fabric parts in an overlap area, and wherein the tooling set-up function is adapted to align the carrier plate in the machine such that a said heat seal bar is over the overlap area, said heat seal bar for heat sealing said flexible fabric parts together at the overlap area.

6. The carrier plate of claim 1 wherein the carrier plate includes a first opening and wherein the machine includes a first upper heat seal bar and a first lower heat seal bar, and wherein the parts assembly function is adapted to align two of the flexible fabric parts over the first opening such that one of said flexible fabric parts overlaps another of said flexible fabric parts in a first overlap area over the first opening, and wherein the tooling set-up function is adapted to align the carrier plate in the machine such that the first upper heat seal bar is over the first overlap area and over the first opening and such that the first lower heat seal bar is under the first overlap area and under the first opening, the upper and lower heat seal bars for heat sealing said flexible fabric parts together at the first overlap area.

7. The carrier plate of claim 6 wherein the carrier plate includes a second opening and wherein the machine includes a second upper heat seal bar and a second lower heat seal bar, and wherein the parts assembly function is adapted to align two of the flexible fabric parts over the second opening such that one of said flexible fabric parts overlaps another of said flexible fabric parts in a second overlap area over the second opening, and wherein the tooling set-up function is adapted to align the carrier plate in the machine such that the second upper heat seal bar is over the second overlap area and over the second opening and such that the second lower heat seal bar is under the second overlap area and under the second opening, the second upper heat seal bar and second lower heat seal bar for heat sealing said flexible fabric parts together at the second overlap area.

8. The carrier plate of claim 7 wherein the carrier plate includes a third opening and wherein the machine includes a third upper heat seal bar and a third lower heat seal bar, and wherein the parts assembly function is adapted to align two of the flexible fabric parts over the third opening such that one of said flexible fabric parts overlaps another of said flexible fabric parts in a third overlap area over the third opening, and wherein the tooling set-up function is adapted to align the carrier plate in the machine such that the third upper heat seal bar is over the third overlap area and over the third opening and such that the third lower heat seal bar is under the third overlap area and under the third opening, the third upper heat seal bar and third lower heat seal bar for heat sealing said flexible fabric parts together at the third overlap area.

9. The carrier plate of claim 8 wherein the carrier plate includes a fourth opening and wherein the machine includes a fourth upper heat seal bar and a fourth lower heat seal bar, and wherein the parts assembly function is adapted to align two of the flexible fabric parts over the fourth opening such that one of said flexible fabric parts overlaps another of said flexible fabric parts in a fourth overlap area over the fourth opening, and wherein the tooling set-up function is adapted to align the carrier plate in the machine such that the fourth upper heat seal bar is over the fourth overlap area and over the fourth opening and such that the fourth lower heat seal bar is under the fourth overlap area and under the fourth opening, the fourth upper heat seal bar and fourth lower heat seal bar for heat sealing said flexible fabric parts together at the fourth overlap area.

10. The carrier plate of claim 4 wherein the carrier plate is adapted for use with the one or more heat seal bars, and wherein the one or more heat seal bars are adapted to self align during heat sealing of the flexible fabric parts while the flexible fabric parts are on the carrier plate.

11. The carrier plate of claim 6 wherein the carrier plate is adapted for use with the first upper heat seal bar and the first lower heat seal bar, and wherein the first upper heat seal bar is adapted to self align during heat sealing of the flexible fabric parts while the flexible fabric parts are on the carrier plate.

12. A carrier plate for use in a heat sealing system for heat sealing flexible fabric parts together, the carrier plate comprising:

one or more first guides adapted for guiding parts positioning of the flexible fabric parts and for guiding formation of overlapped heat sealing areas of the flexible fabric parts;

one or more second guides adapted for guiding positioning of the carrier plate in a machine having a heat seal bar assembly, wherein the one or more second guides are operable to guide positioning of the carrier plate in the machine so that the heat seal bar assembly can join two of said flexible fabric parts that are on the carrier plate together at a said overlapped heat sealing area; and wherein the carrier plate has a quality checks function adapted to quality check dimensions of the flexible fabric parts.

13. The carrier plate of claim 12 wherein the carrier plate is adapted so that the machine can heat seal the flexible fabric parts together while on the carrier plate to form a bulk bag that can hold 500 to 5,000 pounds of bulk material.

14. The carrier plate of claim 12 wherein the carrier plate is adapted so that the machine can heat seal the flexible fabric parts together while on the carrier plate to form a bag of that can hold under 500 pounds of bulk material.

15. The carrier plate of claim 12 wherein the carrier plate is adapted for use with the machine, which includes more than one heat sealing bar assembly.

16. The carrier plate of claim 12 wherein the one or more second guides are adapted to align the carrier plate in the machine with the flexible fabric parts assembled thereon, such that the heat seal bar assembly is over the overlapped heat sealing area, the heat seal bar assembly for joining said flexible fabric parts together at the overlapped heat sealing area.

17. The carrier plate of claim 12 wherein the carrier plate includes an opening, wherein the overlapped heat sealing area is positionable over the opening, and wherein the one or more second guides are adapted to align the opening in the machine so that the heat seal bar assembly can join the flexible fabric parts at the overlapped heat sealing area while the flexible fabric parts are positioned on the carrier plate.

18. The carrier plate of claim 15 wherein the carrier plate includes more than one opening, wherein each of the more than one heat seal bar assemblies includes an upper seal bar and a lower seal bar, and wherein the one or more second guides are adapted to align each said opening between a said upper seal bar and a said lower seal bar of each said seal bar assembly.

19. The carrier plate of claim 12 wherein the carrier plate is adapted for use with the heat seal bar assembly, which is operable to self align during heat sealing of the flexible fabric parts while the flexible fabric parts are on the carrier plate.

20. The carrier plate of claim 15 wherein the carrier plate is adapted for use with the more than one heat seal bar assemblies, which are operable to self align during heat sealing of the flexible fabric parts while the flexible fabric parts are on the carrier plate.

* * * * *